US012598206B2

(12) United States Patent
Giffard

(10) Patent No.: US 12,598,206 B2
(45) Date of Patent: \*Apr. 7, 2026

(54) DETERMINING EXPLOIT PREVENTION USING MACHINE LEARNING

(71) Applicant: Open Text Inc., Menlo Park, CA (US)

(72) Inventor: Jonathan Giffard, Donisthorpe (GB)

(73) Assignee: OPEN TEXT INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,319

(22) Filed: Oct. 12, 2021

(65) Prior Publication Data

US 2022/0030008 A1 Jan. 27, 2022

Related U.S. Application Data

(63) Continuation of application No. 15/952,656, filed on Apr. 13, 2018, now Pat. No. 11,159,553.

(51) Int. Cl.
*H04L 29/06* (2006.01)
*G06F 16/22* (2019.01)
(Continued)

(52) U.S. Cl.
CPC ...... *H04L 63/1433* (2013.01); *G06F 16/2255* (2019.01); *G06N 20/00* (2019.01)

(58) Field of Classification Search
CPC . H06L 63/1433; H06L 63/16; G06F 16/2255; G06N 20/00
See application file for complete search history.

(56) References Cited

U.S. PATENT DOCUMENTS

| 5,121,345 A | 6/1992 | Lentz |
| 5,359,659 A | 10/1994 | Rosenthal |

(Continued)

FOREIGN PATENT DOCUMENTS

| AU | 701007 B2 | 1/1999 |
| AU | 2001262958 A1 | 11/2001 |

(Continued)

OTHER PUBLICATIONS

*Crowdstrike, Inc.* v. *Webroot Inc.*, PTAB Case No. IPR2022-01522, Petition for Inter Partes Review of U.S. Pat. No. 10,284,591, 77 pgs.
(Continued)

*Primary Examiner* — Joseph P Hirl
*Assistant Examiner* — Chi D Nguy
(74) *Attorney, Agent, or Firm* — Sprinkle IP Law Group

(57) ABSTRACT

Examples of the present disclosure describe systems and methods for determining exploit prevention software settings using machine learning. In aspects, exploit prevention software may be used to identify processes executing on a computing device. Metadata for the identified processes may be determined and transmitted to a machine learning system. The machine learning system may use an exploit prevention model to determine exploit prevention configuration settings for each of the processes, and may transmit the configuration setting to the computing device. The computing device may implement the configuration settings to protect the processes and monitor the stability of the protected processes as they execute. The computing device may transmit the stability data to the machine-learning system. The machine-learning system may then modify the exploit prevention model based on the stability data.

23 Claims, 5 Drawing Sheets

(51) Int. Cl.
　　G06N 20/00 　　　(2019.01)
　　H04L 9/40 　　　(2022.01)

(56) References Cited

U.S. PATENT DOCUMENTS

| | | | |
|---|---|---|---|
| 5,440,723 | A | 8/1995 | Arnold |
| 5,450,586 | A | 9/1995 | Kuzara |
| 5,473,769 | A | 12/1995 | Cozza |
| 5,511,184 | A | 4/1996 | Lin |
| 5,623,600 | A | 4/1997 | Ji |
| 5,680,547 | A | 10/1997 | Chang |
| 5,696,822 | A | 12/1997 | Nachenberg |
| 5,826,013 | A | 10/1998 | Nachenberg |
| 5,832,208 | A | 11/1998 | Chen |
| 5,886,699 | A | 3/1999 | Belfiore |
| 5,889,943 | A | 3/1999 | Ji |
| 5,951,698 | A | 9/1999 | Chen |
| 5,960,170 | A | 9/1999 | Chen |
| 5,983,348 | A | 11/1999 | Ji |
| 5,991,881 | A | 11/1999 | Conklin |
| 5,999,723 | A | 12/1999 | Nachenberg |
| 6,021,510 | A | 2/2000 | Nachenberg |
| 6,035,423 | A | 3/2000 | Hodges |
| 6,044,155 | A | 3/2000 | Thomlinson |
| 6,088,804 | A | 7/2000 | Hill |
| 6,092,194 | A | 7/2000 | Touboul |
| 6,094,731 | A | 7/2000 | Waldin |
| 6,149,522 | A | 11/2000 | Alcorn |
| 6,154,844 | A | 11/2000 | Touboul |
| 6,195,587 | B1 | 2/2001 | Hruska |
| 6,272,641 | B1 | 8/2001 | Ji |
| 6,321,338 | B1 | 11/2001 | Porras |
| 6,327,579 | B1 | 12/2001 | Crawford |
| 6,412,071 | B1 | 6/2002 | Hollander |
| 6,460,060 | B1 | 10/2002 | Maddalozzo |
| 6,578,094 | B1 | 6/2003 | Moudgill |
| 6,594,686 | B1 | 7/2003 | Edwards |
| 6,658,571 | B1 | 12/2003 | O'Brien |
| 6,663,000 | B1 | 12/2003 | Muttik |
| 6,704,874 | B1 | 3/2004 | Porras |
| 6,721,721 | B1 | 4/2004 | Bates |
| 6,728,886 | B1 | 4/2004 | Ji |
| 6,735,703 | B1 | 5/2004 | Kilpatrick |
| 6,742,123 | B1 | 5/2004 | Foote |
| 6,742,128 | B1 | 5/2004 | Joiner |
| 6,772,346 | B1 | 8/2004 | Chess |
| 6,772,363 | B2 | 8/2004 | Pedone |
| 6,775,780 | B1 | 8/2004 | Muttik |
| 6,785,732 | B1 | 8/2004 | Bates |
| 6,839,850 | B1 | 1/2005 | Campbell |
| 6,842,861 | B1 | 1/2005 | Cox |
| 6,873,988 | B2 | 3/2005 | Herrmann |
| 6,880,110 | B2 | 4/2005 | Largman |
| 6,886,099 | B1 | 4/2005 | Smithson |
| 6,889,167 | B2 | 5/2005 | Curry |
| 6,928,550 | B1 | 8/2005 | Le Pennec |
| 6,944,772 | B2 | 9/2005 | Dozortsev |
| 6,966,059 | B1 | 11/2005 | Shetty |
| 6,971,019 | B1 | 11/2005 | Nachenberg |
| 6,973,577 | B1 | 12/2005 | Kouznetsov |
| 6,983,377 | B1 | 1/2006 | Beesley |
| 7,024,694 | B1 | 4/2006 | Ko |
| 7,043,757 | B2 | 5/2006 | Hoefelmeyer |
| 7,055,008 | B2 | 5/2006 | Niles |
| 7,055,148 | B2 | 5/2006 | Marsh |
| 7,062,553 | B2 | 6/2006 | Liang |
| 7,069,480 | B1 | 6/2006 | Lovy |
| 7,080,000 | B1 | 7/2006 | Cambridge |
| 7,089,428 | B2 | 8/2006 | Farley |
| 7,093,239 | B1 | 8/2006 | van der Made |
| 7,093,292 | B1 | 8/2006 | Pantuso |
| 7,096,215 | B2 | 8/2006 | Bates |
| 7,096,500 | B2 | 8/2006 | Roberts |
| 7,099,853 | B1 | 8/2006 | Liu |
| 7,107,618 | B1 | 9/2006 | Gordon |

| | | | | |
|---|---|---|---|---|
| 7,134,141 | B2 | 11/2006 | Crosbie | |
| 7,152,164 | B1 | 12/2006 | Loukas | |
| 7,152,242 | B2 | 12/2006 | Douglas | |
| 7,174,566 | B2 | 2/2007 | Yadav | |
| 7,178,165 | B2 | 2/2007 | Abrams | |
| 7,188,369 | B2 | 3/2007 | Ho | |
| 7,203,960 | B1 | 4/2007 | Painter | |
| 7,203,962 | B1 | 4/2007 | Moran | |
| 7,210,168 | B2 | 4/2007 | Hursey | |
| 7,225,343 | B1 | 5/2007 | Honig | |
| 7,228,562 | B2 | 6/2007 | Kobayashi et al. | |
| 7,231,667 | B2 | 6/2007 | Jordan | |
| 7,237,008 | B1 | 6/2007 | Tarbotton | |
| 7,257,841 | B2 | 8/2007 | Naitoh | |
| 7,263,616 | B1 | 8/2007 | Brackett | |
| 7,269,851 | B2 | 9/2007 | Ackroyd | |
| 7,287,278 | B2 | 10/2007 | Liang | |
| 7,287,281 | B1 | 10/2007 | Szor | |
| 7,290,266 | B2 | 10/2007 | Gladstone | |
| 7,290,282 | B1 | 10/2007 | Renert | |
| 7,302,706 | B1 | 11/2007 | Hicks | |
| 7,308,487 | B1 * | 12/2007 | Dansie | H04N 21/4424 |
| | | | | 705/40 |
| 7,308,714 | B2 | 12/2007 | Bardsley | |
| 7,310,817 | B2 | 12/2007 | Hinchliffe | |
| 7,334,264 | B2 | 2/2008 | Takahashi | |
| 7,340,777 | B1 | 3/2008 | Szor | |
| 7,345,843 | B2 | 3/2008 | Seol | |
| 7,352,280 | B1 | 4/2008 | Rockwood | |
| 7,356,736 | B2 | 4/2008 | Natvig | |
| 7,356,843 | B1 | 4/2008 | Kingsford | |
| 7,370,361 | B2 | 5/2008 | de los Santos | |
| 7,373,664 | B2 | 5/2008 | Kissel | |
| 7,373,667 | B1 | 5/2008 | Millard | |
| 7,376,970 | B2 | 5/2008 | Marinescu | |
| 7,386,886 | B1 | 6/2008 | Abrams | |
| 7,392,543 | B2 | 6/2008 | Szor | |
| 7,398,399 | B2 | 7/2008 | Palliyil | |
| 7,398,553 | B1 | 7/2008 | Li | |
| 7,401,359 | B2 | 7/2008 | Gartside | |
| 7,406,454 | B1 | 7/2008 | Liu | |
| 7,406,603 | B1 | 7/2008 | MacKay | |
| 7,415,726 | B2 | 8/2008 | Kelly | |
| 7,418,729 | B2 | 8/2008 | Szor | |
| 7,424,609 | B2 | 9/2008 | Kwan | |
| 7,426,574 | B2 | 9/2008 | Liao | |
| 7,434,260 | B2 | 10/2008 | Hong | |
| 7,434,261 | B2 | 10/2008 | Costea | |
| 7,448,084 | B1 | 11/2008 | Apap | |
| 7,448,085 | B1 | 11/2008 | Reyes | |
| 7,450,005 | B2 | 11/2008 | Anand | |
| 7,461,339 | B2 | 12/2008 | Liao | |
| 7,472,288 | B1 | 12/2008 | Chou | |
| 7,475,135 | B2 | 1/2009 | Bantz | |
| 7,478,431 | B1 | 1/2009 | Nachenberg | |
| 7,487,543 | B2 | 2/2009 | Arnold | |
| 7,496,960 | B1 | 2/2009 | Chen | |
| 7,509,676 | B2 | 3/2009 | Trueba | |
| 7,509,677 | B2 | 3/2009 | Saurabh | |
| 7,509,680 | B1 | 3/2009 | Sallam | |
| 7,512,808 | B2 | 3/2009 | Liang | |
| 7,516,317 | B2 | 4/2009 | Diwan | |
| 7,516,476 | B1 | 4/2009 | Kraemer | |
| 7,519,998 | B2 | 4/2009 | Cai | |
| 7,523,493 | B2 | 4/2009 | Liang | |
| 7,523,501 | B2 | 4/2009 | Liang | |
| 7,536,456 | B2 | 5/2009 | Williams | |
| 7,549,055 | B2 | 6/2009 | Zimmer | |
| 7,555,777 | B2 | 6/2009 | Swimmer | |
| 7,558,796 | B1 | 7/2009 | Bromwich | |
| 7,565,550 | B2 | 7/2009 | Liang | |
| 7,568,233 | B1 | 7/2009 | Szor | |
| 7,571,482 | B2 | 8/2009 | Polyakov | |
| 7,574,741 | B2 | 8/2009 | Aviani | |
| 7,577,721 | B1 | 8/2009 | Chen | |
| 7,587,724 | B2 | 9/2009 | Yeap | |
| 7,590,813 | B1 | 9/2009 | Szor | |
| 7,591,018 | B1 | 9/2009 | Lee | |
| 7,594,111 | B2 | 9/2009 | Kiriansky | |

(56)　　　　　References Cited

U.S. PATENT DOCUMENTS

| | | |
|---|---|---|
| 7,594,267 B2 | 9/2009 | Gladstone |
| 7,594,272 B1 | 9/2009 | Kennedy |
| 7,603,440 B1 | 10/2009 | Grabowski |
| 7,603,711 B2 | 10/2009 | Scheidell |
| 7,613,930 B2 | 11/2009 | Dotan |
| 7,621,613 B2 | 11/2009 | Kojima |
| 7,624,444 B2 | 11/2009 | Gupta |
| 7,624,448 B2 | 11/2009 | Coffman |
| 7,627,758 B1 | 12/2009 | Tock |
| 7,627,898 B2 | 12/2009 | Beck |
| 7,634,521 B1 | 12/2009 | Spertus |
| 7,634,806 B2 | 12/2009 | Zinda |
| 7,636,716 B1 | 12/2009 | Cheng |
| 7,636,946 B2 | 12/2009 | Verma |
| 7,640,434 B2 | 12/2009 | Lee |
| 7,647,636 B2 | 1/2010 | Polyakov |
| 7,653,941 B2 | 1/2010 | Gleichauf |
| 7,657,838 B2 | 2/2010 | Daniell |
| 7,660,999 B2 | 2/2010 | Kudallur |
| 7,664,626 B1 | 2/2010 | Ferrie |
| 7,664,984 B2 | 2/2010 | Wang |
| 7,665,123 B1 | 2/2010 | Szor |
| 7,665,138 B2 | 2/2010 | Song |
| 7,673,341 B2 | 3/2010 | Kramer |
| 7,681,226 B2 | 3/2010 | Kraemer |
| 7,689,531 B1 | 3/2010 | Diao |
| 7,689,984 B2 | 3/2010 | Riley |
| 7,690,038 B1 | 3/2010 | Ko |
| 7,694,150 B1 | 4/2010 | Kirby |
| 7,702,907 B2 | 4/2010 | Vaha-Sipila |
| 7,707,635 B1 | 4/2010 | Kuo |
| 7,707,636 B2 | 4/2010 | Catanzano |
| 7,711,673 B1 | 5/2010 | Diao |
| 7,730,481 B2 | 6/2010 | Chou |
| 7,734,790 B1 | 6/2010 | Chen |
| 7,735,138 B2 | 6/2010 | Zhao |
| 7,739,738 B1 | 6/2010 | Sobel |
| 7,739,739 B2 | 6/2010 | Dettinger |
| 7,739,741 B2 | 6/2010 | Saffre |
| 7,743,419 B1 | 6/2010 | Mashevsky |
| 7,748,038 B2 | 6/2010 | Oliver |
| 7,756,535 B1 | 7/2010 | Diao |
| 7,756,834 B2 | 7/2010 | Masters |
| 7,765,589 B2 | 7/2010 | Keochane |
| 7,765,592 B2 | 7/2010 | Wang |
| 7,774,824 B2 | 8/2010 | Ross |
| 7,774,845 B2 | 8/2010 | Shipman |
| 7,778,999 B1 | 8/2010 | Boisjolie |
| 7,779,119 B2 | 8/2010 | Ginter |
| 7,779,470 B2 | 8/2010 | Keochane |
| 7,779,472 B1 | 8/2010 | Lou |
| 7,784,098 B1 | 8/2010 | Fan |
| 7,793,091 B2 | 9/2010 | Weikel |
| 7,802,301 B1 | 9/2010 | Dreyer |
| 7,809,796 B1 | 10/2010 | Bloch |
| 7,818,800 B1 | 10/2010 | Lemley |
| 7,822,818 B2 | 10/2010 | Desouza |
| 7,836,133 B2 | 11/2010 | Quinlan |
| 7,840,763 B2 | 11/2010 | Murotake |
| 7,840,958 B1 | 11/2010 | Wan |
| 7,841,006 B2 | 11/2010 | Gassoway |
| 7,845,009 B2 | 11/2010 | Grobman |
| 7,854,006 B1 | 12/2010 | Andruss |
| 7,856,538 B2 | 12/2010 | Speirs |
| 7,856,573 B2 | 12/2010 | Ingram |
| 7,861,303 B2 | 12/2010 | Kouznetsov |
| 7,865,956 B1 | 1/2011 | Cambridge |
| 7,874,001 B2 | 1/2011 | Beck |
| 7,877,801 B2 | 1/2011 | Repasi |
| 7,877,809 B1 | 1/2011 | Sutton |
| 7,890,619 B2 | 2/2011 | Morota |
| 7,899,849 B2 | 3/2011 | Chaudhry |
| 7,899,901 B1 | 3/2011 | Njemanze |
| 7,900,194 B1 | 3/2011 | Mankins |
| 7,913,303 B1 | 3/2011 | Rouland |
| 7,926,106 B1 | 4/2011 | Kennedy |
| 7,930,746 B1 | 4/2011 | Sheleheda |
| 7,934,103 B2 | 4/2011 | Kidron |
| 7,937,758 B2 | 5/2011 | Kronenberg |
| 7,941,659 B2 | 5/2011 | Lam |
| 7,945,957 B2 | 5/2011 | Dettinger |
| 7,949,771 B1 | 5/2011 | Chen |
| 7,966,650 B2 | 6/2011 | Manring |
| 7,971,255 B1 | 6/2011 | Kc |
| 7,975,260 B1 | 7/2011 | Conover |
| 7,975,302 B2 | 7/2011 | Armingaud |
| 7,979,889 B2 | 7/2011 | Gladstone |
| 7,984,503 B2 | 7/2011 | Edwards |
| 7,992,156 B1 | 8/2011 | Wang |
| 7,996,374 B1 | 8/2011 | Jones |
| 7,996,637 B2 | 8/2011 | Inoue |
| 7,996,902 B1 | 8/2011 | Gordon |
| 7,996,905 B2 | 8/2011 | Arnold |
| 8,015,174 B2 | 9/2011 | Hubbard |
| 8,023,974 B1 | 9/2011 | Diao |
| 8,024,807 B2 | 9/2011 | Hall |
| 8,028,326 B2 | 9/2011 | Palmer |
| 8,028,336 B2 | 9/2011 | Schuba |
| 8,037,290 B1 | 10/2011 | Stutton |
| 8,042,102 B2 | 10/2011 | DeWitt |
| 8,042,186 B1 | 10/2011 | Polyakov |
| 8,051,487 B2 | 11/2011 | Huang |
| 8,056,136 B1 | 11/2011 | Zaitsev |
| 8,069,213 B2 | 11/2011 | Bloch |
| 8,074,287 B2 | 12/2011 | Barde |
| 8,087,087 B1 | 12/2011 | van Oorschot |
| 8,090,816 B1 | 1/2012 | Deshmukh |
| 8,108,332 B2 | 1/2012 | Misra |
| 8,117,433 B2 | 2/2012 | McIntosh |
| 8,117,659 B2 | 2/2012 | Hartrell |
| 8,140,664 B2 | 3/2012 | Huang |
| 8,145,904 B2 | 3/2012 | Cavanaugh |
| 8,161,548 B1 | 4/2012 | Wan |
| 8,161,552 B1 | 4/2012 | Sun |
| 8,171,552 B1 | 5/2012 | Chang |
| 8,176,527 B1 | 5/2012 | Njemanze |
| 8,181,244 B2 | 5/2012 | Boney |
| 8,190,868 B2 | 5/2012 | Schneider |
| 8,191,139 B2 | 5/2012 | Heimerdinger |
| 8,200,953 B1 * | 6/2012 | Parsons .................. G06F 21/57 |
| | | 713/1 |
| 8,201,243 B2 | 6/2012 | Boney |
| 8,205,261 B1 | 6/2012 | Andruss |
| 8,220,050 B2 | 7/2012 | Sarathy |
| 8,225,407 B1 | 7/2012 | Thrower |
| 8,230,499 B1 | 7/2012 | Pereira |
| 8,230,506 B1 | 7/2012 | Forristal |
| 8,234,687 B2 | 7/2012 | Baumhof |
| 8,234,710 B2 | 7/2012 | Wenzinger |
| 8,239,668 B1 | 8/2012 | Chen |
| 8,239,947 B1 | 8/2012 | Glick |
| 8,261,347 B2 | 9/2012 | Hrabik |
| 8,266,698 B1 | 9/2012 | Seshardi |
| 8,272,058 B2 | 9/2012 | Brennan |
| 8,286,239 B1 | 10/2012 | Sutton |
| 8,291,381 B2 | 10/2012 | Lai |
| 8,291,498 B1 | 10/2012 | Liang |
| 8,312,545 B2 | 11/2012 | Tuvell |
| 8,321,910 B1 | 11/2012 | English |
| 8,327,446 B2 | 12/2012 | Liang |
| 8,332,946 B1 | 12/2012 | Boisjolie |
| 8,341,649 B2 | 12/2012 | Freericks |
| 8,365,286 B2 | 1/2013 | Poston |
| 8,370,938 B1 | 2/2013 | Daswani |
| 8,375,450 B1 | 2/2013 | Oliver |
| 8,387,146 B2 | 2/2013 | Parish |
| 8,412,779 B1 | 4/2013 | Qian |
| 8,418,249 B1 | 4/2013 | Nucci |
| 8,418,250 B2 | 4/2013 | Morris |
| 8,429,180 B1 | 4/2013 | Sobel |
| 8,429,746 B2 | 4/2013 | Capalik |
| 8,438,386 B2 | 5/2013 | Hegli |
| 8,443,449 B1 | 5/2013 | Fan |
| 8,458,797 B1 | 6/2013 | Yu |

(56)　　　　References Cited

U.S. PATENT DOCUMENTS

| | | |
|---|---|---|
| 8,464,318 B1 | 6/2013 | Hallak |
| 8,468,602 B2 | 6/2013 | McDougal |
| 8,484,732 B1 | 7/2013 | Chen |
| 8,490,183 B2 | 7/2013 | Kondo |
| 8,495,144 B1 | 7/2013 | Cheng |
| 8,495,743 B2 | 7/2013 | Kraemer |
| 8,505,094 B1 | 8/2013 | Xuewen |
| 8,510,596 B1 | 8/2013 | Gupta |
| 8,516,583 B2 | 8/2013 | Thomas |
| 8,533,831 B2 | 9/2013 | Satish |
| 8,533,837 B2 | 9/2013 | Cavanaugh |
| 8,549,581 B1 | 10/2013 | Kailash |
| 8,554,907 B1 | 10/2013 | Chen |
| 8,560,466 B2 | 10/2013 | Diao |
| 8,561,182 B2 | 10/2013 | Lee |
| 8,561,190 B2 | 10/2013 | Marinescu |
| 8,572,729 B1 | 10/2013 | Lowe |
| 8,578,497 B2 | 11/2013 | Antonakakis |
| 8,584,240 B1 | 11/2013 | Yang |
| 8,584,241 B1 | 11/2013 | Jenks |
| 8,601,581 B2 | 12/2013 | Wenzinger |
| 8,607,066 B1 | 12/2013 | Kailash |
| 8,619,971 B2 | 12/2013 | Kurien |
| 8,627,458 B2 | 1/2014 | Muttik |
| 8,635,669 B2 | 1/2014 | Iftode |
| 8,645,340 B2 | 2/2014 | Kester |
| 8,646,038 B2 | 2/2014 | Blumfield |
| 8,650,648 B2 | 2/2014 | Howard |
| 8,656,488 B2 | 2/2014 | Liang |
| 8,656,493 B2 | 2/2014 | Capalik |
| 8,661,062 B1 | 2/2014 | Jamail |
| 8,661,541 B2 | 2/2014 | Beck |
| 8,667,590 B1 | 3/2014 | Lee |
| 8,683,031 B2 | 3/2014 | Green |
| 8,688,797 B2 | 4/2014 | Hesselink |
| 8,709,924 B2 | 4/2014 | Hanawa |
| 8,713,682 B2 * | 4/2014 | Shulman ............... G06F 21/577 |
| | | 726/1 |
| 8,719,924 B1 | 5/2014 | Williamson |
| 8,719,932 B2 | 5/2014 | Boney |
| 8,719,939 B2 | 5/2014 | Krasser |
| 8,726,389 B2 | 5/2014 | Morris |
| 8,732,824 B2 | 5/2014 | Arbaugh |
| 8,763,123 B2 | 6/2014 | Morris |
| 8,789,189 B2 | 7/2014 | Capalik |
| 8,793,798 B2 | 7/2014 | Fossen |
| 8,799,190 B2 | 8/2014 | Stokes |
| 8,826,439 B1 | 9/2014 | Hu |
| 8,838,992 B1 | 9/2014 | Zhu |
| 8,839,417 B1 | 9/2014 | Jordan |
| 8,839,422 B2 | 9/2014 | Ghosh |
| 8,850,570 B1 | 9/2014 | Ramzan |
| 8,856,473 B2 | 10/2014 | van Riel |
| 8,856,505 B2 | 10/2014 | Schneider |
| 8,869,139 B2 | 10/2014 | Le |
| 8,875,289 B2 | 10/2014 | Mahaffey |
| 8,881,283 B2 | 11/2014 | Tuvell |
| 8,885,928 B2 | 11/2014 | Forman |
| 8,885,938 B2 | 11/2014 | Hong |
| 8,925,101 B2 | 12/2014 | Bhargava |
| 8,935,788 B1 | 1/2015 | Diao |
| 8,935,792 B1 | 1/2015 | Spurlock |
| 8,943,592 B1 | 1/2015 | Mirski |
| 8,955,104 B2 | 2/2015 | Arbaugh |
| 8,955,133 B2 | 2/2015 | Kumar |
| 8,955,134 B2 | 2/2015 | Hartrell |
| 9,021,589 B2 | 4/2015 | Anderson |
| 9,043,894 B1 | 5/2015 | Dennison |
| 9,043,903 B2 | 5/2015 | Diehl |
| 9,104,871 B2 | 8/2015 | Tuvell |
| 9,117,075 B1 | 8/2015 | Yeh |
| 9,129,110 B1 | 9/2015 | Mason |
| 9,129,111 B2 | 9/2015 | Rothwell |
| 9,152,789 B2 | 10/2015 | Natarajan |
| 9,171,157 B2 | 10/2015 | Flores |
| 9,177,153 B1 | 11/2015 | Perrig |
| 9,189,750 B1 | 11/2015 | Narsky |
| 9,208,323 B1 | 12/2015 | Karta |
| 9,213,836 B2 | 12/2015 | Mayer |
| 9,245,120 B2 | 1/2016 | Friedrichs |
| 9,251,373 B2 | 2/2016 | AlHarbi |
| 9,286,182 B2 | 3/2016 | Fries |
| 9,292,881 B2 | 3/2016 | Alperovitch |
| 9,306,966 B2 | 4/2016 | Eskin |
| 9,306,971 B2 | 4/2016 | Altman |
| 9,319,385 B2 | 4/2016 | Iwanski |
| 9,324,034 B2 | 4/2016 | Gupta |
| 9,330,257 B2 | 5/2016 | Valencia |
| 9,336,390 B2 | 5/2016 | Pavlyushchik |
| 9,349,103 B2 | 5/2016 | Eberhardt |
| 9,398,034 B2 | 7/2016 | Ronen |
| 9,400,886 B1 | 7/2016 | Beloussov |
| 9,411,953 B1 | 8/2016 | Kane |
| 9,413,721 B2 | 8/2016 | Morris |
| 9,424,430 B2 | 8/2016 | Rosenan |
| 9,465,936 B2 | 10/2016 | Tosa |
| 9,465,940 B1 | 10/2016 | Wojnowicz |
| 9,489,514 B2 | 11/2016 | Mankin |
| 9,497,204 B2 | 11/2016 | Symons |
| 9,516,039 B1 | 12/2016 | Yen |
| 9,516,057 B2 | 12/2016 | Aziz |
| 9,578,045 B2 | 2/2017 | Jaroch |
| 9,602,538 B1 | 3/2017 | Chou |
| 9,654,495 B2 | 5/2017 | Hubbard |
| 9,672,355 B2 | 6/2017 | Titonis |
| 9,710,647 B2 | 7/2017 | Zimmer |
| 9,721,212 B2 | 8/2017 | Gupta |
| 9,734,125 B2 | 8/2017 | Baldry |
| 9,781,151 B1 | 10/2017 | McCorkendale |
| 9,832,211 B2 | 11/2017 | Hsiao |
| 9,853,997 B2 | 12/2017 | Canzanese |
| 9,866,584 B2 | 1/2018 | Capalik |
| 9,904,784 B2 | 2/2018 | Diehl |
| 9,940,459 B1 | 4/2018 | Saxe |
| 9,954,872 B2 | 4/2018 | Capalik |
| 10,025,928 B2 | 7/2018 | Jaroch |
| 10,043,008 B2 | 8/2018 | Costea |
| 10,169,579 B1 | 1/2019 | Xu |
| 10,182,061 B2 | 1/2019 | Balasubramanian |
| 10,257,224 B2 | 4/2019 | Jaroch |
| 10,262,136 B1 | 4/2019 | Kailash |
| 10,268,820 B2 | 4/2019 | Okano |
| 10,277,617 B2 | 4/2019 | Yang |
| 10,284,591 B2 | 5/2019 | Giuliani |
| 10,395,032 B2 | 8/2019 | Keller |
| 10,599,844 B2 | 3/2020 | Schmidtler |
| 10,649,970 B1 | 5/2020 | Saxe |
| 10,666,676 B1 | 5/2020 | Hsu |
| 10,783,254 B2 | 9/2020 | Sharma |
| 10,826,931 B1 * | 11/2020 | Quan ................. H04L 63/1441 |
| 11,409,869 B2 | 8/2022 | Schmidtler |
| 2001/0005889 A1 | 6/2001 | Albrecht |
| 2001/0052014 A1 | 12/2001 | Sheymov |
| 2002/0078381 A1 | 6/2002 | Farley |
| 2002/0099952 A1 | 7/2002 | Lambert |
| 2002/0147923 A1 | 10/2002 | Dotan |
| 2002/0178374 A1 | 11/2002 | Swimmer |
| 2002/0194490 A1 | 12/2002 | Halperin |
| 2002/0199116 A1 | 12/2002 | Hoene |
| 2003/0046582 A1 | 3/2003 | Black |
| 2003/0065926 A1 | 4/2003 | Schultz |
| 2003/0084323 A1 | 5/2003 | Gales |
| 2003/0084349 A1 | 5/2003 | Friedrichs |
| 2003/0101381 A1 | 5/2003 | Mateev |
| 2003/0115479 A1 | 6/2003 | Edwards |
| 2003/0120935 A1 | 6/2003 | Teal |
| 2003/0131256 A1 | 7/2003 | Ackroyd |
| 2003/0135791 A1 | 7/2003 | Natvig |
| 2003/0172166 A1 | 9/2003 | Judge |
| 2003/0177394 A1 | 9/2003 | Dorzortsev |
| 2003/0188196 A1 | 10/2003 | Choi |
| 2004/0006704 A1 | 1/2004 | Dahlstrom |
| 2004/0024864 A1 | 2/2004 | Porras |
| 2004/0030913 A1 | 2/2004 | Liang |

(56) References Cited

U.S. PATENT DOCUMENTS

| | | |
|---|---|---|
| 2004/0034800 A1 | 2/2004 | Singhal |
| 2004/0039968 A1 | 2/2004 | Hatonen |
| 2004/0064736 A1 | 4/2004 | Obrecht |
| 2004/0068652 A1 | 4/2004 | Carpentier |
| 2004/0073810 A1 | 4/2004 | Dettinger |
| 2004/0078580 A1 | 4/2004 | Hsu |
| 2004/0083384 A1 | 4/2004 | Hypponen |
| 2004/0083408 A1 | 4/2004 | Spiegel |
| 2004/0111632 A1 | 6/2004 | Halperin |
| 2004/0123145 A1 | 6/2004 | Baffes |
| 2004/0128530 A1 | 7/2004 | Isenberg |
| 2004/0143749 A1 | 7/2004 | Tajalli |
| 2004/0143753 A1 | 7/2004 | Hernacki |
| 2004/0153644 A1 | 8/2004 | McCorkendale |
| 2004/0158729 A1 | 8/2004 | Szor |
| 2004/0172551 A1 | 9/2004 | Fielding |
| 2004/0172557 A1 | 9/2004 | Nakae |
| 2004/0199827 A1 | 10/2004 | Muttik |
| 2004/0205419 A1 | 10/2004 | Liang |
| 2004/0225877 A1 | 11/2004 | Huang |
| 2004/0236960 A1 | 11/2004 | Zimmer |
| 2004/0243829 A1 | 12/2004 | Jordan |
| 2004/0244160 A1 | 12/2004 | Nessel |
| 2004/0255160 A1 | 12/2004 | Stamos |
| 2005/0005160 A1 | 1/2005 | Bates |
| 2005/0021994 A1 | 1/2005 | Barton |
| 2005/0038818 A1 | 2/2005 | Hooks |
| 2005/0044406 A1 | 2/2005 | Stute |
| 2005/0050336 A1 | 3/2005 | Liang |
| 2005/0050337 A1 | 3/2005 | Liang |
| 2005/0050378 A1 | 3/2005 | Liang |
| 2005/0055559 A1 | 3/2005 | Bucher |
| 2005/0091494 A1 | 4/2005 | Hyser |
| 2005/0108562 A1 | 5/2005 | Khazan |
| 2005/0114687 A1 | 5/2005 | Zimmer |
| 2005/0125687 A1 | 6/2005 | Townsend |
| 2005/0132205 A1 | 6/2005 | Palliyil |
| 2005/0138427 A1 | 6/2005 | Crommer |
| 2005/0210035 A1 | 9/2005 | Kester |
| 2005/0216759 A1 | 9/2005 | Rothman |
| 2005/0223001 A1 | 10/2005 | Kester |
| 2005/0229250 A1 | 10/2005 | Ring |
| 2005/0246776 A1 | 11/2005 | Chawro |
| 2005/0251860 A1 | 11/2005 | Saurabh |
| 2005/0262560 A1 | 11/2005 | Gassoway |
| 2005/0268079 A1 | 12/2005 | Rothman |
| 2005/0268112 A1 | 12/2005 | Wang |
| 2005/0283640 A1 | 12/2005 | Cheston |
| 2006/0017557 A1 | 1/2006 | Chung |
| 2006/0026675 A1 | 2/2006 | Cai |
| 2006/0031673 A1 | 2/2006 | Beck |
| 2006/0037079 A1 | 2/2006 | Midgley |
| 2006/0037080 A1 | 2/2006 | Maloof |
| 2006/0070128 A1 | 3/2006 | Heimerdinger |
| 2006/0070130 A1 | 3/2006 | Costea |
| 2006/0075468 A1 | 4/2006 | Boney |
| 2006/0075490 A1 | 4/2006 | Boney |
| 2006/0075502 A1 | 4/2006 | Edwards |
| 2006/0075504 A1 | 4/2006 | Liu |
| 2006/0085857 A1 | 4/2006 | Omote |
| 2006/0095964 A1 | 5/2006 | Costea |
| 2006/0095970 A1 | 5/2006 | Rajagopal |
| 2006/0101520 A1 | 5/2006 | Schumaker |
| 2006/0130141 A1 | 6/2006 | Kramer |
| 2006/0130144 A1 | 6/2006 | Wernicke |
| 2006/0150256 A1 | 7/2006 | Fanton |
| 2006/0156397 A1 | 7/2006 | Dai |
| 2006/0174319 A1 | 8/2006 | Kraemer |
| 2006/0179484 A1 | 8/2006 | Scrimsher |
| 2006/0206937 A1 | 9/2006 | Repasi |
| 2006/0224930 A1 | 10/2006 | Bantz |
| 2006/0230289 A1 | 10/2006 | Fox |
| 2006/0230452 A1 | 10/2006 | Field |
| 2006/0236392 A1 | 10/2006 | Thomas |
| 2006/0253584 A1 | 11/2006 | Dixon |
| 2006/0259819 A1 | 11/2006 | Connor |
| 2006/0259967 A1 | 11/2006 | Thomas |
| 2006/0265746 A1 | 11/2006 | Farley |
| 2006/0288342 A1 | 12/2006 | Hatlelid |
| 2006/0293777 A1 | 12/2006 | Breitgand |
| 2007/0006304 A1 | 1/2007 | Kramer |
| 2007/0006310 A1 | 1/2007 | Piccard |
| 2007/0006311 A1 | 1/2007 | Barton |
| 2007/0016914 A1 | 1/2007 | Yeap |
| 2007/0016951 A1 | 1/2007 | Piccard |
| 2007/0016953 A1 | 1/2007 | Morris |
| 2007/0022315 A1 | 1/2007 | Comegys |
| 2007/0028292 A1 | 2/2007 | Kabzinski |
| 2007/0028304 A1 | 2/2007 | Brennan |
| 2007/0050846 A1 | 3/2007 | Xie |
| 2007/0067844 A1 | 3/2007 | Williamson |
| 2007/0078915 A1 | 4/2007 | Gassoway |
| 2007/0094725 A1 | 4/2007 | Borders |
| 2007/0118646 A1 | 5/2007 | Gassoway |
| 2007/0130350 A1 | 6/2007 | Alperovitch |
| 2007/0150957 A1 | 6/2007 | Hartrell |
| 2007/0162975 A1 | 7/2007 | Overton |
| 2007/0168694 A1 | 7/2007 | Maddaloni |
| 2007/0174911 A1 | 7/2007 | Kronenberg |
| 2007/0180509 A1 | 8/2007 | Swartz |
| 2007/0239999 A1 | 10/2007 | Honig |
| 2007/0240212 A1 | 10/2007 | Matalytski |
| 2007/0240220 A1 | 10/2007 | Tuvell |
| 2007/0244877 A1 | 10/2007 | Kempka |
| 2007/0245420 A1 | 10/2007 | Yong |
| 2007/0250817 A1 | 10/2007 | Boney |
| 2007/0250927 A1 | 10/2007 | Naik |
| 2007/0271610 A1 | 11/2007 | Grobman |
| 2007/0289019 A1 | 12/2007 | Lowrey |
| 2007/0294768 A1 | 12/2007 | Moskovitch |
| 2008/0005797 A1 | 1/2008 | Field |
| 2008/0010368 A1 | 1/2008 | Hubbard |
| 2008/0016314 A1 | 1/2008 | Li |
| 2008/0016339 A1 | 1/2008 | Shukla |
| 2008/0016570 A1 | 1/2008 | Capalik |
| 2008/0028100 A1 | 1/2008 | Adelman |
| 2008/0052468 A1 | 2/2008 | Speirs |
| 2008/0082662 A1 | 4/2008 | Dandliker |
| 2008/0086773 A1 | 4/2008 | Tuvell |
| 2008/0133812 A1 | 6/2008 | Kaiser |
| 2008/0175266 A1 | 7/2008 | Alperovitch |
| 2008/0184058 A1 | 7/2008 | McDermott |
| 2008/0229419 A1 | 9/2008 | Holostov |
| 2008/0244592 A1* | 10/2008 | Uchihira ............... G06F 9/4881 718/107 |
| 2008/0263197 A1 | 10/2008 | Stephens |
| 2008/0271163 A1 | 10/2008 | Stillerman |
| 2008/0319932 A1 | 12/2008 | Yil |
| 2009/0013405 A1 | 1/2009 | Schipka |
| 2009/0044024 A1 | 2/2009 | Oberheide |
| 2009/0049550 A1 | 2/2009 | Shevchenko |
| 2009/0070873 A1 | 3/2009 | McAfee |
| 2009/0144826 A2 | 6/2009 | Piccard |
| 2009/0248623 A1 | 10/2009 | Adelman |
| 2009/0254992 A1 | 10/2009 | Schultz |
| 2009/0288167 A1 | 11/2009 | Freericks |
| 2009/0328210 A1 | 12/2009 | Khachaturov |
| 2010/0011200 A1 | 1/2010 | Rosenan |
| 2010/0031361 A1 | 2/2010 | Shukla |
| 2010/0077481 A1 | 3/2010 | Polyakov |
| 2010/0082642 A1 | 4/2010 | Forman |
| 2010/0150448 A1 | 6/2010 | Lecerf |
| 2010/0162395 A1 | 6/2010 | Kennedy |
| 2010/0169972 A1 | 7/2010 | Kuo |
| 2010/0169973 A1 | 7/2010 | Kim |
| 2010/0191734 A1 | 7/2010 | Rajaram |
| 2010/0256977 A1 | 10/2010 | Yu |
| 2010/0293273 A1 | 11/2010 | Basarrate |
| 2011/0041179 A1 | 2/2011 | Stahlberg |
| 2011/0047618 A1 | 2/2011 | Evans |
| 2011/0067101 A1 | 3/2011 | Seshadri |
| 2011/0083180 A1 | 4/2011 | Mashevsky |
| 2011/0145920 A1 | 6/2011 | Mahaffey |
| 2011/0172504 A1 | 7/2011 | Wegerich |

(56) References Cited

U.S. PATENT DOCUMENTS

| | | | |
|---|---|---|---|
| 2011/0173699 A1 | 7/2011 | Figlin | |
| 2011/0191341 A1 | 8/2011 | Meyer | |
| 2011/0225655 A1 | 9/2011 | Niemela | |
| 2011/0289586 A1 | 11/2011 | Kc | |
| 2011/0321160 A1 | 12/2011 | Mohandas | |
| 2011/0321166 A1 | 12/2011 | Capalik | |
| 2012/0047579 A1 | 2/2012 | Ishiyama | |
| 2012/0047581 A1 | 2/2012 | Banerjee | |
| 2012/0151586 A1 | 6/2012 | Hentunen | |
| 2012/0159620 A1 | 6/2012 | Seifert | |
| 2012/0227105 A1 | 9/2012 | Friedrichs | |
| 2012/0255018 A1 | 10/2012 | Sallam | |
| 2012/0260340 A1 | 10/2012 | Morris | |
| 2012/0304278 A1 | 11/2012 | Murotake | |
| 2012/0317644 A1 | 12/2012 | Kumar | |
| 2013/0007870 A1 | 1/2013 | Devarajan | |
| 2013/0047255 A1 | 2/2013 | Dalcher | |
| 2013/0055339 A1 | 2/2013 | Apostolescu | |
| 2013/0055399 A1 | 2/2013 | Zaitsev | |
| 2013/0067576 A1 | 3/2013 | Niemela | |
| 2013/0074143 A1 | 3/2013 | Bu | |
| 2013/0091570 A1 | 4/2013 | McCorkendale | |
| 2013/0198841 A1 | 8/2013 | Poulson | |
| 2013/0227680 A1 | 8/2013 | Pavlyushchik | |
| 2013/0247179 A1 | 9/2013 | Chandran | |
| 2013/0247190 A1 | 9/2013 | Spurlock | |
| 2013/0275981 A1 | 10/2013 | Dalcher | |
| 2013/0276110 A1 | 10/2013 | Dalcher | |
| 2013/0298244 A1 | 11/2013 | Kumar | |
| 2013/0326625 A1 | 12/2013 | Anderson | |
| 2014/0090061 A1 | 3/2014 | Avasarala | |
| 2014/0090064 A1 | 3/2014 | Pistoia | |
| 2014/0181973 A1 | 6/2014 | Lee | |
| 2014/0283037 A1 | 9/2014 | Sikorski | |
| 2014/0325650 A1 | 10/2014 | Pavlyushchik | |
| 2015/0033341 A1 | 1/2015 | Schmidtler | |
| 2015/0089645 A1 | 3/2015 | Vandergeest | |
| 2015/0096024 A1 | 4/2015 | Haq | |
| 2015/0106931 A1 | 4/2015 | Mankin | |
| 2015/0128263 A1 | 5/2015 | Raugus | |
| 2015/0143502 A1* | 5/2015 | Peterson | H04L 63/0245 |
| | | | 726/11 |
| 2015/0213365 A1 | 7/2015 | Ideses | |
| 2015/0213376 A1 | 7/2015 | Ideses | |
| 2016/0119373 A1* | 4/2016 | Fausto | H04L 63/1433 |
| | | | 726/25 |
| 2016/0154960 A1 | 6/2016 | Sharma | |
| 2016/0277423 A1 | 9/2016 | Apostolescu | |
| 2016/0300060 A1 | 10/2016 | Pike | |
| 2016/0364286 A1* | 12/2016 | Charters | G06F 11/008 |
| 2017/0098074 A1 | 4/2017 | Okano | |
| 2017/0353477 A1* | 12/2017 | Faigon | G06F 21/554 |
| 2018/0239902 A1* | 8/2018 | Godard | G06F 21/53 |

FOREIGN PATENT DOCUMENTS

| | | | |
|---|---|---|---|
| CN | 102142068 A | 8/2011 | |
| CN | 103106365 A | 5/2013 | |
| CN | 103473506 A | 12/2013 | |
| EP | 0449242 A2 | 10/1991 | |
| EP | 1280040 A2 | 3/2004 | |
| EP | 1280040 A3 | 3/2004 | |
| EP | 1549012 A1 | 6/2005 | |
| EP | 2182458 A1 | 5/2010 | |
| EP | 1335559 B1 | 2/2012 | |
| JP | 2004086241 | 3/2004 | |
| JP | 2004334312 A | 11/2004 | |
| JP | 2005250760 A | 9/2005 | |
| JP | 2012027710 A | 2/2012 | |
| KR | 20100089245 A | 8/2010 | |
| KR | 20110036426 A | 4/2011 | |
| TW | I252976 B | 7/2006 | |
| WO | WO 1999015966 A1 | 4/1999 | |
| WO | WO 2000073955 A2 | 12/2000 | |
| WO | WO 2001016709 A1 | 3/2001 | |
| WO | WO 2001033359 A1 | 5/2001 | |
| WO | WO 2003017099 A1 | 8/2001 | |
| WO | WO 2001084285 A2 | 11/2001 | |
| WO | WO 2001090892 A1 | 11/2001 | |
| WO | WO 2002033525 A2 | 4/2002 | |
| WO | WO 2003021402 A2 | 3/2003 | |
| WO | WO 2003088017 A2 | 10/2003 | |
| WO | WO 2004097602 A2 | 11/2004 | |
| WO | WO 2005114949 A1 | 12/2005 | |
| WO | WO 2006115533 A2 | 11/2006 | |
| WO | WO 2007015266 A2 | 2/2007 | |
| WO | WO 2007015266 A3 | 2/2007 | |
| WO | WO 2007104988 A1 | 9/2007 | |
| WO | WO 2007120954 A2 | 10/2007 | |
| WO | WO 2008008401 | 1/2008 | |
| WO | WO 2012027588 A1 | 3/2012 | |
| WO | WO 2012084507 A1 | 6/2012 | |
| WO | WO 2012110501 A1 | 8/2012 | |
| WO | WO 2014107439 A2 | 7/2014 | |
| WO | WO 2014122662 A1 | 8/2014 | |

OTHER PUBLICATIONS

*Crowdstrike, Inc. v. Webroot Inc.*, PTAB Case No. IPR2022-01522, Exhibit 1001: U.S. Pat. No. 10,284,591 to Giuliani et al., 14 pgs.
*Crowdstrike, Inc. v. Webroot Inc.*, PTAB Case No. IPR2022-01522, Exhibit 1002: File History of U.S. Pat. No. 10,284,591, 236 pgs.
*Crowdstrike, Inc. v. Webroot Inc.*, PTAB Case No. IPR2022-01522, Exhibit 1003: Declaration of Dr. Wenke Lee, 144 pgs.
*Crowdstrike, Inc. v. Webroot Inc.*, PTAB Case No. IPR2022-01522, Exhibit 1004: U.S. Patent Publication No. 2008/0016339 to Shukla, 26 pgs.
*Crowdstrike, Inc. v. Webroot Inc.*, PTAB Case No. IPR2022-01522, Exhibit 1005: U.S. Patent Publication No. 2013/0047255 to Dalcher, 20 pgs.
*Crowdstrike, Inc. v. Webroot Inc.*, PTAB Case No. IPR2022-01522, Exhibit 1006: U.S. Pat. No. 9,465,936 to Tosa, 19 pgs.
*Crowdstrike, Inc. v. Webroot Inc.*, PTAB Case No. IPR2022-01522, Exhibit 1007: U.S. Pat. No. 7,971,255 to Kc et al., 12 pgs.
*Crowdstrike, Inc. v. Webroot Inc.*, PTAB Case No. IPR2022-01522, Exhibit 1008: Dawson R. Engler, M. Frans Kaashoek, and James O'Toole Jr., Exokernel: An Operating System Architecture for Application-Level Resource Management, 29 ACM SIGOPS Operating Systems Review (Dec. 3, 1995, p. 251), 16 p.
*Crowdstrike, Inc. v. Webroot Inc.*, PTAB Case No. IPR2022-01522, Exhibit 1009: Intel Architecture Software Developer's Manual vol. 3: SystemProgramming, Intel Corporation (1999), 658 pgs.
*Crowdstrike, Inc. v. Webroot Inc.*, PTAB Case No. IPR2022-01522, Exhibit 1010: Desmond Lobo, Xin-Wen Wu, Paul Watters, and Li Sun, Windows Rootkits, Attacks and Countermeasures, 2010 IEEE Second Cybercrime and Trustworthy Computing Workshop (Jul. 2010), 10 pgs.
*Crowdstrike, Inc. v. Webroot Inc.*, PTAB Case No. IPR2022-01522, Exhibit 1011: Michael Sikorski and Andrew Honig, Practical Malware Analysis, No Starch Press, Inc. (2012), 20 pgs.
*Crowdstrike, Inc. v. Webroot Inc.*, PTAB Case No. IPR2022-01522, Exhibit 1012: Manuel Egele, Theodoor Scholte, Engin Kirda, Christopher Kruegel, A Survey on Automated Dynamic Malware-Analysis Techniques and Tools, ACM Computing Surveys, vol. 44, No. 2, Article 6 (Feb. 2012), 42 pgs.
*Crowdstrike, Inc. v. Webroot Inc.*, PTAB Case No. IPR2022-01522, Exhibit 1013: Pablo Bravo and Daniel F. Garcia, Proactive Detection of Kernel-Mode Rootkits, IEEE 2011 Sixth International Conference on Availability, Reliability and Security (2011), 6 pgs.
*Crowdstrike, Inc. v. Webroot Inc.*, PTAB Case No. IPR2022-01522, Exhibit 1014: Marco Prandini and Marco Ramilli, Return-Oriented Programming, IEEE Security & Privacy, vol. 10, No. 6 (Dec. 10, 2012), 4 pgs.
*Crowdstrike, Inc. v. Webroot Inc.*, PTAB Case No. IPR2022-01522, Exhibit 1015: Yang-Seo Choi, Dong-il Seo, and Sung-Won Sohn, A New Stack Buffer Overflow Hacking Defense Technique with Memory Address Confirmation, in Information Security and Cryptology—ICISC 2001, 146-159 (K. Kim ed., 2002), 14 pgs.

(56) References Cited

OTHER PUBLICATIONS

*Crowdstrike, Inc.* v. *Webroot Inc.*, PTAB Case No. IPR2022-01522, Exhibit 1016: Kevin A. Roundy and Barton P. Miller, Hybrid Analysis and Control of Malware, in Recent Advances in Intrusion Detection, 317-338 (S. Jha, R. Sommer, and C. Kreibich eds., 2010), 23 pgs.

*Crowdstrike, Inc.* v. *Webroot Inc.*, PTAB Case No. IPR2022-01522, Exhibit 1017: Ulfar Erlingsson and Fred B. Schneider, IRM Enforcement of Java Stack Inspection, IEEE Security & Privacy, vol. 10, No. 6 (Dec. 10, 2012), 10 pgs.

*Crowdstrike, Inc.* v. *Webroot Inc.*, PTAB Case No. IPR2022-01522, Exhibit 1018: Dictionary of Computer and Internet Terms (8th ed. 2003), 10 pgs.

*Crowdstrike, Inc.* v. *Webroot Inc.*, PTAB Case No. IPR2022-01522, Exhibit 1019: Dan Appleman, Visual Basic Programmer's Guide to the Win32 API, Macmillan Computer Publishing USA (1999), 21 pgs.

*Crowdstrike, Inc.* v. *Webroot Inc.*, PTAB Case No. IPR2022-01522, Exhibit 1020: 4 objdump, https://web.archive.org/web/20130326055338/http://sourceware.org/binubinu/docs/binutils/objdump.html#objdump (Mar. 26, 2013, retrieved Sep. 9, 2022), 5 pgs.

*Crowdstrike, Inc.* v. *Webroot Inc.*, PTAB Case No. IPR2022-01522, Exhibit 1021: John Calcote, Autotools, No. Starch Press, Inc. (2010), 14 pgs.

*Crowdstrike, Inc.* v. *Webroot Inc.*, PTAB Case No. IPR2022-01522, Exhibit 1022: Zi-Shun Huang, Ian G. Harris, Return-Oriented Vulnerabilities in ARM Executables, 2012 IEEE Conference on Technologies for Homeland Security (HST) (2012), 6 pgs.

*Crowdstrike, Inc.* v. *Webroot Inc.*, PTAB Case No. IPR2022-01522, Exhibit 1023: U.S. Patent Publication No. 2012/0255018 to Sallam, 53 pgs.

*Crowdstrike, Inc.* v. *Webroot Inc.*, PTAB Case No. IPR2022-01522, Exhibit 1024: U.S. Patent Publication No. 2007/0016914 to Yeap, 12 pgs.

*Crowdstrike, Inc.* v. *Webroot Inc.*, PTAB Case No. IPR2022-01522, Exhibit 1025: Henry Hanping Feng, Oleg M. Kolesnikov, Prahlad Fogla, Wenke Lee, and Weibo Gong, Anomaly Detection Using Call Stack Information, Proceedings of the 2003 IEEE Symposium on Security and Privacy (2003), 14 pgs.

*Crowdstrike, Inc.* v. *Webroot Inc.*, PTAB Case No. IPR2022-01522, Exhibit 1026: Scheduling Order (Dkt. 50), 18 pgs.

*Crowdstrike, Inc.* v. *Webroot Inc.*, PTAB Case No. IPR2022-01522, Patent Owner Open Text Inc.'s Mandatory Notices Pursuant to 37 CFR § 42.8(b), Oct. 21, 2022, 4 pgs.

*Crowdstrike, Inc.* v. *Webroot Inc.*, PTAB Case No. IPR2022-01522, Notice of Filing Date Accorded to Petition and Time for Filing Patent Owner Preliminary Response, Oct. 27, 2022, 6 pgs.

*Crowdstrike, Inc.* v. *Webroot Inc.*, PTAB Case No. IPR2022-01522, Patent Owner Open Text Inc.'s Updated Mandatory Notices Pursuant to 37 CFR § 42.8(b), Jan. 27, 2023, 6 pgs.

*Crowdstrike, Inc.* v. *Webroot Inc.*, PTAB Case No. IPR2022-01522, Patent Owner's Preliminary Response, Jan. 27, 2023, 79 pgs.

*Crowdstrike, Inc.* v. *Webroot Inc.*, PTAB Case No. IPR2022-01522, Exhibit 2001: Declaration of Professor Nenad Medvidovic, Ph.D, 95 pgs.

*Crowdstrike, Inc.* v. *Webroot Inc.*, PTAB Case No. IPR2022-01522, Exhibit 2002: Curriculum Vitae of Professor Nenad Medvidovic, Ph.D., 71 pgs.

*Crowdstrike, Inc.* v. *Webroot Inc.*, PTAB Case No. IPR2022-01522, Exhibit 2003: *Webroot, Inc. and Open Text Inc.*, v. *CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.

*Crowdstrike, Inc.* v. *Webroot Inc.*, PTAB Case No. IPR2022-01522, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 ogs.

*Crowdstrike, Inc.* v. *Webroot Inc.*, PTAB Case No. IPR2022-01522, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Crowdstrike, Inc.* v. *Webroot Inc.*, PTAB Case No. IPR2022-01522, Exhibit 2006: *Intellectual Ventures I LLC et al.* v. *Hewlett Packard Enterprise Co.*, No. 6:21-cv-00596- ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Crowdstrike, Inc.* v. *Webroot Inc.*, PTAB Case No. IPR2022-01522, Exhibit 2007: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.

*Crowdstrike, Inc.* v. *Webroot Inc.*, PTAB Case No. IPR2022-01522, Exhibit 2008: Standing Order Governing Proceedings (OGP) 4.2—Patent Cases (W.D. Tex., Sep. 16, 2022), available at chrome-extension://efaid-bmnnnibpcajpcglclefindmkaj/https://www.txwd.uscourts.gov/wpcontent/uploads/Standing%20Orders/Waco/Albright/Stand-ing%20Order%20Governing%20Proceedings%20-%20Pa-tent%20Cases%20091622.pdf (excerpted), 5 pgs.

Crowdstrike, Inc. v. Webroot Inc., PTAB Case No. IPR2022-01522, Exhibit 2009: Webroot, Inc. and Open Text Inc., v. Trend Micro Inc., Case No. 6:22-cv- 00239-ADA-DTG, Defendant's Preliminary Invalidity Contentions (W.D. Tex., Sep. 13, 2022) (excerpted), 9 pgs.

*Crowdstrike, Inc.* v. *Webroot Inc.*, PTAB Case No. IPR2022-01522, Exhibit 2010: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022) (excerpted), 6 pgs.

*Crowdstrike, Inc.* v. *Webroot Inc.*, PTAB Case No. IPR2022-01522, Exhibit 2011: *Open Text Inc et al.*, v. *AO Kaspersky Lab*, Case No. 6:22-cv-00243-ADA-DTG, Defendant AO Kaspersky Lab's Preliminary Invalidity Contentions Exhibit 5A (W.D. Tex., Sep. 14, 2022) (excerpted), 1 pg.

*Crowdstrike, Inc.* v. *Webroot Inc.*, PTAB Case No. IPR2022-01522, Exhibit 2012: U.S. Pat. Appl. Pub. 2011/0289586 A1 to Gaurav S. Kc and Alfred V. Aho, filed Jun. 3, 2011 and issued Nov. 24, 2011, 10 pgs.

*Crowdstrike, Inc.* v. *Webroot Inc.*, PTAB Case No. IPR2022-01522, Exhibit 2013: Erickson, J., Hacking: The Art of Exploitation, 2nd Ed. (2008) (excerpted), 133 pgs.

*Crowdstrike, Inc.* v. *Webroot Inc.*, PTAB Case No. IPR2022-01522, Exhibit 2014: Kleymenov, A. and Thabet, A., Mastering Malware Analysis, Packt Pub. (2019) (excerpted), 7 pgs.

*Crowdstrike, Inc.* v. *Webroot Inc.*, PTAB Case No. IPR2022-01522, Exhibit 2015: Goldberg, I et al., A Secure Environment for Untrusted Helper Applications (Confining the Wily Hacker), Computer Sci. Div., Univ. of Calif., Berkeley, Jul. 1996, 14 pgs.

*Crowdstrike, Inc.* v. *Webroot Inc.*, PTAB Case No. IPR2022-01522, Exhibit 2016: *Webroot, Inc., Open Text Inc.*, v. *AO Kaspersky Lab et al.*, Case No. 6:22-cv-00243-ADA-DTG, Plaintiffs Responsive Claim Construction Brief, Dkt. 98 (W.D. Tex., Nov. 18, 2022), 86 pgs.

*Crowdstrike, Inc.* v. *Webroot Inc.*, PTAB Case No. IPR2022-01522, Exhibit 2017: *Webroot, Inc. and Open Text Inc.*, v. *AO Kaspersky Lab et al.*, Case No. 6:22-cv-00243-ADA-DTG, Defendants' Opening Claim Construction Brief, Dkt. 86 (W.D. Tex., Oct. 28, 2022) (excerpted), 23 pgs.

*Crowdstrike, Inc.* v. *Webroot Inc.*, PTAB Case No. IPR2022-01522, Exhibit 2018: U.S. Pat. Appl. Pub. No. 2009/0049550 A1 to S. Shevchenko, filed Jun. 6, 2008 and issued Feb. 19, 2009, 17 pgs.

*Crowdstrike, Inc.* v. *Webroot Inc.*, PTAB Case No. IPR2022-01522, Exhibit 2019: U.S. Pat. Appl. Pub. No. 2005/0108562 A1 to R. Khazan et al., filed Jun. 18, 2003 and issued May 19, 2005, 30 pgs.

*Crowdstrike, Inc.* v. *Webroot Inc.*, PTAB Case No. IPR2022-01522, Exhibit 2020: U.S. Pat. No. 8,510,596 B1 to S. Gupta and P. Shenoy, filed Jul. 6, 2007 and issued Aug. 13, 2013, 47 pgs.

(56) References Cited

OTHER PUBLICATIONS

*Crowdstrike, Inc.* v. *Webroot Inc.*, PTAB Case No. IPR2022-01522, Exhibit 2021: U.S. Patent 10, 135,861 to M. Harris et al., filed Nov. 2, 2015 and issued Nov. 20, 2018, 22 pgs.

*Crowdstrike, Inc.* v. *Webroot Inc.*, PTAB Case No. IPR2022-01522, Exhibit 2022: U.S. Pat. No. 10,896,254 B2 to R. Mckerchar et al., filed Jun. 29, 2016 and issued Jan. 19, 2021, 31 pgs.

*Crowdstrike, Inc.* v. *Webroot Inc.*, PTAB Case No. IPR2022-01522, Decision Granting Institution of Inter Partes Review, Apr. 21, 2023, 47 pgs.

*Crowdstrike, Inc.* v. *Webroot Inc.*, PTAB Case No. IPR2022-01522, Scheduling Order, Apr. 21, 2023, 12 pgs.

*Crowdstrike, Inc.* v. *Webroot Inc.*, PTAB Case No. IPR2022-01522, Patent Owner's Request for Rehearing, May 5, 2023, 20 pgs.

*Crowdstrike, Inc.* v. *Webroot Inc.*, PTAB Case No. IPR2022-01522, Patent Owner's Objection to Evidence Submitted by Petitioner, May 5, 2023, 5 pgs.

*Crowdstrike, Inc.* v. *Webroot Inc.*, PTAB Case No. IPR2022-01522, Patent Owner's Updated Exhibit List as of May 5, 2023, 5 pgs.

*Crowdstrike, Inc.* v. *Webroot Inc.*, PTAB Case No. IPR2022-01522, Exhibit 2023: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.

*Crowdstrike, Inc.* v. *Webroot Inc.*, PTAB Case No. IPR2022-01522, Exhibit 3001: POP Request, May 5, 2023, 3 pgs.

*Crowdstrike, Inc.* v. *Webroot Inc.*, PTAB Case No. IPR2022-01522, Notification of Receipt of POP Request, May 8, 2023, 2 pgs.

*Crowdstrike, Inc.* v. *Webroot Inc.*, PTAB Case No. IPR2022-01522, Patent Owner Open Text Inc.'s Second Updated Mandatory Notices Pursuant to 37 CFR § 42.8(b), May 25, 2023, 8 pgs.

*Crowdstrike, Inc.* v. *Webroot Inc.*, PTAB Case No. IPR2022-01522, Order Denying POP, Jun. 8, 2023, 3 pgs.

*Trend Micro, Inc.* v. *Webroot Inc.*, PTAB Case No. IPR2023-00692, Petition for Inter Partes Review of U.S. Pat. No. 10,284,591, Mar. 7, 2023, 79 pgs.

*Trend Micro, Inc.* v. *Webroot Inc.*, PTAB Case No. IPR2023-00692, Exhibit 1001: U.S. Pat. No. 10,284,591 to Giuliani et al. ('591 patent), 14 pgs.

*Trend Micro, Inc.* v. *Webroot Inc.*, PTAB Case No. IPR2023-00692, Exhibit 1002: Expert Declaration of Dr. Seth Nielson, 177 pgs.

*Trend Micro, Inc.* v. *Webroot Inc.*, PTAB Case No. IPR2023-00692, Exhibit 1003: Curriculum Vitae of A.L Dr. Seth Nielson, 15 pgs.

*Trend Micro, Inc.* v. *Webroot Inc.*, PTAB Case No. IPR2023-00692, Exhibit 1004: U.S. Patent Publication No. 2013/0275981 to Dalcher, 11 pgs.

*Trend Micro, Inc.* v. *Webroot Inc.*, PTAB Case No. IPR2023-00692, Exhibit 1005: Vasilis Pappas, Transparent ROP Exploit Mitigation Using Indirect Branch Tracing, 22nd USENIX Security Symposium, (Aug. 14-16, 2013), 17 pgs.

*Trend Micro, Inc.* v. *Webroot Inc.*, PTAB Case No. IPR2023-00692, Exhibit 1006: Prosecution History of the '591 patent, 232 pgs.

*Trend Micro, Inc.* v. *Webroot Inc.*, PTAB Case No. IPR2023-00692, Exhibit 1007: Provisional patent application claimed by '591 patent for priority, 30 pgs.

*Trend Micro, Inc.* v. *Webroot Inc.*, PTAB Case No. IPR2023-00692, Exhibit 1008: David A. Patterson, Computer Organization & Design The Hardware/Software Interface, Morgan Kaufmann Publishers, Inc., (1994), 18 pgs.

*Trend Micro, Inc.* v. *Webroot Inc.*, PTAB Case No. IPR2023-00692, Exhibit 1009: ORS Open Systems Resources, Inc., Collecting Detailed Performance Data with Xperf, The NT Insider 17(1), (2010), 20 pgs.

*Trend Micro, Inc.* v. *Webroot Inc.*, PTAB Case No. IPR2023-00692, Exhibit 1010: Aleph One, Smashing the Stack for Fun and Profit, (1996), 25 pgs.

*Trend Micro, Inc.* v. *Webroot Inc.*, PTAB Case No. IPR2023-00692, Exhibit 1011: Jacob R. Lorch, The VTrace Tool: Building a System Tracer for Windows NT and Windows 2000, MSDN Magazine, (2000), 19 pgs.

*Trend Micro, Inc.* v. *Webroot Inc.*, PTAB Case No. IPR2023-00692, Exhibit 1012: Marco Pistoia, Beyond Stack Inspection: A Unified Access-Control and Information-Flow Security Model, IEE, (2007), 16 pgs.

*Trend Micro, Inc.* v. *Webroot Inc.*, PTAB Case No. IPR2023-00692, Exhibit 1013: Galen Hunt, Detours: Binary Interception of Win32 Functions, Microsoft Research, (1999), 9 pgs.

*Trend Micro, Inc.* v. *Webroot Inc.*, PTAB Case No. IPR2023-00692, Exhibit 1014: Sandra Loosemore, The GNU C Library Reference Manual, 188-193, (1999) 10 pgs.

*Trend Micro, Inc.* v. *Webroot Inc.*, PTAB Case No. IPR2023-00692, Exhibit 1015: Jonathan Corbet, Expanding the Kernel Stack, LWN. net, (2014) 1 pg.

*Trend Micro, Inc.* v. *Webroot Inc.*, PTAB Case No. IPR2023-00692, Exhibit 1016: OpenSSL documentation API listing, https://www.openssl.org/docs/man1.0.2/man3/., 39 pgs.

*Trend Micro, Inc.* v. *Webroot Inc.*, PTAB Case No. IPR2023-00692, Exhibit 1017: Declaration of Ingrid Hsieh-Yee, Ph.D., 36 pgs.

*Trend Micro, Inc.* v. *Webroot Inc.*, PTAB Case No. IPR2023-00692, Patent Owner Open Text Inc.'s Mandatory Notices Pursuant to 37 CFR § 42.8(b), Mar. 28, 2023, 7 pgs.

*Trend Micro, Inc.* v. *Webroot Inc.*, PTAB Case No. IPR2023-00692, Notice of Filing Date Accorded to Petition and Time for Filing Patent Owner Preliminary Response, May 11, 2023, 6 pgs.

*AO Kaspersky Lab* v. *Webroot Inc.*, PTAB Case No. IPR2023-00895, Petition for Inter Partes Review, U.S. Pat. No. 10,284,591, Apr. 28, 2023, 85 pgs.

*AO Kaspersky Lab* v. *Webroot Inc.*, PTAB Case No. IPR2023-00895, Exhibit 1001: U.S. Pat. No. 10,284,591 (issued May 7, 2019), 14 pgs.

*AO Kaspersky Lab* v. *Webroot Inc.*, PTAB Case No. IPR2023-00895, Exhibit 1002: Declaration of V.S. Subrahmanian, Ph.D. under 37 C.F.R. §1.68, 110 pgs.

*AO Kaspersky Lab* v. *Webroot Inc.*, PTAB Case No. IPR2023-00895, Exhibit 1003: Curriculum Vitae of V.S. Subrahmanian, Ph.D., 77 pgs.

*AO Kaspersky Lab* v. *Webroot Inc.*, PTAB Case No. IPR2023-00895, Exhibit 1004: Motion for Order Authorizing Alternative Service, 13 pgs.

*AO Kaspersky Lab* v. *Webroot Inc.*, PTAB Case No. IPR2023-00895, Exhibit 1005: Waiver of Service of Summons, 1 pgs.

*AO Kaspersky Lab* v. *Webroot Inc.*, PTAB Case No. IPR2023-00895, Exhibit 1006: File History of U.S. Pat. No. 10,284,591, 238 pgs.

*AO Kaspersky Lab* v. *Webroot Inc.*, PTAB Case No. IPR2023-00895, Exhibit 1007: Ivan Fratric, Runtime Prevention of Return-Oriented Programming Attacks to Ivan Fratric, https://github.com/ivanfratric/ropguard/blob/master/doc/ropguard.pdf, 11 pgs.

*AO Kaspersky Lab* v. *Webroot Inc.*, PTAB Case No. IPR2023-00895, Exhibit 1008: U.S. Patent Publication No. 2012/0255018 (issued Oct. 4, 2012), 53 pg.

*AO Kaspersky Lab* v. *Webroot Inc.*, PTAB Case No. IPR2023-00895, Exhibit 1009: Hello World, Github Docs, https://docs.github.com/en/get-started/quickstart/hello-world (last visited Apr. 26, 2023), 8 pgs.

*AO Kaspersky Lab* v. *Webroot Inc.*, PTAB Case No. IPR2023-00895, Exhibit 1010: Committing and Reviewing Changes to your Project, Github Docs, https://docs.github.com/en/desktop/contributing-and-collaborating-using- github-desktop/making-changes-in-a-branch/committing-and-reviewing-changes-to-Your-project (last visited Apr. 26, 2023), 11 pgs.

*AO Kaspersky Lab* v. *Webroot Inc.*, PTAB Case No. IPR2023-00895, Exhibit 1011: Setting Repository Visibility, Github Docs, https://docs.github.com/en/repositories/managing-your-repositorys-settings-and-features/managing-repository-settings/setting-repository-visibility (last visited Apr. 26, 2023), 3 pgs.

*AO Kaspersky Lab* v. *Webroot Inc.*, PTAB Case No. IPR2023-00895, Exhibit 1012: GitHub Glossary, Github Docs, https://docs.github.com/en/get-started/quickstart/github-glossary#public-repository (last visited Apr. 26, 2023), 37 pgs.

(56) References Cited

OTHER PUBLICATIONS

*AO Kaspersky Lab* v. *Webroot Inc.*, PTAB Case No. IPR2023-00895, Exhibit 1013: Scott Chacon, GitHub Code Search, The Github Blog (Nov. 3, 2008), https://github.blog/2008-11-03-github-code-search/, 7 pgs.

*AO Kaspersky Lab* v. *Webroot Inc.*, PTAB Case No. IPR2023-00895, Exhibit 1014: About Searching on GitHub, Github Docs, https://docs.github.com/en/search-github/getting-started-with-searching-on-github/about-searching-on-github (last visited Apr. 26, 2023), 3 pgs.

*AO Kaspersky Lab* v. *Webroot Inc.*, PTAB Case No. IPR2023-00895, Exhibit 1015: Finding Ways to Contribute to Open Source on GitHub, Github Docs, https://docs.github.com/en/get-started/exploring-projects-on-github/finding-ways-to-contribute-to-open-source-on-github (last visited Apr. 26, 2023), 3 pgs.

*AO Kaspersky Lab* v. *Webroot Inc.*, PTAB Case No. IPR2023-00895, Exhibit 1016: Claim Construction Order, *Webroot, Inc. and Open Text, Inc.* v. *AO Kaspersky Lab*, Case No. 6:22-CV-00243-ADA-DTG, (Mar. 16, 2023), 5 pgs.

*AO Kaspersky Lab* v. *Webroot Inc.*, PTAB Case No. IPR2023-00895, Exhibit 1017: Michael Huttermann, Devops for Developers (Apress, 2012), 183 pgs.

*AO Kaspersky Lab* v. *Webroot Inc.*, PTAB Case No. IPR2023-00895, Exhibit 1018: Nicolas Despres, Automatic performance monitoring tool, Laboratoire De Recherche Et Developpement De L'epita Tech Report No. 0601, 915 (2006), 21 pgs.

*AO Kaspersky Lab* v. *Webroot Inc.*, PTAB Case No. IPR2023-00895, Exhibit 1019: Bryan D. Payne, Martin D.P. de A. Carbone, Wenke Lee, Dec. 2007, Secure and Flexible Monitoring of Virtual Machines, 23rd Ann. Comp. Sec. Applications Conf., 385, 385-397 (2007), 13 pgs.

*AO Kaspersky Lab* v. *Webroot Inc.*, PTAB Case No. IPR2023-00895, Exhibit 1020: Margaret Rouse, Dynamic Library, Techopedia (Mar. 2, 2012), 7 pgs.

*AO Kaspersky Lab* v. *Webroot Inc.*, PTAB Case No. IPR2023-00895, Exhibit 1021: Krishnan, S. and Srihari, K., A Knowledge-Based Object Oriented DFM Advisor for Surface Mount PCB Assembly. 10 Li Int'l. J. Advanced Mfg. Tech, 317, 317-329 (1995), 13 pgs.

*AO Kaspersky Lab* v. *Webroot Inc.*, PTAB Case No. IPR2023-00895, Exhibit 1022: Henry Hanping Feng, Jonathon T. Giffin, Yong Huang, Somesh Jha, Wenkee Lee, and Barton P. Miller, Formalizing Sensitivity in Static Analysis for Intrusion Detection, IEEE Symp. Sec. Priv., 194, 194-208, 15 pgs.

*AO Kaspersky Lab* v. *Webroot Inc.*, PTAB Case No. IPR2023-00895, Exhibit 1023: Wei Li, Lap-chung Lam, and Tzi-cker Chiueh, How to Automatically and Accurately Sandbox Microsoft IIS, 22nd Ann. Comp. Sec. Applications Conf., 213, 213-222 (2006), 10 pgs.

*AO Kaspersky Lab* v. *Webroot Inc.*, PTAB Case No. IPR2023-00895, Exhibit 1024: Kevin A. Roundy and Barton P. Miller, Hybrid Analysis and Control of Malware, Recent Advances in Intrusion Detection: 13th Int'l Symp., 317, 317-338 (2010), 23 pgs.

*AO Kaspersky Lab* v. *Webroot Inc.*, PTAB Case No. IPR2023-00895, Exhibit 1025: Toshiyuki Maeda, 2002, Safe Execution of User Programs in Kernel Mode Using Typed Assembly Language, (Master's Thesis, University of Tokyo, 2002), 44 pgs.

*AO Kaspersky Lab* v. *Webroot Inc.*, PTAB Case No. IPR2023-00895, Exhibit 1026: Alex Skaletsky, Tevi Devor, Nadav Chachmon, Robert Cohn, Kim Hazelwood, Vladimirov, Moshe Bach, Dynamic Program Analysis of Microsoft Windows Applications, IEEE Int'l Symp. Performance Analysis Sys. Software, 2, 2-12 (2010), 11 pgs.

*AO Kaspersky Lab* v. *Webroot Inc.*, PTAB Case No. IPR2023-00895, Exhibit 1027: Tarjei Mandt, T., Locking Down the Windows Kernel: Mitigating Null Pointer Exploitation, Norman Threat Research, 13 pgs.

*AO Kaspersky Lab* v. *Webroot Inc.*, PTAB Case No. IPR2023-00895, Exhibit 1028: Xiangyu Dong, Cong Xu, Yuan Xie, Norman P. Jouppi, N.P., NVSim: A Circuit-Level Performance, Energy, and Area Model for Emerging Nonvolatile Memory, 31 IEEE Transactions Computer-Aided Design of Integrated Circuits Sys., 994, 994-1007 (2012), 14 pgs.

*AO Kaspersky Lab* v. *Webroot Inc.*, PTAB Case No. IPR2023-00895, Exhibit 1029: Father, H., Hooking Windows API-Technics of hooking API functions on Windows, 2 Assembly Programming J., 2, 2-30 (2004), 30 pgs.

*AO Kaspersky Lab* v. *Webroot Inc.*, PTAB Case No. IPR2023-00895, Exhibit 1030: J. Berdajs and Z. Bosnić, Extending Applications Using an Advanced Approach to DLL Injection and API Hooking, 40 Software: Practice Experience, 567, 567-584 (2010), 18 pgs.

*AO Kaspersky Lab* v. *Webroot Inc.*, PTAB Case No. IPR2023-00895, Exhibit 1031: Ulrich Bayer, Christopher Kruegel, and Engin Kirda, TTAnalyze: A Tool for Analyzing Malware, Ikarus Software Tech. Univ. Vienna, 180, 180-192 (2006), 12 pgs.

*AO Kaspersky Lab* v. *Webroot Inc.*, PTAB Case No. IPR2023-00895, Patent Owner Open Text Inc.'s Mandatory Notices Pursuant to 37 CFR § 42.8(b), May 19, 2023, 8 pgs.

*AO Kaspersky Lab* v. *Webroot Inc.*, PTAB Case No. IPR2023-00895, Notice of Filing Date Accorded to Petition and Time for Filing Patent Owner Preliminary Response, Jun. 9, 2023, 6 pgs.

*Crowdstrike, Inc.* v. *Webroot Inc.*, PTAB Case No. IPR2023-00124, Petition for Inter Partes Review of U.S. Pat. No. 9,578,045, 86 pgs.

*Crowdstrike, Inc.* v. *Webroot Inc.*, PTAB Case No. IPR2023-00124, Exhibit 1001: U.S. Pat. No. 9,578,045 to Jaroch et al., 30 pgs.

*Crowdstrike, Inc.* v. *Webroot Inc.*, PTAB Case No. IPR2023-00124, Exhibit 1002: File History of U.S. Pat. No. 9,578,045, 210 pgs.

*Crowdstrike, Inc.* v. *Webroot Inc.*, PTAB Case No. IPR2023-00124, Exhibit 1003: Declaration of Dr. Wenke Lee, 202 pgs.

*Crowdstrike, Inc.* v. *Webroot Inc.*, PTAB Case No. IPR2023-00124, Exhibit 1004: U.S. Publication No. 2013/0298244 to Kumar et al., 52 pgs.

*Crowdstrike, Inc.* v. *Webroot Inc.*, PTAB Case No. IPR2023-00124, Exhibit 1005: U.S. Publication No. 2007/0016953 to Morris et al., 18 pgs.

*Crowdstrike, Inc.* v. *Webroot Inc.*, PTAB Case No. IPR2023-00124, Exhibit 1006: U.S. Pat. No. 8,087,087 to Van Oorschot et al., 19 pgs.

*Crowdstrike, Inc.* v. *Webroot Inc.*, PTAB Case No. IPR2023-00124, Exhibit 1007: U.S. Patent Pub. No. 2010/0077481 to Polyakov et al., 11 pgs.

*Crowdstrike, Inc.* v. *Webroot Inc.*, PTAB Case No. IPR2023-00124, Exhibit 1008: U.S. Publication No. 2011/0321166 to Capalik et al., 29 pgs.

*Crowdstrike, Inc.* v. *Webroot Inc.*, PTAB Case No. IPR2023-00124, Exhibit 1009: U.S. Publication No. 2012/0260340, 30 pgs.

*Crowdstrike, Inc.* v. *Webroot Inc.*, PTAB Case No. IPR2023-00124, Exhibit 1010: U.S. Pat. No. 10,257,224, 31 pgs.

*Crowdstrike, Inc.* v. *Webroot Inc.*, PTAB Case No. IPR2023-00124, Exhibit 1011: Scheduling Order (Dkt. 50), Sep. 28, 2022, 18 pgs.

*Crowdstrike, Inc.* v. *Webroot Inc.*, PTAB Case No. IPR2023-00124, Exhibit 1012: Natarajan Meghanathan, Sumanth Reddy Allam, and Loretta A. Moore, Tools and Techniques for Network Forensics, International Journal of Network Security & Its Applications (IJNSA), vol. 1., No. 1, Apr. 2009, 12 pgs.

*Crowdstrike, Inc.* v. *Webroot Inc.*, PTAB Case No. IPR2023-00124, Exhibit 1013: SANS Institute, Host- vs. Network-Based Intrusion Detection Systems (2000-2005), 11 pgs.

*Crowdstrike, Inc.* v. *Webroot Inc.*, PTAB Case No. IPR2023-00124, Exhibit 1014: Securosis LLC, Evolving Endpoint Malware Detection: Dealing with Advanced and Targeted Attacks, Version 1.3 (Jul. 12, 2012), 23 pgs.

*Crowdstrike, Inc.* v. *Webroot Inc.*, PTAB Case No. IPR2023-00124, Exhibit 1015: Yanfang Ye, Weiwei Zhuang, Tao Li, Egemen Tas, Umesh Gupta, Shenghuo Zhu, Melih Abdulhayoglu, Combining File Content and File Relations for Cloud Based Malware Detection, Aug. 2011, 9 pgs.

*Crowdstrike, Inc.* v. *Webroot Inc.*, PTAB Case No. IPR2023-00124, Exhibit 1016: U.S. Pat. No. 6,944,772 to Dozortsev, 10 pgs.

*Crowdstrike, Inc.* v. *Webroot Inc.*, PTAB Case No. IPR2023-00124, Exhibit 1017: U.S. Pat. No. 6,772,346 to Chess et al., 14 pgs.

*Crowdstrike, Inc.* v. *Webroot Inc.*, PTAB Case No. IPR2023-00124, Exhibit 1018: WO 2002/033525 to Shyne-Song Chuang, 18 pgs.

(56) References Cited

OTHER PUBLICATIONS

*Crowdstrike, Inc.* v. *Webroot Inc.*, PTAB Case No. IPR2023-00124, Exhibit 1019: EP 1,549,012 to Kristof De Spiegeleer, 19 pgs.

*Crowdstrike, Inc.* v. *Webroot Inc.*, PTAB Case No. IPR2023-00124, Exhibit 1020: EP 1,280,040 to Alexander James Hinchliffe et al., 17 pgs.

*Crowdstrike, Inc.* v. *Webroot Inc.*, PTAB Case No. IPR2023-00124, Exhibit 1021: Oracle, Java Documentation, The Java Tutorials, What is a Path? (And Other File System Facts) (available at the following link https://docs.oracle.com/javase/tutorial/essential/io/path.html) (last accessed Oct. 2022), 3 pgs.

*Crowdstrike, Inc.* v. *Webroot Inc.*, PTAB Case No. IPR2023-00124, Exhibit 1022: U.S. Patent Publication No. 2004/0143753 to Hernacki et al., 20 pgs.

*Crowdstrike, Inc.* v. *Webroot Inc.*, PTAB Case No. IPR2023-00124, Exhibit 1023: U.S. Patent Publication No. 2011/0083180 to Mashevsky et al., 16 pgs.

*Crowdstrike, Inc.* v. *Webroot Inc.*, PTAB Case No. IPR2023-00124, Exhibit 1024: U.S. Pat. No. 8,429,746 to Capalik, 11 pgs.

*Crowdstrike, Inc.* v. *Webroot Inc.*, PTAB Case No. IPR2023-00124, Exhibit 1025: Server Hardware, Software and Architecture by Abeer El Hadi El Zein El Nahas, University of Khartoum, Electrical and Electronics Engineering Dept., Feb. 2008, 152 pgs.

*Crowdstrike, Inc.* v. *Webroot Inc.*, PTAB Case No. IPR2023-00124, Exhibit 1026: Guofei Gu, Phillip Porras, Vinod Yegneswaran, Martin Fong, Wenke Lee, BotHunter: Detecting Malware Infection Through IDS-Driven Dialog Correlation, In Proceedings of The 16th USENIX Security Symposium, Aug. 2007, 16 pgs.

*Crowdstrike, Inc.* v. *Webroot Inc.*, PTAB Case No. IPR2023-00124, Exhibit 1027: Yacin Nadji, Manos Antonakakis, Roberto Perdisci, and Wenke Lee, Understanding the Prevalence and Use of Alternative Plans in Malware with Network Games, In Proceedings of The 27th Annual Computer Security Applications Conference, Dec. 2011, 10 pgs.

*Crowdstrike, Inc.* v. *Webroot Inc.*, PTAB Case No. IPR2023-00124, Exhibit 1028: Manos Antonakakis, Roberto Perdisci, David Dagon, Wenke Lee, and Nick Feamster, Building a Dynamic Reputation System for DNS, In Proceedings of The 19th USENIX Security Symposium, Aug. 2010, 17 pgs.

*Crowdstrike, Inc.* v. *Webroot Inc.*, PTAB Case No. IPR2023-00124, Exhibit 1029: Long Lu, Vinod Yegneswaran, Phil Porras, and Wenke Lee, Blade: An Attack-Agnostic Approach for Preventing Drive-By Malware Infections, In Proceedings of The 17th ACM Conference on Computer and Communications Security (CCS), Chicago, IL, Oct. 2010, 12 pgs.

*Crowdstrike, Inc.* v. *Webroot Inc.*, PTAB Case No. IPR2023-00124, Exhibit 1030: Plaintiffs' Markman Opposition Brief (Dkt. 98), Nov. 18, 2022, 86 pgs.

*Crowdstrike, Inc.* v. *Webroot Inc.*, PTAB Case No. IPR2023-00124, Exhibit 1031: Defendants' Markman Opening Brief (Dkt. 86), Oct. 28, 2022, 84 pgs.

*Crowdstrike, Inc.* v. *Webroot Inc.*, PTAB Case No. IPR2023-00124, Notice of Filing Date Accorded to Petition and Time for Filing Patent Owner Preliminary Response, Dec. 20, 2022, 6 pgs.

*Crowdstrike, Inc.* v. *Webroot Inc.*, PTAB Case No. IPR2023-00124, Patent Owner Open Text Inc.'s Mandatory Notices Pursuant to 37 CFR § 42.8(b), Dec. 21, 2022, 5 pgs.

*Crowdstrike, Inc.* v. *Webroot Inc.*, PTAB Case No. IPR2023-00124, Patent Owner's Preliminary Response, Mar. 20, 2023, 82 pgs.

*Crowdstrike, Inc.* v. *Webroot Inc.*, PTAB Case No. IPR2023-00124, Exhibit 2001: Declaration of Professor Nenad Medvidovic, Ph. D., 45 pgs.

*Crowdstrike, Inc.* v. *Webroot Inc.*, PTAB Case No. IPR2023-00124, Exhibit 2002: Curriculum Vitae of Professor Nenad Medvidovic, Ph. D., 71 pgs.

*Crowdstrike, Inc.* v. *Webroot Inc.*, PTAB Case No. IPR2023-00124, Exhibit 2003: *Webroot, Inc., and Open Text Inc.*, v. *CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.

*Crowdstrike, Inc.* v. *Webroot Inc.*, PTAB Case No. IPR2023-00124, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Crowdstrike, Inc.* v. *Webroot Inc.*, PTAB Case No. IPR2023-00124, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Crowdstrike, Inc.* v. *Webroot Inc.*, PTAB Case No. IPR2023-00124, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Crowdstrike, Inc.* v. *Webroot Inc.*, PTAB Case No. IPR2023-00124, Exhibit 2007: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.

*Crowdstrike, Inc.* v. *Webroot Inc.*, PTAB Case No. IPR2023-00124, Exhibit 2008: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.

*Crowdstrike, Inc.* v. *Webroot Inc.*, PTAB Case No. IPR2023-00124, Exhibit 2009: *Webroot, Inc. and Open Text Inc.*, v. *AO Kaspersky Lab et al.*, Case No. 6:22-cv-00243-ADA-DTG, Defendants' Opening Claim Construction Brief, Dkt. 86 (W.D. Tex., Oct. 28, 2022) (excerpted), 19 pgs.

*Crowdstrike, Inc.* v. *Webroot Inc.*, PTAB Case No. IPR2023-00124, Exhibit 2010: *Webroot, Inc. and Open Text Inc.*, v. *AO Kaspersky Lab et al.*, Case No. 6:22-cv-00243-ADA-DTG, Defendants' Reply Claim Construction Brief, Dkt. 110 (W.D. Tex., Dec. 6, 2022) (excerpted), 11 pgs.

*Crowdstrike, Inc.* v. *Webroot Inc.*, PTAB Case No. IPR2023-00124, Exhibit 2011: *Webroot, Inc. and Open Text Inc.*, v. *AO Kaspersky Lab et al.*, Case No. 6:22-cv-00243-ADA-DTG, Scheduling Order, Dkt. 50 (W.D. Tex., Sep. 28, 2022) (excerpted), 6 pgs.

*Crowdstrike, Inc.* v. *Webroot Inc.*, PTAB Case No. IPR2023-00124, Exhibit 2012: *Open Text Inc. et al.*, v. *AO Kaspersky Lab*, Case No. 6:22-cv-00243-ADA-DTG, Defendant AO Kaspersky Lab's Preliminary Invalidity Contentions Exhibit 4A (W.D. Tex., Sep. 14, 2022) (excerpted), 1 pg.

*Crowdstrike, Inc.* v. *Webroot Inc.*, PTAB Case No. IPR2023-00124, Exhibit 2013: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022) (excerpted), 8 pgs.

*Crowdstrike, Inc.* v. *Webroot Inc.*, PTAB Case No. IPR2023-00124, Exhibit 2014: *Webroot, Inc. and Open Text Inc.*, v. *Trend Micro Inc.*, Case No. 6:22-cv-00239-ADA-DTG, Defendant's Preliminary Invalidity Contentions (W.D. Tex., Sep. 13, 2022) (excerpted), 9 pgs.

*Crowdstrike, Inc.* v. *Webroot Inc.*, PTAB Case No. IPR2023-00124, Exhibit 2015: *Webroot, Inc. and Open Text Inc.*, v. *CrowdStrike, Inc. and CrowdStrike Holdings, Inc.*, Case No. 6:22-cv-00241-ADA, Complaint for Patent Infringement, Dkt. 1 (W.D. Tex., Mar. 4, 2022), 141 pgs.

*Crowdstrike, Inc.* v. *Webroot Inc.*, PTAB Case No. IPR2023-00124, Exhibit 2016: *Open Text Inc. et al.*, v. *AO Kaspersky Lab*, Case No. 6:22-cv-00243- ADA-DTG, First Amended Complaint for Patent Infringement, Dkt. 80 (W.D. Tex., Oct. 27, 2022), 148 pgs.

*Crowdstrike, Inc.* v. *Webroot Inc.*, PTAB Case No. IPR2023-00124, Exhibit 2017: *Webroot, Inc. and Open Text Inc.*, v. *Trend Micro Inc.*, Case No. 6:22-cv-00239-ADA-DTG, First Amended Complaint for Patent Infringement, Dkt. 53 (W.D. Tex., Sep. 7, 2022), 235 pgs.

*Crowdstrike, Inc.* v. *Webroot Inc.*, PTAB Case No. IPR2023-00124, Exhibit 2018: *Webroot, Inc. and Open Text Inc.*, v. *Sophos, Ltd.*, Case No. 6:22-cv-00240-ADA-DTG, Second Amended Complaint for Patent Infringement, Dkt. 76 (W.D. Tex., Oct. 24, 2022), 184 pgs.

(56)　　　　　References Cited

OTHER PUBLICATIONS

*Crowdstrike, Inc.* v. *Webroot Inc.*, PTAB Case No. IPR2023-00124, Exhibit 2019: File History for Continuation Patent, U.S. Pat. No. 10,257,224, 472 pgs.
*Crowdstrike, Inc.* v. *Webroot Inc.*, PTAB Case No. IPR2023-00124, Exhibit 2020: U.S. Patent Application Publication No. 2008/0016570 to Capalik, 14 pgs.
*Crowdstrike, Inc.* v. *Webroot Inc.*, PTAB Case No. IPR2023-00124, Exhibit 2021: *Webroot, Inc. and Open Text Inc.*, v. *AO Kaspersky Lab et al.*, Case No. 6:22-cv-243-ADA-DTG, March 9, *Crowdstrike, Inc.* v. *Webroot Inc.*, PTAB Case No. IPR2023-00124, Exhibit 2022: Transcript of Motions Hearing, Dkt. 133 (W.D. Tex. Dec. 15, 2022) (excerpted), 7 pgs.
*Crowdstrike, Inc.* v. *Webroot Inc.*, PTAB Case No. IPR2023-00124, Exhibit 2022: U.S. Patent No. 10, 257,224 to Joseph Jaroch, 31 pgs.
*Crowdstrike, Inc.* v. *Webroot Inc.*, PTAB Case No. IPR2023-00124, Exhibit 2023: Joseph Jaroch LinkedIn, 1 pg.
*Crowdstrike, Inc.* v. *Webroot Inc.*, PTAB Case No. IPR2023-00124, Preliminary Reply to Patent Owner's Preliminary Response, Apr. 12, 2023, 10 pgs.
*Crowdstrike, Inc.* v. *Webroot Inc.*, PTAB Case No. IPR2023-00124, Exhibit 1032: EP File History, 233 pgs.
*Crowdstrike, Inc.* v. *Webroot Inc.*, PTAB Case No. IPR2023-00124, Patent Owner's Preliminary Sur-Reply to Petitioner's Preliminary Reply, Apr. 19, 2023, 13 pgs.
*Crowdstrike, Inc.* v. *Webroot Inc.*, PTAB Case No. IPR2023-00124, Patent Owner Open Text Inc.'s Updated Mandatory Notices Pursuant to 37 CFR § 42.8(b), May 25, 2023, 8 pgs.
*Trend Micro, Inc.* v. *Webroot Inc.*, PTAB Case No. IPR2023-00677, Petition for Inter Partes Review of U.S. Pat. No. 9,578,045, Mar. 6, 2023, 84 pgs.
*Trend Micro, Inc.* v. *Webroot Inc.*, PTAB Case No. IPR2023-00677, Exhibit 1001: U.S. Pat. No. 9,578,045 to Jaroch et al., 30 pgs.
*Trend Micro, Inc.* v. *Webroot Inc.*, PTAB Case No. IPR2023-00677, Exhibit 1002: Expert Declaration of Dr. Seth Nielson, 138 pgs.
*Trend Micro, Inc.* v. *Webroot Inc.*, PTAB Case No. IPR2023-00677, Exhibit 1003: CV of Seth Nielson, 15 pgs.
*Trend Micro, Inc.* v. *Webroot Inc.*, PTAB Case No. IPR2023-00677, Exhibit 1004: U.S. Pat. No. 7,352,280 to Rockwood, Troy, 24 pgs.
*Trend Micro, Inc.* v. *Webroot Inc.*, PTAB Case No. IPR2023-00677, Exhibit 1005: Xie, A Spatiotemporal Event Correlation Approach to Computer Security, 152 pgs.
*Trend Micro, Inc.* v. *Webroot Inc.*, PTAB Case No. IPR2023-00677, Exhibit 1006: Prosecution History of '045 Patent, 210 pgs.
*Trend Micro, Inc.* v. *Webroot Inc.*, PTAB Case No. IPR2023-00677, Exhibit 1007: Peterson, et al., "Computer networks: a systems approach," Morgan Kaufmann Publishers, Inc., 1996, 28 pgs.
*Trend Micro, Inc.* v. *Webroot Inc.*, PTAB Case No. IPR2023-00677, Exhibit 1008: Bangia, et al., "Operating Systems and Software Diagnostics" (2007), 3 pgs.
*Trend Micro, Inc.* v. *Webroot Inc.*, PTAB Case No. IPR2023-00677, Exhibit 1009: U.S. Published Patent Application No. 2013/0067576 to Niemela, 10 pgs.
*Trend Micro, Inc.* v. *Webroot Inc.*, PTAB Case No. IPR2023-00677, Exhibit 1010: Hutchins, et al., "Intelligence-Driven Computer Network Defense Informed by Analysis of Adversary Campaigns and Intrusion Kill Chains", The Proceedings of the 6th International Conference on Information Warfare and Security, Mar. 17-18, 2011, 15 pgs.
*Trend Micro, Inc.* v. *Webroot Inc.*, PTAB Case No. IPR2023-00677, Exhibit 1011: Cheswick, et al., "Firewalls and Internet Security Second Edition, Repelling the Wily Hacker", 2003, 4 pgs.
*Trend Micro, Inc.* v. *Webroot Inc.*, PTAB Case No. IPR2023-00677, Exhibit 1012: Anderson, "Network Attack and Defense", Security Engineering vol. 2, 2008, 51 pgs.
*Trend Micro, Inc.* v. *Webroot Inc.*, PTAB Case No. IPR2023-00677, Exhibit 1013: Wilding et al., Virus Bulletin, The Authoritative International Publication of Computer Virus Prevention Recognition and Removal, Jul. 1989, 16 pgs.

*Trend Micro, Inc.* v. *Webroot Inc.*, PTAB Case No. IPR2023-00677, Exhibit 1014: Lardinois, Google Acquires Online Virus Malware and URL Scanner VirusTotal, TechCrunch, Sep. 7, 2012, 6 pgs.
*Trend Micro, Inc.* v. *Webroot Inc.*, PTAB Case No. IPR2023-00677, Exhibit 1015: Lasser, "Special Focus Issue: Security", ;login: The Magazine of USENIX & Sage, 51-54, (Nov. 2001), 6 pgs.
*Trend Micro, Inc.* v. *Webroot Inc.*, PTAB Case No. IPR2023-00677, Patent Owner Open Text Inc.'s Mandatory Notices Pursuant to 37 CFR § 42.8(b), Mar. 27, 2023, 8 pgs.
*Trend Micro, Inc.* v. *Webroot Inc.*, PTAB Case No. IPR2023-00677, Notice of Filing Date Accorded to Petition and Time for Filing Patent Owner Preliminary Response, May 10, 2023, 6 pgs.
*Crowdstrike, Inc.* v. *Webroot Inc.*, PTAB Case No. IPR2023-00126, Petition for Inter Partes Review of U.S. Pat. No. 10,257,224, Oct. 31, 2022, 87 pgs.
*Crowdstrike, Inc.* v. *Webroot Inc.*, PTAB Case No. IPR2023-00126, Exhibit 1001: U.S. Pat. No. 10,257,224 to Jaroch et al., 31 pgs.
*Crowdstrike, Inc.* v. *Webroot Inc.*, PTAB Case No. IPR2023-00126, Exhibit 1002: File History of U.S. Pat. No. 10,257,224, 472 pgs.
*Crowdstrike, Inc.* v. *Webroot Inc.*, PTAB Case No. IPR2023-00126, Exhibit 1003: Declaration of Dr. Wenke Lee, 202 pgs.
*Crowdstrike, Inc.* v. *Webroot Inc.*, PTAB Case No. IPR2023-00126, Exhibit 1004: U.S. Publication No. 2013/0298244 to Kumar et al., 52 pgs.
*Crowdstrike, Inc.* v. *Webroot Inc.*, PTAB Case No. IPR2023-00126, Exhibit 1005: U.S. Publication No. 2007/0016953 to Morris, 18 pgs.
*Crowdstrike, Inc.* v. *Webroot Inc.*, PTAB Case No. IPR2023-00126, Exhibit 1006: U.S. Pat. No. 8,087,087 to Van Oorschot, 19 pgs.
*Crowdstrike, Inc.* v. *Webroot Inc.*, PTAB Case No. IPR2023-00126, Exhibit 1007: U.S. Publication No. 2010/0077481 to Polyakov, 11 pgs.
*Crowdstrike, Inc.* v. *Webroot Inc.*, PTAB Case No. IPR2023-00126, Exhibit 1008: U.S. Publication No. 2011/0321166 to Capalik, 29 pgs.
*Crowdstrike, Inc.* v. *Webroot Inc.*, PTAB Case No. IPR2023-00126, Exhibit 1009: U.S. Publication No. 2012/0260340, 30 pgs.
*Crowdstrike, Inc.* v. *Webroot Inc.*, PTAB Case No. IPR2023-00126, Exhibit 1010: File History of U.S. Pat. No. 9,578,045, 210 pgs.
*Crowdstrike, Inc.* v. *Webroot Inc.*, PTAB Case No. IPR2023-00126, Exhibit 1011: Scheduling Order (Dkt. 50), 18 pgs.
*Crowdstrike, Inc.* v. *Webroot Inc.*, PTAB Case No. IPR2023-00126, Exhibit 1012: Natarajan Meghanathan, Sumanth Reddy Allam, and Loretta A. Moore, Tools and Techniques for Network Forensics, International Journal of Network Security & Its Applications (IJNSA), vol. 1., No. 1 (Apr. 2009), 12 pgs.
*Crowdstrike, Inc.* v. *Webroot Inc.*, PTAB Case No. IPR2023-00126, Exhibit 1013: SANS Institute, Host- vs. Network-Based Intrusion Detection Systems (2000-2005), 11 pgs.
*Crowdstrike, Inc.* v. *Webroot Inc.*, PTAB Case No. IPR2023-00126, Exhibit 1014: Securosis LLC, Evolving Endpoint Malware Detection: Dealing with Advanced and Targeted Attacks, Version 1.3 (Jul. 12, 2012), 23 pgs.
*Crowdstrike, Inc.* v. *Webroot Inc.*, PTAB Case No. IPR2023-00126, Exhibit 1015: Yanfang Ye, Weiwei Zhuang, Tao Li, Egemen Tas, Umesh Gupta, Shenghuo Zhu, Melih Abdulhayogiu, Combining File Content and File Relations for Cloud Based Malware Detection (Aug. 2011), 9 pgs.
*Crowdstrike, Inc.* v. *Webroot Inc.*, PTAB Case No. IPR2023-00126, Exhibit 1016: U.S. Pat. No. 6,944,772 to Dozortsev, 10 pgs.
*Crowdstrike, Inc.* v. *Webroot Inc.*, PTAB Case No. IPR2023-00126, Exhibit 1017: U.S. Pat. No. 6,772,346 to Chess et al., 14 pgs.
*Crowdstrike, Inc.* v. *Webroot Inc.*, PTAB Case No. IPR2023-00126, Exhibit 1018: WO 2002/033525 to Shyne-Song Chuang, 18 pgs.
*Crowdstrike, Inc.* v. *Webroot Inc.*, PTAB Case No. IPR2023-00126, Exhibit 1019: EP 1,549,012 to Kristof De Spiegeleer, 19 pgs.
*Crowdstrike, Inc.* v. *Webroot Inc.*, PTAB Case No. IPR2023-00126, Exhibit 1020: EP 1,280,040 to Alexander James Hinchliffe et al., 17 pgs.
*Crowdstrike, Inc.* v. *Webroot Inc.*, PTAB Case No. IPR2023-00126, Exhibit 1021: Oracle, Java Documentation, The Java Tutorials, What is a Path? (And Other File System Facts) (available at the following link https://docs.oracle.com/javase/tutorial/essential/io/path.html) (last accessed Oct. 2022), 3 pgs.

(56) References Cited

OTHER PUBLICATIONS

*Crowdstrike, Inc.* v. *Webroot Inc.*, PTAB Case No. IPR2023-00126, Exhibit 1022: U.S. Patent Publication No. 2004/0143753 to Hernacki et al., 20 pgs.

*Crowdstrike, Inc.* v. *Webroot Inc.*, PTAB Case No. IPR2023-00126, Exhibit 1023: U.S. Patent Publication No. 2011/0083180 to Mashevsky et al., 16 pgs.

*Crowdstrike, Inc.* v. *Webroot Inc.*, PTAB Case No. IPR2023-00126, Exhibit 1024: U.S. Pat. No. 8,429,746 to Alen Capalik, 11 pgs.

*Crowdstrike, Inc.* v. *Webroot Inc.*, PTAB Case No. IPR2023-00126, Exhibit 1025: Server Hardware, Software and Architecture by Abeer El Hadi El Zein El Nahas, University of Khartoum, Electrical and Electronics Engineering Dept. (Feb. 2008), 152 pgs.

*Crowdstrike, Inc.* v. *Webroot Inc.*, PTAB Case No. IPR2023-00126, Exhibit 1026: Guofei Gu, Phillip Porras, Vinod Yegneswaran, Martin Fong, Wenke Lee, BotHunter: Detecting Malware Infection Through IDS-Driven Dialog Correlation, In Proceedings of The 16th USENIX Security Symposium (Aug. 2007), 16 pgs.

*Crowdstrike, Inc.* v. *Webroot Inc.*, PTAB Case No. IPR2023-00126, Exhibit 1027: Yacin Nadji, Manos Antonakakis, Roberto Perdisci, and Wenke Lee, Understanding the Prevalence and Use of Alternative Plans in Malware with Network Games, In Proceedings of The 27th Annual Computer Security Applications Conference (Dec. 2011), 10 pgs.

*Crowdstrike, Inc.* v. *Webroot Inc.*, PTAB Case No. IPR2023-00126, Exhibit 1028: Manos Antonakakis, Roberto Perdisci, David Dagon, Wenke Lee, and Nick Feamster, Building a Dynamic Reputation System for DNS, In Proceedings of The 19th USENIX Security Symposium, (Aug. 2010), 17 pgs.

*Crowdstrike, Inc.* v. *Webroot Inc.*, PTAB Case No. IPR2023-00126, Exhibit 1029: Long Lu, Vinod Yegneswaran, Phil Porras, and Wenke Lee, Blade: An Attack-Agnostic Approach for Preventing Drive-By Malware Infections, In Proceedings of The 17th ACM Conference on Computer and Communications Security (CCS), Chicago, IL (Oct. 2010), 12 pgs.

*Crowdstrike, Inc.* v. *Webroot Inc.*, PTAB Case No. IPR2023-00126, Exhibit 1030: U.S. Publication No. 2008/0016570 to Capalik, 14 pgs.

*Crowdstrike, Inc.* v. *Webroot Inc.*, PTAB Case No. IPR2023-00126, Notice of Filing Date Accorded to Petition and Time for Filing Patent Owner Preliminary Response, Nov. 9, 2022, 5 pgs.

*Crowdstrike, Inc.* v. *Webroot Inc.*, PTAB Case No. IPR2023-00126, Patent Owner Open Text Inc.'s Mandatory Notices Pursuant to 37 CFR § 42.8(b), Nov. 21, 2022, 5 pgs.

*Crowdstrike, Inc.* v. *Webroot Inc.*, PTAB Case No. IPR2023-00126, Patent Owner's Preliminary Response, Feb. 9, 2023, 67 pgs.

*Crowdstrike, Inc.* v. *Webroot Inc.*, PTAB Case No. IPR2023-00126, Exhibit 2001: Declaration of Professor Nenad Medvidovic, Ph.D, 45 pgs.

*Crowdstrike, Inc.* v. *Webroot Inc.*, PTAB Case No. IPR2023-00126, Exhibit 2002: Curriculum Vitae of Professor Nenad Medvidovic, Ph.D., 71 pgs.

*Crowdstrike, Inc.* v. *Webroot Inc.*, PTAB Case No. IPR2023-00126, Exhibit 2003: *Webroot, Inc. and Open Text Inc.*, v. *CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.

*Crowdstrike, Inc.* v. *Webroot Inc.*, PTAB Case No. IPR2023-00126, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Crowdstrike, Inc.* v. *Webroot Inc.*, PTAB Case No. IPR2023-00126, Exhibit 2005: mCom Ip, Llc v. Cisco Systems, Inc., Case No. 6:22-cv-00261-ADA, Order Denying Defendant's Motion to Stay Pending Inter Partes Review, Dkt. 42 (W.D. Tex., Oct. 20, 2022), 7 pgs.

*Crowdstrike, Inc.* v. *Webroot Inc.*, PTAB Case No. IPR2023-00126, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Crowdstrike, Inc.* v. *Webroot Inc.*, PTAB Case No. IPR2023-00126, Exhibit 2007: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.

*Crowdstrike, Inc.* v. *Webroot Inc.*, PTAB Case No. IPR2023-00126, Exhibit 2008: Standing Order Governing Proceedings (OGP) 4.2— Patent Cases (W.D. Tex., Sep. 16, 2022), available at chrome-extension://efaid-nbmnnnibpcajpcglclefindmkaj/https://www.txwd. uscourts.gov/wp-content/uploads/Standing%20Orders/Waco/Albright/ Standing%20Order%20Governing%20Proceedings%20-%20Patent% 20Cases%20091622.pdf (excerpted), 5 pgs.

*Crowdstrike, Inc.* v. *Webroot Inc.*, PTAB Case No. IPR2023-00126, Exhibit 2009: *Webroot, Inc. and Open Text Inc.*, v. *AO Kaspersky Lab et al.*, Case No. 6:22-cv-00243-ADA-DTG, Defendants' Opening Claim Construction Brief, Dkt. 86 (W.D. Tex., Oct. 28, 2022) (excerpted), 19 pgs.

*Crowdstrike, Inc.* v. *Webroot Inc.*, PTAB Case No. IPR2023-00126, Exhibit 2010: *Webroot, Inc. and Open Text Inc.*, v. *AO Kaspersky Lab et al.*, Case No. 6:22-cv-00243-ADA-DTG, Defendants' Reply Claim Construction Brief, Dkt. 110 (W.D. Tex., Dec. 6, 2022) (excerpted), 11 pgs.

*Crowdstrike, Inc.* v. *Webroot Inc.*, PTAB Case No. IPR2023-00126, Exhibit 2011: *Webroot, Inc. and Open Text Inc.*, v. *AO Kaspersky Lab et al.*, Case No. 6:22-cv-00243-ADA-DTG, Scheduling Order, Dkt. 50 (W.D. Tex., Sep. 28, 2022) (excerpted), 6 pgs.

*Crowdstrike, Inc.* v. *Webroot Inc.*, PTAB Case No. IPR2023-00126, Exhibit 2012: *Open Text Inc. et al.*, v. *AO Kaspersky Lab*, Case No. 6:22-cv-00243-ADA-DTG, Defendant AO Kaspersky Lab's Preliminary Invalidity Contentions Exhibit 4A (W.D. Tex., Sep. 14, 2022) (excerpted), 1 pg.

*Crowdstrike, Inc.* v. *Webroot Inc.*, PTAB Case No. IPR2023-00126, Exhibit 2013: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022) (excerpted), 8 pgs.

*Crowdstrike, Inc.* v. *Webroot Inc.*, PTAB Case No. IPR2023-00126, Exhibit 2014: *Webroot, Inc. and Open Text Inc.*, v. *Trend Micro Inc.*, Case No. 6:22-cv-00239-ADA-DTG, Defendant's Preliminary Invalidity Contentions (W.D. Tex., Sep. 13, 2022) (excerpted), 9 pgs.

*Crowdstrike, Inc.* v. *Webroot Inc.*, PTAB Case No. IPR2023-00126, Exhibit 2015: *Webroot, Inc. and Open Text Inc.*, v. *CrowdStrike, Inc. and CrowdStrike Holdings, Inc.*, Case No. 6:22-cv-00241-ADA, Complaint for Patent Infringement, Dkt. 1 (W.D. Tex., Mar. 4, 2022), 141 pgs.

*Crowdstrike, Inc.* v. *Webroot Inc.*, PTAB Case No. IPR2023-00126, Exhibit 2016: *Open Text Inc. et al.*, v. *AO Kaspersky Lab*, Case No. 6:22-cv-00243-ADA-DTG, First Amended Complaint for Patent Infringement, Dkt. 80 (W.D. Tex., Oct. 27, 2022), 148 pgs.

*Crowdstrike, Inc.* v. *Webroot Inc.*, PTAB Case No. IPR2023-00126, Exhibit 2017: *Webroot, Inc. and Open Text Inc.*, v. *Trend Micro Inc.*, Case No. 6:22-cv-00239-ADA-DTG, First Amended Complaint for Patent Infringement, Dkt. 53 (W.D. Tex., Sept. 7, 2022), 235 pgs.

*Crowdstrike, Inc.* v. *Webroot Inc.*, PTAB Case No. IPR2023-00126, Exhibit 2018: *Webroot, Inc. and Open Text Inc.*, v. *Sophos, Ltd.*, Case No. 6:22-cv-00240-ADA-DTG, Second Amended Complaint for Patent Infringement, Dkt. 76 (W.D. Tex., Oct. 24, 2022), 184 pgs.

*Crowdstrike, Inc.* v. *Webroot Inc.*, PTAB Case No. IPR2023-00126, Preliminary Reply to Patent Owner's Preliminary Response, Mar. 9, 2023, 9 pgs.

*Crowdstrike, Inc.* v. *Webroot Inc.*, PTAB Case No. IPR2023-00126, Exhibit 1031: File History of EP14791882.5, 233 pgs.

*Crowdstrike, Inc.* v. *Webroot Inc.*, PTAB Case No. IPR2023-00126, Patent Owner's Preliminary Sur-Reply to Petitioner's Preliminary Reply, Mar. 16, 2023, 13 pgs.

*Crowdstrike, Inc.* v. *Webroot Inc.*, PTAB Case No. IPR2023-00126, Exhibit 2019: Excerpts from EX-1002 (File History of U.S. Pat. No. 10,257,224), 3 pgs.

(56)     References Cited

OTHER PUBLICATIONS

*Crowdstrike, Inc.* v. *Webroot Inc.*, PTAB Case No. IPR2023-00126, Exhibit 2020: Joseph Jaroch LinkedIn, 1 pg.
*Crowdstrike, Inc.* v. *Webroot Inc.*, PTAB Case No. IPR2023-00126, Decision Granting Institution of Inter Partes Review, May 5, 2023, 43 pgs.
*Crowdstrike, Inc.* v. *Webroot Inc.*, PTAB Case No. IPR2023-00126, Scheduling Order, May 5, 2023, 12 pgs.
*Crowdstrike, Inc.* v. *Webroot Inc.*, PTAB Case No. IPR2023-00126, Patent Owner's Request for Rehearing, May 19, 2023, 19 pgs.
*Crowdstrike, Inc.* v. *Webroot Inc.*, PTAB Case No. IPR2023-00126, Patent Owner's Objections to Evidence Submitted by Petitioner, May 19, 2023, 6 pgs.
*Crowdstrike, Inc.* v. *Webroot Inc.*, PTAB Case No. IPR2023-00126, Exhibit 2021: Claim Construction Order, *Webroot, Inc., Open Text Inc.* v. *AO Kaspersky*, No. 6:22-cv-00243-ADA-DTG (lead case), May 19, 2023, 20 pgs.
*Crowdstrike, Inc.* v. *Webroot Inc.*, PTAB Case No. IPR2023-00126, Notification of Receipt of POP Request, May 24, 2023, 2 pgs.
*Crowdstrike, Inc.* v. *Webroot Inc.*, PTAB Case No. IPR2023-00126, Exhibit 3001: Request for POP, May 24, 2023, 20 pgs.
*Crowdstrike, Inc.* v. *Webroot Inc.*, PTAB Case No. IPR2023-00126, Patent Owner Open Text Inc.'s Updated Mandatory Notices Pursuant to 37 CFR § 42.8(b), May 25, 2023, 8 pgs.
*Crowdstrike, Inc.* v. *Webroot Inc.*, PTAB Case No. IPR2023-00126, Order denying POP, Jun. 8, 2023, 3 pgs.
*Trend Micro, Inc.* v. *Webroot Inc.*, PTAB Case No. IPR2023-00657, Petition for Inter Partes Review of U.S. Pat. No. 10,257,224, Mar. 3, 2023, 85 pgs.
*Trend Micro, Inc.* v. *Webroot Inc.*, PTAB Case No. IPR2023-00657, Exhibit 1001: U.S. Pat. No. 10,257,224 to Jaroch et al., 31 pgs.
*Trend Micro, Inc.* v. *Webroot Inc.*, PTAB Case No. IPR2023-00657, Exhibit 1002: Expert Declaration of Dr. Seth Nielson, 138 pgs.
*Trend Micro, Inc.* v. *Webroot Inc.*, PTAB Case No. IPR2023-00657, Exhibit 1003: Curriculum Vitae of Dr. Seth Nielson, 15 pgs.
*Trend Micro, Inc.* v. *Webroot Inc.*, PTAB Case No. IPR2023-00657, Exhibit 1004: U.S. Pat. No. 7,352,280 to Rockwood, 24 pgs.
*Trend Micro, Inc.* v. *Webroot Inc.*, PTAB Case No. IPR2023-00657, Exhibit 1005: Xie, A Spatiotemporal Event Correlation Approach to Computer Security, 148 pgs.
*Trend Micro, Inc.* v. *Webroot Inc.*, PTAB Case No. IPR2023-00657, Exhibit 1006: Prosecution History of '224 Patent, 472 pgs.
*Trend Micro, Inc.* v. *Webroot Inc.*, PTAB Case No. IPR2023-00657, Exhibit 1007: Declaration verifying Xie publication date, 4 pgs.
*Trend Micro, Inc.* v. *Webroot Inc.*, PTAB Case No. IPR2023-00657, Exhibit 1008: Peterson, et al., "Computer networks: a systems approach," Morgan Kaufmann Publishers, Inc., 1996, 28 pgs.
*Trend Micro, Inc.* v. *Webroot Inc.*, PTAB Case No. IPR2023-00657, Exhibit 1009: Bangia, et al., "Operating Systems and Software Diagnostics" (2007), 3 pgs.
*Trend Micro, Inc.* v. *Webroot Inc.*, PTAB Case No. IPR2023-00657, Exhibit 1010: U.S. Published Patent Application No. 2013/0067576 to Niemela, 10 pgs.
*Trend Micro, Inc.* v. *Webroot Inc.*, PTAB Case No. IPR2023-00657, Exhibit 1011: Hutchins, et al., "Intelligence-Driven Computer Network Defense Informed by Analysis of Adversary Campaigns and Intrusion Kill Chains", The Proceedings of the 6th Int'l Conf. on Information Warfare and Security, Mar. 17-18, 2011, 15 pgs.
*Trend Micro, Inc.* v. *Webroot Inc.*, PTAB Case No. IPR2023-00657, Exhibit 1012: Cheswick, et al., "Firewalls and Internet Security Second Edition, Repelling the Wily Hacker", 2003, 4 pgs.
*Trend Micro, Inc.* v. *Webroot Inc.*, PTAB Case No. IPR2023-00657, Exhibit 1013: Anderson, "Network Attack and Defense", Security Engineering, vol. 2, 2008, 51 pgs.
*Trend Micro, Inc.* v. *Webroot Inc.*, PTAB Case No. IPR2023-00657, Exhibit 1014: Wilding et al., Virus Bulletin, The Authoritative International Publication of Computer Virus Prevention Recognition and Removal, Jul. 1989, 16 pgs.

*Trend Micro, Inc.* v. *Webroot Inc.*, PTAB Case No. IPR2023-00657, Exhibit 1015: Lardinois, Google Acquires Online Virus Malware and URL Scanner VirusTotal, TechCrunch, Sep. 7, 2012, 6 pgs.
*Trend Micro, Inc.* v. *Webroot Inc.*, PTAB Case No. IPR2023-00657, Exhibit 1016: Lasser, "Special Focus Issue: Security", ;login: The Magazine of USENIX & Sage, 6 pgs.
*Trend Micro, Inc.* v. *Webroot Inc.*, PTAB Case No. IPR2023-00657, Patent Owner Open Text Inc.'s Mandatory Notices Pursuant to 37 CFR § 42.8(b), Mar. 24, 2023, 8 pgs.
*Trend Micro, Inc.* v. *Webroot Inc.*, PTAB Case No. IPR2023-00657, Notice of Filing Date Accorded to Petition and Time for Filing Patent Owner Preliminary Response, Apr. 17, 2023, 5 pgs.
*Sophos Ltd. and Sophos Inc.* v. *Webroot Inc.*, PTAB Case No. IPR2023-00731, Petition for Inter Partes Review of U.S. Pat. No. 8,201,243, Apr. 4, 2023, 86 pgs.
*Sophos Ltd. and Sophos Inc.* v. *Webroot Inc.*, PTAB Case No. IPR2023-00731, Exhibit 1001: U.S. Pat. No. 8,201,243, 13 pgs.
*Sophos Ltd. and Sophos Inc.* v. *Webroot Inc.*, PTAB Case No. IPR2023-00731, Exhibit 1002: File History of the '243 Patent, 423 pgs.
*Sophos Ltd. and Sophos Inc.* v. *Webroot Inc.*, PTAB Case No. IPR2023-00731, Exhibit 1003: Declaration of Dr. Henry Houh, 113 pgs.
*Sophos Ltd. and Sophos Inc.* v. *Webroot Inc.*, PTAB Case No. IPR2023-00731, Exhibit 1004: Curriculum Vitae of Dr. Henry Houh, 12 pgs.
*Sophos Ltd. and Sophos Inc.* v. *Webroot Inc.*, PTAB Case No. IPR2023-00731, Exhibit 1005: Li, et al., UCLog: A Unified, Correlated Logging Architecture for Intrusion Detection Int'l Conf. on Telecomm. Sys. Modelling & Analysis (2004), 15 pgs.
*Sophos Ltd. and Sophos Inc.* v. *Webroot Inc.*, PTAB Case No. IPR2023-00731, Exhibit 1006: U.S. Pat. No. 8,117,659 to Hartrell, 16 pgs.
*Sophos Ltd. and Sophos Inc.* v. *Webroot Inc.*, PTAB Case No. IPR2023-00731, Exhibit 1007: Salvador Mandujano Vergara, A multiagent approach to outbound intrusion detection (2004) (Ph.D. Thesis, Instituto Tecnológico y de Estudios Superires de Monterrey) (on file with Repositorio Institucional del Tecnológico de Monterrey (RITEC) in the Instituto Tecnológico y de Estudios Superiores de Monterrey Library), 216 pgs.
*Sophos Ltd. and Sophos Inc.* v. *Webroot Inc.*, PTAB Case No. IPR2023-00731, Exhibit 1008: U.S. Pat. No. 7,174,566 to Yadav, 17 pgs.
*Sophos Ltd. and Sophos Inc.* v. *Webroot Inc.*, PTAB Case No. IPR2023-00731, Exhibit 1009: Declaration of Dr. Sylvia D. Hall-Ellis, 30 pgs.
*Sophos Ltd. and Sophos Inc.* v. *Webroot Inc.*, PTAB Case No. IPR2023-00731, Exhibit 1010: Webroot Oct. 25, 2022 Infringement Contentions, 9 pgs.
*Sophos Ltd. and Sophos Inc.* v. *Webroot Inc.*, PTAB Case No. IPR2023-00731, Exhibit 1011: Jeff Crume, Inside Internet Security: What Hackers Don't Want You to Know (Pearson Educ. Ltd. 2000), 293 pgs.
*Sophos Ltd. and Sophos Inc.* v. *Webroot Inc.*, PTAB Case No. IPR2023-00731, Exhibit 1012: Information Sciences Institute, Univ. of S. Cal., Internet Protocol: DARPA Internet Program Protocol Specification (1981), 51 pgs.
*Sophos Ltd. and Sophos Inc.* v. *Webroot Inc.*, PTAB Case No. IPR2023-00731, Exhibit 1013: Stipulation Waiving IPR Claims in District Court Litigation, 4 pgs.
*Sophos Ltd. and Sophos Inc.* v. *Webroot Inc.*, PTAB Case No. IPR2023-00731, Exhibit 1014: Excerpt from Transcript of Motions Hearing in *Webroot, Inc., et al.* v. *AO Kaspersky Lab*, No. 6:22-cv-00243-ADA-DTG (W.D. Tex.) (Dec. 9, 2022), 7 pgs.
*Sophos Ltd. and Sophos Inc.* v. *Webroot Inc.*, PTAB Case No. IPR2023-00731, Exhibit 1015: Mandia, K & Prosise, C., Incident Response: Investigating Computer Crime, 23 pgs.
*Sophos Ltd. and Sophos Inc.* v. *Webroot Inc.*, PTAB Case No. IPR2023-00731, Patent Owner Open Text Inc.'s Mandatory Notices Pursuant to 37 CFR § 42.8(b), Apr. 25, 2023, 8 pgs.

(56) References Cited

OTHER PUBLICATIONS

*Sophos Ltd. and Sophos Inc.* v. *Webroot Inc.*, PTAB Case No. IPR2023-00731, Notice of Filing Date Accorded to Petition and Time for Filing Patent Owner Preliminary Response, May 10, 2023, 5 pgs.

*Sophos Ltd. and Sophos Inc.* v. *Webroot Inc.*, PTAB Case No. IPR2023-00732, Petition for Inter Partes Review of U.S. Pat. No. 8,719,932, Apr. 4, 2023, 86 pgs.

*Sophos Ltd. and Sophos Inc.* v. *Webroot Inc.*, PTAB Case No. IPR2023-00732, Exhibit 1001: U.S. Pat. No. 8,719,932, 12 pgs.

*Sophos Ltd. and Sophos Inc.* v. *Webroot Inc.*, PTAB Case No. IPR2023-00732, Exhibit 1002: File History of the '932 Patent, 120 pgs.

*Sophos Ltd. and Sophos Inc.* v. *Webroot Inc.*, PTAB Case No. IPR2023-00732, Exhibit 1003: Declaration of Dr. Henry Houh, 111 pgs.

*Sophos Ltd. and Sophos Inc.* v. *Webroot Inc.*, PTAB Case No. IPR2023-00732, Exhibit 1004: Curriculum Vitae of Dr. Henry Houh, 12 pgs.

*Sophos Ltd. and Sophos Inc.* v. *Webroot Inc.*, PTAB Case No. IPR2023-00732, Exhibit 1005: Li, et al., UCLog: A Unified, Correlated Logging Architecture for Intrusion Detection, Int'l Conf. on Telecomm. Sys. Modelling & Analysis (2004) 1, 15 pgs.

*Sophos Ltd. and Sophos Inc.* v. *Webroot Inc.*, PTAB Case No. IPR2023-00732, Exhibit 1006: U.S. Pat. No. 8,117,659 Hartrell, 16 pgs.

*Sophos Ltd. and Sophos Inc.* v. *Webroot Inc.*, PTAB Case No. IPR2023-00732, Exhibit 1007: Salvador Mandujano Vergara, A multiagent approach to outbound intrusion detection (2004) (Ph.D. Thesis, Instituto Tecnológico y de Estudios Superires de Monterrey) (on file with Repositorio Institucional del Tecnológico de Monterrey (RITEC) in the Instituto Tecnológico y de Estudios Superiores de Monterrey Library), 216 pgs.

*Sophos Ltd. and Sophos Inc.* v. *Webroot Inc.*, PTAB Case No. IPR2023-00732, Exhibit 1008: U.S. Pat. No. 7,174,566 Yadav, 17 pgs.

*Sophos Ltd. and Sophos Inc.* v. *Webroot Inc.*, PTAB Case No. IPR2023-00732, Exhibit 1009: Declaration of Dr. Sylvia D. Hall-Ellis, 30 pgs.

*Sophos Ltd. and Sophos Inc.* v. *Webroot Inc.*, PTAB Case No. IPR2023-00732, Exhibit 1010: Webroot Oct. 25, 2022 Infringement Contentions, 9 pgs.

*Sophos Ltd. and Sophos Inc.* v. *Webroot Inc.*, PTAB Case No. IPR2023-00732, Exhibit 1011: Jeff Crume, Inside Internet Security: What Hackers Don't Want You to Know, 293 pgs.

*Sophos Ltd. and Sophos Inc.* v. *Webroot Inc.*, PTAB Case No. IPR2023-00732, Exhibit 1012: DARPA, Internet Program Protocol Specification, 51 pgs.

*Sophos Ltd. and Sophos Inc.* v. *Webroot Inc.*, PTAB Case No. IPR2023-00732, Exhibit 1013: U.S. Pat. No. 8,201,243, 13 pgs.

*Sophos Ltd. and Sophos Inc.* v. *Webroot Inc.*, PTAB Case No. IPR2023-00732, Exhibit 1014: File History of U.S. Pat. No. 8,201,243, 423 pgs.

*Sophos Ltd. and Sophos Inc.* v. *Webroot Inc.*, PTAB Case No. IPR2023-00732, Exhibit 1015: Mandia, K & Prosise, C., Incident Response: Investigating Computer Crime, 23 pgs.

*Sophos Ltd. and Sophos Inc.* v. *Webroot Inc.*, PTAB Case No. IPR2023-00732, Exhibit 1016: Stipulation Waiving IPR Claims in District Court Litigation, 4 pgs.

*Sophos Ltd. and Sophos Inc.* v. *Webroot Inc.*, PTAB Case No. IPR2023-00732, Exhibit 1017: Excerpt from Transcript of Motions Hearing in *Webroot, Inc., et al.* v. *AO Kaspersky Lab*, No. 6:22-cv-00243-ADA-DTG (W.D. Tex.) (Dec. 9, 2022), 7 pgs.

*Sophos Ltd. and Sophos Inc.* v. *Webroot Inc.*, PTAB Case No. IPR2023-00732, Patent Owner Open Text Inc.'s Mandatory Notices Pursuant to 37 CFR § 42.8(b), Apr. 25, 2023, 8 pgs.

*Sophos Ltd. and Sophos Inc.* v. *Webroot Inc.*, PTAB Case No. IPR2023-00732, Notice of Filing Date Accorded to Petition and Time for Filing Patent Owner Preliminary Response, May 10, 2023, 5 pgs.

*AO Kaspersky Lab* v. *Webroot, Inc.*, PTAB Case No. IPR2023-01011, Petition for Inter Partes Review of U.S. Pat. No. 10,257,224, Jun. 2, 2023, 91 pgs.

*AO Kaspersky Lab* v. *Webroot, Inc.*, PTAB Case No. IPR2023-01011, Exhibit 1001: U.S. Pat. No. 10,257,224 to Jaroch et al., 31 pgs.

*AO Kaspersky Lab* v. *Webroot, Inc.*, PTAB Case No. IPR2023-01011, Exhibit 1002: File History of U.S. Pat. No. 10,257,224, 472 pgs.

*AO Kaspersky Lab* v. *Webroot, Inc.*, PTAB Case No. IPR2023-01011, Exhibit 1003: Declaration of Dr. Wenke Lee, 202 pgs.

*AO Kaspersky Lab* v. *Webroot, Inc.*, PTAB Case No. IPR2023-01011, Exhibit 1004: U.S. Publication No. 2013/0298244 to Kumar et al., 52 pgs.

*AO Kaspersky Lab* v. *Webroot, Inc.*, PTAB Case No. IPR2023-01011, Exhibit 1005: U.S. Publication No. 2007/0016953 to Morris, 18 pgs.

*AO Kaspersky Lab* v. *Webroot, Inc.*, PTAB Case No. IPR2023-01011, Exhibit 1006: U.S. Pat. No. 8,087,087 to Van Oorschot, 19 pgs.

*AO Kaspersky Lab* v. *Webroot, Inc.*, PTAB Case No. IPR2023-01011, Exhibit 1007: U.S. Publication No. 2010/0077481 to Polyakov et al., 11 pgs.

*AO Kaspersky Lab* v. *Webroot, Inc.*, PTAB Case No. IPR2023-01011, Exhibit 1008: U.S. Publication No. 2011/0321166 to Capalik, 29 pgs.

*AO Kaspersky Lab* v. *Webroot, Inc.*, PTAB Case No. IPR2023-01011, Exhibit 1009: U.S. Publication No. 2012/0260340, 30 pgs.

*AO Kaspersky Lab* v. *Webroot, Inc.*, PTAB Case No. IPR2023-01011, Exhibit 1010: File History of U.S. Pat. No. 9,578,045, 210 pgs.

*AO Kaspersky Lab* v. *Webroot, Inc.*, PTAB Case No. IPR2023-01011, Exhibit 1011: Scheduling Order (Dkt. 50), Sep. 28, 2022, 18 pgs.

*AO Kaspersky Lab* v. *Webroot, Inc.*, PTAB Case No. IPR2023-01011, Exhibit 1012: Natarajan Meghanathan, Sumanth Reddy Allam, and Loretta A. Moore, Tools and Techniques for Network Forensics, International Journal of Network Security & Its Applications (IJNSA), vol. 1., No. 1, Apr. 2009, 12 pgs.

*AO Kaspersky Lab* v. *Webroot, Inc.*, PTAB Case No. IPR2023-01011, Exhibit 1013: *SANS Institute, Host*—vs. *Network-Based Intrusion Detection Systems*, 2000-2005, 11 pgs.

*AO Kaspersky Lab* v. *Webroot, Inc.*, PTAB Case No. IPR2023-01011, Exhibit 1014: Securosis LLC, Evolving Endpoint Malware Detection: Dealing with Advanced and Targeted Attacks, Version 1.3 (Jul. 12, 2012), 23 pgs.

*AO Kaspersky Lab* v. *Webroot, Inc.*, PTAB Case No. IPR2023-01011, Exhibit 1015: Yanfang Ye, Weiwei Zhuang, Tao Li, Egemen Tas, Umesh Gupta, Shenghuo Zhu, Melih Abdulhayogiu, Combining File Content and File Relations for Cloud Based Malware Detection, Aug. 2011, 9 pgs.

*AO Kaspersky Lab* v. *Webroot, Inc.*, PTAB Case No. IPR2023-01011, Exhibit 1016: U.S. Pat. No. 6,944,772 to Dozortsev, 10 pgs.

*AO Kaspersky Lab* v. *Webroot, Inc.*, PTAB Case No. IPR2023-01011, Exhibit 1017: U.S. Pat. No. 6,772,346 to Chess et al., 14 pgs.

*AO Kaspersky Lab* v. *Webroot, Inc.*, PTAB Case No. IPR2023-01011, Exhibit 1018: WO 2002/033525 to Chuang, 18 pgs.

*AO Kaspersky Lab* v. *Webroot, Inc.*, PTAB Case No. IPR2023-01011, Exhibit 1019: EP 1,549,012 to De Spiegeleer, 19 pgs.

*AO Kaspersky Lab* v. *Webroot, Inc.*, PTAB Case No. IPR2023-01011, Exhibit 1020: EP 1,280,040 to Hinchliffe, 17 pgs.

*AO Kaspersky Lab* v. *Webroot, Inc.*, PTAB Case No. IPR2023-01011, Exhibit 1021: Oracle, Java Documentation, The Java Tutorials, What is a Path? (And Other File System Facts) (available at the following link https://docs.oracle.com/javase/tutorial/essential/io/path.html) (last accessed Oct. 2022), 3 pgs.

*AO Kaspersky Lab* v. *Webroot, Inc.*, PTAB Case No. IPR2023-01011, Exhibit 1022: U.S. Patent Publication No. 2004/0143753 to Hernacki et al., 20 pgs.

*AO Kaspersky Lab* v. *Webroot, Inc.*, PTAB Case No. IPR2023-01011, Exhibit 1023: U.S. Patent Publication No. 2011/0083180 to Mashevsky et al., 16 pgs.

(56) References Cited

OTHER PUBLICATIONS

*AO Kaspersky Lab* v. *Webroot, Inc.*, PTAB Case No. IPR2023-01011, Exhibit 1024: U.S. Pat. No. 8,429,746 to Alen Capalik, 11 pgs.

*AO Kaspersky Lab* v. *Webroot, Inc.*, PTAB Case No. IPR2023-01011, Exhibit 1025: Server Hardware, Software and Architecture by Abeer El Hadi El Zein El Nahas, University of Khartoum, Electrical and Electronics Engineering Dept., Feb. 2008, 152 pgs.

*AO Kaspersky Lab* v. *Webroot, Inc.*, PTAB Case No. IPR2023-01011, Exhibit 1026: Guofei Gu, Phillip Porras, Vinod Yegneswaran, Martin Fong, Wenke Lee, BotHunter: Detecting Malware Infection Through IDS—Driven Dialog Correlation, In Proceedings of The 16th USENIX Security Symposium, Aug. 2007, 16 pgs.

*AO Kaspersky Lab* v. *Webroot, Inc.*, PTAB Case No. IPR2023-01011, Exhibit 1027: Yacin Nadji, Manos Antonakakis, Roberto Perdisci, and Wenke Lee, Understanding the Prevalence and Use of Alternative Plans in Malware with Network Games, In Proceedings of The 27th Annual Computer Security Applications Conference, Dec. 2011, 10 pgs.

*AO Kaspersky Lab* v. *Webroot, Inc.*, PTAB Case No. IPR2023-01011, Exhibit 1028: Manos Antonakakis, Roberto Perdisci, David Dagon, Wenke Lee, and Nick Feamster, Building a Dynamic Reputation System for DNS, In Proceedings of The 19th USENIX Security Symposium, Aug. 2010, 17 pgs.

*AO Kaspersky Lab* v. *Webroot, Inc.*, PTAB Case No. IPR2023-01011, Exhibit 1029: Long Lu, Vinod Yegneswaran, Phil Porras, and Wenke Lee, BLADE: An Attack-Agnostic Approach for Preventing Drive-By Malware Infections, In Proceedings of The 17th ACM Conference on Computer and Communications Security (CCS), Chicago, IL (Oct. 2010), 12 pgs.

*AO Kaspersky Lab* v. *Webroot, Inc.*, PTAB Case No. IPR2023-01011, Exhibit 1030: U.S. Publication No. 2008/0016570 to Capalik, 14 pgs.

*AO Kaspersky Lab* v. *Webroot, Inc.*, PTAB Case No. IPR2023-01011, Exhibit 1031: Declaration of V.S. Subrahmanian, Ph.D., 88 pgs.

*AO Kaspersky Lab* v. *Webroot, Inc.*, PTAB Case No. IPR2023-01011, Exhibit 1032: Order Granting Fifth Amended Scheduling Order, ECF No. 252, Mar. 29, 2023, 9 pgs.

*AO Kaspersky Lab* v. *Webroot, Inc.*, PTAB Case No. IPR2023-01011, Petitioner's Motion for Joinder under 35 U.S.C. § 315(c), 37 C.F.R. § 42.22, and § 42.122(b), Jun. 2, 2023, 18 pgs.

*AO Kaspersky Lab* v. *Webroot, Inc.*, PTAB Case No. IPR2023-01011, Notice of Filing Date Accorded to Petition and Time for Filing Patent Owner Preliminary Response, Jun. 9, 2023, 6 pgs.

*Forcepoint LLC* v. *Webroot Inc. and Open Text, Inc.*, PTAB Case No. IPR2023-00786, Petition for Inter Partes Review of U.S. Pat. No. 10,025,928, Mar. 31, 2023, 89 pgs.

*Forcepoint LLC* v. *Webroot Inc. and Open Text, Inc.*, PTAB Case No. IPR2023-00786, Exhibit 1001: U.S. Pat. No. 10,025,928 to Jaroch, 12 pgs.

*Forcepoint LLC* v. *Webroot Inc. and Open Text, Inc.*, PTAB Case No. IPR2023-00786, Exhibit 1002: Declaration of Dr. Michael T. Goodrich, 130 pgs.

*Forcepoint LLC* v. *Webroot Inc. and Open Text, Inc.*, PTAB Case No. IPR2023-00786, Exhibit 1003: Patent File History of U.S. Pat. No. 10,025,928, 402 pgs.

*Forcepoint LLC* v. *Webroot Inc. and Open Text, Inc.*, PTAB Case No. IPR2023-00786, Exhibit 1004: U.S. Patent Publication No. 2013/0007870, 25 pgs.

*Forcepoint LLC* v. *Webroot Inc. and Open Text, Inc.*, PTAB Case No. IPR2023-00786, Exhibit 1005: U.S. Patent Publication No. 2009/0070873, 23 pgs.

*Forcepoint LLC* v. *Webroot Inc. and Open Text, Inc.*, PTAB Case No. IPR2023-00786, Exhibit 1006: Complaint, *Webroot, Inc et al.*v. *Forcepoint LLC*, No. 6:22- cv-342 (W.D. Tex.) (Mar. 31, 2022), 98 pgs.

*Forcepoint LLC* v. *Webroot Inc. and Open Text, Inc.*, PTAB Case No. IPR2023-00786, Exhibit 1007: Excerpt from Transcript of Motions Hearing in *Webroot, Inc., et al.* v. *AO Kaspersky Lab*, No. 6:22-cv-243 (W.D. Tex.) (Dec. 9, 2022), 6 pgs.

*Forcepoint LLC* v. *Webroot Inc. and Open Text, Inc.*, PTAB Case No. IPR2023-00786, Exhibit 1008: U.S. Pat. No. 9,654,495, 45 pgs.

*Forcepoint LLC* v. *Webroot Inc. and Open Text, Inc.*, PTAB Case No. IPR2023-00786, Exhibit 1009: Curriculum Vitae of Dr. Michael T. Goodrich, 38 pgs.

*Forcepoint LLC* v. *Webroot Inc. and Open Text, Inc.*, PTAB Case No. IPR2023-00786, Exhibit 1010: LexMachina Summary of Cases filed by Webroot, Inc. in the Western District of Texas, 2 pgs.

*Forcepoint LLC* v. *Webroot Inc. and Open Text, Inc.*, PTAB Case No. IPR2023-00786, Patent Owner Open Text Inc.'s Mandatory Notices Pursuant to 37 CFR § 42.8(b), Apr. 21, 2023, 7 pgs.

*Forcepoint LLC* v. *Webroot Inc. and Open Text, Inc.*, PTAB Case No. IPR2023-00786, Notice of Filing Date Accorded to Petition and Time for Filing Patent Owner Preliminary Response, May 17, 2023, 5 pgs.

*Forcepoint LLC* v. *Webroot Inc. and Open Text, Inc.*, PTAB Case No. IPR2023- 00784, Petition for Inter Partes Review of U.S. Pat. No. 8,438,386 under 37 CFR § 42.101, Mar. 31, 2023, 87 pgs.

*Forcepoint LLC* v. *Webroot Inc. and Open Text, Inc.*, PTAB Case No. IPR2023-00784, Exhibit 1001: U.S. Pat. No. 8,438,386 to Hegli et al., 23 pgs.

*Forcepoint LLC* v. *Webroot Inc. and Open Text, Inc.*, PTAB Case No. IPR2023-00784, Exhibit 1002: Declaration of Dr. Michael T. Goodrich, 135 pgs.

*Forcepoint LLC* v. *Webroot Inc. and Open Text, Inc.*, PTAB Case No. IPR2023-00784, Exhibit 1003: Curriculum Vitae of Dr. Michael T. Goodrich, 38 pgs.

*Forcepoint LLC* v. *Webroot Inc. and Open Text, Inc.*, PTAB Case No. IPR2023-00784, Exhibit 1004: U.S. Pat. No. 9,654,495 to Hubbard et al., 45 pgs.

*Forcepoint LLC* v. *Webroot Inc. and Open Text, Inc.*, PTAB Case No. IPR2023-00784, Exhibit 1005: U.S. Patent No. 8,015, 174 to Hubbard, 32 pgs.

*Forcepoint LLC* v. *Webroot Inc. and Open Text, Inc.*, PTAB Case No. IPR2023-00784, Exhibit 1006: U.S. Patent Publication No. 2008/0175266 to Alperovitch et al., 30 pgs.

*Forcepoint LLC* v. *Webroot Inc. and Open Text, Inc.*, PTAB Case No. IPR2023-00784, Exhibit 1007: Complaint, *Webroot, Inc et al.*v. *Forcepoint LLC*, No. 6:22-CV-342 (W.D. Tex.) (Mar. 31, 2022), 98 pgs.

*Forcepoint LLC* v. *Webroot Inc. and Open Text, Inc.*, PTAB Case No. IPR2023-00784, Exhibit 1008: Excerpt from Transcript of Motions Hearing in *Webroot, Inc., et al.* v. *AO Kaspersky Lab*, No. 6:22-cv-243 (W.D. Tex.) (Dec. 9, 2022), 6 pgs.

*Forcepoint LLC* v. *Webroot Inc. and Open Text, Inc.*, PTAB Case No. IPR2023-00784, Exhibit 1009: Patent File History of U.S. Pat. No. 8,438,386, 197 pgs.

*Forcepoint LLC* v. *Webroot Inc. and Open Text, Inc.*, PTAB Case No. IPR2023-00784, Exhibit 1010: LexMachina Summary of Cases filed by Webroot, Inc. in the Western District of Texas, 2 pgs.

*Forcepoint LLC* v. *Webroot Inc. and Open Text, Inc.*, PTAB Case No. IPR2023-00784, Exhibit 1011: Periakaruppan, Ram & Nemeth, Evi, "GTrace-A Graphical Traceroute Tool," USENIX (1999), 11 pgs.

*Forcepoint LLC* v. *Webroot Inc. and Open Text, Inc.*, PTAB Case No. IPR2023-00784, Exhibit 1012: Microsoft Computer Dictionary (5th ed., 2002), 3 pgs.

*Forcepoint LLC* v. *Webroot Inc. and Open Text, Inc.*, PTAB Case No. IPR2023-00784, Exhibit 1013: U.S. Patent Publication No. 2008/0082662 to Dandliker et al., 24 pgs.

*Forcepoint LLC* v. *Webroot Inc. and Open Text, Inc.*, PTAB Case No. IPR2023-00784, Patent Owner Open Text Inc.'s Mandatory Notices Pursuant to 37 CFR § 42.8(b), Apr. 21, 2023, 7 pgs.

*Forcepoint LLC* v. *Webroot Inc. and Open Text, Inc.*, PTAB Case No. IPR2023-00784, Notice of Filing Date Accorded to Petition and Time for Filing Patent Owner Preliminary Response, May 17, 2023, 5 pgs.

*Sophos Ltd. and Sophos Inc.* v. *Webroot Inc.*, PTAB Case No. IPR2023-00528, Petition for Inter Partes Review of U.S. Pat. No. 10,599,844, Mar. 3, 2023, 86 pgs.

(56) References Cited

OTHER PUBLICATIONS

*Sophos Ltd. and Sophos Inc.* v. *Webroot Inc.*, PTAB Case No. IPR2023-00528, Exhibit 1001: U.S. Pat. No. 10,599,844, 15 pgs.
*Sophos Ltd. and Sophos Inc.* v. *Webroot Inc.*, PTAB Case No. IPR2023-00528, Exhibit 1002: File History for U.S. Pat. No. 10,599,844, 458 pgs.
*Sophos Ltd. and Sophos Inc.* v. *Webroot Inc.*, PTAB Case No. IPR2023-00528, Exhibit 1003: Defendant Sophos Ltd.'s Stipulation regarding Invalidity Contents for U.S. Pat. No. 10,599,844, 4 pgs.
*Sophos Ltd. and Sophos Inc.* v. *Webroot Inc.*, PTAB Case No. IPR2023-00528, Exhibit 1004: Declaration of Dr. Gene Tsudik, 122 pgs.
*Sophos Ltd. and Sophos Inc.* v. *Webroot Inc.*, PTAB Case No. IPR2023-00528, Exhibit 1005: U.S. Patent Appl. Pub. No. 20150213376 Ideses, 19 pgs.
*Sophos Ltd. and Sophos Inc.* v. *Webroot Inc.*, PTAB Case No. IPR2023-00528, Exhibit 1006: Japanese Patent Appl. Pub. No. 2012027710A Mori and Certified Translation Thereof, 27 pgs.
*Sophos Ltd. and Sophos Inc.* v. *Webroot Inc.*, PTAB Case No. IPR2023-00528, Exhibit 1007: Defendants' Opening Claim Construction Brief, D.I. 86, *Webroot Inc et al.* v. *AO Kaspersky Lab et al.*, No. 6:22-cv-00243 (W.D. Tex., Jan. 22, 2023), 84 pgs.
*Sophos Ltd. and Sophos Inc.* v. *Webroot Inc.*, PTAB Case No. IPR2023-00528, Exhibit 1008: Order granting Fourth Amended Scheduling Order, D.I. 160, *Webroot Inc. et al.* v. *AO Kaspersky Lab et al.*, No. 6:22-cv-00243 (W.D. Tex. Jan. 22, 2023), 7 pgs.
*Sophos Ltd. and Sophos Inc.* v. *Webroot Inc.*, PTAB Case No. IPR2023-00528, Exhibit 1009: WANG, et al., Detecting Unknown Malicious Executables Using Portable Executable Headers, Fifth Int'l Joint Conf. on INC, IMS, and IDC, 2009, pp. 278-284.
*Sophos Ltd. and Sophos Inc.* v. *Webroot Inc.*, PTAB Case No. IPR2023-00528, Exhibit 1010: Michael Sikorski & Andrew Honig, *Practical Malware Analysis*, 2012, 12 pgs.
*Sophos Ltd. and Sophos Inc.* v. *Webroot Inc.*, PTAB Case No. IPR2023-00528, Exhibit 1011: Murugiah Souppaya & Karen Scarfone, Guide to Malware Incident Prevention and Handling for Desktops and Laptops, NIST Spec. Pub. 800-83, Rev. 1, Jul. 2013, 47 pgs.
*Sophos Ltd. and Sophos Inc.* v. *Webroot Inc.*, PTAB Case No. IPR2023-00528, Exhibit 1012: Monnappa K A, Learning Malware Analysis, 2018, 9 pgs.
*Sophos Ltd. and Sophos Inc.* v. *Webroot Inc.*, PTAB Case No. IPR2023-00528, Exhibit 1013: V. Kecman, Support Vector Machines—An Introduction, StudFuzz 177, 1-47, 2005, 11 pgs.
*Sophos Ltd. and Sophos Inc.* v. *Webroot Inc.*, PTAB Case No. IPR2023-00528, Exhibit 1014: Virus Bulletin (Nov. 1990), 24 pgs.
*Sophos Ltd. and Sophos Inc.* v. *Webroot Inc.*, PTAB Case No. IPR2023-00528, Exhibit 1015: U.S. Pat. No. 8,709,924, 17 pgs.
*Sophos Ltd. and Sophos Inc.* v. *Webroot Inc.*, PTAB Case No. IPR2023-00528, Exhibit 1016: U.S. Pat. No. 9,465,940, 14 pgs.
*Sophos Ltd. and Sophos Inc.* v. *Webroot Inc.*, PTAB Case No. IPR2023-00528, Exhibit 1017: D. Devi & S. Nandi, *Detection of Packed Malware, in Proceedings of the First Int'l Conf. on Security of Internet of Things* (SecurIT '12), Association for Computing Machinery, New York, NY, USA 22-26, 2012, 1 pg.
*Sophos Ltd. and Sophos Inc.* v. *Webroot Inc.*, PTAB Case No. IPR2023-00528, Exhibit 1018: Excerpt from Transcript of Motions Hearing, *Webroot Inc et al.* v. *AO Kaspersky Lab et al.*, No. 6:22-cv-00243 (W.D. Tex.), Dec. 9, 2022, 3 pgs.
*Trend Micro, Inc.* v. *Webroot Inc.*, PTAB Case No. IPR2023-00662, Petition for Inter Partes Review of U.S. Pat. No. 10,599,844, Mar. 3, 2023, 85 pgs.
*Trend Micro, Inc.* v. *Webroot Inc.*, PTAB Case No. IPR2023-00662, Exhibit 1001, U.S. Pat. No. 10,599,844 to Schmidtler et al., 15 pgs.
*Trend Micro, Inc.* v. *Webroot Inc.*, PTAB Case No. IPR2023-00662, Exhibit 1002, Expert Declaration of Dr. Seth Nielson, 152 pgs.
*Trend Micro, Inc.* v. *Webroot Inc.*, PTAB Case No. IPR2023-00662, Exhibit 1003, Gil Tahan, et al., Mal-ID: Automatic Malware Detection Using Common Segment Analysis and Meta-Features, Journal of Machine Learning 13, 949- 979, Apr. 13, 2012, 31 pgs.

*Trend Micro, Inc.* v. *Webroot Inc.*, PTAB Case No. IPR2023-00662, Exhibit 1004, Eitan Menahem, Improving Malware Detection by Applying Multi- Inducer Ensemble, Computational Statistics & Data Analysis, 53, 2009, 1483-1494, 12 pgs.
*Trend Micro, Inc.* v. *Webroot Inc.*, PTAB Case No. IPR2023-00662, Exhibit 1005, U.S. Published Patent Application No. 2009/0254992 Schultz, 20 pgs.
*Trend Micro, Inc.* v. *Webroot Inc.*, PTAB Case No. IPR2023-00662, Exhibit 1006, Curriculum Vitae of Seth James Nielson, Ph.D., 15 pgs.
*Trend Micro, Inc.* v. *Webroot Inc.*, PTAB Case No. IPR2023-00662, Exhibit 1007, Prosecution history of U.S. Pat. No. 10,599,844, 456 pgs.
*Trend Micro, Inc.* v. *Webroot Inc.*, PTAB Case No. IPR2023-00662, Exhibit 1008, J. Zico Kolter, Learning to Detect and Classify Malicious Executables in the Wild, Journal of Machine Learning Research, 7, 2721-2744, Dec. 2006, 24 pgs.
*Trend Micro, Inc.* v. *Webroot Inc.*, PTAB Case No. IPR2023-00662, Exhibit 1009, Srinivas Mukkamala, Intrusion detection using an ensemble of intelligent paradigms, Journal of Network and Computer Applications, 28, 167-182, 2005, 15 pgs.
*Trend Micro, Inc.* v. *Webroot Inc.*, PTAB Case No. IPR2023-00662, Exhibit 1010, Stuart J. Russell, et al., Artificial Intelligence, A Modern Approach, Second Edition, Kernel Machines, ch. 20.6, Pearson Education, Inc., NJ, copyright 2003, 5 pgs.
*Trend Micro, Inc.* v. *Webroot Inc.*, PTAB Case No. IPR2023-00662, Exhibit 1011, Lars Buitinck, Giles Louppe, Mathieu Blondel, et al., "API design for machine learning software: Experiences from the scikit-learn project", Sep. 2013, 16 pgs.
*Trend Micro, Inc.* v. *Webroot Inc.*, PTAB Case No. IPR2023-00662, Exhibit 1012, Y. Ye, L. Chen, D. Wang, T. Li, Q. Jiang, and M. Zhao, SBMDS: an interpretable string based malware detection system using SVM ensemble with bagging, Journal in Computer Virology, 5:283-293, Nov. 26, 208, 12 pgs.
*Trend Micro, Inc.* v. *Webroot Inc.*, PTAB Case No. IPR2023-00662, Exhibit 1013, O. Henchiri and N. Japkowicz, A Feature Selection and Evaluation Scheme for Computer Virus Detection, Proceedings of the Sixth Int'l Conference on Data Mining (ICDM' 06), pp. 891-895.
*Trend Micro, Inc.* v. *Webroot Inc.*, PTAB Case No. IPR2023-00662, Exhibit 1014, J. Dai, R. Guha, and J. Lee, Efficient Virus Detection Using Dynamic Instruction Sequences, Journal of Computers, vol. 4, No. 5, May 2009, pp. 405-414.
*Trend Micro, Inc.* v. *Webroot Inc.*, PTAB Case No. IPR2023-00662, Exhibit 1015, J. Z. Kolter, "Learning to Detect Malicious Executables in the Wild", Proceedings of the Tenth Acm Sigkdd Int'l Conf. on Knowledge Discovery and Data Mining, 2004, 9 pgs.
*Trend Micro, Inc.* v. *Webroot Inc.*, PTAB Case No. IPR2023-00662, Exhibit 1016, T. Joachims, Advances in Kernel Methods, Making Large-Scale SVM Learning Practical, MIT Press, 1999, pp. 169-184.
*Trend Micro, Inc.* v. *Webroot Inc.*, PTAB Case No. IPR2023-00662, Exhibit 1017, Y. Ye, Hierarchical Associative Classifier (HAC) for Malware Detection from the Large and Imbalanced Gray List, Journal of Intelligent Information Systems, 35:1-20, 2010, 21 pgs.
*Trend Micro, Inc.* v. *Webroot Inc.*, PTAB Case No. IPR2023-00662, Exhibit 1018, Y. Elovici, A. Shabtai, R. Moskovitch, G. Tahan, and C. Glezer, Applying Machine Learning Techniques for Detection of Malicious Code in Network Traffic, 2007: Advances in Artificial Intelligence, pp. 44-50, 8 pgs.
*Trend Micro, Inc.* v. *Webroot Inc.*, PTAB Case No. IPR2023-00662, Exhibit 1019, Declaration of Ingrid Hsieh-Yee, Ph.D., 98 pgs.
*Trend Micro, Inc.* v. *Webroot Inc.*, PTAB Case No. IPR2023-00662, Patent Owner Open Text Inc.'s Mandatory Notices Pursuant to 37 CFR § 42.8(b), Mar. 24, 2023, 8 pgs.
*Trend Micro, Inc.* v. *Webroot Inc.*, PTAB Case No. IPR2023-00662, Notice of Filing Date Accorded to Petition and Time for Filing Patent Owner Preliminary Response, Apr. 17, 2023, 5 pgs.
*Sophos Ltd. and Sophos Inc.* v. *Webroot Inc.*, PTAB Case No. IPR2023-00528, Patent Owner Open Text Inc.'s Mandatory Notices Pursuant to 37 CFR § 42.8(b), Mar. 24, 2023, 7 pgs.

(56)        References Cited

OTHER PUBLICATIONS

*Sophos Ltd. and Sophos Inc.* v. *Webroot Inc.*, PTAB Case No. IPR2023-00528, Notice of Filing Date Accorded to Petition and Time for Filing Patent Owner Preliminary Response, Feb. 16, 2023, 6 pgs.

*Sophos Ltd. and Sophos Inc.* v. *Webroot Inc.*, PTAB Case No. PGR2023-00031, Petition for Post-Grant Review of U.S. Pat. No. 11,409,869, May 8, 2023, 119 pgs.

*Sophos Ltd. and Sophos Inc.* v. *Webroot Inc.*, PTAB Case No. PGR2023-00031, Exhibit 1001: U.S. Pat. No. 11,409,869, 16 pgs.

*Sophos Ltd. and Sophos Inc.* v. *Webroot Inc.*, PTAB Case No. PGR2023-00031, Exhibit 1002: File History for U.S. Pat. No. 11,409,869, 347 pgs.

*Sophos Ltd. and Sophos Inc.* v. *Webroot Inc.*, PTAB Case No. PGR2023-00031, Exhibit 1003: File History for U.S. Pat. No. 10,599,844, 456 pgs.

*Sophos Ltd. and Sophos Inc.* v. *Webroot Inc.*, PTAB Case No. PGR2023-00031, Exhibit 1004: Declaration of Dr. Gene Tsudik, 192 pgs.

*Sophos Ltd. and Sophos Inc.* v. *Webroot Inc.*, PTAB Case No. PGR2023-00031, Exhibit 1005: U.S. Patent Appl. Pub. No. 2015/0213376 Ideses, 19 pgs.

*Sophos Ltd. and Sophos Inc.* v. *Webroot Inc.*, PTAB Case No. PGR2023-00031, Exhibit 1006: Japanese Patent Appl. Pub. No. 2012027710A Mori and Certified Translation Thereof, 27 pgs.

*Sophos Ltd. and Sophos Inc.* v. *Webroot Inc.*, PTAB Case No. PGR2023-00031, Exhibit 1007: Litigation Claim Construction Order (D.I. 236), 29 pgs.

*Sophos Ltd. and Sophos Inc.* v. *Webroot Inc.*, PTAB Case No. PGR2023-00031, Exhibit 1008: Litigation Opening Claim Construction Brief (D.I. 263), 69 pgs.

*Sophos Ltd. and Sophos Inc.* v. *Webroot Inc.*, PTAB Case No. PGR2023-00031, Exhibit 1009: Litigation Responsive Claim Construction Brief (D.I. 304), 70 pgs.

*Sophos Ltd. and Sophos Inc.* v. *Webroot Inc.*, PTAB Case No. PGR2023-00031, Exhibit 1010: Litigation Joint Stipulation Reserving Appellate Rights (D.I. 260), 9 pgs.

*Sophos Ltd. and Sophos Inc.* v. *Webroot Inc.*, PTAB Case No. PGR2023-00031, Exhibit 1011: Monnappa KA, Learning Malware Analysis (2018), 9 pgs.

*Sophos Ltd. and Sophos Inc.* v. *Webroot Inc.*, PTAB Case No. PGR2023-00031, Exhibit 1012: Michael Sikorski & Andrew Honig, Practical Malware Analysis (2012), 12 pgs.

*Sophos Ltd. and Sophos Inc.* v. *Webroot Inc.*, PTAB Case No. PGR2023-00031, Exhibit 1013: John C. Platt, Probabilistic Outputs for Support Vector Machines and Comparisons to Regularized Likelihood Methods, in Advances in Large Margin Classifiers (Alexander J. Smola et al., eds. 2000), 11 pgs.

*Sophos Ltd. and Sophos Inc.* v. *Webroot Inc.*, PTAB Case No. PGR2023- 00031, Exhibit 1014: Wang et al., Detecting Unknown Malicious Executables Using Portable Executable Headers, Fifth International Joint Conference on Inc, Ims and IDC, 278-84 (2009), 7 pgs.

*Sophos Ltd. and Sophos Inc.* v. *Webroot Inc.*, PTAB Case No. PGR2023-00031, Exhibit 1015: Virus Bulletin (Nov. 1990), 24 pgs.

*Sophos Ltd. and Sophos Inc.* v. *Webroot Inc.*, PTAB Case No. PGR2023-00031, Exhibit 1016: U.S. Pat. No. 8,709,924, 17 pgs.

*Sophos Ltd. and Sophos Inc.* v. *Webroot Inc.*, PTAB Case No. PGR2023-00031, Exhibit 1017: U.S. Pat. No. 9,465,940, 14 pgs.

*Sophos Ltd. and Sophos Inc.* v. *Webroot Inc.*, PTAB Case No. PGR2023-00031, Exhibit 1018: D. Devi & S. Nandi, Detection of Packed Malware, in Proceedings of the First International Conference on Security of Internet of Things (SecurIT '12), Association for Computing Machinery, New York, NY, USA, 22-26 (2012), 1 pg.

*Sophos Ltd. and Sophos Inc.* v. *Webroot Inc.*, PTAB Case No. PGR2023-00031, Exhibit 1019: Excerpt from Transcript of Motions Hearing, *Webroot Inc. et al.* v. *AO Kaspersky Lab et al.*, No. 6:22-cv-00243 (W.D. Tex. Dec. 9, 2022), 3 pgs.

*Sophos Ltd. and Sophos Inc.* v. *Webroot Inc.*, PTAB Case No. PGR2023-00031, Exhibit 1020: Shabtai et al., Detection of malicious code by applying machine learning classifiers on static features: A state-of-the-art survey, Information Security Technical Report, 16-29 (2009), 14 pgs.

*Sophos Ltd. and Sophos Inc.* v. *Webroot Inc.*, PTAB Case No. PGR2023-00031, Exhibit 1021: U.S. Patent Appl. Pub. No. 2010/0293273, 14 pgs.

*Sophos Ltd. and Sophos Inc.* v. *Webroot Inc.*, PTAB Case No. PGR2023-00031, Exhibit 1022: U.S. Patent Appl. Pub. No. 2010/0082642, 14 pgs.

*Sophos Ltd. and Sophos Inc.* v. *Webroot Inc.*, PTAB Case No. PGR2023-00031, Exhibit 1023: Defendant Sophos Ltd.'s Stipulation Regarding Invalidity Contentions for U.S. Pat. No. 11,409,869, 4 pgs.

Patent Owner's Preliminary Response, *Sophos Ltd. and Sophos Inc.* v. *Webroot Inc.*, PTAB Case No. IPR2023-00528, May 16, 2023, 64 pgs.

Exhibit 2001: Declaration Of Sam Malek, Ph.D., *Sophos Ltd. and Sophos Inc.* v. *Webroot Inc.*, PTAB Case No. IPR2023-00528, May 16, 2023, 45 pgs.

Exhibit 2002: Curriculum Vitae of Sam Malek, Ph.D., *Sophos Ltd. and Sophos Inc.* v. *Webroot Inc.*, PTAB Case No. IPR2023-00528, May 16, 2023, 36 pgs.

Exhibit 2003: *Webroot, Inc., Open Text Inc.,* v. *AO Kaspersky Lab et al.*, Case No. 6:22-cv-00243-ADA-DTG, Order Granting Third Amended Scheduling Order, Dkt. 142 (W.D. Tex., Dec. 27, 2022), *Sophos Ltd. and Sophos Inc.* v. *Webroot Inc.*, PTAB Case No. IPR2023-00528, May 16, 2023, 9 pgs.

Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), *Sophos Ltd. and Sophos Inc.* v. *Webroot Inc.*, PTAB Case No. IPR2023-00528, May 16, 2023, 7 pgs.

Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), *Sophos Ltd. and Sophos Inc.* v. *Webroot Inc.*, PTAB Case No. IPR2023-00528, May 16, 2023, 7 pgs.

Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), *Sophos Ltd. and Sophos Inc.* v. *Webroot Inc.*, PTAB Case No. IPR2023-00528, May 16, 2023, 8 pgs.

Exhibit 2007: *Webroot, Inc. and Open Text Inc.,* v. *AO Kaspersky Lab et al.*, Case No. 6:22-cv-243-ADA-DTG, Claim Construction Order, Dkt. 236 (W.D. Tex. Mar. 16, 2023), *Sophos Ltd. and Sophos Inc.* v. *Webroot Inc.*, PTAB Case No. IPR2023-00528, May 16, 2023, 20 pgs.

Exhibit 2008: Dani Kass, "Catching Up On Patent Litigation With Judge Albright" (Law360 Mar. 14, 2023); https://www.law360.com/pulse/articles/1582438/print?section=pulse/courts, *Sophos Ltd. and Sophos Inc.* v. *Webroot Inc.*, PTAB Case No. IPR2023-00528, May 16, 2023, 3 pgs.

Exhibit 2009: *Webroot, Inc., Open Text Inc.,* v. *AO Kaspersky Lab et al.*, Case No. 6:22-cv-00243-ADA-DTG, Order Granting Third Amended Scheduling Order, Dkt. 142 (W.D. Tex., Dec. 27, 2022), *Sophos Ltd. and Sophos Inc.* v. *Webroot Inc.*, PTAB Case No. IPR2023-00528, May 16, 2023, 9 pgs.

Exhibit 2010: United States Courts, Statistics & Reports, Federal Court Management Statistics-Comparison Within Circuit-During the 12-Month Period Ending Jun. 30, 2022, "Comparison of Districts Within the First Circuit—12-Month Period Ending Jun. 30, 2022," at https://www.uscourts.gov/sites/default/files/fcms_na_distcomparison0630.2022_0.pdf, *Sophos Ltd. and Sophos Inc.* v. *Webroot Inc.*, PTAB Case No. IPR2023-00528, May 16, 2023, 11 pgs.

Exhibit 2011: *Webroot, Inc. and Open Text Inc.,* v. *Sophos Ltd.*, Case No. 6:22- CV-00240-ADA, Complaint for Patent Infringement, Dkt. 1 (W.D. Tex., Mar. 4, 2022), *Sophos Ltd. and Sophos Inc.* v. *Webroot Inc.*, PTAB Case No. IPR2023-00528, May 16, 2023, 144 pgs.

Exhibit 2012: *Webroot, Inc. and Open Text Inc.,* v. *ForcePoint LLC*, Case No. 6:22-cv-00342-ADA-DTG, Defendant ForcePoint LLC's

(56) References Cited

OTHER PUBLICATIONS

Prelimi-nary Invalidity Contentions (W.D. Tex., Sep. 13, 2022) (excerpted), *Sophos Ltd. and Sophos Inc.* v. *Webroot Inc.*, PTAB Case No. IPR2023-00528, May 16, 2023, 149 pgs.

Exhibit 2013: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022) (excerpted), *Sophos Ltd. and Sophos Inc.* v. *Webroot Inc.*, PTAB Case No. IPR2023-00528, May 16, 2023, 127 pgs.

Exhibit 2014: *Webroot, Inc. and Open Text Inc.*, v. *Trend Micro Inc.*, Case No. 6:22-cv-00239-ADA-DTG, Defendant's Preliminary Invalidity Contentions (W.D. Tex., Sep. 13, 2022) (excerpted), *Sophos Ltd. and Sophos Inc.* v. *Webroot Inc.*, PTAB Case No. IPR2023-00528, May 16, 2023, 125 pgs.

Exhibit 2015: *Webroot, Inc. and Open Text Inc.*, v. *AO Kaspersky Lab*, Case No. 6:22-cv-00243-ADA-DTG, Defendant's Preliminary Invalidity Contentions Appendix A (W.D. Tex., Sep. 14, 2022) (excerpted), *Sophos Ltd. and Sophos Inc.* v. *Webroot Inc.*, PTAB Case No. IPR2023-00528, May 16, 2023, 8 pgs.

Exhibit 2016: *Webroot, Inc. and Open Text Inc.*, v. *CrowdStrike, Inc. and CrowdStrike Holdings, Inc.*, Case No. 6:22-cv-00241-ADA-DTG, Defendant's Preliminary Invalidity Contentions (W.D. Tex., Sep. 13, 2022) (excerpted), *Sophos Ltd. and Sophos Inc.* v. *Webroot Inc.*, PTAB Case No. IPR2023-00528, May 16, 2023, 62 pgs.

Patent Owner Open Text Inc.'s Mandatory Notices Pursuant to 37 CFR § 42.8(b), *Sophos Ltd. and Sophos Inc.* v. *Webroot Inc.*, PTAB Case No. PGR2023-00031, May 30, 2023, 9 pgs.

Notice of Filing Date Accorded to Petition and Time for Filing Patent Owner Preliminary Response, *Sophos Ltd. and Sophos Inc.* v. *Webroot Inc.*, PTAB Case No. PGR2023-00031, Jun. 6, 2023, 6 pgs.

Crowdstrike, Inc. v. Webroot Inc., PTAB Case No. IPR2023-00289, Petition for Inter Partes Review of U.S. Pat. No. 8,418,250, Dec. 29, 2022, 75 pgs.

*Crowdstrike, Inc.* v. *Webroot Inc.*, PTAB Case No. IPR2023-00289, Exhibit 1001: U.S. Pat. No. 8,418,250 to Morris, 17 pgs.

*Crowdstrike, Inc.* v. *Webroot Inc.*, PTAB Case No. IPR2023-00289, Exhibit 1002: File History of U.S. Pat. No. 8,418,250, 888 pgs.

*Crowdstrike, Inc.* v. *Webroot Inc.*, PTAB Case No. IPR2023-00289, Exhibit 1003: Declaration of Dr. Wenke Lee, 171 pgs.

*Crowdstrike, Inc.* v. *Webroot Inc.*, PTAB Case No. IPR2023-00289, Exhibit 1004: U.S. Patent Application Publication No. 2005/0210035 A1 Kester, 42 pgs.

*Crowdstrike, Inc.* v. *Webroot Inc.*, PTAB Case No. IPR2023-00289, Exhibit 1005: U.S. Pat. No. 7,225,343 Honig, 22 pgs.

*Crowdstrike, Inc.* v. *Webroot Inc.*, PTAB Case No. IPR2023-00289, Exhibit 1006: U.S. Pat. No. 7,594,272 Kennedy, 10 pgs.

*Crowdstrike, Inc.* v. *Webroot Inc.*, PTAB Case No. IPR2023-00289, Exhibit 1007: Plaintiff's Opposition Markman Brief, 22-cv-00243 WDTX,, No. 98, Nov. 18, 2022, 86 pgs.

*Crowdstrike, Inc.* v. *Webroot Inc.*, PTAB Case No. IPR2023-00289, Exhibit 1010: Defendants' Opening Markman Brief, 22-cv-00243 WDTX,, No. 86, Oct. 28, 2022, 84 pgs.

*Crowdstrike, Inc.* v. *Webroot Inc.*, PTAB Case No. IPR2023-00289, Exhibit 1011: Intrusion Detection with Unlabeled Data Using Clustering by Leonid Portnoy, et al., 25 pgs.

*Crowdstrike, Inc.* v. *Webroot Inc.*, PTAB Case No. IPR2023-00289, Exhibit 1012: U.S. Pat. No. 6,944,772 Dozortsev, 10 pgs.

*Crowdstrike, Inc.* v. *Webroot Inc.*, PTAB Case No. IPR2023-00289, Exhibit 1013: U.S. Pat. No. 6,772,363 Chess, 14 pgs.

*Crowdstrike, Inc.* v. *Webroot Inc.*, PTAB Case No. IPR2023-00289, Exhibit 1014: WO 2002/033525 Chuang, 18 pgs.

*Crowdstrike, Inc.* v. *Webroot Inc.*, PTAB Case No. IPR2023-00289, Exhibit 1015: EP 1,549,012 De Spiegeleer, 19 pgs.

*Crowdstrike, Inc.* v. *Webroot Inc.*, PTAB Case No. IPR2023-00289, Exhibit 1016: EP 1,280,040 Hinchliffe, 17 pgs.

*Crowdstrike, Inc.* v. *Webroot Inc.*, PTAB Case No. IPR2023-00289, Exhibit 1017: U.S. Patent Publication No. 2004/0153644 McCorkendale, 15 pgs.

*Crowdstrike, Inc.* v. *Webroot Inc.*, PTAB Case No. IPR2023-00289, Exhibit 1018: U.S. Pat. No. 7,516,476 Kraemer, 13 pgs.

*Crowdstrike, Inc.* v. *Webroot Inc.*, PTAB Case No. IPR2023-00289, Exhibit 1019: Harold S. Javitz et al., The NIDES Statistical Component: Description and Justification, Mar. 7, 1994, 52 pgs.

*Crowdstrike, Inc.* v. *Webroot Inc.*, PTAB Case No. IPR2023-00289, Exhibit 1020: U.S. Pat. No. 7,448,084 Apap, 17 pgs.

*Crowdstrike, Inc.* v. *Webroot Inc.*, PTAB Case No. IPR2023-00289, Exhibit 1021: Order Granting Third Amended Scheduling Order, 22-cv-00243, WDTX, No. 142, Dec. 27, 2022, 9 pgs.

*Crowdstrike, Inc.* v. *Webroot Inc.*, PTAB Case No. IPR2023-00289, Patent Owner's Preliminary Response, Dec. 29, 2022, 82 pgs.

*Crowdstrike, Inc.* v. *Webroot Inc.*, PTAB Case No. IPR2023-00289, Exhibit 2001: Declaration of Professor Nenad Medvidovic, Ph.D., 76 pgs.

*Crowdstrike, Inc.* v. *Webroot Inc.*, PTAB Case No. IPR2023-00289, Exhibit 2002: Curriculum Vitae of Professor Nenad Medvidovic, Ph.D., 71 pgs.

*Crowdstrike, Inc.* v. *Webroot Inc.*, PTAB Case No. IPR2023-00289, Exhibit 2003: *Webroot, Inc. and Open Text Inc.* v. *CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.

*Crowdstrike, Inc.* v. *Webroot Inc.*, PTAB Case No. IPR2023-00289, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Crowdstrike, Inc.* v. *Webroot Inc.*, PTAB Case No. IPR2023-00289, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Crowdstrike, Inc.* v. *Webroot Inc.*, PTAB Case No. IPR2023-00289, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Crowdstrike, Inc.* v. *Webroot Inc.*, PTAB Case No. IPR2023-00289, Exhibit 2007: *Webroot, Inc. and Open Text Inc.* v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.

*Crowdstrike, Inc.* v. *Webroot Inc.*, PTAB Case No. IPR2023-00289, Exhibit 2008: Dani Kass, "Catching Up On Patent Litigation With Judge Albright" (Law360 Mar. 14, 2023) at https://www.law360.com/pulse/articles/1582438/print?sec-tion=pulse/courts, 3.

*Crowdstrike, Inc.* v. *Webroot Inc.*, PTAB Case No. IPR2023-00289, Exhibit 2009: *Webroot, Inc. and Open Text Inc.* v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.

*Crowdstrike, Inc.* v. *Webroot Inc.*, PTAB Case No. IPR2023-00289, Exhibit 2010: *Webroot, Inc. and Open Text Inc.* v. *Sophos Ltd.*, Case No. 6:22-cv-00240-ADA-DTG, Minute Entry for proceedings held before Judge Derek T. Gilliland, Notice of Electronic Filing, Dkt. 102, (W.D. Tex., Mar. 7, 2023), 3 pgs.

*Crowdstrike, Inc.* v. *Webroot Inc.*, PTAB Case No. IPR2023-00289, Exhibit 2011: *Webroot, Inc. and Open Text Inc.* v. *AO Kaspersky Lab et al.*, Case No. 6:22-cv-243-ADA-DTG, Scheduling Order, Dkt. 39 (W.D. Tex. Aug. 17, 2022), 7 pgs.

*Crowdstrike, Inc.* v. *Webroot Inc.*, PTAB Case No. IPR2023-00289, Exhibit 2012: *Webroot, Inc. and Open Text Inc.* v. *AO Kaspersky Lab et al.*, Case No. 6:22-cv-243-ADA-DTG, Claim Construction Order, Dkt. 236 (W.D. Tex. Mar. 16, 2023), 20 pgs.

*Crowdstrike, Inc.* v. *Webroot Inc.*, PTAB Case No. IPR2023-00289, Exhibit 2013: *Webroot, Inc. and Open Text Inc.* v. *Sophos Ltd.*, Case No. 6:22-cv-00240-ADA-DTG, Defendant Sophos Ltd.'s Preliminary Invalidity Contentions (W.D. Tex., Sep. 13, 2022) (excerpted), 9 pgs.

(56) References Cited

OTHER PUBLICATIONS

*Crowdstrike, Inc.* v. *Webroot Inc.*, PTAB Case No. IPR2023-00289, Exhibit 2014: *Webroot, Inc. and Open Text Inc.* v. *Trend Micro, Inc.*, Case No. 6:22-cv-00239-ADA-DTG, Defendant's Preliminary Invalidity Contentions (W.D. Tex., Sep. 13, 2022) (excerpted), 27 pgs.

*Crowdstrike, Inc.* v. *Webroot Inc.*, PTAB Case No. IPR2023-00289, Exhibit 2015: Ex Parte James M. Brennan, et al., Appeal 2021-003606, U.S. Appl. No. 15/285,875, Decision On Appeal Statement of the Case (PTAB Jul. 26, 2022), 10 pgs.

*Crowdstrike, Inc.* v. *Webroot Inc.*, PTAB Case No. IPR2023-00289, Exhibit 2016: *Webroot, Inc. and Open Text Inc.* v. *CrowdStrike, Inc. and CrowdStrike Holdings, Inc.*, Case No. 6:22-cv-00241-ADA, Complaint for Patent Infringement, Dkt. 1 (W.D. Tex., Mar. 4, 2022), 141 pgs.

*Crowdstrike, Inc.* v. *Webroot Inc.*, PTAB Case No. IPR2023-00289, Exhibit 2017: *Webroot, Inc. and Open Text Inc.* v. *AO Kaspersky Lab et al.*, Case No. 6:22-cv-243-ADA-DTG, Plaintiffs' SurReply Claim Construction Brief, Dkt. 147 (W.D. Tex. Jan. 6, 2023) (excerpted), 21 pgs.

*Crowdstrike, Inc.* v. *Webroot Inc.*, PTAB Case No. IPR2023-00289, Patent Owner Open Text Inc.'s Mandatory Notices Pursuant to 37 CFR § 42.8(b), Jan. 19, 2023, 5 pgs.

*Crowdstrike, Inc.* v. *Webroot Inc.*, PTAB Case No. IPR2023-00289, Patent Owner Open Text Inc.'s Notice of Filing Date Accorded to Petition and Time for Filing Patent Owner Preliminary Response, Jan. 26, 2023, 6 pgs.

*Trend Micro, Inc.* v. *Webroot Inc.*, PTAB Case No. IPR2023-00655, Petition for Inter Partes Review of U.S. Pat. No. 8,418,250, Mar. 2, 2023, 90 pgs.

*Trend Micro, Inc.* v. *Webroot Inc.*, PTAB Case No. IPR2023-00655, Exhibit 1001: U.S. Pat. No. 8,418,250 (Morris), 17 pgs.

*Trend Micro, Inc.* v. *Webroot Inc.*, PTAB Case No. IPR2023-00655, Exhibit 1002: Expert Declaration of Dr. Seth Nielson, 156 pgs.

*Trend Micro, Inc.* v. *Webroot Inc.*, PTAB Case No. IPR2023-00655, Exhibit 1003: U.S. Published Patent Application No. 2004/0111632 (Halperin), 22 pgs.

*Trend Micro, Inc.* v. *Webroot Inc.*, PTAB Case No. IPR2023-00655, Exhibit 1004: U.S. Patent No. 7,900, 194 (Mankins), 12 pgs.

*Trend Micro, Inc.* v. *Webroot Inc.*, PTAB Case No. IPR2023-00655, Exhibit 1005: Inoue, et al., "Anomaly Intrusion Detection in Dynamic Execution Environments", New Security Paradigms Workshop '02, Sep. 23-26, 2002, 32 pgs.

*Trend Micro, Inc.* v. *Webroot Inc.*, PTAB Case No. IPR2023-00655, Exhibit 1006: U.S. Pat. No. 7,694,150 (Kirby), 22 pgs.

*Trend Micro, Inc.* v. *Webroot Inc.*, PTAB Case No. IPR2023-00655, Exhibit 1007: Prosecution History of the '250 patent, 888 pgs.

*Trend Micro, Inc.* v. *Webroot Inc.*, PTAB Case No. IPR2023-00655, Exhibit 1008: U.S. Pat. No. 5,440,723 (Arnold), 29 pgs.

*Trend Micro, Inc.* v. *Webroot Inc.*, PTAB Case No. IPR2023-00655, Exhibit 1009: Fred Cohen, "Computer Viruses Theory and Experiments", 1984, 15 pgs.

*Trend Micro, Inc.* v. *Webroot Inc.*, PTAB Case No. IPR2023-00655, Exhibit 1010: Joseph A. Bank, "Java Security", Dec. 8, 1995, 11 pgs.

*Trend Micro, Inc.* v. *Webroot Inc.*, PTAB Case No. IPR2023-00655, Exhibit 1011: Curriculum Vitae of A.L. Seth Nielson, Ph.D., 15 pgs.

*Trend Micro, Inc.* v. *Webroot Inc.*, PTAB Case No. IPR2023-00655, Exhibit 1012: U.S. Patent Publication 2003/0177394 (Dozortsev), 11 pgs.

*Trend Micro, Inc.* v. *Webroot Inc.*, PTAB Case No. IPR2023-00655, Exhibit 1013: U.S. Published Patent Application No. 2004/0068652 (Carpentier et al.), 19 pgs.

*Trend Micro, Inc.* v. *Webroot Inc.*, PTAB Case No. IPR2023-00655, Patent Owner Open Text Inc.'s Mandatory Notices Pursuant to 37 CFR § 42.8(b), Mar. 23, 2023, 7 pgs.

*Trend Micro, Inc.* v. *Webroot Inc.*, PTAB Case No. IPR2023-00655, Notice of Filing Date Accorded to Petition and Time for Filing Patent Owner Preliminary Response, Apr. 17, 2023, 5 pgs.

*Sophos Ltd. and Sophos Inc.* v. *Webroot Inc.*, PTAB Case No. IPR2023-00699, Petition for Inter Partes Review of U.S. Pat. No. 8,418,250, Mar. 8, 2023, 83 pgs.

*Sophos Ltd. and Sophos Inc.* v. *Webroot Inc.*, PTAB Case No. IPR2023-00699, Exhibit 1001: U.S. Pat. No. 8,418,250, 17 pgs.

*Sophos Ltd. and Sophos Inc.* v. *Webroot Inc.*, PTAB Case No. IPR2023-00699, Exhibit 1002: File History for U.S. Pat. No. 8,418,250, 888 pgs.

*Sophos Ltd. and Sophos Inc.* v. *Webroot Inc.*, PTAB Case No. IPR2023-00699, Exhibit 1003: Complaint, *Webroot Inc et al.* v. *Sophos Ltd.*, No. 6:22-cv-240 (W.D. Tex.), 144 pgs.

*Sophos Ltd. and Sophos Inc.* v. *Webroot Inc.*, PTAB Case No. IPR2023-00699, Exhibit 1004: Declaration of Dr. Richard Newman, 85 pgs.

*Sophos Ltd. and Sophos Inc.* v. *Webroot Inc.*, PTAB Case No. IPR2023-00699, Exhibit 1005: Curriculum Vitae of Dr. Richard Newman, 13 pgs.

*Sophos Ltd. and Sophos Inc.* v. *Webroot Inc.*, PTAB Case No. IPR2023-00699, Exhibit 1006: U.S. Patent Pub. No. 2004/0111632 Halperin, 22 pgs.

*Sophos Ltd. and Sophos Inc.* v. *Webroot Inc.*, PTAB Case No. IPR2023-00699, Exhibit 1007: U.S. Pat. No. 7,694,150 Kirby, 22 pgs.

*Sophos Ltd. and Sophos Inc.* v. *Webroot Inc.*, PTAB Case No. IPR2023-00699, Exhibit 1008: U.S. Pat. No. 7,900,194 Mankins, 12 pgs.

*Sophos Ltd. and Sophos Inc.* v. *Webroot Inc.*, PTAB Case No. IPR2023-00699, Exhibit 1009: Stipulation Waiving IPR Claims in District Court Litigation, 4 pgs.

*Sophos Ltd. and Sophos Inc.* v. *Webroot Inc.*, PTAB Case No. IPR2023-00699, Exhibit 1010: S. Forrest et al., Computer Immunology, Comms. Of the ACM, vol. 40, No. 10, 1997, pp. 88-96.

*Sophos Ltd. and Sophos Inc.* v. *Webroot Inc.*, PTAB Case No. IPR2023-00699, Exhibit 1011: A Snoeren et al., *Single-Packet IP Traceback*, IEEE/ACM Trans. On Networking (TON), vol. 10, No. 6, 2002, pp. 721-734.

*Sophos Ltd. and Sophos Inc.* v. *Webroot Inc.*, PTAB Case No. IPR2023-00699, Exhibit 1012: S. Hofmeyr, *Intrusion Detection Using Sequences of System Calls*, J. Computer Security, vol. 6, Issue 3, Aug. 1998, pp. 151-180.

*Sophos Ltd. and Sophos Inc.* v. *Webroot Inc.*, PTAB Case No. IPR2023-00699, Exhibit 1013: S. Forrest et al., *A Sense of Self for Unix Processes*, Proc. 1996, IEEE Symp. on Security and Privacy, 1996, pp. 120-128.

*Sophos Ltd. and Sophos Inc.* v. *Webroot Inc.*, PTAB Case No. IPR2023-00699, Exhibit 1014: Order Granting Fourth Amended Scheduling Order, Dkt. 160, *Webroo, Inc. et al.* v. *AO Kaspersky Lab*, No. 6:22-cv-00243-ADA-DTG (W.D. Tex.), Jan. 22, 2023, 7 pgs.

*Sophos Ltd. and Sophos Inc.* v. *Webroot Inc.*, PTAB Case No. IPR2023-00699, Exhibit 1015: Excerpt from Transcript of Motions Hearing in *Webroot, Inc. et al.* v. *AO Kaspersky Lab*, No. 6:22-cv-00243-ADA-DTG (W.D. Tex.), Dec. 9, 2022, 7 pgs.

*Sophos Ltd. and Sophos Inc.* v. *Webroot Inc.*, PTAB Case No. IPR2023-00699, Exhibit 1016: Threat Graphs examples: Malware detection, Sophos Ltd., KB-000036359, https://support.sophos.com/support/s/article/KB-000036359?language=en_US (Feb. 23, 2023), 15 pgs.

*Sophos Ltd. and Sophos Inc.* v. *Webroot Inc.*, PTAB Case No. IPR2023-00699, Patent Owner Open Text Inc.'s Mandatory Notices Pursuant to 37 CFR § 42.8(b), Mar. 29, 2023, 8 pgs.

*Sophos Ltd. and Sophos Inc.* v. *Webroot Inc.*, PTAB Case No. IPR2023-00699, Notice of Filing Date Accorded to Petition and Time for Filing Patent Owner Preliminary Response, Apr. 14, 2023, 6 pgs.

*Crowdstrike, Inc.* v. *Webroot Inc.*, PTAB Case No. IPR2023-00556, Petition for Inter Partes Review of U.S. Pat. No. 8,726,389, Feb. 17, 2023, 74 pgs.

*Crowdstrike, Inc.* v. *Webroot Inc.*, PTAB Case No. IPR2023-00556, Exhibit 1001: U.S. Pat. No. 8,726,389 Morris, 17 pgs.

*Crowdstrike, Inc.* v. *Webroot Inc.*, PTAB Case No. IPR2023-00556, Exhibit 1002: File History of U.S. Pat. No. 8,726,389. 276 pgs.

(56) References Cited

OTHER PUBLICATIONS

*Crowdstrike, Inc.* v. *Webroot Inc.*, PTAB Case No. IPR2023-00556, Exhibit 1003: Declaration of Dr. Wenke Lee, 164 pgs.

*Crowdstrike, Inc.* v. *Webroot Inc.*, PTAB Case No. IPR2023-00556, Exhibit 1004: U.S. Patent Application Publication No. 2005/0210035 A1 Kester, 42 pgs.

*Crowdstrike, Inc.* v. *Webroot Inc.*, PTAB Case No. IPR2023-00556, Exhibit 1005: U.S. Pat. No. 7,594,272 Kennedy, 10 pgs.

*Crowdstrike, Inc.* v. *Webroot Inc.*, PTAB Case No. IPR2023-00556, Exhibit 1006: U.S. Pat. No. 7,225,343 Honig, 22 pgs.

*Crowdstrike, Inc.* v. *Webroot Inc.*, PTAB Case No. IPR2023-00556, Exhibit 1007: PO Opposition Markman Brief, 22-cv-00243 WDTX, No. 98, Nov. 18, 2022, 86 pgs.

*Crowdstrike, Inc.* v. *Webroot Inc.*, PTAB Case No. IPR2023-00556, Exhibit 1008: Defendants' Opening Markman Brief, 22-cv-00243 WDTX, No. 86, Oct. 28, 2022, 84 pgs.

*Crowdstrike, Inc.* v. *Webroot Inc.*, PTAB Case No. IPR2023-00556, Exhibit 1009: Order Granting Fourth Amended Scheduling Order, 22-cv-00243, WDTX, No. 160, Jan. 22, 2023, 7 pgs.

*Crowdstrike, Inc.* v. *Webroot Inc.*, PTAB Case No. IPR2023-00556, Exhibit 1010: SANS Institute (2000-2005) Host—vs. Network-Based Intrusion Detection Systems, 11 pgs.

*Crowdstrike, Inc.* v. *Webroot Inc.*, PTAB Case No. IPR2023-00556, Exhibit 1011: Intrusion Detection with Unlabeled Data Using Clustering by Leonid Portnoy, et al., 25 pgs.

*Crowdstrike, Inc.* v. *Webroot Inc.*, PTAB Case No. IPR2023-00556, Exhibit 1012: U.S. Pat. No. 6,944,772 Dozortsev, 10 pgs.

*Crowdstrike, Inc.* v. *Webroot Inc.*, PTAB Case No. IPR2023-00556, Exhibit 1013: U.S. Pat. No. 6,772,346 Chess, 14 pgs.

*Crowdstrike, Inc.* v. *Webroot Inc.*, PTAB Case No. IPR2023-00556, Exhibit 1014: WO 2002/033525 Chuang, 18 pgs.

*Crowdstrike, Inc.* v. *Webroot Inc.*, PTAB Case No. IPR2023-00556, Exhibit 1015: EP 1,549,012 De Spiegeleer, 19 pgs.

*Crowdstrike, Inc.* v. *Webroot Inc.*, PTAB Case No. IPR2023-00556, Exhibit 1016: EP 1,280,040 Hinchliffe), 17 pgs.

*Crowdstrike, Inc.* v. *Webroot Inc.*, PTAB Case No. IPR2023-00556, Exhibit 1017: U.S. Pat. No. 7,089,428 Farley), 35 pgs.

*Crowdstrike, Inc.* v. *Webroot Inc.*, PTAB Case No. IPR2023-00556, Exhibit 1018: U.S. Patent Publication No. 2004/0153644 McCorkendale, 15 pgs.

*Crowdstrike, Inc.* v. *Webroot Inc.*, PTAB Case No. IPR2023-00556, Exhibit 1019: The NIDES Statistical Component: Description and Justification by Harold S. Javitz et al., Mar. 7, 1994, 52 pgs.

*Crowdstrike, Inc.* v. *Webroot Inc.*, PTAB Case No. IPR2023-00556, Exhibit 1020: U.S. Pat. No. 7,516476 Kraemer, 13 pgs.

*Crowdstrike, Inc.* v. *Webroot Inc.*, PTAB Case No. IPR2023-00556, Exhibit 1021: U.S. Pat. No. 8,418,250 Morris, 17 pgs.

*Crowdstrike, Inc.* v. *Webroot Inc.*, PTAB Case No. IPR2023-00556, Exhibit 1022: U.S. Pat. No. 10,284,591 Giuliani, 14 pgs.

*Crowdstrike, Inc.* v. *Webroot Inc.*, PTAB Case No. IPR2023-00556, Patent Owner Open Text Inc.'s Mandatory Notices Pursuant to 37 CFR § 42.8(b), Mar. 10, 2023, 8 pgs.

*Crowdstrike, Inc.* v. *Webroot Inc.*, PTAB Case No. IPR2023-00556, Notice of Filing Date Accorded to Petition and Time for Filing Patent Owner Preliminary Response, Mar. 16, 2023, 5 pgs.

*Sophos Ltd. and Sophos Inc.* v. *Webroot Inc.*, PTAB Case No. IPR2023-00633, Petition for Inter Partes Review of U.S. Pat. No. 8,726,389, Mar. 3, 2023, 85 pgs.

*Sophos Ltd. and Sophos Inc.* v. *Webroot Inc.*, PTAB Case No. IPR2023-00633, Exhibit 1001: U.S. Pat. No. 8,726,389, 17 pgs.

*Sophos Ltd. and Sophos Inc.* v. *Webroot Inc.*, PTAB Case No. IPR2023-00633, Exhibit 1002: File History for U.S. Pat. No. 8,726,389, 275 pgs.

*Sophos Ltd. and Sophos Inc.* v. *Webroot Inc.*, PTAB Case No. IPR2023-00633, Exhibit 1003: Complaint, *Webroot Inc et al.* v. *Sophos Ltd.*, No. 6:22-cv-240 (W.D. Tex), 144 pgs.

*Sophos Ltd. and Sophos Inc.* v. *Webroot Inc.*, PTAB Case No. IPR2023-00633, Exhibit 1004: Declaration of Dr. Richard Newman, 91 pgs.

*Sophos Ltd. and Sophos Inc.* v. *Webroot Inc.*, PTAB Case No. IPR2023-00633, Exhibit 1005: Curriculum Vitae of Dr. Richard Newman, 13 pgs.

*Sophos Ltd. and Sophos Inc.* v. *Webroot Inc.*, PTAB Case No. IPR2023-00633, Exhibit 1006: U.S. Patent Pub. No. 2004/0111632 Halperin, 22 pgs.

*Sophos Ltd. and Sophos Inc.* v. *Webroot Inc.*, PTAB Case No. IPR2023-00633, Exhibit 1007: U.S. Pat. No. 7,694,150 Kirby, 22 pgs.

*Sophos Ltd. and Sophos Inc.* v. *Webroot Inc.*, PTAB Case No. IPR2023-00633, Exhibit 1008: U.S. Pat. No. 7,900,194 Mankins), 12 pgs.

*Sophos Ltd. and Sophos Inc.* v. *Webroot Inc.*, PTAB Case No. IPR2023-00633, Exhibit 1009: Stipulation Waiving IPR claims in District Court Litigation, 4 pgs.

*Sophos Ltd. and Sophos Inc.* v. *Webroot Inc.*, PTAB Case No. IPR2023-00633, Exhibit 1010: Sophos Central Admin, Threat Graph Analysis, Sophos Ltd., at https://docs.sophos.com/centra/customer/help/en-us/ManageYourProducts/ThreatAnalysisCenter/ThreatGraphs/index.html (last visited Feb. 15, 2023), 1 pg.

*Sophos Ltd. and Sophos Inc.* v. *Webroot Inc.*, PTAB Case No. IPR2023-00633, Exhibit 1011: Sophos Central Admin, Threat Graph Analysis, Sophos Ltd., at https://docs.sophos.com/centra/customer/help/en-us/ManageYourProducts/ThreatAnalysisCenter/ThreatGraphs/ThreatAnalysisD etails/index.html (last visited Feb. 15, 2023), 5 pgs.

*Sophos Ltd. and Sophos Inc.* v. *Webroot Inc.*, PTAB Case No. IPR2023-00633, Exhibit 1012: Excerpt from Transcript of Motions Hearing in *Webroot, Inc. et al.* v. *AO Kaspersky Lab*, No. 6:22-cv-00243-ADA-DTG (W.D. Tex.), Dec. 9, 2022, 7 pgs.

*Sophos Ltd. and Sophos Inc.* v. *Webroot Inc.*, PTAB Case No. IPR2023-00633, Exhibit 1013: Order Granting Fourth Amended Scheduling Order, Dkt. 160, *Webroot, Inc. et al.* v. *AO Kaspersky Lab*, No. 6:22-cv-00243-ADA-DTG (W.D. Tex.), Jan. 22, 2023, 7 pgs.

*Sophos Ltd. and Sophos Inc.* v. *Webroot Inc.*, PTAB Case No. IPR2023-00633, Patent Owner Open Text Inc.'s Mandatory Notices Pursuant to 37 CFR § 42.8(b), Mar. 24, 2023, 8 pgs.

*Sophos Ltd. and Sophos Inc.* v. *Webroot Inc.*, PTAB Case No. IPR2023-00633, Notice of Filing Date Accorded to Petition and Time for Filing Patent Owner Preliminary Response, Mar. 16, 2023, 5 pgs.

*Sophos Ltd. and Sophos Inc.* v. *Webroot Inc.*, PTAB Case No. IPR2023-00491, Petition for Inter Partes Review of U.S. Pat. No. 9,413,721, Jan. 20, 2023, 81 pgs.

*Sophos Ltd. and Sophos Inc.* v. *Webroot Inc.*, PTAB Case No. IPR2023-00491, Exhibit 1001: U.S. Pat. No. 9,413,721 ('721 Patent), 30 pgs.

*Sophos Ltd. and Sophos Inc.* v. *Webroot Inc.*, PTAB Case No. IPR2023-00491, Exhibit 1002: File History of the '721 Patent, 683 pgs.

*Sophos Ltd. and Sophos Inc.* v. *Webroot Inc.*, PTAB Case No. IPR2023-00491, Exhibit 1003: Declaration of Dr. Richard Newman, 82 pgs.

*Sophos Ltd. and Sophos Inc.* v. *Webroot Inc.*, PTAB Case No. IPR2023-00491, Exhibit 1004: Curriculum Vitae of Dr. Richard Newman, 13 pgs.

*Sophos Ltd. and Sophos Inc.* v. *Webroot Inc.*, PTAB Case No. IPR2023-00491, Exhibit 1005: U.S. Patent Pub. No. 2006/0075504 Liu), 19 pgs.

*Sophos Ltd. and Sophos Inc.* v. *Webroot Inc.*, PTAB Case No. IPR2023-00491, Exhibit 1006: U.S. Patent Pub. No. 2008/0086773 Tuvell), 21 pgs.

*Sophos Ltd. and Sophos Inc.* v. *Webroot Inc.*, PTAB Case No. IPR2023-00491, Exhibit 1007: U.S. Patent Pub. No. 2005/0223001 Kester), 27 pgs.

*Sophos Ltd. and Sophos Inc.* v. *Webroot Inc.*, PTAB Case No. IPR2023-00491, Exhibit 1008: U.S. Pat. No. 7,392,543 Szor), 18 pgs.

*Sophos Ltd. and Sophos Inc.* v. *Webroot Inc.*, PTAB Case No. IPR2023-00491, Exhibit 1009: U.S. Patent Pub. No. 2007/0016953 Morris, 18 pgs.

(56)　　　　References Cited

OTHER PUBLICATIONS

*Sophos Ltd. and Sophos Inc.* v. *Webroot Inc.*, PTAB Case No. IPR2023-00491, Exhibit 1010: U.S. Pat. No. 7,966,650 Manring), 21 pgs.
*Sophos Ltd. and Sophos Inc.* v. *Webroot Inc.*, PTAB Case No. IPR2023-00491, Exhibit 1011: Stipulation Waiving IPR Claims in District Court Litigation, 4 pgs.
*Sophos Ltd. and Sophos Inc.* v. *Webroot Inc.*, PTAB Case No. IPR2023-00491, Exhibit 1012: Excerpt from Transcript of Motions Hearing in *Webroot, Inc. et al.* v. *AO Kaspersky Lab*, No. 6:22-cv-00243-ADA-DTG (W.D. Tex.), Dec. 9, 2022, 7 pgs.
*Sophos Ltd. and Sophos Inc.* v. *Webroot Inc.*, PTAB Case No. IPR2023-00491, Exhibit 1013: Excerpt from Henry F. Korth and Abraham Silberschatz, Database System Concepts, McGraw-Hill, New York, 2006, 72 pgs.
*Sophos Ltd. and Sophos Inc.* v. *Webroot Inc.*, PTAB Case No. IPR2023-00491, Exhibit 1014: K.J. Biba, "Integrity Considerations for Secure Computer Systems," MTR-3153, The MITRE Corporation, Apr. 1977, 68 pgs.
*Sophos Ltd. and Sophos Inc.* v. *Webroot Inc.*, PTAB Case No. IPR2023-00491, Exhibit 1015: David E. Bell and Leonard J. LaPadula, "Secure Computer Systems: Mathematical Foundations," MTR-2547, The MITRE Corporation, Nov. 1996, 33 pgs.
*Sophos Ltd. and Sophos Inc.* v. *Webroot Inc.*, PTAB Case No. IPR2023-00491, Patent Owner Open Text Inc.'s Mandatory Notices Pursuant to 37 CFR § 42.8(b), Feb. 10, 2023, 6 pgs.
*Sophos Ltd. and Sophos Inc.* v. *Webroot Inc.*, PTAB Case No. IPR2023-00491, Notice of Filing Date Accorded to Petition and Time for Filing Patent Owner Preliminary Response, Feb. 16, 2023, 6 pgs.
Patent Owner's Preliminary Response to Petition for Inter Partes Review, *Sophos Ltd. and Sophos Inc.* v. *Webroot Inc.*, PTAB Case No. IPR2023-00491, May 16, 2023, 73 pgs.
Exhibit 2001: Declaration of Professor Alessandro Orso, Ph. D., *Sophos Ltd. and Sophos Inc.* v. *Webroot Inc.*, PTAB Case No. IPR2023-00491, 56 pgs.
Exhibit 2002: Curriculum Vitae of Professor Alessandro Orso, Ph. D., *Sophos Ltd. and Sophos Inc.* v. *Webroot Inc.*, PTAB Case No. IPR2023-00491, 52 pgs.
Exhibit 2003: *Webroot, Inc., and Open Text Inc.*, v. *CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), *Sophos Ltd. and Sophos Inc.* v. *Webroot Inc.*, PTAB Case No. IPR2023-00491, 37 pgs.
Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), *Sophos Ltd. and Sophos Inc.* v. *Webroot Inc.*, PTAB Case No. IPR2023-00491, 7 pgs.
Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), *Sophos Ltd. and Sophos Inc.* v. *Webroot Inc.*, PTAB Case No. IPR2023-00491, 7 pgs.
Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), *Sophos Ltd. and Sophos Inc.* v. *Webroot Inc.*, PTAB Case No. IPR2023-00491, 8 pgs.
Exhibit 2007: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), *Sophos Ltd. and Sophos Inc.* v. *Webroot Inc.*, PTAB Case No. IPR2023-00491, 20 pgs.
Exhibit 2008: *Webroot, Inc. and Open Text Inc.*, v. *AO Kaspersky Lab et al.*, Case No. 6:22-cv-00243-ADA-DTG, Scheduling Order, Dkt. 50 (W.D. Tex., Sep. 28, 2022), *Sophos Ltd. and Sophos Inc.* v. *Webroot Inc.*, PTAB Case No. IPR2023-00491, 18 pgs.

Exhibit 2009: *Open Text Inc et al.*, v. *AO Kaspersky Lab*, Case No. 6:22-cv-00243-ADA-DTG, First Amended Complaint for Patent Infringement, Dkt. 80 (W.D. Tex., Oct. 27, 2022), *Sophos Ltd. and Sophos Inc.* v. *Webroot Inc.*, PTAB Case No. IPR2023-00491, 148 pgs.
Exhibit 2010: *Webroot, Inc. and Open Text Inc.*, v. *Sophos, Ltd.*, Case No. 6:22-cv-00240-ADA-DTG, Second Amended Complaint for Patent Infringement, Dkt. 76 (W.D. Tex., Oct. 24, 2022), *Sophos Ltd. and Sophos Inc.* v. *Webroot Inc.*, PTAB Case No. IPR2023-00491, 184 pgs.
Exhibit 2011: Law360, "Catching Up on Patent Litigation with Judge Albright", *Sophos Ltd. and Sophos Inc.* v. *Webroot Inc.*, PTAB Case No. IPR2023-00491, 3 pgs.
Exhibit 2012: Jun. 30, 2022 U.S. Courts Statistics & Reports Comparison Report, *Sophos Ltd. and Sophos Inc.* v. *Webroot Inc.*, PTAB Case No. IPR2023-00491, 11 pgs.
Exhibit 2013: *Webroot, Inc. and Open Text Inc.*, v. *ForcePoint LLC*, Case No. 6:22-cv-00342-ADA-DTG, Defendant ForcePoint LLC's Preliminary Invalidity Contentions (W.D. Tex., Sep. 13, 2022), *Sophos Ltd. and Sophos Inc.* v. *Webroot Inc.*, PTAB Case No. IPR2023-00491, 149 pgs.
Exhibit 2014: U.S. Appl. No. 15/285,875, Appeal No. 2021-003606, Decision on Appeal at 7-8 (PTAB Jul. 26, 2022), *Sophos Ltd. and Sophos Inc.* v. *Webroot Inc.*, PTAB Case No. IPR2023-00491, 10 pgs.
*Crowdstrike, Inc.* v. *Webroot Inc.*, PTAB Case No. IPR2023-01051, Petition for Inter Partes Review of U.S. Pat. No. 8719932, Jun. 23, 2023, 75 pgs.
*Crowdstrike, Inc.* v. *Webroot Inc.*, PTAB Case No. IPR2023-01051, Exhibit 1001: U.S. Pat. No. 8,719,932, 12 pgs.
*Crowdstrike, Inc.* v. *Webroot Inc.*, PTAB Case No. IPR2023-01051, Exhiibit 1002: File History of U.S. Pat. No. 8,719,932, 120 pgs.
*Crowdstrike, Inc.* v. *Webroot Inc.*, PTAB Case No. IPR2023-01051, Exhibit 1003: Declaration of Markus Jakobsson, Ph.D., 98 pgs.
*Crowdstrike, Inc.* v. *Webroot Inc.*, PTAB Case No. IPR2023-01051, Exhibit 1004: U.S. Pat. No. 7,979,889, Gladstone et al., 23 pgs.
*Crowdstrike, Inc.* v. *Webroot Inc.*, PTAB Case No. IPR2023-01051, Exhiibit 1005: U.S. Pat. No. 6,775,780, Muttik, 8 pgs.
*Crowdstrike, Inc.* v. *Webroot Inc.*, PTAB Case No. IPR2023-01051, Exhiibit 1006: U.S. Pat. No. 7,093,292, Pantuso, 12 pgs.
*Crowdstrike, Inc.* v. *Webroot Inc.*, PTAB Case No. IPR2023-01051, Exhibit 1007: U.S. Pat. No. 8,321,910, English, 10 pgs.
*Crowdstrike, Inc.* v. *Webroot Inc.*, PTAB Case No. IPR2023-01051, Exhiibit 1008: Plaintiffs' Responsive Claim Construction Brief, Dkt. 304, No. 22-cv-00241 (W.D. Texas), 70 pgs.
*Crowdstrike, Inc.* v. *Webroot Inc.*, PTAB Case No. IPR2023-01051, Exhibit 1009: Opening Claim Construction Brief, Dkt. 263, No. 22-cv-00241, (W.D. Texas), 69 pgs.
*Crowdstrike, Inc.* v. *Webroot Inc.*, PTAB Case No. IPR2023-01051, Exhiibit 1010: Richard D. Schneeman, Device Driver Development for Microsoft Windows NT: Accessing Motion Control Hardware Using a Multimedia Framework, 1996, 54 pgs.
*Crowdstrike, Inc.* v. *Webroot Inc.*, PTAB Case No. IPR2023-01051, Exhibit 1011: U.S. Publication No. 20070174911, Kronenberg, 13 pgs.
*Crowdstrike, Inc.* v. *Webroot Inc.*, PTAB Case No. IPR2023-01051, Exhiibit 1012: U.S. Publication No. 20060253584, Dixon et al., 74 pgs.
*Crowdstrike, Inc.* v. *Webroot Inc.*, PTAB Case No. IPR2023-01051, Exhiibit 1013: U.S. Pat. No. 7,434,261, Costea et al., 12 pgs.
*Crowdstrike, Inc.* v. *Webroot Inc.*, PTAB Case No. IPR2023-01051, Exhibit 1014: U.S. Pat. No. 8,117,659, Hartrell et al., 16 pgs.
*Crowdstrike, Inc.* v. *Webroot Inc.*, PTAB Case No. IPR2023-01051, Exhiibit 1015: Sophos Petition for Inter Partes Review of U.S. Pat. No. 8,719,932, 86 pgs.
*Crowdstrike, Inc.* v. *Webroot Inc.*, PTAB Case No. IPR2023-01051, Exhibit 1016: No. 22-cv-00241, Dkt. 252, Order Granting Fifth Amended Scheduling Order, 9 pgs.
*Crowdstrike, Inc.* v. *Webroot Inc.*, PTAB Case No. IPR2023-01051, Exhiibit 1017: No. 22-cv-00243, Dkt. 350, Order Resetting Markman Hearing, 1 pg.
*Crowdstrike, Inc.* v. *Webroot Inc.*, PTAB Case No. IPR2023-01051, Exhiibit 1018: File History of U.S. Pat. No. 8,201,243, 423 pgs.

(56) References Cited

OTHER PUBLICATIONS

*Crowdstrike, Inc.* v. *Webroot Inc.*, PTAB Case No. IPR2023-01159, Petition for Inter Partes Review of U.S. Pat. No. 8,856,505 pursuant, 35 U.S.C. §§ 311-319, 37 CFR § 42, Jun. 30, 2023, 87 pgs.
*Crowdstrike, Inc.* v. *Webroot Inc.*, PTAB Case No. IPR2023-01159, Exhibit 1001: U.S. Pat. No. 8,856,505, 11 pgs.
*Crowdstrike, Inc.* v. *Webroot Inc.*, PTAB Case No. IPR2023-01159, Exhibit 1002: Excerpts from the Prosecution History of the '505 Patent, 351 pgs.
*Crowdstrike, Inc.* v. *Webroot Inc.*, PTAB Case No. IPR2023-01159, Exhibit 1003: Declaration of Dr. Markus Jakobsson, 128 pgs.
*Crowdstrike, Inc.* v. *Webroot Inc.*, PTAB Case No. IPR2023-01159, Exhibit 1004: U.S. Publication No. 20080005797 A1, Field, 11 pgs.
*Crowdstrike, Inc.* v. *Webroot Inc.*, PTAB Case No. IPR2023-01159, Exhibit 1005: U.S. Publication No. 20080016339 A1, Shukla, 26 pgs.
*Crowdstrike, Inc.* v. *Webroot Inc.*, PTAB Case No. IPR2023-01159, Exhibit 1006: U.S. Appl. No. 60/806,143, 54 pgs.
*Crowdstrike, Inc.* v. *Webroot Inc.*, PTAB Case No. IPR2023-01159, Exhibit 1007: U.S. Pat. No. 8,239,947 B1, Glick, 25 pgs.
*Crowdstrike, Inc.* v. *Webroot Inc.*, PTAB Case No. IPR2023-01159, Exhibit 1009: U.S. Pat. No. 7,784,098 B1, Fan, 28 pgs.
*Crowdstrike, Inc.* v. *Webroot Inc.*, PTAB Case No. IPR2023-01159, Exhibit 1010: U.S. Pat. No. 7,673,341 B2, Kramer, 16 pgs.
*Crowdstrike, Inc.* v. *Webroot Inc.*, PTAB Case No. IPR2023-01159, Exhibit 1011: Silberschatz, Operating System Concepts (2004), 71 pgs.
*Crowdstrike, Inc.* v. *Webroot Inc.*, PTAB Case No. IPR2023-01159, Exhibit 1012: *Webroot, Inc.* v. *CrowdStrike, Inc.*, Case No. 6:22-cv-00243 ADA, Docket No. 252, "Order Granting Fifth Amended Scheduling Order" (WDTX Mar. 29, 2023), 9 pgs.
*Crowdstrike, Inc.* v. *Webroot Inc.*, PTAB Case No. IPR2023-01159, Exhibit 1013: *Webroot, Inc.* v. *CrowdStrike, Inc.*, Case No. 6:22-cv-00243-ADA, Docket No. 350, "Order Resetting Markman Hearing" (WDTX Jun. 8, 2023), 1 pg.
*Crowdstrike, Inc.* v. *Webroot Inc.*, PTAB Case No. IPR2023-01159, Exhibit 1014: Memorandum: Interim Procedure for Discretionary Denials in AIA Post-Grant Proceedings with Parallel District Court Litigation, Jun. 21, 2022, 9 pgs.
*Crowdstrike, Inc.* v. *Webroot Inc.*, PTAB Case No. IPR2023-01159, Exhibit 1015: U.S. District Courts-Median Time Intervals From Filing, Disposition of Civil Cases Terminated, by District and Method of Disposition, During the 12-Month Period Ending Mar. 31, 2023, 95 pgs.
*AO Kaspersky Lab* v. *Webroot Inc.*, PTAB Case No. IPR2023-01160, Petition for Inter Partes Review under 35 U.S.C. § 312 and 37 CFR § 42.104, Jun. 29, 2023, 88 pgs.
*AO Kaspersky Lab* v. *Webroot Inc.*, PTAB Case No. IPR2023-01160, Exhibit 1001: U.S. Pat. No. 11,409,869 (issued Aug. 9, 2022), 16 pgs.
*AO Kaspersky Lab* v. *Webroot Inc.*, PTAB Case No. IPR2023-01160, Exhibit 1002: Declaration of V.S. Subrahmanian, Ph.D. under 37 C.F.R. §1.68, 145 pgs.
*AO Kaspersky Lab* v. *Webroot Inc.*, PTAB Case No. IPR2023-01160, Exhibit 1003: Curriculum Vitae of V.S. Subrahmanian, Ph.D., 77 pgs.
*AO Kaspersky Lab* v. *Webroot Inc.*, PTAB Case No. IPR2023-01160, Exhibit 1004: File History of U.S. Pat. No. 11,409,869, 345 pgs.
*AO Kaspersky Lab* v. *Webroot Inc.*, PTAB Case No. IPR2023-01160, Exhibit 1005: U.S. Patent Publication No. 20150213376, Ideses et al. (published Jul. 30, 2015), 19 pgs.
*AO Kaspersky Lab* v. *Webroot Inc.*, PTAB Case No. IPR2023-01160, Exhibit 1006: U.S. Patent Publication No. 20160154960, Sharma et al. (published Jun. 2, 2016), 29 pgs.
*AO Kaspersky Lab* v. *Webroot Inc.*, PTAB Case No. IPR2023-01160, Exhibit 1007: Charles Ledoux & Arun Lakhotia, Malware and Machine Learning, in Intelligent Methods Cyber Warfare 1 (2014), 42 pgs.

*AO Kaspersky Lab* v. *Webroot Inc.*, PTAB Case No. IPR2023-01160, Exhibit 1008: U.S. Patent Publication No. 20150213365, Ideses et al., 18 pgs.
*AO Kaspersky Lab* v. *Webroot Inc.*, PTAB Case No. IPR2023-01160, Exhibit 1009: Claim Construction Order, Mar. 16, 2023, Case No. 6:22-CV-00243-ADA-DTG, 20 pgs.
*AO Kaspersky Lab* v. *Webroot Inc.*, PTAB Case No. IPR2023-01160, Exhibit 1010: Joint Stipulation Reserving Appellate Rights, Apr. 12, 2023, Case No. 6:22-CV-00243-ADA-DTG, 9 pgs.
*AO Kaspersky Lab* v. *Webroot Inc.*, PTAB Case No. IPR2023-01160, Exhibit 1011: Kris Kendall, Practical Malware Analysis, in Black Hat Conf., USA (Aug. 2007), 10 pgs.
*AO Kaspersky Lab* v. *Webroot Inc.*, PTAB Case No. IPR2023-01160, Exhibit 1012: Hao Helen Zhang et al., Compactly Supported Radial Basis Function Kernels, Inst. Stat. Mimeo Series No. 2570, N. Carolina St. U. Dep't. Stat. 2 (2004), 19 pgs.
*AO Kaspersky Lab* v. *Webroot Inc.*, PTAB Case No. IPR2023-01160, Exhibit 1013: Zane Markel & Michael Bilzor, Building a Machine Learning Classifier for Malware Detection, 2014 Second Workshop Anti-Malware Testing Res. (WATeR) (2014), 4 pgs.
*AO Kaspersky Lab* v. *Webroot Inc.*, PTAB Case No. IPR2023-01160, Exhibit 1014: Naser Peiravian & Xingquan Zhu, Machine Learning for Android Malware Detection Using Permission and API Calls, IEEE 25th Int'l Conf. Tools Artificial Intelligence 300 (2013), 6 pgs.
*AO Kaspersky Lab* v. *Webroot Inc.*, PTAB Case No. IPR2023-01160, Exhibit 1015: Ekta Gandotra et al., Malware Analysis and Classification: A Survey, J. Inf. Security 5, 56-64 (2014), 9 pgs.
*AO Kaspersky Lab* v. *Webroot Inc.*, PTAB Case No. IPR2023-01160, Exhibit 1016: Rafiqul Islam et al., Classification of Malware Based on Integrated Static and Dynamic Features, 36 J. Network Computer Applications, 646 (2012), 11 pgs.
*AO Kaspersky Lab* v. *Webroot Inc.*, PTAB Case No. IPR2023-01160, Exhibit 1017: D. Michael Cai et al., Comparison of Feature Selection And Classification Algorithms In Identifying Malicious Executables, 51(6) Computational Stat. Data Analysis 3156 (2007), 17 pgs.
*AO Kaspersky Lab* v. *Webroot Inc.*, PTAB Case No. IPR2023-01160, Exhibit 1018: Guanhua Yan et al., Exploring Discriminatory Features for Automated Malware Classification, 10 Detection Intrusions Malware, Vulnerability Assessment: 10th Int'l Conf., 41 (2013), 21 pgs.
*AO Kaspersky Lab* v. *Webroot Inc.*, PTAB Case No. IPR2023-01160, Exhibit 1019: Rafiqul Islam et al., Classification of Malware Based on String and Function Feature Selection, 2010 Second Cybercrime Trustworthy Computing Workshop 9 (2010), 9 pgs.
*AO Kaspersky Lab* v. *Webroot Inc.*, PTAB Case No. IPR2023-01160, Exhibit 1020: Eitan Menahem et al., Improving Malware Detection by Applying Multi-Inducer Ensemble, Computational Stat. Data Analysis, 53(4), 1483 (2008), 12 pgs.
*AO Kaspersky Lab* v. *Webroot Inc.*, PTAB Case No. IPR2023-01160, Exhibit 1021: lanir Ideses & Assaf Neuberger, Adware Detection and Privacy Control in Mobile Devices, in 2014 IEEE 28TH Convention Electrical Electronics Engineers Israel 1 (2014), 5 pgs.
*AO Kaspersky Lab* v. *Webroot Inc.*, PTAB Case No. IPR2023-01160, Exhibit 1022: Raja Khurram Shahzad et al., Accurate Adware Detection Using Opcode Sequence Extraction, Sixth Int'l Conf. Availability, Reliability Security 189 (2011), 7 pgs.
*AO Kaspersky Lab* v. *Webroot Inc.*, PTAB Case No. IPR2023-01160, Exhibit 1023: Raymond Canzanese et al., Toward an Automatic, Online Behavioral Malware Classification System, IEEE 7th Int'l Conf. Self- Adaptive Self- Organizing Sys., 111 (2013), 10 pgs.
*AO Kaspersky Lab* v. *Webroot Inc.*, PTAB Case No. IPR2023-01160, Exhibit 1024: Yanfang Ye et al., Automatic Malware Categorization Using Cluster Ensemble, in Proc. 16th Acm Sigkdd Int'l Conf. Knowledge Discovery Data Mining 95 (2010), 10 pgs.
*AO Kaspersky Lab* v. *Webroot Inc.*, PTAB Case No. IPR2023-01160, Exhibit 1025: Asaf Shabtai et al., Detection of Malicious Code by Applying Machine Learning Classifiers on Static Features: A State-Of-The-Art Survey, Info. Security Tech. Rep. 14(1), 16 (2009), 14 pgs.

(56) References Cited

OTHER PUBLICATIONS

*AO Kaspersky Lab* v. *Webroot Inc.*, PTAB Case No. IPR2023-01160, Exhibit 1026: A.M. Aswini & P. Vinod, Droid Permission Miner: Mining Prominent Permissions for Android Malware Analysis, Fifth Int'l Conf. Applications Digital Inf. Web Tech. 81 (2014), 6 pgs.

*AO Kaspersky Lab* v. *Webroot Inc.*, PTAB Case No. IPR2023-01160, Exhibit 1027: Konrad Rieck et al., Learning and Classification of Malware Behavior, Detection Intrusions Malware, Vulnerability Assessment: 5th Int'l Conf., 108 (2008), 18 pgs.

*AO Kaspersky Lab* v. *Webroot Inc.*, PTAB Case No. IPR2023-01160, Exhibit 1028: Veelasha Moonsamy et al., Feature Reduction, Speed Up Malware Classification, Inf. Security Tech. Applications: 16th Nordic Conf. Secure It Sys., Tallinn, Est., Oct. 26-28, 2011, Rev. Selected Papers 16, 176 (2012), 13 pgs.

*AO Kaspersky Lab* v. *Webroot Inc.*, PTAB Case No. IPR2023-01160, Exhibit 1029: John P. Dickerson et al., Using Sentiment, Detect Bots on Twitter: Are Humans More Opinionated Than Bots?, IEEE/ACM Int'l Conf. Advances Social Networks Analysis Mining 620 (2014), 8 pgs.

*AO Kaspersky Lab* v. *Webroot Inc.*, PTAB Case No. IPR2023-01160, Exhibit 1030: Wei Yu et al., Towards Neural Network Based Malware Detection on Android Mobile Devices, Cybersecurity Sys. Human Cognition Augmentation 99 (2014), 19 pgs.

*AO Kaspersky Lab* v. *Webroot Inc.*, PTAB Case No. IPR2023-01160, Exhibit 1031: Guanhua Yan et al., 2013. Exploring Discriminatory Features for Automated Malware Classification, Detection Intrusions Malware, Vulnerability Assessment: 10th Int'l Conf., Dimva 2013, Berlin, Ger., Jul. 18-19, 2013 Proc. 10, 41 (2013), 21 pgs.

*AO Kaspersky Lab* v. *Webroot Inc.*, PTAB Case No. IPR2023-01160, Exhibit 1032: Julia Yu-Cheng et al., An Information Retrieval Approach for Malware Classification Based on Windows API Calls, Int'l Conf. Machine Learning Cybernetics 1678 (2013), 6 pgs.

*AO Kaspersky Lab* v. *Webroot Inc.*, PTAB Case No. IPR2023-01160, Exhibit 1033: Zi Chu et al., Detecting Automation of Twitter Accounts: Are You a Human, Bot, or Cyborg?, 9 IEEE Transactions Dependable Secure Computing 6, 811 (Nov./Dec. 2012), 14 pgs.

*AO Kaspersky Lab* v. *Webroot Inc.*, PTAB Case No. IPR2023-01160, Exhibit 1034: Axelle Apvrille, Android Reverse Engineering Tools From an Anti-Virus Analyst's Perspective, Fortinet, slides 11-15 (Mar. 2012), http://wikisec.free.fr/papers/insomnidroid.pdf, 69 pgs.

*AO Kaspersky Lab* v. *Webroot Inc.*, PTAB Case No. IPR2023-01160, Exhibit 1035: Li Sun et al., Pattern Recognition Techniques for the Classification of Malware Packers, 15 Proc. Inf. Security Priv.: 15th Australasian Conf., Acisp 2010, Sydney, Austl., Jul. 9-7, 2010, 370, 21 pgs.

*AO Kaspersky Lab* v. *Webroot Inc.*, PTAB Case No. IPR2023-01160, Exhibit 1036: Munkhbayar Bat-Erdene et al., Dynamic Classification of Packing Algorithms for Inspecting Executables Using Entropy Analysis, 8th Int'l Conf. Malicious Unwanted Software: "Americas" (Malware) 19, 2013, 8 pgs.

*AO Kaspersky Lab* v. *Webroot Inc.*, PTAB Case No. IPR2023-01160, Exhibit 1037: M. Zubair et al., PE-Probe: Leveraging Packer Detection and Structural Information, Detect Malicious Portable Executables, 8 Proc. Virus Bull. Conf. (2009), 10 pgs.

*Crowdstrike, Inc.* v. *Webroot Inc.*, PTAB Case No. IPR2023-01053, Petition for Inter Partes Review of U.S. Pat. No. 11,409,869, Jul. 3, 2023, 84 pgs.

*Crowdstrike, Inc.* v. *Webroot Inc.*, PTAB Case No. IPR2023-01053, Exhibit 1001: U.S. Pat. No. 11,409,869, 16 pgs.

*Crowdstrike, Inc.* v. *Webroot Inc.*, PTAB Case No. IPR2023-01053, Exhibit 1002: File History of U.S. Pat. No. 11,409,869, 347 pgs.

*Crowdstrike, Inc.* v. *Webroot Inc.*, PTAB Case No. IPR2023-01053, Exhibit 1003: Declaration of Markus Jakobsson, Ph.D., 122 pgs.

*Crowdstrike, Inc.* v. *Webroot Inc.*, PTAB Case No. IPR2023-01053, Exhibit 1004: U.S. Pat. No. 20120317644, Kumar et al., 16 pgs.

*Crowdstrike, Inc.* v. *Webroot Inc.*, PTAB Case No. IPR2023-01053, Exhibit 1005: Mal-ID: Automatic Malware Detection Using Common Segment Analysis and Meta-Features by Gil Tahan et al., 31 pgs.

*Crowdstrike, Inc.* v. *Webroot Inc.*, PTAB Case No. IPR2023-01053, Exhibit 1006: File History of U.S. Pat. No. 10,599,844, 458 pgs.

*Crowdstrike, Inc.* v. *Webroot Inc.*, PTAB Case No. IPR2023-01053, Exhibit 1007: No. 22-cv-00243, Dkt. 304, Plaintiffs' Responsive Claim Construction Brief, 70 pgs.

*Crowdstrike, Inc.* v. *Webroot Inc.*, PTAB Case No. IPR2023-01053, Exhibit 1008: Declaration of June Ann Munford, 50 pgs.

*Crowdstrike, Inc.* v. *Webroot Inc.*, PTAB Case No. IPR2023-01053, Exhibit 1009: Plaintiffs' Responsive Claim Construction Brief, Dkt. 98, No. 22-cv-00243, (W.D. Texas), 86 pgs.

*Crowdstrike, Inc.* v. *Webroot Inc.*, PTAB Case No. IPR2023-01053, Exhibit 1010: Claim Construction Order, Dkt. 236, No. 22-cv-00243, (W.D. Texas), 20 pgs.

*Crowdstrike, Inc.* v. *Webroot Inc.*, PTAB Case No. IPR2023-01053, Exhibit 1011: *Sophos Inc.* v. *Open Text Inc.*, PGR2023-00031, Paper 1, 119 pgs.

*Crowdstrike, Inc.* v. *Webroot Inc.*, PTAB Case No. IPR2023-01053, Exhibit 1012: *AO Kaspersky Lab* v. *Webroot, Inc.*, IPR2023-01160, Paper 1, 88 pgs.

*Crowdstrike, Inc.* v. *Webroot Inc.*, PTAB Case No. IPR2023-01053, Exhibit 1013: Order Granting Fifth Amended Scheduling Order, Dkt. 252, No. 22-cv-00243, (W.D., Texas), 9 pgs.

*Crowdstrike, Inc.* v. *Webroot Inc.*, PTAB Case No. IPR2023-01053, Exhibit 1014: Order Resetting Markman Hearing, Dkt. 350, No. 22-cv-00243, (W.D. Texas), 1 pg.

*Crowdstrike, Inc.* v. *Webroot Inc.*, PTAB Case No. IPR2023-01053, Exhibit 1015: Declaration of Dr. Ingrid Hsieg Yee, 98 pgs.

*Crowdstrike, Inc.* v. *Webroot Inc.*, PTAB Case No. IPR2023-01053, Exhibit 1016: U.S. Patent Publication No. 20130326625, Anderson et al., 82 pgs.

*Crowdstrike, Inc.* v. *Webroot Inc.*, PTAB Case No. IPR2023-01053, Exhibit 1017: U.S. Pat. No. 8,266,698, Seshardi et al., 16 pgs.

*Crowdstrike, Inc.* v. *Webroot Inc.*, PTAB Case No. IPR2023-01053, Exhibit 1018: U.S. Pat. No. 9,489,514, Mankin et al., 12 pgs.

*Crowdstrike, Inc.* v. *Webroot Inc.*, PTAB Case No. IPR2023-01053, Exhibit 1019: Songlun Zhao et al., Intrusion Detection Using The Support Vector Machine Enhanced With A Feature—Weight Kernel, University of Regina, Sep. 2007, 88 pgs.

*Crowdstrike, Inc.* v. *Webroot Inc.*, PTAB Case No. IPR2023-01053, Exhibit 1020: Srinivas Mukkamala et al., Intrusion Detection Using Neural Networks and Support Vector Machines, IEEE, 2002, 6 pgs.

*Crowdstrike, Inc.* v. *Webroot Inc.*, PTAB Case No. IPR2023-01053, Exhibit 1021: Nhauo Davuth et al., Classification of Malicious Domain Names using Support Vector Machine and Bi-gram Method, International Journal of Security and Its Application, vol. 7, No. 1, Jan. 2013, 8 pgs.

*Crowdstrike, Inc.* v. *Webroot Inc.*, PTAB Case No. IPR2023-01053, Exhibit 1022: Ping Wang et al., Malware behavioral detection and vaccine development by using a support vector model classifier, Journal of Computer and System Sciences, 81, 2015, pp. 1012-1026.

*Crowdstrike, Inc.* v. *Webroot Inc.*, PTAB Case No. IPR2023-01053, Exhibit 1023: M. Zubair Rafique, FIRMA: Malware Clustering and Network Signature Generation with Mixed Network Behaviors, RAID 2013, LNCS 8145, pp. 144-163.

*Crowdstrike, Inc.* v. *Webroot Inc.*, PTAB Case No. IPR2023-01053, Exhibit 1024: U.S. Patent Publication No. 2008/0319932, Wen-tau Yih et al., 26 pgs.

*Crowdstrike, Inc.* v. *Webroot Inc.*, PTAB Case No. IPR2023-01053, Exhibit 1025: Proceso L. Fernandez Jr. et al., Comparative Analysis of Combinations of Dimension Reduction and Data Mining Techniques for Malware Detection, Ateneo de Manila University, 2010, 9 pgs.

*Crowdstrike, Inc.* v. *Webroot Inc.*, PTAB Case No. IPR2023-01053, Exhibit 1026: U.S. Pat. No. 8,418,249, Nucci et al., 30 pgs.

*Crowdstrike, Inc.* v. *Webroot Inc.*, PTAB Case No. IPR2023-01053, Exhibit 1027: U.S. Pat. No. 8,161,548, Wan, 28 pgs.

*Crowdstrike, Inc.* v. *Webroot Inc.*, PTAB Case No. IPR2023-01053, Exhibit 1028: U.S. Pat. No. 8,875,289 B2, Mahaffey et al., 53 pgs.

(56) References Cited

OTHER PUBLICATIONS

*Crowdstrike, Inc.* v. *Webroot Inc.*, PTAB Case No. IPR2023-01053, Exhibit 1029: U.S. Pat. No. 9,349,103, Eberhardt, III et al., 24 pgs.

*Crowdstrike, Inc.* v. *Webroot Inc.*, PTAB Case No. IPR2023-01053, Exhibit 1030: U.S. Pat. No. 9,043,894, Dennison et al., 48 pgs.

*Crowdstrike, Inc.* v. *Webroot Inc.*, PTAB Case No. IPR2023-01053, Exhibit 1031: U.S. Pat. No. 9,306,971, Altman et al., 9 pgs.

*Crowdstrike, Inc.* v. *Webroot Inc.*, PTAB Case No. IPR2023-01053, Exhibit 1032: U.S. Patent Publication No. 20070245420, Yong et al., 13 pgs.

*Crowdstrike, Inc.* v. *Webroot Inc.*, PTAB Case No. IPR2023-01053, Exhibit 1033: U.S. Pat. No. 9,721,212, Gupta et al., 39 pgs.

*Crowdstrike, Inc.* v. *Webroot Inc.*, PTAB Case No. IPR2023-01053, Exhibit 1034: U.S. Pat. No. 9,324,034, Gupta et al., 33 pgs.

*Crowdstrike, Inc.* v. *Webroot Inc.*, PTAB Case No. IPR2023-01053, Exhibit 1035: U.S. Pat. No. 10,783,254, Sharma et al., 29 pgs.

*Crowdstrike, Inc.* v. *Webroot Inc.*, PTAB Case No. IPR2023-01053, Exhibit 1036: Xing An, "Ensemble Methods for Malware Diagnosis Based on One-class SVMs" Louisiana State University, 2012, 43 pgs.

*Crowdstrike, Inc.* v. *Webroot Inc.*, PTAB Case No. IPR2023-01053, Exhibit 1037: U.S. Pat. No. 9,306,966, Eskin et al., 35 pgs.

*Crowdstrike, Inc.* v. *Webroot Inc.*, PTAB Case No. IPR2023-01052, Petition for Inter Partes Review of U.S. Pat. No. 8,201,243, Jun. 23, 2023, 76 pgs.

*Crowdstrike, Inc.* v. *Webroot Inc.*, PTAB Case No. IPR2023-01052, Exhibit 1001: U.S. Pat. No. 8,201,243, 13 pgs.

*Crowdstrike, Inc.* v. *Webroot Inc.*, PTAB Case No. IPR2023-01052, Exhibit 1002: File History of U.S. Pat. No. 8201243, 423 pgs.

*Crowdstrike, Inc.* v. *Webroot Inc.*, PTAB Case No. IPR2023-01052, Exhibit 1003: Declaration of Markus Jakobsson, Ph.D., 102 pgs.

*Crowdstrike, Inc.* v. *Webroot Inc.*, PTAB Case No. IPR2023-01052, Exhibit 1004: U.S. Pat. No. 7,979,889 Gladstone, 23 pgs.

*Crowdstrike, Inc.* v. *Webroot Inc.*, PTAB Case No. IPR2023-01052, Exhibit 1005: U.S. Pat. No. 6,775,780 Muttik, 8 pgs.

*Crowdstrike, Inc.* v. *Webroot Inc.*, PTAB Case No. IPR2023-01052, Exhibit 1006: U.S. Pat. No. 7,093,292 Pantuso, 12 pgs.

*Crowdstrike, Inc.* v. *Webroot Inc.*, PTAB Case No. IPR2023-01052, Exhibit 1007: U.S. Pat. No. 8,321,910 English, 10 pgs.

*Crowdstrike, Inc.* v. *Webroot Inc.*, PTAB Case No. IPR2023-01052, Exhibit 1008: 22-cv-00241, Dkt. 304, Plaintiffs' Responsive Claim Construction Brief, 70 pgs.

*Crowdstrike, Inc.* v. *Webroot Inc.*, PTAB Case No. IPR2023-01052, Exhibit 1009: 22-cv-00241, Dkt. 263, Opening Claim Construction Brief, 69 pgs.

*Crowdstrike, Inc.* v. *Webroot Inc.*, PTAB Case No. IPR2023-01052, Exhibit 1010: Richard D. Schneeman, Device Driver Development for Microsoft Windows NT: Accessing Motion Control Hardware Using a Multimedia Framework, 1996, 54 pgs.

*Crowdstrike, Inc.* v. *Webroot Inc.*, PTAB Case No. IPR2023-01052, Exhibit 1011: U.S. Patent Appl. Publ. No. 20070174911 Kronenberg, 13 pgs.

*Crowdstrike, Inc.* v. *Webroot Inc.*, PTAB Case No. IPR2023-01052, Exhibit 1012: U.S. Patent Appl. Publ. No. 20060253584 Dixon, 74 pgs.

*Crowdstrike, Inc.* v. *Webroot Inc.*, PTAB Case No. IPR2023-01052, Exhibit 1013: U.S. Pat. No. 7,434,261 Costea, 12 pgs.

*Crowdstrike, Inc.* v. *Webroot Inc.*, PTAB Case No. IPR2023-01052, Exhibit 1014: U.S. Pat. No. 8,117,659 Hartrell, 16 pgs.

*Crowdstrike, Inc.* v. *Webroot Inc.*, PTAB Case No. IPR2023-01052, Exhibit 1015: Sophos Petition for Inter Partes Review of U.S. Pat. No. 8,201,243, 86 pgs.

*Crowdstrike, Inc.* v. *Webroot Inc.*, PTAB Case No. IPR2023-01052, Exhibit 1016: 22-cv-00241, Dkt. 252, Order Granting Fifth Amended Scheduling Order, 9 pgs.

*Crowdstrike, Inc.* v. *Webroot Inc.*, PTAB Case No. IPR2023-01052, Exhibit 1017: 22-cv-00243, Dkt. 350, Order Resetting Markman Hearing, 1 pg.

*Crowdstrike, Inc.* v. *Webroot Inc.*, PTAB Case No. IPR2023-01052, Patent Owner Open Text Inc.'s Mandatory Notices Pursuant to 37 CFR § 42.8(b), Jul. 14, 2023, 9 pgs.

*Crowdstrike, Inc.* v. *Webroot Inc.*, PTAB Case No. IPR2023-01158, Petition for Inter Partes Review of U.S. Pat. No. 8,181,244, Jun. 30, 2023, 78 pgs.

*Crowdstrike, Inc.* v. *Webroot Inc.*, PTAB Case No. IPR2023-01158, Exhibit 1001: U.S. Pat. No. 8,181,244, 13 pgs.

*Crowdstrike, Inc.* v. *Webroot Inc.*, PTAB Case No. IPR2023-01158, Exhibit 1002: Excerpts from the Prosecution History of the '244 Patent, 389 pgs.

*Crowdstrike, Inc.* v. *Webroot Inc.*, PTAB Case No. IPR2023-01158, Exhibit 1003: Declaration of Dr. Markus Jakobsson, 107 pgs.

*Crowdstrike, Inc.* v. *Webroot Inc.*, PTAB Case No. IPR2023-01158, Exhibit 1004: U.S. Patent Pub. No. 20070150957 Hartrell, 16 pgs.

*Crowdstrike, Inc.* v. *Webroot Inc.*, PTAB Case No. IPR2023-01158, Exhibit 1005: U.S. Pat. No. 7,784,098 Fan, 28 pgs.

*Crowdstrike, Inc.* v. *Webroot Inc.*, PTAB Case No. IPR2023-01158, Exhibit 1006: U.S. Pat. No. 7,352,280 Rockwood, 24 pgs.

*Crowdstrike, Inc.* v. *Webroot Inc.*, PTAB Case No. IPR2023-01158, Exhibit 1007: U.S. Pat. No. 7,571,482 Polyakov, 14 pgs.

*Crowdstrike, Inc.* v. *Webroot Inc.*, PTAB Case No. IPR2023-01158, Exhibit 1008: U.S. Pat. No. 8,516,583 Thomas, 14 pgs.

*Crowdstrike, Inc.* v. *Webroot Inc.*, PTAB Case No. IPR2023-01158, Exhibit 1009: U.S. Pat. No. 7,549,055 Zimmer, 10 pgs.

*Crowdstrike, Inc.* v. *Webroot Inc.*, PTAB Case No. IPR2023-01158, Exhibit 1010: U.S. District Courts-Median Time Intervals From Filing to Disposition of Civil Cases Terminated, by District and Method of Disposition, During the 12-Month Period Ending Mar. 31, 2023, 95 pgs.

*Crowdstrike, Inc.* v. *Webroot Inc.*, PTAB Case No. IPR2023-01158, Exhibit 1011: Memorandum: Interim Procedure for Discretionary Denials in AIA Post-Grant Proceedings with Parallel District Court Litigation, Jun. 21, 2022, 9 pgs.

*Crowdstrike, Inc.* v. *Webroot Inc.*, PTAB Case No. IPR2023-01158, Exhibit 1012: Webroot, Inc. v. CrowdStrike, Inc., Case No. 6:22-cv-00243-ADA1, Docket No. 252, "Order Granting Fifth Amended Scheduling Order" (WDTX Mar. 29, 2023), 9 pgs.

*Crowdstrike, Inc.* v. *Webroot Inc.*, PTAB Case No. IPR2023-01158, Exhibit 1013: Webroot, Inc. v. CrowdStrike, Inc., Case No. 6:22-cv-00243-ADA, Docket No. 350, "Order Resetting Markman Hearing" (WDTX Jun. 8, 2023), 1 pg.

*Crowdstrike, Inc.* v. *Webroot Inc.*, PTAB Case No. IPR2023-01158, Exhibit 1014: Webroot, Inc. v. CrowdStrike, Inc., Case No. 6:22-cv-00241-ADA, Docket No. 263, "Opening Claim Construction Brief Regarding Patents Plaintiffs Webroot And OpenText Added By Amendment" (WDTX Apr. 12, 2023), 69 pgs.

*Crowdstrike, Inc.* v. *Webroot Inc.*, PTAB Case No. IPR2023-01158, Exhibit 1015: *Webroot, Inc.* v. *CrowdStrike, Inc.*, Case No. 6:22-cv-00243- ADA, Docket No. 304, "Plaintiffs' Responsive Claim Construction Brief Regarding Patents Plaintiffs Added By Amendment" (WDTX May 5, 2023), 70 pgs.

*Crowdstrike, Inc.* v. *Webroot Inc.*, PTAB Case No. IPR2023-01158, Patent Owner Open Text Inc.'s Mandatory Notices Pursuant to 37 CFR § 42.8(b), Jul. 14, 2023, 9 pgs.

*AO Kaspersky Lab* v. *Webroot Inc.*, PTAB Case No. IPR2023-01199, Petition for Inter Partes Review of U.S. Pat. No. 9,578,045 pursuant, 35 U.S.C. §§ 311-319, 37 CFR § 42, Jul. 14, 2023, 88 pgs.

*AO Kaspersky Lab* v. *Webroot Inc.*, PTAB Case No. IPR2023-01199, Exhibit 1001: U.S. Pat. No. 9,578,045 to Jaroch, 30 pgs.

*AO Kaspersky Lab* v. *Webroot Inc.*, PTAB Case No. IPR2023-01199, Exhibit 1002: File History of U.S. Pat. No. 9,578,045, 210 pgs.

*AO Kaspersky Lab* v. *Webroot Inc.*, PTAB Case No. IPR2023-01199, Exhibit 1003: Declaration of Dr. Wenke Lee, 202 pgs.

*AO Kaspersky Lab* v. *Webroot Inc.*, PTAB Case No. IPR2023-01199, Exhibit 1004: U.S. Publication No. 20130298244 Kumar, 52 pgs.

*AO Kaspersky Lab* v. *Webroot Inc.*, PTAB Case No. IPR2023-01199, Exhibit 1005: U.S. Publication No. 20070016953 Morris, 18 pgs.

*AO Kaspersky Lab* v. *Webroot Inc.*, PTAB Case No. IPR2023-01199, Exhibit 1006: U.S. Pat. No. 8,087,087 Van Oorschot, 18 pgs.

(56) References Cited

OTHER PUBLICATIONS

*AO Kaspersky Lab* v. *Webroot Inc.*, PTAB Case No. IPR2023-01199, Exhibit 1007: U.S. Patent Pub. No. 20100077481, Polyakov, 19 pgs.
*AO Kaspersky Lab* v. *Webroot Inc.*, PTAB Case No. IPR2023-01199, Exhibit 1008: U.S. Publication No. 20110321166, Capalik, 29 pgs.
*AO Kaspersky Lab* v. *Webroot Inc.*, PTAB Case No. IPR2023-01199, Exhibit 1009: U.S. Publication No. 20120260340, Morris, 30 pgs.
*AO Kaspersky Lab* v. *Webroot Inc.*, PTAB Case No. IPR2023-01199, Exhibit 1010: U.S. Pat. No. 10,257,224, Jaroch, 31 pgs.
*AO Kaspersky Lab* v. *Webroot Inc.*, PTAB Case No. IPR2023-01199, Exhibit 1011: Scheduling Order (Dkt. 50), No. 6:22-cv-00243-ADA-DTG, (USDC, WD, TX), 18 pgs.
*AO Kaspersky Lab* v. *Webroot Inc.*, PTAB Case No. IPR2023-01199, Exhibit 1012: Natarajan Meghanathan, Sumanth Reddy Allam, and Loretta A. Moore, Tools and Techniques for Network Forensics, International Journal of Network Security & Its Applications (IJNSA), vol. 1., No. 1 (Apr. 2009), 12 pgs.
*AO Kaspersky Lab* v. *Webroot Inc.*, PTAB Case No. IPR2023-01199, Exhibit 1013: *SANS Institute, Host—vs. Network-Based Intrusion Detection Systems* (2000-2005), 11 pgs.
*AO Kaspersky Lab* v. *Webroot Inc.*, PTAB Case No. IPR2023-01199, Exhibit 1014: Securosis LLC, Evolving Endpoint Malware Detection: Dealing with Advanced and Targeted Attacks, Version 1.3 (Jul. 12, 2012), 23 pgs.
*AO Kaspersky Lab* v. *Webroot Inc.*, PTAB Case No. IPR2023-01199, Exhibit 1015: Yanfang Ye, Weiwei Zhuang, Tao Li, Egemen Tas, Umesh Gupta, Shenghuo Zhu, Melih Abdulhayoglu, Combining File Content and File Relations for Cloud Based Malware Detection (Aug. 2011), 9 pgs.
*AO Kaspersky Lab* v. *Webroot Inc.*, PTAB Case No. IPR2023-01199, Exhibit 1016: U.S. Pat. No. 6,944,772 Dozortsev, 10 pgs.
*AO Kaspersky Lab* v. *Webroot Inc.*, PTAB Case No. IPR2023-01199, Exhibit 1017: U.S. Pat. No. 6,772,346 Chess, 14 pgs.
*AO Kaspersky Lab* v. *Webroot Inc.*, PTAB Case No. IPR2023-01199, Exhibit 1018: WO 2002033525 Chuang, 18 pgs.
*AO Kaspersky Lab* v. *Webroot Inc.*, PTAB Case No. IPR2023-01199, Exhibit 1019: EP 1,549,012 De Spiegeleer, 19 pgs.
*AO Kaspersky Lab* v. *Webroot Inc.*, PTAB Case No. IPR2023-01199, Exhibit 1020: EP 1,280,040 Hinchliffe, 17 pgs.
*AO Kaspersky Lab* v. *Webroot Inc.*, PTAB Case No. IPR2023-01199, Exhibit 1021: Oracle, Java Documentation, The Java Tutorials, What is a Path? (And Other File System Facts) (available at the following link https://docs.oracle.com/javase/tutorial/essential/io/path.html) (last accessed Oct. 2022), 3 pgs.
*AO Kaspersky Lab* v. *Webroot Inc.*, PTAB Case No. IPR2023-01199, Exhibit 1022: U.S. Patent Publication No. 2004/0143753 to Hernacki, 20 pgs.
*AO Kaspersky Lab* v. *Webroot Inc.*, PTAB Case No. IPR2023-01199, Exhibit 1023: U.S. Patent Publication No. 2011/0083180 to Mashevsky, 16 pgs.
*AO Kaspersky Lab* v. *Webroot Inc.*, PTAB Case No. IPR2023-01199, Exhibit 1024: U.S. Pat. No. 8,429,746 to Capalik, 11 pgs.
*AO Kaspersky Lab* v. *Webroot Inc.*, PTAB Case No. IPR2023-01199, Exhibit 1025: Server Hardware, Software and Architecture by Abeer El Hadi El Zein El Nahas, University of Khartoum, Electrical and Electronics Engineering Dept. (Feb. 2008), 152 pgs.
*AO Kaspersky Lab* v. *Webroot Inc.*, PTAB Case No. IPR2023-01199, Exhibit 1026: Guofei Gu, Phillip Porras, Vinod Yegneswaran, Martin Fong, Wenke Lee, BotHunter: Detecting Malware Infection Through IDS-Driven Dialog Correlation, In Proceedings of The 16th USENIX Security Symposium (Aug. 2007), 16 pgs.
*AO Kaspersky Lab* v. *Webroot Inc.*, PTAB Case No. IPR2023-01199, Exhibit 1027: Yacin Nadji, Manos Antonakakis, Roberto Perdisci, and Wenke Lee, Understanding the Prevalence and Use of Alternative Plans in Malware with Network Games, In Proceedings of The 27th Annual Computer Security Applications Conference (Dec. 2011), 10 pgs.

*AO Kaspersky Lab* v. *Webroot Inc.*, PTAB Case No. IPR2023-01199, Exhibit 1028: Manos Antonakakis, Roberto Perdisci, David Dagon, Wenke Lee, and Nick Feamster, Building a Dynamic Reputation System for DNS, In Proceedings of The 19th USENIX Security Symposium, (Aug. 2010), 17 pgs.
*AO Kaspersky Lab* v. *Webroot Inc.*, PTAB Case No. IPR2023-01199, Exhibit 1029: Long Lu, Vinod Yegneswaran, Phil Porras, and Wenke Lee, BLADE: An Attack-Agnostic Approach for Preventing Drive-By Malware Infections, In Proceedings of The 17th ACM Conference on Computer and Communications Security (CCS), Chicago, IL (Oct. 2010), 12 pgs.
*AO Kaspersky Lab* v. *Webroot Inc.*, PTAB Case No. IPR2023-01199, Exhibit 1030: Plaintiffs' Markman Opposition Brief (Dkt. 98), 86 pgs.
*AO Kaspersky Lab* v. *Webroot Inc.*, PTAB Case No. IPR2023-01199, Exhibit 1031: Defendants' Markman Opening Brief (Dkt. 86), 84 pgs.
*AO Kaspersky Lab* v. *Webroot Inc.*, PTAB Case No. IPR2023-01199, Exhibit 1032: Declaration of V.S. Subrahmanian, Ph.D., 88 pgs.
*AO Kaspersky Lab* v. *Webroot Inc.*, PTAB Case No. IPR2023-01199, Exhibit 1033: Order Granting Fifth Amended Scheduling Order, ECF No. 252, Mar. 29, 2023, 9 pgs.
*Crowdstrike, Inc.* v. *Webroot Inc.*, PTAB Case No. IPR2023-01050, Petition for Inter Partes Review of U.S. Pat. No. 8,763,123, Jul. 12, 2023, 67 pgs.
*Crowdstrike, Inc.* v. *Webroot Inc.*, PTAB Case No. IPR2023-01050, Exhibit 1001: U.S. Pat. No. 8,763,123, 16 pgs.
*Crowdstrike, Inc.* v. *Webroot Inc.*, PTAB Case No. IPR2023-01050, Exhibit 1002: File History of U.S. Pat. No. 8,763,123, 255 pgs.
*Crowdstrike, Inc.* v. *Webroot Inc.*, PTAB Case No. IPR2023-01050, Exhibit 1003: European File History, 286 pgs.
*Crowdstrike, Inc.* v. *Webroot Inc.*, PTAB Case No. IPR2023-01050, Exhibit 1004: Declaration of Markus Jakobsson, Ph.D., 89 pgs.
*Crowdstrike, Inc.* v. *Webroot Inc.*, PTAB Case No. IPR2023-01050, Exhibit 1005: U.S. Pat. No. 7,269,851 to Ackroyd, 13 pgs.
*Crowdstrike, Inc.* v. *Webroot Inc.*, PTAB Case No. IPR2023-01050, Exhibit 1006: U.S. Patent Publication No. 2004000670, Dahlstrom, 16 pgs.
*Crowdstrike, Inc.* v. *Webroot Inc.*, PTAB Case No. IPR2023-01050, Exhibit 1007: 22-cv-00241, Dkt. 252, Order Granting Fifth Amended Scheduling Order, 9 pgs.
*Crowdstrike, Inc.* v. *Webroot Inc.*, PTAB Case No. IPR2023-01050,1008: 22-cv-00241, Dkt. 304, Plaintiffs' Responsive Claimpgs.
*Crowdstrike, Inc.* v. *Webroot Inc.*, PTAB Case No. IPR2023-01050,1009: U.S. Pat. No. 6,944,772 to Dozortsev, 10 pgs.
*Crowdstrike, Inc.* v. *Webroot Inc.*, PTAB Case No. IPR2023-01050,1010: EP 1,549,012 to De Spiegeleer, 19 pgs.
*Crowdstrike, Inc.* v. *Webroot Inc.*, PTAB Case No. IPR2023-01050,1011: EP 1,280,040 to Hinchliffe, 17 pgs.
*Crowdstrike, Inc.* v. *Webroot Inc.*, PTAB Case No. IPR2023-01050,1012: WO 2002033525 to Chuang, 18 pgs.
*Crowdstrike, Inc.* v. *Webroot Inc.*, PTAB Case No. IPR2023-01050, Exhibit 1013: U.S. Patent Publication No. 20040073810 to Dettinger, 15 pgs.
*Crowdstrike, Inc.* v. *Webroot Inc.*, PTAB Case No. IPR2023-01050,1014: WO 2003021402 to Duke, 13 pgs.
*Crowdstrike, Inc.* v. *Webroot Inc.*, PTAB Case No. IPR2023-01050, Exhibit 1015: U.S. Patent Publication No. 20030115479 to Edwards, 10 pgs.
*Crowdstrike, Inc.* v. *Webroot Inc.*, PTAB Case No. IPR2023-01050,1017: U.S. Pat. No. 6,663,000 to Muttik, 12 pgs.
*Crowdstrike, Inc.* v. *Webroot Inc.*, PTAB Case No. IPR2023-01050, Exhibit 1018: PC Broadband Security by Darren Meyer, 3 pgs.
*Crowdstrike, Inc.* v. *Webroot Inc.*, PTAB Case No. IPR2023-01050, Exhibit 1019: Wired to the World Anti-virus Software by Ralph Lee Scott, 1 pg.
U.S. Appl. No. 60/762,359, filed Jan. 25, 2006, Kronenberg.
U.S. Appl. No. 60/806,143, filed Jun. 29, 2006, Shukla.
CounterTack Scout and CounterTack Sentinel product sheet, CounterTack, Inc., Waltham, MA, at https://web.archive.org/web/20130310054238/http:/www.countertack.com/virtual-machine-introspection/, 2013, 2 pgs.

(56) References Cited

OTHER PUBLICATIONS

Baratloo, Arash et al., Transparent Run-Time Defense Against Stack- Smashing Attacks, Proceedings of the 2000 USENIX Annual Technical Conf., San Diego, CA, Jun. 18-23, 2000, 13 pgs.

Goel, Ashvin et al., The Taser Intrusion Recovery System, SOSP '05, Oct. 23-26, 2005, Brighton, UK, 14 pgs.

PR Newswire, ArcSight Introduces Security Management Solution, Westlaw, Jan. 28, 2002, 4 pgs.

King, Samuel T. et al., Backtracking Intrusions, ACM Transactions on Computer Systems, vol. 23, No. 1, Feb. 2005, pp. 51-76.

Xie, Yinglian, A Spatiotemporal Event Correlation Approach to Computer Security, School of Computer Science, Carnegie Mellon University, Pittsburgh, PA, Aug. 2005, 148 pgs.

TrendMicro Control Manager 6.0, Patch 2 Administrator's Guide, Trend Micro Incorporated, Cupertino, CA, Feb. 2013, 573 pgs.

Symantec Insight and SONAR product sheet, at https://vox.veritas.com/legacyfs/online/veritasdata/SEP%2012%20Insight%20and%20SONAR%20Factsheet, 5 pgs.

Vigna, Giovanni, et al., Host-Based Intrusion Detection, https://sites.cs.ucsb.edu/~chris/research/doc/infsec05_hids.pdf, Jun. 15, 2005, 13 pgs.

Know Your Enemy: Sebek—A kernel based data capture tool, Nov. 17, 2003, The Honeynet Project, https://www.cs.jhu.edu/~rubin/courses/sp04/sebek.pdf, Nov. 17, 2003, 21 pgs.

Patil, Swapail, et al., I3FS: An In-Kernel Integrity Checker and Intrusion Detection File System, https://www.filesystems.org/docs/i3fs/i3fs.html, Sep. 17, 2004, 17 pgs.

Bravo, Pablo, Proactive Detection of Kernel-Mode Rootkits, 2011 Sixth Int'l Conf. on Availability, Reliability, Security, IEEE, https://ieeexplore.ieee.org/document/6045970, Oct. 17, 2011, 6 pgs.

Fratric, Ivan, ROPGuard: Runtime Prevention of Return-Oriented Programming Attacks, Sep. 24, 2012, 49 pgs.

Fratric, Ivan, Runtime Prevention of Return-Oriented Programming Attacks, Github.com, https://github.com/ivanfratric/ropguard, Aug. 26, 2012, 2 pgs.

Srivastava, Abhinav, Efficient Protection of Kernel Data Structures via Object Partitioning, ACSAC, Orlando, FL, https://dl.acm.org/doi/10.1145/242095.2421012, Dec. 3-7, 2012, 10 pgs.

Stojanovski, Nanad, Bypassing Data Execution Prevention on Microsoft Windows XP SP2, Second Int'l Conf. on Availability, Reliability, and Security, https://ieeexplore.ieee.org/document/4159930, Apr. 23, 2007, 5 pgs.

Egele, Manuel et al., A Survey on Automated Dynamic Malware-Analysis Techniques and Tools, ACM Computing Surveys, vol. 44, No. 2, Article 6, Feb. 8, 2012, 42 pgs.

Ficco, Massimo et al., A Generic Intrusion Detection and Diagnose System Based on Complex Event Processing, 2011 First Int'l Conf. on Data Compression, Communications and Processing, 2011, 10 pgs.

Giura, Paul, A Context-Based Detection Framework for Advanced Persistent Threats, 2012 Int'l Conf. on Cyber Security, 2012, 6 pgs.

Hua, Jingyu et al., Efficient Context-Sensitive Intrusion Detection Based on State Transition Table, IEICE Trans. Fundamentals, vol. E94-A, No. 1, Jan. 2011, pp. 255-264.

Johnson, Michael C., Correlating Intrusion Detection Events: A Data Mining & Profiling Approach, George Mason University, Fairfax, Virginia, 2005, 210 pgs.

Krugel, Christopher, Decentralized Event Correlation, ICICS 2001, LCS 2288, 2002, pp. 114-131.

Myers, Justin, et al., Insider Threat Detection Using Distributed Event Correlation of Web Server Logs, Int'l Conf. on Information Warfare and Security, Apr. 2010, 11 pgs.

Porras, Phillip, et al., Emerald: Event Monitoring Enabling Responses to Anomalous Live Disturbances, 20th NISSC, Oct. 9, 1997, 15 pgs.

Jacobson, Emily et al., Detecting Code Reuse Attacks with a Model of Conformant Program Execution, Int'l Symposium on Engineering Secure Software and Systems, Feb. 2014, pp. 1-18.

StackwalkerAPI Programmer's Guide, 8.0 Release, Nov. 2012, Paradyn Parallel Performance Tools, Computer Sciences Department, University of Wisconsin, Madison, WI, 33 pgs.

Scott, David, et al., Abstracting Application-Level Web Security, WWW 2002, Honolulu, HI, May 7-11, 2002, pp. 396-407.

Dewald, Andreas, et al., ADSandbox: Sandboxing JavaScript to fight Malicious Websites, SAC' 2010, Sierre, Switzerland, Mar. 22-26, 2010, pp. 1859-1864.

Le, Van Lam, et al., Identification Of Potential Malicious Web Pages, Australian Computer Society, Ninth Australasian Information Security Conf., Perth Australia, CRPIT vol. 116 Information Security, 2011, pp. 33-40.

Canali, David, et al., Prophiler: A Fast for the Large-Scale Detection of Malicious Web Pages, WWW 2011 Session: Web Security, Hyderabad, IN, Mar. 28-Apr. 1, 2011, 10 pgs.

Chen, Kevin, et al., WebPatrol: Automated Collection and Replay of Web-based Malware Scenarios, ASIACCS, 2011, Hong Kong, CN, Mar. 22-24, 2011, pp. 186-195.

Yan, Wei, et al., Toward Automatic Discovery of Malware Signature for Anti-Virus Cloud Computing, Int'l Conf. on Complex Sciences, Springer, Berlin, Heidelberg, 2009, pp. 724-728.

Martinez, Cristian Adrian, et al., Malware detection based on Cloud Computing Integrating Intrustion Ontology Representation, IEEE Latin-American Conf. on Communications, 2010, 6 pgs.

Wang, Shu-Ching, et al., A Three-Phases Scheduling in a Hierarchical Cloud Computing Network, Third Int'l Conf. on Communications and Mobile Computing, IEEE, 2011, pp. 114-117.

Epshteyn, Arkady, Dejong, Gerald, Generative Prior Knowledge for Discriminative Classification, Journal of Artificial Intelligence Research 27, 2006, pp. 25-53.

Wei, Songjie, Mirkovic, Jelena, Building Reputations for Internet Clients, Electronic Notes in Theoretical Computer Science, 179, 2007, pp. 17-30.

Xia, Yinggie, Song, Guanghua, Zheng, Yao, NI, Jun, Zhu, Mingzhe, A Small World Overlay P2P Transfer System with Role-Based and Reputation-Based Access Control Policies, 2008 Int'l Conf. on Internet Computing in Science and Engineering, IEEE, 2008, pp. 517-520.

Xu, Ziyao, He, Yeping, Deng, Lingli, A Multilevel Reputation System for Peer-to-Peer Networks, Sixth Int'l Conf. on Grid and Cooperative Computing (GCC 2007), IEEE, 2007, 8 pgs.

Arnold, William and Tesauro, Gerald, Automatically Generated WIN32 Heuristic Virus Detection, Virus Bulletin Conf., Oxfordshire, England, Sep. 2000, pp. 51-60.

Abou-Assaleh, Tony, Cercone, Nick, Keselj, Vlado, Sweidan, Ray, N-gram-based Detection of New Malicious Code, IEEE, Sep. 30, 2004, 2 pgs.

Aswini, A.M., Vinod, P., Towards the Detection of Android Malware Using Ensemble Features, Journal of Information Assurance and Security, ISSN 1554-1010 vol. 9, 2014, pp. 375-387.

Baldangombo, Usukhbayar, Jambaljav, Nyamjav, Horng, Shi-Jinn, A Static Malware Detection System Using Data Mining Methods, arXiv:1308.2831, Jul. 4, 2013, 13 pgs.

Cortes, Corinna and Vapnik, Vladimir, Support-Vector Networks, Machine Learning, 20, Sep. 1995 Kluwer Academic Publishers, Boston, pp. 273-297.

Demertzis, Konstantinos and Iliadis, Lazaros, Evolving Computational Intelligence System for Malware Detection, LNBIP 178, Jun. 20, 2014, Springer Int'l Publishing, Switzerland, pp. 322-334.

Firdausi, Ivan, Lim, Charles, Erwin, Alva and Nugroho, Anto Satriyo, Analysis of Machine Learning Techniques Used in Behavior-Based Malware Detection, IEEE, Dec. 3, 2010, pp. 201-203.

Aafer, Yousra, Du, Wenliang, Yin, Heng, DroidAPIMiner: Mining API-Level Features for Robust Malware Detection in Android, https://www.researchgate.net/publication/278705505, Sep. 2013, 18 pgs.

Islam, Rafiqul, Ronghua, Tian, Batten, Lynn and Versteeg, Steve, Classification of Malware Based on String and Function Feature Selection, CTC IEEE, 2010, pp. 9-17.

Lai, Ying-Xu, A Feature Selection for Malicious Detection, Ninth ACIS Int'l Conf. on Software Engineering, Artificial Intelligence, Networking, and Parallel/Distributed Computing, 2008, IEEE, pp. 365-370.

Leder, Felix, Steinbock, Bastian, and Martini, Peter, Classification and Detection of Metamorphic Malware using Value Set Analysis, IEEE, Oct. 14, 2009, pp. 39-46.

(56) References Cited

OTHER PUBLICATIONS

Liangboonprakong, Chatchai, Sornil, Ohm, Classification of Malware Families Based on N-grams Sequential Pattern Features, Proceedings of the 2013 IEEE 8th Conf. on Industrial Electronics and Applications, Melbourne, Australia, Jun. 19-21, 2013, pp. 777-782.

Markel, Zane and Bilzor, Michael, Building a Machine Learning Classifier for Malware Detection, IEEE, Oct. 23, 2014, 4 pgs.

Masud, Mehedy, Khan, Latifur, and Thuraisingham, Bhavani, Data Mining Tools for Malware Detection, CRC Press, 2011, 680 pgs.

Menahem, Eitan, Shabtai, Asaf, Rokach, Lior, and Elovici, Yuval, Improving Malware Detection by Applying Multi-Inducer Ensemble, Elsevier, Computational Statistics and Data Analysis 53, Feb. 2009, pp. 1483-1494.

Raman, Karthick, Selecting Features to Classify Malware, Adobe Systems, Inc., 2012, 5 pgs.

Tahan, Gil, Rokach, Lior, and Shahar, Yuval, Mal-ID: Automatic Malware Detection Using Common Segment Analysis and Meta-Features, Journal of Machine Learning, Apr. 2012, pp. 949-979.

Tian, Ronghua, An Integrated Malware Detection and Classification System, 2011, 283 pgs.

Islam, Rafiqul, Tian, Ronghua, Batten, Lynn, and Versteeg, Steve, Classification of Malware Based on Integrated Static and Dynamic Features, Journal of Network and Computer Applications, No. 36, Nov. 2, 2022, pp. 646-656.

Jiang, Quinshan, Zhao, Xinxing, Huang, Kai, A Feature Selection Method for Malware Detection, Jun. 2011, 6 pgs.

Apel, Martin, Biskup, Joachim, Flegel, Ulrich and Meier, Michael, "Towards Early Warning Systems—Challenges, Technologies and Architecture," Critical Information Infrastructures Security, 2009, 14 pgs.

Doumas, Anatasia, Mavroudakis, Konstantinos, Gritzalis, Dimitris, Katsikas, Sokratis, Design of a Neural Network for Recognition and Classification of Computer Viruses, Computers & Security, Elsevier Science Ltd., 14, 1995, pp. 435-448.

Faruki, Parvez et al., AndroSimilar: Robust Statistical Feature Signature for Android Malware Detection, SIN '13, Aksaray, Turkey, Nov. 26-28, 2013, 8 pgs.

Guo, Shanqing, et al., A Fine-Grained Classification Approach for the Packed Malicious Code, T.W. Chim and T.H. Yue (Eds.): ICICS 2012, LNCS 7618, Springer-Verlag Berlin Heidelberg, 2012, pp. 497-504.

Jeong, Young-Seob, et al., Malware Detection on Byte Streams of PDF Files Using Convolutional Neural Networks, Hindawi, Security and Communication Networks, vol. 2019, Article ID 8485365, 9 pgs.

Lam, Ho-Yu, and Yeung, Dit-Yan, A Learning Approach to Spam Detection based on Social Networks, CEAS 2007—Fourth Conf. on Email and Anti-Spam, Mountain View, CA, Aug. 2-3, 2007, 10 pgs.

Perdisci, Roberto, Lanzi, Andrea, and Lee, Wenke, Classification of Packed Executables for Accurate Computer Virus Detection, Elsevier, Jun. 2008, 15 pgs.

Babu Rajesh V, Phaninder Reddy, Himanshu P and Mahesh U Patil, Androinspector: A System for Comprehensive Analysis of Android Applications, Int'l Journal of Network Security & Its Application (IJNSA), vol. 7, No. 5, Sep. 2015, 22 pgs.

Ravula, Ravindar Reddy, Classification of Malware Using Reverse Engineering and Data Mining Techniques, Aug. 2011, Akron, 104 pgs.

Runwal, Neha, Graph Technique for Metamorphic Virus Detection, San Jose, CA, Dec. 2011, 93 pgs.

Sahs, Justin and Khan, Latifur, A Machine Learning Approach to Android Malware Detection, 2012 European Intelligence and Security Informatics Conf., EEE 2012, pp. 141-147.

Schultz, Matthew G., Eskin, Eleazar, Zadok, Erez, and Stolfo, Salvatore J., Data Mining Methods for Detection of New Malicious Executables, Proceedings 2001 IEEE Symposium on Security and Privacy, S&P 2001, 2001, pp. 38-49.

Tan, Jun, Chen, Xingshu and Du, Min, An Internet Traffic Identification Approach Based on GA and PSO-SVM, Journal of Computers, vol. 7, No. 1, Jan. 2012, pp. 19-29.

Tian, R, Batten, L.M., Versteeg, S.C., Function Length as a Tool for Malware Classification, 2008 3rd Int'l Conf. on Malicious and Unwanted Software (Malware), Los Alamitos, CA, 2008, pp. 69-76.

Tesauro, Gerald J., Kephart, Jeffrey O., Sorkin, Gregory B., Neural Networks for Computer Virus Recognition, Aug. 1996, pp. 5-6.

Walenstein, Andrew, Venable, Michael, Hayes, Matthew, Thompson, Christopher, and Lakhotia, Arun, Exploiting Similarity Between Variants to Defeat Malware, Computer Science, 2007, 12 pgs.

Wang, Tzu-Yen, Wu, Chin-Hsiung, Hsieh, Chu-Cheng, Detecting Unknown Malicious Executables Using Portable Executable Headers, 2009 Fifth Int'l Joint Conf. on Inc, Ims, and IDC, 2009, pp. 278-284.

Gorton, Dan, Extending Intrusion Detection with Alert Correlation, Department of Computer Engineering, Chalmers University of Technology, Sweden, 2003, 121 pgs.

Shafiq, M. Zubair, S. Momina Tabish, Fauzan Mirza, and Muddassar Farooq, "A Framework For Efficient Mining Of Structural Information To Detect Zero-Day Malicious Portable Executables," Next Generation Intelligent Networks Research Center, nexGIN RC, Tech. Rep., Jan. 2009, 30 pgs.

Wang, Tzu-Yen, and Chin-Hsiung Wu, "Detection of Packed Executables Using Support Vector Machines," 2011 Int'l Conf. on Machine Learning and Cybernetics, IEEE, vol. 2, Jul. 2011, pp. 717-722.

Shafiq, M. Zubair, S. Tabish, and Muddassar Farooq, "PE-Probe: Leveraging Packer Detection and Structural Information to Detect Malicious Portable Executables," Proceedings of the Virus Bulletin Conf., vol. 8., Jun. 2009, 10 pgs.

Nath, Hiran V., and Babu M. Mehtre, "Static Malware Analysis Using Machine Learning Methods," In Recent Trends in Computer Networks and Distributed Systems Security: Second Int'l Conf., Trivandrum, India, Springer Berlin Heidelberg, Mar. 13-14, 2014, pp. 440-450.

Sun, Li, Steven Versteeg, Serdar Bozta, and Trevor Yann, "Pattern Recognition Techniques for the Classification of Malware Packers," ACISP 2010, Sydney, Australia, Jul. 5-7, 2010, pp. 370-390.

Nataraj, Lakshmanan, Gregoire Jacob, and B. S. Manjunath, "Detecting Packed executables based on raw binary data," VRL, ECE, 2010, 6 pgs.

Tang, Yuchun, Sven Krasser, Yuanchen He, Weilal Yang, and Dmitri Alperovitch, "Support Vector Machines and Random Forests Modeling for Spam Senders Behavior Analysis," 2008 IEEE Global Telecommunications Conf., IEEE, 2008, pp. 1-5.

S. Krasser, B. Meyer and p. Crenshaw, "Valkyrie: Behavioral Malware Detection Using Global Kernel-Level Telemetry Data," 2015 IEEE 25th Int'l Workshop on Machine Learning for Signal Processing, Boston, MA, 2015, pp. 1-6.

Hsu, Chih-Wei, Chih-Chung Chang, and Chih-Jen Lin, "A Practical Guide to Support Vector Classification," Department of Computer Science, Taiwan, 2003 (last updated Apr. 15, 2010), 16 pgs.

Krasser, Sven, Yuchun Tang, Jeremy Gould, Dmitri Alperovitch, and Paul Judge, "Identifying Image Spam Based on Header and File Properties Using C4. 5 Decision Trees and Support Vector Machine Learning," Proceedings of the 2007 IEEE Workshop on Information Assurance, West Point, NY, Jun. 2007, 7 pgs.

Cynomix malware visualization tool, The Wayback Machine—https://web.archive.org/web/20141006050639/http://cynomix.org:80/, Cynomix, 2 pgs.

Check Point Anti-Bot Software Blade Product Sheet, The Wayback Machine—https://web.archive.org/web/20150320181749/http://www.checkpoint.com/products/anti-bot-software-blade/index.html/, Check Point Software Technologies Ltd., 2015, 5 pgs.

Check Point Anti-Spam Software Blade Product Sheet, The Wayback Machine—https://web.archive.org/web/20150316022003/http://www.checkpoint.com:80//products/anti-spam-email-security-software-blade/index.html/, Check Point Software Technologies Ltd., 2015, 3 pgs.

(56) References Cited

OTHER PUBLICATIONS

Check Point URL Filtering Software Blade Product Sheet, The Wayback Machine—https://web.archive.org/web/20150317044930/http://www.checkpoint.com:80/products/url-filtering-software-blade/index.html/, 3 pgs.

Check Point Secure Web Gateway Product Sheet, The Wayback Machine—https://web.archive.org/web/20150313011752/http://www.checkpoint.com:80/products/n ext-generation-secure-web-gateway/index.html/, Check Point Software Technologies Ltd., 2015, 3 pgs.

McAfee Email Protection Product Sheet, The Wayback Machine—https://web.archive.org/web/20150317020514/http://www.mcafee.com/us/products/email-protection.aspx, McAfee Corp., San Jose, CA, 2015, 2 pgs.

McAfee Web Protection Product Sheet, The Wayback Machine—https://web.archive.org/web/20150317030901/http://www.mcafee.com/US /products/web-protection.aspx/, McAfee Corp., San Jose, CA, 2014, 2 pgs.

McAfee Content Security Suite Product Sheet, The Wayback Machine—https://web.archive.org/web/20140122063324/http://www.mcafee.com/us/products/content-security-suite.aspx/, McAfee Corp., San Jose, CA, 2014, 11 pgs.

McAfee Mobile Virus Scan Product Sheet, The Wayback Machine—https://web.archive.org/web/20150317022132/http://www.mcafee.com/us/products/virusscan-mobile.aspx/, McAfee Corp., San Jose, CA, 2015, 2 pgs.

McAfee Advanced Threat Defense Product Sheet, The Wayback Machine—https://web.archive.org/web/20140122063921/http://www.mcafee.com/us/products/advanced-threat-defense.aspx/, McAfee Corp., San Jose, CA, 2014, 5 pgs.

McAfee Endpoint Protection Product Sheet, The Wayback Machine—https://web.archive.org/web/20140122063414/http://www.mcafee.com/us/products/endpoint-protection-advaced-suite.aspx/, McAfee Corp., San Jose, CA, 2014, 11 pgs.

Check Point Threat Prevention Appliance Product Sheet, The Wayback Machine—https://web.archive.org/web/20131219213701/http://www.checkpoint.com:80/products/secure-web-gateway-appliance/ind.../, Check Point Software Technologies Ltd., 2013, 5 pgs.

Symantec Instant Messaging Security.cloud Product Sheet, The Wayback Machine—https://web.archive.org/web/20140122064248/http://www.symantec.com/us/products/instant-messaging-secur.../, Symantec, Cupertino, CA, 2014, 13 pgs.

Symantec Web Security Product Sheet, The Wayback Machine—https://web.archive.org/web/20150423061313/http://www.symantec.com:80/ /web-security-cloud/, Symantec, Cupertino, CA, 2015, 13 pgs.

Symantec AntiSpam Product Sheet, The Wayback Machine—https://web.archive.org/web/20140122071106/http://www.symantec.com/premium-antispam/, Symantec, Cupertino, CA, 2014, 12 pgs.

Symantec Email Security Product Sheet, The Wayback Machine - https://web.archive.org/web/20140122064243/http://www.symantec.com/email-security-cloud, Symantec, Cupertino, CA, 2014, 13 pgs.

White Paper: Endpoint Protection.cloud, Technical Product Overview, Symantec, Mountain View, CA, 2011, 13 pgs.

Webroot SecureAnywhere Web Security Service Datasheet, Endpoint Protection, Webroot Inc., Broomfield, CO, Jan. 2015, 4 pgs.

Trend Micro InterScan Messaging Security Datasheet, Trend Micro Inc., 2014, 4 pgs.

Trend Micro Apex One (Mac), Administrator's Guide, Trend Micro Inc., Version 2019, 170 pgs.

Trend Micro Worry-Free Business Security Services Datasheet, Trend Micro Inc., 2010, 2 pgs.

File Reputation Service Datasheet, Open Text and BrightCloud, 2022, 2 pgs.

BrightCloud Mobile App Reputation Service Datasheet, Webroot Inc., Broomfield, CO, Feb. 2014, 4 pgs.

BrightCloud IP Reputation Service Datasheet, BrightCloud, copyright 2022, 2 pgs.

BrightCloud Web Classification Service and Web Reputation Services Datasheet, BrightCloud, 2022, 4 pgs.

BrightCloud Real-Time Anti-Phishing Service Datasheet, BrightCloud, 2022, 2 pgs.

Trend Micro Smart Protection Server 2.6, Administrator's Guide, Trend Micro Inc., Apr. 2013, 86 pgs.

Trend Micro NeatSuite for small and medium businesses Datasheet, Trend Micro Inc., 2004, 2 pgs.

Trend Micro Client/Service Suite for small and medium businesses Datasheet, Trend Micro Inc., 2003-2004, 2 pgs.

Trend Micro Deep Discovery Analyzer Datasheet, Trend Micro Inc., 2014, 3 pgs.

Trend Micro Hosted Email Security Datasheet, Trend Micro Inc., 2015, 2 pgs.

Abraham, Ajith, Jain, Ravi, Johnson, Thomas, and Han, Sang Yong, D-SCIDS: Distributed Soft Computing Intrusion Detection System, Journal of Network and Computer Application, 2007, pp. 81-98.

Dai, Shuaifu, Liu, Yaxi, Wang, Tielei, Wei, Tao, and ZOU, Wei, Behavior-Based Malware Detection on Mobile Phone, IEEE, Sep. 25, 2010, 4 pgs.

Del Grosso, Nick, It's Time to Rethink your Corporate Malware Strategy, SANS Institute, Feb. 24, 2002, 12 pgs.

Jiang, Xiao, Hao, Zhiyu, and Wang, Yanming, A Malware Sample Capturing and Tracking System, 2010 Second WRI World Congress on Software Engineering, IEEE, 2010, pp. 69-72.

Kumar, Brijesh and Katsinis, Constantine, A Network Based Approach to Malware Detection in Large IT Infrastructures, Ninth IEEE Int'l Symposium on Network Computing and Application, Jul. 17, 2010, pp. 188-191.

Scanlan, Joel, Lorimer, Samuel, Hartnett, Jacky, and Manderson, Kevin, Intrusion Detection by Intelligent Analysis of Data Across Multiple Gateways in Real-Time, School of Computing, University of Tasmania, 8 pgs.

Bhattacharyya, Manasi, Hershkop, Shlomo, and Eskin, Eleazar, MET: An Experimental System for Malicious Email Tracking, 2002, 8 pgs.

Blue Coat WebFilter product sheet, Block Malware and Filter Content According to Strict Policy Controls, EdgeBlue.com, 1 pg. at https://web.archive.org/web/20101122082933/http://www.edgeblue.com:80/WebFilter.asp.

Colajanni, Michele, Gozzi, Daniele, and Marchetti, Mirco, Collaborative Architecture for Malware Detection and Analysis, Int'l Federation for Information Processing, Proceedings of the IFIP TC 11 23$^{rd}$ Int'l Information Security Conf., vol. 278, 2008, pp. 79-93.

Firstbrook, Peter, and Orans, Lawrence, Magic Quadrant for Secure Web Gateway, Gartner Ras Core Research Note G00172783, Jan. 8, 2010, 20 pgs.

Marchetti, Mirco, Gozzi, Daniele, and Colajanni, Michele, Peer-to-Peer Architecture for Collaborative Intrusion and Malware Detection on a Large Scale, Int'l Journal of Information Security, ISC '09: Proceedings of the 12th Int'l Conf. on Information Security, 2009, pp. 475-490.

Oberheide, Jon, Cooke, Evan and Jahanian, Farnam, CloudAV: N-Version Antivirus in a Network Cloud, USENIX Security Symposium, San Jose, CA, 2008, 24 pgs.

Royal, Paul, Halpin, Mitch, Dagon, David, Edmonds, Robert, Lee, Wenke, PolyUnpack: Automating the Hidden-Code Extraction of Unpack-Executing Malware, 22$^{nd}$ Annual Computer Security Applications Conf., 2006, 11 pgs.

Xin, Wang, Ting-Lei, Huang, and Zhi-Jian, Ren, Research on the Anti-Virus System of Military Network Based on Cloud Security, Oct. 2010, IEEE, pp. 656-659.

Zheng, Xufel, and Fang, Yonghui, An AIS-based Cloud Security Model, Int'l Conf. on Intelligent Control and Information Processing, Dalian, CN, Aug. 13-15, 2010, pp. 153-158.

James P. Anderson Co., Computer Security Threat Monitoring and Surveillance, Feb. 26, 1980 (Rev. Apr. 15, 1980), Fort Washington, PA, 56 pgs.

Anderson, Debra, Lunt, Teresa F., Javitz, Harold, tamaru, Ann, Valdes, Alfonso, Detecting Unusual Program Behavior Using the Statistical Component of the Next-generation Intrusion Detection Expert System (NIDES), Trusted Information Systems, Mountain View, CA (Contract No. 910097C), May 1995, 86 pgs.

Berk, Vincent, et al., Designing a Framework for Active Worm Detection on Global Networks, IEEE, Mar. 24, 2003, 13 pgs.

(56)  References Cited

OTHER PUBLICATIONS

Bolton, Stacy, Aladdin Esafe Enterprise v3.0, Global Information Assurance Certification Paper, Sans Institute, Aug. 1, 2002, 18 pgs.
Cai, Min, et al., Collaborative Internet Worm Containment, 3, IEEE Computer Society, Jun. 13, 2005, pp. 25-33.
Chuvakin, Anton, Security Event Analysis through Correlation, Information Systems Security, May/Jun. 2004, pp. 13-18.
Conry-Murray, Andrew, Product Focus: Behavior-Blocking Stops Unknown Malicious Code, Network Magazine, Jun. 5, 2002, 10 pgs. at http://networkmagazine.com/article/NMG20020603S0009/1.
CoreTrace Corporation: ECM 3000, Preliminary Product and Technical Information, 2 pgs., retrieved Sep. 12, 2022, at https://web.archive.org/web/20050307224541/http://www.coretrace.com:80/ecm.html.
Websense CPM Explorer v6.1, Administrator's Guide, Websense, Inc., San Diego, CA, Sep. 19, 2005, 77 pgs.
Dagon, David, et al., HoneyStat: Local Worm Detection Using Honeypots, Recent Advances In Intrusion Detection, RAID 2004, pp. 39-58.
Denning, Dorothy E., An Intrusion-Detection Model, IEEE Transactions on Software Engineering, vol. SE-13, No. 2, Feb. 1987, pp. 222-232.
Forrest, Stephanie, Hofmeyr, Steven A., and Somayaji, Anil, and Longstaff, Thomas A., A Sense of Self for Unix Processes, IEEE Symposium on Security and Privacy, IEEE Computer Society Press, Los Alamitos, CA, 1996, pp. 120-128.
Forrest, Stephanie, Hofmeyr, Steven A., and Somayaji, Anil, Computer Immunology, Communications of the ACM, vol. 40, Oct. 1997, pp. 88-96.
Hedberg, Sara, Combating Computer Viruses: IBM's new computer immune system, Industry Spotlight, IEEE Explore, Summer 1996, pp. 9-11.
Higgins, Kelly Jackson, Sandbox the Hackers—They're spreading viruses and stealth code. One Way to stop them: block, or 'sandbox,' the culprits, InternetWeek, Manhasset Iss. 858, Apr. 23, 2001, pp. 29-33.
Inoue, Hajime and Forrest, Stephanie, Anomaly Intrusion Detection in Dynamic Execution Environments, NSPW Proceedings of the 2002 Workshop on New Security Paradigms, Sep. 2002, pp. 52-60.
Javitz, Harold S. and ValdeS, Alfonso, The Nides Statistical Component Description and Justification, Annual Report, SRI Project 3131, Mar. 7, 1994, 52 pgs.
King, Christopher M., Security Management: Making Sense Of Events, Business Communications Review, Sep. 2001, pp. 32-38.
Leung, Linda, Advanced Technologies Aim to Protect Network Asset, Profiling Cybercrime: Network Threats And Defense Strategies, Nov. 29, 2004, p. 56.
Nance, Barry, Server-Based Java Security Products Help Guard Your Enterprise Flank, Network Computing (www.networkcomputing.com), Dec. 1, 1998, pp. 86-99.
NetRanger Intrustion Detection System, Wheel Group Corporation, San Antonio, TX, 1997, 4 pgs.
NeuSecure 3.0, Security Management and Incident Response Platform for the Enterprise, GuardedNet, 2005, 37 pgs. at https://web.archive.org/web/20040403183424/http://www.guarded.net:80/neusecure3.0.html.
Okena StormWatch, A New Approach To Intrusion Detection: Intrusion Prevention, Intrusion Prevention White Paper, Okena, Waltham, MA, 2002, 17 pgs.
Prevx Home 2.0 Launches as Version 1.0 continues to outperform major league anti-virus and firewall products, Prevx—News and Press Releases, San Francisco, CA, 2004, 2 pgs.
PR Newswire, Finjan Software and F-Secure to Deliver Proactive Content Security For Corporate PCs in New Era of Malicious Code, PR Newswire Association LLC, New York, NY, Oct. 30, 2000, 4 pgs.
Rivest, R., The MD5 Message-Digest Algorithm, MIT Laboratory for Computer Science and RSA Data Security, Inc., Apr. 1992, 21 pgs.

SandBox Security's Secure4U, Sandbox Security AG, Germany, last modified Dec. 7, 2000, 151 pgs. at https://web.archive.org/web/20010304104828/ http://sandboxsecurity.com:80/products/index.htm.
Shieh, Shiuh-Pyng and Gilgor, Virgil D., A Pattern-Oriented Intrusion-Detection Model and Its Applications, IEEE, 1991, 16 pgs.
Shieh, Shiuh-Pyng and Gilgor, Virgil D., On a Pattern-Oriented Model for Intrusion Detection, IEEE Transactions on Knowledge and Data Engineering, vol. 9, No. 4, Jul./Aug. 1997, pp. 661-667.
Finjan SurfinGuard Pro 5.7, at https://web.archive.org/web/20050207211129/http://www.finjan.com:80/Products/HomeUsers-SurfinGuardPro/default.asp (last visited Sep. 11, 2022) Finjan Software, 2005, 12 pgs.
Using Management Center for Cisco Security Agents 4.0, Cisco Systems, Inc., San Jose, CA, 2003, 413 pgs.
Webroot Spy Sweeper Enterprise: Key Features, Webroot Software, Inc., Boulder, CO, copyright 2002-2005, 2 pgs.
The Digital Immune System, Technical Brief, Symantec, Cupertino, CA, 2001, 16 pgs.
White, Steve R., Swimmer, Morton, Pring, Edward, Arnold, William C., Chess, David M. and Morar, John F., "Anatomy of a Commercial-Grade Immune System", 1999, 28 pgs.
Malin, C.H., Casey, E. and Aquilina, J.M., Malware Forensics: Investigating And Analyzing Malicious Code, Syngress, 2008, 692 pgs.
Bace, Rebecca, and Mell, Peter, NIST Special Publication On Intrusion Detection Systems, Macmillan Technical Publishing, Indianapolis, IN, 2001, 143 pgs.
Snapp, Steven R., et al., A System for Distributed Intrusion Detection, San Francisco, Feb. 25-Mar. 1, 1991, 11 pgs.
Security Threat Manager Product Sheet, OpenService, Inc., https://webarchive.org/web/20031002025323/http://www.open.com:80/products/products.shtml, copyright 2002-2003, 27 pgs.
Goel, Ashvin, Forensix: A Robust, High-Performance Reconstruction System, Proceedings of the 25th IEEE Int'l Conf. on Distributed Computing Systems Workshops, 2005, 8 pgs.
Lunt, Teresa F et al., IDES: The Enhanced Prototype, A Real-Time Intrusion-Detection Expert System, Computer Science Laboratory, SRI International, Menlo Park, CA, Oct. 1988, 89 pgs.
Klosterboer, Larry, Implementing ITIL Configuration Management, IBM Press, 2007, 252 pgs.
Debar, Herve et al., Aggregation and Correlation of Intrusion-Detection Alerts, RAID 2001, LNCS 2212, 2001, pp. 85-103.
Carrier, Brian D. and Matheny, B., Methods for Cluster-Based Incident Detection, Information Assurance Workshop, 2004, Proceedings, Second IEEE International, IEEE, May 2004, 8 pgs.
Xie, Yinglian, Kim, Hyang-Ah, O'Hallaron, David R., Reiter, Michael K. and Zhang, Hui, "Seurat: A Pointillist Approach To Anomaly Detection," In Recent Advances in Intrusion Detection: 7th Int'l Symposium, RAID 2004, Sophia Antipolis, France, Sep. 15-17, 2004, 20 pgs.
Burbeck, Kalle and Nadjm-Tehrani, Simin, Adwice—Anomaly Detection with Real-Time Incremental Clustering, Information Security and Cryptology, 7th Int'l Conf., Seoul, KR, Dec. 2-3, 2004, 26 pgs.
Just, J.E., et al., "Learning Unknown Attacks—A Start," Foundations of Intrusion Tolerant Systems, IEEE, Dec. 2003, 19 pgs.
Parkhouse, Jayne, Pelican SafeTNet 2.0 Product Review, The Wayback Machine https://web.archive.org/web/20030729191240/http://www.scmagazine.com:80/scma . . ., SC Magazine, Jun. 2000, 5 pgs.
Valdes, Alfonso, and Keith Skinner, "Probabilistic Alert Correlation," In Recent Advances in Intrusion Detection: 4th Int'l Symposium, RAID 2001 Davis, CA, Oct. 10-12, 2001, pp. 54-68.
Tolle, Jens, Jahnke, Marko, Bussmann, Michael, and Henkel, Sven, "Meta IDS Environments: An Event Message Anomaly Detection Approach," Third IEEE Int'l Workshop on Information Assurance, IEEE, 2005, pp. 85-94.
Defendant Forcepoint LLC's Preliminary Invalidity Contentions, *Webroot, Inc. and Open Text, Inc. v. Forcepoint LLC*, No. 6:22-CV-00342-ADA-DTG (WD, Texas), Sep. 13, 2022, 149 pgs.

(56) References Cited

OTHER PUBLICATIONS

Defendant Sophos Ltd.'s Preliminary Invalidity Contentions, *Webroot, Inc. and Open Text, Inc.. v. Sophos Ltd.*, CA. No. 6:22-CV-00240-ADA-DTG, W.D. Tex., Sep. 13, 2022, 127 pgs.

Defendant's Preliminary Invalidity Contentions, *Webroot Inc. and Open Text, Inc.. v. Trend Micro Inc.*, CA. No. 6:22-CV-00239-ADA-DTG, W.D. Tex., Sep. 13, 2022, 125 pgs.

Defendant AO Kaspersky Lab.'s Preliminary Invalidity Contentions, *Webroot Inc. and Open Text, Inc.* v. *AO Kaspersky Lab*, CA. No. 6:22-CV-00243-ADA-DTG, W.D. Tex., Sep. 14, 2022, 23 pgs.

Crowdstrike's Preliminary Invalidity Contentions, *Webroot, Inc. and Open Text, Inc.* v. *Crowdstrike, Inc.*, No. 6:22-CV-00241-ADA-DTG (WD, Texas), Sep. 13, 2022, 62 pgs.

Crowdstrike's Preliminary Invalidity Contentions (Patents Asserted by Amendment), *Webroot, Inc. and Open Text, Inc.* v. *Crowdstrike, Inc.*, No. 6:22 CV-00241-ADA-DTG (WD, Texas), Feb. 21, 2023, 86 pgs.

Crowdstrike's First Supplemental Preliminary Invalidity Contentions, *Webroot, Inc. and Open Text, Inc.* v. *Crowdstrike, Inc.*, No. 6:22 CV-00241-ADA-DTG (WD, Texas), Apr. 25, 2023, 85 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, 205 pgs.

Defendant AO Kaspersky Lab's Preliminary Invalidity Contentions—Appendix A, Prior Art Index, *Webroot, Inc. and Open Text, Inc.* v. *AO Kaspersky Lab*, No. 6:22-CV-00243 (WD, Texas), Sep. 14, 2022, 8 pgs.

Defendant AO Kaspersky Lab's Preliminary Invalidity Contentions—Appendix B, Invalidity Claim Chart Index, *Webroot, Inc. and Open Text, Inc.* v. *AO Kaspersky Lab*, No. 6:22-CV-00243 (WD, Texas), Sep. 14, 2022, 1 pg.

Defendant AO Kaspersky Lab's Preliminary Invalidity Contentions, *Webroot, Inc. and Open Text, Inc.* v. *AO Kaspersky Lab*, No. 6:22-CV-00243 (WD, Texas), Feb. 21, 2023, 23 pgs.

Defendant AO Kaspersky Lab's Preliminary Invalidity Contentions—Appendix C, Prior Art Index, *Webroot, Inc. and Open Text, Inc.* v. *AO Kaspersky Lab*, No. 6:22-CV-00243 (WD, Texas), Feb. 21, 2023, 4 pgs.

Defendant AO Kaspersky Lab's Preliminary Invalidity Contentions—Appendix D, Invalidity Claim Chart Index, *Webroot, Inc. and Open Text, Inc.* v. *AO Kaspersky Lab*, No. 6:22-CV-00243 (WD, Texas), Feb. 21, 2023, 1 pg.

Defendant Sophos Ltd.'s Preliminary Invalidity Contentions for Patent Plaintiffs Added by Amendment, *Webroot, Inc. and Open Text, Inc.* v. *Sophos Ltd.*, No. 6:22-CV-00240-ADA-DTG (WD, Texas), Feb. 21, 2023, 167 pgs.

Defendant's Preliminary Invalidity Contentions, *Webroot, Inc. and Open Text, Inc.* v. *Trend Micro Inc.*, No. 6:22-CV-239-ADA-DTG, Feb. 21, 2023, 94 pgs.

Defendant Crowdstrike Holdings, Inc.'s Preliminary Invalidity Contentions, Exhibit 045-A-1, *Webroot, Inc. and Open Text, Inc.* v. *Crowdstrike Holdings, Inc.*, No. 6:22-CV-00241-ADA-DTG (WD, Texas), Sep. 13, 2022, 35 pgs.

Defendant Crowdstrike Holdings, Inc.'s Preliminary Invalidity Contentions, Exhibit 045-A-2, *Webroot, Inc. and Open Text, Inc.* v. *Crowdstrike Holdings, Inc.*, No. 6:22-CV-00241-ADA-DTG (WD, Texas), Sep. 13, 2022, 36 pgs.

Defendant Crowdstrike Holdings, Inc.'s Preliminary Invalidity Contentions, Exhibit 045-A-3, *Webroot, Inc. and Open Text, Inc.* v. *Crowdstrike Holdings, Inc.*, No. 6:22-CV-00241-ADA-DTG (WD, Texas), Sep. 13, 2022, 52 pgs.

Defendant Crowdstrike Holdings, Inc.'s Preliminary Invalidity Contentions, Exhibit 045-A-4, *Webroot, Inc. and Open Text, Inc.* v. *Crowdstrike Holdings, Inc.*, No. 6:22-CV-00241-ADA-DTG (WD, Texas), Sep. 13, 2022, 34 pgs.

Defendant Crowdstrike Holdings, Inc.'s Preliminary Invalidity Contentions, Exhibit 045-A-5, *Webroot, Inc. and Open Text, Inc.* v. *Crowdstrike Holdings, Inc.*, No. 6:22-CV-00241-ADA-DTG (WD, Texas), Sep. 13, 2022, 33 pgs.

Defendant Crowdstrike Holdings, Inc.'s Preliminary Invalidity Contentions, Exhibit 045-A-6, *Webroot, Inc. and Open Text, Inc.* v. *Crowdstrike Holdings, Inc.*, No. 6:22-CV-00241-ADA-DTG (WD, Texas), Sep. 13, 2022, 15 pgs.

Defendant Crowdstrike Holdings, Inc.'s Preliminary Invalidity Contentions, Exhibit 045-A-7, *Webroot, Inc. and Open Text, Inc.* v. *Crowdstrike Holdings, Inc.*, No. 6:22-CV-00241-ADA-DTG (WD, Texas), Sep. 13, 2022, 16 pgs.

Defendant Crowdstrike Holdings, Inc.'s Preliminary Invalidity Contentions, Exhibit 045-A-8, *Webroot, Inc. and Open Text, Inc.* v. *Crowdstrike Holdings, Inc.*, No. 6:22-CV-00241-ADA-DTG (WD, Texas), Sep. 13, 2022, 69 pgs.

Defendant Crowdstrike Holdings, Inc.'s Preliminary Invalidity Contentions, Exhibit 045-A-9, *Webroot, Inc. and Open Text, Inc.* v. *Crowdstrike Holdings, Inc.*, No. 6:22-CV-00241-ADA-DTG (WD, Texas), Sep. 13, 2022, 21 pgs.

Defendant Crowdstrike Holdings, Inc.'s Preliminary Invalidity Contentions, Exhibit 045-A-10, *Webroot, Inc. and Open Text, Inc.* v. *Crowdstrike Holdings, Inc.*, No. 6:22-CV-00241-ADA-DTG (WD, Texas), Sep. 13, 2022, 21 pgs.

Defendant Crowdstrike Holdings, Inc.'s Preliminary Invalidity Contentions, Exhibit 045-A-11, *Webroot, Inc. and Open Text, Inc.* v. *Crowdstrike Holdings, Inc.*, No. 6:22-CV-00241-ADA-DTG (WD, Texas), Sep. 13, 2022, 38 pgs.

Defendant Crowdstrike Holdings, Inc.'s Preliminary Invalidity Contentions, Exhibit 045-A-12, *Webroot, Inc. and Open Text, Inc.* v. *Crowdstrike Holdings, Inc.*, No. 6:22-CV-00241-ADA-DTG (WD, Texas), Sep. 13, 2022, 34 pgs.

Defendant Crowdstrike Holdings, Inc.'s Preliminary Invalidity Contentions, Exhibit 045-A-13, *Webroot, Inc. and Open Text, Inc.* v. *Crowdstrike Holdings, Inc.*, No. 6:22-CV-00241-ADA-DTG (WD, Texas), Sep. 13, 2022, 50 pgs.

Defendant Crowdstrike Holdings, Inc.'s Preliminary Invalidity Contentions, Exhibit 045-A-14, *Webroot, Inc. and Open Text, Inc.* v. *Crowdstrike Holdings, Inc.*, No. 6:22-CV-00241-ADA-DTG (WD, Texas), Sep. 13, 2022, 38 pgs.

Defendant Crowdstrike Holdings, Inc.'s Preliminary Invalidity Contentions, Exhibit 045-A-15, *Webroot, Inc. and Open Text, Inc.* v. *Crowdstrike Holdings, Inc.*, No. 6:22-CV-00241-ADA-DTG (WD, Texas), Sep. 13, 2022, 43 pgs.

Defendant Crowdstrike Holdings, Inc.'s Preliminary Invalidity Contentions, Exhibit 045-A-16, *Webroot, Inc. and Open Text, Inc.* v. *Crowdstrike Holdings, Inc.*, No. 6:22-CV-00241-ADA-DTG (WD, Texas), Sep. 13, 2022, 52 pgs.

Defendant Crowdstrike Holdings, Inc.'s Preliminary Invalidity Contentions, Exhibit 045-A-17, *Webroot, Inc. and Open Text, Inc.* v. *Crowdstrike Holdings, Inc.*, No. 6:22-CV-00241-ADA-DTG (WD, Texas), Sep. 13, 2022, 47 pgs.

Defendant Crowdstrike Holdings, Inc.'s Preliminary Invalidity Contentions, Exhibit 045-A-18, *Webroot, Inc. and Open Text, Inc.* v. *Crowdstrike Holdings, Inc.*, No. 6:22-CV-00241-ADA-DTG (WD, Texas), Sep. 13, 2022, 57 pgs.

Defendant Crowdstrike Holdings, Inc.'s Preliminary Invalidity Contentions, Exhibit 045-A-19, *Webroot, Inc. and Open Text, Inc.* v. *Crowdstrike Holdings, Inc.*, No. 6:22-CV-00241-ADA-DTG (WD, Texas), Sep. 13, 2022, 66 pgs.

Defendant Crowdstrike Holdings, Inc.'s Preliminary Invalidity Contentions, Exhibit 045-A-20, *Webroot, Inc. and Open Text, Inc.* v. *Crowdstrike Holdings, Inc.*, No. 6:22-CV-00241-ADA-DTG (WD, Texas), Sep. 13, 2022, 97 pgs.

Defendant Crowdstrike Holdings, Inc.'s Preliminary Invalidity Contentions, Exhibit 045-A-21, *Webroot, Inc. and Open Text, Inc.* v. *Crowdstrike Holdings, Inc.*, No. 6:22-CV-00241-ADA-DTG (WD, Texas), Sep. 13, 2022, 46 pgs.

Defendant Crowdstrike Holdings, Inc.'s Preliminary Invalidity Contentions, Exhibit 045-A-22, *Webroot, Inc. and Open Text, Inc.* v. *Crowdstrike Holdings, Inc.*, No. 6:22-CV-00241-ADA-DTG (Wd, Texas), Sep. 13, 2022, 15 pgs.

Defendant Crowdstrike Holdings, Inc.'s Preliminary Invalidity Contentions, Exhibit 045-A-23, *Webroot, Inc. and Open Text, Inc.* v. *Crowdstrike Holdings, Inc.*, No. 6:22-CV-00241-ADA-DTG (WD, Texas), Sep. 13, 2022, 17 pgs.

(56)        References Cited

OTHER PUBLICATIONS

Defendant Crowdstrike Holdings, Inc.'s Preliminary Invalidity Contentions, Exhibit 045-A-24, *Webroot, Inc. and Open Text, Inc.* v. *Crowdstrike Holdings, Inc.*, No. 6:22-CV-00241-ADA-DTG (WD, Texas), Sep. 13, 2022, 75 pgs.

Defendant Crowdstrike Holdings, Inc.'s Preliminary Invalidity Contentions, Exhibit 045-A-25, *Webroot, Inc. and Open Text, Inc.* v. *Crowdstrike Holdings, Inc.*, No. 6:22-CV-00241-ADA-DTG (WD, Texas), Sep. 13, 2022, 16 pgs.

Defendant Crowdstrike Holdings, Inc.'s Preliminary Invalidity Contentions, Exhibit 045-A-26, *Webroot, Inc. and Open Text, Inc.* v. *Crowdstrike Holdings, Inc.*, No. 6:22-CV-00241-ADA-DTG (WD, Texas), Sep. 13, 2022, 18 pgs.

Defendant Crowdstrike Holdings, Inc.'s Preliminary Invalidity Contentions, Exhibit 045-A-27, *Webroot, Inc. and Open Text, Inc.* v. *Crowdstrike Holdings, Inc.*, No. 6:22-CV-00241-ADA-DTG (WD, Texas), Sep. 13, 2022, 25 pgs.

Defendant Crowdstrike Holdings, Inc.'s Preliminary Invalidity Contentions, Exhibit 045-A-28, *Webroot, Inc. and Open Text, Inc.* v. *Crowdstrike Holdings, Inc.*, No. 6:22-CV-00241-ADA-DTG (WD, Texas), Sep. 13, 2022, 14 pgs.

Defendant Crowdstrike Holdings, Inc.'s Preliminary Invalidity Contentions, Exhibit 045-A-29, *Webroot, Inc. and Open Text, Inc.* v. *Crowdstrike Holdings, Inc.*, No. 6:22-CV-00241-ADA-DTG (WD, Texas), Sep. 13, 2022, 40 pgs.

Defendant Crowdstrike Holdings, Inc.'s Preliminary Invalidity Contentions, Exhibit 045-A-30, *Webroot, Inc. and Open Text, Inc.* v. *Crowdstrike Holdings, Inc.*, No. 6:22-CV-00241-ADA-DTG (WD, Texas), Sep. 13, 2022, 19 pgs.

Defendant Crowdstrike Holdings, Inc.'s Preliminary Invalidity Contentions, Exhibit 045-A-31, *Webroot, Inc. and Open Text, Inc.* v. *Crowdstrike Holdings, Inc.*, No. 6:22-CV-00241-ADA-DTG (WD, Texas), Sep. 13, 2022, 45 pgs.

Defendant Crowdstrike Holdings, Inc.'s Preliminary Invalidity Contentions, Exhibit 045-A-32, *Webroot, Inc. and Open Text, Inc.* v. *Crowdstrike Holdings, Inc.*, No. 6:22-CV-00241-ADA-DTG (WD, Texas), Sep. 13, 2022, 19 pgs.

Defendant Crowdstrike Holdings, Inc.'s Preliminary Invalidity Contentions, Exhibit 045-A-33, *Webroot, Inc. and Open Text, Inc.* v. *Crowdstrike Holdings, Inc.*, No. 6:22-CV-00241-ADA-DTG (WD, Texas), Sep. 13, 2022, 42 pgs.

Defendant Crowdstrike Holdings, Inc.'s Preliminary Invalidity Contentions, Exhibit 045-A-34, *Webroot, Inc. and Open Text, Inc.* v. *Crowdstrike Holdings, Inc.*, No. 6:22-CV-00241-ADA-DTG (WD, Texas), Sep. 13, 2022, 51 pgs.

Defendant Crowdstrike Holdings, Inc.'s Preliminary Invalidity Contentions, Exhibit 045-B, *Webroot, Inc. and Open Text, Inc.* v. *Crowdstrike Holdings, Inc.*, No. 6:22-CV-00241-ADA-DTG (WD, Texas), Sep. 13, 2022, 129 pgs.

Defendant Crowdstrike Holdings, Inc.'s Preliminary Invalidity Contentions, Exhibit 224-A-1, *Webroot, Inc. and Open Text, Inc.* v. *Crowdstrike Holdings, Inc.*, No. 6:22-CV-00241-ADA-DTG (WD, Texas), Sep. 13, 2022, 53 pgs.

Defendant Crowdstrike Holdings, Inc.'s Preliminary Invalidity Contentions, Exhibit 224-A-2, *Webroot, Inc. and Open Text, Inc.* v. *Crowdstrike Holdings, Inc.*, No. 6:22-CV-00241-ADA-DTG (WD, Texas), Sep. 13, 2022, 53 pgs.

Defendant Crowdstrike Holdings, Inc.'s Preliminary Invalidity Contentions, Exhibit 224-A-3, *Webroot, Inc. and Open Text, Inc.* v. *Crowdstrike Holdings, Inc.*, No. 6:22-CV-00241-ADA-DTG (WD, Texas), Sep. 13, 2022, 73 pgs.

Defendant Crowdstrike Holdings, Inc.'s Preliminary Invalidity Contentions, Exhibit 224-A-4, *Webroot, Inc. and Open Text, Inc.* v. *Crowdstrike Holdings, Inc.*, No. 6:22-CV-00241-ADA-DTG (WD, Texas), Sep. 13, 2022, 47 pgs.

Defendant Crowdstrike Holdings, Inc.'s Preliminary Invalidity Contentions, Exhibit 224-A-5, *Webroot, Inc. and Open Text, Inc.* v. *Crowdstrike Holdings, Inc.*, No. 6:22-CV-00241-ADA-DTG (WD, Texas), Sep. 13, 2022, 55 pgs.

Defendant Crowdstrike Holdings, Inc.'s Preliminary Invalidity Contentions, Exhibit 224-A-6, *Webroot, Inc. and Open Text, Inc.* v. *Crowdstrike Holdings, Inc.*, No. 6:22-CV-00241-ADA-DTG (WD, Texas), Sep. 13, 2022, 34 pgs.

Defendant Crowdstrike Holdings, Inc.'s Preliminary Invalidity Contentions, Exhibit 224-A-7, *Webroot, Inc. and Open Text, Inc.* v. *Crowdstrike Holdings, Inc.*, No. 6:22-CV-00241-ADA-DTG (WD, Texas), Sep. 13, 2022, 33 pgs.

Defendant Crowdstrike Holdings, Inc.'s Preliminary Invalidity Contentions, Exhibit 224-A-8, *Webroot, Inc. and Open Text, Inc.* v. *Crowdstrike Holdings, Inc.*, No. 6:22-CV-00241-ADA-DTG (WD, Texas), Sep. 13, 2022, 112 pgs.

Defendant Crowdstrike Holdings, Inc.'s Preliminary Invalidity Contentions, Exhibit 224-A-9, *Webroot, Inc. and Open Text, Inc.* v. *Crowdstrike Holdings, Inc.*, No. 6:22-CV-00241-ADA-DTG (WD, Texas), Sep. 13, 2022, 47 pgs.

Defendant Crowdstrike Holdings, Inc.'s Preliminary Invalidity Contentions, Exhibit 224-A-10, *Webroot, Inc. and Open Text, Inc.* v. *Crowdstrike Holdings, Inc.*, No. 6:22-CV-00241-ADA-DTG (WD, Texas), Sep. 13, 2022, 39 pgs.

Defendant Crowdstrike Holdings, Inc.'s Preliminary Invalidity Contentions, Exhibit 224-A-11, *Webroot, Inc. and Open Text, Inc.* v. *Crowdstrike Holdings, Inc.*, No. 6:22-CV-00241-ADA-DTG (WD, Texas), Sep. 13, 2022, 72 pgs.

Defendant Crowdstrike Holdings, Inc.'s Preliminary Invalidity Contentions, Exhibit 224-A-12, *Webroot, Inc. and Open Text, Inc.* v. *Crowdstrike Holdings, Inc.*, No. 6:22-CV-00241-ADA-DTG (WD, Texas), Sep. 13, 2022, 72 pgs.

Defendant Crowdstrike Holdings, Inc.'s Preliminary Invalidity Contentions, Exhibit 224-A-13, *Webroot, Inc. and Open Text, Inc.* v. *Crowdstrike Holdings, Inc.*, No. 6:22-CV-00241-ADA-DTG (WD, Texas), Sep. 13, 2022, 62 pgs.

Defendant Crowdstrike Holdings, Inc.'s Preliminary Invalidity Contentions, Exhibit 224-A-14, *Webroot, Inc. and Open Text, Inc.* v. *Crowdstrike Holdings, Inc.*, No. 6:22-CV-00241-ADA-DTG (WD, Texas), Sep. 13, 2022, 95 pgs.

Defendant Crowdstrike Holdings, Inc.'s Preliminary Invalidity Contentions, Exhibit 224-A-15, *Webroot, Inc. and Open Text, Inc.* v. *Crowdstrike Holdings, Inc.*, No. 6:22-CV-00241-ADA-DTG (WD, Texas), Sep. 13, 2022, 79 pgs.

Defendant Crowdstrike Holdings, Inc.'s Preliminary Invalidity Contentions, Exhibit 224-A-16, *Webroot, Inc. and Open Text, Inc.* v. *Crowdstrike Holdings, Inc.*, No. 6:22-CV-00241-ADA-DTG (WD, Texas), Sep. 13, 2022, 95 pgs.

Defendant Crowdstrike Holdings, Inc.'s Preliminary Invalidity Contentions, Exhibit 224-A-17, *Webroot, Inc. and Open Text, Inc.* v. *Crowdstrike Holdings, Inc.*, No. 6:22-CV-00241-ADA-DTG (WD, Texas), Sep. 13, 2022, 78 pgs.

Defendant Crowdstrike Holdings, Inc.'s Preliminary Invalidity Contentions, Exhibit 224-A-18, *Webroot, Inc. and Open Text, Inc.* v. *Crowdstrike Holdings, Inc.*, No. 6:22-CV-00241-ADA-DTG (WD, Texas), Sep. 13, 2022, 93 pgs.

Defendant Crowdstrike Holdings, Inc.'s Preliminary Invalidity Contentions, Exhibit 224-A-19, *Webroot, Inc. and Open Text, Inc.* v. *Crowdstrike Holdings, Inc.*, No. 6:22-CV-00241-ADA-DTG (WD, Texas), Sep. 13, 2022, 129 pgs.

Defendant Crowdstrike Holdings, Inc.'s Preliminary Invalidity Contentions, Exhibit 224-A-20, *Webroot, Inc. and Open Text, Inc.* v. *Crowdstrike Holdings, Inc.*, No. 6:22-CV-00241-ADA-DTG (WD, Texas), Sep. 13, 2022, 132 pgs.

Defendant Crowdstrike Holdings, Inc.'s Preliminary Invalidity Contentions, Exhibit 224-A-21, *Webroot, Inc. and Open Text, Inc.* v. *Crowdstrike Holdings, Inc.*, No. 6:22-CV-00241-ADA-DTG (WD, Texas), Sep. 13, 2022, 100 pgs.

Defendant Crowdstrike Holdings, Inc.'s Preliminary Invalidity Contentions, Exhibit 224-A-22, *Webroot, Inc. and Open Text, Inc.* v. *Crowdstrike Holdings, Inc.*, No. 6:22-CV-00241-ADA-DTG (WD, Texas), Sep. 13, 2022, 31 pgs.

Defendant Crowdstrike Holdings, Inc.'s Preliminary Invalidity Contentions, Exhibit 224-A-23, *Webroot, Inc. and Open Text, Inc.* v. *Crowdstrike Holdings, Inc.*, No. 6:22-CV-00241-ADA-DTG (WD, Texas), Sep. 13, 2022, 35 pgs.

(56) References Cited

OTHER PUBLICATIONS

Defendant Crowdstrike Holdings, Inc.'s Preliminary Invalidity Contentions, Exhibit 224-A-24, *Webroot, Inc. and Open Text, Inc.* v. *Crowdstrike Holdings, Inc.*, No. 6:22-CV-00241-ADA-DTG (WD, Texas), Sep. 13, 2022, 176 pgs.
Defendant Crowdstrike Holdings, Inc.'s Preliminary Invalidity Contentions, Exhibit 224-A-25, *Webroot, Inc. and Open Text, Inc.* v. *Crowdstrike Holdings, Inc.*, No. 6:22-CV-00241-ADA-DTG (WD, Texas), Sep. 13, 2022, 31 pgs.
Defendant Crowdstrike Holdings, Inc.'s Preliminary Invalidity Contentions, Exhibit 224-A-26, *Webroot, Inc. and Open Text, Inc.* v. *Crowdstrike Holdings, Inc.*, No. 6:22-CV-00241-ADA-DTG (WD, Texas), Sep. 13, 2022, 43 pgs.
Defendant Crowdstrike Holdings, Inc.'s Preliminary Invalidity Contentions, Exhibit 224-A-27, *Webroot, Inc. and Open Text, Inc.* v. *Crowdstrike Holdings, Inc.*, No. 6:22-CV-00241-ADA-DTG (WD, Texas), Sep. 13, 2022, 54 pgs.
Defendant Crowdstrike Holdings, Inc.'s Preliminary Invalidity Contentions, Exhibit 224-A-28, *Webroot, Inc. and Open Text, Inc.* v. *Crowdstrike Holdings, Inc.*, No. 6:22-CV-00241-ADA-DTG (WD, Texas), Sep. 13, 2022, 37 pgs.
Defendant Crowdstrike Holdings, Inc.'s Preliminary Invalidity Contentions, Exhibit 224-A-29, *Webroot, Inc. and Open Text, Inc.* v. *Crowdstrike Holdings, Inc.*, No. 6:22-CV-00241-ADA-DTG (WD, Texas), Sep. 13, 2022, 94 pgs.
Defendant Crowdstrike Holdings, Inc.'s Preliminary Invalidity Contentions, Exhibit 224-A-30, *Webroot, Inc. and Open Text, Inc.* v. *Crowdstrike Holdings, Inc.*, No. 6:22-CV-00241-ADA-DTG (WD, Texas), Sep. 13, 2022, 42 pgs.
Defendant Crowdstrike Holdings, Inc.'s Preliminary Invalidity Contentions, Exhibit 224-A-31, *Webroot, Inc. and Open Text, Inc.* v. *Crowdstrike Holdings, Inc.*, No. 6:22-CV-00241-ADA-DTG (WD, Texas), Sep. 13, 2022, 64 pgs.
Defendant Crowdstrike Holdings, Inc.'s Preliminary Invalidity Contentions, Exhibit 224-A-32, *Webroot, Inc. and Open Text, Inc.* v. *Crowdstrike Holdings, Inc.*, No. 6:22-CV-00241-ADA-DTG (WD, Texas), Sep. 13, 2022, 37 pgs.
Defendant Crowdstrike Holdings, Inc.'s Preliminary Invalidity Contentions, Exhibit 224-A-33, *Webroot, Inc. and Open Text, Inc.* v. *Crowdstrike Holdings, Inc.*, No. 6:22-CV-00241-ADA-DTG (WD, Texas), Sep. 13, 2022, 63 pgs.
Defendant Crowdstrike Holdings, Inc.'s Preliminary Invalidity Contentions, Exhibit 224-A-34, *Webroot, Inc. and Open Text, Inc.* v. *Crowdstrike Holdings, Inc.*, No. 6:22-CV-00241-ADA-DTG (WD, Texas), Sep. 13, 2022, 88 pgs.
Defendant Crowdstrike Holdings, Inc.'s Preliminary Invalidity Contentions, Exhibit 224-B, *Webroot, Inc. and Open Text, Inc.* v. *Crowdstrike Holdings, Inc.*, No. 6:22-CV-00241-ADA-DTG (WD, Texas), Sep. 13, 2022, 195 pgs.
Defendant Crowdstrike Holdings, Inc.'s Preliminary Invalidity Contentions, Exhibit 591-A-1, *Webroot, Inc. and Open Text, Inc.* v. *Crowdstrike Holdings, Inc.*, No. 6:22-CV-00241-ADA-DTG (WD, Texas), Sep. 13, 2022, 32 pgs.
Defendant Crowdstrike Holdings, Inc.'s Preliminary Invalidity Contentions, Exhibit 591-A-2, *Webroot, Inc. and Open Text, Inc.* v. *Crowdstrike Holdings, Inc.*, No. 6:22-CV-00241-ADA-DTG (WD, Texas), Sep. 13, 2022, 28 pgs.
Defendant Crowdstrike Holdings, Inc.'s Preliminary Invalidity Contentions, Exhibit 591-A-3, *Webroot, Inc. and Open Text, Inc.* v. *Crowdstrike Holdings, Inc.*, No. 6:22-CV-00241-ADA-DTG (WD, Texas), Sep. 13, 2022, 35 pgs.
Defendant Crowdstrike Holdings, Inc.'s Preliminary Invalidity Contentions, Exhibit 591-A-4, *Webroot, Inc. and Open Text, Inc.* v. *Crowdstrike Holdings, Inc.*, No. 6:22-CV-00241-ADA-DTG (WD, Texas), Sep. 13, 2022, 36 pgs.
Defendant Crowdstrike Holdings, Inc.'s Preliminary Invalidity Contentions, Exhibit 591-A-5, *Webroot, Inc. and Open Text, Inc.* v. *Crowdstrike Holdings, Inc.*, No. 6:22-CV-00241-ADA-DTG (WD, Texas), Sep. 13, 2022, 59 pgs.
Defendant Crowdstrike Holdings, Inc.'s Preliminary Invalidity Contentions, Exhibit 591-A-6, *Webroot, Inc. and Open Text, Inc.* v. *Crowdstrike Holdings, Inc.*, No. 6:22-CV-00241-ADA-DTG (WD, Texas), Sep. 13, 2022, 37 pgs.
Defendant Crowdstrike Holdings, Inc.'s Preliminary Invalidity Contentions, Exhibit 591-A-7, *Webroot, Inc. and Open Text, Inc.* v. *Crowdstrike Holdings, Inc.*, No. 6:22-CV-00241-ADA-DTG (WD, Texas), Sep. 13, 2022, 64 pgs.
Defendant Crowdstrike Holdings, Inc.'s Preliminary Invalidity Contentions, Exhibit 591-A-8, *Webroot, Inc. and Open Text, Inc.* v. *Crowdstrike Holdings, Inc.*, No. 6:22-CV-00241-ADA-DTG (WD, Texas), Sep. 13, 2022, 50 pgs.
Defendant Crowdstrike Holdings, Inc.'s Preliminary Invalidity Contentions, Exhibit 591-A-9, *Webroot, Inc. and Open Text, Inc.* v. *Crowdstrike Holdings, Inc.*, No. 6:22-CV-00241-ADA-DTG (WD, Texas), Sep. 13, 2022, 17 pgs.
Defendant Crowdstrike Holdings, Inc.'s Preliminary Invalidity Contentions, Exhibit 591-A-10, *Webroot, Inc. and Open Text, Inc.* v. *Crowdstrike Holdings, Inc.*, No. 6:22-CV-00241-ADA-DTG (WD, Texas), Sep. 13, 2022, 23 pgs.
Defendant Crowdstrike Holdings, Inc.'s Preliminary Invalidity Contentions, Exhibit 591-A-11, *Webroot, Inc. and Open Text, Inc.* v. *Crowdstrike Holdings, Inc.*, No. 6:22-CV-00241-ADA-DTG (WD, Texas), Sep. 13, 2022, 18 pgs.
Defendant Crowdstrike Holdings, Inc.'s Preliminary Invalidity Contentions, Exhibit 591-A-12, *Webroot, Inc. and Open Text, Inc.* v. *Crowdstrike Holdings, Inc.*, No. 6:22-CV-00241-ADA-DTG (WD, Texas), Sep. 13, 2022, 16 pgs.
Defendant Crowdstrike Holdings, Inc.'s Preliminary Invalidity Contentions, Exhibit 591-A-13, *Webroot, Inc. and Open Text, Inc.* v. *Crowdstrike Holdings, Inc.*, No. 6:22-CV-00241-ADA-DTG (WD, Texas), Sep. 13, 2022, 17 pgs.
Defendant Crowdstrike Holdings, Inc.'s Preliminary Invalidity Contentions, Exhibit 591-A-14, *Webroot, Inc. and Open Text, Inc.* v. *Crowdstrike Holdings, Inc.*, No. 6:22-CV-00241-ADA-DTG (WD, Texas), Sep. 13, 2022, 18 pgs.
Defendant Crowdstrike Holdings, Inc.'s Preliminary Invalidity Contentions, Exhibit 591-A-15, *Webroot, Inc. and Open Text, Inc.* v. *Crowdstrike Holdings, Inc.*, No. 6:22-CV-00241-ADA-DTG (WD, Texas), Sep. 13, 2022, 18 pgs.
Defendant Crowdstrike Holdings, Inc.'s Preliminary Invalidity Contentions, Exhibit 591-A-16, *Webroot, Inc. and Open Text, Inc.* v. *Crowdstrike Holdings, Inc.*, No. 6:22-CV-00241-ADA-DTG (WD, Texas), Sep. 13, 2022, 22 pgs.
Defendant Crowdstrike Holdings, Inc.'s Preliminary Invalidity Contentions, Exhibit 591-A-17, *Webroot, Inc. and Open Text, Inc.* v. *Crowdstrike Holdings, Inc.*, No. 6:22-CV-00241-ADA-DTG (WD, Texas), Sep. 13, 2022, 18 pgs.
Defendant Crowdstrike Holdings, Inc.'s Preliminary Invalidity Contentions, Exhibit 591-A-18, *Webroot, Inc. and Open Text, Inc.* v. *Crowdstrike Holdings, Inc.*, No. 6:22-CV-00241-ADA-DTG (WD, Texas), Sep. 13, 2022, 17 pgs.
Defendant Crowdstrike Holdings, Inc.'s Preliminary Invalidity Contentions, Exhibit 591-A-19, *Webroot, Inc. and Open Text, Inc.* v. *Crowdstrike Holdings, Inc.*, No. 6:22-CV-00241-ADA-DTG (WD, Texas), Sep. 13, 2022, 27 pgs.
Defendant Crowdstrike Holdings, Inc.'s Preliminary Invalidity Contentions, Exhibit 591-A-20, *Webroot, Inc. and Open Text, Inc.* v. *Crowdstrike Holdings, Inc.*, No. 6:22-CV-00241-ADA-DTG (WD, Texas), Sep. 13, 2022, 29 pgs.
Defendant Crowdstrike Holdings, Inc.'s Preliminary Invalidity Contentions, Exhibit 591-A-21, *Webroot, Inc. and Open Text, Inc.* v. *Crowdstrike Holdings, Inc.*, No. 6:22-CV-00241-ADA-DTG (WD, Texas), Sep. 13, 2022, 27 pgs.
Defendant Crowdstrike Holdings, Inc.'s Preliminary Invalidity Contentions, Exhibit 591-A-22, *Webroot, Inc. and Open Text, Inc.* v. *Crowdstrike Holdings, Inc.*, No. 6:22-CV-00241-ADA-DTG (WD, Texas), Sep. 13, 2022, 20 pgs.
Defendant Crowdstrike Holdings, Inc.'s Preliminary Invalidity Contentions, Exhibit 591-A-23, *Webroot, Inc. and Open Text, Inc.* v. *Crowdstrike Holdings, Inc.*, No. 6:22-CV-00241-ADA-DTG (WD, Texas), Sep. 13, 2022, 20 pgs.

(56) References Cited

OTHER PUBLICATIONS

Defendant Crowdstrike Holdings, Inc.'s Preliminary Invalidity Contentions, Exhibit 591-A-24, *Webroot, Inc. and Open Text, Inc.* v. *Crowdstrike Holdings, Inc.*, No. 6:22-CV-00241-ADA-DTG (WD, Texas), Sep. 13, 2022, 24 pgs.

Defendant Crowdstrike Holdings, Inc.'s Preliminary Invalidity Contentions, Exhibit 591-B, *Webroot, Inc. and Open Text, Inc.* v. *Crowdstrike Holdings, Inc.*, No. 6:22-CV-00241-ADA-DTG (WD, Texas), Sep. 13, 2022, 303 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-1, 25 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-2, 49 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-3, 36 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-4, 31 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-5, 90 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-6, 35 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-7, 73 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-8, 58 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-9, 92 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-10, 52 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-11, 88 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-12, 64 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-13, 53 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-14, 60 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-15, 34 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-16, 53 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-17, 37 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-18, 46 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-19, 46 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-20, 45 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-21, 41 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-22, 52 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-23, 50 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-24, 54 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-25, 107 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-26, 220 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-27, 32 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 243-F-28, 29 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-1, 26 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-2, 54 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-3, 44 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-4, 33 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-5, 118 pgs.

(56) References Cited

OTHER PUBLICATIONS

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-6, 36 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-7, 87 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-8, 70 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-9, 112 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-10, 63 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-11, 110 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-12, 74 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-13, 57 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-14, 60 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-15, 39 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-16, 62 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-17, 57 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-18, 61 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-19, 54 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-20, 57 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-21, 59 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-22, 139 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-23, 273 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-24, 39 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-25, 31 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-26, 54 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Feb. 21, 2023, Exhibit 932-G-27, 55 pgs.

Defendant AO Kaspersky Lab's Preliminary Invalidity Contentions—Exhibit 3A, Invalidity Claim Chart Index, *Webroot, Inc. and Open Text, Inc.* v. *AO Kaspersky Lab*, No. 6:22-CV-00243 (WD, Texas), Sep. 14, 2022, 22 pgs.

Defendant AO Kaspersky Lab's Preliminary Invalidity Contentions—Exhibit 4A, Invalidity Claim Chart Index, *Webroot, Inc. and Open Text, Inc.* v. *AO Kaspersky Lab*, No. 6:22-CV-00243 (WD, Texas), Sep. 14, 2022, 54 pgs.

Defendant AO Kaspersky Lab's Preliminary Invalidity Contentions—Exhibit 5A, Invalidity Claim Chart Index, *Webroot, Inc. and Open Text, Inc.* v. *AO Kaspersky Lab*, No. 6:22-CV-00243 (WD, Texas), Sep. 14, 2022, 43 pgs.

Defendant AO Kaspersky Lab's Preliminary Invalidity Contentions—Exhibit 5B, Invalidity Claim Chart Index, *Webroot, Inc. and Open Text, Inc.* v. *AO Kaspersky Lab*, No. 6:22-CV-00243 (WD, Texas), Sep. 14, 2022, 34 pgs.

Defendant AO Kaspersky Lab's Preliminary Invalidity Contentions—Exhibit 5C, Invalidity Claim Chart Index, *Webroot, Inc. and Open Text, Inc.* v. *AO Kaspersky Lab*, No. 6:22-CV-00243 (WD, Texas), Sep. 14, 2022, 36 pgs.

Defendant AO Kaspersky Lab's Preliminary Invalidity Contentions—Exhibit 5D, Invalidity Claim Chart Index, *Webroot, Inc. and Open Text, Inc.* v. *AO Kaspersky Lab*, No. 6:22-CV-00243 (WD, Texas), Sep. 14, 2022, 69 pgs.

Defendant AO Kaspersky Lab's Preliminary Invalidity Contentions—Exhibit 8, Invalidity Claim Chart Index, *Webroot, Inc. and Open Text, Inc.* v. *AO Kaspersky Lab*, No. 6:22-CV-00243 (WD, Texas), Feb. 21, 2023, 30 pgs.

Defendant AO Kaspersky Lab's Preliminary Invalidity Contentions—Exhibit 9, Invalidity Claim Chart Index, *Webroot, Inc. and Open Text, Inc.* v. *AO Kaspersky Lab*, No. 6:22-CV-00243 (WD, Texas), Feb. 21, 2023, 56 pgs.

Defendant AO Kaspersky Lab's Preliminary Invalidity Contentions—Exhibit 10, Invalidity Claim Chart Index, *Webroot, Inc. and Open Text, Inc.* v. *AO Kaspersky Lab*, No. 6:22-CV-00243 (WD, Texas), Feb. 21, 2023, 62 pgs. (intentionally blank).

Defendant Sophos Ltd.'s Preliminary Invalidity Contentions, Exhibit 045-A-1, *Webroot, Inc. and Open Text, Inc.* v. *Sophos Ltd.*, CA. No. 6:22-CV-00240-ADA-DTG, W.D. Tex., Sep. 13, 2022, 77 pgs.

Defendant Sophos Ltd.'s Preliminary Invalidity Contentions, Exhibit 045-A-2, *Webroot, Inc. and Open Text, Inc.* v. *Sophos Ltd.*, CA. No. 6:22-CV-00240-ADA-DTG, W.D. Tex., Sep. 13, 2022, 42 pgs.

Defendant Sophos Ltd.'s Preliminary Invalidity Contentions, Exhibit 045-A-3, *Webroot, Inc. and Open Text, Inc.* v. *Sophos Ltd.*, CA. No. 6:22-CV-00240-ADA-DTG, W.D. Tex., Sep. 13, 2022, 62 pgs.

Defendant Sophos Ltd.'s Preliminary Invalidity Contentions, Exhibit 045-A-4, *Webroot, Inc. and Open Text, Inc.* v. *Sophos Ltd.*, CA. No. 6:22-CV-00240-ADA-DTG, W.D. Tex., Sep. 13, 2022, 147 pgs.

Defendant Sophos Ltd.'s Preliminary Invalidity Contentions, Exhibit 045-A-5, *Webroot, Inc. and Open Text, Inc.* v. *Sophos Ltd.*, CA. No. 6:22-CV-00240-ADA-DTG, W.D. Tex., Sep. 13, 2022, 21 pgs.

(56) References Cited

OTHER PUBLICATIONS

Defendant Sophos Ltd.'s Preliminary Invalidity Contentions, Exhibit 045-A-6, *Webroot, Inc. and Open Text, Inc.* v. *Sophos Ltd.*, CA. No. 6:22-CV-00240-ADA-DTG, W.D. Tex., Sep. 13, 2022, 169 pgs.

Defendant Sophos Ltd.'s Preliminary Invalidity Contentions, Exhibit 045-A-7, *Webroot, Inc. and Open Text, Inc.* v. *Sophos Ltd.*, CA. No. 6:22-CV-00240-ADA-DTG, W.D. Tex., Sep. 13, 2022, 55 pgs.

Defendant Sophos Ltd.'s Preliminary Invalidity Contentions, Exhibit 045-A-8, *Webroot, Inc. and Open Text, Inc.* v. *Sophos Ltd.*, CA. No. 6:22-CV-00240-ADA-DTG, W.D. Tex., Sep. 13, 2022, 19 pgs.

Defendant Sophos Ltd.'s Preliminary Invalidity Contentions, Exhibit 045-A-9, *Webroot, Inc. and Open Text, Inc.* v. *Sophos Ltd.*, CA. No. 6:22-CV-00240-ADA-DTG, W.D. Tex., Sep. 13, 2022, 70 pgs.

Defendant Sophos Ltd.'s Preliminary Invalidity Contentions, Exhibit 045-A-10, *Webroot, Inc. and Open Text, Inc.* v. *Sophos Ltd.*, CA. No. 6:22-CV-00240-ADA-DTG, W.D. Tex., Sep. 13, 2022, 31 pgs.

Defendant Sophos Ltd.'s Preliminary Invalidity Contentions, Exhibit 045-A-11, *Webroot, Inc. and Open Text, Inc.* v. *Sophos Ltd.*, CA. No. 6:22-CV-00240-ADA-DTG, W.D. Tex., Sep. 13, 2022, 116 pgs.

Defendant Sophos Ltd.'s Preliminary Invalidity Contentions, Exhibit 045-A-12, *Webroot, Inc. and Open Text, Inc.* v. *Sophos Ltd.*, CA. No. 6:22-CV-00240-ADA-DTG, W.D. Tex., Sep. 13, 2022, 31 pgs.

Defendant Sophos Ltd.'s Preliminary Invalidity Contentions, Exhibit 045-A-13, *Webroot, Inc. and Open Text, Inc.* v. *Sophos Ltd.*, CA. No. 6:22-CV-00240-ADA-DTG, W.D. Tex., Sep. 13, 2022, 61 pgs.

Defendant Sophos Ltd.'s Preliminary Invalidity Contentions, Exhibit 045-A-14, *Webroot, Inc. and Open Text, Inc.* v. *Sophos Ltd.*, CA. No. 6:22-CV-00240-ADA-DTG, W.D. Tex., Sep. 13, 2022, 117 pgs.

Defendant Sophos Ltd.'s Preliminary Invalidity Contentions, Exhibit 045-A-15, *Webroot, Inc. and Open Text, Inc.* v. *Sophos Ltd.*, CA. No. 6:22-CV-00240-ADA-DTG, W.D. Tex., Sep. 13, 2022, 95 pgs.

Defendant Sophos Ltd.'s Preliminary Invalidity Contentions, Exhibit 045-A-16, *Webroot, Inc. and Open Text, Inc.* v. *Sophos Ltd.*, CA. No. 6:22-CV-00240-ADA-DTG, W.D. Tex., Sep. 13, 2022, 78 pgs.

Defendant Sophos Ltd.'s Preliminary Invalidity Contentions, Exhibit 045-A-17, *Webroot, Inc. and Open Text, Inc.* v. *Sophos Ltd.*, CA. No. 6:22-CV-00240-ADA-DTG, W.D. Tex., Sep. 13, 2022, 68 pgs.

Defendant Sophos Ltd.'s Preliminary Invalidity Contentions, Exhibit 045-A-18, *Webroot, Inc. and Open Text, Inc.* v. *Sophos Ltd.*, CA. No. 6:22-CV-00240-ADA-DTG, W.D. Tex., Sep. 13, 2022, 18 pgs.

Defendant Sophos Ltd.'s Preliminary Invalidity Contentions, Exhibit 045-A-19, *Webroot, Inc. and Open Text, Inc.* v. *Sophos Ltd.*, CA. No. 6:22-CV-00240-ADA-DTG, W.D. Tex., Sep. 13, 2022, 19 pgs.

Defendant Sophos Ltd.'s Preliminary Invalidity Contentions, Exhibit 045-A-20, *Webroot, Inc. and Open Text, Inc.* v. *Sophos Ltd.*, CA. No. 6:22-CV-00240-ADA-DTG, W.D. Tex., Sep. 13, 2022, 26 pgs.

Defendant Sophos Ltd.'s Preliminary Invalidity Contentions, Exhibit 045-A-21, *Webroot, Inc. and Open Text, Inc.* v. *Sophos Ltd.*, CA. No. 6:22-CV-00240-ADA-DTG, W.D. Tex., Sep. 13, 2022, 85 pgs Defendant Sophos Ltd.'s Preliminary Invalidity Contentions, Exhibit 045-A-22, *Webroot, Inc. and Open Text, Inc.* v. *Sophos Ltd.*, CA. No. 6:22-CV-00240-ADA-DTG, W.D. Tex., Sep. 13, 2022, 93 pgs.

Defendant Sophos Ltd.'s Preliminary Invalidity Contentions, Exhibit 045-A-23, *Webroot, Inc. and Open Text, Inc.* v. *Sophos Ltd.*, CA. No. 6:22-CV-00240-ADA-DTG, W.D. Tex., Sep. 13, 2022, 64 pgs.

Defendant Sophos Ltd.'s Preliminary Invalidity Contentions, Exhibit 045-A-24, *Webroot, Inc. and Open Text, Inc.* v. *Sophos Ltd.*, CA. No. 6:22-CV-00240-ADA-DTG, W.D. Tex., Sep. 13, 2022, 69 pgs.

Defendant Sophos Ltd.'s Preliminary Invalidity Contentions, Exhibit 045-A-25, *Webroot, Inc. and Open Text, Inc.* v. *Sophos Ltd.*, CA. No. 6:22-CV-00240-ADA-DTG, W.D. Tex., Sep. 13, 2022, 53 pgs.

Defendant Sophos Ltd.'s Preliminary Invalidity Contentions, Exhibit 045-A-26, *Webroot, Inc. and Open Text, Inc.* v. *Sophos Ltd.*, CA. No. 6:22-CV-00240-ADA-DTG, W.D. Tex., Sep. 13, 2022, 75 pgs.

Defendant Sophos Ltd.'s Preliminary Invalidity Contentions, Exhibit 045-A-27, *Webroot, Inc. and Open Text, Inc.* v. *Sophos Ltd.*, CA. No. 6:22-CV-00240-ADA-DTG, W.D. Tex., Sep. 13, 2022, 25 pgs.

Defendant Sophos Ltd.'s Preliminary Invalidity Contentions, Exhibit 045-A-28, *Webroot, Inc. and Open Text, Inc.* v. *Sophos Ltd.*, CA. No. 6:22-CV-00240-ADA-DTG, W.D. Tex., Sep. 13, 2022, 75 pgs.

Defendant Sophos Ltd.'s Preliminary Invalidity Contentions, Exhibit 045-A-29, *Webroot, Inc. and Open Text, Inc.* v. *Sophos Ltd.*, CA. No. 6:22-CV-00240-ADA-DTG, W.D. Tex., Sep. 13, 2022, 20 pgs.

Defendant Sophos Ltd.'s Preliminary Invalidity Contentions, Exhibit 045-A-30, *Webroot, Inc. and Open Text, Inc.* v. *Sophos Ltd.*, CA. No. 6:22-CV-00240-ADA-DTG, W.D. Tex., Sep. 13, 2022, 90 pgs.

Defendant Sophos Ltd.'s Preliminary Invalidity Contentions, Exhibit 045-A-31, *Webroot, Inc. and Open Text, Inc.* v. *Sophos Ltd.*, CA. No. 6:22-CV-00240-ADA-DTG, W.D. Tex., Sep. 13, 2022, 26 pgs.

Defendant Sophos Ltd.'s Preliminary Invalidity Contentions, Exhibit 045-A-32, *Webroot, Inc. and Open Text, Inc.* v. *Sophos Ltd.*, CA. No. 6:22-CV-00240-ADA-DTG, W.D. Tex., Sep. 13, 2022, 23 pgs.

Defendant Sophos Ltd.'s Preliminary Invalidity Contentions, Exhibit 045-A-34, *Webroot, Inc. and Open Text, Inc.* v. *Sophos Ltd.*, CA. No. 6:22-CV-00240-ADA-DTG, W.D. Tex., Sep. 13, 2022, 27 pgs.

Defendant Sophos Ltd.'s Preliminary Invalidity Contentions, Exhibit 045-A-35, *Webroot, Inc. and Open Text, Inc.* v. *Sophos Ltd.*, CA. No. 6:22-CV-00240-ADA-DTG, W.D. Tex., Sep. 13, 2022, 22 pgs.

Defendant Sophos Ltd.'s Preliminary Invalidity Contentions, Exhibit 045-B, *Webroot, Inc. and Open Text, Inc.* v. *Sophos Ltd.*, CA. No. 6:22-CV-00240-ADA-DTG, W.D. Tex., Sep. 13, 2022, 31 pgs.

Defendant Sophos Ltd.'s Preliminary Invalidity Contentions, Exhibit 224-A-1, *Webroot, Inc. and Open Text, Inc.* v. *Sophos Ltd.*, CA. No. 6:22-CV-00240-ADA-DTG, W.D. Tex., Sep. 13, 2022, 111 pgs.

Defendant Sophos Ltd.'s Preliminary Invalidity Contentions, Exhibit 224-A-2, Webroot, Inc. and Open Text, Inc. v. Sophos Ltd., CA. No. 6:22-CV-00240- Ada-Dtg, W.D. Tex., Sep. 13, 2022, 68 pgs.

Defendant Sophos Ltd.'s Preliminary Invalidity Contentions, Exhibit 224-A-3, *Webroot, Inc. and Open Text, Inc.* v. *Sophos Ltd.*, CA. No. 6:22-CV-00240-ADA-DTG, W.D. Tex., Sep. 13, 2022, 95 pgs.

Defendant Sophos Ltd.'s Preliminary Invalidity Contentions, Exhibit 224-A-4, *Webroot, Inc. and Open Text, Inc.* v. *Sophos Ltd.*, CA. No. 6:22-CV-00240-ADA-DTG, W.D. Tex., Sep. 13, 2022, 207 pgs.

Defendant Sophos Ltd.'s Preliminary Invalidity Contentions, Exhibit 224-A-5, *Webroot, Inc. and Open Text, Inc.* v. *Sophos Ltd.*, CA. No. 6:22-CV-00240-ADA-DTG, W.D. Tex., Sep. 13, 2022, 61 pgs.

Defendant Sophos Ltd.'s Preliminary Invalidity Contentions, Exhibit 224-A-6, *Webroot, Inc. and Open Text, Inc.* v. *Sophos Ltd.*, CA. No. 6:22-CV-00240-ADA-DTG, W.D. Tex., Sep. 13, 2022, 263 pgs.

Defendant Sophos Ltd.'s Preliminary Invalidity Contentions, Exhibit 224-A-8, *Webroot, Inc. and Open Text, Inc.* v. *Sophos Ltd.*, CA. No. 6:22-CV-00240-ADA-DTG, W.D. Tex., Sep. 13, 2022, 51 pgs.

Defendant Sophos Ltd.'s Preliminary Invalidity Contentions, Exhibit 224-A-9, *Webroot, Inc. and Open Text, Inc.* v. *Sophos Ltd.*, CA. No. 6:22-CV-00240-ADA-DTG, W.D. Tex., Sep. 13, 2022, 136 pgs.

Defendant Sophos Ltd.'s Preliminary Invalidity Contentions, Exhibit 224-A-10, *Webroot, Inc. and Open Text, Inc.* v. *Sophos Ltd.*, CA. No. 6:22-CV-00240-ADA-DTG, W.D. Tex., Sep. 13, 2022, 79 pgs.

Defendant Sophos Ltd.'s Preliminary Invalidity Contentions, Exhibit 224-A-11, *Webroot, Inc. and Open Text, Inc.* v. *Sophos Ltd.*, CA. No. 6:22-CV-00240-ADA-DTG, W.D. Tex., Sep. 13, 2022, 185 pgs.

Defendant Sophos Ltd.'s Preliminary Invalidity Contentions, Exhibit 224-A-12, *Webroot, Inc. and Open Text, Inc.* v. *Sophos Ltd.*, CA. No. 6:22-CV-00240-ADA-DTG, W.D. Tex., Sep. 13, 2022, 53 pgs.

Defendant Sophos Ltd.'s Preliminary Invalidity Contentions, Exhibit 224-A-13, *Webroot, Inc. and Open Text, Inc.* v. *Sophos Ltd.*, CA. No. 6:22-CV-00240-ADA-DTG, W.D. Tex., Sep. 13, 2022, 95 pgs.

Defendant Sophos Ltd.'s Preliminary Invalidity Contentions, Exhibit 224-A-14, *Webroot, Inc. and Open Text, Inc.* v. *Sophos Ltd.*, CA. No. 6:22-CV-00240-ADA-DTG, W.D. Tex., Sep. 13, 2022, 176 pgs.

Defendant Sophos Ltd.'s Preliminary Invalidity Contentions, Exhibit 224-A-15, *Webroot, Inc. and Open Text, Inc.* v. *Sophos Ltd.*, CA. No. 6:22-CV-00240-ADA-DTG, W.D. Tex., Sep. 13, 2022, 173 pgs.

Defendant Sophos Ltd.'s Preliminary Invalidity Contentions, Exhibit 224-A-16, *Webroot, Inc. and Open Text, Inc.* v. *Sophos Ltd.*, CA. No. 6:22-CV-00240-ADA-DTG, W.D. Tex., Sep. 13, 2022, 126 pgs.

Defendant Sophos Ltd.'s Preliminary Invalidity Contentions, Exhibit 224-A-17, *Webroot, Inc. and Open Text, Inc.* v. *Sophos Ltd.*, CA. No. 6:22-CV-00240-ADA-DTG, W.D. Tex., Sep. 13, 2022, 103 pgs.

Defendant Sophos Ltd.'s Preliminary Invalidity Contentions, Exhibit 224-A-18, *Webroot, Inc. and Open Text, Inc.* v. *Sophos Ltd.*, CA. No. 6:22-CV-00240-ADA-DTG, W.D. Tex., Sep. 13, 2022, 49 pgs.

(56) References Cited

OTHER PUBLICATIONS

Defendant Sophos Ltd.'s Preliminary Invalidity Contentions, Exhibit 224-A-19, *Webroot, Inc. and Open Text, Inc. v. Sophos Ltd.*, CA. No. 6:22-CV-00240-ADA-DTG, W.D. Tex., Sep. 13, 2022, 68 pgs.

Defendant Sophos Ltd.'s Preliminary Invalidity Contentions, Exhibit 224-A-20, *Webroot, Inc. and Open Text, Inc. v. Sophos Ltd.*, CA. No. 6:22-CV-00240-ADA-DTG, W.D. Tex., Sep. 13, 2022, 157 pgs.

Defendant Sophos Ltd.'s Preliminary Invalidity Contentions, Exhibit 224-A-21, *Webroot, Inc. and Open Text, Inc. v. Sophos Ltd.*, CA. No. 6:22-CV-00240-ADA-DTG, W.D. Tex., Sep. 13, 2022, 139 pgs.

Defendant Sophos Ltd.'s Preliminary Invalidity Contentions, Exhibit 224-A-22, *Webroot, Inc. and Open Text, Inc. v. Sophos Ltd.*, CA. No. 6:22-CV-00240-ADA-DTG, W.D. Tex., Sep. 13, 2022, 152 pgs.

Defendant Sophos Ltd.'s Preliminary Invalidity Contentions, Exhibit 224-A-23, *Webroot, Inc. and Open Text, Inc. v. Sophos Ltd.*, CA. No. 6:22-CV-00240-ADA-DTG, W.D. Tex., Sep. 13, 2022, 98 pgs.

Defendant Sophos Ltd.'s Preliminary Invalidity Contentions, Exhibit 224-A-24, *Webroot, Inc. and Open Text, Inc. v. Sophos Ltd.*, CA. No. 6:22-CV-00240-ADA-DTG, W.D. Tex., Sep. 13, 2022, 117 pgs.

Defendant Sophos Ltd.'s Preliminary Invalidity Contentions, Exhibit 224-A-25, *Webroot, Inc. and Open Text, Inc. v. Sophos Ltd.*, CA. No. 6:22-CV-00240-ADA-DTG, W.D. Tex., Sep. 13, 2022, 78 pgs.

Defendant Sophos Ltd.'s Preliminary Invalidity Contentions, Exhibit 224-A-26, *Webroot, Inc. and Open Text, Inc. v. Sophos Ltd.*, CA. No. 6:22-CV-00240-ADA-DTG, W.D. Tex., Sep. 13, 2022, 117 pgs.

Defendant Sophos Ltd.'s Preliminary Invalidity Contentions, Exhibit 224-A-27, *Webroot, Inc. and Open Text, Inc. v. Sophos Ltd.*, CA. No. 6:22-CV-00240-ADA-DTG, W.D. Tex., Sep. 13, 2022, 60 pgs.

Defendant Sophos Ltd.'s Preliminary Invalidity Contentions, Exhibit 224-A-28, *Webroot, Inc. and Open Text, Inc. v. Sophos Ltd.*, CA. No. 6:22-CV-00240-ADA-DTG, W.D. Tex., Sep. 13, 2022, 55 pgs.

Defendant Sophos Ltd.'s Preliminary Invalidity Contentions, Exhibit 224-A-29, *Webroot, Inc. and Open Text, Inc. v. Sophos Ltd.*, CA. No. 6:22-CV-00240-ADA-DTG, W.D. Tex., Sep. 13, 2022, 145 pgs.

Defendant Sophos Ltd.'s Preliminary Invalidity Contentions, Exhibit 224-A-30, *Webroot, Inc. and Open Text, Inc. v. Sophos Ltd.*, CA. No. 6:22-CV-00240-ADA-DTG, W.D. Tex., Sep. 13, 2022, 60 pgs.

Defendant Sophos Ltd.'s Preliminary Invalidity Contentions, Exhibit 224-A-31, *Webroot, Inc. and Open Text, Inc. v. Sophos Ltd.*, CA. No. 6:22-CV-00240-ADA-DTG, W.D. Tex., Sep. 13, 2022, 104 pgs.

Defendant Sophos Ltd.'s Preliminary Invalidity Contentions, Exhibit 224-A-32, *Webroot, Inc. and Open Text, Inc. v. Sophos Ltd.*, CA. No. 6:22-CV-00240-ADA-DTG, W.D. Tex., Sep. 13, 2022, 57 pgs.

Defendant Sophos Ltd.'s Preliminary Invalidity Contentions, Exhibit 224-A-34, *Webroot, Inc. and Open Text, Inc. v. Sophos Ltd.*, CA. No. 6:22-CV-00240-ADA-DTG, W.D. Tex., Sep. 13, 2022, 59 pgs.

Defendant Sophos Ltd.'s Preliminary Invalidity Contentions, Exhibit 224-A-35, *Webroot, Inc. and Open Text, Inc. v. Sophos Ltd.*, CA. No. 6:22-CV-00240-ADA-DTG, W.D. Tex., Sep. 13, 2022, 63 pgs.

Defendant Sophos Ltd.'s Preliminary Invalidity Contentions, Exhibit 224-B, *Webroot, Inc. and Open Text, Inc. v. Sophos Ltd.*, CA. No. 6:22-CV-00240-ADA-DTG, W.D. Tex., Sep. 13, 2022, 50 pgs.

Defendant Sophos Ltd.'s Preliminary Invalidity Contentions, Exhibit 591-A-1, *Webroot, Inc. and Open Text, Inc. v. Sophos Ltd.*, CA. No. 6:22-CV-00240-ADA-DTG, W.D. Tex., Sep. 13, 2022, 20 pgs.

Defendant Sophos Ltd.'s Preliminary Invalidity Contentions, Exhibit 591-A-2, *Webroot, Inc. and Open Text, Inc. v. Sophos Ltd.*, CA. No. 6:22-CV-00240-ADA-DTG, W.D. Tex., Sep. 13, 2022, 19 pgs.

Defendant Sophos Ltd.'s Preliminary Invalidity Contentions, Exhibit 591-A-3, *Webroot, Inc. and Open Text, Inc. v. Sophos Ltd.*, CA. No. 6:22-CV-00240-ADA-DTG, W.D. Tex., Sep. 13, 2022, 22 pgs.

Defendant Sophos Ltd.'s Preliminary Invalidity Contentions, Exhibit 591-A-4, *Webroot, Inc. and Open Text, Inc. v. Sophos Ltd.*, CA. No. 6:22-CV-00240-ADA-DTG, W.D. Tex., Sep. 13, 2022, 52 pgs.

Defendant Sophos Ltd.'s Preliminary Invalidity Contentions, Exhibit 591-A-5, *Webroot, Inc. and Open Text, Inc. v. Sophos Ltd.*, CA. No. 6:22-CV-00240-ADA-DTG, W.D. Tex., Sep. 13, 2022, 19 pgs.

Defendant Sophos Ltd.'s Preliminary Invalidity Contentions, Exhibit 591-A-6, *Webroot, Inc. and Open Text, Inc. v. Sophos Ltd.*, CA. No. 6:22-CV-00240-ADA-DTG, W.D. Tex., Sep. 13, 2022, 30 pgs.

Defendant Sophos Ltd.'s Preliminary Invalidity Contentions, Exhibit 591-A-7, *Webroot, Inc. and Open Text, Inc. v. Sophos Ltd.*, CA. No. 6:22-CV-00240-ADA-DTG, W.D. Tex., Sep. 13, 2022, 42 pgs.

Defendant Sophos Ltd.'s Preliminary Invalidity Contentions, Exhibit 591-A-8, *Webroot, Inc. and Open Text, Inc. v. Sophos Ltd.*, CA. No. 6:22-CV-00240-ADA-DTG, W.D. Tex., Sep. 13, 2022, 33 pgs.

Defendant Sophos Ltd.'s Preliminary Invalidity Contentions, Exhibit 591-A-9, *Webroot, Inc. and Open Text, Inc. v. Sophos Ltd.*, CA. No. 6:22-CV-00240-ADA-DTG, W.D. Tex., Sep. 13, 2022, 19 pgs.

Defendant Sophos Ltd.'s Preliminary Invalidity Contentions, Exhibit 591-A-10, *Webroot, Inc. and Open Text, Inc. v. Sophos Ltd.*, CA. No. 6:22-CV-00240-ADA-DTG, W.D. Tex., Sep. 13, 2022, 20 pgs.

Defendant Sophos Ltd.'s Preliminary Invalidity Contentions, Exhibit 591-A-11, *Webroot, Inc. and Open Text, Inc. v. Sophos Ltd.*, CA. No. 6:22-CV-00240-ADA-DTG, W.D. Tex., Sep. 13, 2022, 31 pgs.

Defendant Sophos Ltd.'s Preliminary Invalidity Contentions, Exhibit 591-A-12, *Webroot, Inc. and Open Text, Inc. v. Sophos Ltd.*, CA. No. 6:22-CV-00240-ADA-DTG, W.D. Tex., Sep. 13, 2022, 40 pgs.

Defendant Sophos Ltd.'s Preliminary Invalidity Contentions, Exhibit 591-A-13, *Webroot, Inc. and Open Text, Inc. v. Sophos Ltd.*, CA. No. 6:22-CV-00240-ADA-DTG, W.D. Tex., Sep. 13, 2022, 21 pgs.

Defendant Sophos Ltd.'s Preliminary Invalidity Contentions, Exhibit 591-A-14, *Webroot, Inc. and Open Text, Inc. v. Sophos Ltd.*, CA. No. 6:22-CV-00240-ADA-DTG, W.D. Tex., Sep. 13, 2022, 21 pgs.

Defendant Sophos Ltd.'s Preliminary Invalidity Contentions, Exhibit 591-A-15, *Webroot, Inc. and Open Text, Inc. v. Sophos Ltd.*, CA. No. 6:22-CV-00240-ADA-DTG, W.D. Tex., Sep. 13, 2022, 40 pgs.

Defendant Sophos Ltd.'s Preliminary Invalidity Contentions, Exhibit 591-A-16, *Webroot, Inc. and Open Text, Inc. v. Sophos Ltd.*, CA. No. 6:22-CV-00240-ADA-DTG, W.D. Tex., Sep. 13, 2022, 18 pgs.

Defendant Sophos Ltd.'s Preliminary Invalidity Contentions, Exhibit 591-A-17, *Webroot, Inc. and Open Text, Inc. v. Sophos Ltd.*, CA. No. 6:22-CV-00240-ADA-DTG, W.D. Tex., Sep. 13, 2022, 22 pgs.

Defendant Sophos Ltd.'s Preliminary Invalidity Contentions, Exhibit 591-A-18, *Webroot, Inc. and Open Text, Inc. v. Sophos Ltd.*, CA. No. 6:22-CV-00240-ADA-DTG, W.D. Tex., Sep. 13, 2022, 71 pgs.

Defendant Sophos Ltd.'s Preliminary Invalidity Contentions, Exhibit 591-A-19, *Webroot, Inc. and Open Text, Inc. v. Sophos Ltd.*, CA. No. 6:22-CV-00240-ADA-DTG, W.D. Tex., Sep. 13, 2022, 31 pgs.

Defendant Sophos Ltd.'s Preliminary Invalidity Contentions, Exhibit 591-A-20, *Webroot, Inc. and Open Text, Inc. v. Sophos Ltd.*, CA. No. 6:22-CV-00240-ADA-DTG, W.D. Tex., Sep. 13, 2022, 31 pgs.

Defendant Sophos Ltd.'s Preliminary Invalidity Contentions, Exhibit 591-A-21, *Webroot, Inc. and Open Text, Inc. v. Sophos Ltd.*, CA. No. 6:22-CV-00240-ADA-DTG, W.D. Tex., Sep. 13, 2022, 34 pgs.

Defendant Sophos Ltd.'s Preliminary Invalidity Contentions, Exhibit 591-A-22, *Webroot, Inc. and Open Text, Inc. v. Sophos Ltd.*, CA. No. 6:22-CV-00240-ADA-DTG, W.D. Tex., Sep. 13, 2022, 22 pgs.

Defendant Sophos Ltd.'s Preliminary Invalidity Contentions, Exhibit 591-A-23, *Webroot, Inc. and Open Text, Inc. v. Sophos Ltd.*, CA. No. 6:22-CV-00240-ADA-DTG, W.D. Tex., Sep. 13, 2022, 20 pgs.

Defendant Sophos Ltd.'s Preliminary Invalidity Contentions, Exhibit 591-A-24, *Webroot, Inc. and Open Text, Inc. v. Sophos Ltd.*, CA. No. 6:22-CV-00240-ADA-DTG, W.D. Tex., Sep. 13, 2022, 38 pgs.

Defendant Sophos Ltd.'s Preliminary Invalidity Contentions, Exhibit 591-A-25, *Webroot, Inc. and Open Text, Inc. v. Sophos Ltd.*, CA. No. 6:22-CV-00240-ADA-DTG, W.D. Tex., Sep. 13, 2022, 72 pgs.

Defendant Sophos Ltd.'s Preliminary Invalidity Contentions, Exhibit 591-A-26, *Webroot, Inc. and Open Text, Inc. v. Sophos Ltd.*, CA. No. 6:22-CV-00240-ADA-DTG, W.D. Tex., Sep. 13, 2022, 27 pgs.

Defendant Sophos Ltd.'s Preliminary Invalidity Contentions, Exhibit 591-A-27, *Webroot, Inc. and Open Text, Inc. v. Sophos Ltd.*, CA. No. 6:22-CV-00240-ADA-DTG, W.D. Tex., Sep. 13, 2022, 27 pgs.

Defendant Sophos Ltd.'s Preliminary Invalidity Contentions, Exhibit 591-B, *Webroot, Inc. and Open Text, Inc. v. Sophos Ltd.*, CA. No. 6:22-CV-00240-ADA-DTG, W.D. Tex., Sep. 13, 2022, 26 pgs.

Defendant Sophos Ltd.'s Preliminary Invalidity Contentions, Exhibit 243-A-1, *Webroot, Inc. and Open Text, Inc. v. Sophos Ltd.*, CA. No. 6:22-CV-00240-ADA-DTG, W.D. Tex., Feb. 21, 2023, 101 pgs.

Defendant Sophos Ltd.'s Preliminary Invalidity Contentions, Exhibit 243-A-2, *Webroot, Inc. and Open Text, Inc. v. Sophos Ltd.*, CA. No. 6:22-CV-00240-ADA-DTG, W.D. Tex., Feb. 21, 2023, 54 pgs.

(56) References Cited

OTHER PUBLICATIONS

Defendant Sophos Ltd.'s Preliminary Invalidity Contentions, Exhibit 243-A-3, *Webroot, Inc. and Open Text, Inc.* v. *Sophos Ltd.*, CA. No. 6:22-CV-00240-ADA-DTG, W.D. Tex., Feb. 21, 2023, 27 pgs.

Defendant Sophos Ltd.'s Preliminary Invalidity Contentions, Exhibit 243-A-4, *Webroot, Inc. and Open Text, Inc.* v. *Sophos Ltd.*, CA. No. 6:22-CV-00240-ADA-DTG, W.D. Tex., Feb. 21, 2023, 80 pgs.

Defendant Sophos Ltd.'s Preliminary Invalidity Contentions, Exhibit 243-A-5, *Webroot, Inc. and Open Text, Inc.* v. *Sophos Ltd.*, CA. No. 6:22-CV-00240-ADA-DTG, W.D. Tex., Feb. 21, 2023, 58 pgs.

Defendant Sophos Ltd.'s Preliminary Invalidity Contentions, Exhibit 243-A-6, *Webroot, Inc. and Open Text, Inc.* v. *Sophos Ltd.*, CA. No. 6:22-CV-00240-ADA-DTG, W.D. Tex., Feb. 21, 2023, 49 pgs.

Defendant Sophos Ltd.'s Preliminary Invalidity Contentions, Exhibit 243-A-7, *Webroot, Inc. and Open Text, Inc.* v. *Sophos Ltd.*, CA. No. 6:22-CV-00240-ADA-DTG, W.D. Tex., Feb. 21, 2023, 98 pgs.

Defendant Sophos Ltd.'s Preliminary Invalidity Contentions, Exhibit 243-A-8, *Webroot, Inc. and Open Text, Inc.* v. *Sophos Ltd.*, CA. No. 6:22-CV-00240-ADA-DTG, W.D. Tex., Feb. 21, 2023, 58 pgs.

Defendant Sophos Ltd.'s Preliminary Invalidity Contentions, Exhibit 243-A-9, *Webroot, Inc. and Open Text, Inc.* v. *Sophos Ltd.*, CA. No. 6:22-CV-00240-ADA-DTG, W.D. Tex., Feb. 21, 2023, 59 pgs.

Defendant Sophos Ltd.'s Preliminary Invalidity Contentions, Exhibit 243-A-10, *Webroot, Inc. and Open Text, Inc.* v. *Sophos Ltd.*, CA. No. 6:22-CV-00240-ADA-DTG, W.D. Tex., Feb. 21, 2023, 103 pgs.

Defendant Sophos Ltd.'s Preliminary Invalidity Contentions, Exhibit 243-A-11, *Webroot, Inc. and Open Text, Inc.* v. *Sophos Ltd.*, CA. No. 6:22-CV-00240-ADA-DTG, W.D. Tex., Feb. 21, 2023, 60 pgs.

Defendant Sophos Ltd.'s Preliminary Invalidity Contentions, Exhibit 243-A-12, *Webroot, Inc. and Open Text, Inc.* v. *Sophos Ltd.*, CA. No. 6:22-CV-00240-ADA-DTG, W.D. Tex., Feb. 21, 2023, 38 pgs.

Defendant Sophos Ltd.'s Preliminary Invalidity Contentions, Exhibit 243-A-13, *Webroot, Inc. and Open Text, Inc.* v. *Sophos Ltd.*, CA. No. 6:22-CV-00240-ADA-DTG, W.D. Tex., Feb. 21, 2023, 40 pgs.

Defendant Sophos Ltd.'s Preliminary Invalidity Contentions, Exhibit 243-A-14, *Webroot, Inc. and Open Text, Inc.* v. *Sophos Ltd.*, CA. No. 6:22-CV-00240-ADA-DTG, W.D. Tex., Feb. 21, 2023, 49 pgs.

Defendant Sophos Ltd.'s Preliminary Invalidity Contentions, Exhibit 243-A-15, *Webroot, Inc. and Open Text, Inc.* v. *Sophos Ltd.*, CA. No. 6:22-CV-00240-ADA-DTG, W.D. Tex., Feb. 21, 2023, 57 pgs.

Defendant Sophos Ltd.'s Preliminary Invalidity Contentions, Exhibit 243-A-16, *Webroot, Inc. and Open Text, Inc.* v. *Sophos Ltd.*, CA. No. 6:22-CV-00240-ADA-DTG, W.D. Tex., Feb. 21, 2023, 60 pgs.

Defendant Sophos Ltd.'s Preliminary Invalidity Contentions, Exhibit 243-A-17, *Webroot, Inc. and Open Text, Inc.* v. *Sophos Ltd.*, CA. No. 6:22-CV-00240-ADA-DTG, W.D. Tex., Feb. 21, 2023, 47 pgs.

Defendant Sophos Ltd.'s Preliminary Invalidity Contentions, Exhibit 243-A-18, *Webroot, Inc. and Open Text, Inc.* v. *Sophos Ltd.*, CA. No. 6:22-CV-00240-ADA-DTG, W.D. Tex., Feb. 21, 2023, 33 pgs.

Defendant Sophos Ltd.'s Preliminary Invalidity Contentions, Exhibit 243-A-19, *Webroot, Inc. and Open Text, Inc.* v. *Sophos Ltd.*, CA. No. 6:22-CV-00240-ADA-DTG, W.D. Tex., Feb. 21, 2023, 70 pgs.

Defendant Sophos Ltd.'s Preliminary Invalidity Contentions, Exhibit 243-A-20, *Webroot, Inc. and Open Text, Inc.* v. *Sophos Ltd.*, CA. No. 6:22-CV-00240-ADA-DTG, W.D. Tex., Feb. 21, 2023, 51 pgs.

Defendant Sophos Ltd.'s Preliminary Invalidity Contentions, Exhibit 243-A-21, *Webroot, Inc. and Open Text, Inc.* v. *Sophos Ltd.*, CA. No. 6:22-CV-00240-ADA-DTG, W.D. Tex., Feb. 21, 2023, 117 pgs.

Defendant Sophos Ltd.'s Preliminary Invalidity Contentions, Exhibit 243-A-22, *Webroot, Inc. and Open Text, Inc.* v. *Sophos Ltd.*, CA. No. 6:22-CV-00240-ADA-DTG, W.D. Tex., Feb. 21, 2023, 239 pgs.

Defendant Sophos Ltd.'s Preliminary Invalidity Contentions, Exhibit 243-A-23, *Webroot, Inc. and Open Text, Inc.* v. *Sophos Ltd.*, CA. No. 6:22-CV-00240-ADA-DTG, W.D. Tex., Feb. 21, 2023, 62 pgs.

Defendant Sophos Ltd.'s Preliminary Invalidity Contentions, Exhibit 243-A-24, *Webroot, Inc. and Open Text, Inc.* v. *Sophos Ltd.*, CA. No. 6:22-CV-00240-ADA-DTG, W.D. Tex., Feb. 21, 2023, 36 pgs.

Defendant Sophos Ltd.'s Preliminary Invalidity Contentions, Exhibit 243-A-25, *Webroot, Inc. and Open Text, Inc.* v. *Sophos Ltd.*, CA. No. 6:22-CV-00240-ADA-DTG, W.D. Tex., Feb. 21, 2023, 39 pgs.

Defendant Sophos Ltd.'s Preliminary Invalidity Contentions, Exhibit 243-A-26, *Webroot, Inc. and Open Text, Inc.* v. *Sophos Ltd.*, CA. No. 6:22-CV-00240-ADA-DTG, W.D. Tex., Feb. 21, 2023, 38 pgs.

Defendant Sophos Ltd.'s Preliminary Invalidity Contentions, Exhibit 243-A-27, *Webroot, Inc. and Open Text, Inc.* v. *Sophos Ltd.*, CA. No. 6:22-CV-00240-ADA-DTG, W.D. Tex., Feb. 21, 2023, 44 pgs.

Defendant Sophos Ltd.'s Preliminary Invalidity Contentions, Exhibit 243-A-28, *Webroot, Inc. and Open Text, Inc.* v. *Sophos Ltd.*, CA. No. 6:22-CV-00240-ADA-DTG, W.D. Tex., Feb. 21, 2023, 31 pgs.

Defendant Sophos Ltd.'s Preliminary Invalidity Contentions, Exhibit 243-B, *Webroot, Inc. and Open Text, Inc.* v. *Sophos Ltd.*, CA. No. 6:22-CV-00240-ADA-DTG, W.D. Tex., Feb. 21, 2023, 111 pgs.

Defendant Sophos Ltd.'s Preliminary Invalidity Contentions, Exhibit 932-A-1, *Webroot, Inc. and Open Text, Inc.* v. *Sophos Ltd.*, CA. No. 6:22-CV-00240-ADA-DTG, W.D. Tex., Feb. 21, 2023, 122 pgs.

Defendant Sophos Ltd.'s Preliminary Invalidity Contentions, Exhibit 932-A-2, *Webroot, Inc. and Open Text, Inc.* v. *Sophos Ltd.*, CA. No. 6:22-CV-00240-ADA-DTG, W.D. Tex., Feb. 21, 2023,62 pgs.

Defendant Sophos Ltd.'s Preliminary Invalidity Contentions, Exhibit 932-A-3, *Webroot, Inc. and Open Text, Inc.* v. *Sophos Ltd.*, CA. No. 6:22-CV-00240-ADA-DTG, W.D. Tex., Feb. 21, 2023, 28 pgs.

Defendant Sophos Ltd.'s Preliminary Invalidity Contentions, Exhibit 932-A-4, *Webroot, Inc. and Open Text, Inc.* v. *Sophos Ltd.*, CA. No. 6:22-CV-00240-ADA-DTG, W.D. Tex., Feb. 21, 2023, 95 pgs.

Defendant Sophos Ltd.'s Preliminary Invalidity Contentions, Exhibit 932-A-5, *Webroot, Inc. and Open Text, Inc.* v. *Sophos Ltd.*, CA. No. 6:22-CV-00240-ADA-DTG, W.D. Tex., Feb. 21, 2023, 59 pgs.

Defendant Sophos Ltd.'s Preliminary Invalidity Contentions, Exhibit 932-A-6, *Webroot, Inc. and Open Text, Inc.* v. *Sophos Ltd.*, CA. No. 6:22-CV-00240-ADA-DTG, W.D. Tex., Feb. 21, 2023, 115 pgs.

Defendant Sophos Ltd.'s Preliminary Invalidity Contentions, Exhibit 932-A-7, *Webroot, Inc. and Open Text, Inc.* v. *Sophos Ltd.*, CA. No. 6:22-CV-00240-ADA-DTG, W.D. Tex., Feb. 21, 2023, 69 pgs.

Defendant Sophos Ltd.'s Preliminary Invalidity Contentions, Exhibit 932-A-8, *Webroot, Inc. and Open Text, Inc.* v. *Sophos Ltd.*, CA. No. 6:22-CV-00240-ADA-DTG, W.D. Tex., Feb. 21, 2023, 57 pgs.

Defendant Sophos Ltd.'s Preliminary Invalidity Contentions, Exhibit 932-A-9, *Webroot, Inc. and Open Text, Inc.* v. *Sophos Ltd.*, CA. No. 6:22-CV-00240-ADA-DTG, W.D. Tex., Feb. 21, 2023, 119 pgs.

Defendant Sophos Ltd.'s Preliminary Invalidity Contentions, Exhibit 932-A-10, *Webroot, Inc. and Open Text, Inc.* v. *Sophos Ltd.*, CA. No. 6:22-CV-00240-ADA-DTG, W.D. Tex., Feb. 21, 2023, 65 pgs.

Defendant Sophos Ltd.'s Preliminary Invalidity Contentions, Exhibit 932-A-11, *Webroot, Inc. and Open Text, Inc.* v. *Sophos Ltd.*, CA. No. 6:22-CV-00240-ADA-DTG, W.D. Tex., Feb. 21, 2023, 62 pgs.

Defendant Sophos Ltd.'s Preliminary Invalidity Contentions, Exhibit 932-A-12, *Webroot, Inc. and Open Text, Inc.* v. *Sophos Ltd.*, CA. No. 6:22-CV-00240-ADA-DTG, W.D. Tex., Feb. 21, 2023, 39 pgs.

Defendant Sophos Ltd.'s Preliminary Invalidity Contentions, Exhibit 932-A-13, *Webroot, Inc. and Open Text, Inc.* v. *Sophos Ltd.*, CA. No. 6:22-CV-00240-ADA-DTG, W.D. Tex., Feb. 21, 2023, 63 pgs.

Defendant Sophos Ltd.'s Preliminary Invalidity Contentions, Exhibit 932-A-14, *Webroot, Inc. and Open Text, Inc.* v. *Sophos Ltd.*, CA. No. 6:22-CV-00240-ADA-DTG, W.D. Tex., Feb. 21, 2023, 59 pgs.

Defendant Sophos Ltd.'s Preliminary Invalidity Contentions, Exhibit 932-A-15, *Webroot, Inc. and Open Text, Inc.* v. *Sophos Ltd.*, CA. No. 6:22-CV-00240-ADA-DTG, W.D. Tex., Feb. 21, 2023, 66 pgs.

Defendant Sophos Ltd.'s Preliminary Invalidity Contentions, Exhibit 932-A-16, *Webroot, Inc. and Open Text, Inc.* v. *Sophos Ltd.*, CA. No. 6:22-CV-00240-ADA-DTG, W.D. Tex., Feb. 21, 2023, 60 pgs.

Defendant Sophos Ltd.'s Preliminary Invalidity Contentions, Exhibit 932-A-17, *Webroot, Inc. and Open Text, Inc.* v. *Sophos Ltd.*, CA. No. 6:22-CV-00240-ADA-DTG, W.D. Tex., Feb. 21, 2023, 65 pgs.

Defendant Sophos Ltd.'s Preliminary Invalidity Contentions, Exhibit 932-A-18, *Webroot, Inc. and Open Text, Inc.* v. *Sophos Ltd.*, CA. No. 6:22-CV-00240-ADA-DTG, W.D. Tex., Feb. 21, 2023, 35 pgs.

Defendant Sophos Ltd.'s Preliminary Invalidity Contentions, Exhibit 932-A-19, *Webroot, Inc. and Open Text, Inc.* v. *Sophos Ltd.*, CA. No. 6:22-CV-00240-ADA-DTG, W.D. Tex., Feb. 21, 2023, 80 pgs.

Defendant Sophos Ltd.'s Preliminary Invalidity Contentions, Exhibit 932-A-20, *Webroot, Inc. and Open Text, Inc.* v. *Sophos Ltd.*, CA. No. 6:22-CV-00240- ADA-DTG, W.D. Tex., Feb. 21, 2023, 61 pgs.

(56)　　　　　　　References Cited

OTHER PUBLICATIONS

Defendant Sophos Ltd.'s Preliminary Invalidity Contentions, Exhibit 932-A-21, *Webroot, Inc. and Open Text, Inc.* v. *Sophos Ltd.*, CA. No. 6:22-CV-00240-ADA-DTG, W.D. Tex., Feb. 21, 2023, 158 pgs.
Defendant Sophos Ltd.'s Preliminary Invalidity Contentions, Exhibit 932-A-22, *Webroot, Inc. and Open Text, Inc.* v. *Sophos Ltd.*, CA. No. 6:22-CV-00240-ADA-DTG, W.D. Tex., Feb. 21, 2023, 297 pgs.
Defendant Sophos Ltd.'s Preliminary Invalidity Contentions, Exhibit 932-A-23, *Webroot, Inc. and Open Text, Inc.* v. *Sophos Ltd.*, CA. No. 6:22-CV-00240-ADA-DTG, W.D. Tex., Feb. 21, 2023, 73 pgs.
Defendant Sophos Ltd.'s Preliminary Invalidity Contentions, Exhibit 932-A-24, *Webroot, Inc. and Open Text, Inc.* v. *Sophos Ltd.*, CA. No. 6:22-CV-00240-ADA-DTG, W.D. Tex., Feb. 21, 2023, 44 pgs.
Defendant Sophos Ltd.'s Preliminary Invalidity Contentions, Exhibit 932-A-25, *Webroot, Inc. and Open Text, Inc.* v. *Sophos Ltd.*, CA. No. 6:22-CV-00240-ADA-DTG, W.D. Tex., Feb. 21, 2023, 46 pgs.
Defendant Sophos Ltd.'s Preliminary Invalidity Contentions, Exhibit 932-A-26, *Webroot, Inc. and Open Text, Inc.* v. *Sophos Ltd.*, CA. No. 6:22-CV-00240-ADA-DTG, W.D. Tex., Feb. 21, 2023, 43 pgs.
Defendant Sophos Ltd.'s Preliminary Invalidity Contentions, Exhibit 932-A-27, *Webroot, Inc. and Open Text, Inc.* v. *Sophos Ltd.*, CA. No. 6:22-CV-00240-ADA-DTG, W.D. Tex., Feb. 21, 2023, 34 pgs.
Defendant Sophos Ltd.'s Preliminary Invalidity Contentions, Exhibit 932-B, *Webroot, Inc. and Open Text, Inc.* v. *Sophos Ltd.*, CA. No. 6:22-CV-00240-ADA-DTG, W.D. Tex., Feb. 21, 2023, 139 pgs.
Defendant Sophos Ltd.'s Preliminary Invalidity Contentions, Exhibit 244-A-1, *Webroot, Inc. and Open Text, Inc.* v. *Sophos Ltd.*, CA. No. 6:22-CV-00240-ADA-DTG, W.D. Tex., Feb. 21, 2023, 290 pgs.
Defendant Sophos Ltd.'s Preliminary Invalidity Contentions, Exhibit 244-A-2, *Webroot, Inc. and Open Text, Inc.* v. *Sophos Ltd.*, CA. No. 6:22-CV-00240-ADA-DTG, W.D. Tex., Feb. 21, 2023, 104 pgs.
Defendant Sophos Ltd.'s Preliminary Invalidity Contentions, Exhibit 244-A-3, *Webroot, Inc. and Open Text, Inc.* v. *Sophos Ltd.*, CA. No. 6:22-CV-00240-ADA-DTG, W.D. Tex., Feb. 21, 2023, 71 pgs.
Defendant Sophos Ltd.'s Preliminary Invalidity Contentions, Exhibit 244-A-4, *Webroot, Inc. and Open Text, Inc.* v. *Sophos Ltd.*, CA. No. 6:22-CV-00240-ADA-DTG, W.D. Tex., Feb. 21, 2023, 182 pgs.
Defendant Sophos Ltd.'s Preliminary Invalidity Contentions, Exhibit 244-A-5, *Webroot, Inc. and Open Text, Inc.* v. *Sophos Ltd.*, CA. No. 6:22-CV-00240-ADA-DTG, W.D. Tex., Feb. 21, 2023, 37 pgs.
Defendant Sophos Ltd.'s Preliminary Invalidity Contentions, Exhibit 244-A-6, *Webroot, Inc. and Open Text, Inc.* v. *Sophos Ltd.*, CA. No. 6:22-CV-00240-ADA-DTG, W.D. Tex., Feb. 21, 2023, 43 pgs.
Defendant Sophos Ltd.'s Preliminary Invalidity Contentions, Exhibit 244-A-7, *Webroot, Inc. and Open Text, Inc.* v. *Sophos Ltd.*, CA. No. 6:22-CV-00240-ADA-DTG, W.D. Tex., Feb. 21, 2023, 55 pgs.
Defendant Sophos Ltd.'s Preliminary Invalidity Contentions, Exhibit 244-A-8, *Webroot, Inc. and Open Text, Inc.* v. *Sophos Ltd.*, CA. No. 6:22-CV-00240-ADA-DTG, W.D. Tex., Feb. 21, 2023, 80 pgs.
Defendant Sophos Ltd.'s Preliminary Invalidity Contentions, Exhibit 244-A-9, *Webroot, Inc. and Open Text, Inc.* v. *Sophos Ltd.*, CA. No. 6:22-CV-00240-ADA-DTG, W.D. Tex., Feb. 21, 2023, 62 pgs.
Defendant Sophos Ltd.'s Preliminary Invalidity Contentions, Exhibit 244-A-10, *Webroot, Inc. and Open Text, Inc.* v. *Sophos Ltd.*, CA. No. 6:22-CV-00240-ADA-DTG, W.D. Tex., Feb. 21, 2023, 70 pgs.
Defendant Sophos Ltd.'s Preliminary Invalidity Contentions, Exhibit 244-A-11, *Webroot, Inc. and Open Text, Inc.* v. *Sophos Ltd.*, CA. No. 6:22-CV-00240-ADA-DTG, W.D. Tex., Feb. 21, 2023, 45 pgs.
Defendant Sophos Ltd.'s Preliminary Invalidity Contentions, Exhibit 244-A-12, *Webroot, Inc. and Open Text, Inc.* v. *Sophos Ltd.*, CA. No. 6:22-CV-00240-ADA-DTG, W.D. Tex., Feb. 21, 2023, 72 pgs.
Defendant Sophos Ltd.'s Preliminary Invalidity Contentions, Exhibit 244-A-13, *Webroot, Inc. and Open Text, Inc.* v. *Sophos Ltd.*, CA. No. 6:22-CV-00240-ADA-DTG, W.D. Tex., Feb. 21, 2023, 68 pgs.
Defendant Sophos Ltd.'s Preliminary Invalidity Contentions, Exhibit 244-A-14, *Webroot, Inc. and Open Text, Inc.* v. *Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 244-A-15, *Webroot, Inc. and Open Text, Inc.* v. *Sophos Ltd.*, CA. No. 6:22-CV-00240-ADA-DTG, W.D. Tex., Feb. 21, 2023, 54 pgs.
Defendant Sophos Ltd.'s Preliminary Invalidity Contentions, Exhibit 244-A-16, *Webroot, Inc. and Open Text, Inc.* v. *Sophos Ltd.*, CA. No. 6:22-CV-00240-ADA-DTG, W.D. Tex., Feb. 21, 2023, 63 pgs.
Defendant Sophos Ltd.'s Preliminary Invalidity Contentions, Exhibit 244-A-17, *Webroot, Inc. and Open Text, Inc.* v. *Sophos Ltd.*, CA. No. 6:22-CV-00240-ADA-DTG, W.D. Tex., Feb. 21, 2023, 212 pgs.
Defendant Sophos Ltd.'s Preliminary Invalidity Contentions, Exhibit 244-A-18, *Webroot, Inc. and Open Text, Inc.* v. *Sophos Ltd.*, CA. No. 6:22-CV-00240-ADA-DTG, W.D. Tex., Feb. 21, 2023, 66 pgs.
Defendant Sophos Ltd.'s Preliminary Invalidity Contentions, Exhibit 244-A-19, *Webroot, Inc. and Open Text, Inc.* v. *Sophos Ltd.*, CA. No. 6:22-CV-00240-ADA-DTG, W.D. Tex., Feb. 21, 2023, 109 pgs.
Defendant Sophos Ltd.'s Preliminary Invalidity Contentions, Exhibit 244-A-20, *Webroot, Inc. and Open Text, Inc.* v. *Sophos Ltd.*, CA. No. 6:22-CV-00240-ADA-DTG, W.D. Tex., Feb. 21, 2023, 63 pgs.
Defendant Sophos Ltd.'s Preliminary Invalidity Contentions, Exhibit 244-A-21, *Webroot, Inc. and Open Text, Inc.* v. *Sophos Ltd.*, CA. No. 6:22-CV-00240-ADA-DTG, W.D. Tex., Feb. 21, 2023, 4 pgs.
Defendant Sophos Ltd.'s Preliminary Invalidity Contentions, Exhibit 244-A-22, *Webroot, Inc. and Open Text, Inc.* v. *Sophos Ltd.*, CA. No. 6:22-CV-00240-ADA-DTG, W.D. Tex., Feb. 21, 2023, 198 pgs.
Defendant Sophos Ltd.'s Preliminary Invalidity Contentions, Exhibit 244-B, *Webroot, Inc. and Open Text, Inc.* v. *Sophos Ltd.*, CA. No. 6:22-CV-00240-ADA-DTG, W.D. Tex., Feb. 21, 2023, 56 pgs.
Defendant Sophos Ltd.'s Preliminary Invalidity Contentions, Exhibit 505-A-1, *Webroot, Inc. and Open Text, Inc.* v. *Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 505-A-2, *Webroot, Inc. and Open Text, Inc.* v. *Sophos Ltd.*, CA. No. 6:22-CV-00240-ADA-DTG, W.D. Tex., Feb. 21, 2023, 39 pgs.
Defendant Sophos Ltd.'s Preliminary Invalidity Contentions, Exhibit 505-A-3, *Webroot, Inc. and Open Text, Inc.* v. *Sophos Ltd.*, CA. No. 6:22-CV-00240-ADA-DTG, W.D. Tex., Feb. 21, 2023, 111 pgs.
Defendant Sophos Ltd.'s Preliminary Invalidity Contentions, Exhibit 505-A-4, *Webroot, Inc. and Open Text, Inc.* v. *Sophos Ltd.*, CA. No. 6:22-CV-00240-ADA-DTG, W.D. Tex., Feb. 21, 2023, 34 pgs.
Defendant Sophos Ltd.'s Preliminary Invalidity Contentions, Exhibit 505-A-5, *Webroot, Inc. and Open Text, Inc.* v. *Sophos Ltd.*, CA. No. 6:22-CV-00240-ADA-DTG, W.D. Tex., Feb. 21, 2023, 38 pgs.
Defendant Sophos Ltd.'s Preliminary Invalidity Contentions, Exhibit 505-A-6, *Webroot, Inc. and Open Text, Inc.* v. *Sophos Ltd.*, CA. No. 6:22-CV-00240-ADA-DTG, W.D. Tex., Feb. 21, 2023, 162 pgs.
Defendant Sophos Ltd.'s Preliminary Invalidity Contentions, Exhibit 505-A-7, *Webroot, Inc. and Open Text, Inc.* v. *Sophos Ltd.*, CA. No. 6:22-CV-00240-ADA-DTG, W.D. Tex., Feb. 21, 2023, 96 pgs.
Defendant Sophos Ltd.'s Preliminary Invalidity Contentions, Exhibit 505-A-8, *Webroot, Inc. and Open Text, Inc.* v. *Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 505-A-9, *Webroot, Inc. and Open Text, Inc.* v. *Sophos Ltd.*, CA. No. 6:22-CV-00240-ADA-DTG, W.D. Tex., Feb. 21, 2023, 81 pgs.
Defendant Sophos Ltd.'s Preliminary Invalidity Contentions, Exhibit 505-A-10, *Webroot, Inc. and Open Text, Inc.* v. *Sophos Ltd.*, CA. No. 6:22-CV-00240-ADA-DTG, W.D. Tex., Feb. 21, 2023, 48 pgs.
Defendant Sophos Ltd.'s Preliminary Invalidity Contentions, Exhibit 505-A-11, *Webroot, Inc. and Open Text, Inc.* v. *Sophos Ltd.*, CA. No. 6:22-CV-00240-ADA-DTG, W.D. Tex., Feb. 21, 2023, 52 pgs.
Defendant Sophos Ltd.'s Preliminary Invalidity Contentions, Exhibit 505-A-12, *Webroot, Inc. and Open Text, Inc.* v. *Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 505-A-13, *Webroot, Inc. and Open Text, Inc.* v. *Sophos Ltd.*, CA. No. 6:22-CV-00240-ADA-DTG, W.D. Tex., Feb. 21, 2023, 147 pgs.
Defendant Sophos Ltd.'s Preliminary Invalidity Contentions, Exhibit 505-A-14, *Webroot, Inc. and Open Text, Inc.* v. *Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 505-A-15, *Webroot, Inc. and Open Text, Inc.* v. *Sophos Ltd.*, CA. No. 6:22-CV-00240-ADA-DTG, W.D. Tex., Feb. 21, 2023, 148 pgs.
Defendant Sophos Ltd.'s Preliminary Invalidity Contentions, Exhibit 505-A-16, *Webroot, Inc. and Open Text, Inc.* v. *Sophos Ltd.*, CA. No. 6:22-CV-00240-ADA-DTG, W.D. Tex., Feb. 21, 2023, 46 pgs.

(56) References Cited

OTHER PUBLICATIONS

Defendant Sophos Ltd.'s Preliminary Invalidity Contentions, Exhibit 505-A-17, *Webroot, Inc. and Open Text, Inc.* v. *Sophos Ltd.*, CA. No. 6:22-CV-00240-ADA-DTG, W.D. Tex., Feb. 21, 2023, 31 pgs.
Defendant Sophos Ltd.'s Preliminary Invalidity Contentions, Exhibit 505-A-18, *Webroot, Inc. and Open Text, Inc.* v. *Sophos Ltd.*, CA. No. 6:22-CV-00240-ADA-DTG, W.D. Tex., Feb. 21, 2023, 47 pgs.
Defendant Sophos Ltd.'s Preliminary Invalidity Contentions, Exhibit 505-A-19, *Webroot, Inc. and Open Text, Inc.* v. *Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 505-A-20, *Webroot, Inc. and Open Text, Inc.* v. *Sophos Ltd.*, CA. No. 6:22-CV-00240-ADA-DTG, W.D. Tex., Feb. 21, 2023, 47 pgs.
Defendant Sophos Ltd.'s Preliminary Invalidity Contentions, Exhibit 505-B, *Webroot, Inc. and Open Text, Inc.* v. *Sophos Ltd.*, CA. No. 6:22-CV-00240-ADA-DTG, W.D. Tex., Feb. 21, 2023, 81 pgs.
Defendant's Preliminary Invalidity Contentions, Exhibit 045-A-2, *Webroot, Inc. and Open Text, Inc.* v. *Trend Micro Inc.*, No. 6:22-CV-00239-ADA-DTG, W.D. Tex., Sep. 13, 2022, 35 pgs.
Defendant's Preliminary Invalidity Contentions, Exhibit 045-A-3, *Webroot, Inc. and Open Text, Inc.* v. *Trend Micro Inc.*, No. 6:22-CV-00239-ADA-DTG, W.D. Tex., Sep. 13, 2022, 75 pgs.
Defendant's Preliminary Invalidity Contentions, Exhibit 045-A-4, *Webroot, Inc. and Open Text, Inc.* v. *Trend Micro Inc.*, No. 6:22-CV-00239-ADA-DTG, W.D. Tex., Sep. 13, 2022, 51 pgs.
Defendant's Preliminary Invalidity Contentions, Exhibit 045-A-5, *Webroot, Inc. and Open Text, Inc.* v. *Trend Micro Inc.*, No. 6:22-CV-00239-ADA-DTG, W.D. Tex., Sep. 13, 2022, 55 pgs.
Defendant's Preliminary Invalidity Contentions, Exhibit 045-A-6, *Webroot, Inc. and Open Text, Inc.* v. *Trend Micro Inc.*, No. 6:22-CV-00239-ADA-DTG, W.D. Tex., Sep. 13, 2022, 66 pgs.
Defendant's Preliminary Invalidity Contentions, Exhibit 045-A-7, *Webroot, Inc. and Open Text, Inc.* v. *Trend Micro Inc.*, No. 6:22-CV-00239-ADA-DTG, W.D. Tex., Sep. 13, 2022, 62 pgs.
Defendant's Preliminary Invalidity Contentions, Exhibit 045-A-9, *Webroot, Inc. and Open Text, Inc.* v. *Trend Micro Inc.*, No. 6:22-CV-00239-ADA-DTG, W.D. Tex., Sep. 13, 2022, 47 pgs.
Defendant's Preliminary Invalidity Contentions, Exhibit 045-A-10, *Webroot, Inc. and Open Text, Inc.* v. *Trend Micro Inc.*, No. 6:22-CV-00239-ADA-DTG, W.D. Tex., Sep. 13, 2022, 35 pgs.
Defendant's Preliminary Invalidity Contentions, Exhibit 045-A-11, *Webroot, Inc. and Open Text, Inc.* v. *Trend Micro Inc.*, No. 6:22-CV-00239-ADA-DTG, W.D. Tex., Sep. 13, 2022, 37 pgs.
Defendant's Preliminary Invalidity Contentions, Exhibit 045-A-12, *Webroot, Inc. and Open Text, Inc.* v. *Trend Micro Inc.*, No. 6:22-CV-00239-ADA-DTG, W.D. Tex., Sep. 13, 2022, 21 pgs.
Defendant's Preliminary Invalidity Contentions, Exhibit 045-A-13, *Webroot, Inc. and Open Text, Inc.* v. *Trend Micro Inc.*, No. 6:22-CV-00239-ADA-DTG, W.D. Tex., Sep. 13, 2022, 22 pgs.
Defendant's Preliminary Invalidity Contentions, Exhibit 045-A-14, *Webroot, Inc. and Open Text, Inc.* v. *Trend Micro Inc.*, No. 6:22-CV-00239-ADA-DTG, W.D. Tex., Sep. 13, 2022, 26 pgs.
Defendant's Preliminary Invalidity Contentions, Exhibit 045-A-15, *Webroot, Inc. and Open Text, Inc.* v. *Trend Micro Inc.*, No. 6:22-CV-00239-ADA-DTG, W.D. Tex., Sep. 13, 2022, 18 pgs.
Defendant's Preliminary Invalidity Contentions, Exhibit 045-A-16, *Webroot, Inc. and Open Text, Inc.* v. *Trend Micro Inc.*, No. 6:22-CV-00239-ADA-DTG, W.D. Tex., Sep. 13, 2022, 23 pgs.
Defendant's Preliminary Invalidity Contentions, Exhibit 045-A-17, *Webroot, Inc. and Open Text, Inc.* v. *Trend Micro Inc.*, No. 6:22-CV-00239-ADA-DTG, W.D. Tex., Sep. 13, 2022, 24 pgs.
Defendant's Preliminary Invalidity Contentions, Exhibit 045-A-18, *Webroot, Inc. and Open Text, Inc.* v. *Trend Micro Inc.*, No. 6:22-CV-00239-ADA-DTG, W.D. Tex., Sep. 13, 2022, 26 pgs.
Defendant's Preliminary Invalidity Contentions, Exhibit 045-A-19, *Webroot, Inc. and Open Text, Inc.* v. *Trend Micro Inc.*, No. 6:22-CV-00239-ADA-DTG, W.D. Tex., Sep. 13, 2022, 20 pgs.
Defendant's Preliminary Invalidity Contentions, Exhibit 045-A-20, *Webroot, Inc. and Open Text, Inc.* v. *Trend Micro Inc.*, No. 6:22-CV-00239-ADA-DTG, W.D. Tex., Sep. 13, 2022, 23 pgs.
Defendant's Preliminary Invalidity Contentions, Exhibit 045-A-21, *Webroot, Inc. and Open Text, Inc.* v. *Trend Micro Inc.*, No. 6:22-CV-00239-ADA-DTG, W.D. Tex., Sep. 13, 2022, 48 pgs.
Defendant's Preliminary Invalidity Contentions, Exhibit 045-A-22, *Webroot, Inc. and Open Text, Inc.* v. *Trend Micro Inc.*, No. 6:22-CV-00239-ADA-DTG, W.D. Tex., Sep. 13, 2022, 55 pgs.
Defendant's Preliminary Invalidity Contentions, Exhibit 045-A-23, *Webroot, Inc. and Open Text, Inc.* v. *Trend Micro Inc.*, No. 6:22-CV-00239-ADA-DTG, W.D. Tex., Sep. 13, 2022, 36 pgs.
Defendant's Preliminary Invalidity Contentions, Exhibit 045-A-24, *Webroot, Inc. and Open Text, Inc.* v. *Trend Micro Inc.*, No. 6:22-CV-00239-ADA-DTG, W.D. Tex., Sep. 13, 2022, 57 pgs.
Defendant's Preliminary Invalidity Contentions, Exhibit 045-A-25, *Webroot, Inc. and Open Text, Inc.* v. *Trend Micro Inc.*, No. 6:22-CV-00239-ADA-DTG, W.D. Tex., Sep. 13, 2022, 45 pgs.
Defendant's Preliminary Invalidity Contentions, Exhibit 045-A-26, *Webroot, Inc. and Open Text, Inc.* v. *Trend Micro Inc.*, No. 6:22-CV-00239-ADA-DTG, W.D. Tex., Sep. 13, 2022, 19 pgs.
Defendant's Preliminary Invalidity Contentions, Exhibit 045-A-27, *Webroot, Inc. and Open Text, Inc.* v. *Trend Micro Inc.*, No. 6:22-CV-00239-ADA-DTG, W.D. Tex., Sep. 13, 2022, 43 pgs.
Defendant's Preliminary Invalidity Contentions, Exhibit 045-A-28, *Webroot, Inc. and Open Text, Inc.* v. *Trend Micro Inc.*, No. 6:22-CV-00239-ADA-DTG, W.D. Tex., Sep. 13, 2022, 48 pgs.
Defendant's Preliminary Invalidity Contentions, Exhibit 045-A-29, *Webroot, Inc. and Open Text, Inc.* v. *Trend Micro Inc.*, No. 6:22-CV-00239-ADA-DTG, W.D. Tex., Sep. 13, 2022, 48 pgs.
Defendant's Preliminary Invalidity Contentions, Exhibit 045-A-30, *Webroot, Inc. and Open Text, Inc.* v. *Trend Micro Inc.*, No. 6:22-CV-00239-ADA-DTG, W.D. Tex., Sep. 13, 2022, 49 pgs.
Defendant's Preliminary Invalidity Contentions, Exhibit 045-A-31, *Webroot, Inc. and Open Text, Inc.* v. *Trend Micro Inc.*, No. 6:22-CV-00239-ADA-DTG, W.D. Tex., Sep. 13, 2022, 59 pgs.
Defendant's Preliminary Invalidity Contentions, Exhibit 045-A-32, *Webroot, Inc. and Open Text, Inc.* v. *Trend Micro Inc.*, No. 6:22-CV-00239-ADA-DTG, W.D. Tex., Sep. 13, 2022, 100 pgs.
Defendant's Preliminary Invalidity Contentions, Exhibit 045-A-33, *Webroot, Inc. and Open Text, Inc.* v. *Trend Micro Inc.*, No. 6:22-CV-00239-ADA-DTG, W.D. Tex., Sep. 13, 2022, 74 pgs.
Defendant's Preliminary Invalidity Contentions, Exhibit 045-A-34, *Webroot, Inc. and Open Text, Inc.* v. *Trend Micro Inc.*, No. 6:22-CV-00239-ADA-DTG, W.D. Tex., Sep. 13, 2022, 39 pgs.
Defendant's Preliminary Invalidity Contentions, Exhibit 045-A-35, *Webroot, Inc. and Open Text, Inc.* v. *Trend Micro Inc.*, No. 6:22-CV-00239-ADA-DTG, W.D. Tex., Sep. 13, 2022, 64 pgs.
Defendant's Preliminary Invalidity Contentions, Exhibit 045-A-36, *Webroot, Inc. and Open Text, Inc.* v. *Trend Micro Inc.*, No. 6:22-CV-00239-ADA-DTG, W.D. Tex., Sep. 13, 2022, 170 pgs.
Defendant's Preliminary Invalidity Contentions, Exhibit 045-A-37, *Webroot, Inc. and Open Text, Inc.* v. *Trend Micro Inc.*, No. 6:22-CV-00239-ADA-DTG, W.D. Tex., Sep. 13, 2022, 170 pgs.
Defendant's Preliminary Invalidity Contentions, Exhibit 045-A-38, *Webroot, Inc. and Open Text, Inc.* v. *Trend Micro Inc.*, No. 6:22-CV-00239-ADA-DTG, W.D. Tex., Sep. 13, 2022, 32 pgs.
Defendant's Preliminary Invalidity Contentions, Exhibit 045-A-39, *Webroot, Inc. and Open Text, Inc.* v. *Trend Micro Inc.*, No. 6:22-CV-00239-ADA-DTG, W.D. Tex., Sep. 13, 2022, 62 pgs.
Defendant's Preliminary Invalidity Contentions, Exhibit 045-A-40, *Webroot, Inc. and Open Text, Inc.* v. *Trend Micro Inc.*, No. 6:22-CV-00239-ADA-DTG, W.D. Tex., Sep. 13, 2022, 79 pgs.
Defendant's Preliminary Invalidity Contentions, Exhibit 045-A-41, *Webroot, Inc. and Open Text, Inc.* v. *Trend Micro Inc.*, No. 6:22-CV-00239-ADA-DTG, W.D. Tex., Sep. 13, 2022, 85 pgs.
Defendant's Preliminary Invalidity Contentions, Exhibit 045-A-42, *Webroot, Inc. and Open Text, Inc.* v. *Trend Micro Inc.*, No. 6:22-CV-00239-ADA-DTG, W.D. Tex., Sep. 13, 2022, 70 pgs.
Defendant's Preliminary Invalidity Contentions, Exhibit 045-A-43, *Webroot, Inc. and Open Text, Inc.* v. *Trend Micro Inc.*, No. 6:22-CV-00239-ADA-DTG, W.D. Tex., Sep. 13, 2022, 76 pgs.
Defendant's Preliminary Invalidity Contentions, Exhibit 045-A-44, *Webroot, Inc. and Open Text, Inc.* v. *Trend Micro Inc.*, No. 6:22-CV-00239-ADA-DTG, W.D. Tex., Sep. 13, 2022, 38 pgs.

(56) References Cited

OTHER PUBLICATIONS

Defendant's Preliminary Invalidity Contentions, Exhibit 045-A-45, *Webroot, Inc. and Open Text, Inc. v. Trend Micro Inc.*, No. 6:22-CV-00239-ADA-DTG, W.D. Tex., Sep. 13, 2022, 45 pgs.

Defendant's Preliminary Invalidity Contentions, Exhibit 045-A-46, *Webroot, Inc. and Open Text, Inc. v. Trend Micro Inc.*, No. 6:22-CV-00239-ADA-DTG, W.D. Tex., Sep. 13, 2022, 78 pgs.

Defendant's Preliminary Invalidity Contentions, Exhibit 045-A-47, *Webroot, Inc. and Open Text, Inc. v. Trend Micro Inc.*, No. 6:22-CV-00239-ADA-DTG, W.D. Tex., Sep. 13, 2022, 65 pgs.

Defendant's Preliminary Invalidity Contentions, Exhibit 045-A-48, *Webroot, Inc. and Open Text, Inc. v. Trend Micro Inc.*, No. 6:22-CV-00239-ADA-DTG, W.D. Tex., Sep. 13, 2022, 27 pgs.

Defendant's Preliminary Invalidity Contentions, Exhibit 045-A-49, *Webroot, Inc. and Open Text, Inc. v. Trend Micro Inc.*, No. 6:22-CV-00239-ADA-DTG, W.D. Tex., Sep. 13, 2022, 55 pgs.

Defendant's Preliminary Invalidity Contentions, Exhibit 045-A-50, *Webroot, Inc. and Open Text, Inc. v. Trend Micro Inc.*, No. 6:22-CV-00239-ADA-DTG, W.D. Tex., Sep. 13, 2022, 98 pgs.

Defendant's Preliminary Invalidity Contentions, Exhibit 045-B, *Webroot, Inc. and Open Text, Inc. v. Trend Micro Inc.*, No. 6:22-CV-00239-ADA-DTG, W.D. Tex., Sep. 13, 2022, 45 pgs.

Defendant's Preliminary Invalidity Contentions, Exhibit 224-A-2, *Webroot, Inc. and Open Text, Inc. v. Trend Micro Inc.*, No. 6:22-CV-00239-ADA-DTG, W.D. Tex., Sep. 13, 2022, 102 pgs.

Defendant's Preliminary Invalidity Contentions, Exhibit 224-A-3, *Webroot, Inc. and Open Text, Inc. v. Trend Micro Inc.*, No. 6:22-CV-00239-ADA-DTG, W.D. Tex., Sep. 13, 2022, 169 pgs.

Defendant's Preliminary Invalidity Contentions, Exhibit 224-A-4, *Webroot, Inc. and Open Text, Inc. v. Trend Micro Inc.*, No. 6:22-CV-00239-ADA-DTG, W.D. Tex., Sep. 13, 2022, 120 pgs.

Defendant's Preliminary Invalidity Contentions, Exhibit 224-A-5, *Webroot, Inc. and Open Text, Inc. v. Trend Micro Inc.*, No. 6:22-CV-00239-ADA-DTG, W.D. Tex., Sep. 13, 2022, 117 pgs.

Defendant's Preliminary Invalidity Contentions, Exhibit 224-A-6, *Webroot, Inc. and Open Text, Inc. v. Trend Micro Inc.*, No. 6:22-CV-00239-ADA-DTG, W.D. Tex., Sep. 13, 2022, 142 pgs.

Defendant's Preliminary Invalidity Contentions, Exhibit 224-A-7, *Webroot, Inc. and Open Text, Inc. v. Trend Micro Inc.*, No. 6:22-CV-00239-ADA-DTG, W.D. Tex., Sep. 13, 2022, 129 pgs.

Defendant's Preliminary Invalidity Contentions, Exhibit 224-A-9, *Webroot, Inc. and Open Text, Inc. v. Trend Micro Inc.*, No. 6:22-CV-00239-ADA-DTG, W.D. Tex., Sep. 13, 2022, 102 pgs.

Defendant's Preliminary Invalidity Contentions, Exhibit 224-A-10, *Webroot, Inc. and Open Text, Inc. v. Trend Micro Inc.*, No. 6:22-CV-00239-ADA-DTG, W.D. Tex., Sep. 13, 2022, 75 pgs.

Defendant's Preliminary Invalidity Contentions, Exhibit 224-A-11, *Webroot, Inc. and Open Text, Inc. v. Trend Micro Inc.*, No. 6:22-CV-00239-ADA-DTG, W.D. Tex., Sep. 13, 2022, 87 pgs.

Defendant's Preliminary Invalidity Contentions, Exhibit 224-A-12, *Webroot, Inc. and Open Text, Inc. v. Trend Micro Inc.*, No. 6:22-CV-00239-ADA-DTG, W.D. Tex., Sep. 13, 2022, 61 pgs.

Defendant's Preliminary Invalidity Contentions, Exhibit 224-A-13, *Webroot, Inc. and Open Text, Inc. v. Trend Micro Inc.*, No. 6:22-CV-00239-ADA-DTG, W.D. Tex., Sep. 13, 2022, 63 pgs.

Defendant's Preliminary Invalidity Contentions, Exhibit 224-A-14, *Webroot, Inc. and Open Text, Inc. v. Trend Micro Inc.*, No. 6:22-CV-00239-ADA-DTG, W.D. Tex., Sep. 13, 2022, 68 pgs.

Defendant's Preliminary Invalidity Contentions, Exhibit 224-A-15, *Webroot, Inc. and Open Text, Inc. v. Trend Micro Inc.*, No. 6:22-CV-00239-ADA-DTG, W.D. Tex., Sep. 13, 2022, 49 pgs.

Defendant's Preliminary Invalidity Contentions, Exhibit 224-A-16, *Webroot, Inc. and Open Text, Inc. v. Trend Micro Inc.*, No. 6:22-CV-00239-ADA-DTG, W.D. Tex., Sep. 13, 2022, 59 pgs.

Defendant's Preliminary Invalidity Contentions, Exhibit 224-A-17, *Webroot, Inc. and Open Text, Inc. v. Trend Micro Inc.*, No. 6:22-CV-00239-ADA-DTG, W.D. Tex., Sep. 13, 2022, 55 pgs.

Defendant's Preliminary Invalidity Contentions, Exhibit 224-A-18, *Webroot, Inc. and Open Text, Inc. v. Trend Micro Inc.*, No. 6:22-CV-00239-ADA-DTG, W.D. Tex., Sep. 13, 2022, 60 pgs.

Defendant's Preliminary Invalidity Contentions, Exhibit 224-A-19, *Webroot, Inc. and Open Text, Inc. v. Trend Micro Inc.*, No. 6:22-CV-00239-ADA-DTG, W.D. Tex., Sep. 13, 2022, 55 pgs.

Defendant's Preliminary Invalidity Contentions, Exhibit 224-A-20, *Webroot, Inc. and Open Text, Inc. v. Trend Micro Inc.*, No. 6:22-CV-00239-ADA-DTG, W.D. Tex., Sep. 13, 2022, 57 pgs.

Defendant's Preliminary Invalidity Contentions, Exhibit 224-A-21, *Webroot, Inc. and Open Text, Inc. v. Trend Micro Inc.*, No. 6:22-CV-00239-ADA-DTG, W.D. Tex., Sep. 13, 2022, 95 pgs.

Defendant's Preliminary Invalidity Contentions, Exhibit 224-A-22, *Webroot, Inc. and Open Text, Inc. v. Trend Micro Inc.*, No. 6:22-CV-00239-ADA-DTG, W.D. Tex., Sep. 13, 2022, 108 pgs.

Defendant's Preliminary Invalidity Contentions, Exhibit 224-A-23, *Webroot, Inc. and Open Text, Inc. v. Trend Micro Inc.*, No. 6:22-CV-00239-ADA-DTG, W.D. Tex., Sep. 13, 2022, 59 pgs.

Defendant's Preliminary Invalidity Contentions, Exhibit 224-A-24, *Webroot, Inc. and Open Text, Inc. v. Trend Micro Inc.*, No. 6:22-CV-00239-ADA-DTG, W.D. Tex., Sep. 13, 2022, 110 pgs.

Defendant's Preliminary Invalidity Contentions, Exhibit 224-A-25, *Webroot, Inc. and Open Text, Inc. v. Trend Micro Inc.*, No. 6:22-CV-00239-ADA-DTG, W.D. Tex., Sep. 13, 2022, 92 pgs.

Defendant's Preliminary Invalidity Contentions, Exhibit 224-A-26, *Webroot, Inc. and Open Text, Inc. v. Trend Micro Inc.*, No. 6:22-CV-00239-ADA-DTG, W.D. Tex., Sep. 13, 2022, 51 pgs.

Defendant's Preliminary Invalidity Contentions, Exhibit 224-A-27, *Webroot, Inc. and Open Text, Inc. v. Trend Micro Inc.*, No. 6:22-CV-00239-ADA-DTG, W.D. Tex., Sep. 13, 2022, 118 pgs.

Defendant's Preliminary Invalidity Contentions, Exhibit 224-A-28, *Webroot, Inc. and Open Text, Inc. v. Trend Micro Inc.*, No. 6:22-CV-00239-ADA-DTG, W.D. Tex., Sep. 13, 2022, 118 pgs.

Defendant's Preliminary Invalidity Contentions, Exhibit 224-A-29, *Webroot, Inc. and Open Text, Inc. v. Trend Micro Inc.*, No. 6:22-CV-00239-ADA-DTG, W.D. Tex., Sep. 13, 2022, 85 pgs.

Defendant's Preliminary Invalidity Contentions, Exhibit 224-A-30, *Webroot, Inc. and Open Text, Inc. v. Trend Micro Inc.*, No. 6:22-CV-00239-ADA-DTG, W.D. Tex., Sep. 13, 2022, 98 pgs.

Defendant's Preliminary Invalidity Contentions, Exhibit 224-A-31, *Webroot, Inc. and Open Text, Inc. v. Trend Micro Inc.*, No. 6:22-CV-00239-ADA-DTG, W.D. Tex., Sep. 13, 2022, 111 pgs.

Defendant's Preliminary Invalidity Contentions, Exhibit 224-A-32, *Webroot, Inc. and Open Text, Inc. v. Trend Micro Inc.*, No. 6:22-CV-00239-ADA-DTG, W.D. Tex., Sep. 13, 2022, 150 pgs.

Defendant's Preliminary Invalidity Contentions, Exhibit 224-A-33, *Webroot, Inc. and Open Text, Inc. v. Trend Micro Inc.*, No. 6:22-CV-00239-ADA-DTG, W.D. Tex., Sep. 13, 2022, 129 pgs.

Defendant's Preliminary Invalidity Contentions, Exhibit 224-A-34, *Webroot, Inc. and Open Text, Inc. v. Trend Micro Inc.*, No. 6:22-CV-00239-ADA-DTG, W.D. Tex., Sep. 13, 2022, 65 pgs.

Defendant's Preliminary Invalidity Contentions, Exhibit 224-A-35, *Webroot, Inc. and Open Text, Inc. v. Trend Micro Inc.*, No. 6:22-CV-00239-ADA-DTG, W.D. Tex., Sep. 13, 2022, 108 pgs.

Defendant's Preliminary Invalidity Contentions, Exhibit 224-A-36, *Webroot, Inc. and Open Text, Inc. v. Trend Micro Inc.*, No. 6:22-CV-00239-ADA-DTG, W.D. Tex., Sep. 13, 2022, 275 pgs.

Defendant's Preliminary Invalidity Contentions, Exhibit 224-A-37, *Webroot, Inc. and Open Text, Inc. v. Trend Micro Inc.*, No. 6:22-CV-00239-ADA-DTG, W.D. Tex., Sep. 13, 2022, 198 pgs.

Defendant's Preliminary Invalidity Contentions, Exhibit 224-A-38, *Webroot, Inc. and Open Text, Inc. v. Trend Micro Inc.*, No. 6:22-CV-00239-ADA-DTG, W.D. Tex., Sep. 13, 2022, 65 pgs.

Defendant's Preliminary Invalidity Contentions, Exhibit 224-A-39, *Webroot, Inc. and Open Text, Inc. v. Trend Micro Inc.*, No. 6:22-CV-00239-ADA-DTG, W.D. Tex., Sep. 13, 2022, 107 pgs.

Defendant's Preliminary Invalidity Contentions, Exhibit 224-A-40, *Webroot, Inc. and Open Text, Inc. v. Trend Micro Inc.*, No. 6:22-CV-00239-ADA-DTG, W.D. Tex., Sep. 13, 2022, 138 pgs.

Defendant's Preliminary Invalidity Contentions, Exhibit 224-A-41, *Webroot, Inc. and Open Text, Inc. v. Trend Micro Inc.*, No. 6:22-CV-00239-ADA-DTG, W.D. Tex., Sep. 13, 2022, 150 pgs.

Defendant's Preliminary Invalidity Contentions, Exhibit 224-A-42, *Webroot, Inc. and Open Text, Inc. v. Trend Micro Inc.*, No. 6:22-CV-00239-ADA-DTG, W.D. Tex., Sep. 13, 2022, 129 pgs.

(56) References Cited

OTHER PUBLICATIONS

Defendant's Preliminary Invalidity Contentions, Exhibit 224-A-43, *Webroot, Inc. and Open Text, Inc. v. Trend Micro Inc.*, No. 6:22-CV-00239-ADA-DTG, W.D. Tex., Sep. 13, 2022, 118 pgs.

Defendant's Preliminary Invalidity Contentions, Exhibit 224-A-44, *Webroot, Inc. and Open Text, Inc. v. Trend Micro Inc.*, No. 6:22-CV-00239-ADA-DTG, W.D. Tex., Sep. 13, 2022, 70 pgs.

Defendant's Preliminary Invalidity Contentions, Exhibit 224-A-45, *Webroot, Inc. and Open Text, Inc. v. Trend Micro Inc.*, No. 6:22-CV-00239-ADA-DTG, W.D. Tex., Sep. 13, 2022, 70 pgs.

Defendant's Preliminary Invalidity Contentions, Exhibit 224-A-46, *Webroot, Inc. and Open Text, Inc. v. Trend Micro Inc.*, No. 6:22-CV-00239-ADA-DTG, W.D. Tex., Sep. 13, 2022, 124 pgs.

Defendant's Preliminary Invalidity Contentions, Exhibit 224-A-47, *Webroot, Inc. and Open Text, Inc. v. Trend Micro Inc.*, No. 6:22-CV-00239-ADA-DTG, W.D. Tex., Sep. 13, 2022, 110 pgs.

Defendant's Preliminary Invalidity Contentions, Exhibit 224-A-48, *Webroot, Inc. and Open Text, Inc. v. Trend Micro Inc.*, No. 6:22-CV-00239-ADA-DTG, W.D. Tex., Sep. 13, 2022, 45 pgs.

Defendant's Preliminary Invalidity Contentions, Exhibit 224-A-49, *Webroot, Inc. and Open Text, Inc. v. Trend Micro Inc.*, No. 6:22-CV-00239-ADA-DTG, W.D. Tex., Sep. 13, 2022, 112 pgs.

Defendant's Preliminary Invalidity Contentions, Exhibit 224-A-50, *Webroot, Inc. and Open Text, Inc. v. Trend Micro Inc.*, No. 6:22-CV-00239-ADA-DTG, W.D. Tex., Sep. 13, 2022, 187 pgs.

Defendant's Preliminary Invalidity Contentions, Exhibit 224-B, *Webroot, Inc. and Open Text, Inc. v. Trend Micro Inc.*, No. 6:22-CV-00239-ADA-DTG, W.D. Tex., Sep. 13, 2022, 93 pgs.

Defendant's Preliminary Invalidity Contentions, Exhibit 591-A-1, *Webroot, Inc. and Open Text, Inc. v. Trend Micro Inc.*, No. 6:22-CV-00239-ADA-DTG, W.D. Tex., Sep. 13, 2022, 35 pgs.

Defendant's Preliminary Invalidity Contentions, Exhibit 591-A-2, *Webroot, Inc. and Open Text, Inc. v. Trend Micro Inc.*, No. 6:22-CV-00239-ADA-DTG, W.D. Tex., Sep. 13, 2022, 28 pgs.

Defendant's Preliminary Invalidity Contentions, Exhibit 591-A-3, *Webroot, Inc. and Open Text, Inc. v. Trend Micro Inc.*, No. 6:22-CV-00239-ADA-DTG, W.D. Tex., Sep. 13, 2022, 27 pgs.

Defendant's Preliminary Invalidity Contentions, Exhibit 591-A-4, *Webroot, Inc. and Open Text, Inc. v. Trend Micro Inc.*, No. 6:22-CV-00239-ADA-DTG, W.D. Tex., Sep. 13, 2022, 38 pgs.

Defendant's Preliminary Invalidity Contentions, Exhibit 591-A-5, *Webroot, Inc. and Open Text, Inc. v. Trend Micro Inc.*, No. 6:22-CV-00239-ADA-DTG, W.D. Tex., Sep. 13, 2022, 25 pgs.

Defendant's Preliminary Invalidity Contentions, Exhibit 591-A-6, *Webroot, Inc. and Open Text, Inc. v. Trend Micro Inc.*, No. 6:22-CV-00239-ADA-DTG, W.D. Tex., Sep. 13, 2022, 27 pgs.

Defendant's Preliminary Invalidity Contentions, Exhibit 591-A-7, *Webroot, Inc. and Open Text, Inc. v. Trend Micro Inc.*, No. 6:22-CV-00239-ADA-DTG, W.D. Tex., Sep. 13, 2022, 25 pgs.

Defendant's Preliminary Invalidity Contentions, Exhibit 591-A-8, *Webroot, Inc. and Open Text, Inc. v. Trend Micro Inc.*, No. 6:22-CV-00239-ADA-DTG, W.D. Tex., Sep. 13, 2022, 28 pgs.

Defendant's Preliminary Invalidity Contentions, Exhibit 591-A-9, *Webroot, Inc. and Open Text, Inc. v. Trend Micro Inc.*, No. 6:22-CV-00239-ADA-DTG, W.D. Tex., Sep. 13, 2022, 34 pgs.

Defendant's Preliminary Invalidity Contentions, Exhibit 591-A-10, *Webroot, Inc. and Open Text, Inc. v. Trend Micro Inc.*, No. 6:22-CV-00239-ADA-DTG, W.D. Tex., Sep. 13, 2022, 89 pgs.

Defendant's Preliminary Invalidity Contentions, Exhibit 591-A-11, *Webroot, Inc. and Open Text, Inc. v. Trend Micro Inc.*, No. 6:22-CV-00239-ADA-DTG, W.D. Tex., Sep. 13, 2022, 42 pgs.

Defendant's Preliminary Invalidity Contentions, Exhibit 591-A-12, *Webroot, Inc. and Open Text, Inc. v. Trend Micro Inc.*, No. 6:22-CV-00239-ADA-DTG, W.D. Tex., Sep. 13, 2022, 50 pgs.

Defendant's Preliminary Invalidity Contentions, Exhibit 591-A-13, *Webroot, Inc. and Open Text, Inc. v. Trend Micro Inc.*, No. 6:22-CV-00239-ADA-DTG, W.D. Tex., Sep. 13, 2022, 69 pgs.

Defendant's Preliminary Invalidity Contentions, Exhibit 591-A-14, *Webroot, Inc. and Open Text, Inc. v. Trend Micro Inc.*, No. 6:22-CV-00239-ADA-DTG, W.D. Tex., Sep. 13, 2022, 59 pgs.

Defendant's Preliminary Invalidity Contentions, Exhibit 591-A-15, *Webroot, Inc. and Open Text, Inc. v. Trend Micro Inc.*, No. 6:22-CV-00239-ADA-DTG, W.D. Tex., Sep. 13, 2022, 55 pgs.

Defendant's Preliminary Invalidity Contentions, Exhibit 591-A-16, *Webroot, Inc. and Open Text, Inc. v. Trend Micro Inc.*, No. 6:22-CV-00239-ADA-DTG, W.D. Tex., Sep. 13, 2022, 43 pgs.

Defendant's Preliminary Invalidity Contentions, Exhibit 591-A-17, *Webroot, Inc. and Open Text, Inc. v. Trend Micro Inc.*, No. 6:22-CV-00239-ADA-DTG, W.D. Tex., Sep. 13, 2022, 47 pgs.

Defendant's Preliminary Invalidity Contentions, Exhibit 591-A-18, *Webroot, Inc. and Open Text, Inc. v. Trend Micro Inc.*, No. 6:22-CV-00239-ADA-DTG, W.D. Tex., Sep. 13, 2022, 46 pgs.

Defendant's Preliminary Invalidity Contentions, Exhibit 591-A-19, *Webroot, Inc. and Open Text, Inc. v. Trend Micro Inc.*, No. 6:22-CV-00239-ADA-DTG, W.D. Tex., Sep. 13, 2022, 99 pgs.

Defendant's Preliminary Invalidity Contentions, Exhibit 591-A-20, *Webroot, Inc. and Open Text, Inc. v. Trend Micro Inc.*, No. 6:22-CV-00239-ADA-DTG, W.D. Tex., Sep. 13, 2022, 33 pgs.

Defendant's Preliminary Invalidity Contentions, Exhibit 591-A-21, *Webroot, Inc. and Open Text, Inc. v. Trend Micro Inc.*, No. 6:22-CV-00239-ADA-DTG, W.D. Tex., Sep. 13, 2022, 38 pgs.

Defendant's Preliminary Invalidity Contentions, Exhibit 591-A-22, *Webroot, Inc. and Open Text, Inc. v. Trend Micro Inc.*, No. 6:22-CV-00239-ADA-DTG, W.D. Tex., Sep. 13, 2022, 26 pgs.

Defendant's Preliminary Invalidity Contentions, Exhibit 591-A-23, *Webroot, Inc. and Open Text, Inc. v. Trend Micro Inc.*, No. 6:22-CV-00239-ADA-DTG, W.D. Tex., Sep. 13, 2022, 31 pgs.

Defendant's Preliminary Invalidity Contentions, Exhibit 591-A-24, *Webroot, Inc. and Open Text, Inc. v. Trend Micro Inc.*, No. 6:22-CV-00239-ADA-DTG, W.D. Tex., Sep. 13, 2022, 75 pgs.

Defendant's Preliminary Invalidity Contentions, Exhibit 591-A-25, *Webroot, Inc. and Open Text, Inc. v. Trend Micro Inc.*, No. 6:22-CV-00239-ADA-DTG, W.D. Tex., Sep. 13, 2022, 54 pgs.

Defendant's Preliminary Invalidity Contentions, Exhibit 591-A-26, *Webroot, Inc. and Open Text, Inc. v. Trend Micro Inc.*, No. 6:22-CV-00239-ADA-DTG, W.D. Tex., Sep. 13, 2022, 25 pgs.

Defendant's Preliminary Invalidity Contentions, Exhibit 591-A-27, *Webroot, Inc. and Open Text, Inc. v. Trend Micro Inc.*, No. 6:22-CV-00239-ADA-DTG, W.D. Tex., Sep. 13, 2022, 29 pgs.

Defendant's Preliminary Invalidity Contentions, Exhibit 591-A-28, *Webroot, Inc. and Open Text, Inc. v. Trend Micro Inc.*, No. 6:22-CV-00239-ADA-DTG, W.D. Tex., Sep. 13, 2022, 164 pgs.

Defendant's Preliminary Invalidity Contentions, Exhibit 591-A-29, *Webroot, Inc. and Open Text, Inc. v. Trend Micro Inc.*, No. 6:22-CV-00239-ADA-DTG, W.D. Tex., Sep. 13, 2022, 62 pgs.

Defendant's Preliminary Invalidity Contentions, Exhibit 591-A-30, *Webroot, Inc. and Open Text, Inc. v. Trend Micro Inc.*, No. 6:22-CV-00239-ADA-DTG, W.D. Tex., Sep. 13, 2022, 41 pgs.

Defendant's Preliminary Invalidity Contentions, Exhibit 591-A-31, *Webroot, Inc. and Open Text, Inc. v. Trend Micro Inc.*, No. 6:22-CV-00239-ADA-DTG, W.D. Tex., Sep. 13, 2022, 124 pgs.

Defendant's Preliminary Invalidity Contentions, Exhibit 591-A-32, *Webroot, Inc. and Open Text, Inc. v. Trend Micro Inc.*, No. 6:22-CV-00239-ADA-DTG, W.D. Tex., Sep. 13, 2022, 123 pgs.

Defendant's Preliminary Invalidity Contentions, Exhibit 591-A-33, *Webroot, Inc. and Open Text, Inc. v. Trend Micro Inc.*, No. 6:22-CV-00239-ADA-DTG, W.D. Tex., Sep. 13, 2022, 107 pgs.

Defendant's Preliminary Invalidity Contentions, Exhibit 591-A-34, *Webroot, Inc. and Open Text, Inc. v. Trend Micro Inc.*, No. 6:22-CV-00239-ADA-DTG, W.D. Tex., Sep. 13, 2022, 67 pgs.

Defendant's Preliminary Invalidity Contentions, Exhibit 591-A-35, *Webroot, Inc. and Open Text, Inc. v. Trend Micro Inc.*, No. 6:22-CV-00239-ADA-DTG, W.D. Tex., Sep. 13, 2022, 26 pgs.

Defendant's Preliminary Invalidity Contentions, Exhibit 591-A-36, *Webroot, Inc. and Open Text, Inc. v. Trend Micro Inc.*, No. 6:22-CV-00239-ADA-DTG, W.D. Tex., Sep. 13, 2022, 82 pgs.

Defendant's Preliminary Invalidity Contentions, Exhibit 591-A-37, *Webroot, Inc. and Open Text, Inc. v. Trend Micro Inc.*, No. 6:22-CV-00239-ADA-DTG, W.D. Tex., Sep. 13, 2022, 93 pgs.

Defendant's Preliminary Invalidity Contentions, Exhibit 591-A-38, *Webroot, Inc. and Open Text, Inc. v. Trend Micro Inc.*, No. 6:22-CV-00239-ADA-DTG, W.D. Tex., Sep. 13, 2022, 93 pgs.

(56) References Cited

OTHER PUBLICATIONS

Defendant's Preliminary Invalidity Contentions, Exhibit 591-A-39, *Webroot, Inc. and Open Text, Inc. v. Trend Micro Inc.*, No. 6:22-CV-00239-ADA-DTG, W.D. Tex., Sep. 13, 2022, 81 pgs.

Defendant's Preliminary Invalidity Contentions, Exhibit 591-A-40, *Webroot, Inc. and Open Text, Inc. v. Trend Micro Inc.*, No. 6:22-CV-00239-ADA-DTG, W.D. Tex., Sep. 13, 2022, 25 pgs.

Defendant's Preliminary Invalidity Contentions, Exhibit 591-A-41, *Webroot, Inc. and Open Text, Inc. v. Trend Micro Inc.*, No. 6:22-CV-00239-ADA-DTG, W.D. Tex., Sep. 13, 2022, 22 pgs.

Defendant's Preliminary Invalidity Contentions, Exhibit 591-A-42, *Webroot, Inc. and Open Text, Inc. v. Trend Micro Inc.*, No. 6:22-CV-00239-ADA-DTG, W.D. Tex., Sep. 13, 2022, 43 pgs.

Defendant's Preliminary Invalidity Contentions, Exhibit 591-A-43, *Webroot, Inc. and Open Text, Inc. v. Trend Micro Inc.*, No. 6:22-CV-00239-ADA-DTG, W.D. Tex., Sep. 13, 2022, 43 pgs.

Defendant's Preliminary Invalidity Contentions, Exhibit 591-A-44, *Webroot, Inc. and Open Text, Inc. v. Trend Micro Inc.*, No. 6:22-CV-00239-ADA-DTG, W.D. Tex., Sep. 13, 2022, 67 pgs.

Defendant's Preliminary Invalidity Contentions, Exhibit 591-B, *Webroot, Inc. and Open Text, Inc. v. Trend Micro Inc.*, No. 6:22-CV-00239-ADA-DTG, W.D. Tex., Sep. 13, 2022, 51 pgs.

Defendant's Preliminary Invalidity Contentions, Exhibit 243-A-1, *Webroot, Inc. and Open Text, Inc. v. Trend Micro Inc.*, No. 6:22-CV-00239-ADA-DTG, W.D. Tex., Feb. 21, 2023,27 pgs.

Defendant's Preliminary Invalidity Contentions, Exhibit 243-A-2, *Webroot, Inc. and Open Text, Inc. v. Trend Micro Inc.*, No. 6:22-CV-00239-ADA-DTG, W.D. Tex., Feb. 21, 2023, 59 pgs.

Defendant's Preliminary Invalidity Contentions, Exhibit 243-A-3, *Webroot, Inc. and Open Text, Inc. v. Trend Micro Inc.*, No. 6:22-CV-00239-ADA-DTG, W.D. Tex., Feb. 21, 2023, 39 pgs.

Defendant's Preliminary Invalidity Contentions, Exhibit 243-A-4, *Webroot, Inc. and Open Text, Inc. v. Trend Micro Inc.*, No. 6:22-CV-00239-ADA-DTG, W.D. Tex., Feb. 21, 2023, 34 pgs.

Defendant's Preliminary Invalidity Contentions, Exhibit 243-A-5, *Webroot, Inc. and Open Text, Inc. v. Trend Micro Inc.*, No. 6:22-CV-00239-ADA-DTG, W.D. Tex., Feb. 21, 2023, 101 pgs.

Defendant's Preliminary Invalidity Contentions, Exhibit 243-A-6, *Webroot, Inc. and Open Text, Inc. v. Trend Micro Inc.*, No. 6:22-CV-00239-ADA-DTG, W.D. Tex., Feb. 21, 2023, 39 pgs.

Defendant's Preliminary Invalidity Contentions, Exhibit 243-A-7, *Webroot, Inc. and Open Text, Inc. v. Trend Micro Inc.*, No. 6:22-CV-00239-ADA-DTG, W.D. Tex., Feb. 21, 2023, 80 pgs.

Defendant's Preliminary Invalidity Contentions, Exhibit 243-A-8, *Webroot, Inc. and Open Text, Inc. v. Trend Micro Inc.*, No. 6:22-CV-00239-ADA-DTG, W.D. Tex., Feb. 21, 2023, 62 pgs.

Defendant's Preliminary Invalidity Contentions, Exhibit 243-A-9, *Webroot, Inc. and Open Text, Inc. v. Trend Micro Inc.*, No. 6:22-CV-00239-ADA-DTG, W.D. Tex., Feb. 21, 2023, 103 pgs.

Defendant's Preliminary Invalidity Contentions, Exhibit 243-A-10, *Webroot, Inc. and Open Text, Inc. v. Trend Micro Inc.*, No. 6:22-CV-00239-ADA-DTG, W.D. Tex., Feb. 21, 2023, 57 pgs.

Defendant's Preliminary Invalidity Contentions, Exhibit 243-A-11, *Webroot, Inc. and Open Text, Inc. v. Trend Micro Inc.*, No. 6:22-CV-00239-ADA-DTG, W.D. Tex., Feb. 21, 2023, 98 pgs.

Defendant's Preliminary Invalidity Contentions, Exhibit 243-A-12, *Webroot, Inc. and Open Text, Inc. v. Trend Micro Inc.*, No. 6:22-CV-00239-ADA-DTG, W.D. Tex., Feb. 21, 2023, 71 pgs.

Defendant's Preliminary Invalidity Contentions, Exhibit 243-A-13, *Webroot, Inc. and Open Text, Inc. v. Trend Micro Inc.*, No. 6:22-CV-00239-ADA-DTG, W.D. Tex., Feb. 21, 2023, 49 pgs.

Defendant's Preliminary Invalidity Contentions, Exhibit 243-A-14, *Webroot, Inc. and Open Text, Inc. v. Trend Micro Inc.*, No. 6:22-CV-00239-ADA-DTG, W.D. Tex., Feb. 21, 2023, 60 pgs.

Defendant's Preliminary Invalidity Contentions, Exhibit 243-A-15, *Webroot, Inc. and Open Text, Inc. v. Trend Micro Inc.*, No. 6:22-CV-00239-ADA-DTG, W.D. Tex., Feb. 21, 2023, 38 pgs.

Defendant's Preliminary Invalidity Contentions, Exhibit 243-A-16, *Webroot, Inc. and Open Text, Inc. v. Trend Micro Inc.*, No. 6:22-CV-00239-ADA-DTG, W.D. Tex., Feb. 21, 2023, 54 pgs.

Defendant's Preliminary Invalidity Contentions, Exhibit 243-A-17, *Webroot, Inc. and Open Text, Inc. v. Trend Micro Inc.*, No. 6:22-CV-00239-ADA-DTG, W.D. Tex., Feb. 21, 2023, 44 pgs.

Defendant's Preliminary Invalidity Contentions, Exhibit 243-A-18, *Webroot, Inc. and Open Text, Inc. v. Trend Micro Inc.*, No. 6:22-CV-00239-ADA-DTG, W.D. Tex., Feb. 21, 2023, 48 pgs.

Defendant's Preliminary Invalidity Contentions, Exhibit 243-A-19, *Webroot, Inc. and Open Text, Inc. v. Trend Micro Inc.*, No. 6:22-CV-00239-ADA-DTG, W.D. Tex., Feb. 21, 2023, 37 pgs.

Defendant's Preliminary Invalidity Contentions, Exhibit 243-A-20, *Webroot, Inc. and Open Text, Inc. v. Trend Micro Inc.*, No. 6:22-CV-00239-ADA-DTG, W.D. Tex., Feb. 21, 2023, 32 pgs.

Defendant's Preliminary Invalidity Contentions, Exhibit 243-A-21, *Webroot, Inc. and Open Text, Inc. v. Trend Micro Inc.*, No. 6:22-CV-00239-ADA-DTG, W.D. Tex., Feb. 21, 2023, 240 pgs.

Defendant's Preliminary Invalidity Contentions, Exhibit 243-A-22, *Webroot, Inc. and Open Text, Inc. v. Trend Micro Inc.*, No. 6:22-CV-00239-ADA-DTG, W.D. Tex., Feb. 21, 2023, 117 pgs.

Defendant's Preliminary Invalidity Contentions, Exhibit 243-A-23, *Webroot, Inc. and Open Text, Inc. v. Trend Micro Inc.*, No. 6:22-CV-00239-ADA-DTG, W.D. Tex., Feb. 21, 2023, 58 pgs.

Defendant's Preliminary Invalidity Contentions, Exhibit 243-A-24, *Webroot, Inc. and Open Text, Inc. v. Trend Micro Inc.*, No. 6:22-CV-00239-ADA-DTG, W.D. Tex., Feb. 21, 2023, 61 pgs.

Defendant's Preliminary Invalidity Contentions, Exhibit 243-A-25, *Webroot, Inc. and Open Text, Inc. v. Trend Micro Inc.*, No. 6:22-CV-00239-ADA-DTG, W.D. Tex., Feb. 21, 2023, 50 pgs.

Defendant's Preliminary Invalidity Contentions, Exhibit 243-A-26, *Webroot, Inc. and Open Text, Inc. v. Trend Micro Inc.*, No. 6:22-CV-00239-ADA-DTG, W.D. Tex., Feb. 21, 2023, 40 pgs.

Defendant's Preliminary Invalidity Contentions, Exhibit 243-A-27, *Webroot, Inc. and Open Text, Inc. v. Trend Micro Inc.*, No. 6:22-CV-00239-ADA-DTG, W.D. Tex., Feb. 21, 2023, 49 pgs.

Defendant's Preliminary Invalidity Contentions, Exhibit 243-A-28, *Webroot, Inc. and Open Text, Inc. v. Trend Micro Inc.*, No. 6:22-CV-00239-ADA-DTG, W.D. Tex., Feb. 21, 2023, 51 pgs.

Defendant's Preliminary Invalidity Contentions, Exhibit 243-A-29, *Webroot, Inc. and Open Text, Inc. v. Trend Micro Inc.*, No. 6:22-CV-00239-ADA-DTG, W.D. Tex., Feb. 21, 2023, 110 pgs.

Defendant's Preliminary Invalidity Contentions, Exhibit 243-A-30, *Webroot, Inc. and Open Text, Inc. v. Trend Micro Inc.*, No. 6:22-CV-00239-ADA-DTG, W.D. Tex., Feb. 21, 2023, 76 pgs.

Defendant's Preliminary Invalidity Contentions, Exhibit 243-A-32, *Webroot, Inc. and Open Text, Inc. v. Trend Micro Inc.*, No. 6:22-CV-00239-ADA-DTG, W.D. Tex., Feb. 21, 2023, 107 pgs.

Defendant's Preliminary Invalidity Contentions, Exhibit 243-A-33, *Webroot, Inc. and Open Text, Inc. v. Trend Micro Inc.*, No. 6:22-CV-00239-ADA-DTG, W.D. Tex., Feb. 21, 2023, 137 pgs.

Defendant's Preliminary Invalidity Contentions, Exhibit 243-A-34, *Webroot, Inc. and Open Text, Inc. v. Trend Micro Inc.*, No. 6:22-CV-00239-ADA-DTG, W.D. Tex., Feb. 21, 2023, 93 pgs.

Defendant's Preliminary Invalidity Contentions, Exhibit 243-A-35, *Webroot, Inc. and Open Text, Inc. v. Trend Micro Inc.*, No. 6:22-CV-00239-ADA-DTG, W.D. Tex., Feb. 21, 2023, 72 pgs.

Defendant's Preliminary Invalidity Contentions, Exhibit 243-B, *Webroot, Inc. and Open Text, Inc. v. Trend Micro Inc.*, No. 6:22-CV-00239-ADA-DTG, W.D. Tex., Feb. 21, 2023, 115 pgs.

Defendant's Preliminary Invalidity Contentions, Exhibit 932-A-1, *Webroot, Inc. and Open Text, Inc. v. Trend Micro Inc.*, No. 6:22-CV-00239-ADA-DTG, W.D. Tex., Feb. 21, 2023, 28 pgs.

Defendant's Preliminary Invalidity Contentions, Exhibit 932-A-2, *Webroot, Inc. and Open Text, Inc. v. Trend Micro Inc.*, No. 6:22-CV-00239-ADA-DTG, W.D. Tex., Feb. 21, 2023, 57 pgs.

Defendant's Preliminary Invalidity Contentions, Exhibit 932-A-3, *Webroot, Inc. and Open Text, Inc. v. Trend Micro Inc.*, No. 6:22-CV-00239-ADA-DTG, W.D. Tex., Feb. 21, 2023, 46 pgs.

Defendant's Preliminary Invalidity Contentions, Exhibit 932-A-4, *Webroot, Inc. and Open Text, Inc. v. Trend Micro Inc.*, No. 6:22-CV-00239-ADA-DTG, W.D. Tex., Feb. 21, 2023, 36 pgs.

Defendant's Preliminary Invalidity Contentions, Exhibit 932-A-5, *Webroot, Inc. and Open Text, Inc. v. Trend Micro Inc.*, No. 6:22-CV-00239-ADA-DTG, W.D. Tex., Feb. 21, 2023, 122 pgs.

(56) References Cited

OTHER PUBLICATIONS

Defendant's Preliminary Invalidity Contentions, Exhibit 932-A-6, *Webroot, Inc. and Open Text, Inc.* v. *Trend Micro Inc.*, No. 6:22-CV-00239-ADA-DTG, W.D. Tex., Feb. 21, 2023, 39 pgs.

Defendant's Preliminary Invalidity Contentions, Exhibit 932-A-7, *Webroot, Inc. and Open Text, Inc.* v. *Trend Micro Inc.*, No. 6:22-CV-00239-ADA-DTG, W.D. Tex., Feb. 21, 2023, 95 pgs.

Defendant's Preliminary Invalidity Contentions, Exhibit 932-A-8, *Webroot, Inc. and Open Text, Inc.* v. *Trend Micro Inc.*, No. 6:22-CV-00239-ADA-DTG, W.D. Tex., Feb. 21, 2023, 73 pgs.

Defendant's Preliminary Invalidity Contentions, Exhibit 932-A-9, *Webroot, Inc. and Open Text, Inc.* v. *Trend Micro Inc.*, No. 6:22-CV-00239-ADA-DTG, W.D. Tex., Feb. 21, 2023, 119 pgs.

Defendant's Preliminary Invalidity Contentions, Exhibit 932-A-10, *Webroot, Inc. and Open Text, Inc.* v. *Trend Micro Inc.*, No. 6:22-CV-00239-ADA-DTG, W.D. Tex., Feb. 21, 2023, 66 pgs.

Defendant's Preliminary Invalidity Contentions, Exhibit 932-A-11, *Webroot, Inc. and Open Text, Inc.* v. *Trend Micro Inc.*, No. 6:22-CV-00239-ADA-DTG, W.D. Tex., Feb. 21, 2023, 115 pgs.

Defendant's Preliminary Invalidity Contentions, Exhibit 932-A-12, *Webroot, Inc. and Open Text, Inc.* v. *Trend Micro Inc.*, No. 6:22-CV-00239-ADA-DTG, W.D. Tex., Feb. 21, 2023, 81 pgs.

Defendant's Preliminary Invalidity Contentions, Exhibit 932-A-13, *Webroot, Inc. and Open Text, Inc.* v. *Trend Micro Inc.*, No. 6:22-CV-00239-ADA-DTG, W.D. Tex., Feb. 21, 2023, 60 pgs.

Defendant's Preliminary Invalidity Contentions, Exhibit 932-A-14, *Webroot, Inc. and Open Text, Inc.* v. *Trend Micro Inc.*, No. 6:22-CV-00239-ADA-DTG, W.D. Tex., Feb. 21, 2023, 60 pgs.

Defendant's Preliminary Invalidity Contentions, Exhibit 932-A-15, *Webroot, Inc. and Open Text, Inc.* v. *Trend Micro Inc.*, No. 6:22-CV-00239-ADA-DTG, W.D. Tex., Feb. 21, 2023, 43 pgs.

Defendant's Preliminary Invalidity Contentions, Exhibit 932-A-16, *Webroot, Inc. and Open Text, Inc.* v. *Trend Micro Inc.*, No. 6:22-CV-00239-ADA-DTG, W.D. Tex., Feb. 21, 2023, 62 pgs.

Defendant's Preliminary Invalidity Contentions, Exhibit 932-A-17, *Webroot, Inc. and Open Text, Inc.* v. *Trend Micro Inc.*, No. 6:22-CV-00239-ADA-DTG, W.D. Tex., Feb. 21, 2023, 49 pgs.

Defendant's Preliminary Invalidity Contentions, Exhibit 932-A-18, *Webroot, Inc. and Open Text, Inc.* v. *Trend Micro Inc.*, No. 6:22-CV-00239-ADA-DTG, W.D. Tex., Feb. 21, 2023, 66 pgs.

Defendant's Preliminary Invalidity Contentions, Exhibit 932-A-19, *Webroot, Inc. and Open Text, Inc.* v. *Trend Micro Inc.*, No. 6:22-CV-00239-ADA-DTG, W.D. Tex., Feb. 21, 2023, 44 pgs.

Defendant's Preliminary Invalidity Contentions, Exhibit 932-A-20, *Webroot, Inc. and Open Text, Inc.* v. *Trend Micro Inc.*, No. 6:22-CV-00239-ADA-DTG, W.D. Tex., Feb. 21, 2023, 35 pgs.

Defendant's Preliminary Invalidity Contentions, Exhibit 932-A-21, *Webroot, Inc. and Open Text, Inc.* v. *Trend Micro Inc.*, No. 6:22-CV-00239-ADA-DTG, W.D. Tex., Feb. 21, 2023, 298 pgs.

Defendant's Preliminary Invalidity Contentions, Exhibit 932-A-22, *Webroot, Inc. and Open Text, Inc.* v. *Trend Micro Inc.*, No. 6:22-CV-00239-ADA-DTG, W.D. Tex., Feb. 21, 2023, 158 pgs.

Defendant's Preliminary Invalidity Contentions, Exhibit 932-A-23, *Webroot, Inc. and Open Text, Inc.* v. *Trend Micro Inc.*, No. 6:22-CV-00239-ADA-DTG, W.D. Tex., Feb. 21, 2023, 70 pgs.

Defendant's Preliminary Invalidity Contentions, Exhibit 932-A-24, *Webroot, Inc. and Open Text, Inc.* v. *Trend Micro Inc.*, No. 6:22-CV-00239-ADA-DTG, W.D. Tex., Feb. 21, 2023, 65 pgs.

Defendant's Preliminary Invalidity Contentions, Exhibit 932-A-25, *Webroot, Inc. and Open Text, Inc.* v. *Trend Micro Inc.*, No. 6:22-CV-00239-ADA-DTG, W.D. Tex., Feb. 21, 2023, 62 pgs.

Defendant's Preliminary Invalidity Contentions, Exhibit 932-A-26, *Webroot, Inc. and Open Text, Inc.* v. *Trend Micro Inc.*, No. 6:22-CV-00239-ADA-DTG, W.D. Tex., Feb. 21, 2023, 63 pgs.

Defendant's Preliminary Invalidity Contentions, Exhibit 932-A-27, *Webroot, Inc. and Open Text, Inc.* v. *Trend Micro Inc.*, No. 6:22-CV-00239-ADA-DTG, W.D. Tex., Feb. 21, 2023, 59 pgs.

Defendant's Preliminary Invalidity Contentions, Exhibit 932-A-28, *Webroot, Inc. and Open Text, Inc.* v. *Trend Micro Inc.*, No. 6:22-CV-00239-ADA-DTG, W.D. Tex., Feb. 21, 2023, 61 pgs.

Defendant's Preliminary Invalidity Contentions, Exhibit 932-A-29, *Webroot, Inc. and Open Text, Inc.* v. *Trend Micro Inc.*, No. 6:22-CV-00239-ADA-DTG, W.D. Tex., Feb. 21, 2023, 145 pgs.

Defendant's Preliminary Invalidity Contentions, Exhibit 932-A-30, *Webroot, Inc. and Open Text, Inc.* v. *Trend Micro Inc.*, No. 6:22-CV-00239-ADA-DTG, W.D. Tex., Feb. 21, 2023, 89 pgs.

Defendant's Preliminary Invalidity Contentions, Exhibit 932-A-32, *Webroot, Inc. and Open Text, Inc.* v. *Trend Micro Inc.*, No. 6:22-CV-00239-ADA-DTG, W.D. Tex., Feb. 21, 2023, 130 pgs.

Defendant's Preliminary Invalidity Contentions, Exhibit 932-A-33, *Webroot, Inc. and Open Text, Inc.* v. *Trend Micro Inc.*, No. 6:22-CV-00239-ADA-DTG, W.D. Tex., Feb. 21, 2023, 165 pgs.

Defendant's Preliminary Invalidity Contentions, Exhibit 932-A-34, *Webroot, Inc. and Open Text, Inc.* v. *Trend Micro Inc.*, No. 6:22-CV-00239-ADA-DTG, W.D. Tex., Feb. 21, 2023, 110 pgs.

Defendant's Preliminary Invalidity Contentions, Exhibit 932-A-35, *Webroot, Inc. and Open Text, Inc.* v. *Trend Micro Inc.*, No. 6:22-CV-00239-ADA-DTG, W.D. Tex., Feb. 21, 2023, 80 pgs.

Defendant's Preliminary Invalidity Contentions, Exhibit 932-B, *Webroot, Inc. and Open Text, Inc.* v. *Trend Micro Inc.*, No. 6:22-CV-00239-ADA-DTG, W.D. Tex., Feb. 21, 2023, 141 pgs.

Defendant's Preliminary Invalidity Contentions, Exhibit 244-A-1, *Webroot, Inc. and Open Text, Inc.* v. *Trend Micro Inc.*, No. 6:22-CV-00239-ADA-DTG, W.D. Tex., Feb. 21, 2023, 39 pgs.

Defendant's Preliminary Invalidity Contentions, Exhibit 244-A-2, *Webroot, Inc. and Open Text, Inc.* v. *Trend Micro Inc.*, No. 6:22-CV-00239-ADA-DTG, W.D. Tex., Feb. 21, 2023, 66 pgs.

Defendant's Preliminary Invalidity Contentions, Exhibit 244-A-3, *Webroot, Inc. and Open Text, Inc.* v. *Trend Micro Inc.*, No. 6:22-CV-00239-ADA-DTG, W.D. Tex., Feb. 21, 2023, 67 pgs.

Defendant's Preliminary Invalidity Contentions, Exhibit 244-A-4, *Webroot, Inc. and Open Text, Inc.* v. *Trend Micro Inc.*, No. 6:22-CV-00239-ADA-DTG, W.D. Tex., Feb. 21, 2023, 57 pgs.

Defendant's Preliminary Invalidity Contentions, Exhibit 244-A-5, *Webroot, Inc. and Open Text, Inc.* v. *Trend Micro Inc.*, No. 6:22-CV-00239-ADA-DTG, W.D. Tex., Feb. 21, 2023, 106 pgs.

Defendant's Preliminary Invalidity Contentions, Exhibit 244-A-6, *Webroot, Inc. and Open Text, Inc.* v. *Trend Micro Inc.*, No. 6:22-CV-00239-ADA-DTG, W.D. Tex., Feb. 21, 2023, 47 pgs.

Defendant's Preliminary Invalidity Contentions, Exhibit 244-A-7, *Webroot, Inc. and Open Text, Inc.* v. *Trend Micro Inc.*, No. 6:22-CV-00239-ADA-DTG, W.D. Tex., Feb. 21, 2023, 46 pgs.

Defendant's Preliminary Invalidity Contentions, Exhibit 244-A-8, *Webroot, Inc. and Open Text, Inc.* v. *Trend Micro Inc.*, No. 6:22-CV-00239-ADA-DTG, W.D. Tex., Feb. 21, 2023, 69 pgs.

Defendant's Preliminary Invalidity Contentions, Exhibit 244-A-9, *Webroot, Inc. and Open Text, Inc.* v. *Trend Micro Inc.*, No. 6:22-CV-00239-ADA-DTG, W.D. Tex., Feb. 21, 2023, 72 pgs.

Defendant's Preliminary Invalidity Contentions, Exhibit 244-A-10, *Webroot, Inc. and Open Text, Inc.* v. *Trend Micro Inc.*, No. 6:22-CV-00239-ADA-DTG, W.D. Tex., Feb. 21, 2023, 81 pgs.

Defendant's Preliminary Invalidity Contentions, Exhibit 244-A-11, *Webroot, Inc. and Open Text, Inc.* v. *Trend Micro Inc.*, No. 6:22-CV-00239-ADA-DTG, W.D. Tex., Feb. 21, 2023, 77 pgs.

Defendant's Preliminary Invalidity Contentions, Exhibit 244-A-12, *Webroot, Inc. and Open Text, Inc.* v. *Trend Micro Inc.*, No. 6:22-CV-00239-ADA-DTG, W.D. Tex., Feb. 21, 2023, 64 pgs.

Defendant's Preliminary Invalidity Contentions, Exhibit 244-A-13, *Webroot, Inc. and Open Text, Inc.* v. *Trend Micro Inc.*, No. 6:22-CV-00239-ADA-DTG, W.D. Tex., Feb. 21, 2023, 57 pgs.

Defendant's Preliminary Invalidity Contentions, Exhibit 244-A-14, *Webroot, Inc. and Open Text, Inc.* v. *Trend Micro Inc.*, No. 6:22-CV-00239-ADA-DTG, W.D. Tex., Feb. 21, 2023, 71 pgs.

Defendant's Preliminary Invalidity Contentions, Exhibit 244-A-15, *Webroot, Inc. and Open Text, Inc.* v. *Trend Micro Inc.*, No. 6:22-CV-00239-ADA-DTG, W.D. Tex., Feb. 21, 2023, 43 pgs.

Defendant's Preliminary Invalidity Contentions, Exhibit 244-A-16, *Webroot, Inc. and Open Text, Inc.* v. *Trend Micro Inc.*, No. 6:22-CV-00239-ADA-DTG, W.D. Tex., Feb. 21, 2023, 73 pgs.

Defendant's Preliminary Invalidity Contentions, Exhibit 244-A-17, *Webroot, Inc. and Open Text, Inc.* v. *Trend Micro Inc.*, No. 6:22-CV-00239-ADA-DTG, W.D. Tex., Feb. 21, 2023, 49 pgs.

(56) References Cited

OTHER PUBLICATIONS

Defendant's Preliminary Invalidity Contentions, Exhibit 244-A-18, *Webroot, Inc. and Open Text, Inc.* v. *Trend Micro Inc.*, No. 6:22-CV-00239-ADA-DTG, W.D. Tex., Feb. 21, 2023, 42 pgs.

Defendant's Preliminary Invalidity Contentions, Exhibit 244-A-19, *Webroot, Inc. and Open Text, Inc.* v. *Trend Micro Inc.*, No. 6:22-CV-00239-ADA-DTG, W.D. Tex., Feb. 21, 2023, 38 pgs.

Defendant's Preliminary Invalidity Contentions, Exhibit 244-A-20, *Webroot, Inc. and Open Text, Inc.* v. *Trend Micro Inc.*, No. 6:22-CV-00239-ADA-DTG, W.D. Tex., Feb. 21, 2023, 36 pgs.

Defendant's Preliminary Invalidity Contentions, Exhibit 244-A-21, *Webroot, Inc. and Open Text, Inc.* v. *Trend Micro Inc.*, No. 6:22-CV-00239-ADA-DTG, W.D. Tex., Feb. 21, 2023, 215 pgs.

Defendant's Preliminary Invalidity Contentions, Exhibit 244-A-22, *Webroot, Inc. and Open Text, Inc.* v. *Trend Micro Inc.*, No. 6:22-CV-00239-ADA-DTG, W.D. Tex., Feb. 21, 2023, 140 pgs.

Defendant's Preliminary Invalidity Contentions, Exhibit 244-A-23, *Webroot, Inc. and Open Text, Inc.* v. *Trend Micro Inc.*, No. 6:22-CV-00239-ADA-DTG, W.D. Tex., Feb. 21, 2023, 68 pgs.

Defendant's Preliminary Invalidity Contentions, Exhibit 244-A-24, *Webroot, Inc. and Open Text, Inc.* v. *Trend Micro Inc.*, No. 6:22-CV-00239-ADA-DTG, W.D. Tex., Feb. 21, 2023, 301 pgs.

Defendant's Preliminary Invalidity Contentions, Exhibit 244-A-25, *Webroot, Inc. and Open Text, Inc.* v. *Trend Micro Inc.*, No. 6:22-CV-00239-ADA-DTG, W.D. Tex., Feb. 21, 2023, 113 pgs.

Defendant's Preliminary Invalidity Contentions, Exhibit 244-A-26, *Webroot, Inc. and Open Text, Inc.* v. *Trend Micro Inc.*, No. 6:22-CV-00239-ADA-DTG, W.D. Tex., Feb. 21, 2023, 207 pgs.

Defendant's Preliminary Invalidity Contentions, Exhibit 244-A-27, *Webroot, Inc. and Open Text, Inc.* v. *Trend Micro Inc.*, No. 6:22-CV-00239-ADA-DTG, W.D. Tex., Feb. 21, 2023, 187 pgs.

Defendant's Preliminary Invalidity Contentions, Exhibit 244-A-28, *Webroot, Inc. and Open Text, Inc.* v. *Trend Micro Inc.*, No. 6:22-CV-00239-ADA-DTG, W.D. Tex., Feb. 21, 2023, 88 pgs.

Defendant's Preliminary Invalidity Contentions, Exhibit 244-A-29, *Webroot, Inc. and Open Text, Inc.* v. *Trend Micro Inc.*, No. 6:22-CV-00239-ADA-DTG, W.D. Tex., Feb. 21, 2023, 88 pgs.

Defendant's Preliminary Invalidity Contentions, Exhibit 244-A-31, *Webroot, Inc. and Open Text, Inc.* v. *Trend Micro Inc.*, No. 6:22-CV-00239-ADA-DTG, W.D. Tex., Feb. 21, 2023, 122 pgs.

Defendant's Preliminary Invalidity Contentions, Exhibit 244-A-32, *Webroot, Inc. and Open Text, Inc.* v. *Trend Micro Inc.*, No. 6:22-CV-00239-ADA-DTG, W.D. Tex., Feb. 21, 2023, 136 pgs.

Defendant's Preliminary Invalidity Contentions, Exhibit 244-A-33, *Webroot, Inc. and Open Text, Inc.* v. *Trend Micro Inc.*, No. 6:22-CV-00239-ADA-DTG, W.D. Tex., Feb. 21, 2023, 86 pgs.

Defendant's Preliminary Invalidity Contentions, Exhibit 244-A-34, *Webroot, Inc. and Open Text, Inc.* v. *Trend Micro Inc.*, No. 6:22-CV-00239-ADA-DTG, W.D. Tex., Feb. 21, 2023, 105 pgs.

Defendant's Preliminary Invalidity Contentions, Exhibit 244-B, *Webroot, Inc. and Open Text, Inc.* v. *Trend Micro Inc.*, No. 6:22-CV-00239-ADA-DTG, W.D. Tex., Feb. 21, 2023, 294 pgs.

Defendant's Preliminary Invalidity Contentions, Exhibit 505-A-1, *Webroot, Inc. and Open Text, Inc.* v. *Trend Micro Inc.*, No. 6:22-CV-00239-ADA-DTG, W.D. Tex., Feb. 21, 2023, 47 pgs.

Defendant's Preliminary Invalidity Contentions, Exhibit 505-A-2, *Webroot, Inc. and Open Text, Inc.* v. *Trend Micro Inc.*, No. 6:22-CV-00239-ADA-DTG, W.D. Tex., Feb. 21, 2023, 40 pgs.

Defendant's Preliminary Invalidity Contentions, Exhibit 505-A-3, *Webroot, Inc. and Open Text, Inc.* v. *Trend Micro Inc.*, No. 6:22-CV-00239-ADA-DTG, W.D. Tex., Feb. 21, 2023, 48 pgs.

Defendant's Preliminary Invalidity Contentions, Exhibit 505-A-4, *Webroot, Inc. and Open Text, Inc.* v. *Trend Micro Inc.*, No. 6:22-CV-00239-ADA-DTG, W.D. Tex., Feb. 21, 2023, 35 pgs.

Defendant's Preliminary Invalidity Contentions, Exhibit 505-A-5, *Webroot, Inc. and Open Text, Inc.* v. *Trend Micro Inc.*, No. 6:22-CV-00239-ADA-DTG, W.D. Tex., Feb. 21, 2023, 161 pgs.

Defendant's Preliminary Invalidity Contentions, Exhibit 505-A-6, *Webroot, Inc. and Open Text, Inc.* v. *Trend Micro Inc.*, No. 6:22-CV-00239-ADA-DTG, W.D. Tex., Feb. 21, 2023, 34 pgs.

Defendant's Preliminary Invalidity Contentions, Exhibit 505-A-7, *Webroot, Inc. and Open Text, Inc.* v. *Trend Micro Inc.*, No. 6:22-CV-00239-ADA-DTG, W.D. Tex., Feb. 21, 2023, 34 pgs.

Defendant's Preliminary Invalidity Contentions, Exhibit 505-A-8, *Webroot, Inc. and Open Text, Inc.* v. *Trend Micro Inc.*, No. 6:22-CV-00239-ADA-DTG, W.D. Tex., Feb. 21, 2023, 52 pgs.

Defendant's Preliminary Invalidity Contentions, Exhibit 505-A-9, *Webroot, Inc. and Open Text, Inc.* v. *Trend Micro Inc.*, No. 6:22-CV-00239-ADA-DTG, W.D. Tex., Feb. 21, 2023, 33 pgs.

Defendant's Preliminary Invalidity Contentions, Exhibit 505-A-10, *Webroot, Inc. and Open Text, Inc.* v. *Trend Micro Inc.*, No. 6:22-CV-00239-ADA-DTG, W.D. Tex., Feb. 21, 2023, 34 pgs.

Defendant's Preliminary Invalidity Contentions, Exhibit 505-A-11, *Webroot, Inc. and Open Text, Inc.* v. *Trend Micro Inc.*, No. 6:22-CV-00239-ADA-DTG, W.D. Tex., Feb. 21, 2023, 51 pgs.

Defendant's Preliminary Invalidity Contentions, Exhibit 505-A-12, *Webroot, Inc. and Open Text, Inc.* v. *Trend Micro Inc.*, No. 6:22-CV-00239-ADA-DTG, W.D. Tex., Feb. 21, 2023, 46 pgs.

Defendant's Preliminary Invalidity Contentions, Exhibit 505-A-13, *Webroot, Inc. and Open Text, Inc.* v. *Trend Micro Inc.*, No. 6:22-CV-00239-ADA-DTG, W.D. Tex., Feb. 21, 2023, 38 pgs.

Defendant's Preliminary Invalidity Contentions, Exhibit 505-A-14, *Webroot, Inc. and Open Text, Inc.* v. *Trend Micro Inc.*, No. 6:22-CV-00239-ADA-DTG, W.D. Tex., Feb. 21, 2023, 146 pgs.

Defendant's Preliminary Invalidity Contentions, Exhibit 505-A-15, *Webroot, Inc. and Open Text, Inc.* v. *Trend Micro Inc.*, No. 6:22-CV-00239-ADA-DTG, W.D. Tex., Feb. 21, 2023, 148 pgs.

Defendant's Preliminary Invalidity Contentions, Exhibit 505-A-16, *Webroot, Inc. and Open Text, Inc.* v. *Trend Micro Inc.*, No. 6:22-CV-00239-ADA-DTG, W.D. Tex., Feb. 21, 2023, 47 pgs.

Defendant's Preliminary Invalidity Contentions, Exhibit 505-A-17, *Webroot, Inc. and Open Text, Inc.* v. *Trend Micro Inc.*, No. 6:22-CV-00239-ADA-DTG, W.D. Tex., Feb. 21, 2023, 111 pgs.

Defendant's Preliminary Invalidity Contentions, Exhibit 505-A-18, *Webroot, Inc. and Open Text, Inc.* v. *Trend Micro Inc.*, No. 6:22-CV-00239-ADA-DTG, W.D. Tex., Feb. 21, 2023, 96 pgs.

Defendant's Preliminary Invalidity Contentions, Exhibit 505-A-19, *Webroot, Inc. and Open Text, Inc.* v. *Trend Micro Inc.*, No. 6:22-CV-00239-ADA-DTG, W.D. Tex., Feb. 21, 2023, 81 pgs.

Defendant's Preliminary Invalidity Contentions, Exhibit 505-A-20, *Webroot, Inc. and Open Text, Inc.* v. *Trend Micro Inc.*, No. 6:22-CV-00239-ADA-DTG, W.D. Tex., Feb. 21, 2023, 70 pgs.

Defendant's Preliminary Invalidity Contentions, Exhibit 505-A-21, *Webroot, Inc. and Open Text, Inc.* v. *Trend Micro Inc.*, No. 6:22-CV-00239-ADA-DTG, W.D. Tex., Feb. 21, 2023, 65 pgs.

Defendant's Preliminary Invalidity Contentions, Exhibit 505-A-22, *Webroot, Inc. and Open Text, Inc.* v. *Trend Micro Inc.*, No. 6:22-CV-00239-ADA-DTG, W.D. Tex., Feb. 21, 2023, 73 pgs.

Defendant's Preliminary Invalidity Contentions, Exhibit 505-A-23, *Webroot, Inc. and Open Text, Inc.* v. *Trend Micro Inc.*, No. 6:22-CV-00239-ADA-DTG, W.D. Tex., Feb. 21, 2023, 75 pgs.

Defendant's Preliminary Invalidity Contentions, Exhibit 505-A-24, *Webroot, Inc. and Open Text, Inc.* v. *Trend Micro Inc.*, No. 6:22-CV-00239-ADA-DTG, W.D. Tex., Feb. 21, 2023, 63 pgs.

Defendant's Preliminary Invalidity Contentions, Exhibit 505-A-25, *Webroot, Inc. and Open Text, Inc.* v. *Trend Micro Inc.*, No. 6:22-CV-00239-ADA-DTG, W.D. Tex., Feb. 21, 2023, 61 pgs.

Defendant's Preliminary Invalidity Contentions, Exhibit 505-A-26, *Webroot, Inc. and Open Text, Inc.* v. *Trend Micro Inc.*, No. 6:22-CV-00239-ADA-DTG, W.D. Tex., Feb. 21, 2023, 78 pgs.

Defendant's Preliminary Invalidity Contentions, Exhibit 505-B, *Webroot, Inc. and Open Text, Inc.* v. *Trend Micro Inc.*, No. 6:22-CV-00239-ADA-DTG, W.D. Tex., Feb. 21, 2023, 428 pgs.

Defendant Crowdstrike Holdings, Inc.'s Preliminary Invalidity Contentions, Exhibit 250-A-1, *Webroot, Inc. and Open Text, Inc.* v. *Crowdstrike Holdings, Inc.*, No. 6:22-CV-00241-ADA-DTG (WD, Texas), Sep. 13, 2022, 42 pgs.

Defendant Crowdstrike Holdings, Inc.'s Preliminary Invalidity Contentions, Exhibit 250-A-2, *Webroot, Inc. and Open Text, Inc.* v. *Crowdstrike Holdings, Inc.*, No. 6:22-CV-00241-ADA-DTG (WD, Texas), Sep. 13, 2022, 31 pgs.

(56) References Cited

OTHER PUBLICATIONS

Defendant Crowdstrike Holdings, Inc.'s Preliminary Invalidity Contentions, Exhibit 250-A-3, *Webroot, Inc. and Open Text, Inc.* v. *Crowdstrike Holdings, Inc.*, No. 6:22-CV-00241-ADA-DTG (WD, Texas), Sep. 13, 2022, 120 pgs.

Defendant Crowdstrike Holdings, Inc.'s Preliminary Invalidity Contentions, Exhibit 250-A-4, *Webroot, Inc. and Open Text, Inc.* v. *Crowdstrike Holdings, Inc.*, No. 6:22-CV-00241-ADA-DTG (WD, Texas), Sep. 13, 2022, 112 pgs.

Defendant Crowdstrike Holdings, Inc.'s Preliminary Invalidity Contentions, Exhibit 250-A-5, *Webroot, Inc. and Open Text, Inc.* v. *Crowdstrike Holdings, Inc.*, No. 6:22-CV-00241-ADA-DTG (WD, Texas), Sep. 13, 2022, 51 pgs.

Defendant Crowdstrike Holdings, Inc.'s Preliminary Invalidity Contentions, Exhibit 250-A-6, *Webroot, Inc. and Open Text, Inc.* v. *Crowdstrike Holdings, Inc.*, No. 6:22-CV-00241-ADA-DTG (WD, Texas), Sep. 13, 2022, 34 pgs.

Defendant Crowdstrike Holdings, Inc.'s Preliminary Invalidity Contentions, Exhibit 250-A-7, *Webroot, Inc. and Open Text, Inc.* v. *Crowdstrike Holdings, Inc.*, No. 6:22-CV-00241-ADA-DTG (WD, Texas), Sep. 13, 2022, 70 pgs.

Defendant Crowdstrike Holdings, Inc.'s Preliminary Invalidity Contentions, Exhibit 250-A-8, *Webroot, Inc. and Open Text, Inc.* v. *Crowdstrike Holdings, Inc.*, No. 6:22-CV-00241-ADA-DTG (WD, Texas), Sep. 13, 2022, 32 pgs.

Defendant Crowdstrike Holdings, Inc.'s Preliminary Invalidity Contentions, Exhibit 250-A-9, *Webroot, Inc. and Open Text, Inc.* v. *Crowdstrike Holdings, Inc.*, No. 6:22-CV-00241-ADA-DTG (WD, Texas), Sep. 13, 2022, 44 pgs.

Defendant Crowdstrike Holdings, Inc.'s Preliminary Invalidity Contentions, Exhibit 250-A-10, *Webroot, Inc. and Open Text, Inc.* v. *Crowdstrike Holdings, Inc.*, No. 6:22-CV-00241-ADA-DTG (WD, Texas), Sep. 13, 2022, 32 pgs.

Defendant Crowdstrike Holdings, Inc.'s Preliminary Invalidity Contentions, Exhibit 250-A-11, *Webroot, Inc. and Open Text, Inc.* v. *Crowdstrike Holdings, Inc.*, No. 6:22-CV-00241-ADA-DTG (WD, Texas), Sep. 13, 2022, 77 pgs.

Defendant Crowdstrike Holdings, Inc.'s Preliminary Invalidity Contentions, Exhibit 250-A-12, *Webroot, Inc. and Open Text, Inc.* v. *Crowdstrike Holdings, Inc.*, No. 6:22-CV-00241-ADA-DTG (WD, Texas), Sep. 13, 2022, 25 pgs.

Defendant Crowdstrike Holdings, Inc.'s Preliminary Invalidity Contentions, Exhibit 250-A-13, *Webroot, Inc. and Open Text, Inc.* v. *Crowdstrike Holdings, Inc.*, No. 6:22-CV-00241-ADA-DTG (WD, Texas), Sep. 13, 2022, 76 pgs.

Defendant Crowdstrike Holdings, Inc.'s Preliminary Invalidity Contentions, Exhibit 250-A-14, *Webroot, Inc. and Open Text, Inc.* v. *Crowdstrike Holdings, Inc.*, No. 6:22-CV-00241-ADA-DTG (WD, Texas), Sep. 13, 2022, 27 pgs.

Defendant Crowdstrike Holdings, Inc.'s Preliminary Invalidity Contentions, Exhibit 250-A-15, *Webroot, Inc. and Open Text, Inc.* v. *Crowdstrike Holdings, Inc.*, No. 6:22-CV-00241-ADA-DTG (WD, Texas), Sep. 13, 2022, 35 pgs.

Defendant Crowdstrike Holdings, Inc.'s Preliminary Invalidity Contentions, Exhibit 250-A-16, *Webroot, Inc. and Open Text, Inc.* v. *Crowdstrike Holdings, Inc.*, No. 6:22-CV-00241-ADA-DTG (WD, Texas), Sep. 13, 2022, 25 pgs.

Defendant Crowdstrike Holdings, Inc.'s Preliminary Invalidity Contentions, Exhibit 250-B, *Webroot, Inc. and Open Text, Inc.* v. *Crowdstrike Holdings, Inc.*, No. 6:22-CV-00241-ADA-DTG (WD, Texas), Sep. 13, 2022, 130 pgs.

Defendant Crowdstrike Holdings, Inc.'s Preliminary Invalidity Contentions, Exhibit 389-A-1, *Webroot, Inc. and Open Text, Inc.* v. *Crowdstrike Holdings, Inc.*, No. 6:22-CV-00241-ADA-DTG (WD, Texas), Sep. 13, 2022, 37 pgs.

Defendant Crowdstrike Holdings, Inc.'s Preliminary Invalidity Contentions, Exhibit 389-A-2, *Webroot, Inc. and Open Text, Inc.* v. *Crowdstrike Holdings, Inc.*, No. 6:22-CV-00241-ADA-DTG (WD, Texas), Sep. 13, 2022, 24 pgs.

Defendant Crowdstrike Holdings, Inc.'s Preliminary Invalidity Contentions, Exhibit 389-A-3, *Webroot, Inc. and Open Text, Inc.* v. *Crowdstrike Holdings, Inc.*, No. 6:22-CV-00241-ADA-DTG (WD, Texas), Sep. 13, 2022, 150 pgs.

Defendant Crowdstrike Holdings, Inc.'s Preliminary Invalidity Contentions, Exhibit 389-A-4, *Webroot, Inc. and Open Text, Inc.* v. *Crowdstrike Holdings, Inc.*, No. 6:22-CV-00241-ADA-DTG (WD, Texas), Sep. 13, 2022, 151 pgs.

Defendant Crowdstrike Holdings, Inc.'s Preliminary Invalidity Contentions, Exhibit 389-A-5, *Webroot, Inc. and Open Text, Inc.* v. *Crowdstrike Holdings, Inc.*, No. 6:22-CV-00241-ADA-DTG (WD, Texas), Sep. 13, 2022, 46 pgs.

Defendant Crowdstrike Holdings, Inc.'s Preliminary Invalidity Contentions, Exhibit 389-A-6, *Webroot, Inc. and Open Text, Inc.* v. *Crowdstrike Holdings, Inc.*, No. 6:22-CV-00241-ADA-DTG (WD, Texas), Sep. 13, 2022, 37 pgs.

Defendant Crowdstrike Holdings, Inc.'s Preliminary Invalidity Contentions, Exhibit 389-A-7, *Webroot, Inc. and Open Text, Inc.* v. *Crowdstrike Holdings, Inc.*, No. 6:22-CV-00241-ADA-DTG (WD, Texas), Sep. 13, 2022, 74 pgs.

Defendant Crowdstrike Holdings, Inc.'s Preliminary Invalidity Contentions, Exhibit 389-A-8, *Webroot, Inc. and Open Text, Inc.* v. *Crowdstrike Holdings, Inc.*, No. 6:22-CV-00241-ADA-DTG (WD, Texas), Sep. 13, 2022, 26 pgs.

Defendant Crowdstrike Holdings, Inc.'s Preliminary Invalidity Contentions, Exhibit 389-A-9, *Webroot, Inc. and Open Text, Inc.* v. *Crowdstrike Holdings, Inc.*, No. 6:22-CV-00241-ADA-DTG (WD, Texas), Sep. 13, 2022, 41 pgs.

Defendant Crowdstrike Holdings, Inc.'s Preliminary Invalidity Contentions, Exhibit 389-A-10, *Webroot, Inc. and Open Text, Inc.* v. *Crowdstrike Holdings, Inc.*, No. 6:22-CV-00241-ADA-DTG (WD, Texas), Sep. 13, 2022, 35 pgs.

Defendant Crowdstrike Holdings, Inc.'s Preliminary Invalidity Contentions, Exhibit 389-A-11, *Webroot, Inc. and Open Text, Inc.* v. *Crowdstrike Holdings, Inc.*, No. 6:22-CV-00241-ADA-DTG (WD, Texas), Sep. 13, 2022, 104 pgs.

Defendant Crowdstrike Holdings, Inc.'s Preliminary Invalidity Contentions, Exhibit 389-A-12, *Webroot, Inc. and Open Text, Inc.* v. *Crowdstrike Holdings, Inc.*, No. 6:22-CV-00241-ADA-DTG (WD, Texas), Sep. 13, 2022, 29 pgs.

Defendant Crowdstrike Holdings, Inc.'s Preliminary Invalidity Contentions, Exhibit 389-A-13, *Webroot, Inc. and Open Text, Inc.* v. *Crowdstrike Holdings, Inc.*, No. 6:22-CV-00241-ADA-DTG (WD, Texas), Sep. 13, 2022, 92 pgs.

Defendant Crowdstrike Holdings, Inc.'s Preliminary Invalidity Contentions, Exhibit 389-A-14, *Webroot, Inc. and Open Text, Inc.* v. *Crowdstrike Holdings, Inc.*, No. 6:22-CV-00241-ADA-DTG (WD, Texas), Sep. 13, 2022, 22 pgs.

Defendant Crowdstrike Holdings, Inc.'s Preliminary Invalidity Contentions, Exhibit 389-A-15, *Webroot, Inc. and Open Text, Inc.* v. *Crowdstrike Holdings, Inc.*, No. 6:22-CV-00241-ADA-DTG (WD, Texas), Sep. 13, 2022, 54 pgs.

Defendant Crowdstrike Holdings, Inc.'s Preliminary Invalidity Contentions, Exhibit 389-A-16, *Webroot, Inc. and Open Text, Inc.* v. *Crowdstrike Holdings, Inc.*, No. 6:22-CV-00241-ADA-DTG (WD, Texas), Sep. 13, 2022, 26 pgs.

Defendant Crowdstrike Holdings, Inc.'s Preliminary Invalidity Contentions, Exhibit 389-A-17, *Webroot, Inc. and Open Text, Inc.* v. *Crowdstrike Holdings, Inc.*, No. 6:22-CV-00241-ADA-DTG (WD, Texas), Sep. 13, 2022, 30 pgs.

Defendant Crowdstrike Holdings, Inc.'s Preliminary Invalidity Contentions, Exhibit 389-A-18, *Webroot, Inc. and Open Text, Inc.* v. *Crowdstrike Holdings, Inc.*, No. 6:22-CV-00241-ADA-DTG (WD, Texas), Sep. 13, 2022, 45 pgs.

Defendant Crowdstrike Holdings, Inc.'s Preliminary Invalidity Contentions, Exhibit 389-B, *Webroot, Inc. and Open Text, Inc.* v. *Crowdstrike Holdings, Inc.*, No. 6:22-CV-00241-ADA-DTG (WD, Texas), Sep. 13, 2022, 195 pgs.

Defendant Crowdstrike Holdings, Inc.'s Preliminary Invalidity Contentions, Exhibit 844-A-1, *Webroot, Inc. and Open Text, Inc.* v. *Crowdstrike Holdings, Inc.*, No. 6:22-CV-00241-ADA-DTG (WD, Texas), Sep. 13, 2022, 33 pgs.

(56) References Cited

OTHER PUBLICATIONS

Defendant Crowdstrike Holdings, Inc.'s Preliminary Invalidity Contentions, Exhibit 844-A-2, *Webroot, Inc. and Open Text, Inc.* v. *Crowdstrike Holdings, Inc.*, No. 6:22-CV-00241-ADA-DTG (WD, Texas), Sep. 13, 2022, 44 pgs.

Defendant Crowdstrike Holdings, Inc.'s Preliminary Invalidity Contentions, Exhibit 844-A-3, *Webroot, Inc. and Open Text, Inc.* v. *Crowdstrike Holdings, Inc.*, No. 6:22-CV-00241-ADA-DTG (WD, Texas), Sep. 13, 2022, 34 pgs.

Defendant Crowdstrike Holdings, Inc.'s Preliminary Invalidity Contentions, Exhibit 844-A-4, *Webroot, Inc. and Open Text, Inc.* v. *Crowdstrike Holdings, Inc.*, No. 6:22-CV-00241-ADA-DTG (WD, Texas), Sep. 13, 2022, 43 pgs.

Defendant Crowdstrike Holdings, Inc.'s Preliminary Invalidity Contentions, Exhibit 844-A-5, *Webroot, Inc. and Open Text, Inc.* v. *Crowdstrike Holdings, Inc.*, No. 6:22-CV-00241-ADA-DTG (WD, Texas), Sep. 13, 2022, 34 pgs.

Defendant Crowdstrike Holdings, Inc.'s Preliminary Invalidity Contentions, Exhibit 844-A-6, *Webroot, Inc. and Open Text, Inc.* v. *Crowdstrike Holdings, Inc.*, No. 6:22-CV-00241-ADA-DTG (WD, Texas), Sep. 13, 2022, 31 pgs.

Defendant Crowdstrike Holdings, Inc.'s Preliminary Invalidity Contentions, Exhibit 844-A-7, *Webroot, Inc. and Open Text, Inc.* v. *Crowdstrike Holdings, Inc.*, No. 6:22-CV-00241-ADA-DTG (WD, Texas), Sep. 13, 2022, 28 pgs.

Defendant Crowdstrike Holdings, Inc.'s Preliminary Invalidity Contentions, Exhibit 844-A-8, *Webroot, Inc. and Open Text, Inc.* v. *Crowdstrike Holdings, Inc.*, No. 6:22-CV-00241-ADA-DTG (WD, Texas), Sep. 13, 2022, 28 pgs.

Defendant Crowdstrike Holdings, Inc.'s Preliminary Invalidity Contentions, Exhibit 844-A-9, *Webroot, Inc. and Open Text, Inc.* v. *Crowdstrike Holdings, Inc.*, No. 6:22-CV-00241-ADA-DTG (WD, Texas), Sep. 13, 2022, 35 pgs.

Defendant Crowdstrike Holdings, Inc.'s Preliminary Invalidity Contentions, Exhibit 844-A-10, *Webroot, Inc. and Open Text, Inc.* v. *Crowdstrike Holdings, Inc.*, No. 6:22-CV-00241-ADA-DTG (WD, Texas), Sep. 13, 2022, 28 pgs.

Defendant Crowdstrike Holdings, Inc.'s Preliminary Invalidity Contentions, Exhibit 844-A-11, *Webroot, Inc. and Open Text, Inc.* v. *Crowdstrike Holdings, Inc.*, No. 6:22-CV-00241-ADA-DTG (WD, Texas), Sep. 13, 2022, 27 pgs.

Defendant Crowdstrike Holdings, Inc.'s Preliminary Invalidity Contentions, Exhibit 844-A-12, *Webroot, Inc. and Open Text, Inc.* v. *Crowdstrike Holdings, Inc.*, No. 6:22-CV-00241-ADA-DTG (WD, Texas), Sep. 13, 2022, 32 pgs.

Defendant Crowdstrike Holdings, Inc.'s Preliminary Invalidity Contentions, Exhibit 844-A-13, *Webroot, Inc. and Open Text, Inc.* v. *Crowdstrike Holdings, Inc.*, No. 6:22-CV-00241-ADA-DTG (WD, Texas), Sep. 13, 2022, 37 pgs.

Defendant Crowdstrike Holdings, Inc.'s Preliminary Invalidity Contentions, Exhibit 844-A-14, *Webroot, Inc. and Open Text, Inc.* v. *Crowdstrike Holdings, Inc.*, No. 6:22-CV-00241-ADA-DTG (WD, Texas), Sep. 13, 2022, 32 pgs.

Defendant Crowdstrike Holdings, Inc.'s Preliminary Invalidity Contentions, Exhibit 844-A-15, *Webroot, Inc. and Open Text, Inc.* v. *Crowdstrike Holdings, Inc.*, No. 6:22-CV-00241-ADA-DTG (WD, Texas), Sep. 13, 2022, 32 pgs.

Defendant Crowdstrike Holdings, Inc.'s Preliminary Invalidity Contentions, Exhibit 844-A-16, *Webroot, Inc. and Open Text, Inc.* v. *Crowdstrike Holdings, Inc.*, No. 6:22-CV-00241-ADA-DTG (WD, Texas), Sep. 13, 2022, 35 pgs.

Defendant Crowdstrike Holdings, Inc.'s Preliminary Invalidity Contentions, Exhibit 844-A-17, *Webroot, Inc. and Open Text, Inc.* v. *Crowdstrike Holdings, Inc.*, No. 6:22-CV-00241-ADA-DTG (WD, Texas), Sep. 13, 2022, 35 pgs.

Defendant Crowdstrike Holdings, Inc.'s Preliminary Invalidity Contentions, Exhibit 844-A-18, *Webroot, Inc. and Open Text, Inc.* v. *Crowdstrike Holdings, Inc.*, No. 6:22-CV-00241-ADA-DTG (WD, Texas), Sep. 13, 2022, 42 pgs.

Defendant Crowdstrike Holdings, Inc.'s Preliminary Invalidity Contentions, Exhibit 844-A-19, *Webroot, Inc. and Open Text, Inc.* v. *Crowdstrike Holdings, Inc.*, No. 6:22-CV-00241-ADA-DTG (WD, Texas), Sep. 13, 2022, 28 pgs.

Defendant Crowdstrike Holdings, Inc.'s Preliminary Invalidity Contentions, Exhibit 844-A-20, *Webroot, Inc. and Open Text, Inc.* v. *Crowdstrike Holdings, Inc.*, No. 6:22-CV-00241-ADA-DTG (WD, Texas), Sep. 13, 2022, 33 pgs.

Defendant Crowdstrike Holdings, Inc.'s Preliminary Invalidity Contentions, Exhibit 844-A-21, *Webroot, Inc. and Open Text, Inc.* v. *Crowdstrike Holdings, Inc.*, No. 6:22-CV-00241-ADA-DTG (WD, Texas), Sep. 13, 2022, 44 pgs.

Defendant Crowdstrike Holdings, Inc.'s Preliminary Invalidity Contentions, Exhibit 844-A-22, *Webroot, Inc. and Open Text, Inc.* v. *Crowdstrike Holdings, Inc.*, No. 6:22-CV-00241-ADA-DTG (WD, Texas), Sep. 13, 2022, 29 pgs.

Defendant Crowdstrike Holdings, Inc.'s Preliminary Invalidity Contentions, Exhibit 844-A-23, *Webroot, Inc. and Open Text, Inc.* v. *Crowdstrike Holdings, Inc.*, No. 6:22-CV-00241-ADA-DTG (WD, Texas), Sep. 13, 2022, 26 pgs.

Defendant Crowdstrike Holdings, Inc.'s Preliminary Invalidity Contentions, Exhibit 844-A-24, *Webroot, Inc. and Open Text, Inc.* v. *Crowdstrike Holdings, Inc.*, No. 6:22-CV-00241-ADA-DTG (WD, Texas), Sep. 13, 2022, 30 pgs.

Defendant Crowdstrike Holdings, Inc.'s Preliminary Invalidity Contentions, Exhibit 844-A-25, *Webroot, Inc. and Open Text, Inc.* v. *Crowdstrike Holdings, Inc.*, No. 6:22-CV-00241-ADA-DTG (WD, Texas), Sep. 13, 2022, 37 pgs.

Defendant Crowdstrike Holdings, Inc.'s Preliminary Invalidity Contentions, Exhibit 844-A-26, *Webroot, Inc. and Open Text, Inc.* v. *Crowdstrike Holdings, Inc.*, No. 6:22-CV-00241-ADA-DTG (WD, Texas), Sep. 13, 2022, 26 pgs.

Defendant Crowdstrike Holdings, Inc.'s Preliminary Invalidity Contentions, Exhibit 844-A-27, *Webroot, Inc. and Open Text, Inc.* v. *Crowdstrike Holdings, Inc.*, No. 6:22-CV-00241-ADA-DTG (WD, Texas), Sep. 13, 2022, 45 pgs.

Defendant Crowdstrike Holdings, Inc.'s Preliminary Invalidity Contentions, Exhibit 844-A-28, *Webroot, Inc. and Open Text, Inc.* v. *Crowdstrike Holdings, Inc.*, No. 6:22-CV-00241-ADA-DTG (WD, Texas), Sep. 13, 2022, 41 pgs.

Defendant Crowdstrike Holdings, Inc.'s Preliminary Invalidity Contentions, Exhibit 844-A-29, *Webroot, Inc. and Open Text, Inc.* v. *Crowdstrike Holdings, Inc.*, No. 6:22-CV-00241-ADA-DTG (WD, Texas), Sep. 13, 2022, 38 pgs.

Defendant Crowdstrike Holdings, Inc.'s Preliminary Invalidity Contentions, Exhibit 844-B, *Webroot, Inc. and Open Text, Inc.* v. *Crowdstrike Holdings, Inc.*, No. 6:22-CV-00241-ADA-DTG (WD, Texas), Sep. 13, 2022, 167 pgs.

Defendant Forcepoint LLC's Preliminary Invalidity Contentions, Exhibit 389-A-1, *Webroot, Inc. and Open Text, Inc.* v. *Forcepoint LLC*, No. 6:22-CV-00342-ADA-DTG (WD, Texas), Sep. 13, 2022, 29 pgs.

Defendant Forcepoint LLC's Preliminary Invalidity Contentions, Exhibit 389-A-2, *Webroot, Inc. and Open Text, Inc.* v. *Forcepoint LLC*, No. 6:22-CV-00342-ADA-DTG (WD, Texas), Sep. 13, 2022, 45 pgs.

Defendant Forcepoint LLC's Preliminary Invalidity Contentions, Exhibit 389-A-3, *Webroot, Inc. and Open Text, Inc.* v. *Forcepoint LLC*, No. 6:22-CV-00342-ADA-DTG (WD, Texas), Sep. 13, 2022, 51 pgs.

Defendant Forcepoint LLC's Preliminary Invalidity Contentions, Exhibit 389-A-4, *Webroot, Inc. and Open Text, Inc.* v. *Forcepoint LLC*, No. 6:22-CV-00342-ADA-DTG (WD, Texas), Sep. 13, 2022, 71 pgs.

Defendant Forcepoint LLC's Preliminary Invalidity Contentions, Exhibit 389-A-5, *Webroot, Inc. and Open Text, Inc.* v. *Forcepoint LLC*, No. 6:22-CV-00342-ADA-DTG (WD, Texas), Sep. 13, 2022, 26 pgs.

Defendant Forcepoint LLC's Preliminary Invalidity Contentions, Exhibit 389-A-6, *Webroot, Inc. and Open Text, Inc.* v. *Forcepoint LLC*, No. 6:22-CV-00342-ADA-DTG (WD, Texas), Sep. 13, 2022, 21 pgs.

(56) References Cited

OTHER PUBLICATIONS

Defendant Forcepoint LLC's Preliminary Invalidity Contentions, Exhibit 389-A-7, *Webroot, Inc. and Open Text, Inc.* v. *Forcepoint LLC*, No. 6:22-CV-00342-ADA-DTG (WD, Texas), Sep. 13, 2022, 32 pgs.

Defendant Forcepoint LLC's Preliminary Invalidity Contentions, Exhibit 389-A-8, *Webroot, Inc. and Open Text, Inc.* v. *Forcepoint LLC*, No. 6:22-CV-00342-ADA-DTG (WD, Texas), Sep. 13, 2022, 87 pgs.

Defendant Forcepoint LLC's Preliminary Invalidity Contentions, Exhibit 389-A-9, *Webroot, Inc. and Open Text, Inc.* v. *Forcepoint LLC*, No. 6:22-CV-00342-ADA-DTG (WD, Texas), Sep. 13, 2022, 20 pgs.

Defendant Forcepoint LLC's Preliminary Invalidity Contentions, Exhibit 389-A-10, *Webroot, Inc. and Open Text, Inc.* v. *Forcepoint LLC*, No. 6:22-CV- 00342-ADA-DTG (WD, Texas), Sep. 13, 2022, 76 pgs.

Defendant Forcepoint LLC's Preliminary Invalidity Contentions, Exhibit 389-A-11, *Webroot, Inc. and Open Text, Inc.* v. *Forcepoint LLC*, No. 6:22-CV-00342-ADA-DTG (WD, Texas), Sep. 13, 2022, 29 pgs.

Defendant Forcepoint LLC's Preliminary Invalidity Contentions, Exhibit 389-A-12, *Webroot, Inc. and Open Text, Inc.* v. *Forcepoint LLC*, No. 6:22-CV-00342-ADA-DTG (WD, Texas), Sep. 13, 2022, 25 pgs.

Defendant Forcepoint LLC's Preliminary Invalidity Contentions, Exhibit 389-A-13, *Webroot, Inc. and Open Text, Inc.* v. *Forcepoint LLC*, No. 6:22-CV-00342-ADA-DTG (WD, Texas), Sep. 13, 2022, 39 pgs.

Defendant Forcepoint LLC's Preliminary Invalidity Contentions, Exhibit 389-A-14, *Webroot, Inc. and Open Text, Inc.* v. *Forcepoint LLC*, No. 6:22-CV-00342-ADA-DTG (WD, Texas), Sep. 13, 2022, 24 pgs.

Defendant Forcepoint LLC's Preliminary Invalidity Contentions, Exhibit 389-A-15, *Webroot, Inc. and Open Text, Inc.* v. *Forcepoint LLC*, No. 6:22-CV-00342-ADA-DTG (WD, Texas), Sep. 13, 2022, 126 pgs.

Defendant Forcepoint LLC's Preliminary Invalidity Contentions, Exhibit 389-A-16, *Webroot, Inc. and Open Text, Inc.* v. *Forcepoint LLC*, No. 6:22-CV-00342-ADA-DTG (WD, Texas), Sep. 13, 2022, 127 pgs.

Defendant Forcepoint LLC's Preliminary Invalidity Contentions, Exhibit 389-A-17, *Webroot, Inc. and Open Text, Inc.* v. *Forcepoint LLC*, No. 6:22-CV-00342-ADA-DTG (WD, Texas), Sep. 13, 2022, 61 pgs.

Defendant Forcepoint LLC's Preliminary Invalidity Contentions, Exhibit 389-A-18, *Webroot, Inc. and Open Text, Inc.* v. *Forcepoint LLC*, No. 6:22-CV-00342-ADA-DTG (WD, Texas), Sep. 13, 2022, 35 pgs.

Defendant Forcepoint LLC's Preliminary Invalidity Contentions, Exhibit 389-A-19, *Webroot, Inc. and Open Text, Inc.* v. *Forcepoint LLC*, No. 6:22-CV-00342-ADA-DTG (WD, Texas), Sep. 13, 2022, 42 pgs.

Defendant Forcepoint LLC's Preliminary Invalidity Contentions, Exhibit 389-A-20, *Webroot, Inc. and Open Text, Inc.* v. *Forcepoint LLC*, No. 6:22-CV-00342-ADA-DTG (WD, Texas), Sep. 13, 2022, 35 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-1, 24 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-2, 23 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-3, 28 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-4, 24 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-5, 26 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-6, 22 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-7, 30 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-8, 25 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-9, 24 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-10, 21 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-11, 26 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-12, 25 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-13, 25 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-14, 22 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-15, 18 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-16, 21 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-17, 19 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-18, 19 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-19, 21 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-20, 18 pgs.

Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-21, 19 pgs.

(56)        References Cited

OTHER PUBLICATIONS

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-22, 18 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-23, 24 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-24, 28 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-25, 25 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-26, 23 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-27, 34 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-28, 31 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Sep. 13, 2022, Exhibit 844-B-29, 28 pgs.
Defendant Forcepoint LLC's Preliminary Invalidity Contentions, Exhibit 721-C-1, *Webroot, Inc. and Open Text, Inc. v. Forcepoint LLC*, No. 6:22-CV-00342-ADA-DTG (WD, Texas), Sep. 13, 2022, 44 pgs.
Defendant Forcepoint LLC's Preliminary Invalidity Contentions, Exhibit 721-C-2, *Webroot, Inc. and Open Text, Inc. v. Forcepoint LLC*, No. 6:22-CV-00342-ADA-DTG (WD, Texas), Sep. 13, 2022, 76 pgs.
Defendant Forcepoint LLC's Preliminary Invalidity Contentions, Exhibit 721-C-3, *Webroot, Inc. and Open Text, Inc. v. Forcepoint LLC*, No. 6:22-CV-00342-ADA-DTG (WD, Texas), Sep. 13, 2022, 73 pgs.
Defendant Forcepoint LLC's Preliminary Invalidity Contentions, Exhibit 721-C-4, *Webroot, Inc. and Open Text, Inc. v. Forcepoint LLC*, No. 6:22-CV-00342-ADA-DTG (WD, Texas), Sep. 13, 2022, 92 pgs.
Defendant Forcepoint LLC's Preliminary Invalidity Contentions, Exhibit 721-C-5, *Webroot, Inc. and Open Text, Inc. v. Forcepoint LLC*, No. 6:22-CV-00342-ADA-DTG (WD, Texas), Sep. 13, 2022, 24 pgs.
Defendant Forcepoint LLC's Preliminary Invalidity Contentions, Exhibit 721-C-6, *Webroot, Inc. and Open Text, Inc. v. Forcepoint LLC*, No. 6:22-CV-00342-ADA-DTG (WD, Texas), Sep. 13, 2022, 21 pgs.
Defendant Forcepoint LLC's Preliminary Invalidity Contentions, Exhibit 721-C-7, *Webroot, Inc. and Open Text, Inc. v. Forcepoint LLC*, No. 6:22-CV-00342-ADA-DTG (WD, Texas), Sep. 13, 2022, 27 pgs.
Defendant Forcepoint LLC's Preliminary Invalidity Contentions, Exhibit 721-C-8, *Webroot, Inc. and Open Text, Inc. v. Forcepoint LLC*, No. 6:22-CV-00342-ADA-DTG (WD, Texas), Sep. 13, 2022, 33 pgs.
Defendant Forcepoint LLC's Preliminary Invalidity Contentions, Exhibit 721-C-9, *Webroot, Inc. and Open Text, Inc. v. Forcepoint LLC*, No. 6:22-CV-00342-ADA-DTG (WD, Texas), Sep. 13, 2022, 38 pgs.
Defendant Forcepoint LLC's Preliminary Invalidity Contentions, Exhibit 721-C-10, *Webroot, Inc. and Open Text, Inc. v. Forcepoint LLC*, No. 6:22-CV-00342-ADA-DTG (WD, Texas), Sep. 13, 2022, 27 pgs.
Defendant Forcepoint LLC's Preliminary Invalidity Contentions, Exhibit 721-C-11, *Webroot, Inc. and Open Text, Inc. v. Forcepoint LLC*, No. 6:22-CV-00342-ADA-DTG (WD, Texas), Sep. 13, 2022, 34 pgs.
Defendant Forcepoint LLC's Preliminary Invalidity Contentions, Exhibit 721-C-12, *Webroot, Inc. and Open Text, Inc. v. Forcepoint LLC*, No. 6:22-CV-00342-ADA-DTG (WD, Texas), Sep. 13, 2022, 31 pgs.
Defendant Forcepoint LLC's Preliminary Invalidity Contentions, Exhibit 721-C-13, *Webroot, Inc. and Open Text, Inc. v. Forcepoint LLC*, No. 6:22-CV-00342-ADA-DTG (WD, Texas), Sep. 13, 2022, 39 pgs.
Defendant Forcepoint LLC's Preliminary Invalidity Contentions, Exhibit 721-C-14, *Webroot, Inc. and Open Text, Inc. v. Forcepoint LLC*, No. 6:22-CV-00342-ADA-DTG (WD, Texas), Sep. 13, 2022, 40 pgs.
Defendant Forcepoint LLC's Preliminary Invalidity Contentions, Exhibit 721-C-15, *Webroot, Inc. and Open Text, Inc. v. Forcepoint LLC*, No. 6:22-CV-00342-ADA-DTG (WD, Texas), Sep. 13, 2022, 28 pgs.
Defendant Forcepoint LLC's Preliminary Invalidity Contentions, Exhibit 721-C-16, *Webroot, Inc. and Open Text, Inc. v. Forcepoint LLC*, No. 6:22-CV-00342-ADA-DTG (WD, Texas), Sep. 13, 2022, 18 pgs.
Defendant Forcepoint LLC's Preliminary Invalidity Contentions, Exhibit 721-C-17, *Webroot, Inc. and Open Text, Inc. v. Forcepoint LLC*, No. 6:22-CV-00342-ADA-DTG (WD, Texas), Sep. 13, 2022, 18 pgs.
Defendant Forcepoint LLC's Preliminary Invalidity Contentions, Exhibit 386-D-1, *Webroot, Inc. and Open Text, Inc. v. Forcepoint LLC*, No. 6:22-CV-00342-ADA-DTG (WD, Texas), Sep. 13, 2022, 91 pgs.
Defendant Forcepoint LLC's Preliminary Invalidity Contentions, Exhibit 386-D-2, *Webroot, Inc. and Open Text, Inc. v. Forcepoint LLC*, No. 6:22-CV-00342-ADA-DTG (WD, Texas), Sep. 13, 2022, 64 pgs.
Defendant Forcepoint LLC's Preliminary Invalidity Contentions, Exhibit 386-D-3, *Webroot, Inc. and Open Text, Inc. v. Forcepoint LLC*, No. 6:22-CV-00342-ADA-DTG (WD, Texas), Sep. 13, 2022, 75 pgs.
Defendant Forcepoint LLC's Preliminary Invalidity Contentions, Exhibit 386-D-4, *Webroot, Inc. and Open Text, Inc. v. Forcepoint LLC*, No. 6:22-CV-00342-ADA-DTG (WD, Texas), Sep. 13, 2022, 72 pgs.
Defendant Forcepoint LLC's Preliminary Invalidity Contentions, Exhibit 386-D-5, *Webroot, Inc. and Open Text, Inc. v. Forcepoint LLC*, No. 6:22-CV-00342-ADA-DTG (WD, Texas), Sep. 13, 2022, 76 pgs.
Defendant Forcepoint LLC's Preliminary Invalidity Contentions, Exhibit 928-E-1, *Webroot, Inc. and Open Text, Inc. v. Forcepoint LLC*, No. 6:22-CV-00342-ADA-DTG (WD, Texas), Sep. 13, 2022, 27 pgs.
Defendant Forcepoint LLC's Preliminary Invalidity Contentions, Exhibit 928-E-2, *Webroot, Inc. and Open Text, Inc. v. Forcepoint LLC*, No. 6:22-CV-00342-ADA-DTG (WD, Texas), Sep. 13, 2022, 25 pgs.
Defendant Forcepoint LLC's Preliminary Invalidity Contentions, Exhibit 928-E-3, *Webroot, Inc. and Open Text, Inc. v. Forcepoint LLC*, No. 6:22-CV-00342-ADA-DTG (WD, Texas), Sep. 13, 2022, 28 pgs.
Defendant Forcepoint LLC's Preliminary Invalidity Contentions, Exhibit 928-E-4, *Webroot, Inc. and Open Text, Inc. v. Forcepoint LLC*, No. 6:22-CV-00342-ADA-DTG (WD, Texas), Sep. 13, 2022, 31 pgs.
Defendant Forcepoint LLC's Preliminary Invalidity Contentions, Exhibit 928-E-5, *Webroot, Inc. and Open Text, Inc. v. Forcepoint LLC*, No. 6:22-CV-00342-ADA-DTG (WD, Texas), Sep. 13, 2022, 31 pgs.

(56) References Cited

OTHER PUBLICATIONS

Defendant Forcepoint LLC's Preliminary Invalidity Contentions, Exhibit 869-H-1, *Webroot, Inc. and Open Text, Inc.* v. *Forcepoint LLC*, CA. No. 6:22-CV-00342-ADA-DTG, W.D. Tex., Feb. 21, 2023, 55 pgs.

Defendant Forcepoint LLC's Preliminary Invalidity Contentions, Exhibit 869-H-2, *Webroot, Inc. and Open Text, Inc.* v. *Forcepoint LLC*, CA. No. 6:22-CV-00342-ADA-DTG, W.D. Tex., Feb. 21, 2023,42 pgs.

Defendant Forcepoint LLC's Preliminary Invalidity Contentions, Exhibit 869-H-3, *Webroot, Inc. and Open Text, Inc.* v. *Forcepoint LLC*, CA. No. 6:22-CV-00342-ADA-DTG, W.D. Tex., Feb. 21, 2023, 39 pgs.

Defendant Forcepoint LLC's Preliminary Invalidity Contentions, Exhibit 869-H-4, *Webroot, Inc. and Open Text, Inc.* v. *Forcepoint LLC*, CA. No. 6:22-CV-00342-ADA-DTG, W.D. Tex., Feb. 21, 2023, 40 pgs.

Defendant Forcepoint LLC's Preliminary Invalidity Contentions, Exhibit 869-H-5, *Webroot, Inc. and Open Text, Inc.* v. *Forcepoint LLC*, CA. No. 6:22-CV-00342-ADA-DTG, W.D. Tex., Feb. 21, 2023, 47 pgs.

Defendant Forcepoint LLC's Preliminary Invalidity Contentions, Exhibit 869-H-6, *Webroot, Inc. and Open Text, Inc.* v. *Forcepoint LLC*, CA. No. 6:22-CV-00342-ADA-DTG, W.D. Tex., Feb. 21, 2023, 48 pgs.

Defendant Forcepoint LLC's Preliminary Invalidity Contentions, Exhibit 869-H-7, *Webroot, Inc. and Open Text, Inc.* v. *Forcepoint LLC*, CA. No. 6:22-CV-00342-ADA-DTG, W.D. Tex., Feb. 21, 2023, 62 pgs.

Defendant Forcepoint LLC's Preliminary Invalidity Contentions, Exhibit 869-H-8, *Webroot, Inc. and Open Text, Inc.* v. *Forcepoint LLC*, CA. No. 6:22-CV-00342-ADA-DTG, W.D. Tex., Feb. 21, 2023, 36 pgs.

Defendant Forcepoint LLC's Preliminary Invalidity Contentions, Exhibit 869-H-9, *Webroot, Inc. and Open Text, Inc.* v. *Forcepoint LLC*, CA. No. 6:22-CV-00342-ADA-DTG, W.D. Tex., Feb. 21, 2023, 39 pgs.

Defendant Forcepoint LLC's Preliminary Invalidity Contentions, Exhibit 869-H-10, *Webroot, Inc. and Open Text, Inc.* v. *Forcepoint LLC*, CA. No. 6:22-CV-00342-ADA-DTG, W.D. Tex., Feb. 21, 2023, 37 pgs.

Defendant Forcepoint LLC's Preliminary Invalidity Contentions, Exhibit 869-H-11, *Webroot, Inc. and Open Text, Inc.* v. *Forcepoint LLC*, CA. No. 6:22-CV-00342-ADA-DTG, W.D. Tex., Feb. 21, 2023, 44 pgs.

Defendant Forcepoint LLC's Preliminary Invalidity Contentions, Exhibit 869-H-12, *Webroot, Inc. and Open Text, Inc.* v. *Forcepoint LLC*, CA. No. 6:22-CV-00342-ADA-DTG, W.D. Tex., Feb. 21, 2023, 39 pgs.

Defendant Forcepoint LLC's Preliminary Invalidity Contentions, Exhibit 869-H-13, *Webroot, Inc. and Open Text, Inc.* v. *Forcepoint LLC*, CA. No. 6:22-CV-00342-ADA-DTG, W.D. Tex., Feb. 21, 2023, 50 pgs.

Defendant Forcepoint LLC's Preliminary Invalidity Contentions, Exhibit 869-H-14, *Webroot, Inc. and Open Text, Inc.* v. *Forcepoint LLC*, CA. No. 6:22-CV-00342-ADA-DTG, W.D. Tex., Feb. 21, 2023, 37 pgs.

Defendant Forcepoint LLC's Preliminary Invalidity Contentions, Exhibit 869-H-15, *Webroot, Inc. and Open Text, Inc.* v. *Forcepoint LLC*, CA. No. 6:22-CV-00342-ADA-DTG, W.D. Tex., Feb. 21, 2023, 36 pgs.

Defendant Forcepoint LLC's Preliminary Invalidity Contentions, Exhibit 869-H-16, *Webroot, Inc. and Open Text, Inc.* v. *Forcepoint LLC*, CA. No. 6:22-CV-00342-ADA-DTG, W.D. Tex., Feb. 21, 2023, 32 pgs.

Defendant Forcepoint LLC's Preliminary Invalidity Contentions, Exhibit 869-H-17, *Webroot, Inc. and Open Text, Inc.* v. *Forcepoint LLC*, CA. No. 6:22-CV-00342-ADA-DTG, W.D. Tex., Feb. 21, 2023, 31 pgs.

Defendant Forcepoint LLC's Preliminary Invalidity Contentions, Exhibit 869-H-18, *Webroot, Inc. and Open Text, Inc.* v. *Forcepoint LLC*, CA. No. 6:22-CV-00342-ADA-DTG, W.D. Tex., Feb. 21, 2023, 30 pgs.

Defendant Forcepoint LLC's Preliminary Invalidity Contentions, Exhibit 869-H-19, *Webroot, Inc. and Open Text, Inc.* v. *Forcepoint LLC*, CA. No. 6:22-CV-00342-ADA-DTG, W.D. Tex., Feb. 21, 2023, 37 pgs.

Defendant Forcepoint LLC's Preliminary Invalidity Contentions, Exhibit 869-H-20, *Webroot, Inc. and Open Text, Inc.* v. *Forcepoint LLC*, CA. No. 6:22-CV-00342-ADA-DTG, W.D. Tex., Feb. 21, 2023, 32 pgs.

Defendant Forcepoint LLC's Preliminary Invalidity Contentions, Exhibit 869-H-21, *Webroot, Inc. and Open Text, Inc.* v. *Forcepoint LLC*, CA. No. 6:22-CV-00342-ADA-DTG, W.D. Tex., Feb. 21, 2023, 37 pgs.

Defendant Forcepoint LLC's Preliminary Invalidity Contentions, Exhibit 869-H-22, *Webroot, Inc. and Open Text, Inc.* v. *Forcepoint LLC*, CA. No. 6:22-CV-00342-ADA-DTG, W.D. Tex., Feb. 21, 2023, 38 pgs.

Defendant Forcepoint LLC's Preliminary Invalidity Contentions, Exhibit 869-H-23, *Webroot, Inc. and Open Text, Inc.* v. *Forcepoint LLC*, CA. No. 6:22-CV-00342-ADA-DTG, W.D. Tex., Feb. 21, 2023, 33 pgs.

Defendant Forcepoint LLC's Preliminary Invalidity Contentions, Exhibit 869-H-24, *Webroot, Inc. and Open Text, Inc.* v. *Forcepoint LLC*, CA. No. 6:22-CV-00342-ADA-DTG, W.D. Tex., Feb. 21, 2023, 35 pgs.

Defendant Forcepoint LLC's Preliminary Invalidity Contentions, Exhibit 869-H-25, *Webroot, Inc. and Open Text, Inc.* v. *Forcepoint LLC*, CA. No. 6:22-CV-00342-ADA-DTG, W.D. Tex., Feb. 21, 2023, 63 pgs.

Defendant Forcepoint LLC's Preliminary Invalidity Contentions, Exhibit 869-H-26, *Webroot, Inc. and Open Text, Inc.* v. *Forcepoint LLC*, CA. No. 6:22-CV-00342-ADA-DTG, W.D. Tex., Feb. 21, 2023, 39 pgs.

Defendant Forcepoint LLC's Preliminary Invalidity Contentions, Exhibit 869-H-27, *Webroot, Inc. and Open Text, Inc.* v. *Forcepoint LLC*, CA. No. 6:22-CV-00342-ADA-DTG, W.D. Tex., Feb. 21, 2023, 29 pgs.

Defendant Forcepoint LLC's Preliminary Invalidity Contentions, Exhibit 869-H-28, *Webroot, Inc. and Open Text, Inc.* v. *Forcepoint LLC*, CA. No. 6:22-CV-00342-ADA-DTG, W.D. Tex., Feb. 21, 2023, 71 pgs.

Defendant Forcepoint LLC's Preliminary Invalidity Contentions, Exhibit 869-H-29, *Webroot, Inc. and Open Text, Inc.* v. *Forcepoint LLC*, CA. No. 6:22-CV-00342-ADA-DTG, W.D. Tex., Feb. 21, 2023, 38 pgs.

Defendant Forcepoint LLC's Preliminary Invalidity Contentions, Exhibit 869-H-30, *Webroot, Inc. and Open Text, Inc.* v. *Forcepoint LLC*, CA. No. 6:22-CV-00342-ADA-DTG, W.D. Tex., Feb. 21, 2023, 33 pgs.

Defendant Forcepoint LLC's Preliminary Invalidity Contentions, Exhibit 869-H-31, *Webroot, Inc. and Open Text, Inc.* v. *Forcepoint LLC*, CA. No. 6:22-CV-00342-ADA-DTG, W.D. Tex., Feb. 21, 2023, 39 pgs.

Defendant Forcepoint LLC's Preliminary Invalidity Contentions, Exhibit 869-H-32, *Webroot, Inc. and Open Text, Inc.* v. *Forcepoint LLC*, CA. No. 6:22-CV-00342-ADA-DTG, W.D. Tex., Feb. 21, 2023, 34 pgs.

Defendant Forcepoint LLC's Preliminary Invalidity Contentions, Exhibit 869-H-33, *Webroot, Inc. and Open Text, Inc.* v. *Forcepoint LLC*, CA. No. 6:22-CV-00342-ADA-DTG, W.D. Tex., Feb. 21, 2023, 40 pgs.

Defendant Forcepoint LLC's Preliminary Invalidity Contentions, Exhibit 869-H-34, *Webroot, Inc. and Open Text, Inc.* v. *Forcepoint LLC*, CA. No. 6:22-CV-00342-ADA-DTG, W.D. Tex., Feb. 21, 2023, 43 pgs.

Defendant Forcepoint LLC's Preliminary Invalidity Contentions, Exhibit 869-H-35, *Webroot, Inc. and Open Text, Inc.* v. *Forcepoint LLC*, CA. No. 6:22-CV-00342-ADA-DTG, W.D. Tex., Feb. 21, 2023, 49 pgs.

(56) References Cited

OTHER PUBLICATIONS

Defendant Forcepoint LLC's Preliminary Invalidity Contentions, Exhibit 869-H-36, *Webroot, Inc. and Open Text, Inc.* v. *Forcepoint LLC*, CA. No. 6:22-CV-00342-ADA-DTG, W.D. Tex., Feb. 21, 2023, 69 pgs.

Defendant AO Kaspersky Lab's Preliminary Invalidity Contentions—Exhibit 1A, Prior Art Index, *Webroot, Inc. and Open Text, Inc.* v. *AO Kaspersky Lab*, No. 6:22-CV-00243 (WD, Texas), Sep. 14, 2022, 67 pgs.

Defendant AO Kaspersky Lab's Preliminary Invalidity Contentions—Exhibit 2A, Invalidity Claim Chart Index, *Webroot, Inc. and Open Text, Inc.* v. *AO Kaspersky Lab*, No. 6:22-CV-00243 (WD, Texas), Sep. 14, 2022, 19 pgs.

Defendant AO Kaspersky Lab's Preliminary Invalidity Contentions—Exhibit 2B, Invalidity Claim Chart Index, *Webroot, Inc. and Open Text, Inc.* v. *AO Kaspersky Lab*, No. 6:22-CV-00243 (WD, Texas), Sep. 14, 2022, 22 pgs.

Defendant AO Kaspersky Lab's Preliminary Invalidity Contentions—Exhibit 6A, *Webroot, Inc. and Open Text, Inc.* v. *AO Kaspersky Lab*, No. 6:22-CV-00243 (WD, Texas), Sep. 14, 2022, 70 pgs.

Defendant AO Kaspersky Lab's Preliminary Invalidity Contentions—Exhibit 6B, *Webroot, Inc. and Open Text, Inc.* v. *AO Kaspersky Lab*, No. 6:22-CV-00243 (WD, Texas), Sep. 14, 2022, 55 pgs.

Defendant AO Kaspersky Lab's Preliminary Invalidity Contentions—Exhibit 6C, *Webroot, Inc. and Open Text, Inc.* v. *AO Kaspersky Lab*, No. 6:22-CV-00243 (WD, Texas), Sep. 14, 2022, 37 pgs.

Defendant AO Kaspersky Lab's Preliminary Invalidity Contentions—Exhibit 7A, *Webroot, Inc. and Open Text, Inc.* v. *AO Kaspersky Lab*, No. 6:22-CV-00243 (WD, Texas), Feb. 21, 2023, 71 pgs.

Defendant AO Kaspersky Lab's Preliminary Invalidity Contentions—Exhibit 7B, *Webroot, Inc. and Open Text, Inc.* v. *AO Kaspersky Lab*, No. 6:22-CV-00243 (WD, Texas), Feb. 21, 2023, 68 pgs.

Defendant Sophos Ltd.'s Preliminary Invalidity Contentions, Exhibit 250-A-1, *Webroot, Inc. and Open Text, Inc.* v. *Sophos Ltd.*, No. 6:22-CV-00240-ADA-DTG (WD, Texas), Sep. 13, 2022, 65 pgs.

Defendant Sophos Ltd.'s Preliminary Invalidity Contentions, Exhibit 250-A-2, *Webroot, Inc. and Open Text, Inc.* v. *Sophos Ltd.*, No. 6:22-CV-00240-ADA-DTG (WD, Texas), Sep. 13, 2022, 44 pgs.

Defendant Sophos Ltd.'s Preliminary Invalidity Contentions, Exhibit 250-A-3, *Webroot, Inc. and Open Text, Inc.* v. *Sophos Ltd.*, No. 6:22-CV-00240-ADA-DTG (WD, Texas), Sep. 13, 2022, 120 pgs.

Defendant Sophos Ltd.'s Preliminary Invalidity Contentions, Exhibit 250-A-4, *Webroot, Inc. and Open Text, Inc.* v. *Sophos Ltd.*, No. 6:22-CV-00240-ADA-DTG (WD, Texas), Sep. 13, 2022, 30 pgs.

Defendant Sophos Ltd.'s Preliminary Invalidity Contentions, Exhibit 250-A-5, *Webroot, Inc. and Open Text, Inc.* v. *Sophos Ltd.*, No. 6:22-CV-00240-ADA-DTG (WD, Texas), Sep. 13, 2022, 112 pgs.

Defendant Sophos Ltd.'s Preliminary Invalidity Contentions, Exhibit 250-A-6, *Webroot, Inc. and Open Text, Inc.* v. *Sophos Ltd.*, No. 6:22-CV-00240-ADA-DTG (WD, Texas), Sep. 13, 2022, 51 pgs.

Defendant Sophos Ltd.'s Preliminary Invalidity Contentions, Exhibit 250-A-7, *Webroot, Inc. and Open Text, Inc.* v. *Sophos Ltd.*, No. 6:22-CV-00240-ADA-DTG (WD, Texas), Sep. 13, 2022, 42 pgs.

Defendant Sophos Ltd.'s Preliminary Invalidity Contentions, Exhibit 250-A-8, *Webroot, Inc. and Open Text, Inc.* v. *Sophos Ltd.*, No. 6:22-CV-00240-ADA-DTG (WD, Texas), Sep. 13, 2022, 71 pgs.

Defendant Sophos Ltd.'s Preliminary Invalidity Contentions, Exhibit 250-A-9, *Webroot, Inc. and Open Text, Inc.* v. *Sophos Ltd.*, No. 6:22-CV-00240-ADA-DTG (WD, Texas), Sep. 13, 2022, 45 pgs.

Defendant Sophos Ltd.'s Preliminary Invalidity Contentions, Exhibit 250-A-10, *Webroot, Inc. and Open Text, Inc.* v. *Sophos Ltd.*, No. 6:22-CV-00240-ADA-DTG (WD, Texas), Sep. 13, 2022, 31 pgs.

Defendant Sophos Ltd.'s Preliminary Invalidity Contentions, Exhibit 250-A-11, *Webroot, Inc. and Open Text, Inc.* v. *Sophos Ltd.*, No. 6:22-CV-00240-ADA-DTG (WD, Texas), Sep. 13, 2022, 77 pgs.

Defendant Sophos Ltd.'s Preliminary Invalidity Contentions, Exhibit 250-A-12, *Webroot, Inc. and Open Text, Inc.* v. *Sophos Ltd.*, No. 6:22-CV-00240-ADA-DTG (WD, Texas), Sep. 13, 2022, 31 pgs.

Defendant Sophos Ltd.'s Preliminary Invalidity Contentions, Exhibit 250-A-13, *Webroot, Inc. and Open Text, Inc.* v. *Sophos Ltd.*, No. 6:22-CV-00240-ADA-DTG (WD, Texas), Sep. 13, 2022, 77 pgs.

Defendant Sophos Ltd.'s Preliminary Invalidity Contentions, Exhibit 250-A-14, *Webroot, Inc. and Open Text, Inc.* v. *Sophos Ltd.*, No. 6:22-CV-00240-ADA-DTG (WD, Texas), Sep. 13, 2022, 41 pgs.

Defendant Sophos Ltd.'s Preliminary Invalidity Contentions, Exhibit 250-A-15, *Webroot, Inc. and Open Text, Inc.* v. *Sophos Ltd.*, No. 6:22-CV-00240-ADA-DTG (WD, Texas), Sep. 13, 2022, 34 pgs.

Defendant Sophos Ltd.'s Preliminary Invalidity Contentions, Exhibit 250-A-16, *Webroot, Inc. and Open Text, Inc.* v. *Sophos Ltd.*, No. 6:22-CV-00240-ADA-DTG (WD, Texas), Sep. 13, 2022, 33 pgs.

Defendant Sophos Ltd.'s Preliminary Invalidity Contentions, Exhibit 250-A-17, *Webroot, Inc. and Open Text, Inc.* v. *Sophos Ltd.*, No. 6:22-CV-00240-ADA-DTG (WD, Texas), Sep. 13, 2022, 37 pgs.

Defendant Sophos Ltd.'s Preliminary Invalidity Contentions, Exhibit 250-B, *Webroot, Inc. and Open Text, Inc.* v. *Sophos Ltd.*, No. 6:22-CV-00240-ADA-DTG (WD, Texas), Sep. 13, 2022, 41 pgs.

Defendant Sophos Ltd.'s Preliminary Invalidity Contentions, Exhibit 389-A-1, *Webroot, Inc. and Open Text, Inc.* v. *Sophos Ltd.*, No. 6:22-CV-00240-ADA-DTG (WD, Texas), Sep. 13, 2022, 52 pgs.

Defendant Sophos Ltd.'s Preliminary Invalidity Contentions, Exhibit 389-A-2, *Webroot, Inc. and Open Text, Inc.* v. *Sophos Ltd.*, No. 6:22-CV-00240-ADA-DTG (WD, Texas), Sep. 13, 2022, 30 pgs.

Defendant Sophos Ltd.'s Preliminary Invalidity Contentions, Exhibit 389-A-3, *Webroot, Inc. and Open Text, Inc.* v. *Sophos Ltd.*, No. 6:22-CV-00240-ADA-DTG (WD, Texas), Sep. 13, 2022, 44 pgs.

Defendant Sophos Ltd.'s Preliminary Invalidity Contentions, Exhibit 389-A-4, *Webroot, Inc. and Open Text, Inc.* v. *Sophos Ltd.*, No. 6:22-CV-00240-ADA-DTG (WD, Texas), Sep. 13, 2022, 40 pgs.

Defendant Sophos Ltd.'s Preliminary Invalidity Contentions, Exhibit 389-A-5, *Webroot, Inc. and Open Text, Inc.* v. *Sophos Ltd.*, No. 6:22-CV-00240-ADA-DTG (WD, Texas), Sep. 13, 2022, 151 pgs.

Defendant Sophos Ltd.'s Preliminary Invalidity Contentions, Exhibit 389-A-6, *Webroot, Inc. and Open Text, Inc.* v. *Sophos Ltd.*, No. 6:22-CV-00240-ADA-DTG (WD, Texas), Sep. 13, 2022, 23 pgs.

Defendant Sophos Ltd.'s Preliminary Invalidity Contentions, Exhibit 389-A-7, *Webroot, Inc. and Open Text, Inc.* v. *Sophos Ltd.*, No. 6:22-CV-00240-ADA-DTG (WD, Texas), Sep. 13, 2022, 152 pgs.

Defendant Sophos Ltd.'s Preliminary Invalidity Contentions, Exhibit 389-A-8, *Webroot, Inc. and Open Text, Inc.* v. *Sophos Ltd.*, No. 6:22-CV-00240-ADA-DTG (WD, Texas), Sep. 13, 2022, 45 pgs.

Defendant Sophos Ltd.'s Preliminary Invalidity Contentions, Exhibit 389-A-9, *Webroot, Inc. and Open Text, Inc.* v. *Sophos Ltd.*, No. 6:22-CV-00240-ADA-DTG (WD, Texas), Sep. 13, 2022, 38 pgs.

Defendant Sophos Ltd.'s Preliminary Invalidity Contentions, Exhibit 389-A-10, *Webroot, Inc. and Open Text, Inc.* v. *Sophos Ltd.*, No. 6:22-CV-00240-ADA-DTG (WD, Texas), Sep. 13, 2022, 76 pgs.

Defendant Sophos Ltd.'s Preliminary Invalidity Contentions, Exhibit 389-A-11, *Webroot, Inc. and Open Text, Inc.* v. *Sophos Ltd.*, No. 6:22-CV-00240-ADA-DTG (WD, Texas), Sep. 13, 2022, 42 pgs.

Defendant Sophos Ltd.'s Preliminary Invalidity Contentions, Exhibit 389-A-12, *Webroot, Inc. and Open Text, Inc.* v. *Sophos Ltd.*, No. 6:22-CV-00240-ADA-DTG (WD, Texas), Sep. 13, 2022, 29 pgs.

Defendant Sophos Ltd.'s Preliminary Invalidity Contentions, Exhibit 389-A-13, *Webroot, Inc. and Open Text, Inc.* v. *Sophos Ltd.*, No. 6:22-CV-00240-ADA-DTG (WD, Texas), Sep. 13, 2022, 93 pgs.

Defendant Sophos Ltd.'s Preliminary Invalidity Contentions, Exhibit 389-A-14, *Webroot, Inc. and Open Text, Inc.* v. *Sophos Ltd.*, No. 6:22-CV-00240-ADA-DTG (WD, Texas), Sep. 13, 2022, 25 pgs.

Defendant Sophos Ltd.'s Preliminary Invalidity Contentions, Exhibit 389-A-15, *Webroot, Inc. and Open Text, Inc.* v. *Sophos Ltd.*, No. 6:22-CV-00240-ADA-DTG (WD, Texas), Sep. 13, 2022, 98 pgs.

Defendant Sophos Ltd.'s Preliminary Invalidity Contentions, Exhibit 389-A-16, *Webroot, Inc. and Open Text, Inc.* v. *Sophos Ltd.*, No. 6:22-CV-00240-ADA-DTG (WD, Texas), Sep. 13, 2022.

Defendant Sophos Ltd.'s Preliminary Invalidity Contentions, Exhibit 389-A-17, *Webroot, Inc. and Open Text, Inc.* v. *Sophos Ltd.*, No. 6:22-CV-00240-ADA-DTG (WD, Texas), Sep. 13, 2022, 52 pgs.

Defendant Sophos Ltd.'s Preliminary Invalidity Contentions, Exhibit 389-A-18, *Webroot, Inc. and Open Text, Inc.* v. *Sophos Ltd.*, No. 6:22-CV-00240-ADA-DTG (WD, Texas), Sep. 13, 2022, 57 pgs.

(56) References Cited

OTHER PUBLICATIONS

Defendant Sophos Ltd.'s Preliminary Invalidity Contentions, Exhibit 389-A-19, *Webroot, Inc. and Open Text, Inc. v. Sophos Ltd.*, No. 6:22-CV-00240-ADA-DTG (WD, Texas), Sep. 13, 2022, 79 pgs.

Defendant Sophos Ltd.'s Preliminary Invalidity Contentions, Exhibit 389-A-20, *Webroot, Inc. and Open Text, Inc. v. Sophos Ltd.*, No. 6:22-CV-00240-ADA-DTG (WD, Texas), Sep. 13, 2022, 36 pgs.

Defendant Sophos Ltd.'s Preliminary Invalidity Contentions, Exhibit 389-B, *Webroot, Inc. and Open Text, Inc. v. Sophos Ltd.*, No. 6:22-CV-00240-ADA-DTG (WD, Texas), Sep. 13, 2022, 21 pgs.

Defendant Sophos Ltd.'s Preliminary Invalidity Contentions, Exhibit 721-A-1, *Webroot, Inc. and Open Text, Inc. v. Sophos Ltd.*, No. 6:22-CV-00240-ADA-DTG (WD, Texas), Sep. 13, 2022, 14 pgs.

Defendant Sophos Ltd.'s Preliminary Invalidity Contentions, Exhibit 721-A-2, *Webroot, Inc. and Open Text, Inc. v. Sophos Ltd.*, No. 6:22-CV-00240-ADA-DTG (WD, Texas), Sep. 13, 2022, 14 pgs.

Defendant Sophos Ltd.'s Preliminary Invalidity Contentions, Exhibit 721-A-3, *Webroot, Inc. and Open Text, Inc. v. Sophos Ltd.*, No. 6:22-CV-00240-ADA-DTG (WD, Texas), Sep. 13, 2022, 31 pgs.

Defendant Sophos Ltd.'s Preliminary Invalidity Contentions, Exhibit 721-A-4, *Webroot, Inc. and Open Text, Inc. v. Sophos Ltd.*, No. 6:22-CV-00240-ADA-DTG (WD, Texas), Sep. 13, 2022, 50 pgs.

Defendant Sophos Ltd.'s Preliminary Invalidity Contentions, Exhibit 721-A-5, *Webroot, Inc. and Open Text, Inc. v. Sophos Ltd.*, No. 6:22-CV-00240-ADA-DTG (WD, Texas), Sep. 13, 2022, 39 pgs.

Defendant Sophos Ltd.'s Preliminary Invalidity Contentions, Exhibit 721-A-6, *Webroot, Inc. and Open Text, Inc. v. Sophos Ltd.*, No. 6:22-CV-00240-ADA-DTG (WD, Texas), Sep. 13, 2022, 17 pgs.

Defendant Sophos Ltd.'s Preliminary Invalidity Contentions, Exhibit 721-A-7, *Webroot, Inc. and Open Text, Inc. v. Sophos Ltd.*, No. 6:22-CV-00240-ADA-DTG (WD, Texas), Sep. 13, 2022, 33 pgs.

Defendant Sophos Ltd.'s Preliminary Invalidity Contentions, Exhibit 721-A-8, *Webroot, Inc. and Open Text, Inc. v. Sophos Ltd.*, No. 6:22-CV-00240-ADA-DTG (WD, Texas), Sep. 13, 2022, 40 pgs.

Defendant Sophos Ltd.'s Preliminary Invalidity Contentions, Exhibit 721-A-9, *Webroot, Inc. and Open Text, Inc. v. Sophos Ltd.*, No. 6:22-CV-00240-ADA-DTG (WD, Texas), Sep. 13, 2022, 29 pgs.

Defendant Sophos Ltd.'s Preliminary Invalidity Contentions, Exhibit 721-A-10, *Webroot, Inc. and Open Text, Inc. v. Sophos Ltd.*, No. 6:22-CV-00240-ADA-DTG (WD, Texas), Sep. 13, 2022, 114 pgs.

Defendant Sophos Ltd.'s Preliminary Invalidity Contentions, Exhibit 721-A-11, *Webroot, Inc. and Open Text, Inc. v. Sophos Ltd.*, No. 6:22-CV-00240-ADA-DTG (WD, Texas), Sep. 13, 2022, 24 pgs.

Defendant Sophos Ltd.'s Preliminary Invalidity Contentions, Exhibit 721-A-12, *Webroot, Inc. and Open Text, Inc. v. Sophos Ltd.*, No. 6:22-CV-00240-ADA-DTG (WD, Texas), Sep. 13, 2022, 37 pgs.

Defendant Sophos Ltd.'s Preliminary Invalidity Contentions, Exhibit 721-A-13, *Webroot, Inc. and Open Text, Inc. v. Sophos Ltd.*, No. 6:22-CV-00240-ADA-DTG (WD, Texas), Sep. 13, 2022, 34 pgs.

Defendant Sophos Ltd.'s Preliminary Invalidity Contentions, Exhibit 721-A-14, *Webroot, Inc. and Open Text, Inc. v. Sophos Ltd.*, No. 6:22-CV-00240-ADA-DTG (WD, Texas), Sep. 13, 2022, 44 pgs.

Defendant Sophos Ltd.'s Preliminary Invalidity Contentions, Exhibit 721-A-15, *Webroot, Inc. and Open Text, Inc. v. Sophos Ltd.*, No. 6:22-CV-00240-ADA-DTG (WD, Texas), Sep. 13, 2022, 28 pgs.

Defendant Sophos Ltd.'s Preliminary Invalidity Contentions, Exhibit 721-A-16, *Webroot, Inc. and Open Text, Inc. v. Sophos Ltd.*, No. 6:22-CV-00240-ADA-DTG (WD, Texas), Sep. 13, 2022, 92 pgs.

Defendant Sophos Ltd.'s Preliminary Invalidity Contentions, Exhibit 721-A-17, *Webroot, Inc. and Open Text, Inc. v. Sophos Ltd.*, No. 6:22-CV-00240-ADA-DTG (WD, Texas), Sep. 13, 2022, 19 pgs.

Defendant Sophos Ltd.'s Preliminary Invalidity Contentions, Exhibit 721-A-18, *Webroot, Inc. and Open Text, Inc. v. Sophos Ltd.*, No. 6:22-CV-00240-ADA-DTG (WD, Texas), Sep. 13, 2022, 19 pgs.

Defendant Sophos Ltd.'s Preliminary Invalidity Contentions, Exhibit 721-A-19, *Webroot, Inc. and Open Text, Inc. v. Sophos Ltd.*, No. 6:22-CV-00240-ADA-DTG (WD, Texas), Sep. 13, 2022, 41 pgs.

Defendant Sophos Ltd.'s Preliminary Invalidity Contentions, Exhibit 721-A-20, *Webroot, Inc. and Open Text, Inc. v. Sophos Ltd.*, No. 6:22-CV-00240-ADA-DTG (WD, Texas), Sep. 13, 2022, 85 pgs.

Defendant Sophos Ltd.'s Preliminary Invalidity Contentions, Exhibit 721-A-21, *Webroot, Inc. and Open Text, Inc. v. Sophos Ltd.*, No. 6:22-CV-00240-ADA-DTG (WD, Texas), Sep. 13, 2022, 27 pgs.

Defendant Sophos Ltd.'s Preliminary Invalidity Contentions, Exhibit 721-A-22, *Webroot, Inc. and Open Text, Inc. v. Sophos Ltd.*, No. 6:22-CV-00240-ADA-DTG (WD, Texas), Sep. 13, 2022, 31 pgs.

Defendant Sophos Ltd.'s Preliminary Invalidity Contentions, Exhibit 721-B, *Webroot, Inc. and Open Text, Inc. v. Sophos Ltd.*, No. 6:22-CV-00240-ADA-DTG (WD, Texas), Sep. 13, 2022, 23 pgs.

Defendant Sophos Ltd.'s Preliminary Invalidity Contentions, Exhibit 844-A-1, *Webroot, Inc. and Open Text, Inc. v. Sophos Ltd.*, CA. No. 6:22-CV-00240-ADA-DTG, W.D. Tex., Sep. 13, 2022, 30 pgs.

Defendant Sophos Ltd.'s Preliminary Invalidity Contentions, Exhibit 844-A-2, *Webroot, Inc. and Open Text, Inc. v. Sophos Ltd.*, CA. No. 6:22-CV-00240-ADA-DTG, W.D. Tex., Sep. 13, 2022, 31 pgs.

Defendant Sophos Ltd.'s Preliminary Invalidity Contentions, Exhibit 844-A-3, *Webroot, Inc. and Open Text, Inc. v. Sophos Ltd.*, CA. No. 6:22-CV-00240-ADA-DTG, W.D. Tex., Sep. 13, 2022, 39 pgs.

Defendant Sophos Ltd.'s Preliminary Invalidity Contentions, Exhibit 844-A-4, *Webroot, Inc. and Open Text, Inc. v. Sophos Ltd.*, CA. No. 6:22-CV-00240-ADA-DTG, W.D. Tex., Sep. 13, 2022, 30 pgs.

Defendant Sophos Ltd.'s Preliminary Invalidity Contentions, Exhibit 844-A-5, *Webroot, Inc. and Open Text, Inc. v. Sophos Ltd.*, CA. No. 6:22-CV-00240-ADA-DTG, W.D. Tex., Sep. 13, 2022, 27 pgs.

Defendant Sophos Ltd.'s Preliminary Invalidity Contentions, Exhibit 844-A-6, *Webroot, Inc. and Open Text, Inc. v. Sophos Ltd.*, CA. No. 6:22-CV-00240-ADA-DTG, W.D. Tex., Sep. 13, 2022, 48 pgs.

Defendant Sophos Ltd.'s Preliminary Invalidity Contentions, Exhibit 844-A-7, *Webroot, Inc. and Open Text, Inc. v. Sophos Ltd.*, CA. No. 6:22-CV-00240-ADA-DTG, W.D. Tex., Sep. 13, 2022, 25 pgs.

Defendant Sophos Ltd.'s Preliminary Invalidity Contentions, Exhibit 844-A-8, *Webroot, Inc. and Open Text, Inc. v. Sophos Ltd.*, CA. No. 6:22-CV-00240-ADA-DTG, W.D. Tex., Sep. 13, 2022, 33 pgs.

Defendant Sophos Ltd.'s Preliminary Invalidity Contentions, Exhibit 844-A-9, *Webroot, Inc. and Open Text, Inc. v. Sophos Ltd.*, CA. No. 6:22-CV-00240-ADA-DTG, W.D. Tex., Sep. 13, 2022, 27 pgs.

Defendant Sophos Ltd.'s Preliminary Invalidity Contentions, Exhibit 844-A-10, *Webroot, Inc. and Open Text, Inc. v. Sophos Ltd.*, CA. No. 6:22-CV-00240-ADA-DTG, W.D. Tex., Sep. 13, 2022, 25 pgs.

Defendant Sophos Ltd.'s Preliminary Invalidity Contentions, Exhibit 844-A-11, *Webroot, Inc. and Open Text, Inc. v. Sophos Ltd.*, CA. No. 6:22-CV-00240-ADA-DTG, W.D. Tex., Sep. 13, 2022, 29 pgs.

Defendant Sophos Ltd.'s Preliminary Invalidity Contentions, Exhibit 844-A-12, *Webroot, Inc. and Open Text, Inc. v. Sophos Ltd.*, CA. No. 6:22-CV-00240-ADA-DTG, W.D. Tex., Sep. 13, 2022, 27 pgs.

Defendant Sophos Ltd.'s Preliminary Invalidity Contentions, Exhibit 844-A-13, *Webroot, Inc. and Open Text, Inc. v. Sophos Ltd.*, CA. No. 6:22-CV-00240-ADA-DTG, W.D. Tex., Sep. 13, 2022, 34 pgs.

Defendant Sophos Ltd.'s Preliminary Invalidity Contentions, Exhibit 844-A-14, *Webroot, Inc. and Open Text, Inc. v. Sophos Ltd.*, CA. No. 6:22-CV-00240-ADA-DTG, W.D. Tex., Sep. 13, 2022, 30 pgs.

Defendant Sophos Ltd.'s Preliminary Invalidity Contentions, Exhibit 844-A-15, *Webroot, Inc. and Open Text, Inc. v. Sophos Ltd.*, CA. No. 6:22-CV-00240-ADA-DTG, W.D. Tex., Sep. 13, 2022, 42 pgs.

Defendant Sophos Ltd.'s Preliminary Invalidity Contentions, Exhibit 844-A-16, *Webroot, Inc. and Open Text, Inc. v. Sophos Ltd.*, CA. No. 6:22-CV-00240-ADA-DTG, W.D. Tex., Sep. 13, 2022, 31 pgs.

Defendant Sophos Ltd.'s Preliminary Invalidity Contentions, Exhibit 844-A-17, *Webroot, Inc. and Open Text, Inc. v. Sophos Ltd.*, CA. No. 6:22-CV-00240-ADA-DTG, W.D. Tex., Sep. 13, 2022, 38 pgs.

Defendant Sophos Ltd.'s Preliminary Invalidity Contentions, Exhibit 844-A-18, *Webroot, Inc. and Open Text, Inc. v. Sophos Ltd.*, CA. No. 6:22-CV-00240-ADA-DTG, W.D. Tex., Sep. 13, 2022, 27 pgs.

Defendant Sophos Ltd.'s Preliminary Invalidity Contentions, Exhibit 844-A-19, *Webroot, Inc. and Open Text, Inc. v. Sophos Ltd.*, CA. No. 6:22-CV-00240-ADA-DTG, W.D. Tex., Sep. 13, 2022, 35 pgs.

Defendant Sophos Ltd.'s Preliminary Invalidity Contentions, Exhibit 844-A-20, *Webroot, Inc. and Open Text, Inc. v. Sophos Ltd.*, CA. No. 6:22-CV-00240-ADA-DTG, W.D. Tex., Sep. 13, 2022, 43 pgs.

Defendant Sophos Ltd.'s Preliminary Invalidity Contentions, Exhibit 844-A-21, *Webroot, Inc. and Open Text, Inc. v. Sophos Ltd.*, CA. No. 6:22-CV-00240-ADA-DTG, W.D. Tex., Sep. 13, 2022, 42 pgs.

(56) References Cited

OTHER PUBLICATIONS

Defendant Sophos Ltd.'s Preliminary Invalidity Contentions, Exhibit 844-A-22, *Webroot, Inc. and Open Text, Inc.* v. *Sophos Ltd.*, CA. No. 6:22-CV-00240-ADA-DTG, W.D. Tex., Sep. 13, 2022, 30 pgs.
Defendant Sophos Ltd.'s Preliminary Invalidity Contentions, Exhibit 844-A-23, *Webroot, Inc. and Open Text, Inc.* v. *Sophos Ltd.*, CA. No. 6:22-CV-00240-ADA-DTG, W.D. Tex., Sep. 13, 2022, 48 pgs.
Defendant Sophos Ltd.'s Preliminary Invalidity Contentions, Exhibit 844-A-24, *Webroot, Inc. and Open Text, Inc.* v. *Sophos Ltd.*, CA. No. 6:22-CV-00240-ADA-DTG, W.D. Tex., Sep. 13, 2022, 36 pgs.
Defendant Sophos Ltd.'s Preliminary Invalidity Contentions, Exhibit 844-A-25, *Webroot, Inc. and Open Text, Inc.* v. *Sophos Ltd.*, CA. No. 6:22-CV-00240-ADA-DTG, W.D. Tex., Sep. 13, 2022, 26 pgs.
Defendant Sophos Ltd.'s Preliminary Invalidity Contentions, Exhibit 844-A-26, *Webroot, Inc. and Open Text, Inc.* v. *Sophos Ltd.*, CA. No. 6:22-CV-00240-ADA-DTG, W.D. Tex., Sep. 13, 2022, 26 pgs.
Defendant Sophos Ltd.'s Preliminary Invalidity Contentions, Exhibit 844-A-27, *Webroot, Inc. and Open Text, Inc.* v. *Sophos Ltd.*, CA. No. 6:22-CV-00240-ADA-DTG, W.D. Tex., Sep. 13, 2022, 30 pgs.
Defendant Sophos Ltd.'s Preliminary Invalidity Contentions, Exhibit 844-A-28, *Webroot, Inc. and Open Text, Inc.* v. *Sophos Ltd.*, CA. No. 6:22-CV-00240-ADA-DTG, W.D. Tex., Sep. 13, 2022, 37 pgs.
Defendant Sophos Ltd.'s Preliminary Invalidity Contentions, Exhibit 844-A-29, *Webroot, Inc. and Open Text, Inc.* v. *Sophos Ltd.*, CA. No. 6:22-CV-00240-ADA-DTG, W.D. Tex., Sep. 13, 2022, 26 pgs.
Defendant Sophos Ltd.'s Preliminary Invalidity Contentions, Exhibit 844-A-30, *Webroot, Inc. and Open Text, Inc.* v. *Sophos Ltd.*, CA. No. 6:22-CV-00240-ADA-DTG, W.D. Tex., Sep. 13, 2022, 42 pgs.
Defendant Sophos Ltd.'s Preliminary Invalidity Contentions, Exhibit 844-A-31, *Webroot, Inc. and Open Text, Inc.* v. *Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 844-A-32, *Webroot, Inc. and Open Text, Inc.* v. *Sophos Ltd.*, CA. No. 6:22-CV-00240-ADA-DTG, W.D. Tex., Sep. 13, 2022, 25 pgs.
Defendant Sophos Ltd.'s Preliminary Invalidity Contentions, Exhibit 844-A-33, *Webroot, Inc. and Open Text, Inc.* v. *Sophos Ltd.*, CA. No. 6:22-CV-00240-ADA-DTG, W.D. Tex., Sep. 13, 2022, 29 pgs.
Defendant Sophos Ltd.'s Preliminary Invalidity Contentions, Exhibit 844-B, *Webroot, Inc. and Open Text, Inc.* v. *Sophos Ltd.*, CA. No. 6:22-CV-00240-ADA-DTG, W.D. Tex., Sep. 13, 2022, 36 pgs.
Defendant Sophos Ltd.'s Preliminary Invalidity Contentions, Exhibit 123-A-1, *Webroot, Inc. and Open Text, Inc.* v. *Sophos Ltd.*, CA. No. 6:22-CV-00240-ADA-DTG, W.D. Tex., Feb. 21, 2023, 48 pgs.
Defendant Sophos Ltd.'s Preliminary Invalidity Contentions, Exhibit 123-A-2, *Webroot, Inc. and Open Text, Inc.* v. *Sophos Ltd.*, CA. No. 6:22-CV-00240-ADA-DTG, W.D. Tex., Feb. 21, 2023, 57 pgs.
Defendant Sophos Ltd.'s Preliminary Invalidity Contentions, Exhibit 123-A-3, *Webroot, Inc. and Open Text, Inc.* v. *Sophos Ltd.*, CA. No. 6:22-CV-00240-ADA-DTG, W.D. Tex., Feb. 21, 2023, 83 pgs.
Defendant Sophos Ltd.'s Preliminary Invalidity Contentions, Exhibit 123-A-4, *Webroot, Inc. and Open Text, Inc.* v. *Sophos Ltd.*, CA. No. 6:22-CV-00240-ADA-DTG, W.D. Tex., Feb. 21, 2023, 45 pgs.
Defendant Sophos Ltd.'s Preliminary Invalidity Contentions, Exhibit 123-A-5, *Webroot, Inc. and Open Text, Inc.* v. *Sophos Ltd.*, CA. No. 6:22-CV-00240-ADA-DTG, W.D. Tex., Feb. 21, 2023, 57 pgs.
Defendant Sophos Ltd.'s Preliminary Invalidity Contentions, Exhibit 123-A-6, *Webroot, Inc. and Open Text, Inc.* v. *Sophos Ltd.*, CA. No. 6:22-CV-00240-ADA-DTG, W.D. Tex., Feb. 21, 2023, 41 pgs.
Defendant Sophos Ltd.'s Preliminary Invalidity Contentions, Exhibit 123-A-7, *Webroot, Inc. and Open Text, Inc.* v. *Sophos Ltd.*, CA. No. 6:22-CV-00240-ADA-DTG, W.D. Tex., Feb. 21, 2023, 51 pgs.
Defendant Sophos Ltd.'s Preliminary Invalidity Contentions, Exhibit 123-B, *Webroot, Inc. and Open Text, Inc.* v. *Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 869-A-1, *Webroot, Inc. and Open Text, Inc.* v. *Sophos Ltd.*, CA. No. 6:22-CV-00240-ADA-DTG, W.D. Tex., Feb. 21, 2023, 49 pgs.
Defendant Sophos Ltd.'s Preliminary Invalidity Contentions, Exhibit 869-A-2, *Webroot, Inc. and Open Text, Inc.* v. *Sophos Ltd.*, CA. No. 6:22-CV-00240-ADA-DTG, W.D. Tex., Feb. 21, 2023, 37 pgs.
Defendant Sophos Ltd.'s Preliminary Invalidity Contentions, Exhibit 869-A-3, *Webroot, Inc. and Open Text, Inc.* v. *Sophos Ltd.*, CA. No. 6:22-CV-00240-ADA-DTG, W.D. Tex., Feb. 21, 2023, 29 pgs.
Defendant Sophos Ltd.'s Preliminary Invalidity Contentions, Exhibit 869-A-4, *Webroot, Inc. and Open Text, Inc.* v. *Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 869-A-5, *Webroot, Inc. and Open Text, Inc.* v. *Sophos Ltd.*, CA. No. 6:22-CV-00240-ADA-DTG, W.D. Tex., Feb. 21, 2023, 29 pgs.
Defendant Sophos Ltd.'s Preliminary Invalidity Contentions, Exhibit 869-A-6, *Webroot, Inc. and Open Text, Inc.* v. *Sophos Ltd.*, CA. No. 6:22-CV-00240-ADA-DTG, W.D. Tex., Feb. 21, 2023, 30 pgs.
Defendant Sophos Ltd.'s Preliminary Invalidity Contentions, Exhibit 869-A-7, *Webroot, Inc. and Open Text, Inc.* v. *Sophos Ltd.*, CA. No. 6:22-CV-00240-ADA-DTG, W.D. Tex., Feb. 21, 2023, 29 pgs.
Defendant Sophos Ltd.'s Preliminary Invalidity Contentions, Exhibit 869-A-8, *Webroot, Inc. and Open Text, Inc.* v. *Sophos Ltd.*, CA. No. 6:22-CV-00240-ADA-DTG, W.D. Tex., Feb. 21, 2023, 27 pgs.
Defendant Sophos Ltd.'s Preliminary Invalidity Contentions, Exhibit 869-A-9, *Webroot, Inc. and Open Text, Inc.* v. *Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 869-A-10, *Webroot, Inc. and Open Text, Inc.* v. *Sophos Ltd.*, CA. No. 6:22-CV-00240-ADA-DTG, W.D. Tex., Feb. 21, 2023, 53 pgs.
Defendant Sophos Ltd.'s Preliminary Invalidity Contentions, Exhibit 869-A-11, *Webroot, Inc. and Open Text, Inc.* v. *Sophos Ltd.*, CA. No. 6:22-CV-00240-ADA-DTG, W.D. Tex., Feb. 21, 2023, 34 pgs.
Defendant Sophos Ltd.'s Preliminary Invalidity Contentions, Exhibit 869-A-12, *Webroot, Inc. and Open Text, Inc.* v. *Sophos Ltd.*, CA. No. 6:22-CV-00240-ADA-DTG, W.D. Tex., Feb. 21, 2023, 32 pgs.
Defendant Sophos Ltd.'s Preliminary Invalidity Contentions, Exhibit 869-A-13, *Webroot, Inc. and Open Text, Inc.* v. *Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 869-A-14, *Webroot, Inc. and Open Text, Inc.* v. *Sophos Ltd.*, CA. No. 6:22-CV-00240-ADA-DTG, W.D. Tex., Feb. 21, 2023, 63 pgs.
Defendant Sophos Ltd.'s Preliminary Invalidity Contentions, Exhibit 869-A-15, *Webroot, Inc. and Open Text, Inc.* v. *Sophos Ltd.*, CA. No. 6:22-CV-00240-ADA-DTG, W.D. Tex., Feb. 21, 2023, 75 pgs.
Defendant Sophos Ltd.'s Preliminary Invalidity Contentions, Exhibit 869-A-16, *Webroot, Inc. and Open Text, Inc.* v. *Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 869-A-17, *Webroot, Inc. and Open Text, Inc.* v. *Sophos Ltd.*, CA. No. 6:22-CV-00240-ADA-DTG, W.D. Tex., Feb. 21, 2023, 54 pgs.
Defendant Sophos Ltd.'s Preliminary Invalidity Contentions, Exhibit 869-A-18, *Webroot, Inc. and Open Text, Inc.* v. *Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 869-A-19, *Webroot, Inc. and Open Text, Inc.* v. *Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 869-A-20, *Webroot, Inc. and Open Text, Inc.* v. *Sophos Ltd.*, CA. No. 6:22-CV-00240-ADA-DTG, W.D. Tex., Feb. 21, 2023, 44 pgs.
Defendant Sophos Ltd.'s Preliminary Invalidity Contentions, Exhibit 869-A-21, *Webroot, Inc. and Open Text, Inc.* v. *Sophos Ltd.*, CA. No. 6:22-CV-00240-ADA-DTG, W.D. Tex., Feb. 21, 2023, 34 pgs.
Defendant Sophos Ltd.'s Preliminary Invalidity Contentions, Exhibit 869-A-22, *Webroot, Inc. and Open Text, Inc.* v. *Sophos Ltd.*, CA. No. 6:22-CV-00240-ADA-DTG, W.D. Tex., Feb. 21, 2023, 65 pgs.
Defendant Sophos Ltd.'s Preliminary Invalidity Contentions, Exhibit 869-A-23, *Webroot, Inc. and Open Text, Inc.* v. *Sophos Ltd.*, CA. No. 6:22-CV-00240-ADA-DTG, W.D. Tex., Feb. 21, 2023, 45 pgs.
Defendant Sophos Ltd.'s Preliminary Invalidity Contentions, Exhibit 869-A-24, *Webroot, Inc. and Open Text, Inc.* v. *Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 869-A-25, *Webroot, Inc. and Open Text, Inc.* v. *Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 869-A-26, *Webroot, Inc. and Open Text, Inc.* v. *Sophos Ltd.*, CA. No. 6:22-CV-00240-ADA-DTG, W.D. Tex., Feb. 21, 2023, 40 pgs.

(56) References Cited

OTHER PUBLICATIONS

Defendant Sophos Ltd.'s Preliminary Invalidity Contentions, Exhibit 869-A-27, *Webroot, Inc. and Open Text, Inc. v. Sophos Ltd.*, CA. No. 6:22-CV-00240-ADA-DTG, W.D. Tex., Feb. 21, 2023, 39 pgs.

Defendant Sophos Ltd.'s Preliminary Invalidity Contentions, Exhibit 869-A-28, *Webroot, Inc. and Open Text, Inc. v. Sophos Ltd.*, CA. No. 6:22-CV-00240-ADA-DTG, W.D. Tex., Feb. 21, 2023, 33 pgs.

Defendant Sophos Ltd.'s Preliminary Invalidity Contentions, Exhibit 869-A-29, *Webroot, Inc. and Open Text, Inc. v. Sophos Ltd.*, CA. No. 6:22-CV-00240-ADA-DTG, W.D. Tex., Feb. 21, 2023, 43 pgs.

Defendant Sophos Ltd.'s Preliminary Invalidity Contentions, Exhibit 869-A-30, *Webroot, Inc. and Open Text, Inc. v. Sophos Ltd.*, CA. No. 6:22-CV-00240-ADA-DTG, W.D. Tex., Feb. 21, 2023, 48 pgs.

Defendant Sophos Ltd.'s Preliminary Invalidity Contentions, Exhibit 869-A-31, *Webroot, Inc. and Open Text, Inc. v. Sophos Ltd.*, CA. No. 6:22-CV-00240-ADA-DTG, W.D. Tex., Feb. 21, 2023, 37 pgs.

Defendant Sophos Ltd.'s Preliminary Invalidity Contentions, Exhibit 869-A-32, *Webroot, Inc. and Open Text, Inc. v. Sophos Ltd.*, CA. No. 6:22-CV-00240-ADA-DTG, W.D. Tex., Feb. 21, 2023, 31 pgs.

Defendant Sophos Ltd.'s Preliminary Invalidity Contentions, Exhibit 869-A-33, *Webroot, Inc. and Open Text, Inc. v. Sophos Ltd.*, CA. No. 6:22-CV-00240-ADA-DTG, W.D. Tex., Feb. 21, 2023, 35 pgs.

Defendant Sophos Ltd.'s Preliminary Invalidity Contentions, Exhibit 869-A-34, *Webroot, Inc. and Open Text, Inc. v. Sophos Ltd.*, CA. No. 6:22-CV-00240-ADA-DTG, W.D. Tex., Feb. 21, 2023, 58 pgs.

Defendant Sophos Ltd.'s Preliminary Invalidity Contentions, Exhibit 869-A-35, *Webroot, Inc. and Open Text, Inc. v. Sophos Ltd.*, CA. No. 6:22-CV-00240-ADA-DTG, W.D. Tex., Feb. 21, 2023, 36 pgs.

Defendant Sophos Ltd.'s Preliminary Invalidity Contentions, Exhibit 869-A-36, *Webroot, Inc. and Open Text, Inc. v. Sophos Ltd.*, CA. No. 6:22-CV-00240-ADA-DTG, W.D. Tex., Feb. 21, 2023, 37 pgs.

Defendant Sophos Ltd.'s Preliminary Invalidity Contentions, Exhibit 869-B, *Webroot, Inc. and Open Text, Inc. v. Sophos Ltd.*, CA. No. 6:22-CV-00240-ADA-DTG, W.D. Tex., Feb. 21, 2023, 75 pgs.

Defendant's Preliminary Invalidity Contentions Exhibit 250-A-1, *Webroot, Inc. and Open Text, Inc. v. Trend Micro Inc.*, No. 6:22-CV-00239-ADA-DTG (WD, Texas), Sep. 13, 2022, 89 pgs.

Defendant's Preliminary Invalidity Contentions Exhibit 250-A-2, *Webroot, Inc. and Open Text, Inc. v. Trend Micro Inc.*, No. 6:22-CV-00239-ADA-DTG (WD, Texas), Sep. 13, 2022, 64 pgs.

Defendant's Preliminary Invalidity Contentions Exhibit 250-A-3, *Webroot, Inc. and Open Text, Inc. v. Trend Micro Inc.*, No. 6:22-CV-00239-ADA-DTG (WD, Texas), Sep. 13, 2022, 104 pgs.

Defendant's Preliminary Invalidity Contentions Exhibit 250-A-4, *Webroot, Inc. and Open Text, Inc. v. Trend Micro Inc.*, No. 6:22-CV-00239-ADA-DTG (WD, Texas), Sep. 13, 2022, 54 pgs.

Defendant's Preliminary Invalidity Contentions Exhibit 250-A-5, *Webroot, Inc. and Open Text, Inc. v. Trend Micro Inc.*, No. 6:22-CV-00239-ADA-DTG (WD, Texas), Sep. 13, 2022, 45 pgs.

Defendant's Preliminary Invalidity Contentions Exhibit 250-A-6, *Webroot, Inc. and Open Text, Inc. v. Trend Micro Inc.*, No. 6:22-CV-00239-ADA-DTG (WD, Texas), Sep. 13, 2022, 36 pgs.

Defendant's Preliminary Invalidity Contentions Exhibit 250-A-7, *Webroot, Inc. and Open Text, Inc. v. Trend Micro Inc.*, No. 6:22-CV-00239-ADA-DTG (WD, Texas), Sep. 13, 2022, 42 pgs.

Defendant's Preliminary Invalidity Contentions Exhibit 250-A-8, *Webroot, Inc. and Open Text, Inc. v. Trend Micro Inc.*, No. 6:22-CV-00239-ADA-DTG (WD, Texas), Sep. 13, 2022, 105 pgs.

Defendant's Preliminary Invalidity Contentions Exhibit 250-A-9, *Webroot, Inc. and Open Text, Inc. v. Trend Micro Inc.*, No. 6:22-CV-00239-ADA-DTG (WD, Texas), Sep. 13, 2022, 44 pgs.

Defendant's Preliminary Invalidity Contentions Exhibit 250-A-10, *Webroot, Inc. and Open Text, Inc. v. Trend Micro Inc.*, No. 6:22-CV-00239-ADA-DTG (WD, Texas), Sep. 13, 2022, 46 pgs.

Defendant's Preliminary Invalidity Contentions Exhibit 250-A-11, *Webroot, Inc. and Open Text, Inc. v. Trend Micro Inc.*, No. 6:22-CV-00239-ADA-DTG (WD, Texas), Sep. 13, 2022, 45 pgs.

Defendant's Preliminary Invalidity Contentions Exhibit 250-A-12, *Webroot, Inc. and Open Text, Inc. v. Trend Micro Inc.*, No. 6:22-CV-00239-ADA-DTG (WD, Texas), Sep. 13, 2022, 166 pgs.

Defendant's Preliminary Invalidity Contentions Exhibit 250-A-13, *Webroot, Inc. and Open Text, Inc. v. Trend Micro Inc.*, No. 6:22-CV-00239-ADA-DTG (WD, Texas), Sep. 13, 2022, 169 pgs.

Defendant's Preliminary Invalidity Contentions Exhibit 250-A-14, *Webroot, Inc. and Open Text, Inc. v. Trend Micro Inc.*, No. 6:22-CV-00239-ADA-DTG (WD, Texas), Sep. 13, 2022, 51 pgs.

Defendant's Preliminary Invalidity Contentions Exhibit 250-A-15, *Webroot, Inc. and Open Text, Inc. v. Trend Micro Inc.*, No. 6:22-CV-00239-ADA-DTG (WD, Texas), Sep. 13, 2022, 44 pgs.

Defendant's Preliminary Invalidity Contentions Exhibit 250-A-16, *Webroot, Inc. and Open Text, Inc. v. Trend Micro Inc.*, No. 6:22-CV-00239-ADA-DTG (WD, Texas), Sep. 13, 2022, 34 pgs.

Defendant's Preliminary Invalidity Contentions Exhibit 250-A-17, *Webroot, Inc. and Open Text, Inc. v. Trend Micro Inc.*, No. 6:22-CV-00239-ADA-DTG (WD, Texas), Sep. 13, 2022, 31 pgs.

Defendant's Preliminary Invalidity Contentions Exhibit 250-A-18, *Webroot, Inc. and Open Text, Inc. v. Trend Micro Inc.*, No. 6:22-CV-00239-ADA-DTG (WD, Texas), Sep. 13, 2022, 32 pgs.

Defendant's Preliminary Invalidity Contentions Exhibit 250-A-19, *Webroot, Inc. and Open Text, Inc. v. Trend Micro Inc.*, No. 6:22-CV-00239-ADA-DTG (WD, Texas), Sep. 13, 2022, 42 pgs.

Defendant's Preliminary Invalidity Contentions Exhibit 250-A-20, *Webroot, Inc. and Open Text, Inc. v. Trend Micro Inc.*, No. 6:22-CV-00239-ADA-DTG (WD, Texas), Sep. 13, 2022, 42 pgs.

Defendant's Preliminary Invalidity Contentions Exhibit 250-A-21, *Webroot, Inc. and Open Text, Inc. v. Trend Micro Inc.*, No. 6:22-CV-00239-ADA-DTG (WD, Texas), Sep. 13, 2022, 192 pgs.

Defendant's Preliminary Invalidity Contentions Exhibit 250-A-22, *Webroot, Inc. and Open Text, Inc. v. Trend Micro Inc.*, No. 6:22-CV-00239-ADA-DTG (WD, Texas), Sep. 13, 2022, 127 pgs.

Defendant's Preliminary Invalidity Contentions Exhibit 250-A-23, *Webroot, Inc. and Open Text, Inc. v. Trend Micro Inc.*, No. 6:22-CV-00239-ADA-DTG (WD, Texas), Sep. 13, 2022, 120 pgs.

Defendant's Preliminary Invalidity Contentions Exhibit 250-A-24, *Webroot, Inc. and Open Text, Inc. v. Trend Micro Inc.*, No. 6:22-CV-00239-ADA-DTG (WD, Texas), Sep. 13, 2022, 113 pgs.

Defendant's Preliminary Invalidity Contentions Exhibit 250-A-25, *Webroot, Inc. and Open Text, Inc. v. Trend Micro Inc.*, No. 6:22-CV-00239-ADA-DTG (WD, Texas), Sep. 13, 2022, 71 pgs.

Defendant's Preliminary Invalidity Contentions Exhibit 250-A-26, *Webroot, Inc. and Open Text, Inc. v. Trend Micro Inc.*, No. 6:22-CV-00239-ADA-DTG (WD, Texas), Sep. 13, 2022, 77 pgs.

Defendant's Preliminary Invalidity Contentions Exhibit 250-A-27, *Webroot, Inc. and Open Text, Inc. v. Trend Micro Inc.*, No. 6:22-CV-00239-ADA-DTG (WD, Texas), Sep. 13, 2022, 32 pgs.

Defendant's Preliminary Invalidity Contentions Exhibit 250-A-28, *Webroot, Inc. and Open Text, Inc. v. Trend Micro Inc.*, No. 6:22-CV-00239-ADA-DTG (WD, Texas), Sep. 13, 2022, 77 pgs.

Defendant's Preliminary Invalidity Contentions Exhibit 250-A-29, *Webroot, Inc. and Open Text, Inc. v. Trend Micro Inc.*, No. 6:22-CV-00239-ADA-DTG (WD, Texas), Sep. 13, 2022, 45 pgs.

Defendant's Preliminary Invalidity Contentions Exhibit 250-A-30, *Webroot, Inc. and Open Text, Inc. v. Trend Micro Inc.*, No. 6:22-CV-00239-ADA-DTG (WD, Texas), Sep. 13, 2022, 31 pgs.

Defendant's Preliminary Invalidity Contentions Exhibit 250-A-31, *Webroot, Inc. and Open Text, Inc. v. Trend Micro Inc.*, No. 6:22-CV-00239-ADA-DTG (WD, Texas), Sep. 13, 2022, 29 pgs.

Defendant's Preliminary Invalidity Contentions Exhibit 250-A-32, *Webroot, Inc. and Open Text, Inc. v. Trend Micro Inc.*, No. 6:22-CV-00239-ADA-DTG (WD, Texas), Sep. 13, 2022, 34 pgs.

Defendant's Preliminary Invalidity Contentions Exhibit 250-A-33, *Webroot, Inc. and Open Text, Inc. v. Trend Micro Inc.*, No. 6:22-CV-00239-ADA-DTG (WD, Texas), Sep. 13, 2022, 41 pgs.

Defendant's Preliminary Invalidity Contentions Exhibit 250-A-34, *Webroot, Inc. and Open Text, Inc. v. Trend Micro Inc.*, No. 6:22-CV-00239-ADA-DTG (WD, Texas), Sep. 13, 2022, 59 pgs.

Defendant's Preliminary Invalidity Contentions Exhibit 250-A-35, *Webroot, Inc. and Open Text, Inc. v. Trend Micro Inc.*, No. 6:22-CV-00239-ADA-DTG (WD, Texas), Sep. 13, 2022, 42 pgs.

Defendant's Preliminary Invalidity Contentions Exhibit 250-A-36, *Webroot, Inc. and Open Text, Inc. v. Trend Micro Inc.*, No. 6:22-CV-00239-ADA-DTG (WD, Texas), Sep. 13, 2022, 29 pgs.

(56)         References Cited

OTHER PUBLICATIONS

Defendant's Preliminary Invalidity Contentions Exhibit 250-B, *Webroot, Inc. and Open Text, Inc.* v. *Trend Micro Inc.*, No. 6:22-CV-00239-ADA-DTG (WD, Texas), Sep. 13, 2022, 91 pgs.

Defendant's Preliminary Invalidity Contentions, Exhibit 389-A-1, *Webroot, Inc. and Open Text, Inc.* v. *Trend Micro Inc.*, No. 6:22-CV-00239-ADA-DTG (WD, Texas), Sep. 13, 2022, 83 pgs.

Defendant's Preliminary Invalidity Contentions, Exhibit 389-A-2, *Webroot, Inc. and Open Text, Inc.* v. *Trend Micro Inc.*, No. 6:22-CV-00239-ADA-DTG (WD, Texas), Sep. 13, 2022, 59 pgs.

Defendant's Preliminary Invalidity Contentions, Exhibit 389-A-3, *Webroot, Inc. and Open Text, Inc.* v. *Trend Micro Inc.*, No. 6:22-CV-00239-ADA-DTG (WD, Texas), Sep. 13, 2022, 120 pgs.

Defendant's Preliminary Invalidity Contentions, Exhibit 389-A-4, *Webroot, Inc. and Open Text, Inc.* v. *Trend Micro Inc.*, No. 6:22-CV-00239-ADA-DTG (WD, Texas), Sep. 13, 2022, 45 pgs.

Defendant's Preliminary Invalidity Contentions, Exhibit 389-A-5, *Webroot, Inc. and Open Text, Inc.* v. *Trend Micro Inc.*, No. 6:22-CV-00239-ADA-DTG (WD, Texas), Sep. 13, 2022, 40 pgs.

Defendant's Preliminary Invalidity Contentions, Exhibit 389-A-6, *Webroot, Inc. and Open Text, Inc.* v. *Trend Micro Inc.*, No. 6:22-CV-00239-ADA-DTG (WD, Texas), Sep. 13, 2022, 32 pgs.

Defendant's Preliminary Invalidity Contentions, Exhibit 389-A-7, *Webroot, Inc. and Open Text, Inc.* v. *Trend Micro Inc.*, No. 6:22-CV-00239-ADA-DTG (WD, Texas), Sep. 13, 2022, 37 pgs.

Defendant's Preliminary Invalidity Contentions, Exhibit 389-A-8, *Webroot, Inc. and Open Text, Inc.* v. *Trend Micro Inc.*, No. 6:22-CV-00239-ADA-DTG (WD, Texas), Sep. 13, 2022, 106 pgs.

Defendant's Preliminary Invalidity Contentions, Exhibit 389-A-9, *Webroot, Inc. and Open Text, Inc.* v. *Trend Micro Inc.*, No. 6:22-CV-00239-ADA-DTG (WD, Texas), Sep. 13, 2022, 40 pgs.

Defendant's Preliminary Invalidity Contentions, Exhibit 389-A-10, *Webroot, Inc. and Open Text, Inc.* v. *Trend Micro Inc.*, No. 6:22-CV-00239-ADA-DTG (WD, Texas), Sep. 13, 2022, 43 pgs.

Defendant's Preliminary Invalidity Contentions, Exhibit 389-A-11, *Webroot, Inc. and Open Text, Inc.* v. *Trend Micro Inc.*, No. 6:22-CV-00239-ADA-DTG (WD, Texas), Sep. 13, 2022, 43 pgs.

Defendant's Preliminary Invalidity Contentions, Exhibit 389-A-12, *Webroot, Inc. and Open Text, Inc.* v. *Trend Micro Inc.*, No. 6:22-CV-00239-ADA-DTG (WD, Texas), Sep. 13, 2022, 179 pgs.

Defendant's Preliminary Invalidity Contentions, Exhibit 389-A-13, *Webroot, Inc. and Open Text, Inc.* v. *Trend Micro Inc.*, No. 6:22-CV-00239-ADA-DTG (WD, Texas), Sep. 13, 2022, 192 pgs.

Defendant's Preliminary Invalidity Contentions, Exhibit 389-A-14, *Webroot, Inc. and Open Text, Inc.* v. *Trend Micro Inc.*, No. 6:22-CV-00239-ADA-DTG (WD, Texas), Sep. 13, 2022, 46 pgs.

Defendant's Preliminary Invalidity Contentions, Exhibit 389-A-15, *Webroot, Inc. and Open Text, Inc.* v. *Trend Micro Inc.*, No. 6:22-CV-00239-ADA-DTG (WD, Texas), Sep. 13, 2022, 41 pgs.

Defendant's Preliminary Invalidity Contentions, Exhibit 389-A-16, *Webroot, Inc. and Open Text, Inc.* v. *Trend Micro Inc.*, No. 6:22-CV-00239-ADA-DTG (WD, Texas), Sep. 13, 2022, 37 pgs.

Defendant's Preliminary Invalidity Contentions, Exhibit 389-A-17, *Webroot, Inc. and Open Text, Inc.* v. *Trend Micro Inc.*, No. 6:22-CV-00239-ADA-DTG (WD, Texas), Sep. 13, 2022, 24 pgs.

Defendant's Preliminary Invalidity Contentions, Exhibit 389-A-18, *Webroot, Inc. and Open Text, Inc.* v. *Trend Micro Inc.*, No. 6:22-CV-00239-ADA-DTG (WD, Texas), Sep. 13, 2022, 26 pgs.

Defendant's Preliminary Invalidity Contentions, Exhibit 389-A-19, *Webroot, Inc. and Open Text, Inc.* v. *Trend Micro Inc.*, No. 6:22-CV-00239-ADA-DTG (WD, Texas), Sep. 13, 2022, 38 pgs.

Defendant's Preliminary Invalidity Contentions, Exhibit 389-A-20, *Webroot, Inc. and Open Text, Inc.* v. *Trend Micro Inc.*, No. 6:22-CV-00239-ADA-DTG (WD, Texas), Sep. 13, 2022, 37 pgs.

Defendant's Preliminary Invalidity Contentions, Exhibit 389-A-21, *Webroot, Inc. and Open Text, Inc.* v. *Trend Micro Inc.*, No. 6:22-CV-00239-ADA-DTG (WD, Texas), Sep. 13, 2022, 206 pgs.

Defendant's Preliminary Invalidity Contentions, Exhibit 389-A-22, *Webroot, Inc. and Open Text, Inc.* v. *Trend Micro Inc.*, No. 6:22-CV-00239-ADA-DTG (WD, Texas), Sep. 13, 2022, 138 pgs.

Defendant's Preliminary Invalidity Contentions, Exhibit 389-A-23, *Webroot, Inc. and Open Text, Inc.* v. *Trend Micro Inc.*, No. 6:22-CV-00239-ADA-DTG (WD, Texas), Sep. 13, 2022, 149 pgs.

Defendant's Preliminary Invalidity Contentions, Exhibit 389-A-24, *Webroot, Inc. and Open Text, Inc.* v. *Trend Micro Inc.*, No. 6:22-CV-00239-ADA-DTG (WD, Texas), Sep. 13, 2022, 152 pgs.

Defendant's Preliminary Invalidity Contentions, Exhibit 389-A-25, *Webroot, Inc. and Open Text, Inc.* v. *Trend Micro Inc.*, No. 6:22-CV-00239-ADA-DTG (WD, Texas), Sep. 13, 2022, 73 pgs.

Defendant's Preliminary Invalidity Contentions, Exhibit 389-A-26, *Webroot, Inc. and Open Text, Inc.* v. *Trend Micro Inc.*, No. 6:22-CV-00239-ADA-DTG (WD, Texas), Sep. 13, 2022, 91 pgs.

Defendant's Preliminary Invalidity Contentions, Exhibit 389-A-27, *Webroot, Inc. and Open Text, Inc.* v. *Trend Micro Inc.*, No. 6:22-CV-00239-ADA-DTG (WD, Texas), Sep. 13, 2022, 34 pgs.

Defendant's Preliminary Invalidity Contentions, Exhibit 389-A-28, *Webroot, Inc. and Open Text, Inc.* v. *Trend Micro Inc.*, No. 6:22-CV-00239-ADA-DTG (WD, Texas), Sep. 13, 2022, 102 pgs.

Defendant's Preliminary Invalidity Contentions, Exhibit 389-A-29, *Webroot, Inc. and Open Text, Inc.* v. *Trend Micro Inc.*, No. 6:22-CV-00239-ADA-DTG (WD, Texas), Sep. 13, 2022, 30 pgs.

Defendant's Preliminary Invalidity Contentions, Exhibit 389-A-30, *Webroot, Inc. and Open Text, Inc.* v. *Trend Micro Inc.*, No. 6:22-CV-00239-ADA-DTG (WD, Texas), Sep. 13, 2022, 21 pgs.

Defendant's Preliminary Invalidity Contentions, Exhibit 389-A-31, *Webroot, Inc. and Open Text, Inc.* v. *Trend Micro Inc.*, No. 6:22-CV-00239-ADA-DTG (WD, Texas), Sep. 13, 2022, 28 pgs.

Defendant's Preliminary Invalidity Contentions, Exhibit 389-A-32, *Webroot, Inc. and Open Text, Inc.* v. *Trend Micro Inc.*, No. 6:22-CV-00239-ADA-DTG (WD, Texas), Sep. 13, 2022, 48 pgs.

Defendant's Preliminary Invalidity Contentions, Exhibit 389-A-33, *Webroot, Inc. and Open Text, Inc.* v. *Trend Micro Inc.*, No. 6:22-CV-00239-ADA-DTG (WD, Texas), Sep. 13, 2022, 54 pgs.

Defendant's Preliminary Invalidity Contentions, Exhibit 389-A-34, *Webroot, Inc. and Open Text, Inc.* v. *Trend Micro Inc.*, No. 6:22-CV-00239-ADA-DTG (WD, Texas), Sep. 13, 2022, 78 pgs.

Defendant's Preliminary Invalidity Contentions, Exhibit 389-A-35, *Webroot, Inc. and Open Text, Inc.* v. *Trend Micro Inc.*, No. 6:22-CV-00239-ADA-DTG (WD, Texas), Sep. 13, 2022, 39 pgs.

Defendant's Preliminary Invalidity Contentions, Exhibit 389-A-36, *Webroot, Inc. and Open Text, Inc.* v. *Trend Micro Inc.*, No. 6:22-CV-00239-ADA-DTG (WD, Texas), Sep. 13, 2022, 21 pgs.

Defendant's Preliminary Invalidity Contentions, Exhibit 389-A-37, *Webroot, Inc. and Open Text, Inc.* v. *Trend Micro Inc.*, No. 6:22-CV-00239-ADA-DTG (WD, Texas), Sep. 13, 2022, 26 pgs.

Defendant's Preliminary Invalidity Contentions, Exhibit 389-B, *Webroot, Inc. and Open Text, Inc.* v. *Trend Micro Inc.*, No. 6:22-CV-00239-ADA-DTG (WD, Texas), Sep. 13, 2022, 92 pgs.

Defendant's Preliminary Invalidity Contentions, Exhibit 844-A-1, *Webroot, Inc. and Open Text, Inc.* v. *Trend Micro Inc.*, No. 6:22-CV-00239-ADA-DTG, W.D. Tex., Sep. 13, 2022, 28 pgs.

Defendant's Preliminary Invalidity Contentions, Exhibit 844-A-2, *Webroot, Inc. and Open Text, Inc.* v. *Trend Micro Inc.*, No. 6:22-CV-00239-ADA-DTG, W.D. Tex., Sep. 13, 2022, 30 pgs.

Defendant's Preliminary Invalidity Contentions, Exhibit 844-A-3, *Webroot, Inc. and Open Text, Inc.* v. *Trend Micro Inc.*, No. 6:22-CV-00239-ADA-DTG, W.D. Tex., Sep. 13, 2022, 27 pgs.

Defendant's Preliminary Invalidity Contentions, Exhibit 844-A-4, *Webroot, Inc. and Open Text, Inc.* v. *Trend Micro Inc.*, No. 6:22-CV-00239-ADA-DTG, W.D. Tex., Sep. 13, 2022, 31 pgs.

Defendant's Preliminary Invalidity Contentions, Exhibit 844-A-5, *Webroot, Inc. and Open Text, Inc.* v. *Trend Micro Inc.*, No. 6:22-CV-00239-ADA-DTG, W.D. Tex., Sep. 13, 2022, 34 pgs.

Defendant's Preliminary Invalidity Contentions, Exhibit 844-A-6, *Webroot, Inc. and Open Text, Inc.* v. *Trend Micro Inc.*, No. 6:22-CV-00239-ADA-DTG, W.D. Tex., Sep. 13, 2022, 28 pgs.

Defendant's Preliminary Invalidity Contentions, Exhibit 844-A-7, *Webroot, Inc. and Open Text, Inc.* v. *Trend Micro Inc.*, No. 6:22-CV-00239-ADA-DTG, W.D. Tex., Sep. 13, 2022, 45 pgs.

Defendant's Preliminary Invalidity Contentions, Exhibit 844-A-8, *Webroot, Inc. and Open Text, Inc.* v. *Trend Micro Inc.*, No. 6:22-CV-00239-ADA-DTG, W.D. Tex., Sep. 13, 2022, 26 pgs.

(56)          References Cited

OTHER PUBLICATIONS

Defendant's Preliminary Invalidity Contentions, Exhibit 844-A-9, *Webroot, Inc. and Open Text, Inc.* v. *Trend Micro Inc.*, No. 6:22-CV-00239-ADA-DTG, W.D. Tex., Sep. 13, 2022, 28 pgs.

Defendant's Preliminary Invalidity Contentions, Exhibit 844-A-10, *Webroot, Inc. and Open Text, Inc.* v. *Trend Micro Inc.*, No. 6:22-CV-00239-ADA-DTG, W.D. Tex., Sep. 13, 2022, 35 pgs.

Defendant's Preliminary Invalidity Contentions, Exhibit 844-A-11, *Webroot, Inc. and Open Text, Inc.* v. *Trend Micro Inc.*, No. 6:22-CV-00239-ADA-DTG, W.D. Tex., Sep. 13, 2022, 26 pgs.

Defendant's Preliminary Invalidity Contentions, Exhibit 844-A-12, *Webroot, Inc. and Open Text, Inc.* v. *Trend Micro Inc.*, No. 6:22-CV-00239-ADA-DTG, W.D. Tex., Sep. 13, 2022, 40 pgs.

Defendant's Preliminary Invalidity Contentions, Exhibit 844-A-13, *Webroot, Inc. and Open Text, Inc.* v. *Trend Micro Inc.*, No. 6:22-CV-00239-ADA-DTG, W.D. Tex., Sep. 13, 2022, 38 pgs.

Defendant's Preliminary Invalidity Contentions, Exhibit 844-A-14, *Webroot, Inc. and Open Text, Inc.* v. *Trend Micro Inc.*, No. 6:22-CV-00239-ADA-DTG, W.D. Tex., Sep. 13, 2022, 26 pgs.

Defendant's Preliminary Invalidity Contentions, Exhibit 844-A-15, *Webroot, Inc. and Open Text, Inc.* v. *Trend Micro Inc.*, No. 6:22-CV-00239-ADA-DTG, W.D. Tex., Sep. 13, 2022, 31 pgs.

Defendant's Preliminary Invalidity Contentions, Exhibit 844-A-16, *Webroot, Inc. and Open Text, Inc.* v. *Trend Micro Inc.*, No. 6:22-CV-00239-ADA-DTG, W.D. Tex., Sep. 13, 2022, 40 pgs.

Defendant's Preliminary Invalidity Contentions, Exhibit 844-A-17, *Webroot, Inc. and Open Text, Inc.* v. *Trend Micro Inc.*, No. 6:22-CV-00239-ADA-DTG, W.D. Tex., Sep. 13, 2022, 43 pgs.

Defendant's Preliminary Invalidity Contentions, Exhibit 844-A-18, *Webroot, Inc. and Open Text, Inc.* v. *Trend Micro Inc.*, No. 6:22-CV-00239-ADA-DTG, W.D. Tex., Sep. 13, 2022, 44 pgs.

Defendant's Preliminary Invalidity Contentions, Exhibit 844-A-19, *Webroot, Inc. and Open Text, Inc.* v. *Trend Micro Inc.*, No. 6:22-CV-00239-ADA-DTG, W.D. Tex., Sep. 13, 2022, 40 pgs.

Defendant's Preliminary Invalidity Contentions, Exhibit 844-A-20, *Webroot, Inc. and Open Text, Inc.* v. *Trend Micro Inc.*, No. 6:22-CV-00239-ADA-DTG, W.D. Tex., Sep. 13, 2022, 32 pgs.

Defendant's Preliminary Invalidity Contentions, Exhibit 844-A-21, *Webroot, Inc. and Open Text, Inc.* v. *Trend Micro Inc.*, No. 6:22-CV-00239-ADA-DTG, W.D. Tex., Sep. 13, 2022, 26 pgs.

Defendant's Preliminary Invalidity Contentions, Exhibit 844-A-22, *Webroot, Inc. and Open Text, Inc.* v. *Trend Micro Inc.*, No. 6:22-CV-00239-ADA-DTG, W.D. Tex., Sep. 13, 2022, 39 pgs.

Defendant's Preliminary Invalidity Contentions, Exhibit 844-A-23, *Webroot, Inc. and Open Text, Inc.* v. *Trend Micro Inc.*, No. 6:22-CV-00239-ADA-DTG, W.D. Tex., Sep. 13, 2022, 30 pgs.

Defendant's Preliminary Invalidity Contentions, Exhibit 844-A-24, *Webroot, Inc. and Open Text, Inc.* v. *Trend Micro Inc.*, No. 6:22-CV-00239-ADA-DTG, W.D. Tex., Sep. 13, 2022, 31 pgs.

Defendant's Preliminary Invalidity Contentions, Exhibit 844-A-25, *Webroot, Inc. and Open Text, Inc.* v. *Trend Micro Inc.*, No. 6:22-CV-00239-ADA-DTG, W.D. Tex., Sep. 13, 2022, 36 pgs.

Defendant's Preliminary Invalidity Contentions, Exhibit 844-A-26, *Webroot, Inc. and Open Text, Inc.* v. *Trend Micro Inc.*, No. 6:22-CV-00239-ADA-DTG, W.D. Tex., Sep. 13, 2022, 35 pgs.

Defendant's Preliminary Invalidity Contentions, Exhibit 844-A-27, *Webroot, Inc. and Open Text, Inc.* v. *Trend Micro Inc.*, No. 6:22-CV-00239-ADA-DTG, W.D. Tex., Sep. 13, 2022, 37 pgs.

Defendant's Preliminary Invalidity Contentions, Exhibit 844-A-28, *Webroot, Inc. and Open Text, Inc.* v. *Trend Micro Inc.*, No. 6:22-CV-00239-ADA-DTG, W.D. Tex., Sep. 13, 2022, 32 pgs.

Defendant's Preliminary Invalidity Contentions, Exhibit 844-A-29, *Webroot, Inc. and Open Text, Inc.* v. *Trend Micro Inc.*, No. 6:22-CV-00239-ADA-DTG, W.D. Tex., Sep. 13, 2022, 31 pgs.

Defendant's Preliminary Invalidity Contentions, Exhibit 844-A-30, *Webroot, Inc. and Open Text, Inc.* v. *Trend Micro Inc.*, No. 6:22-CV-00239-ADA-DTG, W.D. Tex., Sep. 13, 2022, 93 pgs.

Defendant's Preliminary Invalidity Contentions, Exhibit 844-A-31, *Webroot, Inc. and Open Text, Inc.* v. *Trend Micro Inc.*, No. 6:22-CV-00239-ADA-DTG, W.D. Tex., Sep. 13, 2022, 39 pgs.

Defendant's Preliminary Invalidity Contentions, Exhibit 844-A-32, *Webroot, Inc. and Open Text, Inc.* v. *Trend Micro Inc.*, No. 6:22-CV-00239-ADA-DTG, W.D. Tex., Sep. 13, 2022, 93 pgs.

Defendant's Preliminary Invalidity Contentions, Exhibit 844-A-33, *Webroot, Inc. and Open Text, Inc.* v. *Trend Micro Inc.*, No. 6:22-CV-00239-ADA-DTG, W.D. Tex., Sep. 13, 2022, 54 pgs.

Defendant's Preliminary Invalidity Contentions, Exhibit 844-A-34, *Webroot, Inc. and Open Text, Inc.* v. *Trend Micro Inc.*, No. 6:22-CV-00239-ADA-DTG, W.D. Tex., Sep. 13, 2022, 68 pgs.

Defendant's Preliminary Invalidity Contentions, Exhibit 844-A-35, *Webroot, Inc. and Open Text, Inc.* v. *Trend Micro Inc.*, No. 6:22-CV-00239-ADA-DTG, W.D. Tex., Sep. 13, 2022, 55 pgs.

Defendant's Preliminary Invalidity Contentions, Exhibit 844-A-36, *Webroot, Inc. and Open Text, Inc.* v. *Trend Micro Inc.*, No. 6:22-CV-00239-ADA-DTG, W.D. Tex., Sep. 13, 2022, 53 pgs.

Defendant's Preliminary Invalidity Contentions, Exhibit 844-A-37, *Webroot, Inc. and Open Text, Inc.* v. *Trend Micro Inc.*, No. 6:22-CV-00239-ADA-DTG, W.D. Tex., Sep. 13, 2022, 42 pgs.

Defendant's Preliminary Invalidity Contentions, Exhibit 844-A-38, *Webroot, Inc. and Open Text, Inc.* v. *Trend Micro Inc.*, No. 6:22-CV-00239-ADA-DTG, W.D. Tex., Sep. 13, 2022, 68 pgs.

Defendant's Preliminary Invalidity Contentions, Exhibit 844-A-39, *Webroot, Inc. and Open Text, Inc.* v. *Trend Micro Inc.*, No. 6:22-CV-00239-ADA-DTG, W.D. Tex., Sep. 13, 2022, 54 pgs.

Defendant's Preliminary Invalidity Contentions, Exhibit 844-A-40, *Webroot, Inc. and Open Text, Inc.* v. *Trend Micro Inc.*, No. 6:22-CV-00239-ADA-DTG, W.D. Tex., Sep. 13, 2022, 69 pgs.

Defendant's Preliminary Invalidity Contentions, Exhibit 844-A-41, *Webroot, Inc. and Open Text, Inc.* v. *Trend Micro Inc.*, No. 6:22-CV-00239-ADA-DTG, W.D. Tex., Sep. 13, 2022, 68 pgs.

Defendant's Preliminary Invalidity Contentions, Exhibit 844-A-42, *Webroot, Inc. and Open Text, Inc.* v. *Trend Micro Inc.*, No. 6:22-CV-00239-ADA-DTG, W.D. Tex., Sep. 13, 2022, 40 pgs.

Defendant's Preliminary Invalidity Contentions, Exhibit 844-A-43, *Webroot, Inc. and Open Text, Inc.* v. *Trend Micro Inc.*, No. 6:22-CV-00239-ADA-DTG, W.D. Tex., Sep. 13, 2022, 56 pgs.

Defendant's Preliminary Invalidity Contentions, Exhibit 844-A-44, *Webroot, Inc. and Open Text, Inc.* v. *Trend Micro Inc.*, No. 6:22-CV-00239-ADA-DTG, W.D. Tex., Sep. 13, 2022, 67 pgs.

Defendant's Preliminary Invalidity Contentions, Exhibit 844-A-45, *Webroot, Inc. and Open Text, Inc.* v. *Trend Micro Inc.*, No. 6:22-CV-00239-ADA-DTG, W.D. Tex., Sep. 13, 2022, 66 pgs.

Defendant's Preliminary Invalidity Contentions, Exhibit 844-A-46, *Webroot, Inc. and Open Text, Inc.* v. *Trend Micro Inc.*, No. 6:22-CV-00239-ADA-DTG, W.D. Tex., Sep. 13, 2022, 81 pgs.

Defendant's Preliminary Invalidity Contentions, Exhibit 844-A-47, *Webroot, Inc. and Open Text, Inc.* v. *Trend Micro Inc.*, No. 6:22-CV-00239-ADA-DTG, W.D. Tex., Sep. 13, 2022, 24 pgs.

Defendant's Preliminary Invalidity Contentions, Exhibit 844-A-48, *Webroot, Inc. and Open Text, Inc.* v. *Trend Micro Inc.*, No. 6:22-CV-00239-ADA-DTG, W.D. Tex., Sep. 13, 2022, 78 pgs.

Defendant's Preliminary Invalidity Contentions, Exhibit 844-A-49, *Webroot, Inc. and Open Text, Inc.* v. *Trend Micro Inc.*, No. 6:22-CV-00239-ADA-DTG, W.D. Tex., Sep. 13, 2022, 79 pgs.

Defendant's Preliminary Invalidity Contentions, Exhibit 844-A-50, *Webroot, Inc. and Open Text, Inc.* v. *Trend Micro Inc.*, No. 6:22-CV-00239-ADA-DTG, W.D. Tex., Sep. 13, 2022, 73 pgs.

Defendant's Preliminary Invalidity Contentions, Exhibit 844-A-51, *Webroot, Inc. and Open Text, Inc.* v. *Trend Micro Inc.*, No. 6:22-CV-00239-ADA-DTG, W.D. Tex., Sep. 13, 2022, 53 pgs.

Defendant's Preliminary Invalidity Contentions, Exhibit 844-A-52, *Webroot, Inc. and Open Text, Inc.* v. *Trend Micro Inc.*, No. 6:22-CV-00239-ADA-DTG, W.D. Tex., Sep. 13, 2022, 55 pgs.

Defendant's Preliminary Invalidity Contentions, Exhibit 844-A-53, *Webroot, Inc. and Open Text, Inc.* v. *Trend Micro Inc.*, No. 6:22-CV-00239-ADA-DTG, W.D. Tex., Sep. 13, 2022, 75 pgs.

Defendant's Preliminary Invalidity Contentions, Exhibit 844-A-54, *Webroot, Inc. and Open Text, Inc.* v. *Trend Micro Inc.*, No. 6:22-CV-00239-ADA-DTG, W.D. Tex., Sep. 13, 2022, 23 pgs.

Defendant's Preliminary Invalidity Contentions, Exhibit 844-A-55, *Webroot, Inc. and Open Text, Inc.* v. *Trend Micro Inc.*, No. 6:22-CV-00239-ADA-DTG, W.D. Tex., Sep. 13, 2022, 19 pgs.

(56) References Cited

OTHER PUBLICATIONS

Defendant's Preliminary Invalidity Contentions, Exhibit 844-A-56, *Webroot, Inc. and Open Text, Inc. v. Trend Micro Inc.*, No. 6:22-CV-00239-ADA-DTG, W.D. Tex., Sep. 13, 2022, 55 pgs.

Defendant's Preliminary Invalidity Contentions, Exhibit 844-A-57, *Webroot, Inc. and Open Text, Inc. v. Trend Micro Inc.*, No. 6:22-CV-00239-ADA-DTG, W.D. Tex., Sep. 13, 2022, 105 pgs.

Defendant's Preliminary Invalidity Contentions, Exhibit 844-A-58, *Webroot, Inc. and Open Text, Inc. v. Trend Micro Inc.*, No. 6:22-CV-00239-ADA-DTG, W.D. Tex., Sep. 13, 2022, 82 pgs.

Defendant's Preliminary Invalidity Contentions, Exhibit 844-A-59, *Webroot, Inc. and Open Text, Inc. v. Trend Micro Inc.*, No. 6:22-CV-00239-ADA-DTG, W.D. Tex., Sep. 13, 2022, 78 pgs.

Defendant's Preliminary Invalidity Contentions, Exhibit 844-A-60, *Webroot, Inc. and Open Text, Inc. v. Trend Micro Inc.*, No. 6:22-CV-00239-ADA-DTG, W.D. Tex., Sep. 13, 2022, 64 pgs.

Defendant's Preliminary Invalidity Contentions, Exhibit 844-A-61, *Webroot, Inc. and Open Text, Inc. v. Trend Micro Inc.*, No. 6:22-CV-00239-ADA-DTG, W.D. Tex., Sep. 13, 2022, 59 pgs.

Defendant's Preliminary Invalidity Contentions, Exhibit 844-A-62, *Webroot, Inc. and Open Text, Inc. v. Trend Micro Inc.*, No. 6:22-CV-00239-ADA-DTG, W.D. Tex., Sep. 13, 2022, 81 pgs.

Defendant's Preliminary Invalidity Contentions, Exhibit 844-A-63, *Webroot, Inc. and Open Text, Inc. v. Trend Micro Inc.*, No. 6:22-CV-00239-ADA-DTG, W.D. Tex., Sep. 13, 2022, 47 pgs.

Defendant's Preliminary Invalidity Contentions, Exhibit 844-A-64, *Webroot, Inc. and Open Text, Inc. v. Trend Micro Inc.*, No. 6:22-CV-00239-ADA-DTG, W.D. Tex., Sep. 13, 2022, 81 pgs.

Defendant's Preliminary Invalidity Contentions, Exhibit 844-A-65, *Webroot, Inc. and Open Text, Inc. v. Trend Micro Inc.*, No. 6:22-CV-00239-ADA-DTG, W.D. Tex., Sep. 13, 2022, 52 pgs.

Defendant's Preliminary Invalidity Contentions, Exhibit 844-A-66, *Webroot, Inc. and Open Text, Inc. v. Trend Micro Inc.*, No. 6:22-CV-00239-ADA-DTG, W.D. Tex., Sep. 13, 2022, 83 pgs.

Defendant's Preliminary Invalidity Contentions, Exhibit 844-A-67, *Webroot, Inc. and Open Text, Inc. v. Trend Micro Inc.*, No. 6:22-CV-00239-ADA-DTG, W.D. Tex., Sep. 13, 2022, 25 pgs.

Defendant's Preliminary Invalidity Contentions, Exhibit 844-A-68, *Webroot, Inc. and Open Text, Inc. v. Trend Micro Inc.*, No. 6:22-CV-00239-ADA-DTG, W.D. Tex., Sep. 13, 2022, 28 pgs.

Defendant's Preliminary Invalidity Contentions, Exhibit 844-A-69, *Webroot, Inc. and Open Text, Inc. v. Trend Micro Inc.*, No. 6:22-CV-00239-ADA-DTG, W.D. Tex., Sep. 13, 2022, 80 pgs.

Defendant's Preliminary Invalidity Contentions, Exhibit 844-A-70, *Webroot, Inc. and Open Text, Inc. v. Trend Micro Inc.*, No. 6:22-CV-00239-ADA-DTG, W.D. Tex., Sep. 13, 2022, 88 pgs.

Defendant's Preliminary Invalidity Contentions, Exhibit 844-A-71, *Webroot, Inc. and Open Text, Inc. v. Trend Micro Inc.*, No. 6:22-CV-00239-ADA-DTG, W.D. Tex., Sep. 13, 2022, 100 pgs.

Defendant's Preliminary Invalidity Contentions, Exhibit 844-A-72, *Webroot, Inc. and Open Text, Inc. v. Trend Micro Inc.*, No. 6:22-CV-00239-ADA-DTG, W.D. Tex., Sep. 13, 2022, 63 pgs.

Defendant's Preliminary Invalidity Contentions, Exhibit 844-A-73, *Webroot, Inc. and Open Text, Inc. v. Trend Micro Inc.*, No. 6:22-CV-00239-ADA-DTG, W.D. Tex., Sep. 13, 2022, 97 pgs.

Defendant's Preliminary Invalidity Contentions, Exhibit 844-A-74, *Webroot, Inc. and Open Text, Inc. v. Trend Micro Inc.*, No. 6:22-CV-00239-ADA-DTG, W.D. Tex., Sep. 13, 2022, 149 pgs.

Defendant's Preliminary Invalidity Contentions, Exhibit 844-A-75, *Webroot, Inc. and Open Text, Inc. v. Trend Micro Inc.*, No. 6:22-CV-00239-ADA-DTG, W.D. Tex., Sep. 13, 2022, 57 pgs.

Defendant's Preliminary Invalidity Contentions, Exhibit 844-A-76, *Webroot, Inc. and Open Text, Inc. v. Trend Micro Inc.*, No. 6:22-CV-00239-ADA-DTG, W.D. Tex., Sep. 13, 2022, 73 pgs.

Defendant's Preliminary Invalidity Contentions, Exhibit 844-A-77, *Webroot, Inc. and Open Text, Inc. v. Trend Micro Inc.*, No. 6:22-CV-00239-ADA-DTG, W.D. Tex., Sep. 13, 2022, 48 pgs.

Defendant's Preliminary Invalidity Contentions, Exhibit 844-B, *Webroot, Inc. and Open Text, Inc. v. Trend Micro Inc.*, No. 6:22-CV-00239-ADA-DTG, W.D. Tex., Sep. 13, 2022, 52 pgs.

Defendant's Preliminary Invalidity Contentions, Exhibit 869-A-1, *Webroot, Inc. and Open Text, Inc. v. Trend Micro Inc.*, No. 6:22-CV-00239-ADA-DTG, W.D. Tex., Feb. 21, 2023, 31 pgs.

Defendant's Preliminary Invalidity Contentions, Exhibit 869-A-2, *Webroot, Inc. and Open Text, Inc. v. Trend Micro Inc.*, No. 6:22-CV-00239-ADA-DTG, W.D. Tex., Feb. 21, 2023, 59 pgs.

Defendant's Preliminary Invalidity Contentions, Exhibit 869-A-3, *Webroot, Inc. and Open Text, Inc. v. Trend Micro Inc.*, No. 6:22-CV-00239-ADA-DTG, W.D. Tex., Feb. 21, 2023, 36 pgs.

Defendant's Preliminary Invalidity Contentions, Exhibit 869-A-4, *Webroot, Inc. and Open Text, Inc. v. Trend Micro Inc.*, No. 6:22-CV-00239-ADA-DTG, W.D. Tex., Feb. 21, 2023, 37 pgs.

Defendant's Preliminary Invalidity Contentions, Exhibit 869-A-5, *Webroot, Inc. and Open Text, Inc. v. Trend Micro Inc.*, No. 6:22-CV-00239-ADA-DTG, W.D. Tex., Feb. 21, 2023, 32 pgs.

Defendant's Preliminary Invalidity Contentions, Exhibit 869-A-6, *Webroot, Inc. and Open Text, Inc. v. Trend Micro Inc.*, No. 6:22-CV-00239-ADA-DTG, W.D. Tex., Feb. 21, 2023, 65 pgs.

Defendant's Preliminary Invalidity Contentions, Exhibit 869-A-7, *Webroot, Inc. and Open Text, Inc. v. Trend Micro Inc.*, No. 6:22-CV-00239-ADA-DTG, W.D. Tex., Feb. 21, 2023, 27 pgs.

Defendant's Preliminary Invalidity Contentions, Exhibit 869-A-8, *Webroot, Inc. and Open Text, Inc. v. Trend Micro Inc.*, No. 6:22-CV-00239-ADA-DTG, W.D. Tex., Feb. 21, 2023, 29 pgs.

Defendant's Preliminary Invalidity Contentions, Exhibit 869-A-9, *Webroot, Inc. and Open Text, Inc. v. Trend Micro Inc.*, No. 6:22-CV-00239-ADA-DTG, W.D. Tex., Feb. 21, 2023, 29 pgs.

Defendant's Preliminary Invalidity Contentions, Exhibit 869-A-10, *Webroot, Inc. and Open Text, Inc. v. Trend Micro Inc.*, No. 6:22-CV-00239-ADA-DTG, W.D. Tex., Feb. 21, 2023, 30 pgs.

Defendant's Preliminary Invalidity Contentions, Exhibit 869-A-11, *Webroot, Inc. and Open Text, Inc. v. Trend Micro Inc.*, No. 6:22-CV-00239-ADA-DTG, W.D. Tex., Feb. 21, 2023, 30 pgs.

Defendant's Preliminary Invalidity Contentions, Exhibit 869-A-12, *Webroot, Inc. and Open Text, Inc. v. Trend Micro Inc.*, No. 6:22-CV-00239-ADA-DTG, W.D. Tex., Feb. 21, 2023, 35 pgs.

Defendant's Preliminary Invalidity Contentions, Exhibit 869-A-13, *Webroot, Inc. and Open Text, Inc. v. Trend Micro Inc.*, No. 6:22-CV-00239-ADA-DTG, W.D. Tex., Feb. 21, 2023, 36 pgs.

Defendant's Preliminary Invalidity Contentions, Exhibit 869-A-14, *Webroot, Inc. and Open Text, Inc. v. Trend Micro Inc.*, No. 6:22-CV-00239-ADA-DTG, W.D. Tex., Feb. 21, 2023, 32 pgs.

Defendant's Preliminary Invalidity Contentions, Exhibit 869-A-15, *Webroot, Inc. and Open Text, Inc. v. Trend Micro Inc.*, No. 6:22-CV-00239-ADA-DTG, W.D. Tex., Feb. 21, 2023, 33 pgs.

Defendant's Preliminary Invalidity Contentions, Exhibit 869-A-16, *Webroot, Inc. and Open Text, Inc. v. Trend Micro Inc.*, No. 6:22-CV-00239-ADA-DTG, W.D. Tex., Feb. 21, 2023, 34 pgs.

Defendant's Preliminary Invalidity Contentions, Exhibit 869-A-17, *Webroot, Inc. and Open Text, Inc. v. Trend Micro Inc.*, No. 6:22-CV-00239-ADA-DTG, W.D. Tex., Feb. 21, 2023, 48 pgs.

Defendant's Preliminary Invalidity Contentions, Exhibit 869-A-18, *Webroot, Inc. and Open Text, Inc. v. Trend Micro Inc.*, No. 6:22-CV-00239-ADA-DTG, W.D. Tex., Feb. 21, 2023, 38 pgs.

Defendant's Preliminary Invalidity Contentions, Exhibit 869-A-19, *Webroot, Inc. and Open Text, Inc. v. Trend Micro Inc.*, No. 6:22-CV-00239-ADA-DTG, W.D. Tex., Feb. 21, 2023, 33 pgs.

Defendant's Preliminary Invalidity Contentions, Exhibit 869-A-20, *Webroot, Inc. and Open Text, Inc. v. Trend Micro Inc.*, No. 6:22-CV-00239-ADA-DTG, W.D. Tex., Feb. 21, 2023, 33 pgs.

Defendant's Preliminary Invalidity Contentions, Exhibit 869-A-21, *Webroot, Inc. and Open Text, Inc. v. Trend Micro Inc.*, No. 6:22-CV-00239-ADA-DTG, W.D. Tex., Feb. 21, 2023, 45 pgs.

Defendant's Preliminary Invalidity Contentions, Exhibit 869-A-22, *Webroot, Inc. and Open Text, Inc. v. Trend Micro Inc.*, No. 6:22-CV-00239-ADA-DTG, W.D. Tex., Feb. 21, 2023, 35 pgs.

Defendant's Preliminary Invalidity Contentions, Exhibit 869-A-23, *Webroot, Inc. and Open Text, Inc. v. Trend Micro Inc.*, No. 6:22-CV-00239-ADA-DTG, W.D. Tex., Feb. 21, 2023, 35 pgs.

Defendant's Preliminary Invalidity Contentions, Exhibit 869-A-24, *Webroot, Inc. and Open Text, Inc. v. Trend Micro Inc.*, No. 6:22-CV-00239-ADA-DTG, W.D. Tex., Feb. 21, 2023, 55 pgs.

(56) References Cited

OTHER PUBLICATIONS

Defendant's Preliminary Invalidity Contentions, Exhibit 869-A-25, *Webroot, Inc. and Open Text, Inc.* v. *Trend Micro Inc.*, No. 6:22-CV-00239-ADA-DTG, W.D. Tex., Feb. 21, 2023, 56 pgs.

Defendant's Preliminary Invalidity Contentions, Exhibit 869-A-26, *Webroot, Inc. and Open Text, Inc.* v. *Trend Micro Inc.*, No. 6:22-CV-00239-ADA-DTG, W.D. Tex., Feb. 21, 2023, 83 pgs.

Defendant's Preliminary Invalidity Contentions, Exhibit 869-A-27, *Webroot, Inc. and Open Text, Inc.* v. *Trend Micro Inc.*, No. 6:22-CV-00239-ADA-DTG, W.D. Tex., Feb. 21, 2023, 25 pgs.

Defendant's Preliminary Invalidity Contentions, Exhibit 869-A-28, *Webroot, Inc. and Open Text, Inc.* v. *Trend Micro Inc.*, No. 6:22-CV-00239-ADA-DTG, W.D. Tex., Feb. 21, 2023, 79 pgs.

Defendant's Preliminary Invalidity Contentions, Exhibit 869-A-29, *Webroot, Inc. and Open Text, Inc.* v. *Trend Micro Inc.*, No. 6:22-CV-00239-ADA-DTG, W.D. Tex., Feb. 21, 2023, 95 pgs.

Defendant's Preliminary Invalidity Contentions, Exhibit 869-A-30, *Webroot, Inc. and Open Text, Inc.* v. *Trend Micro Inc.*, No. 6:22-CV-00239-ADA-DTG, W.D. Tex., Feb. 21, 2023, 24 pgs.

Defendant's Preliminary Invalidity Contentions, Exhibit 869-A-31, *Webroot, Inc. and Open Text, Inc.* v. *Trend Micro Inc.*, No. 6:22-CV-00239-ADA-DTG, W.D. Tex., Feb. 21, 2023, 25 pgs.

Defendant's Preliminary Invalidity Contentions, Exhibit 869-A-32, *Webroot, Inc. and Open Text, Inc.* v. *Trend Micro Inc.*, No. 6:22-CV-00239-ADA-DTG, W.D. Tex., Feb. 21, 2023, 68 pgs.

Defendant's Preliminary Invalidity Contentions, Exhibit 869-A-33, *Webroot, Inc. and Open Text, Inc.* v. *Trend Micro Inc.*, No. 6:22-CV-00239-ADA-DTG, W.D. Tex., Feb. 21, 2023, 27 pgs.

Defendant's Preliminary Invalidity Contentions, Exhibit 869-A-34, *Webroot, Inc. and Open Text, Inc.* v. *Trend Micro Inc.*, No. 6:22-CV-00239-ADA-DTG, W.D. Tex., Feb. 21, 2023, 21 pgs.

Defendant's Preliminary Invalidity Contentions, Exhibit 869-A-35, *Webroot, Inc. and Open Text, Inc.* v. *Trend Micro Inc.*, No. 6:22-CV-00239-ADA-DTG, W.D. Tex., Feb. 21, 2023, 126 pgs.

Defendant's Preliminary Invalidity Contentions, Exhibit 869-A-36, *Webroot, Inc. and Open Text, Inc.* v. *Trend Micro Inc.*, No. 6:22-CV-00239-ADA-DTG, W.D. Tex., Feb. 21, 2023, 27 pgs.

Defendant's Preliminary Invalidity Contentions, Exhibit 869-A-37, *Webroot, Inc. and Open Text, Inc.* v. *Trend Micro Inc.*, No. 6:22-CV-00239-ADA-DTG, W.D. Tex., Feb. 21, 2023, 112 pgs.

Defendant's Preliminary Invalidity Contentions, Exhibit 869-A-38, *Webroot, Inc. and Open Text, Inc.* v. *Trend Micro Inc.*, No. 6:22-CV-00239-ADA-DTG, W.D. Tex., Feb. 21, 2023, 41 pgs.

Defendant's Preliminary Invalidity Contentions, Exhibit 869-A-39, *Webroot, Inc. and Open Text, Inc.* v. *Trend Micro Inc.*, No. 6:22-CV-00239-ADA-DTG, W.D. Tex., Feb. 21, 2023, 62 pgs.

Defendant's Preliminary Invalidity Contentions, Exhibit 869-A-40, *Webroot, Inc. and Open Text, Inc.* v. *Trend Micro Inc.*, No. 6:22-CV-00239-ADA-DTG, W.D. Tex., Feb. 21, 2023, 62 pgs.

Defendant's Preliminary Invalidity Contentions, Exhibit 869-A-41, *Webroot, Inc. and Open Text, Inc.* v. *Trend Micro Inc.*, No. 6:22-CV-00239-ADA-DTG, W.D. Tex., Feb. 21, 2023, 54 pgs.

Defendant's Preliminary Invalidity Contentions, Exhibit 869-A-42, *Webroot, Inc. and Open Text, Inc.* v. *Trend Micro Inc.*, No. 6:22-CV-00239-ADA-DTG, W.D. Tex., Feb. 21, 2023, 63 pgs.

Defendant's Preliminary Invalidity Contentions, Exhibit 869-A-43, *Webroot, Inc. and Open Text, Inc.* v. *Trend Micro Inc.*, No. 6:22-CV-00239-ADA-DTG, W.D. Tex., Feb. 21, 2023, 62 pgs.

Defendant's Preliminary Invalidity Contentions, Exhibit 869-A-44, *Webroot, Inc. and Open Text, Inc.* v. *Trend Micro Inc.*, No. 6:22-CV-00239-ADA-DTG, W.D. Tex., Feb. 21, 2023, 64 pgs.

Defendant's Preliminary Invalidity Contentions, Exhibit 869-A-45, *Webroot, Inc. and Open Text, Inc.* v. *Trend Micro Inc.*, No. 6:22-CV-00239-ADA-DTG, W.D. Tex., Feb. 21, 2023, 23 pgs.

Defendant's Preliminary Invalidity Contentions, Exhibit 869-A-46, *Webroot, Inc. and Open Text, Inc.* v. *Trend Micro Inc.*, No. 6:22-CV-00239-ADA-DTG, W.D. Tex., Feb. 21, 2023, 22 pgs.

Defendant's Preliminary Invalidity Contentions, Exhibit 869-A-47, *Webroot, Inc. and Open Text, Inc.* v. *Trend Micro Inc.*, No. 6:22-CV-00239-ADA-DTG, W.D. Tex., Feb. 21, 2023, 22 pgs.

Defendant's Preliminary Invalidity Contentions, Exhibit 869-A-48, *Webroot, Inc. and Open Text, Inc.* v. *Trend Micro Inc.*, No. 6:22-CV-00239-ADA-DTG, W.D. Tex., Feb. 21, 2023, 64 pgs.

Defendant's Preliminary Invalidity Contentions, Exhibit 869-A-49, *Webroot, Inc. and Open Text, Inc.* v. *Trend Micro Inc.*, No. 6:22-CV-00239-ADA-DTG, W.D. Tex., Feb. 21, 2023, 65 pgs.

Defendant's Preliminary Invalidity Contentions, Exhibit 869-A-50, *Webroot, Inc. and Open Text, Inc.* v. *Trend Micro Inc.*, No. 6:22-CV-00239-ADA-DTG, W.D. Tex., Feb. 21, 2023, 108 pgs.

Defendant's Preliminary Invalidity Contentions, Exhibit 869-A-51, *Webroot, Inc. and Open Text, Inc.* v. *Trend Micro Inc.*, No. 6:22-CV-00239-ADA-DTG, W.D. Tex., Feb. 21, 2023, 111 pgs.

Defendant's Preliminary Invalidity Contentions, Exhibit 869-A-52, *Webroot, Inc. and Open Text, Inc.* v. *Trend Micro Inc.*, No. 6:22-CV-00239-ADA-DTG, W.D. Tex., Feb. 21, 2023, 81 pgs.

Defendant's Preliminary Invalidity Contentions, Exhibit 869-A-53, *Webroot, Inc. and Open Text, Inc.* v. *Trend Micro Inc.*, No. 6:22-CV-00239-ADA-DTG, W.D. Tex., Feb. 21, 2023, 51 pgs.

Defendant's Preliminary Invalidity Contentions, Exhibit 869-A-54, *Webroot, Inc. and Open Text, Inc.* v. *Trend Micro Inc.*, No. 6:22-CV-00239-ADA-DTG, W.D. Tex., Feb. 21, 2023, 61 pgs.

Defendant's Preliminary Invalidity Contentions, Exhibit 869-A-55, *Webroot, Inc. and Open Text, Inc.* v. *Trend Micro Inc.*, No. 6:22-CV-00239-ADA-DTG, W.D. Tex., Feb. 21, 2023, 61 pgs.

Defendant's Preliminary Invalidity Contentions, Exhibit 869-A-56, *Webroot, Inc. and Open Text, Inc.* v. *Trend Micro Inc.*, No. 6:22-CV-00239-ADA-DTG, W.D. Tex., Feb. 21, 2023, 107 pgs.

Defendant's Preliminary Invalidity Contentions, Exhibit 869-A-57, *Webroot, Inc. and Open Text, Inc.* v. *Trend Micro Inc.*, No. 6:22-CV-00239-ADA-DTG, W.D. Tex., Feb. 21, 2023, 47 pgs.

Defendant's Preliminary Invalidity Contentions, Exhibit 869-A-58, *Webroot, Inc. and Open Text, Inc.* v. *Trend Micro Inc.*, No. 6:22-CV-00239-ADA-DTG, W.D. Tex., Feb. 21, 2023, 108 pgs.

Defendant's Preliminary Invalidity Contentions, Exhibit 869-A-59, *Webroot, Inc. and Open Text, Inc.* v. *Trend Micro Inc.*, No. 6:22-CV-00239-ADA-DTG, W.D. Tex., Feb. 21, 2023, 62 pgs.

Defendant's Preliminary Invalidity Contentions, Exhibit 869-A-60, *Webroot, Inc. and Open Text, Inc.* v. *Trend Micro Inc.*, No. 6:22-CV-00239-ADA-DTG, W.D. Tex., Feb. 21, 2023, 78 pgs.

Defendant's Preliminary Invalidity Contentions, Exhibit 869-A-61, *Webroot, Inc. and Open Text, Inc.* v. *Trend Micro Inc.*, No. 6:22-CV-00239-ADA-DTG, W.D. Tex., Feb. 21, 2023, 62 pgs.

Defendant's Preliminary Invalidity Contentions, Exhibit 869-A-62, *Webroot, Inc. and Open Text, Inc.* v. *Trend Micro Inc.*, No. 6:22-CV-00239-ADA-DTG, W.D. Tex., Feb. 21, 2023, 77 pgs.

Defendant's Preliminary Invalidity Contentions, Exhibit 869-A-63, *Webroot, Inc. and Open Text, Inc.* v. *Trend Micro Inc.*, No. 6:22-CV-00239-ADA-DTG, W.D. Tex., Feb. 21, 2023, 80 pgs.

Defendant's Preliminary Invalidity Contentions, Exhibit 869-A-64, *Webroot, Inc. and Open Text, Inc.* v. *Trend Micro Inc.*, No. 6:22-CV-00239-ADA-DTG, W.D. Tex., Feb. 21, 2023, 76 pgs.

Defendant's Preliminary Invalidity Contentions, Exhibit 869-A-65, *Webroot, Inc. and Open Text, Inc.* v. *Trend Micro Inc.*, No. 6:22-CV-00239-ADA-DTG, W.D. Tex., Feb. 21, 2023, 77 pgs.

Defendant's Preliminary Invalidity Contentions, Exhibit 869-A-66, *Webroot, Inc. and Open Text, Inc.* v. *Trend Micro Inc.*, No. 6:22-CV-00239-ADA-DTG, W.D. Tex., Feb. 21, 2023, 76 pgs.

Defendant's Preliminary Invalidity Contentions, Exhibit 869-A-67, *Webroot, Inc. and Open Text, Inc.* v. *Trend Micro Inc.*, No. 6:22-CV-00239-ADA-DTG, W.D. Tex., Feb. 21, 2023, 78 pgs.

Defendant's Preliminary Invalidity Contentions, Exhibit 869-A-68, *Webroot, Inc. and Open Text, Inc.* v. *Trend Micro Inc.*, No. 6:22-CV-00239-ADA-DTG, W.D. Tex., Feb. 21, 2023, 46 pgs.

Defendant's Preliminary Invalidity Contentions, Exhibit 869-A-69, *Webroot, Inc. and Open Text, Inc.* v. *Trend Micro Inc.*, No. 6:22-CV-00239-ADA-DTG, W.D. Tex., Feb. 21, 2023, 63 pgs.

Defendant's Preliminary Invalidity Contentions, Exhibit 869-A-70, *Webroot, Inc. and Open Text, Inc.* v. *Trend Micro Inc.*, No. 6:22-CV-00239-ADA-DTG, W.D. Tex., Feb. 21, 2023, 94 pgs.

Defendant's Preliminary Invalidity Contentions, Exhibit 869-A-72, *Webroot, Inc. and Open Text, Inc.* v. *Trend Micro Inc.*, No. 6:22-CV-00239-ADA-DTG, W.D. Tex., Feb. 21, 2023, 49 pgs.

(56) References Cited

OTHER PUBLICATIONS

Defendant's Preliminary Invalidity Contentions, Exhibit 869-A-73, *Webroot, Inc. and Open Text, Inc. v. Trend Micro Inc.*, No. 6:22-CV-00239-ADA-DTG, W.D. Tex., Feb. 21, 2023, 53 pgs.

Defendant's Preliminary Invalidity Contentions, Exhibit 869-A-74, *Webroot, Inc. and Open Text, Inc. v. Trend Micro Inc.*, No. 6:22-CV-00239-ADA-DTG, W.D. Tex., Feb. 21, 2023, 64 pgs.

Defendant's Preliminary Invalidity Contentions, Exhibit 869-A-75, *Webroot, Inc. and Open Text, Inc. v. Trend Micro Inc.*, No. 6:22-CV-00239-ADA-DTG, W.D. Tex., Feb. 21, 2023, 44 pgs.

Defendant's Preliminary Invalidity Contentions, Exhibit 869-A-76, *Webroot, Inc. and Open Text, Inc. v. Trend Micro Inc.*, No. 6:22-CV-00239-ADA-DTG, W.D. Tex., Feb. 21, 2023, 73 pgs.

Defendant's Preliminary Invalidity Contentions, Exhibit 869-A-77, *Webroot, Inc. and Open Text, Inc. v. Trend Micro Inc.*, No. 6:22-CV-00239-ADA-DTG, W.D. Tex., Feb. 21, 2023, 54 pgs.

Defendant's Preliminary Invalidity Contentions, Exhibit 869-A-78, *Webroot, Inc. and Open Text, Inc. v. Trend Micro Inc.*, No. 6:22-CV-00239-ADA-DTG, W.D. Tex., Feb. 21, 2023, 44 pgs.

Defendant's Preliminary Invalidity Contentions, Exhibit 869-A-79, *Webroot, Inc. and Open Text, Inc. v. Trend Micro Inc.*, No. 6:22-CV-00239-ADA-DTG, W.D. Tex., Feb. 21, 2023, 56 pgs.

Defendant's Preliminary Invalidity Contentions, Exhibit 869-A-80, *Webroot, Inc. and Open Text, Inc. v. Trend Micro Inc.*, No. 6:22-CV-00239-ADA-DTG, W.D. Tex., Feb. 21, 2023, 43 pgs.

Defendant's Preliminary Invalidity Contentions, Exhibit 869-A-81, *Webroot, Inc. and Open Text, Inc. v. Trend Micro Inc.*, No. 6:22-CV-00239-ADA-DTG, W.D. Tex., Feb. 21, 2023, 40 pgs.

Defendant's Preliminary Invalidity Contentions, Exhibit 869-A-82, *Webroot, Inc. and Open Text, Inc. v. Trend Micro Inc.*, No. 6:22-CV-00239-ADA-DTG, W.D. Tex., Feb. 21, 2023, 40 pgs.

Defendant's Preliminary Invalidity Contentions, Exhibit 869-A-83, *Webroot, Inc. and Open Text, Inc. v. Trend Micro Inc.*, No. 6:22-CV-00239-ADA-DTG, W.D. Tex., Feb. 21, 2023, 44 pgs.

Defendant's Preliminary Invalidity Contentions, Exhibit 869-A-84, *Webroot, Inc. and Open Text, Inc. v. Trend Micro Inc.*, No. 6:22-CV-00239-ADA-DTG, W.D. Tex., Feb. 21, 2023, 74 pgs.

Defendant's Preliminary Invalidity Contentions, Exhibit 869-A-85, *Webroot, Inc. and Open Text, Inc. v. Trend Micro Inc.*, No. 6:22-CV-00239-ADA-DTG, W.D. Tex., Feb. 21, 2023, 42 pgs.

Defendant's Preliminary Invalidity Contentions, Exhibit 869-A-86, *Webroot, Inc. and Open Text, Inc. v. Trend Micro Inc.*, No. 6:22-CV-00239-ADA-DTG, W.D. Tex., Feb. 21, 2023, 38 pgs.

Defendant's Preliminary Invalidity Contentions, Exhibit 869-A-87, *Webroot, Inc. and Open Text, Inc. v. Trend Micro Inc.*, No. 6:22-CV-00239-ADA-DTG, W.D. Tex., Feb. 21, 2023, 30 pgs.

Defendant's Preliminary Invalidity Contentions, Exhibit 869-A-88, *Webroot, Inc. and Open Text, Inc. v. Trend Micro Inc.*, No. 6:22-CV-00239-ADA-DTG, W.D. Tex., Feb. 21, 2023, 35 pgs.

Defendant's Preliminary Invalidity Contentions, Exhibit 869-A-89, *Webroot, Inc. and Open Text, Inc. v. Trend Micro Inc.*, No. 6:22-CV-00239-ADA-DTG, W.D. Tex., Feb. 21, 2023, 35 pgs.

Defendant's Preliminary Invalidity Contentions, Exhibit 869-A-90, *Webroot, Inc. and Open Text, Inc. v. Trend Micro Inc.*, No. 6:22-CV-00239-ADA-DTG, W.D. Tex., Feb. 21, 2023, 41 pgs.

Defendant's Preliminary Invalidity Contentions, Exhibit 869-B, *Webroot, Inc. and Open Text, Inc. v. Trend Micro Inc.*, 6:22-CV-00239-ADA-DTG, W.D. Tex., Feb. 21, 2023, 64 pgs.

*Trend Micro, Inc. v. Webroot Inc.*, PTAB Case No. IPR2023-01389, Petition for Inter Partes Review of U.S. Pat. No. 8,856,505, Sep. 7, 2023, 63 pgs.

*Trend Micro, Inc. v. Webroot Inc.*, PTAB Case No. IPR2023-01389, Exhibit 1001: U.S. Pat. No. 8,856,505 to Schneider, 11 pgs.

*Trend Micro, Inc. v. Webroot Inc.*, PTAB Case No. IPR2023-01389, Exhibit 1002: Prosecution History of 8,856,505, 351 pgs.

*Trend Micro, Inc. v. Webroot Inc.*, PTAB Case No. IPR2023-01389, Exhibit 1003: Expert Declaration of Dr. Seth Nielson, 89 pgs.

*Trend Micro, Inc. v. Webroot Inc.*, PTAB Case No. IPR2023-01389, Exhibit 1004: Curriculum Vitae of Dr. Seth Nielson, 15 pgs.

*Trend Micro, Inc. v. Webroot Inc.*, PTAB Case No. IPR2023-01389, Exhibit 1005: Webroot, Inc. and Open Text, Inc. v. Trend Micro Inc., Case No. 6:22-cv-00243- ADA-DTG, Claim Construction Order, Dkt. 391 (W.D. Tex.) Jul. 25, 2023, 19 pgs.

*Trend Micro, Inc. v. Webroot Inc.*, PTAB Case No. IPR2023-01389, Exhibit 1006: Tal Garfinkel, A Virtual Machine Introspection Based Architecture for Intrusion Detection, Computer Science Department, Stanford University, 2003, 16 pgs.

*Trend Micro, Inc. v. Webroot Inc.*, PTAB Case No. IPR2023-01389, Exhibit 1007: Greg Hoglund, Subverting the Windows Kernel: Rootkits, Addison-Wesley Professional, Jul. 22, 2005, 363 pgs.

*Trend Micro, Inc. v. Webroot Inc.*, PTAB Case No. IPR2023-01389, Exhibit 1008: Andreas Bunten, UNIX and Linux based Rootkits Techniques and Countermeasures, DFN-CERT Services GmbH, Apr. 30, 2004, 17 pgs.

*Trend Micro, Inc. v. Webroot Inc.*, PTAB Case No. IPR2023-01389, Exhibit 1009: Catherine Dodge, A Study of Initialization in Linux and OpenBSD, ACM SIGOPS Operating Systems Review 39(2), pp. 79-93, Apr. 2005, 16 pgs.

*Trend Micro, Inc. v. Webroot Inc.*, PTAB Case No. IPR2023-01389, Exhibit 1010: Phrack Staff, Linux on-the-fly kernel patching without LKM (58), Linux on-the-fly kernel patching without LKM, at http://phrack.org/issues/58/7.html, Dec. 28, 2001, 71 pgs.

*Trend Micro, Inc. v. Webroot Inc.*, PTAB Case No. IPR2023-01389, Exhibit 1011: Red Hat Linux 6.2, The Official Red Hat Linuz Reference Guide, 2000, 375 pgs.

*Trend Micro, Inc. v. Webroot Inc.*, PTAB Case No. IPR2023-01389, Exhibit 1012: Kathy Ivens, Walkin' Through the Boot Process, Aug. 30, 2004, 9 pgs.

*Trend Micro, Inc. v. Webroot Inc.*, PTAB Case No. IPR2023-01389, Exhibit 1013: Henrique de Moraes Holschuh, System Init Scripts and the Debian O.S., 3rd Debian Conference, Jun. 2002, 20 pgs.

*Trend Micro, Inc. v. Webroot Inc.*, PTAB Case No. IPR2023-01389, Exhibit 1014: Frank Apap, Detecting Malicious Software by Monitoring Anomalous Windows Registry Accesses, LNCS (2516), Oct. 2002, 19 pgs.

*Trend Micro, Inc. v. Webroot Inc.*, PTAB Case No. IPR2023-01389, Exhibit 1015: Declaration of Ingrid Hsieh-Yee, Ph.D., 26 pgs.

*Trend Micro, Inc. v. Webroot Inc.*, PTAB Case No. IPR2023-01390, Petition for Inter Partes Review of U.S. Pat. No. 8201243, 79 pgs.

*Trend Micro, Inc. v. Webroot Inc.*, PTAB Case No. IPR2023-01390, Exhibit 1001: U.S. Pat. No. 8201243, Boney, 13 pgs.

*Trend Micro, Inc. v. Webroot Inc.*, PTAB Case No. IPR2023-01390, Exhibit 1002: Prosecution History of 8201243, 423 pgs.

*Trend Micro, Inc. v. Webroot Inc.*, PTAB Case No. IPR2023-01390, Exhibit 1003: Expert Declaration of Dr. Seth Nielson, 135 pgs.

*Trend Micro, Inc. v. Webroot Inc.*, PTAB Case No. IPR2023-01390, Exhibit 1004: Curriculum Vitae of A.L. Seth Nielson, Ph.D., 15 pgs.

*Trend Micro, Inc. v. Webroot Inc.*, PTAB Case No. IPR2023-01390, Exhibit 1005: *Webroot, Inc. and Open Text, Inc. v. Trend Micro Inc.*, Case No. 6:22-cv-00243-ADA-DTG, Claim Construction Order, Dkt. 391 (W.D. Tex., Jul. 25, 2023), 19 pgs.

*Trend Micro, Inc. v. Webroot Inc.*, PTAB Case No. IPR2023-01390, Exhibit 1006: Cristina Abad, Log Correlation for Intrusion Detection: A Proof of Concept, 19th Annual Computer Security Applications Conference (2003), 10 pgs.

*Trend Micro, Inc. v. Webroot Inc.*, PTAB Case No. IPR2023-01390, Exhibit 1007: U.S. Publication No. 20070006310, Piccard, 7 pgs.

*Trend Micro, Inc. v. Webroot Inc.*, PTAB Case No. IPR2023-01390, Exhibit 1008: U.S. Pat. No. 6735703, Kilpatrick, 11 pgs.

*Trend Micro, Inc. v. Webroot Inc.*, PTAB Case No. IPR2023-01390, Exhibit 1009: Ed Skoudis, Malware: Fighting Malicious Code, Pearson, Nov. 2003, 30 pgs.

*Trend Micro, Inc. v. Webroot Inc.*, PTAB Case No. IPR2023-01390, Exhibit 1010: Robert Rinnan, Benefits of Centralized Log File Correlation, Gjøvik University College, 2005, 68 pgs.

*Trend Micro, Inc. v. Webroot Inc.*, PTAB Case No. IPR2023-01390, Exhibit 1011: Platform SDK: Windows Management Instrumentation, Win32_Process, Win32_Process class [WMI] (archive.org), Jul. 17, 2004, 9 pgs.

*Trend Micro, Inc. v. Webroot Inc.*, PTAB Case No. IPR2023-01390, Exhibit 1012: Matthew M. Lavy, Windows Management Instrumentation (WMI), Sams Oct. 2001, 24 pgs.

(56) References Cited

OTHER PUBLICATIONS

*Trend Micro, Inc.* v. *Webroot Inc.*, PTAB Case No. IPR2023-01390, Exhibit 1013: Yariv Kapla API Spying Techniques for Windows 9x, NT and 2000 (archive.org) Feb. 10, 2003, 7 pgs.

*Trend Micro, Inc.* v. *Webroot Inc.*, PTAB Case No. IPR2023-01390, Exhibit 1014: Stephanie Forrest, Computer Immunolgy, Communications of the ACM 40(1), Oct. 1997, 9 pgs.

*Trend Micro, Inc.* v. *Webroot Inc.*, PTAB Case No. IPR2023-01390, Exhibit 1015: Declaration of Ingrid Hsieh-Yee, Ph.D., 24 pgs.

*Trend Micro, Inc.* v. *Webroot Inc.*, PTAB Case No. IPR2023-01390, Notice of Filing Date Accorded to Petition and Time for Filing Patent Owner Preliminary Response, Sep. 18, 2023, 6 pgs.

*Trend Micro, Inc.* v. *Webroot Inc.*, PTAB Case No. IPR2023-01391, Petition for Inter Partes Review of U.S. Pat. No. 8,719,932, Sep. 7, 2023, 79 pgs.

*Trend Micro, Inc.* v. *Webroot Inc.*, PTAB Case No. IPR2023-01391, Exhibit 1001: U.S. Pat. No. 8719932, Boney, 12 pgs.

*Trend Micro, Inc.* v. *Webroot Inc.*, PTAB Case No. IPR2023-01391, Exhibit 1002: Prosecution History of 8719932, 120 pgs.

*Trend Micro, Inc.* v. *Webroot Inc.*, PTAB Case No. IPR2023-01391, Exhibit 1003: Expert Declaration of Dr. Seth Nielson, 138 pgs.

*Trend Micro, Inc.* v. *Webroot Inc.*, PTAB Case No. IPR2023-01391, Exhibit 1004: Curriculum Vitae of Dr. Seth Nielson, 15 pgs.

*Trend Micro, Inc.* v. *Webroot Inc.*, PTAB Case No. IPR2023-01391, Exhibit 1005: *Webroot, Inc. and Open Text, Inc.* v. *Trend Micro Inc.*, Case No. 6:22-cv-00243-ADA-DTG, Claim Construction Order, Dkt. 391 (W.D. Tex.), Jul. 25, 2023, 19 pgs.

*Trend Micro, Inc.* v. *Webroot Inc.*, PTAB Case No. IPR2023-01391, Exhibit 1006: Cristina Abad, Log Correlation for Intrusion Detection: A Proof of Concept, 19th Annual Computer Security Applications Conference, 2003, 10 pgs.

*Trend Micro, Inc.* v. *Webroot Inc.*, PTAB Case No. IPR2023-01391, Exhibit 1007: U.S. Publication No. 20070006310, Piccard, 7 pgs.

*Trend Micro, Inc.* v. *Webroot Inc.*, PTAB Case No. IPR2023-01391, Exhibit 1008: U.S. Pat. No. 6,735,703, Kilpatrick, 11 pgs.

*Trend Micro, Inc.* v. *Webroot Inc.*, PTAB Case No. IPR2023-01391, Exhibit 1009: Ed Skoudis, Malware: Fighting Malicious Code, Pearson, Nov. 2003, 30 pgs.

*Trend Micro, Inc.* v. *Webroot Inc.*, PTAB Case No. IPR2023-01391, Exhibit 1010: Robert Rinnan, Benefits of Centralized Log File Correlation, Gjøvik University College, 2005, 68 pgs.

*Trend Micro, Inc.* v. *Webroot Inc.*, PTAB Case No. IPR2023-01391, Exhibit 1011: Platform SDK: Windows Management Instrumentation, Win32_Process, Win32_Process class [WMI] (archive.org) Jul. 17, 2004, 9 pgs.

*Trend Micro, Inc.* v. *Webroot Inc.*, PTAB Case No. IPR2023-01391, Exhibit 1012: Matthew M. Lavy, Windows Management Instrumentation (WMI), Sams, Oct. 2001, 24 pgs.

*Trend Micro, Inc.* v. *Webroot Inc.*, PTAB Case No. IPR2023-01391, Exhibit 1013: Yariv Kaplan, API Spying Techniques for Windows 9x, NT and 2000, API Spying Techniques for Windows 9x, NT and 2000 (archive.org), Feb. 10, 2003, 7 pgs.

*Trend Micro, Inc.* v. *Webroot Inc.*, PTAB Case No. IPR2023-01391, Exhibit 1014: Stephanie Forrest, Computer Immunology, Communications of the ACM 40(1), Oct. 1997, 9 pgs.

*Trend Micro, Inc.* v. *Webroot Inc.*, PTAB Case No. IPR2023-01391, Exhibit 1015: Declaration of Ingrid Hsieh-Yee, Ph.D., 24 pgs.

*Trend Micro, Inc.* v. *Webroot Inc.*, PTAB Case No. IPR2023-01391, Notice of Filing Date Accorded to Petition and Time for Filing Patent Owner Preliminary Response, Sep. 18, 2023, 6 pgs.

*Trend Micro, Inc.* v. *Webroot Inc.*, PTAB Case No. IPR2023-01392, Petition for Inter Partes Review of U.S. Pat. No. 8, 181,244, Sep. 7, 2023, 88 pgs.

*Trend Micro, Inc.* v. *Webroot Inc.*, PTAB Case No. IPR2023-01392, Exhibit 1001: U.S. Pat. No. 8,181,244, Boney, 13 pgs.

*Trend Micro, Inc.* v. *Webroot Inc.*, PTAB Case No. IPR2023-01392, Exhibit 1002: Prosecution History of 8181244, 389 pgs.

*Trend Micro, Inc.* v. *Webroot Inc.*, PTAB Case No. IPR2023-01392, Exhibit 1003: Expert Declaration of Dr. Seth Nielson, 142 pgs.

*Trend Micro, Inc.* v. *Webroot Inc.*, PTAB Case No. IPR2023-01392, Exhibit 1004: Curriculum Vitae of Dr. Seth Nielson, 15 pgs.

*Trend Micro, Inc.* v. *Webroot Inc.*, PTAB Case No. IPR2023-01392, Exhibit 1005: *Webroot, Inc. and Open Text, Inc.* v. *Trend Micro Inc.*, Case No. 6:22-cv-00243-ADA-DTG, Claim Construction Order, Dkt. 391 (W.D. Tex.), Jul. 25, 2023, 19 pgs.

*Trend Micro, Inc.* v. *Webroot Inc.*, PTAB Case No. IPR2023-01392, Exhibit 1006: Kevin Chen, ECF—Event Correlation for Forensics, Australian Computer, Network & Information Forensics Conference, 2003, 10 pgs.

*Trend Micro, Inc.* v. *Webroot Inc.*, PTAB Case No. IPR2023-01392, Exhibit 1007: U.S. Patent Publication No. 20070006310, Piccard, 7 pgs.

*Trend Micro, Inc.* v. *Webroot Inc.*, PTAB Case No. IPR2023-01392, Exhibit 1008: Zhenmin Li, UCLog: A Unified, Correlated Logging Architecture for Intrusion Detection, Int'l Conf. on Telecomm. Sys. Modelling & Analysis, 2004, 15 pgs.

*Trend Micro, Inc.* v. *Webroot Inc.*, PTAB Case No. IPR2023-01392, Exhibit 1009: Declaration of Ingrid Hsieh-Yee, Ph.D., 29 pgs.

*Trend Micro, Inc.* v. *Webroot Inc.*, PTAB Case No. IPR2023-01392, Exhibit 1010: Peter G. Viscarola, Windows NT Device Driver Development, ORS Open Systems Resources, Inc., 1999, 686 pgs.

*Trend Micro, Inc.* v. *Webroot Inc.*, PTAB Case No. IPR2023-01392, Exhibit 1011: *Nicholas Weaver, Worms* vs. *Perimeters*: The Case or Hard-LANS, 12th Annual IEEE Symposium, Aug. 2004, 8 pgs.

*Trend Micro, Inc.* v. *Webroot Inc.*, PTAB Case No. IPR2023-01392, Exhibit 1012: Weidong Cui, Design and Implementation of an Extrusion-based Break-In Detector for Personal Computers, 2006, 11 pgs.

*Trend Micro, Inc.* v. *Webroot Inc.*, PTAB Case No. IPR2023-01392, Exhibit 1013: Cristina Abad, Log Correlation for Intrusion Detection: A Proof of Concept, 19th Annual Computer Security Applications Conference, 2003, 10 pgs.

*Trend Micro, Inc.* v. *Webroot Inc.*, PTAB Case No. IPR2023-01392, Exhibit 1014: Robert Rinnan, Benefits of Centralized Log File Correlation, Gjøvik University College, 2005, 68 pgs.

*Trend Micro, Inc.* v. *Webroot Inc.*, PTAB Case No. IPR2023-01392, Exhibit 1015: Ed Skoudis, Malware: Fighting Malicious Code, Pearson, Nov. 2003, 30 pgs.

*Trend Micro, Inc.* v. *Webroot Inc.*, PTAB Case No. IPR2023-01392, Exhibit 1016: Platform SDK: Windows Management Instrumentation, Win32_Process, Win32_Process class [WMI] (archive.org), Jul. 17, 2004, 9 pgs.

*Trend Micro, Inc.* v. *Webroot Inc.*, PTAB Case No. IPR2023-01392, Exhibit 1017: Matthew M. Lavy, Windows Management Instrumentation (WMI), Sams, Oct. 2001, 24 pgs.

*Trend Micro, Inc.* v. *Webroot Inc.*, PTAB Case No. IPR2023-01392, Exhibit 1018: Yariv Kaplan, API Spying Techniques for Windows 9x, NT and 2000, API Spying Techniques for Windows 9x, NT and 2000 (archive.org) Feb. 10, 2003, 7 pgs.

*Trend Micro, Inc.* v. *Webroot Inc.*, PTAB Case No. IPR2023-01392, Exhibit 1019: Stephanie Forrest, Computer Immunology, Communications of the ACM 40(1), Oct. 1997, 9 pgs.

*Trend Micro, Inc.* v. *Webroot Inc.*, PTAB Case No. IPR2023-01392, Corrected Exhibit List, Sep. 19, 2023, 4 pgs.

*AO Kaspersky Lab* v. *Webroot Inc.*, PTAB Case No. IPR2023-01334, Petition for Inter Partes Review of U.S. Pat. No. 8,418,250, 78 pgs.

*AO Kaspersky Lab* v. *Webroot Inc.*, PTAB Case No. IPR2023-01334, Exhibit 1001: U.S. Pat. No. 8,418,250, Morris, 17 pgs.

*AO Kaspersky Lab* v. *Webroot Inc.*, PTAB Case No. IPR2023-01334, Exhibit 1002: File History of U.S. Pat. No. 8,418,250, 888 pgs.

*AO Kaspersky Lab* v. *Webroot Inc.*, PTAB Case No. IPR2023-01334, Exhibit 1003: Declaration of Dr. Wenke Lee, 171 pgs.

*AO Kaspersky Lab* v. *Webroot Inc.*, PTAB Case No. IPR2023-01334, Exhibit 1004: U.S. Patent Publication No. 20050210035, Kester, 42 pgs.

*AO Kaspersky Lab* v. *Webroot Inc.*, PTAB Case No. IPR2023-01334, Exhibit 1005: U.S. Pat. No. 7,225,343, Honig, 22 pgs.

*AO Kaspersky Lab* v. *Webroot Inc.*, PTAB Case No. IPR2023-01334, Exhibit 1006: U.S. Pat. No. 7,594,272, Kennedy, 10 pgs.

(56) References Cited

OTHER PUBLICATIONS

*AO Kaspersky Lab* v. *Webroot Inc.*, PTAB Case No. IPR2023-01334, Exhibit 1007: Plaintiff's Opposition Markman Brief, No. 6:22-cv-00243, USDC, WDTX, Nov. 18, 2022, 86 pgs.

*AO Kaspersky Lab* v. *Webroot Inc.*, PTAB Case No. IPR2023-01334, Exhibit 1010: Defendants' Opening Markman Brief, 22-cv-00243 WDTX, Oct. 28, 22, 84 pgs.

*AO Kaspersky Lab* v. *Webroot Inc.*, PTAB Case No. IPR2023-01334, Exhibit 1011: Intrusion Detection with Unlabeled Data Using Clustering by Leonid Portnoy, et al., 25 pgs.

*AO Kaspersky Lab* v. *Webroot Inc.*, PTAB Case No. IPR2023-01334, Exhibit 1012: U.S. Pat. No. 6,944,772, Dozortsev, 10 pgs.

*AO Kaspersky Lab* v. *Webroot Inc.*, PTAB Case No. IPR2023-01334, Exhibit 1013: U.S. Pat. No. 6,772,363, Chess, 14 pgs.

*AO Kaspersky Lab* v. *Webroot Inc.*, PTAB Case No. IPR2023-01334, Exhibit 1014: WO 2002033525, Shyne-Song Chuang, 18 pgs.

*AO Kaspersky Lab* v. *Webroot Inc.*, PTAB Case No. IPR2023-01334, Exhibit 1015: EP 1549012, Kristof De Spiegeleer, 19 pgs.

*AO Kaspersky Lab* v. *Webroot Inc.*, PTAB Case No. IPR2023-01334, Exhibit 1016: EP 1280040, Alexander James Hinchliffe, et al., 17 pgs.

*AO Kaspersky Lab* v. *Webroot Inc.*, PTAB Case No. IPR2023-01334, Exhibit 1017: U.S. Patent Publication No. 20040153644, McCorkendale, 15 pgs.

*AO Kaspersky Lab* v. *Webroot Inc.*, PTAB Case No. IPR2023-01334, Exhibit 1018: U.S. Pat. No. 7,516,476, Kraemer, 13 pgs.

*AO Kaspersky Lab* v. *Webroot Inc.*, PTAB Case No. IPR2023-01334, Exhibit 1019: Harold S. Javitz et al., The NIDES Statistical Component: Description and Justification, 52 pgs.

*AO Kaspersky Lab* v. *Webroot Inc.*, PTAB Case No. IPR2023-01334, Exhibit 1020: U.S. Pat. No. 7,448,084, Apap, 17 pgs.

*AO Kaspersky Lab* v. *Webroot Inc.*, PTAB Case No. IPR2023-01334, Exhibit 1021: Order Granting Third Amended Scheduling Order, 22-cv-00243, WDTX, No. 142, Dec. 27, 2022, 9 pgs.

*AO Kaspersky Lab* v. *Webroot Inc.*, PTAB Case No. IPR2023-01334, Exhibit 1022: Declaration of V.S. Subrahmanian, Ph.D., 86 pgs.

*AO Kaspersky Lab* v. *Webroot Inc.*, PTAB Case No. IPR2023-01334, Exhibit 1023: Order Granting Fifth Amended Scheduling Order, ECF No. 252, Mar. 29, 2023, 9 pgs.

*AO Kaspersky Lab* v. *Webroot Inc.*, PTAB Case No. IPR2023-01334, Notice of Filing Date Accorded to Petition and Time for Filing Patent Owner Preliminary Response, Aug. 28, 2023, 6 pgs.

*AO Kaspersky Lab* v. *Webroot Inc.*, PTAB Case No. IPR2023-01334, Patent Owner Open Text Inc.'s Mandatory Notices Pursuant to 37 CFR § 42.8(b), Sep. 8, 2023, 11 pgs.

*AO Kaspersky Lab* v. *Webroot Inc.*, PTAB Case No. IPR2023-01380, Petition for Inter Partes Review of U.S. Pat. No. 11,409,869, Sep. 5, 2023, 91 pgs.

*Trend Micro, Inc.* v. *Webroot Inc.*, PTAB Case No. IPR2023-01380, Exhibit 1001: U.S. Pat. No. 11,409,869, Schmidtler, 16 pgs.

*Trend Micro, Inc.* v. *Webroot Inc.*, PTAB Case No. IPR2023-01380, Exhibit 1002: Prosecution History of U.S. Pat. 11,409,869, 347 pgs.

*Trend Micro, Inc.* v. *Webroot Inc.*, PTAB Case No. IPR2023-01380, Exhibit 1003: Expert Declaration of Dr. Seth Nielson, 174 pgs.

*Trend Micro, Inc.* v. *Webroot Inc.*, PTAB Case No. IPR2023-01380, Exhibit 1004: Curriculum Vitae of A.L. Seth Nielson, Ph.D., 15 pgs.

*Trend Micro, Inc.* v. *Webroot Inc.*, PTAB Case No. IPR2023-01380, Exhibit 1005: Gil Tahan, Mal-ID: Automatic Malware Detection Using Common Segment Analysis and Meta-Features, Journal of Machine Learning 13, 949-979, Apr. 13, 2012, 31 pgs.

*Trend Micro, Inc.* v. *Webroot Inc.*, PTAB Case No. IPR2023-01380, Exhibit 1006: Eitan Menahem, Improving Malware Detection by Applying Multi-Inducer Ensemble, Computational Statistics & Data Analysis 53, 2009, 12 pgs.

*Trend Micro, Inc.* v. *Webroot Inc.*, PTAB Case No. IPR2023-01380, Exhibit 1007: U.S. Patent Publication No. 20090254992, Schultz et al., 20 pgs.

*Trend Micro, Inc.* v. *Webroot Inc.*, PTAB Case No. IPR2023-01380, Exhibit 1008: Stuart Russell, Artificial Intelligence: A Modern Approach; The Intelligent Agent Book, Prentice Hall 2, 2003 pp. 749-751.

*Trend Micro, Inc.* v. *Webroot Inc.*, PTAB Case No. IPR2023-01380, Exhibit 1009: Lars Buitinck, API design for machine learning software: Experiences from the scikit-learn project, Sep. 2013, 16 pgs.

*Trend Micro, Inc.* v. *Webroot Inc.*, PTAB Case No. IPR2023-01380, Exhibit 1010: Declaration of Ingrid Hsieh-Yee, Ph.D., 30 pgs.

*Trend Micro, Inc.* v. *Webroot Inc.*, PTAB Case No. IPR2023-01380, Exhibit 1011: Dr. Solomon's Anti-Virus Toolkit Reference Guide, Apr. 1999, 8 pgs.

*Trend Micro, Inc.* v. *Webroot Inc.*, PTAB Case No. IPR2023-01380, Exhibit 1012: George Karypis, Chameleon: A Hierarchical Clustering Algorithm Using Dynamic Modeling, IEEE 32 (8), Aug. 1999, 22 pgs.

*Trend Micro, Inc.* v. *Webroot Inc.*, PTAB Case No. IPR2023-01380, Exhibit 1013: Yingjie Tian, Recent Advances on Support Vector Machine Research, Technological and Economic Development of Economy 18(1), Apr. 2012, 32 pgs.

*Trend Micro, Inc.* v. *Webroot Inc.*, PTAB Case No. IPR2023-01380, Exhibit 1014: Ian H. Witten, Data Mining, Practical Machine Learning Tools and Techniques 2, Jul. 2005, 10 pgs.

*Trend Micro, Inc.* v. *Webroot Inc.*, PTAB Case No. IPR2023-01380, Exhibit 1015: Craig Szydlowski, Multithreaded Technology & Multicore Processors, Dr. Dobb's Journal, May 2005, 19 pgs.

*Trend Micro, Inc.* v. *Webroot Inc.*, PTAB Case No. IPR2023-01380, Exhibit 1016: *Webroot, Inc. and Open Text, Inc.* v. *Trend Micro Inc.*, Case No. 6:22-cv-00243-ADA-DTG, Claim Construction Order, Dkt. 391 (W.D. Tex.) Jul. 25, 2023, 15 pgs.

*Trend Micro, Inc.* v. *Webroot Inc.*, PTAB Case No. IPR2023-01380, Exhibit 1017: U.S. Pat. No. 7,657,838, Daniell et al., 15 pgs.

*Trend Micro, Inc.* v. *Webroot Inc.*, PTAB Case No. IPR2023-01380, Exhibit 1018: U.S. Pat. No. 8,885,928, Forman, 11 pgs.

*Trend Micro, Inc.* v. *Webroot Inc.*, PTAB Case No. IPR2023-01380, Exhibit 1019: U.S. Publication 20100082642, Forman, 14 pgs. (intentionally blank).

*Crowdstrike, Inc.* v. *Webroot Inc.*, PTAB Case No. IPR2022-01522, Patent Owner's Response to Petition, Jul. 18, 2023, 83 pgs.

*Crowdstrike, Inc.* v. *Webroot Inc.*, PTAB Case No. IPR2022-01522, Exhibit 2024: Declaration of Professor Nenad Medvidovic, Ph.D in Support of Patent Owner's Response to Petition, 131 pgs.

*Crowdstrike, Inc.* v. *Webroot Inc.*, PTAB Case No. IPR2022-01522, Exhibit 2025: Erickson, J., Hacking: The Art of Exploitation, 2nd Ed. (2008), 492 pgs.

*Crowdstrike, Inc.* v. *Webroot Inc.*, PTAB Case No. IPR2022-01522, Exhibit 2026: Kleymenov, A. and Thabet, A., Mastering Malware Analysis, Packt Pub. (2019), 547 pgs.

*Crowdstrike, Inc.* v. *Webroot Inc.*, PTAB Case No. IPR2022-01522, Exhibit 2027: Deposition Transcript of Dr. Wenke Lee, Ph.D., Jun. 30, 2023, 212 pgs.

*Crowdstrike, Inc.* v. *Webroot Inc.*, PTAB Case No. IPR2022-01522, Exhibit 2028: U.S. Pat. No. 9,251,373, AlHarbi, 14 pgs.

*Crowdstrike, Inc.* v. *Webroot Inc.*, PTAB Case No. IPR2022-01522, Exhibit 2029: U.S. Pat. No. 8,291,381, Lai, 26 pgs.

*Crowdstrike, Inc.* v. *Webroot Inc.*, PTAB Case No. IPR2022-01522, Exhibit 2030: GeeksforGeeks, Stack Unwinding in C++, Nov. 25, 2021, 7 pgs.

*Crowdstrike, Inc.* v. *Webroot Inc.*, PTAB Case No. IPR2022-01522, Exhibit 2031: IBM Documentation, Stack unwinding (C++ only) IBM Documentation, Mar. 22, 2021, 3 pgs.

*Crowdstrike, Inc.* v. *Webroot Inc.*, PTAB Case No. IPR2022-01522, Exhibit 2032: Microsoft Learn, Exceptions and Stack Unwinding in C++, Nov. 13, 2022, 4 pgs.

*Crowdstrike, Inc.* v. *Webroot Inc.*, PTAB Case No. IPR2022-01522, Decision denying Patent Owner's Request for Rehearing of Decision Granting Institution of Inter Partes Review, Aug. 21, 23, 12 pgs.

*Trend Micro, Inc.* v. *Webroot Inc.*, PTAB Case No. IPR2023-00692, Patent Owner's Preliminary Response to Petition, Aug. 11, 2023, 81 pgs.

(56)　　　　　References Cited

OTHER PUBLICATIONS

*Trend Micro, Inc.* v. *Webroot Inc.*, PTAB Case No. IPR2023-00692, Exhibit 2001: Declaration of Professor Nenad Medvidovic, Ph.D in Support of Patent Owner's Preliminary Response To Petition, 58 pgs.
*Trend Micro, Inc.* v. *Webroot Inc.*, PTAB Case No. IPR2023-00692, Exhibit 2002: Curriculum Vitae of Professor Nenad Medvidovic, Ph.D., 71 pgs.
*Trend Micro, Inc.* v. *Webroot Inc.*, PTAB Case No. IPR2023-00692, Exhibit 2003: *Webroot, Inc. and Open Text Inc.*, v. *Trend Micro Inc.*, Case No. 6:22-cv-00239, Complaint for Patent Infringement, Dkt. 1 (W.D. Tex., Mar. 4, 2022), 117 pgs.
*Trend Micro, Inc.* v. *Webroot Inc.*, PTAB Case No. IPR2023-00692, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Trend Micro, Inc.* v. *Webroot Inc.*, PTAB Case No. IPR2023-00692, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Trend Micro, Inc.* v. *Webroot Inc.*, PTAB Case No. IPR2023-00692, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Trend Micro, Inc.* v. *Webroot Inc.*, PTAB Case No. IPR2023-00692, Exhibit 2007: *Webroot, Inc. and Open Text Inc.*, v. *AO Kaspersky Lab et al.*, Case No. 6:22-cv-243- ADA-DTG, Dec. 9, 2022 Transcript of Motions Hearing, Dkt. 133 (W.D. Tex. Dec. 15, 2022) (excerpted), 2 pgs.
*Trend Micro, Inc.* v. *Webroot Inc.*, PTAB Case No. IPR2023-00692, Exhibit 2008: Dani Kass, "Catching Up On Patent Litigation With Judge Al-bright" (Law360 Mar. 14, 2023); https://www.law360.com/pulse/articles/1582438/print?section=pulse/courts, 3 pgs.
*Trend Micro, Inc.* v. *Webroot Inc.*, PTAB Case No. IPR2023-00692, Exhibit 2009: *Webroot, Inc. and Open Text Inc.*, v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.
*Trend Micro, Inc.* v. *Webroot Inc.*, PTAB Case No. IPR2023-00692, Exhibit 2010: U.S. District Courts—Federal Court Management Statistics-Profiles-During the 12-Month Periods Ending Mar. 31, 2018 Through 2023, "Table N/A—U.S. District Courts-Combined Civil and Criminal Federal Court Management Statistics (Mar. 31, 2023)", Available at https://www.uscourts.gov/sites/default/files/data_tables/fcms_na_distprofile0331.2023.pdf, 95 pgs.
*Trend Micro, Inc.* v. *Webroot Inc.*, PTAB Case No. IPR2023-00692, Exhibit 2011: *Webroot, Inc. and Open Text Inc.*, v. *Trend Micro, Inc.*, Case No. 6:22-cv-00239-ADA-DTG, Defendant's Preliminary Invalidity Contentions (W.D. Tex., Sep. 13, 2022), 125 pgs.
*Trend Micro, Inc.* v. *Webroot Inc.*, PTAB Case No. IPR2023-00692, Exhibit 2012: *Webroot, Inc. and Open Text Inc.*, v. *Sophos Ltd.*, Case No. 6:22-cv-240-ADA-DTG, Defendant's Preliminary Invalidity Contentions (W.D. Tex., Sep. 13, 2022), 127 pgs.
*Trend Micro, Inc.* v. *Webroot Inc.*, PTAB Case No. IPR2023-00692, Exhibit 2013: *Webroot, Inc. and Open Text Inc.*, v. *CrowdStrike, Inc. and CrowdStrike Holdings, Inc.*, Case No. 6:22-cv-00241-ADA-DTG, Second Supplemental Preliminary Invalidity Contentions (W.D. Tex., Jul. 14, 2023), 85 pgs.
*Trend Micro, Inc.* v. *Webroot Inc.*, PTAB Case No. IPR2023-00692, Exhibit 2014: U.S. Publication No. 20090049550, Shevchenko, Feb. 19, 2009, 17 pgs.
*Trend Micro, Inc.* v. *Webroot Inc.*, PTAB Case No. IPR2023-00692, Exhibit 2015: U.S. Publication No. 20050108562, Khazan et al., May 19, 2005, 30 pgs.

*Trend Micro, Inc.* v. *Webroot Inc.*, PTAB Case No. IPR2023-00692, Exhibit 2016: U.S. Pat. No. 8,510,596, Gupta, Aug. 13, 2013, 47 pgs.
*Trend Micro, Inc.* v. *Webroot Inc.*, PTAB Case No. IPR2023-00692, Exhibit 2017: *Webroot, Inc. and Open Text Inc.*, v. *AO Kaspersky Lab et al.*, Case No. 6:22-CV-243-ADA-DTG, Claim Construction Order, Dkt. 236 (W.D. Tex. Mar. 16, 2023), 20 pgs.
*Trend Micro, Inc.* v. *Webroot Inc.*, PTAB Case No. IPR2023-00692, Exhibit 2018: Erickson, J., Hacking: The Art of Exploitation, 2nd Ed. (2008), 486 pgs.
*Trend Micro, Inc.* v. *Webroot Inc.*, PTAB Case No. IPR2023-00692, Exhibit 2019: Kleymenov, A. and Thabet, A., Mastering Malware Analysis, Packt Pub. (2019), 547 pgs.
*Trend Micro, Inc.* v. *Webroot Inc.*, PTAB Case No. IPR2023-00692, Exhibit 2020: LWN.net, An Introduction to Last Branch Records (Mar. 23, 2016) (available at https://web.archive.org/web/20160413055733/https://lwn.net/Articles/680985/), 5 pgs.
*Trend Micro, Inc.* v. *Webroot Inc.*, PTAB Case No. IPR2023-00692, Exhibit 2021: U.S. Pat. No. 9,251,373, AlHarbi, Feb. 2, 2016, 14 pgs.
*Trend Micro, Inc.* v. *Webroot Inc.*, PTAB Case No. IPR2023-00692, Exhibit 2022: U.S. Pat. No. 8,291,381, Lai, Oct. 16, 2012, 26 pgs.
*Trend Micro, Inc.* v. *Webroot Inc.*, PTAB Case No. IPR2023-00692, Exhibit 2023: GeeksforGeeks, Stack Unwinding in C++, Nov. 25, 2021, 7 pgs.
*Trend Micro, Inc.* v. *Webroot Inc.*, PTAB Case No. IPR2023-00692, Exhibit 2024: IBM Documentation, Stack unwinding (C++ only), Mar. 22, 2021, 3 pgs.
*Trend Micro, Inc.* v. *Webroot Inc.*, PTAB Case No. IPR2023-00692, Exhibit 2025: Microsoft Learn, Exceptions and Stack Unwinding in C++, Nov. 13, 2022, 4 pgs.
*Trend Micro, Inc.* v. *Webroot Inc.*, PTAB Case No. IPR2023-00692, Sotera Stipulation, Sep. 28, 2023, 3 pgs.
*Trend Micro, Inc.* v. *Webroot Inc.*, PTAB Case No. IPR2023-00692, Order, Conduct of Proceeding, Sep. 28, 2023, 6 pgs.
*Trend Micro, Inc.* v. *Webroot Inc.*, PTAB Case No. IPR2023-00692, Exhibit 3001: email re: Sotera Stipulation, Sep. 28, 2023, 2 pgs.
*Trend Micro, Inc.* v. *Webroot Inc.*, PTAB Case No. IPR2023-00692, Decision denying institution of Inter Parties Review, Nov. 6, 2023, 32 pgs.
*AO Kaspersky Lab* v. *Webroot Inc.*, PTAB Case No. IPR2023-00895, Corrected Label Exhibit 1001: U.S. Pat. No. 10284591, Giuliani, May 7, 2019, 14 pgs.
*AO Kaspersky Lab* v. *Webroot Inc.*, PTAB Case No. IPR2023-00895, Corrected Label Exhibit 1002: Declaration of V.S. Subrahmanian, Ph.D. under 37 C.F.R. §1.68, 110 pgs.
*AO Kaspersky Lab* v. *Webroot Inc.*, PTAB Case No. IPR2023-00895, Corrected Label Exhibit 1003: Curriculum Vitae of V.S. Subrahmanian, Ph.D., 77 pgs.
*AO Kaspersky Lab* v. *Webroot Inc.*, PTAB Case No. IPR2023-00895, Corrected Label Exhibit 1004: Motion for Order Authorizing Alternative Service, 13 pgs.
*AO Kaspersky Lab* v. *Webroot Inc.*, PTAB Case No. IPR2023-00895, Corrected Label Exhibit 1005: Waiver of Service of Summons, 1 pgs.
*AO Kaspersky Lab* v. *Webroot Inc.*, PTAB Case No. IPR2023-00895, Corrected Label Exhibit 1006: File History of U.S. Pat. No. 10,284,591, 238 pgs.
*AO Kaspersky Lab* v. *Webroot Inc.*, PTAB Case No. IPR2023-00895, Corrected Label Exhibit 1007: Ivan Fratric, Runtime Prevention of Return-Oriented Programming Attacks, at https://github.com/ivanfratric/ropguard/blob/master/doc/ropguard.pdf, 11 pgs.
*AO Kaspersky Lab* v. *Webroot Inc.*, PTAB Case No. IPR2023-00895, Corrected Label Exhibit 1008: U.S. Publication No. 20120255018, Sallam, Oct. 4, 2012, 53 pg.
*AO Kaspersky Lab* v. *Webroot Inc.*, PTAB Case No. IPR2023-00895, Corrected Label Exhibit 1009: Hello World, Github Docs, at https://docs.github.com/en/get-started/quickstart/hello-world (last visited Apr. 26, 2023), 8 pgs.
*AO Kaspersky Lab* v. *Webroot Inc.*, PTAB Case No. IPR2023-00895, Corrected Label Exhibit 1010: Committing and Reviewing Changes to your Project, Github Docs, at https://docs.github.com/en/desktop/contributing-and-collaborating-using-github-desktop/

(56) References Cited

OTHER PUBLICATIONS making-changes-in-a-branch/committing-and-reviewing-changes-to-your-project (last visited Apr. 26, 2023), 11 pgs.

*AO Kaspersky Lab* v. *Webroot Inc.*, PTAB Case No. IPR2023-00895, Corrected Label Exhibit 1011: Setting Repository Visibility, Github Docs, at https://docs.github.com/en/repositories/managing-your-repositorys-settings-and-features/managing-repository-settings/setting-repository-visibility (last visited Apr. 26, 2023), 3 pgs.

*AO Kaspersky Lab* v. *Webroot Inc.*, PTAB Case No. IPR2023-00895, Corrected Label Exhibit 1012: GitHub Glossary, Github Docs, at https://docs.github.com/en/get-started/quickstart/github-glossary#public-repository (last visited Apr. 26, 2023), 37 pgs.

*AO Kaspersky Lab* v. *Webroot Inc.*, PTAB Case No. IPR2023-00895, Corrected Label Exhibit 1013: Scott Chacon, GitHub Code Search, The Github Blog, at https://github.blog/2008-11-03-github-code-search/, Nov. 3, 2008, 7 pgs.

*AO Kaspersky Lab* v. *Webroot Inc.*, PTAB Case No. IPR2023-00895, Corrected Label Exhibit 1014: About Searching on GitHub, Github Docs, at https://docs.github.com/en/search-github/getting-started-with-searching-on-github/about-searching-on-github (last visited Apr. 26, 2023), 3 pgs.

*AO Kaspersky Lab* v. *Webroot Inc.*, PTAB Case No. IPR2023-00895, Corrected Label Exhibit 1015: Finding Ways to Contribute to Open Source on GitHub, Github Docs, at https://docs.github.com/en/get-started/exploring-projects-on-github/finding-ways-to-contribute-to-open-source-on-github (last visited Apr. 26, 2023), 3 pgs.

*AO Kaspersky Lab* v. *Webroot Inc.*, PTAB Case No. IPR2023-00895, Corrected Label Exhibit 1016: Claim Construction Order, *Webroot, Inc. and Open Text, Inc.* v. *AO Kaspersky Lab*, Case No. 6:22-CV-00243-ADA-DTG, (Mar. 16, 2023), 5 pgs.

*AO Kaspersky Lab* v. *Webroot Inc.*, PTAB Case No. IPR2023-00895, Corrected Label Exhibit 1017: Michael Huttermann, Devops For Developers (Apress, 2012), 183 pgs.

*AO Kaspersky Lab* v. *Webroot Inc.*, PTAB Case No. IPR2023-00895, Corrected Label Exhibit 1018: Nicolas Despres, Automatic performance monitoring tool, Laboratoire De Recherche Et Developpement De L'epita Tech Report No. 0601, 915 (2006), 21 pgs.

*AO Kaspersky Lab* v. *Webroot Inc.*, PTAB Case No. IPR2023-00895, Corrected Label Exhibit 1019: Bryan D. Payne, Martin D.P. de A. Carbone, Wenke Lee, Dec. 2007. Secure and Flexible Monitoring of Virtual Machines, 23rd Ann. Comp. Sec. Applications Conf., 385, 385-397 (2007), 13 pgs.

*AO Kaspersky Lab* v. *Webroot Inc.*, PTAB Case No. IPR2023-00895, Corrected Label Exhibit 1020: Margaret Rouse, Dynamic Library, Techopedia (Mar. 2, 2012), 7 pgs.

*AO Kaspersky Lab* v. *Webroot Inc.*, PTAB Case No. IPR2023-00895, Corrected Label Exhibit 1021: Krishnan, S. and Srihari, K., A Knowledge-Based Object Oriented DFM Advisor for Surface Mount PCB Assembly. 10 Li Int'l. J. Advanced Mfg. Tech, 317, 317- 329 (1995), 13 pgs.

*AO Kaspersky Lab* v. *Webroot Inc.*, PTAB Case No. IPR2023-00895, Corrected Label Exhibit 1022: Henry Hanping Feng, Jonathon T. Giffin, Yong Huang, Somesh Jha, Wenkee Lee, and Barton P. Miller, Formalizing Sensitivity in Static Analysis for Intrusion Detection, IEEE Symp. Sec. Priv., 194, 194-208, 15 pgs.

*AO Kaspersky Lab* v. *Webroot Inc.*, PTAB Case No. IPR2023-00895, Corrected Label Exhibit 1023: Wei Li, Lap-chung Lam, and Tzi-cker Chiueh, How to Automatically and Accurately Sandbox Microsoft IIS, 22nd Ann. Comp. Sec. Applications Conf., 213, 213-222 (2006), 10 pgs.

*AO Kaspersky Lab* v. *Webroot Inc.*, PTAB Case No. IPR2023-00895, Corrected Label Exhibit 1024: Kevin A. Roundy and Barton P. Miller, Hybrid Analysis and Control of Malware, Recent Advances In Intrusion Detection: 13th Int'l Symp., 317, 317-338 (2010), 23 pgs.

*AO Kaspersky Lab* v. *Webroot Inc.*, PTAB Case No. IPR2023-00895, Corrected Label Exhibit 1025: Toshiyuki Maeda, 2002, Safe Execution of User Programs in Kernel Mode Using Typed Assembly Language, (Master's Thesis, University of Tokyo, 2002), 44 pgs.

*AO Kaspersky Lab* v. *Webroot Inc.*, PTAB Case No. IPR2023-00895, Corrected Label Exhibit 1026: Alex Skaletsky, Tevi Devor, Nadav Chachmon, Robert Cohn, Kim Hazelwood, Vladimirov, Moshe Bach, Dynamic Program Analysis of Microsoft Windows Applications, IEEE Int'l Symp. Performance Analysis Sys. Software, 2, 2-12 (2010), 11 pgs.

*AO Kaspersky Lab* v. *Webroot Inc.*, PTAB Case No. IPR2023-00895, Corrected Label Exhibit 1027: Tarjei Mandt, T., Locking Down the Windows Kernel: Mitigating Null Pointer Exploitation, Norman Threat Research, 13 pgs.

*AO Kaspersky Lab* v. *Webroot Inc.*, PTAB Case No. IPR2023-00895, Corrected Label Exhibit 1028: Xiangyu Dong, Cong Xu, Yuan Xie, Norman P. Jouppi, N.P., NVSim: A Circuit-Level Performance, Energy, and Area Model for Emerging Nonvolatile Memory, 31 IEEE Transactions Computer-Aided Design Of Integrated Circuits Sys., 994, 994-1007 (2012), 14 pgs.

*AO Kaspersky Lab* v. *Webroot Inc.*, PTAB Case No. IPR2023-00895, Corrected Label Exhibit 1029: Father, H., Hooking Windows API-Technics of hooking API functions on Windows, 2 Assembly Programming J., 2, 2-30 (2004), 30 pgs.

*AO Kaspersky Lab* v. *Webroot Inc.*, PTAB Case No. IPR2023-00895, Corrected Label Exhibit 1030: J. Berdajs and Z. Bosnic, Extending Applications Using an Advanced Approach to DLL Injection and API Hooking, 40 Software: Practice Experience, 567, 567-584 (2010), 18 pgs.

*AO Kaspersky Lab* v. *Webroot Inc.*, PTAB Case No. IPR2023-00895, Corrected Label Exhibit 1031: Ulrich Bayer, Christopher Kruegel, and Engin Kirda, TTAnalyze: A Tool for Analyzing Malware, Ikarus Software Tech. Univ. Vienna, 180, 180-192 (2006), 12 pgs.

*AO Kaspersky Lab* v. *Webroot Inc.*, PTAB Case No. IPR2023-00895, Patent Owner's Preliminary Response to Petition, Sep. 11, 2023, 48 pgs.

*AO Kaspersky Lab* v. *Webroot Inc.*, PTAB Case No. IPR2023-00895, Exhibit 2001: Declaration of Professor Nenad Medvidovic, Ph.D in Support of PatentOwner's Preliminary Response To Petition, 15 pgs.

*AO Kaspersky Lab* v. *Webroot Inc.*, PTAB Case No. IPR2023-00895, Exhibit 2002: Curriculum Vitae of Professor Nenad Medvidovic, Ph.D., 71 pgs.

*AO Kaspersky Lab* v. *Webroot Inc.*, PTAB Case No. IPR2023-00895, Exhibit 2003: *Webroot, Inc. and Open Text Inc.*, v. *AO Kaspersky.*, Case No. 6:22-cv-00243, Complaint for Patent Infringement, Dkt. 1 (W.D. Tex., Mar. 4, 2022), 115 pgs.

*AO Kaspersky Lab* v. *Webroot Inc.*, PTAB Case No. IPR2023-00895, Exhibit 2004: *Sonrai Memory Ltd.* v. *Kingston Tech. Co. and Kingston Tech. Corp.*, Case No. 6:21-cv- 1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*AO Kaspersky Lab* v. *Webroot Inc.*, PTAB Case No. IPR2023-00895, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*AO Kaspersky Lab* v. *Webroot Inc.*, PTAB Case No. IPR2023-00895, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*AO Kaspersky Lab* v. *Webroot Inc.*, PTAB Case No. IPR2023-00895, Exhibit 2007: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.

*AO Kaspersky Lab* v. *Webroot Inc.*, PTAB Case No. IPR2023-00895, Exhibit 2008: Dani Kass, "Catching Up On Patent Litigation With Judge Albright" (Law360 Mar. 14, 2023); at https://www.law360.com/pulse/articles/1582438/print?section=pulse/courts, 3 pgs.

*AO Kaspersky Lab* v. *Webroot Inc.*, PTAB Case No. IPR2023-00895, Exhibit 2009: *Webroot, Inc. and Open Text Inc.*, v. *AO*

(56)          References Cited

OTHER PUBLICATIONS

*Kaspersky Lab et al.*, Case No. 6:22-cv-243-ADA-DTG, Order Granting Fifth Amended Scheduling Order, Dkt. 252 (W.D. Tex. Mar. 29, 2023), 7 pgs.
*AO Kaspersky Lab* v. *Webroot Inc.*, PTAB Case No. IPR2023-00895, Exhibit 2010: U.S. District Courts—Federal Court Management Statistics—Profiles-During the 12-Month Periods Ending Mar. 31, 2018 Through 2023, "Table N/A—U.S. District Courts- Combined Civil and Criminal Federal Court Management Statistics (Mar. 31, 2023)", available at https://www.uscourts.gov/sites/default/files/data_tables/fcms_na_distp rofile0331.2023.pdf, 95 pgs.
*AO Kaspersky Lab* v. *Webroot Inc.*, PTAB Case No. IPR2023-00895, Exhibit 2011: *Webroot, Inc. and Open Text Inc.*, v. *AO Kaspersky Lab et al.*, Case No. 6:22-cv-243-ADA-DTG, Defendant's Preliminary Invalidity Contentions, Appx. B (W.D. Tex., Sep. 14, 2022), 125 pgs.
*AO Kaspersky Lab* v. *Webroot Inc.*, PTAB Case No. IPR2023-00895, Exhibit 2012: *Webroot, Inc. and Open Text Inc.*, v. *Sophos Ltd.*, Case No. 6:22-cv-240-ADA-DTG, Defendant's Preliminary Invalidity Contentions (W.D. Tex., Sep. 13, 2022), 127 pgs.
*AO Kaspersky Lab* v. *Webroot Inc.*, PTAB Case No. IPR2023-00895, Exhibit 2013: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*AO Kaspersky Lab* v. *Webroot Inc.*, PTAB Case No. IPR2023-00895, Exhibit 2014: Setting Repository Visibility, Github Docs, https://docs.github.com/en/repositories/managing-your-repositorys-settings-and-features/managing-repository-settings/setting-repository-visibility (last visited Sep. 11, 2023), 3 pgs.
*AO Kaspersky Lab* v. *Webroot Inc.*, PTAB Case No. IPR2023-00895, Exhibit 2015: Calendar of archives for https://github.com/ivanfratric/ropguard, Internet Archive Wayback Machine, at https://web.archive.org/web/20180401000000*/https://github.com/iva nfratric/ropguard (last visited Sep. 11, 2023), 2 pgs.
*AO Kaspersky Lab* v. *Webroot Inc.*, PTAB Case No. IPR2023-00895, Exhibit 2016: Reviewing Your Security Log, Github Docs, at https://docs.github.com/en/authentication/keeping-your-account-and-data-secure/reviewing-your-security-log (last visited Sep. 11, 2023), 6 pgs.
*Crowdstrike, Inc.* v. *Webroot Inc.*, PTAB Case No. IPR2023-00124, Decision Granting Institution of Inter Partes Review, Jun. 15, 2023, 48 pgs.
*Crowdstrike, Inc.* v. *Webroot Inc.*, PTAB Case No. IPR2023-00124, Scheduling Order, Jun. 15, 2023, 12 pgs.
*Crowdstrike, Inc.* v. *Webroot Inc.*, PTAB Case No. IPR2023-00124, Patent Owner's Request for Rehearing, Jun. 29, 2023, 19 pgs.
*Crowdstrike, Inc.* v. *Webroot Inc.*, PTAB Case No. IPR2023-00124, Patent Owner's Updated Exhibit List, Jun. 29, 2023, 6 pgs.
*Crowdstrike, Inc.* v. *Webroot Inc.*, PTAB Case No. IPR2023-00124, Exhibit 2024: *Webroot, Inc. and Open Text Inc.* v. *AO Kaspersky Lab et al.*, Case No. 6:22-cv-243- ADA-DTG, Claim Construction Order, Dkt. 236 (W.D. Tex. Mar. 16, 2023), 20 pgs.
*Crowdstrike, Inc.* v. *Webroot Inc.*, PTAB Case No. IPR2023-00124, Patent Owner's Objections to Evidence submitted by Petitioner, Jun. 30, 23, 6 pgs.
*Crowdstrike, Inc.* v. *Webroot Inc.*, PTAB Case No. IPR2023-00124, Patent Owner's Response to Petition, Sep. 7, 23, 81 pgs.
*Crowdstrike, Inc.* v. *Webroot Inc.*, PTAB Case No. IPR2023-00124, Exhibit 2025: *CrowdStrike, Inc.* v. *Open Text Inc.*, IPR2023-00126, Deposition Transcript of Wenke Lee, Ph.D., dated Jul. 17, 2023, 269 pgs.
*Crowdstrike, Inc.* v. *Webroot Inc.*, PTAB Case No. IPR2023-00124, Exhibit 2026: Second Declaration of Professor Nenad Medvidovic, Ph.D., 83 pgs.
*Crowdstrike, Inc.* v. *Webroot Inc.*, PTAB Case No. IPR2023-00124, Exhibit 2027: Email chain from Brian Eutermoser to Hunter Horton regarding *CrowdStrike, Inc.* v. *Open Text Inc.* | IPR2023-00124-r. Lee deposition, 2 pgs.

*Trend Micro, Inc.* v. *Webroot Inc.*, PTAB Case No. IPR2023-00677, Replacement Exhibit 1002: Expert Declaration of Dr. Seth Nielson, Jul. 17, 2023, 138 pgs.
*Trend Micro, Inc.* v. *Webroot Inc.*, PTAB Case No. IPR2023-00677, Patent Owner's Preliminary Response, Aug. 10, 2023, 80 pgs.
*Trend Micro, Inc.* v. *Webroot Inc.*, PTAB Case No. IPR2023-00677, Exhibit 2001: Declaration of Professor Nenad Medvidovic, Ph.D., 64 pgs.
*Trend Micro, Inc.* v. *Webroot Inc.*, PTAB Case No. IPR2023-00677, Exhibit 2002: Curriculum Vitae of Professor Nenad Medvidovic, Ph.D., 71 pgs.
*Trend Micro, Inc.* v. *Webroot Inc.*, PTAB Case No. IPR2023-00677, Exhibit 2003: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.
*Trend Micro, Inc.* v. *Webroot Inc.*, PTAB Case No. IPR2023-00677, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Trend Micro, Inc.* v. *Webroot Inc.*, PTAB Case No. IPR2023-00677, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Trend Micro, Inc.* v. *Webroot Inc.*, PTAB Case No. IPR2023-00677, Exhibit 2006: *Intellectual Ventures I LLC et al.* v. *Hewlett Packard Enterprise Co.*, No. 6:21-cv-00596- ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Trend Micro, Inc.* v. *Webroot Inc.*, PTAB Case No. IPR2023-00677, Exhibit 2007: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Trend Micro, Inc.* v. *Webroot Inc.*, PTAB Case No. IPR2023-00677, Exhibit 2008: Dani Kass, "Catching Up On Patent Litigation With Judge Albright" (Law360 Mar. 14, 2023); at https://www.law360.com/pulse/articles/1582438/print?section=pulse/courts, 3 pgs.
*Trend Micro, Inc.* v. *Webroot Inc.*, PTAB Case No. IPR2023-00677, Exhibit 2009: U.S. District Courts - Federal Court Management Statistics—Profiles—During the 12-month Periods Ending Mar. 31, 2018 Through 2023, "Table N/A—U.S. District Courts—Combined Civil and Criminal Federal Court Management Statistics (Mar. 31, 2023)," available at https://www.uscourts.gov/sites/default/files/data_tables/fcms_na_distprofile0331.2023.pdf, 95 pgs.
*Trend Micro, Inc.* v. *Webroot Inc.*, PTAB Case No. IPR2023-00677, Exhibit 2010: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Trend Micro, Inc.* v. *Webroot Inc.*, PTAB Case No. IPR2023-00677, Exhibit 2011: *Webroot, Inc. and Open Text Inc.*, v. *Trend Micro Inc.*, Case No. 6:22-cv-00239-ADA-DTG, Defendant Trend Micro's Preliminary Invalidity Contentions (W.D. Tex., Sep. 13, 2022), 125 pgs.
*Trend Micro, Inc.* v. *Webroot Inc.*, PTAB Case No. IPR2023-00677, Exhibit 2012: *Webroot, Inc. and Open Text Inc.*, v. *Trend Micro Inc.*, Case No. 6:22-cv-00239-ADA-DTG, Plaintiff's Preliminary Infringement Contentions (W.D. Tex., Jul. 13, 2022), 10 pgs.
*Trend Micro, Inc.* v. *Webroot Inc.*, PTAB Case No. IPR2023-00677, Exhibit 2013: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022), 16 pgs.
*Trend Micro, Inc.* v. *Webroot Inc.*, PTAB Case No. IPR2023-00677, Exhibit 2014: *Webroot, Inc. and Open Text Inc.*, v. *Trend Micro Inc.*, Case No. 6:22-cv-00239-ADA, Complaint for Patent Infringement, Dkt. 1 (W.D. Tex., Mar. 4, 2022), 117 pgs.
*Trend Micro, Inc.* v. *Webroot Inc.*, PTAB Case No. IPR2023-00677, Exhibit 2015: *Webroot, Inc. and Open Text Inc.*, v. *CrowdStrike, Inc. and CrowdStrike Holdings, Inc.*, Case No. 6:22-cv-00241-ADA-

(56) References Cited

OTHER PUBLICATIONS

DTG, First Amended Complaint for Patent Infringement, Dkt. 60 (W.D. Tex., Sept. 8, 2022) (excerpted), 37 pgs.
*Trend Micro, Inc.* v. *Webroot Inc.*, PTAB Case No. IPR2023-00677, Exhibit 2016: *Open Text Inc et al.*, v. *AO Kaspersky Lab*, Case No. 6:22-cv-00243-ADA-DTG, First Amended Complaint for Patent Infringement, Dkt. 80 (W.D. Tex., Oct. 27, 2022), 148 pgs.
*Trend Micro, Inc.* v. *Webroot Inc.*, PTAB Case No. IPR2023-00677, Exhibit 2017: *Webroot, Inc. and Open Text Inc.*, v. *Trend Micro Inc.*, Case No. 6:22-cv-00239-ADA-DTG, First Amended Complaint for Patent Infringement, Dkt. 53 (W.D. Tex., Sept. 7, 2022), 235 pgs.
*Trend Micro, Inc.* v. *Webroot Inc.*, PTAB Case No. IPR2023-00677, Exhibit 2018: *Webroot, Inc. and Open Text Inc.*, v. *Sophos, Ltd.*, Case No. 6:22-cv-00240-ADA-DTG, Second Amended Complaint for Patent Infringement, Dkt. 76 (W.D. Tex., Oct. 24, 2022), 184 pgs.
*Trend Micro, Inc.* v. *Webroot Inc.*, PTAB Case No. IPR2023-00677, Exhibit 2019: *Webroot, Inc. and Open Text Inc.*, v. *CrowdStrike, Inc. and CrowdStrike Holdings, Inc.*, Case No. 6:22-cv-002410ADA-DTG, Defendant's Preliminary Invalidity Contentions (W.D. Tex., Sep. 13, 2022), 62 pgs.
*Trend Micro, Inc.* v. *Webroot Inc.*, PTAB Case No. IPR2023-00677, Sotera Stipulation, Sep. 28, 23, 3 pgs.
*Trend Micro, Inc.* v. *Webroot Inc.*, PTAB Case No. IPR2023-00677, Order Conduct of Proceeding, Sep. 28, 2023, 6 pgs.
*Trend Micro, Inc.* v. *Webroot Inc.*, PTAB Case No. IPR2023-00677, Exhibit 3001: email re: Sotera stipulation, Sep. 28, 2023, 2 pgs.
*Trend Micro, Inc.* v. *Webroot Inc.*, PTAB Case No. IPR2023-00677, Decision denying institution of Inter Parties Review, Nov. 6, 2023, 24 pgs.
*AO Kaspersky Lab* v. *Webroot Inc.*, PTAB Case No. IPR2023-01199, Patent Owner Open Text Inc.'s Mandatory Notices Pursuant to 37 CFR § 42.8(b), Aug. 4, 2023, 10 pgs.
*AO Kaspersky Lab* v. *Webroot Inc.*, PTAB Case No. IPR2023-01199, Notice of Filing Date Accorded to Petition and Time for Filing Patent Owner Preliminary Response, Sep. 19, 2023, 6 pgs.
*Trend Micro, Inc.* v. *Webroot Inc.*, PTAB Case No. IPR2023-00657, Patent Owner's Preliminary Response, Jul. 17, 2023, 73 pgs.
*Trend Micro, Inc.* v. *Webroot Inc.*, PTAB Case No. IPR2023-00657, Exhibit 2001: Declaration of Professor Nenad Medvidovic, Ph.D., 59 pgs.
*Trend Micro, Inc.* v. *Webroot Inc.*, PTAB Case No. IPR2023-00657, Exhibit 2002: Curriculum Vitae of Professor Nenad Medvidovic, Ph.D., 71 pgs.
*Trend Micro, Inc.* v. *Webroot Inc.*, PTAB Case No. IPR2023-00657, Exhibit 2003: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.
*Trend Micro, Inc.* v. *Webroot Inc.*, PTAB Case No. IPR2023-00657, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Trend Micro, Inc.* v. *Webroot Inc.*, PTAB Case No. IPR2023-00657, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Trend Micro, Inc.* v. *Webroot Inc.*, PTAB Case No. IPR2023-00657, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Trend Micro, Inc.* v. *Webroot Inc.*, PTAB Case No. IPR2023-00657, Exhibit 2007: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Trend Micro, Inc.* v. *Webroot Inc.*, PTAB Case No. IPR2023-00657, Exhibit 2008: Dani Kass, "Catching Up On Patent Litigation With Judge Albright" (Law360 Mar. 14, 2023); at https://www.law360.com/pulse/articles/1582438/print?section= pulse/courts, 3 pgs.
*Trend Micro, Inc.* v. *Webroot Inc.*, PTAB Case No. IPR2023-00657, Exhibit 2009: U.S. District Courts—Federal Court Management Statistics—Pro-files-During the 12-month Periods Ending Mar. 31, 2018 through 2023, "Table N/A—U.S. District Courts-Combined Civil and Criminal Federal Court Management Statistics (Mar. 31, 2023)", available at https://www.uscourts.gov/sites/default/files/data_tables/fcms_na_distprofile0331.2023.pdf, 95 pgs.
*Trend Micro, Inc.* v. *Webroot Inc.*, PTAB Case No. IPR2023-00657, Exhibit 2010: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Trend Micro, Inc.* v. *Webroot Inc.*, PTAB Case No. IPR2023-00657, Exhibit 2011: *Webroot, Inc. and Open Text Inc.*, v. *Trend Micro Inc.*, Case No. 6:22-cv-00239-ADA- DTG, Defendant Trend Micro's Preliminary Invalidity Contentions (W.D. Tex., Sep. 13, 2022), 125 pgs.
*Trend Micro, Inc.* v. *Webroot Inc.*, PTAB Case No. IPR2023-00657, Exhibit 2012: *Webroot, Inc. and Open Text Inc.*, v. *Trend Micro Inc.*, Case No. 6:22-cv-00239-ADA- DTG, Plaintiff's Preliminary Infringement Contentions (W.D. Tex., Jul. 13, 2022), 10 pgs.
*Trend Micro, Inc.* v. *Webroot Inc.*, PTAB Case No. IPR2023-00657, Exhibit 2013: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022), 16 pgs.
*Trend Micro, Inc.* v. *Webroot Inc.*, PTAB Case No. IPR2023-00657, Exhibit 2014: *Webroot, Inc. and Open Text Inc.*, v. *Trend Micro Inc.*, Case No. 6:22-cv-00239-ADA, Complaint for Patent Infringement, Dkt. 1 (W.D. Tex., Mar. 4, 2022), 117 pgs.
*Trend Micro, Inc.* v. *Webroot Inc.*, PTAB Case No. IPR2023-00657, Exhibit 2015: *Webroot, Inc. and Open Text Inc.*, v. *CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.
*Trend Micro, Inc.* v. *Webroot Inc.*, PTAB Case No. IPR2023-00657, Exhibit 2016: *Open Text Inc et al.*, v. *AO Kaspersky Lab*, Case No. 6:22-cv-00243-ADA-DTG, First Amended Complaint for Patent Infringement, Dkt. 80 (W.D. Tex., Oct. 27, 2022), 148 pgs.
*Trend Micro, Inc.* v. *Webroot Inc.*, PTAB Case No. IPR2023-00657, Exhibit 2017: *Webroot, Inc. and Open Text Inc.*, v. *Trend Micro Inc.*, Case No. 6:22-cv-00239-ADA- DTG, First Amended Complaint for Patent Infringement, Dkt. 53 (W.D. Tex., Sept. 7, 2022), 235 pgs.
*Trend Micro, Inc.* v. *Webroot Inc.*, PTAB Case No. IPR2023-00657, Exhibit 2018: *Webroot, Inc. and Open Text Inc.*, v. *Sophos, Ltd.*, Case No. 6:22-cv-00240-ADA-DTG, Second Amended Complaint for Patent Infringement, Dkt. 76 (W.D. Tex., Oct. 24, 2022), 184 pgs.
*Trend Micro, Inc.* v. *Webroot Inc.*, PTAB Case No. IPR2023-00657, Exhibit 2019: *Webroot, Inc. and Open Text Inc.*, v. *CrowdStrike, Inc. and Crowdstrike Holdings, Inc.*, Case No. 6:22-cv-002410ADA-DTG, Defendant's Preliminary Invalidity Contentions (W.D. Tex., Sep. 13, 2022), 62 pgs.
*Trend Micro, Inc.* v. *Webroot Inc.*, PTAB Case No. IPR2023-00657, Exhibit 1017: Sotera Stipulation, Sep. 28, 2023, 3 pgs.
*Trend Micro, Inc.* v. *Webroot Inc.*, PTAB Case No. IPR2023-00657, Order Conduct of Proceeding, Sep. 28, 2023, 6 pgs.
*Trend Micro, Inc.* v. *Webroot Inc.*, PTAB Case No. IPR2023-00657, Exhibit 3001: email, Sep. 28, 2023, 2 pgs.
*Trend Micro, Inc.* v. *Webroot Inc.*, PTAB Case No. IPR2023-00657, Decision denying institution of Inter Parties Review, Oct. 13, 2023, 23 pgs.
*AO Kaspersky Lab* v. *Webroot Inc.*, PTAB Case No. IPR2023-01011, Patent Owner Open Text Inc.'s Mandatory Notices Pursuant to 37 CFR § 42.8(b), Jun. 23, 2023, 9 pgs.
*AO Kaspersky Lab* v. *Webroot Inc.*, PTAB Case No. IPR2023-01011, Patent Owner's Preliminary Response, Sep. 11, 2023, 6 pgs.

(56) References Cited

OTHER PUBLICATIONS

*AO Kaspersky Lab* v. *Webroot Inc.*, PTAB Case No. IPR2023-01011, Exhibit 2001: *CrowdStrike, Inc.* v. *Open Text Inc.*, IPR2023-00126, Paper 11 (PTAB May 19, 2023), 19 pgs.
*AO Kaspersky Lab* v. *Webroot Inc.*, PTAB Case No. IPR2023-01011, Exhibit 2002: *Webroot, Inc. and Open Text Inc.* v. *AO Kaspersky Lab*, Case No. 6:22-cv-00243-ADA-DTG, Wavier of Summons AO Kaspersky Labs, Dkt. 16 (E.D. Tex May 24, 2022), 1 pg.
*Sophos Ltd. and Sophos Inc.* v. *Webroot Inc.*, PTAB Case No. IPR2023-00731, Patent Owner's Preliminary Response, Aug. 10, 2023, 75 pgs.
*Sophos Ltd. and Sophos Inc.* v. *Webroot Inc.*, PTAB Case No. IPR2023-00731, Exhibit 2001: Declaration of Professor Ron Schnell, 42 pgs.
*Sophos Ltd. and Sophos Inc.* v. *Webroot Inc.*, PTAB Case No. IPR2023-00731, Exhibit 2002: Curriculum Vitae of Professor Ron Schnell, 5 pgs.
*Sophos Ltd. and Sophos Inc.* v. *Webroot Inc.*, PTAB Case No. IPR2023-00731, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Sophos Ltd. and Sophos Inc.* v. *Webroot Inc.*, PTAB Case No. IPR2023-00731, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Sophos Ltd. and Sophos Inc.* v. *Webroot Inc.*, PTAB Case No. IPR2023-00731, Exhibit 2005: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Sophos Ltd. and Sophos Inc.* v. *Webroot Inc.*, PTAB Case No. IPR2023-00731, Exhibit 2006: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Sophos Ltd. and Sophos Inc.* v. *Webroot Inc.*, PTAB Case No. IPR2023-00731, Exhibit 2007: Dani Kass, "Catching Up On Patent Litigation With Judge Albright" (Law360 Mar. 14, 2023); https://www.law360.com/pulse/articles/1582438/print?section=pulse/courts, 3 pgs.
*Sophos Ltd. and Sophos Inc.* v. *Webroot Inc.*, PTAB Case No. IPR2023-00731, Exhibit 2008: *Webroot, Inc. and Open Text Inc.*, v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.
*Sophos Ltd. and Sophos Inc.* v. *Webroot Inc.*, PTAB Case No. IPR2023-00731, Exhibit 2009: U.S. District Courts-Federal Court Management Statistics-Profiles-During the 12-Month Periods Ending Mar. 31, 2018 through 2023, "Table N/A-U.S. District Courts-Combined Civil and Criminal Federal Court Management Statistics (Mar. 31, 2023)", available at https://www.uscourts.gov/sites/default/files/data_tables/fcms_na_distprofile0331.2023.pdf, 95 pgs.
*Sophos Ltd. and Sophos Inc.* v. *Webroot Inc.*, PTAB Case No. IPR2023-00731, Exhibit 2010: *Webroot, Inc. and Open Text Inc.*, v. *AO Kaspersky Lab et al.*, Case No. 6:22-cv-243-ADA-DTG, Jul. 25, 2023 Claim Construction Order, Dkt. 391 (W.D. Tex. Jul. 25, 2022), 19 pgs.
*Sophos Ltd. and Sophos Inc.* v. *Webroot Inc.*, PTAB Case No. IPR2023-00731, Exhibit 2011: *Webroot, Inc. and Open Text Inc.*, v. *CrowdStrike, Inc. and CrowdStrike Holdings, Inc.*, Case No. 6:22-cv-00241-ADA-DTG, Defendant's Preliminary Invalidity Contentions (W.D. Tex., Feb. 21, 2023) (excerpted), 17 pgs.
*Sophos Ltd. and Sophos Inc.* v. *Webroot Inc.*, PTAB Case No. IPR2023-00731, Exhibit 2012: *Webroot, Inc. and Open Text Inc.*, v.

*Trend Micro, Inc.*, Case No. 6:22-cv-00239-ADA-DTG, Defendant's Preliminary Invalidity Contentions (W.D. Tex., Feb. 21, 2023) (excerpted), 15 pgs.
*Sophos Ltd. and Sophos Inc.* v. *Webroot Inc.*, PTAB Case No. IPR2023-00731, Exhibit 2013: *Webroot, Inc. and Open Text Inc.*, v. *AO Kaspersky Lab*, Case No. 6:22-cv-00243-ADA-DTG, Defendant's Preliminary Invalidity Contentions Appendix C (W.D. Tex., Feb. 21, 2023) (excerpted), 4 pgs.
*Sophos Ltd. and Sophos Inc.* v. *Webroot Inc.*, PTAB Case No. IPR2023-00731, Exhibit 2014: Website: About ResearchGate, https://www.researchgate.net/about, 7 pgs.
*Sophos Ltd. and Sophos Inc.* v. *Webroot Inc.*, PTAB Case No. IPR2023-00731, Exhibit 2015: Website: "Google Announces Beta Release of Google Scholar," Univ. of Calif. (Nov. 17, 2004); available at https://osc.universityofcalifornia.edu/2004/11/google-announces-beta-release-of-google-scholar/, 2 pgs.
*Sophos Ltd. and Sophos Inc.* v. *Webroot Inc.*, PTAB Case No. IPR2023-00731, Revised Mandatory Notices, Aug. 30, 2023, 5 pgs.
*Sophos Ltd. and Sophos Inc.* v. *Webroot Inc.*, PTAB Case No. IPR2023-00731, Board Exhibit 3001, Sep. 18, 2023, 3 pgs.
*Sophos Ltd. and Sophos Inc.* v. *Webroot Inc.*, PTAB Case No. IPR2023-00731, Panel Change Order, Sep. 18, 2023, 3 pgs.
*Crowdstrike, Inc.* v. *Open Text Inc.*, PTAB Case No. IPR2023-01052, Notice of Filing Date Accorded to Petition and Time for Filing Patent Owner Preliminary Response, Aug. 23, 2023, 6 pgs.
*Sophos Ltd. and Sophos Inc.* v. *Webroot Inc.*, PTAB Case No. IPR2023-00732, Patent Owner's Preliminary Response, Aug. 10, 2023, 75 pgs.
*Sophos Ltd. and Sophos Inc.* v. *Webroot Inc.*, PTAB Case No. IPR2023-00732, Exhibit 2001: Declaration of Professor Ron Schnell, 41 pgs.
*Sophos Ltd. and Sophos Inc.* v. *Webroot Inc.*, PTAB Case No. IPR2023-00732, Exhibit 2002: Curriculum Vitae of Professor Ron Schnell, 5 pgs.
*Sophos Ltd. and Sophos Inc.* v. *Webroot Inc.*, PTAB Case No. IPR2023-00732, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Sophos Ltd. and Sophos Inc.* v. *Webroot Inc.*, PTAB Case No. IPR2023-00732, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Sophos Ltd. and Sophos Inc.* v. *Webroot Inc.*, PTAB Case No. IPR2023-00732, Exhibit 2005: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Sophos Ltd. and Sophos Inc.* v. *Webroot Inc.*, PTAB Case No. IPR2023-00732, Exhibit 2006: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Sophos Ltd. and Sophos Inc.* v. *Webroot Inc.*, PTAB Case No. IPR2023-00732, Exhibit 2007: Dani Kass, "Catching Up On Patent Litigation With Judge Albright" (Law360 Mar. 14, 2023); https://www.law360.com/pulse/articles/1582438/print?section=pulse/courts, 3 pgs.
*Sophos Ltd. and Sophos Inc.* v. *Webroot Inc.*, PTAB Case No. IPR2023-00732, Exhibit 2008: *Webroot, Inc. and Open Text Inc.*, v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.
*Sophos Ltd. and Sophos Inc.* v. *Webroot Inc.*, PTAB Case No. IPR2023-00732, Exhibit 2009: U.S. District Courts-Federal Court Management Statistics-Profiles-During the 12-Month Periods Ending Mar. 31, 2018 through 2023, "Table N/A-U.S. District Courts-Combined Civil and Criminal Federal Court Management Statistics (Mar. 31, 2023)", available at https://www.uscourts.gov/sites/default/files/data_tables/fcms_na_d istprofile0331.2023.pdf, 95 pgs.

(56)         References Cited

OTHER PUBLICATIONS

*Sophos Ltd. and Sophos Inc.* v. *Webroot Inc.*, PTAB Case No. IPR2023-00732, Exhibit 2010: *Webroot, Inc. and Open Text Inc.*, v. *AO Kaspersky Lab et al.*, Case No. 6:22-cv-243-ADA-DTG, Jul. 25, 2023 Claim Construction Order, Dkt. 391 (W.D. Tex. Jul. 25, 2022), 19 pgs.

*Sophos Ltd. and Sophos Inc.* v. *Webroot Inc.*, PTAB Case No. IPR2023-00732, Exhibit 2011: *Webroot, Inc. and Open Text Inc.*, v. *CrowdStrike, Inc. and CrowdStrike Holdings, Inc.*, Case No. 6:22-cv-00241-ADA-DTG, Defendant's Preliminary Invalidity Contentions (W.D. Tex., Feb. 21, 2023) (excerpted), 17 pgs.

*Sophos Ltd. and Sophos Inc.* v. *Webroot Inc.*, PTAB Case No. IPR2023-00732, Exhibit 2012: *Webroot, Inc. and Open Text Inc.*, v. *Trend Micro, Inc.*, Case No. 6:22-cv-00239- ADA-DTG, Defendant's Preliminary Invalidity Contentions (W.D. Tex., Feb. 21, 2023) (excerpted), 15 pgs.

*Sophos Ltd. and Sophos Inc.* v. *Webroot Inc.*, PTAB Case No. IPR2023-00732, Exhibit 2013: *Webroot, Inc. and Open Text Inc.*, v. *AO Kaspersky Lab*, Case No. 6:22-cv-00243-ADA-DTG, Defendant's Preliminary Invalidity Contentions Appendix C (W.D. Tex., Feb. 21, 2023) (excerpted), 4 pgs.

*Sophos Ltd. and Sophos Inc.* v. *Webroot Inc.*, PTAB Case No. IPR2023-00732, Exhibit 2014: Website: About ResearchGate, https://www.researchgate.net/about, 7 pgs.

*Sophos Ltd. and Sophos Inc.* v. *Webroot Inc.*, PTAB Case No. IPR2023-00732, Exhibit 2015: Website: "Google Announces Beta Release of Google Scholar," Univ. of Calif. (Nov. 17, 2004); available at https://osc.universityofcalifornia.edu/2004/11/google-announces-beta-release-of-google-scholar/, 2 pgs.

*Sophos Ltd. and Sophos Inc.* v. *Webroot Inc.*, PTAB Case No. IPR2023-00732, Exhibit 2016: U.S. Pat. No. 8,201,243 File History (Sophos Ex. 1002 IPR2023- 00731), 423 pgs.

*Sophos Ltd. and Sophos Inc.* v. *Webroot Inc.*, PTAB Case No. IPR2023-00732, Revised Mandatory Notices, Aug. 30, 2023, 5 pgs.

*Sophos Ltd. and Sophos Inc.* v. *Webroot Inc.*, PTAB Case No. IPR2023-00732, Panel Change Order, Sep. 12, 2023, 3 pgs.

*Sophos Ltd. and Sophos Inc.* v. *Webroot Inc.*, PTAB Case No. IPR2023-00732, Board Exhibit 3001, Sep. 15, 2023, 3 pgs.

*Sophos Ltd. and Sophos Inc.* v. *Webroot Inc.*, PTAB Case No. IPR2023-00732, Order Conduct of the Proceeding, Oct. 2, 2023, 3 pgs.

*Sophos Ltd. and Sophos Inc.* v. *Webroot Inc.*, PTAB Case No. IPR2023-00732, Motion to Dismiss Petition for Inter Partes Review, Oct. 10, 2023, 10 pgs.

*Sophos Ltd. and Sophos Inc.* v. *Webroot Inc.*, PTAB Case No. IPR2023-00732, Patent Owner's Updated Exhibit List, Oct. 13, 2023, 6 pgs.

*Sophos Ltd. and Sophos Inc.* v. *Webroot Inc.*, PTAB Case No. IPR2023-00732, Exhibit 2017: email from Best to Eutermoser, Oct. 13, 2023, 3 pgs.

*Sophos Ltd. and Sophos Inc.* v. *Webroot Inc.*, PTAB Case No. IPR2023-00732, Patent Owner's Opposition to Petitioners' Motion to Dismiss Petition, Oct. 13, 2023, 9 pgs.

*Sophos Ltd. and Sophos Inc.* v. *Webroot Inc.*, PTAB Case No. IPR2023-00732, Exhibit 3002, Oct. 16, 2023, 3 pgs.

*Sophos Ltd. and Sophos Inc.* v. *Webroot Inc.*, PTAB Case No. IPR2023-00732, Order denying Motion to Dismiss, Nov. 1, 2023, 6 pgs.

*Sophos Ltd. and Sophos Inc.* v. *Webroot Inc.*, PTAB Case No. IPR2023-00732, Decision denying Institution of Inter Partes Review, Nov. 2, 2023, 20 pgs.

*Crowdstrike, Inc.* v. *Open Text Inc.*, PTAB Case No. IPR2023-01051, Patent Owner Open Text Inc.'s Mandatory Notices Pursuant to 37 CFR § 42.8(b), Jul. 14, 2023, 6 pgs.

*Crowdstrike, Inc.* v. *Open Text Inc.*, PTAB Case No. IPR2023-01051, Notice of Filing Date Accorded to Petition and Time for Filing Patent Owner Preliminary Response, Aug. 23, 2023, 6 pgs.

*Crowdstrike, Inc.* v. *Open Text Inc.*, PTAB Case No. IPR2023-01158, Notice of Filing Date Accorded to Petition and Time for Filing Patent Owner Preliminary Response, Aug. 23, 2023, 6 pgs.

*Crowdstrike, Inc.* v. *Open Text Inc.*, PTAB Case No. IPR2023-01159, Patent Owner Open Text Inc.'s Mandatory Notices Pursuant to 37 CFR § 42.8(b), Jul. 21, 2023, 9 pgs.

*Crowdstrike, Inc.* v. *Open Text Inc.*, PTAB Case No. IPR2023-01159, Notice of Filing Date Accorded to Petition and Time for Filing Patent Owner Preliminary Response, Aug. 23, 2023, 6 pgs.

*Forcepoint LLC* v. *Open Text Inc.*, PTAB Case No. IPR2023-00786, Patent Owner's Preliminary Response to Petition for Inter Partes Review U.S. Pat. No. 10,025,928; Aug. 17, 2023, 59 pgs.

*Forcepoint LLC* v. *Open Text Inc.*, PTAB Case No. IPR2023-00786, Exhibit 2001: Declaration of Professor Alessandro Orso, Ph.D., 46 pgs.

*Forcepoint LLC* v. *Open Text Inc.*, PTAB Case No. IPR2023-00786, Exhibit 2002: Curriculum Vitae of Alessandro Orso, Ph.D., 52 pgs.

*Forcepoint LLC* v. *Open Text Inc.*, PTAB Case No. IPR2023-00786, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Forcepoint LLC* v. *Open Text Inc.*, PTAB Case No. IPR2023-00786, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Forcepoint LLC* v. *Open Text Inc.*, PTAB Case No. IPR2023-00786, Exhibit 2005: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Forcepoint LLC* v. *Open Text Inc.*, PTAB Case No. IPR2023-00786, Exhibit 2006: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.

*Forcepoint LLC* v. *Open Text Inc.*, PTAB Case No. IPR2023-00786, Exhibit 2007: Dani Kass, "Catching Up On Patent Litigation With Judge Albright" (Law360 Mar. 14, 2023); https://www.law360.com/pulse/articles/1582438/print?section=pulse/courts, 3 pgs.

*Forcepoint LLC* v. *Open Text Inc.*, PTAB Case No. IPR2023-00786, Exhibit 2008: U.S. District Courts-Federal Court Management Statistics-Profiles-During the 12-Month Periods Ending Mar. 31, 2018 Through 2023, "Table N/A-U.S. District Courts-Combined Civil and Criminal Federal Court Management Statistics (Mar. 31, 2023)", available at https://www.uscourts.gov/sites/default/files/data_tables/fcms_na_distpro file0331.2023.pdf, 95 pgs.

*Forcepoint LLC* v. *Open Text Inc.*, PTAB Case No. IPR2023-00786, Exhibit 2009: *Webroot, Inc. and Open Text Inc.*, v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.

*Forcepoint LLC* v. *Open Text Inc.*, PTAB Case No. IPR2023-00786, Exhibit 2010: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.

*Forcepoint LLC* v. *Open Text Inc.*, PTAB Case No. IPR2023-00786, Exhibit 2011: *Webroot, Inc. et al.* v. *AO Kaspersky Lab et al.*, No 6-22-cv-00243, Dkt. 121, Second Amended Complaint For Patent Infringement (Forcepoint LLC, Case No. 22-cv-00342-ADA-DTG) (W.D. Tex. Dec. 9, 2022), 338 pgs.

*Forcepoint LLC* v. *Open Text Inc.*, PTAB Case No. IPR2023-00786, Exhibit 2012: *Webroot, Inc. and Open Text Inc.*, v. *Forcepoint LLC*, Case No. 6:22-cv-342-ADA-DTG, Defendant Forcepoint LLC's Preliminary Invalidity Contentions (W.D. Tex. Sep. 13, 2022) (excerpted), 9 pgs.

*Forcepoint LLC* v. *Open Text Inc.*, Case No. IPR2023-00784, Patent Owner's Preliminary Response to Petition for Inter Partes Review for U.S. Pat. No. 8,438,386; Aug. 17, 2023, 62 pgs.

*Forcepoint LLC* v. *Open Text Inc.*, Case No. IPR2023-00784, Exhibit 2001: Declaration of Professor Alessandro Orso, Ph. D., 49 pgs.

(56)  References Cited

OTHER PUBLICATIONS

*Forcepoint LLC* v. *Open Text Inc.*, Case No. IPR2023-00784, Exhibit 2002: Curriculum Vitae of Professor Alessandro Orso, Ph. D., 52 pgs.
*Forcepoint LLC* v. *Open Text Inc.*, Case No. IPR2023-00784, Exhibit 2003: Sonrai *Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Forcepoint LLC* v. *Open Text Inc.*, Case No. IPR2023-00784, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Forcepoint LLC* v. *Open Text Inc.*, Case No. IPR2023-00784, Exhibit 2005: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Forcepoint LLC* v. *Open Text Inc.*, Case No. IPR2023-00784, Exhibit 2006: *Webroot, Inc. and Open Text Inc.*, v. *AO Kaspersky Lab et al.*, Case No. 6:22-CV-243-ADA-DTG, Dec. 9, 2022 Transcript of Motions Hearing, Dkt. 133 (W.D. Tex. Dec. 15, 2022) (excerpted), 7 pgs.
*Forcepoint LLC* v. *Open Text Inc.*, Case No. IPR2023-00784, Exhibit 2007: Dani Kass, "Catching Up On Patent Litigation With Judge Albright" (Law360 Mar. 14, 2023); https://www.law360.com/pulse/articles/1582438/print?section=pulse/courts, 3 pgs.
*Forcepoint LLC* v. *Open Text Inc.*, Case No. IPR2023-00784, Exhibit 2008: U.S. District Courts-Federal Court Management Statistics-Profiles-During the 12- Month Periods Ending Mar. 31, 2018 Through 2023, "Table N/A-U.S. District Courts-Combined Civil and Criminal Federal Court Management Statistics (Mar. 31, 2023)", available at https://www.uscourts.gov/sites/default/files/ data_tables/fcms_na_distprofile0331.2023.pdf, 95 pgs.
*Forcepoint LLC* v. *Open Text Inc.*, Case No. IPR2023-00784, Exhibit 2009: *Webroot, Inc. and Open Text Inc.*, v. *AO Kaspersky Lab et al.*, Case No. 6:22-CV-243-ADA-DTG, Order Granting Fourth Amended Scheduling Order, Dkt. 160 (W.D. Tex. Jan. 22, 2023), 7 pgs.
*Forcepoint LLC* v. *Open Text Inc.*, Case No. IPR2023-00784, Exhibit 2010: *Webroot, Inc. and Open Text Inc.*, v. *AO Kaspersky Lab et al.*, Case No. 6:22-CV-243-ADA-DTG, Claim Construction Order, Dkt. 236 (W.D. Tex. Mar. 16, 2023), 20 pgs.
*Forcepoint LLC* v. *Open Text Inc.*, Case No. IPR2023-00784, Exhibit 2011: *Webroot, Inc. and Open Text Inc.*, v. *Forcepoint LLC*, Case No. 6:22-cv-342-ADA-DTG, Defendant Forcepoint LLC's Preliminary Invalidity Contentions (W.D. Tex. Sep. 13, 2022) (excerpted), 9 pgs.
*Forcepoint LLC* v. *Open Text Inc.*, Case No. IPR2023-00784, Exhibit 2012: *Webroot, Inc et al.* v. *AO Kaspersky Lab et al.*, No 6-22-cv-00243, Dkt. 121, Second Amended Complaint For Patent Infringement (Forcepoint LLC, Case No. 22-cv-00342-ADA-DTG) (W.D. Tex. Dec. 9, 2022), 338 pgs.
*Sophos Ltd. and Sophos Inc.* v. *Webroot Inc.*, PTAB Case No. IPR2023-00528, Decision denying institution of Inter Parties Review, Aug. 14, 2023, 23 pgs.
*Sophos Ltd. and Sophos Inc.* v. *Webroot Inc.*, PTAB Case No. IPR2023-00528, Board Exhibit 3001: Email Request for Leave to File Reply to Patent Owner's Preliminary Response, 2 pgs., Jul. 13, 2023.
*Sophos Ltd. and Sophos Inc.* v. *Webroot Inc.*, PTAB Case No. IPR2023-00528, Petitioner's Revised Mandatory Notices, 4 pgs., , Aug. 30, 2023.
*Trend Micro, Inc.* v. *Webroot Inc.*, PTAB Case No. IPR2023-00662, Patent Owner's Preliminary Response, Jul. 17, 2023, 72 pgs.
*Trend Micro, Inc.* v. *Webroot Inc.*, PTAB Case No. IPR2023-00662, Exhibit 2001: Declaration Of Sam Malek, Ph.D., 45 pgs.
*Trend Micro, Inc.* v. *Webroot Inc.*, PTAB Case No. IPR2023-00662, Exhibit 2002: Curriculum Vitae of Sam Malek, Ph.D., 36 pgs.
*Trend Micro, Inc.* v. *Webroot Inc.*, PTAB Case No. IPR2023-00662, Exhibit 2003: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., 12/27/ 2022, 9 pgs.
*Trend Micro, Inc.* v. *Webroot Inc.*, PTAB Case No. IPR2023-00662, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., 1018/2022, 7 pgs.
*Trend Micro, Inc.* v. *Webroot Inc.*, PTAB Case No. IPR2023-00662, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022, 7 pgs.
*Trend Micro, Inc.* v. *Webroot Inc.*, PTAB Case No. IPR2023-00662, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Trend Micro, Inc.* v. *Webroot Inc.*, PTAB Case No. IPR2023-00662, Exhibit 2007: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Trend Micro, Inc.* v. *Webroot Inc.*, PTAB Case No. IPR2023-00662, Exhibit 2008: Dani Kass, "Catching Up On Patent Litigation With Judge Albright" (Law360 Mar. 14, 2023); https://www.law360.com/pulse/articles/1582438/print?section=pulse/courts, 3 pgs.
*Trend Micro, Inc.* v. *Webroot Inc.*, PTAB Case No. IPR2023-00662, Exhibit 2009: *Webroot, Inc., Open Text Inc.*, v. *AO Kaspersky Lab et al.*, Case No. 6:22-cv-00243- ADA-DTG, Order Granting Third Amended Scheduling Order, Dkt. 142 (W.D. Tex., Dec. 27, 2022, 9 pgs.
*Trend Micro, Inc.* v. *Webroot Inc.*, PTAB Case No. IPR2023-00662, Exhibit 2010: United States Courts, Statistics & Reports, Federal Court Management Statistics-Comparison Within Circuit-During the 12-Month Period Ending Jun. 30, 2022, "Comparison of Districts Within the First Circuit - 12-Month Period Ending Jun. 30, 2022," available at https://www.uscourts.gov/sites/default/files/fcms_na_distcomparison0630.2022_0.pdf, 11 pgs.
*Trend Micro, Inc.* v. *Webroot Inc.*, PTAB Case No. IPR2023-00662, Exhibit 2011: *Webroot, Inc. and Open Text Inc.*, v. *Sophos Ltd.*, Case No. 6:22-cv-00240-ADA, Complaint for Patent Infringement, Dkt. 1 (W.D. Tex., Mar. 4, 2022), 144 pgs.
*Trend Micro, Inc.* v. *Webroot Inc.*, PTAB Case No. IPR2023-00662, Exhibit 2012: *Webroot, Inc. and Open Text Inc.*, v. *ForcePoint LLC*, Case No. 6:22-cv-00342-ADA-DTG, Defendant ForcePoint LLC's Preliminary Invalidity Contentions (W.D. Tex., Sep. 13, 2022), 149 pgs.
*Trend Micro, Inc.* v. *Webroot Inc.*, PTAB Case No. IPR2023-00662, Exhibit 2013: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022), 127 pgs.
*Trend Micro, Inc.* v. *Webroot Inc.*, PTAB Case No. IPR2023-00662, Exhibit 2014: Webroot, Inc. and Open Text Inc., v. Trend Micro Inc., Case No. 6:22-cv-00239-ADA-DTG, Defendant's Preliminary Invalidity Contentions (W.D. Tex., Sep. 13, 2022), 125 pgs.
*Trend Micro, Inc.* v. *Webroot Inc.*, PTAB Case No. IPR2023-00662, Exhibit 2015: *Webroot, Inc. and Open Text Inc.*, v. *AO Kaspersky Lab*, Case No. 6:22-cv-00243-ADA-DTG, Defendant's Preliminary Invalidity Contentions Appendix A (W.D. Tex., Sep. 14, 2022), 8 pgs.
*Trend Micro, Inc.* v. *Webroot Inc.*, PTAB Case No. IPR2023-00662, Exhibit 2016: *Webroot, Inc. and Open Text Inc.*, v. *CrowdStrike, Inc. and CrowdStrike Holdings, Inc.*, Case No. 6:22-cv-00241-ADA-DTG, Defendant's Preliminary Invalidity Contentions (W.D. Tex., Sep. 13, 2022), 62 pgs.

(56)                    References Cited

OTHER PUBLICATIONS

*Trend Micro, Inc.* v. *Webroot Inc.*, PTAB Case No. IPR2023-00662, Exhibit 2017: Dec. 9, 2022 excerpt from discovery hearing transcript, 2 pgs.
*Trend Micro, Inc.* v. *Webroot Inc.*, PTAB Case No. IPR2023-00662, Exhibit 1020: Sotera Stipulation, Sep. 28, 2023, 3 pgs.
*Trend Micro, Inc.* v. *Webroot Inc.*, PTAB Case No. IPR2023-00662, Order Conduct of the Proceeding, Sep. 28, 2023, 6 pgs.
*Trend Micro, Inc.* v. *Webroot Inc.*, PTAB Case No. IPR2023-00662, Exhibit 3001: Email re: Sotera stipulation, Sep. 28, 2023, 2 pgs.
*Trend Micro, Inc.* v. *Webroot Inc.*, PTAB Case No. IPR2023-00662, Decision denying institution of Inter Parties Review, Oct. 13, 2023, 20 pgs.
*Sophos Ltd. and Sophos Inc.* v. *Webroot Inc.*, PTAB Case No. PGR2023-00031, Patent Owner's Preliminary Response, Sep. 6, 2023, 75 pgs.
*Sophos Ltd. and Sophos Inc.* v. *Webroot Inc.*, PTAB Case No. PGR2023-00031, Exhibit 2001: Declaration Of Sam Malek, Ph.D., 52 pgs.
*Sophos Ltd. and Sophos Inc.* v. *Webroot Inc.*, PTAB Case No. PGR2023-00031, Exhibit 2002: Curriculum Vitae of Sam Malek, Ph.D., 36 pgs.
*Sophos Ltd. and Sophos Inc.* v. *Webroot Inc.*, PTAB Case No. PGR2023-00031, Exhibit 2003: *Webroot, Inc., Open Text Inc.*, v. *AO Kaspersky Lab et al.*, Case No. 6:22-cv-00243-ADA-DTG, Claim Construction Order, Dkt. 391 (W.D. Tex Jul. 25, 2023), 19 pgs.
*Sophos Ltd. and Sophos Inc.* v. *Webroot Inc.*, PTAB Case No. PGR2023-00031, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Sophos Ltd. and Sophos Inc.* v. *Webroot Inc.*, PTAB Case No. PGR2023-00031, Exhibit 2005: *mCom IP, LLC* v. *Cisco Systems, Inc.*, Case No. 6:22-cv-0026-ADA, Order Denying Defendant's Motion to Stay Pending Inter Partes Review, Dkt. 42 (W.D. Tex., Oct. 20, 2022), 7 pgs.
*Sophos Ltd. and Sophos Inc.* v. *Webroot Inc.*, PTAB Case No. PGR2023-00031, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Sophos Ltd. and Sophos Inc.* v. *Webroot Inc.*, PTAB Case No. PGR2023-00031, Exhibit 2007: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Sophos Ltd. and Sophos Inc.* v. *Webroot Inc.*, PTAB Case No. PGR2023-00031, Exhibit 2008: Dani Kass, "Catching Up On Patent Litigation With Judge Albright" (Law360 Mar. 14, 2023); https://www.law360.com/pulse/articles/1582438/print?section= pulse/courts, 3 pgs.
*Sophos Ltd. and Sophos Inc.* v. *Webroot Inc.*, PTAB Case No. PGR2023-00031, Exhibit 2009: U.S. District Courts-Federal Court Management Statistics- Profiles-During the 12-Month Periods Ending Mar. 31, 2018 Through 2023, "Table N/A-U.S. District Courts-Combined Civil and Criminal Federal Court Management Statistics (Mar. 31, 2023)", available at https://www.uscourts.gov/sites/default/files/data_tables/fcms_na_distprofile0331.2023.pdf, 95 pgs.
*Sophos Ltd. and Sophos Inc.* v. *Webroot Inc.*, PTAB Case No. PGR2023-00031, Exhibit 2010: *Webroot, Inc., Open Text Inc.*, v. *AO Kaspersky Lab et al.*, Case No. 6:22-cv-00243-ADA-DTG, Order Granting Fifth Amended Scheduling Order, Dkt. 252 (W.D. Tex., Mar. 29, 2023), 9 pgs.
*Sophos Ltd. and Sophos Inc.* v. *Webroot Inc.*, PTAB Case No. PGR2023-00031, Exhibit 2011: *Webroot, Inc. and Open Text Inc.*, v. *Sophos Ltd.*, Case No. 6:22-cv-00240-ADA, Second Amended Complaint for Patent Infringement, Dkt. 76 (W.D. Tex., Oct. 24, 2022), 184 pgs.

*Sophos Ltd. and Sophos Inc.* v. *Webroot Inc.*, PTAB Case No. PGR2023-00031, Exhibit 2012: *Webroot, Inc. and Open Text Inc.*, v. *Sophos Ltd.*, Case No. 6:22-cv-00240-ADA-DTG, Defendant Sophos Ltd.'s Preliminary Invalidity Contentions For Patents Plaintiffs Added by Amendment (W.D. Tex., Feb. 21, 2023) (excerpted), 7 pgs.
*Sophos Ltd. and Sophos Inc.* v. *Webroot Inc.*, PTAB Case No. PGR2023-00031, Exhibit 2013: *Webroot, Inc. and Open Text Inc.*, v. *CrowdStrike, Inc. and CrowdStrike Holdings, Inc.*, Case No. 6:22-cv-00241-ADA-DTG, Crowdstrike's Preliminary Invalidity Contentions (Patents Asserted by Amendment) (W.D. Tex., Feb. 21, 2023) (excerpted), 8 pgs.
*Sophos Ltd. and Sophos Inc.* v. *Webroot Inc.*, PTAB Case No. PGR2023-00031, Exhibit 2014: *Webroot, Inc. and Open Text Inc.*, v. *Trend Micro Inc.*, Case No. 6:22-cv-00239-ADA-DTG, Defendant's Preliminary Invalidity Contentions (W.D. Tex., Feb. 21, 2023) (excerpted), 9 pgs.
*Sophos Ltd. and Sophos Inc.* v. *Webroot Inc.*, PTAB Case No. PGR2023-00031, Exhibit 2015: *Webroot, Inc. and Open Text Inc.*, v. *AO Kaspersky Lab*, Case No. 6:22-cv-00243-ADA-DTG, Defendant's AO Kaspersky Lab's Pre-liminary Invalidity Contentions (W.D. Tex., Feb. 21, 2023) (excerpted), 4 pgs.
*Sophos Ltd. and Sophos Inc.* v. *Webroot Inc.*, PTAB Case No. PGR2023-00031, Exhibit 2016: *Webroot, Inc. and Open Text Inc.*, v. *AO Kaspersky Lab*, Case No. 6:22-cv-00243-ADA-DTG, Opening Claim Construction Brief From: [Defendants], Dkt. 86 (W.D. Tex., Oct. 28, 2022), 84 pgs.
*Sophos Ltd. and Sophos Inc.* v. *Webroot Inc.*, PTAB Case No. PGR2023-00031, Exhibit 2017: Microsoft Computer Dictionary, (Fifth Ed. Microsoft 2012), p. 36, 4 pgs.
*Sophos Ltd. and Sophos Inc.* v. *Webroot Inc.*, PTAB Case No. PGR2023-00031, Exhibit 2018: Decimal-Binary-Octal-Hex -ASCII Conversion Chart, available at https://www.eecis.udel.edu/~amer/CISC651/ASCII-Conversion-Chart.pdf., 1 pg.
*Sophos Ltd. and Sophos Inc.* v. *Webroot Inc.*, PTAB Case No. PGR2023-00031, Exhibit 2019: Microsoft, String to numberic value functions, available at https://learn.microsoft.com/en-us/cpp/c-runtime-library/string-to-numeric-value-functions?view=msvc-140, 3 pgs.
*AO Kaspersky Lab* v. *Webroot Inc.*, PTAB Case No. IPR2023-01160, Patent Owner Open Text Inc.'s Mandatory Notices Pursuant to 37 CFR § 42.8(b), Jul. 21, 2023, 10 pgs.
*AO Kaspersky Lab* v. *Webroot Inc.*, PTAB Case No. IPR2023-01160, Notice of Filing Date Accorded to Petition and Time for Filing Patent Owner Preliminary Response, Aug. 23, 2023, 6 pgs.
*AO Kaspersky Lab* v. *Webroot Inc.*, PTAB Case No. IPR2023-01160, Corrected Exhibit 1001: U.S. Pat. No. 11,409,869, Aug. 9, 2022, 16 pgs.
*AO Kaspersky Lab* v. *Webroot Inc.*, PTAB Case No. IPR2023-01160, Corrected Exhibit 1002: Declaration of V.S. Subrahmanian, Ph.D. under 37 C.F.R. §1.68, 145 pgs.
*AO Kaspersky Lab* v. *Webroot Inc.*, PTAB Case No. IPR2023-01160, Corrected Exhibit 1003: Curriculum Vitae of V.S. Subrahmanian, Ph.D., 77 pgs.
*AO Kaspersky Lab* v. *Webroot Inc.*, PTAB Case No. IPR2023-01160, Corrected Exhibit 1004: File History of U.S. Pat. No. 11,409,869, 345 pgs.
*AO Kaspersky Lab* v. *Webroot Inc.*, PTAB Case No. IPR2023-01160, Corrected Exhibit 1005: U.S. Patent Publication No. 20150213376, Ideses, published Jul. 30, 2015, 19 pgs.
*AO Kaspersky Lab* v. *Webroot Inc.*, PTAB Case No. IPR2023-01160, Corrected Exhibit 1006: U.S. Patent Publication No. 20160154960, Sharma, published Jun. 2, 2016, 29 pgs.
*AO Kaspersky Lab* v. *Webroot Inc.*, PTAB Case No. IPR2023-01160, Corrected Exhibit 1007: Charles Ledoux & Arun Lakhotia, Malware and Machine Learning, in Intelligent Methods Cyber Warfare 1 (2014), 42 pgs.
*AO Kaspersky Lab* v. *Webroot Inc.*, PTAB Case No. IPR2023-01160, Corrected Exhibit 1008: U.S. Patent Publication No. 20150213365, Ideses et al., 18 pgs.
*AO Kaspersky Lab* v. *Webroot Inc.*, PTAB Case No. IPR2023-01160, Corrected Exhibit 1009: Claim Construction Order, Mar. 16, 2023, Case No. 6:22-CV-00243-ADA-DTG, 20 pgs.

(56) References Cited

OTHER PUBLICATIONS

*AO Kaspersky Lab* v. *Webroot Inc.*, PTAB Case No. IPR2023-01160, Corrected Exhibit 1010: Joint Stipulation Reserving Appellate Rights, Apr. 12, 2023, Case No. 6:22-CV-00243-ADA-DTG, 9 pgs.
*AO Kaspersky Lab* v. *Webroot Inc.*, PTAB Case No. IPR2023-01160, Corrected Exhibit 1011: Kris Kendall, Practical Malware Analysis, in Black Hat Conf., USA (Aug. 2007), 10 pgs.
*AO Kaspersky Lab* v. *Webroot Inc.*, PTAB Case No. IPR2023-01160, Corrected Exhibit 1012: Hao Helen Zhang et al., Compactly Supported Radial Basis Function Kernels, Inst. Stat. Mimeo Series No. 2570, N. Carolina St. U. Dep't. Stat. 2 (2004), 19 pgs.
*AO Kaspersky Lab* v. *Webroot Inc..*, PTAB Case No. IPR2023-01160, Corrected Exhibit 1013: Zane Markel & Michael Bilzor, Building a Machine Learning Classifier for Malware Detection, 2014 Second Workshop Anti-Malware Testing Res. (WATeR) (2014), 4 pgs.
*AO Kaspersky Lab* v. *Webroot Inc.*, PTAB Case No. IPR2023-01160, Corrected Exhibit 1014: Naser Peiravian & Xingquan Zhu, Machine Learning for Android Malware Detection Using Permission and API Calls, IEEE 25th Int'l Conf. Tools Artificial Intelligence 300 (2013), 6 pgs.
*AO Kaspersky Lab* v. *Webroot Inc.*, PTAB Case No. IPR2023-01160, Corrected Exhibit 1015: Ekta Gandotra et al., Malware Analysis and Classification: A Survey, J. Inf. Security 5, 56-64 (2014), 9 pgs.
*AO Kaspersky Lab* v. *Webroot Inc.*, PTAB Case No. IPR2023-01160, Corrected Exhibit 1016: Rafiqul Islam et al., Classification of Malware Based on Integrated Static and Dynamic Features, 36 J. Network Computer Applications, 646 (2012), 11 pgs.
*AO Kaspersky Lab* v. *Webroot Inc.*, PTAB Case No. IPR2023-01160, Corrected Exhibit 1017: D. Michael Cai et al., Comparison of Feature Selection And Classification Algorithms In Identifying Malicious Executables, 51(6) Computational Stat. Data Analysis 3156 (2007), 17 pgs.
*AO Kaspersky Lab* v. *Webroot Inc.*, PTAB Case No. IPR2023-01160, Corrected Exhibit 1018: Guanhua Yan et al., Exploring Discriminatory Features for Automated Malware Classification, 10 Detection Intrusions Malware, Vulnerability Assessment: 10th Int'l Conf., 41 (2013), 21 pgs.
*AO Kaspersky Lab* v. *Webroot Inc.*, PTAB Case No. IPR2023-01160, Corrected Exhibit 1019: Rafiqul Islam et al., Classification of Malware Based on String and Function Feature Selection, 2010 Second Cybercrime Trustworthy Computing Workshop 9 (2010), 9 pgs.
*AO Kaspersky Lab* v. *Webroot Inc.*, PTAB Case No. IPR2023-01160, Corrected Exhibit 1020: Eitan Menahem et al., Improving Malware Detection by Applying Multi-Inducer Ensemble, Computational Stat. Data Analysis, 53(4), 1483 (2008), 12 pgs.
*AO Kaspersky Lab* v. *Webroot Inc.*, PTAB Case No. IPR2023-01160, Corrected Exhibit 1021: Ianir Ideses & Assaf Neuberger, Adware Detection and Privacy Control in Mobile Devices, in 2014 IEEE 28th Convention Electrical Electronics Engineers Israel 1 (2014), 5 pgs.
*AO Kaspersky Lab* v. *Webroot Inc.*, PTAB Case No. IPR2023-01160, Corrected Exhibit 1022: Raja Khurram Shahzad et al., Accurate Adware Detection Using Opcode Sequence Extraction, Sixth Int'l Conf. Availability, Reliability Security 189 (2011), 7 pgs.
*AO Kaspersky Lab* v. *Webroot Inc.*, PTAB Case No. IPR2023-01160, Corrected Exhibit 1023: Raymond Canzanese et al., Toward an Automatic, Online Behavioral Malware Classification System, IEEE 7th Int'l Conf. Self-Adaptive Self-Organizing Sys., 111 (2013), 10 pgs.
*AO Kaspersky Lab* v. *Webroot Inc.*, PTAB Case No. IPR2023-01160, Corrected Exhibit 1024: Yanfang Ye et al., Automatic Malware Categorization Using Cluster Ensemble, in Proc. 16th Acm Sigkdd Int'l Conf. Knowledge Discovery Data Mining 95 (2010), 10 pgs.
*AO Kaspersky Lab* v. *Webroot Inc.*, PTAB Case No. IPR2023-01160, Corrected Exhibit 1025: Asaf Shabtai et al., Detection of Malicious Code by Applying Machine Learning Classifiers on Static Features: A State-Of-The-Art Survey, Info. Security Tech. Rep. 14(1), 16 (2009), 14 pgs.
*AO Kaspersky Lab* v. *Webroot Inc.*, PTAB Case No. IPR2023-01160, Corrected Exhibit 1026: A.M. Aswini & P. Vinod, Droid Permission Miner: Mining Prominent Permissions for Android Malware Analysis, Fifth Int'l Conf. Applications Digital Inf. Web Tech. 81 (2014), 6 pgs.
*AO Kaspersky Lab* v. *Webroot Inc.*, PTAB Case No. IPR2023-01160, Corrected Exhibit 1027: Konrad Rieck et al., Learning and Classification of Malware Behavior, Detection Intrusions Malware, Vulnerability Assessment: 5th Int'l Conf., 108 (2008), 18 pgs.
*AO Kaspersky Lab* v. *Webroot Inc.*, PTAB Case No. IPR2023-01160, Corrected Exhibit 1028: Veelasha Moonsamy et al., Feature Reduction, Speed Up Malware Classification, Inf. Security Tech. Applications: 16th Nordic Conf. Secure It Sys., Tallinn, Est., Oct. 26-28/2011, Rev. Selected Papers 16, 176 (2012), 13 pgs.
*AO Kaspersky Lab* v. *Webroot Inc.*, PTAB Case No. IPR2023-01160, Corrected Exhibit 1029: John P. Dickerson et al., Using Sentiment, Detect Bots on Twitter: Are Humans More Opinionated Than Bots?, IEEE/ACM Int'l Conf. Advances Social Networks Analysis Mining 620 (2014), 8 pgs.
*AO Kaspersky Lab* v. *Webroot Inc.*, PTAB Case No. IPR2023-01160, Corrected Exhibit 1030: Wei Yu et al., Towards Neural Network Based Malware Detection on Android Mobile Devices, Cybersecurity Sys. Human Cognition Augmentation 99 (2014), 19 pgs.
*AO Kaspersky Lab* v. *Webroot Inc.*, PTAB Case No. IPR2023-01160, Corrected Exhibit 1031: Guanhua Yan et al., 2013. Exploring Discriminatory Features for Automated Malware Classification, Detection Intrusions Malware, Vulnerability Assessment: 10th Int'l Conf., Dimva 2013, Berlin, Ger., Jul. 18-19, 2013 Proc. 10, 41 (2013), 21 pgs.
*AO Kaspersky Lab* v. *Webroot Inc.*, PTAB Case No. IPR2023-01160, Corrected Exhibit 1032: Julia Yu-Cheng et al., An Information Retrieval Approach for Malware Classification Based on Windows API Calls, Int'l Conf. Machine Learning Cybernetics 1678 (2013), 6 pgs.
*AO Kaspersky Lab* v. *Webroot Inc.*, PTAB Case No. IPR2023-01160, Corrected Exhibit 1033: Zi Chu et al., Detecting Automation of Twitter Accounts: Are You a Human, Bot, or Cyborg?, 9 IEEE Transactions Dependable Secure Computing 6, 811 (Nov./Dec. 2012), 14 pgs.
*AO Kaspersky Lab* v. *Webroot Inc.*, PTAB Case No. IPR2023-01160, Corrected Exhibit 1034: Axelle Apvrille, Android Reverse Engineering Tools From an Anti-Virus Analyst's Perspective, Fortinet, slides 11-15 (Mar. 2012), http://wikisec.free.fr/papers/insomnidroid.pdf, 69 pgs.
*AO Kaspersky Lab* v. *Webroot Inc.*, PTAB Case No. IPR2023-01160, Corrected Exhibit 1035: Li Sun et al., Pattern Recognition Techniques for the Classification of Malware Packers, 15 Proc. Inf. Security Priv.: 15th Australasian Conf., Acisp 2010, Sydney, Austl., Jul. 5-7, 2010, 370, 21 pgs.
*AO Kaspersky Lab* v. *Webroot Inc.*, PTAB Case No. IPR2023-01160, Corrected Exhibit 1036: Munkhbayar Bat-Erdene et al., Dynamic Classification of Packing Algorithms for Inspecting Executables Using Entropy Analysis, 8th Int'l Conf. Malicious Unwanted Software: "Americas" (Malware) 19, 2013, 8 pgs.
*AO Kaspersky Lab* v. *Webroot Inc.*, PTAB Case No. IPR2023-01160, Corrected Exhibit 1037: M. Zubair et al., PE-Probe: Leveraging Packer Detection and Structural Information, Detect Malicious Portable Executables, 8 Proc. Virus Bull. Conf. (2009), 10 pgs.
*AO Kaspersky Lab* v. *Webroot Inc.*, PTAB Case No. IPR2023-01160, Notice of Accepting Corrected Petition, Sep. 13, 2023, 2 pgs.
*Crowdstrike, Inc.* v. *Webroot Inc.*, PTAB Case No. IPR2023-01053, Patent Owner Open Text Inc.'s Mandatory Notices Pursuant to 37 CFR § 42.8(b), Jul. 24, 2023, 9 pgs.
*Crowdstrike, Inc.* v. *Webroot Inc.*, PTAB Case No. IPR2023-01053, Notice of Filing Date Accorded to Petition and Time for Filing Patent Owner Preliminary Response, Aug. 23, 2023, 6 pgs.

(56) References Cited

OTHER PUBLICATIONS

*Crowdstrike, Inc.* v. *Webroot Inc.*, PTAB Case No. IPR2023-00289, Decision Granting Institution of Inter Partes Review, Jul. 21, 2023, 44 pgs.

*Crowdstrike, Inc.* v. *Webroot Inc.*, PTAB Case No. IPR2023-00289, Scheduling Order, Jul. 21, 2023, 12 pgs.

*Crowdstrike, Inc.* v. *Webroot Inc.*, PTAB Case No. IPR2023-00289, Patent Owner's Request for Rehearing, Aug. 4, 2023, 20 pgs.

*Crowdstrike, Inc.* v. *Webroot Inc.*, PTAB Case No. IPR2023-00289, Patent Owner's Objections to Evidence Submitted by Petitioner, Aug. 4, 2023, 4 pgs.

*Crowdstrike, Inc.* v. *Webroot Inc.*, PTAB Case No. IPR2023-00289, Decision denying Patent Owner's Request for Rehearing of Decision Granting Institution of Inter Partes Review, Sep. 7, 2023, 11 pgs.

*Crowdstrike, Inc.* v. *Webroot Inc.*, PTAB Case No. IPR2023-00289, Joint Stipulation to Modify Due Dates, Oct. 7, 2023, 4 pgs.

*Trend Micro, Inc.* v. *Webroot Inc.*, PTAB Case No. IPR2023-00655, Patent Owner's Preliminary Response, Jul. 17, 2023, 76 pgs.

*Trend Micro, Inc.* v. *Webroot Inc.*, PTAB Case No. IPR2023-00655, Exhibit 2001: Declaration of Professor Nenad Medvidovic, Ph.D, 70 pgs.

*Trend Micro, Inc.* v. *Webroot Inc.*, PTAB Case No. IPR2023-00655, Exhibit 2002: Curriculum Vitae of Professor Nenad Medvidovic, Ph.D., 71 pgs.

*Trend Micro, Inc.* v. *Webroot Inc.*, PTAB Case No. IPR2023-00655, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Trend Micro, Inc.* v. *Webroot Inc.*, PTAB Case No. IPR2023-00655, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Trend Micro, Inc.* v. *Webroot Inc.*, PTAB Case No. IPR2023-00655, Exhibit 2005: *Intellectual Ventures I LLC* et al. v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Trend Micro, Inc.* v. *Webroot Inc.*, PTAB Case No. IPR2023-00655, Corrected Exhibit 2006: Dani Kass, "Catching Up On Patent Litigation With Judge Albright" (Law360 Mar. 14, 2023); https://www.law360.com/pulse/articles/1582438/ print?section=pulse/courts, 4 pgs.

*Trend Micro, Inc.* v. *Webroot Inc.*, PTAB Case No. IPR2023-00655, Corrected Exhibit 2006: Dani Kass, "Catching Up On Patent Litigation With Judge Albright" (Law360 Mar. 14, 2023); https://www.law360.com/pulse/articles/1582438/ print?section=pulse/courts, 3 pgs.

*Trend Micro, Inc.* v. *Webroot Inc.*, PTAB Case No. IPR2023-00655, Exhibit 2007: U.S. District Courts—Federal Court Management Statistics—Profiles—During the 12-Month Periods Ending Mar. 31, 2018 Through 2023, "Table N/A—U.S. District Courts—Combined Civil and Criminal Federal Court Management Statistics (Mar. 31, 2023)", available at https://www.uscourts.gov/sites/default/files/data_tables/fcms_na_distpro file0331.2023.pdf, 95 pgs.

*Trend Micro, Inc.* v. *Webroot Inc.*, PTAB Case No. IPR2023-00655, Exhibit 2008: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.

*Trend Micro, Inc.* v. *Webroot Inc.*, PTAB Case No. IPR2023-00655, Exhibit 2009: *Webroot, Inc. and Open Text Inc.*, v. *AO Kaspersky Lab et al.*, Case No. 6:22-CV-243-ADA-DTG, Claim Construction Order, Dkt. 236 (W.D. Tex. Mar. 16, 2023), 20 pgs.

*Trend Micro, Inc.* v. *Webroot Inc.*, PTAB Case No. IPR2023-00655, Exhibit 2010: *Webroot, Inc. and Open Text Inc.*, v. *Trend Micro, Inc.*. , Case No. 6:22-cv-239-ADA-DTG, First Amended Complaint For Patent Infringement, Dkt. 42 (W.D. Tex. Jun. 23, 2023), 235 pgs.

*Trend Micro, Inc.* v. *Webroot Inc.*, PTAB Case No. IPR2023-00655, Exhibit 2011: *Webroot, Inc. and Open Text Inc.*, v. *AO Kaspersky Lab et al.*, Case No. 6:22-CV-243-ADA-DTG, Scheduling Order, Dkt. 53 (W.D. Tex. Sept. 7, 2022), 7 pgs.

*Trend Micro, Inc.* v. *Webroot Inc.*, PTAB Case No. IPR2023-00655, Exhibit 2012: *Webroot, Inc. and Open Text Inc.*, v. *Trend Micro, Inc.*, Case No. 6:22-cv-00239-ADA-DTG, Defendant's Preliminary Invalidity Contentions (W.D. Tex., Sep. 13, 2022) (excerpted), 9 pgs.

*Trend Micro, Inc.* v. *Webroot Inc.*, PTAB Case No. IPR2023-00655, Exhibit 2013: *Webroot, Inc. and Open Text Inc.*, v. *CrowdStrike, Inc. and CrowdStrike Holdings, Inc.*, Case No. 6:22-cv-00241-ADA-DTG, Defendant's Preliminary Invalidity Contentions (W.D. Tex., Sep. 13, 2022) (excerpted), 10 pgs.

*Trend Micro, Inc.* v. *Webroot Inc.*, PTAB Case No. IPR2023-00655, Exhibit 2014: *Webroot, Inc. and Open Text Inc.*, v. *AO Kaspersky Lab*, Case No. 6:22-cv-00243-ADA-DTG, Defendant's Preliminary Invalidity Contentions Appendix A (W.D. Tex., Sep. 14, 2022) (excerpted), 8 pgs.

*Trend Micro, Inc.* v. *Webroot Inc.*, PTAB Case No. IPR2023-00655, Decision Denying Institution of Inter Partes Request, Oct. 11, 2023, 19 pgs.

*Sophos Ltd. and Sophos Inc.* v. *Webroot Inc.*, PTAB Case No. IPR2023-00699, Patent Owner's Preliminary Response, Jul. 14, 2023, 75 pgs.

*Sophos Ltd. and Sophos Inc.* v. *Webroot Inc.*, PTAB Case No. IPR2023-00699, Exhibit 2001: Declaration of Professor Nenad Medvidovic, Ph.D, 63 pgs.

*Sophos Ltd. and Sophos Inc.* v. *Webroot Inc.*, PTAB Case No. IPR2023-00699, Exhibit 2002: Curriculum Vitae of Professor Nenad Medvidovic, Ph.D., 71 pgs.

*Sophos Ltd. and Sophos Inc.* v. *Webroot Inc.*, PTAB Case No. IPR2023-00699, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Sophos Ltd. and Sophos Inc.* v. *Webroot Inc.*, PTAB Case No. IPR2023-00699, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Sophos Ltd. and Sophos Inc.* v. *Webroot Inc.*, PTAB Case No. IPR2023-00699, Exhibit 2005: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Sophos Ltd. and Sophos Inc.* v. *Webroot Inc.*, PTAB Case No. IPR2023-00699, Exhibit 2006: Dani Kass, "Catching Up On Patent Litigation With Judge Albright" (Law360 Mar. 14, 2023); https://www.law360.com/pulse/articles/1582438/ print?section=pulse/courts, 3 pgs.

*Sophos Ltd. and Sophos Inc.* v. *Webroot Inc.*, Case No. IPR2023-00699, Exhibit 2007: U.S. District Courts—Federal Court Management Statistics-Profiles*Sophos Ltd. and Sophos Inc.* v. *Webroot Inc.*, During the 12-Month Periods Ending Mar. 31, 2018 Through 2023, "Table N/A—U.S. District Courts-Combined Civil and Criminal Federal Court Management Statistics (Mar. 31, 2023)", available at https://www.uscourts.gov/sites/default/files/data_tables/fcms_na_dist profile0331.2023.pdf, 95 pgs.

*Sophos Ltd. and Sophos Inc.* v. *Webroot Inc.*, PTAB Case No. IPR2023-00699, Exhibit 2008: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.

*Sophos Ltd. and Sophos Inc.* v. *Webroot Inc.*, PTAB Case No. IPR2023-00699, Exhibit 2009: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.

*Sophos Ltd. and Sophos Inc.* v. *Webroot Inc.*, PTAB Case No. IPR2023-00699, Exhibit 2010: *Webroot, Inc. and Open Text Inc.*, v.

(56) References Cited

OTHER PUBLICATIONS

*Sophos Ltd.*, Case No. 6:22-cv-240-ADA-DTG, First Amended Complaint For Patent Infringement, Dkt. 42 (W.D. Tex. Jun. 23, 2023), 158 pgs.

*Sophos Ltd. and Sophos Inc.* v. *Webroot Inc.*, PTAB Case No. IPR2023-00699, Exhibit 2011: *Webroot, Inc. and Open Text Inc.*, v. *AO Kaspersky Lab et al.*, Case No. 6:22-cv-243-ADA-DTG, Scheduling Order, Dkt. 39 (W.D. Tex. Aug. 17, 2022), 7 pgs.

*Sophos Ltd. and Sophos Inc.* v. *Webroot Inc.*, PTAB Case No. IPR2023-00699, Exhibit 2012: *Webroot, Inc. and Open Text Inc.*, v. *Trend Micro, Inc.*, Case No. 6:22-cv-00239-ADA-DTG, Defendant's Preliminary Invalidity Contentions (W.D. Tex., Sep. 13, 2022) (excerpted), 47 pgs.

*Sophos Ltd. and Sophos Inc.* v. *Webroot Inc.*, PTAB Case No. IPR2023-00699, Exhibit 2013: *Webroot, Inc. and Open Text Inc.*, v. *CrowdStrike, Inc. and CrowdStrike Holdings, Inc.*, Case No. 6:22-cv-00241-ADA-DTG, Defendant's Preliminary Invalidity Contentions (W.D. Tex., Sep. 13, 2022) (excerpted), 10 pgs.

*Sophos Ltd. and Sophos Inc.* v. *Webroot Inc.*, PTAB Case No. IPR2023-00699, Exhibit 2014: *Webroot, Inc. and Open Text Inc.*, v. *AO Kaspersky Lab*, Case No. 6:22-cv-00243-ADA-DTG, Defendant's Preliminary Invalidity Contentions Appendix A (W.D. Tex., Sep. 14, 2022) (excerpted), 8 pgs.

*Sophos Ltd. and Sophos Inc.* v. *Webroot Inc.*, PTAB Case No. IPR2023-00699, Panel Change Order, Aug. 15, 2023, 3 pgs.

*Sophos Ltd. and Sophos Inc.* v. *Webroot Inc.*, PTAB Case No. IPR2023-00699, Revised Mandatory Notices, Aug. 30, 2023, 4 pgs.

*Sophos Ltd. and Sophos Inc.* v. *Webroot Inc.*, PTAB Case No. IPR2023-00699, Decision Granting Institution of Inter Partes Review, Oct. 11, 2023, 38 pgs.

*Sophos Ltd. and Sophos Inc.* v. *Webroot Inc.*, PTAB Case No. IPR2023-00699, Scheduling Order, Oct. 16, 2023, 12 pgs.

*Crowdstrike, Inc.* v. *Webroot Inc.*, PTAB Case No. IPR2023-00556, Patent Owner's Preliminary Response, Jun. 16, 23, 81 pgs.

*Crowdstrike, Inc.* v. *Webroot Inc.*, PTAB Case No. IPR2023-00556, Exhibit 2001: Declaration of Professor Nenad Medvidovic, Ph.D., 63 pgs.

*Crowdstrike, Inc.* v. *Webroot Inc.*, PTAB Case No. IPR2023-00556, Exhibit 2002: Curriculum Vitae of Professor Nenad Medvidovic, Ph.D., 71 pgs.

*Crowdstrike, Inc.* v. *Webroot Inc.*, PTAB Case No. IPR2023-00556, Exhibit 2003: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.

*Crowdstrike, Inc.* v. *Webroot Inc.*, PTAB Case No. IPR2023-00556, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Crowdstrike, Inc.* v. *Webroot Inc.*, PTAB Case No. IPR2023-00556, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Crowdstrike, Inc.* v. *Webroot Inc.*, PTAB Case No. IPR2023-00556, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Crowdstrike, Inc.* v. *Webroot Inc.*, PTAB Case No. IPR2023-00556, Exhibit 2007: *Webroot, Inc. and Open Text Inc.*, v. *AO Kaspersky Lab et al.*, Case No. 6:22-CV-243-ADA-DTG, Dec. 9, 2022 Transcript of Motions Hearing, Dkt. 133 (W.D. Tex. Dec. 15, 2022) (excerpted), 7 pgs.

*Crowdstrike, Inc.* v. *Webroot Inc.*, PTAB Case No. IPR2023-00556, Exhibit 2008: Dani Kass, "Catching Up On Patent Litigation With Judge Albright" (Law360 Mar. 14, 2023); https://www.law360.com/pulse/articles/1582438/print?section=pulse/courts, 3 pgs.

*Crowdstrike, Inc.* v. *Webroot Inc.*, PTAB Case No. IPR2023-00556, Exhibit 2009: U.S. District Courts—Federal Court Management Statistics-Profiles—During the 12-Month Periods Ending Mar. 31, 2018 Through 2023, "Table N/A—U.S. District Courts-Combined Civil and Criminal Federal Court Management Statistics (Mar. 31, 2023)", available at https://www.uscourts.gov/sites/default/files/data_tables/fcms_na_distprofile0331.2023.pdf, 95 pgs.

*Crowdstrike, Inc.* v. *Webroot Inc.*, PTAB Case No. IPR2023-00556, Exhibit 2010: *Webroot, Inc. and Open Text Inc.*, v. *AO Kaspersky Lab et al.*, Case No. 6:22-cv-243-ADA-DTG, Claim Construction Order, Dkt. 236 (W.D. Tex. 03/16/ 2023), 20 pgs.

*Crowdstrike, Inc.* v. *Webroot Inc.*, PTAB Case No. IPR2023-00556, Exhibit 2011: *Webroot, Inc. and Open Text Inc.*, v. *CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.

*Crowdstrike, Inc.* v. *Webroot Inc.*, PTAB Case No. IPR2023-00556, Exhibit 2012: *Webroot, Inc. and Open Text Inc.*, v. *AO Kaspersky Lab et al.*, Case No. 6:22-cv-243-ADA-DTG, Scheduling Order, Dkt. 39 (W.D. Tex. Aug. 17, 2022), 7 pgs.

*Crowdstrike, Inc.* v. *Webroot Inc.*, PTAB Case No. IPR2023-00556, Exhibit 2013: *Webroot, Inc. and Open Text Inc.*, v. *ForcePoint LLC*, Case No. 6:22-cv-00342-ADA-DTG, Defendant ForcePoint LLC's Preliminary Invalidity Contentions (W.D. Tex., Sep. 13, 2022) (excerpted), 149 pgs.

*Crowdstrike, Inc.* v. *Webroot Inc.*, PTAB Case No. IPR2023-00556, Exhibit 2014: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022) (excerpted), 127 pgs.

*Crowdstrike, Inc.* v. *Webroot Inc.*, PTAB Case No. IPR2023-00556, Exhibit 2015: *Webroot, Inc. and Open Text Inc.*, v. *Trend Micro, Inc.*, Case No. 6:22-cv-00239-ADA-DTG, Defendant's Preliminary Invalidity Contentions (W.D. Tex., Sep. 13, 2022) (excerpted), 125 pgs.

*Crowdstrike, Inc.* v. *Webroot Inc.*, PTAB Case No. IPR2023-00556, Exhibit 2016: *Webroot, Inc. and Open Text Inc.*, v. *AO Kaspersky Lab*, Case No. 6:22-cv- 00243-ADA-DTG, Defendant's Preliminary Invalidity Contentions Appendix A (W.D. Tex., Sep. 14, 2022) (excerpted), 8 pgs.

*Crowdstrike, Inc.* v. *Webroot Inc.*, PTAB Case No. IPR2023-00556, Exhibit 2017: *Webroot, Inc. and Open Text Inc.*, v. *CrowdStrike, Inc. and CrowdStrike Holdings, Inc.*, Case No. 6:22-cv-00241-ADA-DTG, Defendant's Preliminary Invalidity Contentions (W.D. Tex., Sep. 13, 2022) (excerpted), 62 pgs.

*Crowdstrike, Inc.* v. *Webroot Inc.*, PTAB Case No. IPR2023-00556, Exhibit 2018: Ex Parte James M. Brennan, et al., Appeal 2021-003606, U.S. Appl. No. 15/285,875, Decision On Appeal Statement of the Case (PTAB Jul. 26, 2022), 10 pgs.

*Crowdstrike, Inc.* v. *Webroot Inc.*, PTAB Case No. IPR2023-00556, Exhibit 2019: File History of U.S. Pat. No. 8,418,250, 1187 pgs.

*Crowdstrike, Inc.* v. *Webroot Inc.*, PTAB Case No. IPR2023-00556, Patent Owner's Updated Mandatory Notices Pursuant to 37 CFR §42.8(b), Jun. 23, 2023, 9 pgs.

*Crowdstrike, Inc.* v. *Webroot Inc.*, PTAB Case No. IPR2023-00556, Notice of Petitioner Stipulation, Jul. 17, 2023, 3 pgs.

*Crowdstrike, Inc.* v. *Webroot Inc.*, PTAB Case No. IPR2023-00556, Decision Granting Institution of Inter Partes Review, Sep. 12, 2023, 25 pgs.

*Crowdstrike, Inc.* v. *Webroot Inc.*, PTAB Case No. IPR2023-00556, Sep. 12, 2023, Scheduling Order, Sep. 12, 2023, 12 pgs.

*Crowdstrike, Inc.* v. *Webroot Inc.*, PTAB Case No. IPR2023-00556, Patent Owner's Objections to Evidence submitted by Petitioner, Sep. 26, 2023, 5 pgs.

*Sophos Ltd. and Sophos Inc.* v. *Webroot Inc.*, PTAB Case No. IPR2023-00633, Patent Owner's Preliminary Response, Jun. 16, 2023, 81 pgs.

*Sophos Ltd. and Sophos Inc.* v. *Webroot Inc.*, PTAB Case No. IPR2023-00633, Exhibit 2001: Declaration of Professor Nenad Medvidovic, Ph.D., 70 pgs.

(56)　　　　References Cited

OTHER PUBLICATIONS

*Sophos Ltd. and Sophos Inc.* v. *Webroot Inc.*, PTAB Case No. IPR2023-00633, Exhibit 2002: Curriculum Vitae of Nenad Medvidovic, Ph.D., 71 pgs.
*Sophos Ltd. and Sophos Inc.* v. *Webroot Inc.*, PTAB Case No. IPR2023-00633, Exhibit 2003: *Webroot, Inc. and Open Text Inc.*, v. *Sophos LTD*, Case No. 6:22-CV-240-ADA-DTG, Complaint (W.D. Tex Mar. 4, 2022), 144 pgs.
*Sophos Ltd. and Sophos Inc.* v. *Webroot Inc.*, PTAB Case No. IPR2023-00633, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Sophos Ltd. and Sophos Inc.* v. *Webroot Inc.*, PTAB Case No. IPR2023-00633, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Sophos Ltd. and Sophos Inc.* v. *Webroot Inc.*, PTAB Case No. IPR2023-00633, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Sophos Ltd. and Sophos Inc.* v. *Webroot Inc.*, PTAB Case No. IPR2023-00633, Exhibit 2007: Dani Kass, "Catching Up On Patent Litigation With Judge Albright" (Law360 Mar. 14, 2023); https://www.law360.com/pulse/articles/1582438/print? section=pulse/courts, 3 pgs.
*Sophos Ltd. and Sophos Inc.* v. *Webroot Inc.*, PTAB Case No. IPR2023-00633, Exhibit 2008: U.S. District Courts—Combined Civil and Criminal Federal Court Management Statistics (Mar. 31, 2023), available at https://www.uscourts.gov/statistics/table/na/federal-court-management-statistics/2023/03/31-1, 95 pgs.
*Sophos Ltd. and Sophos Inc.* v. *Webroot Inc.*, PTAB Case No. IPR2023-00633, Exhibit 2009: *Webroot, Inc. and Open Text Inc.*, v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.
*Sophos Ltd. and Sophos Inc.* v. *Webroot Inc.*, PTAB Case No. IPR2023-00633, Exhibit 2010: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Sophos Ltd. and Sophos Inc.* v. *Webroot Inc.*, PTAB Case No. IPR2023-00633, Exhibit 2011: U.S. Patent Application Publication No. 2002/0194490, Halperin, 25 pgs.
*Sophos Ltd. and Sophos Inc.* v. *Webroot Inc.*, PTAB Case No. IPR2023-00633, Exhibit 2012: *Webroot, Inc. and Open Text Inc.*, v. *Sophos LTD*, Case No. 6:22-cv-240-ADA-DTG, Scheduling Order, Dkt. 54 (W.D. Tex. Aug. 8, 2022), 4 pgs.
*Sophos Ltd. and Sophos Inc.* v. *Webroot Inc.*, PTAB Case No. IPR2023-00633, Exhibit 2013: *Webroot, Inc. and Open Text Inc.*, v. *Forcepoint LLC*, Case No. 6:22-cv-00342-ADA-DTG, Defendant's Preliminary Invalidity Contentions (W.D. Tex., Sep. 13, 2022) (excerpted), 21 pgs.
*Sophos Ltd. and Sophos Inc.* v. *Webroot Inc.*, PTAB Case No. IPR2023-00633, Exhibit 2014: *Webroot, Inc. and Open Text Inc.*, v. *Sophos Ltd.*, Case No. 6:22-CV-00240-ADA-DTG, Defendant Sophos Ltd.'s Preliminary Invalidity Contentions (W.D. Tex., Sep. 13, 2022) (excerpted), 36 pgs.
*Sophos Ltd. and Sophos Inc.* v. *Webroot Inc.*, PTAB Case No. IPR2023-00633. Exhibit 2015: *Webroot, Inc. and Open Text Inc.*, v. *Trend Micro, Inc.*, Case No. 6:22-cv-00239-ADA-DTG, Defendant's Preliminary Invalidity Contentions (W.D. Tex., Sep. 13, 2022) (excerpted), 47 pgs.
*Sophos Ltd. and Sophos Inc.* v. *Webroot Inc.*, PTAB Case No. IPR2023-00633, Exhibit 2016: *Webroot, Inc. and Open Text Inc.*, v.

*AO Kaspersky Lab et al.*, Case No. 6:22-cv-243-ADA-DTG, Defendant's Preliminary Invalidity Contentions Appendix A (W.D. Tex., Sep. 14, 2022), 8 pgs.
*Sophos Ltd. and Sophos Inc.* v. *Webroot Inc.*, PTAB Case No. IPR2023-00633, Exhibit 2017: *Webroot, Inc. and Open Text Inc.*, v. *CrowdStrike, Inc. and CrowdStrike Holdings, Inc.*, Case No. 6:22-cv-00241-ADA, Defendant's Preliminary Invalidity Contentions (W.D. Tex., Sep. 13, 2022) (excerpted), 10 pgs.
*Sophos Ltd. and Sophos Inc.* v. *Webroot Inc.*, PTAB Case No. IPR2023-00633, Exhibit 2018: U.S. Pat. No. 8,726,389 Certified File History, 324 pgs.
*Sophos Ltd. and Sophos Inc.* v. *Webroot Inc.*, PTAB Case No. IPR2023-00633, Exhibit 2019: Jul. 13, 2022 Email from Jennifer Inghram of King & Spalding, 2 pgs.
*Sophos Ltd. and Sophos Inc.* v. *Webroot Inc.*, PTAB Case No. IPR2023-00633, Exhibit 2020: *Webroot, Inc. and Open Text Inc.*, v. *AO Kaspersky Lab et al.*, Case No. 6:22-cv-243-ADA-DTG, Joint Defendants' Opening Claim Construction Brief, Dkt. 86 (W.D. Tex., Oct. 28, 2022), 84 pgs.
*Sophos Ltd. and Sophos Inc.* v. *Webroot Inc.*, PTAB Case No. IPR2023-00633, Patent Owner Open Text Inc.'s Updated Mandatory Notices Pursuant to 37 CFR § 42.8(b), Jun. 23, 2023, 9 pgs.
*Sophos Ltd. and Sophos Inc.* v. *Webroot Inc.*, PTAB Case No. IPR2023-00633, Petitioner's Reply to Patent Owner's Preliminary Response, Aug. 18, 2023, 5 pgs.
*Sophos Ltd. and Sophos Inc.* v. *Webroot Inc.*, PTAB Case No. IPR2023-00633, Exhibit 1014: email granting Request for Leave to File Reply to Patent Owner's Preliminary Response, 2 pgs.
*Sophos Ltd. and Sophos Inc.* v. *Webroot Inc.*, PTAB Case No. IPR2023-00633, Panel Change Order, Aug. 21, 2023, 3 pgs.
*Sophos Ltd. and Sophos Inc.* v. *Webroot Inc.*, PTAB Case No. IPR2023-00633, Patent Owner's Preliminary Sur-Reply, Aug. 25, 2023, 10 pgs.
*Sophos Ltd. and Sophos Inc.* v. *Webroot Inc.*, PTAB Case No. IPR2023-00633, Exhibit 2021: U.S. Patent and Trademark Office, General USPTO Customer Information, at https://www.uspto.gov/ebc/pair/pair_faq_pt_general.html #certifiedcopy, 4 pgs.
*Sophos Ltd. and Sophos Inc.* v. *Webroot Inc.*, PTAB Case No. IPR2023-00633, Exhibit 2022: U.S. Patent and Trademark Office, Order Certified Copies, https://www.uspto.gov/patents/apply/checking-application-status/order-certified-copies, 2 pgs.
*Sophos Ltd. and Sophos Inc.* v. *Webroot Inc.*, PTAB Case No. IPR2023-00633, Revised Mandatory Notices, Aug. 30, 2023, 5 pgs.
*Sophos Ltd. and Sophos Inc.* v. *Webroot Inc.*, PTAB Case No. IPR2023-00633, Decision denying institution of Inter Parties Review, Sep. 12, 2023, 11 pgs.
*Crowdstrike, Inc.* v. *Webroot Inc.*, PTAB Case No. IPR2023-01050, Patent Owner Open Text Inc.'s Mandatory Notices Pursuant to 37 CFR § 42.8(b), Aug. 2, 2023, 9 pgs.
*Crowdstrike, Inc.* v. *Webroot Inc.*, PTAB Case No. IPR2023-01050, Notice of Filing Date Accorded to Petition and Time for Filing Patent Owner Preliminary Response, 6 pgs.
*Sophos Ltd. and Sophos Inc.* v. *Webroot Inc.*, PTAB Case No. IPR2023-00491, Exhibit 3001: email denying Request for Leave to File Reply to Patent Owner's Preliminary Response, Aug. 2, 2023, 3 pgs.
*Sophos Ltd. and Sophos Inc.* v. *Webroot Inc.*, PTAB Case No. IPR2023-00491, Decision denying institution of Inter Parties Review, Aug. 2, 2023, 27 pgs.
*Sophos Ltd. and Sophos Inc.* v. *Webroot Inc.*, PTAB Case No. IPR2023-00491, Revised Mandatory Notices, Aug. 30, 2023, 4 pgs.
*Sophos Ltd. and Sophos Inc.* v. *Webroot Inc.*, PTAB Case No. IPR2024-00252, Petition for Inter Partes Review of U.S. Pat. No. 8,201,243, Dec. 8, 2023, 87 pgs.
*Sophos Ltd. and Sophos Inc.* v. *Webroot Inc.*, PTAB Case No. IPR2024-00252, Exhibit 1001: U.S. Pat. No. 8,201,243, Boney, Jun. 12, 2012, 13 pgs.
*Sophos Ltd. and Sophos Inc.* v. *Webroot Inc.*, PTAB Case No. IPR2024-00252, Exhibit 1002: File History of the '243 Patent, Dec. 8, 2023, 423 pgs.
*Sophos Ltd. and Sophos Inc.* v. *Webroot Inc.*, PTAB Case No. IPR2024-00252, Exhibit 1003: Declaration of Dr. Henry Houh, Nov. 29, 2023, 113 pgs.

(56)　　　　References Cited

OTHER PUBLICATIONS

*Sophos Ltd. and Sophos Inc.* v. *Webroot Inc.*, PTAB Case No. IPR2024-00252, Exhibit 1004: Curriculum Vitae of Dr. Henry Houh, Dec. 8, 2023, 12 pgs.

*Sophos Ltd. and Sophos Inc.* v. *Webroot Inc.*, PTAB Case No. IPR2024-00252, Exhibit 1005: Li, et al., UCLog: A Unified, Correlated Logging Architecture for Intrusion Detection Int'l Conf. on Telecomm. Sys.Modelling & Analysis, Jan. 2004, 15 pgs.

*Sophos Ltd. and Sophos Inc.* v. *Webroot Inc.*, PTAB Case No. IPR2024-00252, Exhibit 1006: U.S. Pat. No. 8,117,659, Hartrell, Feb. 14, 2002, 16 pgs.

*Sophos Ltd. and Sophos Inc.* v. *Webroot Inc.*, PTAB Case No. IPR2024-00252, Exhibit 1007: Salvador Mandujano Vergara, A multiagent approach to outbound intrusion detection, (Ph.D. Thesis, Instituto Tecnológico y de Estudios Superires de Monterrey) (on file with Repositorio Institucional del Tecnológico de Monterrey (RITEC) in the Instituto Tecnológico y de Estudios Superiores de Monterrey Library), 2004, 216 pgs.

*Sophos Ltd. and Sophos Inc.* v. *Webroot Inc.*, PTAB Case No. IPR2024-00252, Exhibit 1008: U.S. Pat. No. 7, 174,566, Yadav, Feb. 6, 2007, 17 pgs.

*Sophos Ltd. and Sophos Inc.* v. *Webroot Inc.*, PTAB Case No. IPR2024-00252, Exhibit 1009: Declaration of Dr. Mary K. Bolin, Dec. 11, 2023, 318 pgs.

*Sophos Ltd. and Sophos Inc.* v. *Webroot Inc.*, PTAB Case No. IPR2024-00252, Exhibit 1010: Webroot Infringement Contentions, Oct. 25, 2022, 9 pgs.

*Sophos Ltd. and Sophos Inc.* v. *Webroot Inc.*, PTAB Case No. IPR2024-00252, Exhibit 1011: Jeff Crume, Inside Internet Security: What Hackers Don't Want You to Know, Pearson Educ. Ltd., 2000, 293 pgs.

*Sophos Ltd. and Sophos Inc.* v. *Webroot Inc.*, PTAB Case No. IPR2024-00252, Exhibit 1012: Information Sciences Institute, Univ. of S. Cal., Internet Protocol: DARPA Internet Program Protocol Specification, Sep. 1981, 51 pgs.

*Sophos Ltd. and Sophos Inc.* v. *Webroot Inc.*, PTAB Case No. IPR2024-00252, Exhibit 1013: Stipulation Waiving IPR Claims in District Court Litigation, Dec. 6, 2023, 7 pgs.

*Sophos Ltd. and Sophos Inc.* v. *Webroot Inc.*, PTAB Case No. IPR2024-00252, Exhibit 1014: Mandia, Kevin and Prosise, Chris, Incident Response, Investigating Computer Crime, Osborne/McGraw-Hill, Berkeley, CA, copyright 2001, 23 pgs.

*Sophos Ltd. and Sophos Inc.* v. *Webroot Inc.*, PTAB Case No. IPR2024-00252, Exhibit 1015: Declaration of Cristina L. Abad, Ph.D., Sep. 26, 2023, 61 pgs.

*Sophos Ltd. and Sophos Inc.* v. *Webroot Inc.*, PTAB Case No. IPR2024-00252, Exhibit 1016: Declaration of Z. Morley Mao, Ph.D., Oct. 11, 2023, 33 pgs.

*Sophos Ltd. and Sophos Inc.* v. *Webroot Inc.*, PTAB Case No. IPR2024-00252, Exhibit 1017: District Court Claim Construction Order entered in *Webroot, Inc.* v. *AO Kaspersky Lab*, No. 6:22-cv-00243-ADA-DTG (W.D. Tex.) (Dkt. 391) Jul. 25, 2023, 19 pgs.

*Sophos Ltd. and Sophos Inc.* v. *Webroot Inc.*, PTAB Case No. IPR2024-00253, Petition for Inter Partes Review of U.S. Pat. No. 8,719,932, Dec. 8, 2023, 86 pgs.

*Sophos Ltd. and Sophos Inc.* v. *Webroot Inc.*, PTAB Case No. IPR2024-00253, Exhibit 1001: U.S. Pat. No. 8,719,932, Boney, May 6, 2014, 12 pgs.

*Sophos Ltd. and Sophos Inc.* v. *Webroot Inc.*, PTAB Case No. IPR2024-00253, Exhibit 1002: File History of the '932 Patent, Dec. 8, 2023, 120 pgs.

*Sophos Ltd. and Sophos Inc.* v. *Webroot Inc.*, PTAB Case No. IPR2024-00253, Exhibit 1003: Declaration of Dr. Henry Houh, Nov. 29, 2023, 111 pgs.

*Sophos Ltd. and Sophos Inc.* v. *Webroot Inc.*, PTAB Case No. IPR2024-00253, Exhibit 1004: Curriculum Vitae of Dr. Henry Houh, Dec. 8, 2023, 12 pgs.

*Sophos Ltd. and Sophos Inc.* v. *Webroot Inc.*, PTAB Case No. IPR2024-00253, Exhibit 1005: Li, et al., UCLog: A Unified, Correlated Logging Architecture for Intrusion Detection, Int'l Conf. on Telecomm. Sys.—Modelling & Analysis, Jan. 2004, 15 pgs.

*Sophos Ltd. and Sophos Inc.* v. *Webroot Inc.*, PTAB Case No. IPR2024-00253, Exhibit 1006: U.S. Pat. No. 8, 117,659, Hartrell, Feb. 14, 2012, 16 pgs.

*Sophos Ltd. and Sophos Inc.* v. *Webroot Inc.*, PTAB Case No. IPR2024-00253, Exhibit 1007: Salvador Mandujano Vergara, A multiagent approach to outbound intrusion detection, (Ph.D. Thesis, Instituto Tecnológico y de Estudios Superires de Monterrey) (on file with Repositorio Institucional del Tecnológico de Monterrey (RITEC) in the Instituto Tecnológico y de Estudios Superiores de Monterrey Library), 2004, 216 pgs.

*Sophos Ltd. and Sophos Inc.* v. *Webroot Inc.*, PTAB Case No. IPR2024-00253, Exhibit 1008: U.S. Patent No. Yadav, Feb. 6, 2007, 17 pgs.

*Sophos Ltd. and Sophos Inc.* v. *Webroot Inc.*, PTAB Case No. IPR2024-00253, Exhibit 1009: Declaration of Dr. Mary K. Bolin, Dec. 11, 2023, 318 pgs.

*Sophos Ltd. and Sophos Inc.* v. *Webroot Inc.*, PTAB Case No. IPR2024-00253, Exhibit 1010: Webroot Infringement Contentions, Oct. 25, 2022, 9 pgs.

*Sophos Ltd. and Sophos Inc.* v. *Webroot Inc.*, PTAB Case No. IPR2024-00253, Exhibit 1011: Crume, Jeff, Inside Internet Security, What Hackers Don't Want You to Know, Addison-Wesley, GB, first published 2000, 293 pgs.

*Sophos Ltd. and Sophos Inc.* v. *Webroot Inc.*, PTAB Case No. IPR2024-00253, Exhibit 1012: Internet Protocol DARPA Internet Program Protocol Specification, Marina del Rey, CA, Sep. 1981, 51 pgs.

*Sophos Ltd. and Sophos Inc.* v. *Webroot Inc.*, PTAB Case No. IPR2024-00253, Exhibit 1013: U.S. Pat. No. 8,201,243, Boney, Jun. 12, 2012, 13 pgs.

*Sophos Ltd. and Sophos Inc.* v. *Webroot Inc.*, PTAB Case No. IPR2024-00253, Exhibit 1014: File History of U.S. Pat. No. 8,201,243, Dec. 8, 2023, 423 pgs.

*Sophos Ltd. and Sophos Inc.* v. *Webroot Inc.*, PTAB Case No. IPR2024-00253, Exhibit 1015: Mandia, Kevin and Prosise, Chris, Incident Response, Investigating Computer Crime, Osborne/McGraw-Hill, Berkeley, CA, copyright 2001, 23 pgs.

*Sophos Ltd. and Sophos Inc.* v. *Webroot Inc.*, PTAB Case No. IPR2024-00253, Exhibit 1016: Stipulation Waiving IPR Claims in District Court Litigation, Dec. 6, 2023, 5 pgs.

*Sophos Ltd. and Sophos Inc.* v. *Webroot Inc.*, PTAB Case No. IPR2024-00253, Exhibit 1017: District Court Claim Construction Order entered in *Webroot, Inc.* v. *AO Kaspersky Lab*, No. 6:22-cv-00243-ADA-DTG (W.D. Tex.) (Dkt. 391), Jul. 25, 2023, 19 pgs.

*Sophos Ltd. and Sophos Inc.* v. *Webroot Inc.*, PTAB Case No. IPR2024-00253, Exhibit 1018: Declaration of Cristina L. Abad, Ph.D., Sep. 26, 2023, 61 pgs.

*Sophos Ltd. and Sophos Inc.* v. *Webroot Inc.*, PTAB Case No. IPR2024-00253, Exhibit 1019: Declaration of Z. Morley Mao, Ph.D., Oct. 11, 2023, 33 pgs.

*AO Kaspersky Lab* v. *Open Text Inc.*, PTAB Case No. IPR2024-00297, Petition for Inter Partes Review of U.S. Pat. No. 8,719,932, Dec. 8, 2023, 76 pgs.

*AO Kaspersky Lab* v. *Open Text Inc.*, PTAB Case No. IPR2024-00297, Exhibit 1001: U.S. Pat. No. 8,719,932, Boney, May 6, 2014, 12 pgs.

*AO Kaspersky Lab* v. *Open Text Inc.*, PTAB Case No. IPR2024-00297, Exhibit 1002: Declaration of Michael J. Donahoo, Ph.D. under 37 C.F.R. §1.68, Dec. 8, 2023, 113 pgs.

*AO Kaspersky Lab* v. *Open Text Inc.*, PTAB Case No. IPR2024-00297, Exhibit 1003: Curriculum Vitae of Michael J. Donahoo, Ph.D., Dec. 8, 2023, 12 pgs.

*AO Kaspersky Lab* v. *Open Text Inc.*, PTAB Case No. IPR2024-00297, Exhibit 1004: File History of U.S. Pat. No. 8,719,932, Dec. 8, 2023, 120 pgs.

*AO Kaspersky Lab* v. *Open Text Inc.*, PTAB Case No. IPR2024-00297, Exhibit 1005: U.S. Pat. No. 8,719,924, Williamson, May 6, 2014, 14 pgs.

*AO Kaspersky Lab* v. *Open Text Inc.*, PTAB Case No. IPR2024-00297, Exhibit 1006: U.S. Patent Publication No. 20070016951, Piccard, Jan. 18, 2007, 8 pgs.

(56) References Cited

OTHER PUBLICATIONS

*AO Kaspersky Lab* v. *Open Text Inc.*, PTAB Case No. IPR2024-00297, Exhibit 1007: U.S. Pat. No. 7,934,103, Kidron, Apr. 26, 2011, 13 pgs.

*AO Kaspersky Lab* v. *Open Text Inc.*, PTAB Case No. IPR2024-00297, Exhibit 1008: Walter Oney, Programming The Microsoft Windows Driver Model, 2nd ed., 2003, 467 pgs.

*AO Kaspersky Lab* v. *Open Text Inc.*, PTAB Case No. IPR2024-00297, Exhibit 1009: Ted Hudek & Don Marshall, KMDF Version History, Microsoft, at https://learn.microsoft.com/en-us/windows-hardware/drivers/wdf/kmdf-version-history, Oct. 31, 2023, 8 pgs.

*AO Kaspersky Lab* v. *Open Text Inc.*, PTAB Case No. IPR2024-00297, Exhibit 1010: Troy Mott, Learning Carbon, Apple Computer, Inc. eds., 1st ed., 2001, 3 pgs.

*AO Kaspersky Lab* v. *Open Text Inc.*, PTAB Case No. IPR2024-00297, Exhibit 1011: T James Gosling, Frank Yellin, & The Java Team, The Java™ Application Programming Interface, vol. 1: Core Packages in The Java Series . . . From The Source, May 29, 1996, 10 pgs.

*AO Kaspersky Lab* v. *Open Text Inc.*, PTAB Case No. IPR2024-00297, Exhibit 1012: Dictionary Of Computing, 4th ed. 1996, 6 pgs.

*AO Kaspersky Lab* v. *Open Text Inc.*, PTAB Case No. IPR2024-00297, Exhibit 1013: Sixth Amended Scheduling Order, *Open Text Inc.* v. *AO Kaspersky Lab*, 6:22-cv-00243-ADA-DTG (U.S. Dist. Ct. W. Dist. Tx. Waco Div.), Oct. 30, 2023, 3 pgs.

*AO Kaspersky Lab* v. *Open Text Inc.*, PTAB Case No. IPR2024-00297, Exhibit 1014: Claim Construction Order, *Webroot, Inc.*, *Open Text Inc.* v. *AO Kaspersky Lab*, 6:22-cv-00243-ADA-DTG (U.S. Dist. Ct. W. Dist. Tx. Waco Div.), Jul. 25, 2023, 19 pgs.

*AO Kaspersky Lab* v. *Open Text Inc.*, PTAB Case No. IPR2024-00297, Exhibit 1015: Fifth Amended Scheduling Order, *Open Text Inc.* v. *AO Kaspersky Lab*, 6:22-cv-00243-ADA-DTG (U.S. Dist. Ct. W. Dist. Tx. Waco Div.), Mar. 29, 2023, 9 pgs.

*AO Kaspersky Lab* v. *Open Text Inc.*, PTAB Case No. IPR2024-00297, Exhibit 1016: Plaintiffs' Responsive Claim Construction Brief Regarding Patents Plaintiffs Added by Amendment [263], *Open Text Inc.* v. *AO Kaspersky Lab*, 6:22-cv-00243-Ada-Dtg (U.S. Dist. Ct. W. Dist. Tx. Waco Div.) May 5, 2023, 70 pgs.

*AO Kaspersky Lab* v. *Open Text Inc.*, PTAB Case No. IPR2024-00297, Exhibit 1017: File History of U.S. Pat. No. 8,201,243, Dec. 8, 2023, 423 pgs.

*AO Kaspersky Lab* v. *Open Text Inc.*, PTAB Case No. IPR2024-00297, Exhibit 1018: James Boney, Cisco IOS In A Nutshell, Dec. 2001, 1381 pgs.

*AO Kaspersky Lab* v. *Open Text Inc.*, PTAB Case No. IPR2024-00297, Exhibit 1019: David Hucaby, Cisco ASA And PIX Firewall Logging, provided by Cisco Press, at https://www.ciscopress.com/articles/article.asp?p=424447 seqNum=2, Dec. 7, 2023, 19 pgs.

*AO Kaspersky Lab* v. *Open Text Inc.*, PTAB Case No. IPR2024-00297, Exhibit 1020: Jennifer M. Anderson, et al., Continuous Profiling: Where Have All the Cycles Gone?, 15 ACM Transactions on Computer Systems 357, Nov. 1997, 34 pgs.

*Trend Micro, Inc.* v. *Open Text Inc.*, PTAB Case No. IPR2023-01459, Petition for Inter Partes Review of U.S. Pat. No. 8,726,389, Oct. 4, 2023, 89 pgs.

*Trend Micro, Inc.* v. *Open Text Inc.*, PTAB Case No. IPR2023-01459, Exhibit 1001: U.S. Pat. No. 8,726,389, Morris, May 13, 2014, 17 pgs.

*Trend Micro, Inc.* v. *Open Text Inc.*, PTAB Case No. IPR2023-01459, Exhibit 1002: File History of U.S. Pat. No. 8,726,389, Oct. 4, 2023, 276 pgs.

*Trend Micro, Inc.* v. *Open Text Inc.*, PTAB Case No. IPR2023-01459, Exhibit 1003: Declaration of Dr. Wenke Lee, Feb. 17, 2023, 164 pgs.

*Trend Micro, Inc.* v. *Open Text Inc.*, PTAB Case No. IPR2023-01459, Exhibit 1004: U.S. Patent Application Publication No. 20050210035 A1, Kester et al., Sep. 22, 2005, 42 pgs.

*Trend Micro, Inc.* v. *Open Text Inc.*, PTAB Case No. IPR2023-01459, Exhibit 1005: U.S. Pat. No. 7,594,272, Kennedy et al., Sep. 22, 2009, 10 pgs.

*Trend Micro, Inc.* v. *Open Text Inc.*, PTAB Case No. IPR2023-01459, Exhibit 1006: U.S. Pat. No. 7,225,343, Honig et al., May 29, 2007, 22 pgs.

*Trend Micro, Inc.* v. *Open Text Inc.*, PTAB Case No. IPR2023-01459, Exhibit 1007: PO Opposition Markman Brief, 22-cv-00243 WDTX, No. 98, Nov. 18, 2022, 86 pgs.

*Trend Micro, Inc.* v. *Open Text Inc.*, PTAB Case No. IPR2023-01459, Exhibit 1008: Defendants' Markman Brief, 22-cv-00243 WDTX, No. 86, Oct. 28, 2022, 84 pgs.

*Trend Micro, Inc.* v. *Open Text Inc.*, PTAB Case No. IPR2023-01459, Exhibit 1009: Order Granting Fifth Amended Scheduling Order, 22-cv-00243 WDTX, No. 252, Mar. 29, 2023, 9 pgs.

*Trend Micro, Inc.* v. *Open Text Inc.*, PTAB Case No. IPR2023-01459, Exhibit 1010: *SANS Institute, Host*—vs. *Network-Based Intrusion Detection Systems*, 2000-2005, 11 pgs.

*Trend Micro, Inc.* v. *Open Text Inc.*, PTAB Case No. IPR2023-01459, Exhib: Intrusion Detection with Unlabeled Data Using Clustering by Leonid Portnoy, et al., Nov. 2001, 25 pgs.

*Trend Micro, Inc.* v. *Open Text Inc.*, PTAB Case No. IPR2023-01459, Exhibit 1012: U.S. Pat. No. 6,944,772, Dozortsev, Sep. 13, 2005, 10 pgs.

*Trend Micro, Inc.* v. *Open Text Inc.*, PTAB Case No. IPR2023-01459, Exhibit 1013: U.S. Pat. No. 6,772,346, Chess et al., Aug. 3, 2004, 14 pgs.

*Trend Micro, Inc.* v. *Open Text Inc.*, PTAB Case No. IPR2023-01459, Exhibit 1014: WO 2002033525, Shyne-Song Chuang, Apr. 25, 2002, 18 pgs.

*Trend Micro, Inc.* v. *Open Text Inc.*, PTAB Case No. IPR2023-01459, Exhibit 1015: EP 1,549,012, Kristof De Spiegeleer, Jun. 29, 2005, 19 pgs.

*Trend Micro, Inc.* v. *Open Text Inc.*, PTAB Case No. IPR2023-01459, Exhibit 1016: EP 1,280,040, Alexander James Hinchliffe, et al., Jan. 29, 2003, 17 pgs.

*Trend Micro, Inc.* v. *Open Text Inc.*, PTAB Case No. IPR2023-01459, Exhibit 1017: U.S. Pat. No. 7,089,428, Farley et al., Aug. 8, 2006, 35 pgs.

*Trend Micro, Inc.* v. *Open Text Inc.*, PTAB Case No. IPR2023-01459, Exhibit 1018: U.S. Patent Publication No. 20040153644, McCorkendale, Aug. 5, 2004, 16 pgs.

*Trend Micro, Inc.* v. *Open Text Inc.*, PTAB Case No. IPR2023-01459, Exhibit 1019: The NIDES Statistical Component: Description and Justification by Harold S. Javitz et al., Mar. 7, 1994, 52 pgs.

*Trend Micro, Inc.* v. *Open Text Inc.*, PTAB Case No. IPR2023-01459, Exhibit 1020: U.S. Pat. No. 7,516,476, Kraemer et al., Apr. 7, 2009, 13 pgs.

*Trend Micro, Inc.* v. *Open Text Inc.*, PTAB Case No. IPR2023-01459, Exhibit 1021: U.S. Pat. No. 8,418,250, Morris et al., Apr. 9, 2013, 17 pgs.

*Trend Micro, Inc.* v. *Open Text Inc.*, PTAB Case No. IPR2023-01459, Exhibit 1022: U.S. Pat. No. 10,284,591, Giuliani et al., May 7, 2019, 14 pgs.

*Trend Micro, Inc.* v. *Open Text Inc.*, PTAB Case No. IPR2023-01459, Notice of Filing Date Accorded to Petition and Time for Filing Patent Owner Preliminary Response, Oct. 17, 2023, 6 pgs.

*Trend Micro, Inc.* v. *Open Text Inc.*, PTAB Case No. IPR2023-01459, Patent Owner Open Text Inc.'s Mandatory Notices Pursuant to 37 CFR § 42.8(b), Oct. 25, 2023, 11 pgs.

*AO Kaspersky Lab* v. *Webroot Inc.*, PTAB Case No. IPR2024-00035, Petition for Inter Partes Review of U.S. Pat. No. 8,726,389, Oct. 11, 2023, 76 pgs.

*AO Kaspersky Lab* v. *Webroot Inc.*, PTAB Case No. IPR2024-00035, Exhibit 1001: U.S. Pat. No. 8,726,389, Morris et al., May 13, 2014, 17 pgs.

*AO Kaspersky Lab* v. *Webroot Inc.*, PTAB Case No. IPR2024-00035, Exhibit 1002: File History of U.S. Pat. No. 8,726,389, Oct. 11, 2023, 276 pgs.

*AO Kaspersky Lab* v. *Webroot Inc.*, PTAB Case No. IPR2024-00035, Exhibit 1003: Declaration of Dr. Wenke Lee, Feb. 17, 2023, 164 pgs.

*AO Kaspersky Lab* v. *Webroot Inc.*, PTAB Case No. IPR2024-00035, Exhibit 1004: U.S. Patent Application Publication No. 2005/0210035 A1, Kester et al., Sep. 22, 2005, 42 pgs.

(56)     References Cited

OTHER PUBLICATIONS

*AO Kaspersky Lab* v. *Webroot Inc.*, PTAB Case No. IPR2024-00035, Exhibit 1005: U.S. Pat. No. 7,594,272, Kennedy et al., Sep. 22, 2009, 10 pgs.
*AO Kaspersky Lab* v. *Webroot Inc.*, PTAB Case No. IPR2024-00035, Exhibit 1006: U.S. Pat. No. 7,225,343, Honig et al., May 29, 2007, 22 pgs.
*AO Kaspersky Lab* v. *Webroot Inc.*, PTAB Case No. IPR2024-00035, Exhibit 1007: PO Opposition Markman Brief, 22-cv-00243 WDTX, No. 98, Nov. 18, 2022, 86 pgs.
*AO Kaspersky Lab* v. *Webroot Inc.*, PTAB Case No. IPR2024-00035, Exhibit 1008: Defendants' Opening Markman Brief, 22-cv-00243 WDTX, No. 86, Oct. 28, 2022, 84 pgs.
*AO Kaspersky Lab* v. *Webroot Inc.*, PTAB Case No. IPR2024-00035, Exhibit 1009: Order Granting Fourth Amended Scheduling Order, 22-cv-00243 WDTX, No. 160, Jan. 22, 2023, 7 pgs.
*AO Kaspersky Lab* v. *Webroot Inc.*, PTAB Case No. IPR2024-00035, Exhibit 1010: *SANS Institute, Host—vs. Network-Based Intrusion Detection Systems*, 2000-2005, 11 pgs.
*AO Kaspersky Lab* v. *Webroot Inc.*, PTAB Case No. IPR2024-00035, Exhibit 1011: Intrusion Detection with Unlabeled Data Using Clustering by Leonid Portnoy, et al., Nov. 2001, 25 pgs.
*AO Kaspersky Lab* v. *Webroot Inc.*, PTAB Case No. IPR2024-00035, Exhibit 1012: U.S. Pat. No. 6,944,772, Dozortsev, Sep. 13, 2005, 10 pgs.
*AO Kaspersky Lab* v. *Webroot Inc.*, PTAB Case No. IPR2024-00035, Exhibit 1013: U.S. Pat. No. 6,772,346, Chess et al., Aug. 3, 2004, 14 pgs.
*AO Kaspersky Lab* v. *Webroot Inc.*, PTAB Case No. IPR2024-00035, Exhibit 1014: WO 2002/033525, Shyne-Song Chuang, Apr. 25, 2002, 18 pgs.
*AO Kaspersky Lab* v. *Webroot Inc.*, PTAB Case No. IPR2024-00035, Exhibit 1015: EP 1,549,012, Kristof De Spiegeleer, Jun. 29, 2005, 19 pgs.
*AO Kaspersky Lab* v. *Webroot Inc.*, PTAB Case No. IPR2024-00035, Exhibit 1016: EP 1,280,040, Alexander James Hinchliffe, et al., Jan. 29, 2003, 17 pgs.
*AO Kaspersky Lab* v. *Webroot Inc.*, PTAB Case No. IPR2024-00035, Exhibit 1017: U.S. Pat. No. 7,089,428, Farley et al., Aug. 8, 2006, 35 pgs.
*AO Kaspersky Lab* v. *Webroot Inc.*, PTAB Case No. IPR2024-00035, Exhibit 1018: U.S. Patent Publication No. 20040153644, McCorkendale, Aug. 5, 2004, 15 pgs.
*AO Kaspersky Lab* v. *Webroot Inc.*, PTAB Case No. IPR2024-00035, Exhibit 1019: The NIDES Statistical Component: Description and Justification by Harold S. Javitz et al., Mar. 7, 1994, 52 pgs.
*AO Kaspersky Lab* v. *Webroot Inc.*, PTAB Case No. IPR2024-00035, Exhibit 1020: U.S. Pat. No. 7516476, Kraemer et al., Apr. 7, 2009, 13 pgs.
*AO Kaspersky Lab* v. *Webroot Inc.*, PTAB Case No. IPR2024-00035, Exhibit 1021: U.S. Pat. No. 8,418,250, Morris et al., Apr. 9, 2013, 17 pgs.
*AO Kaspersky Lab* v. *Webroot Inc.*, PTAB Case No. IPR2024-00035, Exhibit 1022: U.S. Pat. No. 10,284,591, Giuliani et al., May 7, 2019, 14 pgs.
*AO Kaspersky Lab* v. *Webroot Inc.*, PTAB Case No. IPR2024-00035, Exhibit 1023: Declaration of V.S. Subrahmanian, Ph.D., Oct. 9, 2023, 88 pgs.
*AO Kaspersky Lab* v. *Webroot Inc.*, PTAB Case No. IPR2024-00035, Exhibit 1024: Order Granting Fifth Amended Scheduling Order, ECF No. 252, Mar. 29, 2023, 9 pgs.
*AO Kaspersky Lab* v. *Webroot Inc.*, PTAB Case No. IPR2024-00035, Notice of Filing Date Accorded to Petition and Time for Filing Patent Owner Preliminary Response, Oct. 17, 2023, 6 pgs.
*AO Kaspersky Lab* v. *Webroot Inc.*, PTAB Case No. IPR2024-00035, Patent Owner Open Text Inc.'s Mandatory Notices Pursuant to 37 CFR § 42.8(b), Oct. 25, 2023, 11 pgs.
*Trend Micro, Inc.* v. *Webroot Inc.*, PTAB Case No. IPR2024-00106, Petition for Inter Partes Review of U.S. Pat. No. 8,418,250, Nov. 8, 2023, 85 pgs.

*Trend Micro, Inc.* v. *Webroot Inc.*, PTAB Case No. IPR2024-00106, Exhibit 1001: U.S. Pat. No. 8,418,250, Morris, Apr. 9, 2013, 17 pgs.
*Trend Micro, Inc.* v. *Webroot Inc.*, PTAB Case No. IPR2024-00106, Exhibit 1002: File History for U.S. Pat. No. 8,418,250, Nov. 8, 2023, 888 pgs.
*Trend Micro, Inc.* v. *Webroot Inc.*, PTAB Case No. IPR2024-00106, Exhibit 1003: Complaint, *Webroot Inc, et al.* v. *Sophos Ltd.*, No. 6:22-cv-240 (W.D. Tex.), Mar. 4, 2022, 144 pgs.
*Trend Micro, Inc.* v. *Webroot Inc.*, PTAB Case No. IPR2024-00106, Exhibit 1004: Declaration of Dr. Richard Newman, Mar. 8, 2023, 85 pgs.
*Trend Micro, Inc.* v. *Webroot Inc.*, PTAB Case No. IPR2024-00106, Exhibit 1005: Curriculum Vitae of Dr. Richard Newman, Nov. 8, 2023, 13 pgs.
*Trend Micro, Inc.* v. *Webroot Inc.*, PTAB Case No. IPR2024-00106, Exhibit 1006: U.S. Patent Appl. Pub. No. 2004/0111632, Halperin, Jun. 10, 2004, 22 pgs.
*Trend Micro, Inc.* v. *Webroot Inc.*, PTAB Case No. IPR2024-00106, Exhibit 1007: U.S. Pat. No. 7,694,150, Kirby, Apr. 6, 2010, 22 pgs.
*Trend Micro, Inc.* v. *Webroot Inc.*, PTAB Case No. IPR2024-00106, Exhibit 1008: U.S. Pat. No. 7,900,194, Mankins, Mar. 1, 2011, 12 pgs.
*Trend Micro, Inc.* v. *Webroot Inc.*, PTAB Case No. IPR2024-00106, Exhibit 1009: Stipulation Waiving IPR Claims in District Court Litigation, Mar. 8, 2023, 4 pgs.
*Trend Micro, Inc.* v. *Webroot Inc.*, PTAB Case No. IPR2024-00106, Exhibit 1010: S. Forrest et al., Computer Immunology, Comms. of the ACM, vol. 40, No. 10, 88-96, 1997, 9 pgs.
*Trend Micro, Inc.* v. *Webroot Inc.*, PTAB Case No. IPR2024-00106, Exhibit 1011: A. Snoeren et al., Single-Packet IP Traceback, IEEE/ACM Trans. on Networking (TON), vol. 10, No. 6, 721-34, 2002, 14 pgs.
*Trend Micro, Inc.* v. *Webroot Inc.*, PTAB Case No. IPR2024-00106, Exhibit 1012: S. Hofmeyr, Intrusion Detection Using Sequences of System Calls, J. Computer Security, vol. 6, Issue 3, 151-180, Aug. 18, 1998, 25 pgs.
*Trend Micro, Inc.* v. *Webroot Inc.*, PTAB Case No. IPR2024-00106, Exhibit 1013: S. Forrest et al., A Sense of Self for Unix Processes, Proc. 1996 IEEE Symp. on Security and Privacy, 120-28 1996, 9 pgs.
*Trend Micro, Inc.* v. *Webroot Inc.*, PTAB Case No. IPR2024-00106, Exhibit 1014: Order Granting Fifth Amended Scheduling Order, Dkt. 253, *Webroot, Inc., et al.* v. *AO Kaspersky Lab*, No. 6:22-cv-00243-ADA-DTG (W.D. Tex.) Mar. 29, 2023, 7 pgs.
*Trend Micro, Inc.* v. *Webroot Inc.*, PTAB Case No. IPR2024-00106, Exhibit 1015: Excerpt from Transcript of Motions Hearing in *Webroot, Inc., et al.* v. *AO Kaspersky Lab*, No. 6:22-cv-00243-ADA-DTG (W.D. Tex.) Dec. 9, 2022, 7 pgs.
*Trend Micro, Inc.* v. *Webroot Inc.*, PTAB Case No. IPR2024-00106, Exhibit 1016: Threat Graphs examples: Malware detection, Sophos Ltd., KB-000036359, https://support.sophos.com/support/s/article/KB000036359?language=en_US, Feb. 23, 2023, 15 pgs.
*Trend Micro, Inc.* v. *Webroot Inc.*, PTAB Case No. IPR2024-00106, Corrected Exhibit, Nov. 22, 2023, 4 pgs.
*Trend Micro, Inc.* v. *Webroot Inc.*, PTAB Case No. IPR2024-00106, Exhibit 1014: Order Granting Fifth Amended Scheduling Order, Dkt. 253, *Webroot Inc et al.* v. *AO Kaspersky Lab*, No. 6:22-CV-00243-ADA-DTG (W.D. Tex, Mar. 29, 2023), Nov. 22, 2023, 9 pgs.
*Trend Micro, Inc.* v. *Webroot Inc.*, PTAB Case No. IPR2024-00106, Notice of Filing Date Accorded to Petition and Time for Filing Patent Owner Preliminary Response, Nov. 22, 2023, 6 pgs.
*Trend Micro, Inc.* v. *Webroot Inc.*, PTAB Case No. IPR2024-00106, Patent Owner Open Text Inc.'s Mandatory Notices Pursuant to 37 CFR § 42.8(b), Nov. 29, 2023, 10 pgs.
*Crowdstrike, Inc.* v. *Webroot Inc.*, PTAB Case No. IPR2022-01522, Joint Stipulation to Modify Due Dates 2-3, Oct. 6, 2023, 4 pgs.
*Crowdstrike, Inc.* v. *Webroot Inc.*, PTAB Case No. IPR2022-01522, Joint Stipulation to Modify Due Dates 2-3, Oct. 20, 2023, 4 pgs.
*Crowdstrike, Inc.* v. *Webroot Inc.*, PTAB Case No. IPR2022-01522, Panel Change Order, Nov. 6, 2023, 3 pgs.
*Crowdstrike, Inc.* v. *Webroot Inc.*, PTAB Case No. IPR2022-01522, Second Updated Joint Stipulation to Modify Due Dates 2-3, Nov. 7, 2023, 4 pgs.

(56) References Cited

OTHER PUBLICATIONS

*Crowdstrike, Inc.* v. *Webroot Inc.*, PTAB Case No. IPR2022-01522, Joint Motion to Terminate Proceeding, Nov. 20, 2023, 10 pgs.
*Crowdstrike, Inc.* v. *Webroot Inc.*, PTAB Case No. IPR2022-01522, Joint Request to Treat Agreement as Business Confidential Information, Nov. 20, 2023, 5 pgs.
*Crowdstrike, Inc.* v. *Webroot Inc.*, PTAB Case No. IPR2022-01522, Patent Owner's Request for Oral Argument, Dec. 12, 2023, 4 pgs.
*Crowdstrike, Inc.* v. *Webroot Inc.*, PTAB Case No. IPR2022-01522, Termination due to Settlement Prior to Institution of Trial, Jan. 8, 2024, 4 pgs.
*AO Kaspersky Lab* v. *Webroot Inc.*, PTAB Case No. IPR2023-00895, Decision denying Institution of Inter Partes Review, Dec. 7, 2023, 12 pgs.
*AO Kaspersky Lab* v. *Webroot Inc.*, PTAB Case No. IPR2023-00895, Petitioner's Request for Rehearing, Jan. 5, 2024, 20 pgs.
*AO Kaspersky Lab* v. *Webroot Inc.*, PTAB Case No. IPR2023-00895, Exhibit 1032: Fratric, Runtime Prevention of Return-Oriented Programming Attacks, Sep. 24, 2012, 16 pgs.
*AO Kaspersky Lab* v. *Webroot Inc.*, PTAB Case No. IPR2023-00895, Exhibit 1033: Fratric, Abstract of Runtime Prevention of Return-Oriented Programming Attacks, Jan. 5, 2024, 1 pgs.
*AO Kaspersky Lab* v. *Webroot Inc.*, PTAB Case No. IPR2023-00895, Exhibit 1034, Jan. 5, 2024, 2 pgs.
*AO Kaspersky Lab* v. *Webroot Inc.*, PTAB Case No. IPR2023-00895, Exhibit 1035: Email re: Subpoena served on GitHub, Dec. 6, 2023, 1 pg.
*AO Kaspersky Lab* v. *Webroot Inc.*, PTAB Case No. IPR2023-00895, Exhibit 1036: screenshot of Ivan Fratric communication dated Dec. 23, 2023, 1 pg.
*AO Kaspersky Lab* v. *Webroot Inc.*, PTAB Case No. IPR2023-00895, Exhibit 1037: screenshot of post of Ivan Fratric post dated Aug. 26, 2012, 1 pg.
*AO Kaspersky Lab* v. *Webroot Inc.*, PTAB Case No. IPR2023-00895, Exhibit 1038: Ivan Fratic's Security Blog dated Dec. 28, 23, 3 pgs.
*AO Kaspersky Lab* v. *Webroot Inc.*, PTAB Case No. IPR2023-00895, Exhibit 1039: Ivan Fratric's Security Blog dated Sep. 29, 2012, 16 pgs.
*AO Kaspersky Lab* v. *Webroot Inc.*, PTAB Case No. IPR2023-00895, Exhibit 1040: Google Code archive for Runtime Prevention of Return-Oriented Programming Attacks, Dec. 28, 2023, 1 pg.
*AO Kaspersky Lab* v. *Webroot Inc.*, PTAB Case No. IPR2023-00895, Exhibit 1041: Twitter listing of Users who reposted this post / X, Dec. 28, 2023, 4 pgs.
*AO Kaspersky Lab* v. *Webroot Inc.*, PTAB Case No. IPR2023-00895, Exhibit 1042: screenshot of Twitter posts, Jan. 5, 2024, 1 pg.
*AO Kaspersky Lab* v. *Webroot Inc.*, PTAB Case No. IPR2023-00124, Decision denying Patent Owner's Request on Rehearing of Decision granting Institution of Inter Partes Review, Oct. 13, 2023, 11 pgs.
*Crowdstrike, Inc.* v. *Webroot Inc.*, PTAB Case No. IPR2023-00124, Panel Change Order, Nov. 6, 2023, 3 pgs.
*Crowdstrike, Inc.* v. *Webroot Inc.*, PTAB Case No. IPR2023-00124, Joint Motion to Terminate Proceeding, Nov. 20, 2023, 10 pgs.
*Crowdstrike, Inc.* v. *Webroot Inc.*, PTAB Case No. IPR2023-00124, Joint Request to Treat Agreement as Business Confidential Information, Nov. 20, 2023, 5 pgs.
*Crowdstrike, Inc.* v. *Webroot Inc.*, PTAB Case No. IPR2023-00124, Decision granting Institution of Inter Parties Review and granting Motion for Joinder, Dec. 21, 2023, 10 pgs.
*Crowdstrike, Inc.* v. *Webroot Inc.*, PTAB Case No. IPR2023-00124, Order on Settlement as to CrowdStrike, Inc., Jan. 5, 2024, 5 pgs.
*Crowdstrike, Inc.* v. *Webroot Inc.*, PTAB Case No. IPR2023-00124, Petitioner's Reply to Patent Owner's Response, Jan. 8, 2024, 27 pgs.
*Crowdstrike, Inc.* v. *Webroot Inc.*, PTAB Case No. IPR2023-00124, Exhibit 1035: *Webroot, Inc. and Open Text Inc.* v. *AO Kaspserksy Lab, et al.*, Case No. 6:22-CV-243-ADA-DTG, Joint Claim Construction Statement, Dkt 185 (W.D. Tex., Feb. 20, 23), 12 pgs.

*Crowdstrike, Inc.* v. *Webroot Inc.*, PTAB Case No. IPR2023-00124, Exhibit 1036, Robert Sedgewick, Algorithms in C: Graph Algorithms (3rd ed.), Pearson Education, 2002, 571 pgs.
*Crowdstrike, Inc.* v. *Webroot Inc.*, PTAB Case No. IPR2023-00124, Exhibit 1037: David B. Guralnik, Webster's New World Dictionary of the American Language, 1984, 3 pgs.
*AO Kaspersky Lab* v. *Webroot Inc.*, PTAB Case No. IPR2023-01199, Patent Owner's Preliminary Response, Dec. 19, 2023, 14 pgs.
*AO Kaspersky Lab* v. *Webroot Inc.*, PTAB Case No. IPR2023-01199, Exhibit 2001: *Webroot, Inc. and Open Text Inc.* v. *AO Kaspersky Lab*, Case No. 6:22-cv-00243-ADA, Complaint, Dkt. 1 (W.D. Tex., Mar. 4, 2022), Dec. 19, 2023, 115 pgs.
*AO Kaspersky Lab* v. *Webroot Inc.*, PTAB Case No. IPR2023-01199, Exhibit 2002: *Webroot, Inc. and Open Text Inc.* v. *AO Kaspersky Lab*, Case No. 6:22-cv-00243-ADA, Waiver of the Service of Summons, Dkt. 16 (W.D. Tex., May 25, 2022), Dec. 19, 2023, 1 pgs.
*AO Kaspersky Lab* v. *Webroot Inc.*, PTAB Case No. IPR2023-01199, Exhibit 2003: Email chain from PTAB Trials to *E. Block re Crowdstrike* v. *Open Text Inc.*—IPR2023-00124 & IPR2023-001199 (U.S. Pat. No. 9,578,045) / Conference Call, (dated Nov. 21, 2023) , Dec. 19, 2023, 4 pgs.
*AO Kaspersky Lab* v. *Webroot Inc.*, PTAB Case No. IPR2023-01199, Decision granting Inter Partes Review and Motion for Joinder, Dec. 21, 2023, 10 pgs.
*AO Kaspersky Lab* v. *Webroot Inc.*, PTAB Case No. IPR2023-01199, Petitioner's Reply to Patent Owner's Response, Dec. 28, 2023, 27 pgs.
*AO Kaspersky Lab* v. *Webroot Inc.*, PTAB Case No. IPR2023-01199, Exhibit 1035: *Webroot, Inc. and Open Text Inc.* v. *AO Kaspserksy Lab, et al.*, Case No. 6:22-cv-243-ADA-DTG, Joint Claim Construction Statement, Dkt 185 (W.D. Tex., Feb. 20, 23), 12 pgs.
*AO Kaspersky Lab* v. *Webroot Inc.*, PTAB Case No. IPR2023-01199, Exhibit 1036, Robert Sedgewick, Algorithms in C: Graph Algorithms (3rd ed.), Pearson Education, 2002, 571 pgs.
*AO Kaspersky Lab* v. *Webroot Inc.*, PTAB Case No. IPR2023-01199, Exhibit 1037: David B. Guralnik, Webster's New World Dictionary of the American Language, 1984, 3 pgs.
*Crowdstrike, Inc.* v. *Webroot Inc.*, PTAB Case No. IPR2023-00126, Patent Owner's Response to Petition, Jul. 28, 2023, 71 pgs.
*Crowdstrike, Inc.* v. *Webroot Inc.*, PTAB Case No. IPR2023-00126, Exhibit 2022: Deposition Transcript of Wendke Lee Ph.D, dated Jul. 17, 2023, *Crowdstrike, Inc.* v. *Open Text Inc.*, Jul. 28, 2023, 268 pgs.
*Crowdstrike, Inc.* v. *Webroot Inc.*, PTAB Case No. IPR2023-00126, Exhibit 2023: Second Declaration of Professor Nenad Medvidovic, Jul. 28, 2023, 73 pgs.
*Crowdstrike, Inc.* v. *Webroot Inc.*, PTAB Case No. IPR2023-00126, Patent Owner Open Text Inc.'s Second Updated Mandatory Notices, Oct. 3, 2023, 10 pgs.
*Crowdstrike, Inc.* v. *Webroot Inc.*, PTAB Case No. IPR2023-00126, Joint Motion to Modify Due Dates 2 and 3, Oct. 6, 2023, 4 pgs.
*Crowdstrike, Inc.* v. *Webroot Inc.*, PTAB Case No. IPR2023-00126, Joint Motion to Modify Due Dates 2 and 3, Oct. 20, 2023, 4 pgs.
*Crowdstrike, Inc.* v. *Webroot Inc.*, PTAB Case No. IPR2023-00126, Second Updated Joint Stipulation to Modify Due Dates 2 and 3, Nov. 7, 2023, 4 pgs.
*Crowdstrike, Inc.* v. *Webroot Inc.*, PTAB Case No. IPR2023-00126, Panel Change Order, Nov. 9, 2023, 3 pgs.
*Crowdstrike, Inc.* v. *Webroot Inc.*, PTAB Case No. IPR2023-00126, Decision denying Patent Owner's Request for Rehearing of Decision granting Institution of Inter Partes Review, Nov. 15, 2023, 11 pgs.
*Crowdstrike, Inc.* v. *Webroot Inc.*, PTAB Case No. IPR2023-00126, Joint Motion to Terminate Proceeding, Nov. 20, 2023, 10 pgs.
*Crowdstrike, Inc.* v. *Webroot Inc.*, PTAB Case No. IPR2023-00126, Joint Request to Treat Agreement as Business Confidential Information, Nov. 20, 2023, 5 pgs.
*Crowdstrike, Inc.* v. *Webroot Inc.*, PTAB Case No. IPR2023-00126, Decision instituting Inter Partes Review and granting Petitioner's Motion for Joinder Nov. 28, 2023, 6 pgs.

(56) References Cited

OTHER PUBLICATIONS

*Crowdstrike, Inc.* v. *Webroot Inc.*, PTAB Case No. IPR2023-00126, Patent Owner's Request for Oral Argument, Dec. 22, 2023, 5 pgs.

*Crowdstrike, Inc.* v. *Webroot Inc.*, PTAB Case No. IPR2023-00126, Order Settlement as to Crowdstrike, Inc., Jan. 5, 2024, 4 pgs.

*Crowdstrike, Inc.* v. *Webroot Inc.*, PTAB Case No. IPR2023-00126, Order setting Oral Argument, Jan. 9, 2024, 9 pgs.

*AO Kaspersky Lab* v. *Webroot Inc.*, PTAB Case No. IPR2023-01011, Decision instituting Inter Partes Review, Nov. 28, 2023, 6 pgs.

*AO Kaspersky Lab* v. *Webroot Inc.*, PTAB Case No. IPR2023-01011, Petitioner's Reply to Patent Owner's Response, Dec. 18, 2023, 27 pgs.

*AO Kaspersky Lab* v. *Webroot Inc.*, PTAB Case No. IPR2023-01011, Exhibit 1034: *Webroot, Inc. and Open Text Inc.* v. *AO Kaspserksy Lab, et al.*, Case No. 6:22-cv-243-ADA-DTG, Joint Claim Construction Statement, Dkt 185 (W.D. Tex., Feb. 20, 23), 12 pgs.

*AO Kaspersky Lab* v. *Webroot Inc.*, PTAB Case No. IPR2023-01011, Exhibit 1035, Robert Sedgewick, Algorithms in C: Graph Algorithms (3rd ed.), Pearson Education, 2002, 571 pgs.

*AO Kaspersky Lab* v. *Webroot Inc.*, PTAB Case No. IPR2023-01011, Exhibit 1036: David B. Guralnik, Webster's New World Dictionary of the American Language, 1984, 3 pgs.

*Sophos Ltd. and Sophos Inc.* v. *Webroot Inc.*, PTAB Case No. IPR2023-00731, Order - Conduct of the Proceeding, Oct. 2, 2023, 3 pgs.

*Sophos Ltd. and Sophos Inc.* v. *Webroot Inc.*, PTAB Case No. IPR2023-00731, Motion to Dismiss Petition for Inter Partes Review, Oct. 10, 2023, 10 pgs.

*Sophos Ltd. and Sophos Inc.* v. *Webroot Inc.*, PTAB Case No. IPR2023-00731, Patent Owner's Opposition to Petitioners' Motion to Dismiss Petition, Oct. 13, 2023, 9 pgs.

*Sophos Ltd. and Sophos Inc.* v. *Webroot Inc.*, PTAB Case No. IPR2023-00731, Patent Owner's Updated Exhibit List, Oct. 13, 2023, 6 pgs.

*Sophos Ltd. and Sophos Inc.* v. *Webroot Inc.*, PTAB Case No. IPR2023-00731, Exhibit 2016: Best email to Eutermoser, Oct. 13, 2023, 3 pgs.

*Sophos Ltd. and Sophos Inc.* v. *Webroot Inc.*, PTAB Case No. IPR2023-00731, Exhibit 3002: Board email to Best, Oct. 16, 2023, 3 pgs.

*Sophos Ltd. and Sophos Inc.* v. *Webroot Inc.*, PTAB Case No. IPR2023-00731, Order denying Motion to Dismiss, Nov. 1, 2023, 6 pgs.

*Sophos Ltd. and Sophos Inc.* v. *Webroot Inc.*, PTAB Case No. IPR2023-00731, Decision denying Institution of Inter Partes Review, Nov. 2, 2023, 20 pgs.

*Sophos Ltd. and Sophos Inc.* v. *Webroot Inc.*, PTAB Case No. IPR2023-00731, Petitioners' Request for Rehearing by the Director, Dec. 4, 2023, 17 pgs.

*Sophos Ltd. and Sophos Inc.* v. *Webroot Inc.*, PTAB Case No. IPR2023-00731, Exhibit 3100: Best email re Request for Rehearing by the Director, Dec. 5, 2023, 2 pgs.

*Sophos Ltd. and Sophos Inc.* v. *Webroot Inc.*, PTAB Case No. IPR2023-00731, Order Denying Director Review, Dec. 21, 2023, 3 pgs.

*Crowdstrike, Inc.* v. *Open Text Inc.*, PTAB Case No. IPR2023-01052, Joint Motion to Terminate Proceeding, Nov. 20, 2023, 9 pgs.

*Crowdstrike, Inc.* v. *Open Text Inc.*, PTAB Case No. IPR2023-01052, Joint Request to Treat Agreement as Business Confidential Information, Nov. 20, 2023, 5 pgs.

*Crowdstrike, Inc.* v. *Open Text Inc.*, PTAB Case No. IPR2023-01052, Decision, Settlement Prior to Institution of Trial, Dec. 4, 2023, 5 pgs.

*Crowdstrike, Inc.* v. *Open Text Inc.*, PTAB Case No. IPR2023-01052, Exhibit 3001: Email regarding Joint Motion to Terminate Proceeding, Dec. 4, 2023, 2 pgs.

*Crowdstrike, Inc.* v. *Open Text Inc.*, PTAB Case No. IPR2023-01051, Joint Motion to Terminate Proceeding, Nov. 20, 2023, 9 pgs.

*Crowdstrike, Inc.* v. *Open Text Inc.*, PTAB Case No. IPR2023-01051, Joint Request to Treat Agreement as Business Confidential Information, Nov. 20, 2023, 5 pgs.

*Crowdstrike, Inc.* v. *Open Text Inc.*, PTAB Case No. IPR2023-01051, Decision, Settlement Prior to Institution of Trial, Dec. 4, 2023, 5 pgs.

*Crowdstrike, Inc.* v. *Open Text Inc.*, PTAB Case No. IPR2023-01051, Exhibit 3001: Email regarding Joint Motion to Terminate Proceeding, Dec. 4, 2023, 2 pgs.

*Crowdstrike, Inc.* v. *Open Text Inc.*, PTAB Case No. IPR2023-01159, Joint Motion to Terminate Proceeding, Nov. 20, 2023, 9 pgs.

*Crowdstrike, Inc.* v. *Open Text Inc.*, PTAB Case No. IPR2023-01159, Joint Request to Treat Agreement as Business Confidential Information, Nov. 20, 2023, 5 pgs.

*Crowdstrike, Inc.* v. *Open Text Inc.*, PTAB Case No. IPR2023-01159, Decision, Settlement Prior to Institution of Trial, Dec. 4, 2023, 5 pgs.

*Crowdstrike, Inc.* v. *Open Text Inc.*, PTAB Case No. IPR2023-01159, Exhibit 3001: Email regarding Joint Motion to Terminate Proceeding, Dec. 4, 2023, 2 pgs.

*Crowdstrike, Inc.* v. *Open Text Inc.*, PTAB Case No. IPR2023-01158, Joint Motion to Terminate Proceeding, Nov. 20, 2023, 9 pgs.

*Crowdstrike, Inc.* v. *Open Text Inc.*, PTAB Case No. IPR2023-01158, Joint Request to Treat Agreement as Business Confidential Information, Nov. 20, 2023, 5 pgs.

*Crowdstrike, Inc.* v. *Open Text Inc.*, PTAB Case No. IPR2023-01158, Decision, Settlement Prior to Institution of Trial, Dec. 4, 2023, 5 pgs.

*Crowdstrike, Inc.* v. *Open Text Inc.*, PTAB Case No. IPR2023-01158, Exhibit 3001: Email regarding Joint Motion to Terminate Proceeding, Dec. 4, 2023, 2 pgs.

*Forcepoint LLC* v. *Open Text, Inc.*, PTAB Case No. IPR2023-00786, Petitioner Forcepoint LLC's Updated Mandatory Notices Pursuant to 37 CFR § 42.8, Oct. 25, 2023, 5 pgs.

*Forcepoint LLC* v. *Open Text, Inc.*, PTAB Case No. IPR2023-00786, Order, Conduct of Proceedings, Oct. 30, 2023, 4 pgs.

*Forcepoint LLC* v. *Open Text, Inc.*, PTAB Case No. IPR2023-00786, Notice of Stipulation regarding Invalidity Contentions, Nov. 1, 2023, 5 pgs.

*Forcepoint LLC* v. *Open Text, Inc.*, PTAB Case No. IPR2023-00786, Patent Owner's Reply to Stipulation, Nov. 3, 2023, 7 pgs.

*Forcepoint LLC* v. *Open Text, Inc.*, PTAB Case No. IPR2023-00786, Exhibit 2013: Defendant Forcepoint LLC's Final Invalidity Contentions, Nov. 3, 2023, 394 pgs.

*Forcepoint LLC* v. *Open Text, Inc.*, PTAB Case No. IPR2023-00786, Decision denying Institution of Inter Partes Review, Nov. 9, 2023, 24 pgs.

*Forcepoint LLC* v. *Open Text, Inc.*, PTAB Case No. IPR2023-00786, Petitioner's Request for Rehearing, Nov. 22, 2023, 12 pgs.

*Forcepoint LLC* v. *Open Text, Inc.*, PTAB Case No. IPR2023-00786, Petitioner's Unopposed Motion to Withdraw Request for Rehearing of the Board's Decision Denying Inter Partes Review, Nov. 22, 2023, 5 pgs.

*Forcepoint LLC* v. *Webroot, Inc. and Open Text, Inc.*, Case No. IPR2023-00784, Petitioner's Forcepoint LLC's Updated Mandatory Notices Pursuant to 37 CFR § 42.8, Oct. 25, 2023, 5 pgs.

*Forcepoint LLC* v. *Webroot, Inc. and Open Text, Inc.*, Case No. IPR2023-00784, Order Conduct of the Proceeding, Oct. 30, 2023, 4 pgs.

*Forcepoint LLC* v. *Webroot, Inc. and Open Text, Inc.*, Case No. IPR2023-00784, Petitioner Forcepoint LLC's Notice of Stipulation regarding Invalidity Contentions, Nov. 1, 2023, 5 pgs.

*Forcepoint LLC* v. *Webroot, Inc. and Open Text, Inc.*, Case No. IPR2023-00784, Patent Owner's Reply to Stipulation, Nov. 3, 2023, 7 pgs.

*Forcepoint LLC* v. *Webroot, Inc. and Open Text, Inc.*, Case No. IPR2023-00784, Exhibit 2013: Final Invalidity Contentions, 394 pgs.

*Forcepoint LLC* v. *Webroot, Inc. and Open Text, Inc.*, Case No. IPR2023-00784, Decision denying Institution of Inter Partes Review, Nov. 13, 2023, 27 pgs.

(56) References Cited

OTHER PUBLICATIONS

*Forcepoint LLC* v. *Webroot, Inc. and Open Text, Inc.*, Case No. IPR2023-00784, Petitioner's Request for Rehearing, Nov. 27, 2023, 12 pgs.

*Forcepoint LLC* v. *Webroot, Inc. and Open Text, Inc.*, Case No. IPR2023-00784, Petitioner's Unopposed Motion to Withdraw its Request for Rehearing of the Board's Decision Denying Inter Partes Review, Dec. 12, 2023, 5 pgs.

*Forcepoint LLC* v. *Webroot, Inc. and Open Text, Inc.*, Case No. IPR2023- 00784, Order granting Petitioner's Unopposed Motion to Withdraw its Request for Rehearing of the Board's Decision Denying Inter Partes Review, Dec. 13, 2023, 3 pgs.

*Sophos Ltd. and Sophos Inc.* v. *Webroot Inc.*, PTAB Case No. PGR2023-00031, Decision denying Institution of Post-Grant Review, Nov. 29, 2023, 33 pgs.

*AO Kaspersky Lab* v. *Webroot Inc.*, PTAB Case No. IPR2023-01160, Patent Owner's Preliminary Response, Nov. 21, 2023, 60 pgs.

*AO Kaspersky Lab* v. *Webroot Inc.*, PTAB Case No. IPR2023-01160, Exhibit 2001: Declaration Of Sam Malek, Ph.D., Nov. 21, 2023, 37 pgs.

*AO Kaspersky Lab* v. *Webroot Inc.*, PTAB Case No. IPR2023-01160, Exhibit 2002: Curriculum Vitae of Sam Malek, Ph.D., Nov. 21, 2023, 36 pgs.

*AO Kaspersky Lab* v. *Webroot Inc.*, PTAB Case No. IPR2023-01160, Exhibit 2003: *Webroot, Inc., Open Text Inc.*, v. *AO Kaspersky Lab et al.*, Case No. 6:22-cv-00243-ADA-DTG, Claim Construction Order, Dkt. 391 (W.D. Tex Jul. 25, 2023), Nov. 21, 2023, 19 pgs.

*AO Kaspersky Lab* v. *Webroot Inc.*, PTAB Case No. IPR2023-01160, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), Nov. 21, 2023, 17 pgs.

*AO Kaspersky Lab* v. *Webroot Inc.*, PTAB Case No. IPR2023-01160, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), Nov. 21, 2023, 7 pgs.

*AO Kaspersky Lab* v. *Webroot Inc.*, PTAB Case No. IPR2023-01160, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), Nov. 21, 2023, 8 pgs.

*AO Kaspersky Lab* v. *Webroot Inc.*, PTAB Case No. IPR2023-01160, Exhibit 2007: Email dated Nov. 8, 2023 from David Holt to Trials@USPTO.gov re *CrowdStrike* v. *Open Text / Webroot* IPRs: Request to File Motions to Terminate, Nov. 21, 2023, 1 pg.

*AO Kaspersky Lab* v. *Webroot Inc.*, PTAB Case No. IPR2023-01160, Exhibit 2008: Email dated Nov. 13, 2023 from Trials@USPTO.gov to David Holt RE: *CrowdStrike* v *Open Text / Webroot* IPRs: Request to File Motions to Terminate, Nov. 21, 2023, 2 pgs.

*AO Kaspersky Lab* v. *Webroot Inc.*, PTAB Case No. IPR2023-01160, Exhibit 2009: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), Nov. 21, 2023, 2 pgs.

*AO Kaspersky Lab* v. *Webroot Inc.*, PTAB Case No. IPR2023-01160, Exhibit 2010: Dani Kass, "Catching Up On Patent Litigation With Judge Albright" (Law360 Mar. 14, 2023); https://www.law360.com/pulse/articles/1582438/print?section=pulse/courts, Nov. 21, 2023, 3 pgs.

*AO Kaspersky Lab* v. *Webroot Inc.*, PTAB Case No. IPR2023-01160, Exhibit 2011: *Webroot, Inc. and Open Text Inc.*, v. *AO Kaspersky Lab et al.*, Case No. 6:22-cv-243-ADA-DTG, Unopposed Motion to Modify the Scheduling Order, Dkt. 468 (W.D. Tex. Oct. 23, 2023) , Nov. 21, 2023, 10 pgs.

*AO Kaspersky Lab* v. *Webroot Inc.*, PTAB Case No. IPR2023-01160, Exhibit 2012: *Webroot, Inc., Open Text Inc.*, v. *AO Kaspersky Lab et al.*, Case No. 6:22-cv-00243-ADA-DTG, Order Granting Fifth Amended Scheduling Order, Dkt. 252 (W.D. Tex., Mar. 29, 2023) , Nov. 21, 2023, 9 pgs.

*AO Kaspersky Lab* v. *Webroot Inc.*, PTAB Case No. IPR2023-01160, Exhibit 2013: *Webroot, Inc. and Open Text Inc.*, v. *AO Kaspersky Lab*, Case No. 6:22-cv-00243-ADA-DTG, Defendant's AO Kaspersky Lab's Preliminary Invalidity Contentions, Appendix C (W.D. Tex., Feb. 21, 23) (excerpted) , Nov. 21, 2023, 4 pgs.

*AO Kaspersky Lab* v. *Webroot Inc.*, PTAB Case No. IPR2023-01160, Exhibit 2014: *Webroot, Inc. and Open Text Inc.*, v. *Sophos Ltd.*, Case No. 6:22-cv-00240-ADA-DTG, Defendant Sophos Ltd.'s Final Invalidity Contentions (W.D. Tex., Nov. 1, 2023) (excerpted), Nov. 21, 2023, 22 pgs.

*AO Kaspersky Lab* v. *Webroot Inc.*, PTAB Case No. IPR2023-01160, Exhibit 2015: *Webroot, Inc. and Open Text Inc.*, v. *AO Kaspersky Lab*, Case No. 6:22-cv-00243-ADA, Second Amended Complaint for Patent Infringement, Dkt. 122 (W.D. Tex., Dec. 9, 2022) , Nov. 21, 2023, 227 pgs.

*AO Kaspersky Lab* v. *Webroot Inc.*, PTAB Case No. IPR2023-01160, Exhibit 2016: *Webroot, Inc. and Open Text Inc.*, v. *Forcepoint LLC*, Case No. 6:22-cv-00342-ADA, Defendant Forcepoint LLC's Final Invalidity, (W.D. Tex., Nov. 1, 2023) (excerpted), Nov. 21, 2023, 89 pgs.

*AO Kaspersky Lab* v. *Webroot Inc.*, PTAB Case No. IPR2023-01160, Exhibit 2017: *Webroot, Inc. and Open Text Inc.*, v. *Trend Micro Inc.*, Case No. 6:22-cv-00243-ADA, Defendant's Final Invalidity Contentions (W.D. Tex., Nov. 1, 2023) (excerpted), Nov. 21, 2023, 7 pgs.

*AO Kaspersky Lab* v. *Webroot Inc.*, PTAB Case No. IPR2023-01160, Decision denying institution of Inter Parties Review, Feb. 7, 2024, 27 pgs.

*Crowdstrike, Inc.* v. *Webroot Inc.*, PTAB Case No. IPR2023-01053, Joint Motion to Terminate Proceeding, Nov. 20, 2023, 10 pgs.

*Crowdstrike, Inc.* v. *Webroot Inc.*, PTAB Case No. IPR2023-01053, Joint Request to Treat Agreement as Business Confidential Information, Nov. 20, 2023, 5 pgs.

*Crowdstrike, Inc.* v. *Webroot Inc.*, PTAB Case No. IPR2023-01053, Decision, Settlement Prior to Institution of Trial, Dec. 4, 2023, 5 pgs.

*Crowdstrike, Inc.* v. *Webroot Inc.*, PTAB Case No. IPR2023-01053, Exhibit 3001: email, Dec. 21, 2023, 2 pgs.

*Crowdstrike, Inc.* v. *Webroot Inc.*, PTAB Case No. IPR2023-00289, Updated Joint Stipulation to Modify Due Dates, Oct. 20, 2023, 4 pgs.

*Crowdstrike, Inc.* v. *Webroot Inc.*, PTAB Case No. IPR2023-00289, Second Updated Joint Stipulation to Modify Due Dates, Nov. 7, 2023, 4 pgs.

*Crowdstrike, Inc.* v. *Webroot Inc.*, PTAB Case No. IPR2023-00289, Panel Change Order, Nov. 9, 2023, 3 pgs.

*Crowdstrike, Inc.* v. *Webroot Inc.*, PTAB Case No. IPR2023-00289, Third Updated Joint Stipulation to Modify Due Dates, Nov. 16, 2023, 4 pgs.

*Crowdstrike, Inc.* v. *Webroot Inc.*, PTAB Case No. IPR2023-00289, Joint Motion to Terminate Proceeding, Nov. 20, 2023, 9 pgs.

*Crowdstrike, Inc.* v. *Webroot Inc.*, PTAB Case No. IPR2023-00289, Joint Request to Treat Agreement as Business Confidential Information, Nov. 20, 2023, 5 pgs.

*Crowdstrike, Inc.* v. *Webroot Inc.*, PTAB Case No. IPR2023-00289, Patent Owner's Response, Dec. 21, 2023, 72 pgs.

*Crowdstrike, Inc.* v. *Webroot Inc.*, PTAB Case No. IPR2023-00289, Exhibit 2018: Transcript of Wenke Lee, Ph.D., Dec. 21, 2023, 86 pgs.

*Crowdstrike, Inc.* v. *Webroot Inc.*, PTAB Case No. IPR2023-00289, Exhibit 2019: Declaration of Professor Nenad Medvidovic, Dec. 21, 2023, 87 pgs.

*Crowdstrike, Inc.* v. *Webroot Inc.*, PTAB Case No. IPR2023-00289, Exhibit 2020: *Webroot, Inc.* v. *Open Text Inc.* v. *AO Kaspersky Lab, et al.*, Case No. 22-cv-00243-ADA-DTG, Open Claim Construction Brief from: OA Kaspersky Lab et al., Dkt. 86 (W.D. Tex. Oct. 28, 2022) (excerpted), Dec. 21, 2023, 29 pgs.

*Crowdstrike, Inc.* v. *Webroot Inc.*, PTAB Case No. IPR2023-00289, Decision Granting Institution of Inter Partes Review and granting Motion for Joinder, Dec. 21, 2023, 10 pgs.

(56) References Cited

OTHER PUBLICATIONS

*Crowdstrike, Inc.* v. *Webroot Inc.*, PTAB Case No. IPR2023-00289, Order of Settlement as to Crowdstrike, Jan. 4, 2024, 5 pgs.
*Crowdstrike, Inc.* v. *Webroot Inc.*, PTAB Case No. IPR2023-00289, Exhibit 3001: email, Dec. 21, 2023, 2 pgs.
*Sophos Ltd. and Sophos Inc.* v. *Webroot Inc.*, PTAB Case No. IPR2023-00699, Patent Owner's Objections to Evidence submitted by Petitioner, Oct. 25, 2023, 6 pgs.
*Sophos Ltd. and Sophos Inc.* v. *Webroot Inc.*, PTAB Case No. IPR2023-00699, Petitioner's Updated Mandatory Notices, Nov. 27, 2023, 5 pgs.
*Sophos Ltd. and Sophos Inc.* v. *Webroot Inc.*, PTAB Case No. IPR2023-00699, Patent Owner's Response, Jan. 2, 2024, 80 pgs.
*Sophos Ltd. and Sophos Inc.* v. *Webroot Inc.*, PTAB Case No. IPR2023-00699, Exhibit 2015: Declaration of Nanad Medvidovic, Ph.D., Jan. 2, 2024, 76 pgs.
*Sophos Ltd. and Sophos Inc.* v. *Webroot Inc.*, PTAB Case No. IPR2023-00699, Exhibit 2016: Excerpt of Dr. Richard Newman Deposition Transcript, Jan. 2, 2024, 21 pgs.
*Sophos Ltd. and Sophos Inc.* v. *Webroot Inc.*, PTAB Case No. IPR2023-00699, Exhibit 2017: Gheorghescu—Automated Virus Classification System, Jan. 2, 2024, 7 pgs.
*Crowdstrike, Inc.* v. *Webroot Inc.*, PTAB Case No. IPR2023-00556, Panel Change Order, Nov. 8, 2023, 3 pgs.
*Crowdstrike, Inc.* v. *Webroot Inc.*, PTAB Case No. IPR2023-00556, Joint Stipulation to Modify Due Date 1, Nov. 16, 2023, 4 pgs.
*Crowdstrike, Inc.* v. *Webroot Inc.*, PTAB Case No. IPR2023-00556, Joint Motion to Terminate Proceeding, Nov. 20, 2023, 9 pgs.
*Crowdstrike, Inc.* v. *Webroot Inc.*, PTAB Case No. IPR2023-00556, Joint Request to Treat Agreement as Business Confidential Information, Nov. 20, 2023, 5 pgs.
*Crowdstrike, Inc.* v. *Webroot Inc.*, PTAB Case No. IPR2023-00556, Revised Scheduling Order, Jan. 2, 2024, 4 pgs.
*Crowdstrike, Inc.* v. *Webroot Inc.*, PTAB Case No. IPR2023-01050, Joint Request to Treat Agreement as Business Confidential Information, Nov. 20, 2023, 9 pgs.
*Crowdstrike, Inc.* v. *Webroot Inc.*, PTAB Case No. IPR2023-01050, Joint Motion to Terminate Proceeding, Nov. 20, 2023, 5 pgs.
*Crowdstrike, Inc.* v. *Webroot Inc.*, PTAB Case No. IPR2023-01050, Decision, Settlement Prior to Institution of Trial, Dec. 4, 2023, 5 pgs.
*Crowdstrike, Inc.* v. *Webroot Inc.*, PTAB Case No. IPR2023-01050, Exhibit 3001: Email regarding Joint Motion to Terminate Proceeding, Dec. 4, 2023, 2 pgs.
Request for Ex Parte Reexamination of U.S. Pat. No. 10,599,844 under 35 U.S.C. § 302 and 37 C.F.R. § 1.510, U.S. Appl. No. 90/015,286, filed Aug. 31, 2023, 85 pgs.
Exhibit 1001: U.S. Pat. No. 10,599,844 to Request for Ex Parte Reexamination of U.S. Pat. No. 10,599,844, U.S. Appl. No. 90/015,286, filed Aug. 31, 2023, 16 pgs.
Exhibit 1002: File History of U.S. Pat. No. 10,599,844 to Request for Ex Parte Reexamination of U.S. Pat. No. 10,599,844, U.S. Patent Application No. 90/015,286, filed Aug. 31, 2023, 459 pgs.
Exhibit 1003: Declaration of Dr. Markus Jakobsson to Request for Ex Parte Reexamination of U.S. Pat. No. 10,599,844, U.S. Patent Application No. 90/015,286, filed Aug. 31, 2023, 132 pgs.
Exhibit 1004: U.S. Patent Pub. No. 2012/0317644 to Kumar et al. to Request for Ex Parte Reexamination of U.S. Pat. No. 10,599,844, U.S. Patent Application No. 90/015,286, filed Aug. 31, 2023, 17 pgs.
Exhibit 1005: Mal-ID: Automatic Malware Detection Using Common Segment Analysis and Meta-Features by Gil Tahan et al. to Request for Ex Parte Reexamination of U.S. Pat. No. 10,599,844, U.S. Patent Application No. 90/015,286, filed Aug. 31, 2023, 32 pgs.
Exhibit 1006: U.S. Pat. No. 10,666,676 to Hsu et al. to Request for Ex Parte Reexamination of U.S. Pat. No. 10,599,844, U.S. Patent ApplicationNo. 90/015,286, filed Aug. 31, 2023, 21 pgs.
Exhibit 1007: 22-cv-00243, Dkt. 304, Plaintiffs' Responsive Claim Construction Brief ("Responsive Markman Brief, Dkt. 304") to Request for Ex Parte Reexamination of U.S. Pat. No. 10,599,844, U.S. Patent ApplicationNo. 90/015,286, filed Aug. 31, 2023, 71 pgs.
Exhibit 1008: Declaration of June Ann Munford to Request for Ex Parte Reexamination of U.S. Pat. No. 10,599,844, U.S. Patent Application No. 90/015,286, filed Aug. 31, 2023, 51 pgs.
Exhibit 1009: 22-cv-00243, Dkt. 98, Plaintiffs' Responsive Claim Construction Brief to Request for Ex Parte Reexamination of U.S. Pat. No. 10,599,844, U.S. Patent Application No. 90/015,286, filed Aug. 31, 2023, 87 pgs.
Exhibit 1010: 22-cv-00243, Dkt. 236 Claim Construction Order to Request for Ex Parte Reexamination of U.S. Pat. No. 10,599,844, U.S. Patent Application No. 90/015,286, filed Aug. 31, 2023, 21 pgs.
Exhibit 1011: Declaration of Dr. Ingrid Hsieg Yee to Request for Ex Parte Reexamination of U.S. Pat. No. 10,599,844, U.S. Patent Application No. 90/015,286, filed Aug. 31, 2023, 99 pgs.
Exhibit 1012: U.S. Patent Application No. 2013/0326625 to Anderson et al. to Request for Ex Parte Reexamination of U.S. Pat. No. 10,599,844, U.S. Patent Application No. 90/015,286, filed Aug. 31, 2023,83 pgs.
Exhibit 1013: U.S. Pat. No. 8,266,698 to Seshardi et al. to Request for Ex Parte Reexamination of U.S. Pat. No. 10,599,844, U.S. Patent Application No. 90/015,286, filed Aug. 31, 2023, 17 pgs.
Exhibit 1014: U.S. Pat. No. 9,489,514 to Mankin et al. to Request for Ex Parte Reexamination of U.S. Pat. No. 10,599,844, U.S. Patent Application No. 90/015,286, filed Aug. 31, 2023, 13 pgs.
Exhibit 1015: Intrusion Detection Using The Support Vector Machine Enhanced With A Feature -- Weight Kernel by Songlun Zhao et al. to Request for Ex Parte Reexamination of U.S. Pat. No. 10,599,844, U.S. Patent Application No. 90/015,286, filed Aug. 31, 2023, 89 pgs.
Exhibit 1016: Intrusion Detection Using Neural Networks and Support Vector Machines by Srinivas Mukkamala et al. to Request for Ex Parte Reexamination of U.S. Pat. No. 10,599,844, U.S. Patent Application No. 90/015,286, filed Aug. 31, 2023, 7 pgs.
Exhibit 1017: Classification of Malicious Domain Names using Support Vector Machine and Bi-gram Method by Nhauo Davuth et al. to Request for Ex Parte Reexamination of U.S. Pat. No. 10,599,844, U.S. Patent Application No. 90/015,286, filed Aug. 31, 2023, 9 pgs.
Exhibit 1018: Malware behavioral detection and vaccine development by using a support vector model classifier by Ping Wang et al. to Request for Ex Parte Reexamination of U.S. Pat. No. 10,599,844, U.S. Patent Application No. 90/015,286, filed Aug. 31, 2023, 16 pgs.
Exhibit 1019: U.S. Patent Publication No. 2008/0319932 to Wentau Yih et al. to Request for Ex Parte Reexamination of U.S. Pat. No. 10,599,844, U.S. Patent Application No. 90/015,286, filed Aug. 31, 2023, 27 pgs.
Exhibit 1020: Comparative Analysis of Combinations of Dimension Reduction and Data Mining Techniques for Malware Detection, by Proceso L. Fernandez Jr et al. to Request for Ex Parte Reexamination of U.S. Pat. No. 10,599,844, U.S. Patent ApplicationNo. 90/015,286, filed Aug. 31, 2023, 10 pgs.
Exhibit 1021: U.S. Pat. No. 9,349, 103 to Eberhardt, III et al. to Request for Ex Parte Reexamination of U.S. Pat. No. 10,599,844, U.S. Patent ApplicationNo. 90/015,286, filed Aug. 31, 2023, 25 pgs.
Exhibit 1022: U.S. Pat. No. 9,043,894 to Dennison et al. to Request for Ex Parte Reexamination of U.S. Pat. No. 10,599,844, U.S. Patent Application No. 90/015,286, filed Aug. 31, 2023, 49 pgs.
Exhibit 1023: U.S. Pat. No. 9,306,971 to Altman et al. to Request for Ex Parte Reexamination of U.S. Pat. No. 10,599,844, U.S. Patent Application No. 90/015,286, filed Aug. 31, 2023, 10 pgs.
Exhibit 1024: FIRMA: Malware Clustering and Network Signature Generation with Mixed Network Behaviors by M. Zubair Rafique to Request for Ex Parte Reexamination of U.S. Pat. No. 10,599,844, U.S. Patent Application No. 90/015,286, filed Aug. 31, 2023, 21 pgs.
Exhibit 1025: IPR2023-00528—*Sophos, Inc* v. *Open Text Inc. et al.*, Petition for IPR, Paper 1, to Request for Ex Parte Reexamination of U.S. Pat. No. 10,599,844, U.S. Patent Application No. 90/015,286, filed Aug. 31, 2023, 87 pgs.

(56) References Cited

OTHER PUBLICATIONS

Exhibit 1026: IPR2023-00662—*Trend Micro, Inc* v. *Webroot, Inc et al.* Petition for IPR, Paper 2, to Request for Ex Parte Reexamination of U.S. Pat. No. 10,599,844, U.S. Patent Application No. 90/015,286, filed Aug. 31, 2023, 86 pgs.

Exhibit 1027: IPR2023-01053—*CrowdStrike, Inc.* v. *Webroot Inc.*, Petitioner for IPR, Paper 2, to Request for Ex Parte Reexamination of U.S. Pat. No. 10,599,844, U.S. Patent Application No. 90/015,286, filed Aug. 31, 2023, 85 pgs.

Exhibit 1028: U.S. Pat. No. 11,409,869 to Request for Ex Parte Reexamination of U.S. Pat. No. 10,599,844, U.S. Patent Application No. 90/015,286, filed Aug. 31, 2023, 17 pgs.

Information Disclosure Statement submitted with Request for Ex Parte Reexamination of U.S. Pat. No. 10,599,844, U.S. Patent Application No. 90/015,286, filed Aug. 31, 2023, 4 pgs.

Notice of Assignment of Reexamination Request issued in U.S. Patent Application No. 90/015,286, dated Sep. 15, 2023, 1 pg.

Notice of Reexamination Request Filing Date issued in U.S. Patent Application No. 90/015,286, dated Sep. 15, 2023, 1 pg.

Order Granting Request for Ex Parte Reexamination issued in U.S. Patent Application No. 90/015,286, dated Sep. 15, 2023, 17 pgs.

*Trend Micro, Inc.* v. *Webroot Inc.*, PTAB Case No. IPR2023-01390, Patent Owner Open Text Inc.'s Mandatory Notices Pursuant to 37 CFR § 42.8(b), Sep. 28, 2023, 6 pgs.

*Trend Micro, Inc.* v. *Webroot Inc.*, PTAB Case No. IPR2023-01390, Patent Owner's Preliminary Response, Dec. 18, 2023, 32 pgs.

*Trend Micro, Inc.* v. *Webroot Inc.*, PTAB Case No. IPR2023-01390, Exhibit 2001: Declaration Of Matthew L. Boney In Support Of Patent Owner's Preliminary Response, Dec. 18, 2023, 1 pg.

*Trend Micro, Inc.* v. *Webroot Inc.*, PTAB Case No. IPR2023-01390, Exhibit 2002: Assignment of U.S. Publication No. 2007/0006310 A1 from Paul Piccard to Webroot Software, Inc. executed Jun. 30, 2005 and Corrective Assignment, Dec. 18, 2023, 5 pgs.

*Trend Micro, Inc.* v. *Webroot Inc.*, PTAB Case No. IPR2023-01390, Exhibit 2003: Paul Piccard LinkedIn, Dec. 18, 2023, 4 pgs.

*Trend Micro, Inc.* v. *Webroot Inc.*, PTAB Case No. IPR2023-01390, Exhibit 2004: Assignment of U.S. Appl. No. 11/408,146 from Matthew L. Boney to Webroot Software, Inc. executed on Jun. 7, 2006, Dec. 18, 2023, 4 pgs.

*Trend Micro, Inc.* v. *Webroot Inc.*, PTAB Case No. IPR2023-01390, Exhibit 2005: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), Dec. 18, 2023, 7 pgs.

*Trend Micro, Inc.* v. *Webroot Inc.*, PTAB Case No. IPR2023-01390, Exhibit 2006: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), Dec. 18, 2023, 7 pgs.

*Trend Micro, Inc.* v. *Webroot Inc.*, PTAB Case No. IPR2023-01390, Exhibit 2007: *Intellectual Ventures I LLC et al.* v. *Hewlett Packard Enterprise Co.*, No. 6:21-cv-00596—*Trend Micro, Inc.* v. *Webroot Inc.*, PTAB Case No. IPR2023-01391, Exhibit ADA, Order Denying Hewlett Packard Enterprise Company's Opposed Motion to Stay Pending Resolution of Inter Partes Review, Dkt. 104 (W.D. Tex., Dec. 22, 2022), Dec. 18, 2023, 8 pgs.

*Trend Micro, Inc.* v. *Webroot Inc.*, PTAB Case No. IPR2023-01390, Exhibit 2008: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), Dec. 18, 2023, 2 pgs.

*Trend Micro, Inc.* v. *Webroot Inc.*, PTAB Case No. IPR2023-01390, Exhibit 2009: Dani Kass, "Catching Up On Patent Litigation With Judge Albright" (Law360 Mar. 14, 2023), Dec. 18, 2023, 3 pgs.

*Trend Micro, Inc.* v. *Webroot Inc.*, PTAB Case No. IPR2023-01390, Exhibit 2010: *Webroot, Inc. and Open Text Inc.*, v. *Trend Micro, Inc et al.*, Case No. 6:22-cv-243-ADA-DTG, Amend the Schedule Order, Dkt. 521 (W.D. Tex. Dec. 7, 2023), Dec. 18, 2023, 4 pgs.

*Trend Micro, Inc.* v. *Webroot Inc.*, PTAB Case No. IPR2023-01390, Exhibit 2011: *Webroot, Inc. and Open Text Inc.*, v. *Sophos Ltd.*, Case No. 6:22-cv-00240-ADA-DTG, Defendant Sophos Ltd.'s Final Invalidity Contentions (W.D. Tex., Nov. 1, 2022) (excerpted), Dec. 18, 2023, 11 pgs.

*Trend Micro, Inc.* v. *Webroot Inc.*, PTAB Case No. IPR2023-01390, Exhibit 2012: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2023), Dec. 18, 2023, 19 pgs.

*Trend Micro, Inc.* v. *Webroot Inc.*, PTAB Case No. IPR2023-01390, Exhibit 2013: USPTO Assignment Record for U.S. Pub. No. 2009/0144826 A2 (Prior U.S. Pub. No. 2007/0006310 A1), U.S. Appl. No. 11/171,924, filed Jun. 30, 2005, issued Jun. 4, 2009, Dec. 18, 2023, 2 pgs.

*Trend Micro, Inc.* v. *Webroot Inc.*, PTAB Case No. IPR2023-01390, Exhibit 2014: USPTO Assignment Record for U.S. Pat. No. 8,201,243, U.S. Pub. No. 2007/0250817 A1, Application No. 11/408, 146, filed Apr. 20, 2006, issued Jun. 12, 2012, Dec. 18, 2023, 3 pgs.

*Trend Micro, Inc.* v. *Webroot Inc.*, PTAB Case No. IPR2023-01390, Decision denying Institution of Inter Partes Review, Feb. 17, 2024, 9 pgs.

*Trend Micro, Inc.* v. *Webroot Inc.*, PTAB Case No. IPR2023-01391, Patent Owner Open Text Inc.'s Mandatory Notices Pursuant to 37 CFR § 42.8(b), Sep. 28, 2023, 6 pgs.

*Trend Micro, Inc.* v. *Webroot Inc.*, PTAB Case No. IPR2023-01391, Patent Owner's Preliminary Response, Dec. 18, 2023, 32 pgs.

*Trend Micro, Inc.* v. *Webroot Inc.*, PTAB Case No. IPR2023-01391, Exhibit 2001: Declaration Of Matthew L. Boney In Support Of Patent Owner's Preliminary Response, Dec. 18, 2023, 1 pg.

*Trend Micro, Inc.* v. *Webroot Inc.*, PTAB Case No. IPR2023-01391, Exhibit 2002: Assignment of U.S. Publication No. 2007/0006310 A1 from Paul Piccard to Webroot Software, Inc. executed Jun. 30, 2005 and Corrective Assignment, Dec. 18, 2023, 5 pgs.

*Trend Micro, Inc.* v. *Webroot Inc.*, PTAB Case No. IPR2023-01391, Exhibit 2003: Paul Piccard LinkedIn, Dec. 18, 2023, 4 pgs.

*Trend Micro, Inc.* v. *Webroot Inc.*, PTAB Case No. IPR2023-01391, Exhibit 2004: Assignment of U.S. Appl. No. 13/490,294 from Matthew L. Boney to Webroot Software, Inc. executed on Jun. 7, 2006, Dec. 18, 2023, 4 pgs.

*Trend Micro, Inc.* v. *Webroot Inc.*, PTAB Case No. IPR2023-01391, Exhibit 2005: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), Dec. 18, 2023, 7 pgs.

*Trend Micro, Inc.* v. *Webroot Inc.*, PTAB Case No. IPR2023-01391, Exhibit 2006: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), Dec. 18, 2023, 7 pgs.

*Trend Micro, Inc.* v. *Webroot Inc.*, PTAB Case No. IPR2023-01391, Exhibit 2007: *Intellectual Ventures I LLC et al.* v. *Hewlett Packard Enterprise Co.*, No. 6:21-cv-00596—*Trend Micro, Inc.* v. *Webroot Inc.*, PTAB Case No. IPR2023-01391, Exhibit ADA, Order Denying Hewlett Packard Enterprise Company's Opposed Motion to Stay Pending Resolution of Inter Partes Review, Dkt. 104 (W.D. Tex., Dec. 22, 2022), Dec. 18, 2023, 8 pgs.

*Trend Micro, Inc.* v. *Webroot Inc.*, PTAB Case No. IPR2023-01391, Exhibit 2008: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), Dec. 18, 2023, 2 pgs.

*Trend Micro, Inc.* v. *Webroot Inc.*, PTAB Case No. IPR2023-01391, Exhibit 2009: Dani Kass, "Catching Up On Patent Litigation With Judge Albright" (Law360 Mar. 14, 2023), Dec. 18, 2023, 3 pgs.

*Trend Micro, Inc.* v. *Webroot Inc.*, PTAB Case No. IPR2023-01391, Exhibit 2010: *Webroot, Inc. and Open Text Inc.*, v. *Trend Micro, Inc. et al.*, Case No. 6:22-cv-243-ADA-DTG, Amend the Schedule Order, Dkt. 521 (W.D. Tex. Dec. 7, 2023), Dec. 18, 2023, 4 pgs.

*Trend Micro, Inc.* v. *Webroot Inc.*, PTAB Case No. IPR2023-01391, Exhibit 2011: *Webroot, Inc. and Open Text Inc.*, v. *Sophos Ltd.*, Case

(56) References Cited

OTHER PUBLICATIONS

No. 6:22-cv-00240-ADA-DTG, Defendant Sophos Ltd.'s Final Invalidity Contentions (W.D. Tex., Nov. 1, 2022) (excerpted), Dec. 18, 2023, 11 pgs.

*Trend Micro, Inc.* v. *Webroot Inc.*, PTAB Case No. IPR2023-01391, Exhibit 2012: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2023), Dec. 18, 2023, 19 pgs.

*Trend Micro, Inc.* v. *Webroot Inc.*, PTAB Case No. IPR2023-01391, Exhibit 2013: USPTO Assignment Record for U.S. Pub. No. 2009/0144826 A2 (Prior U.S. Pub. No. 2007/0006310 A1), U.S. Appl. No. 11/171,924, filed Jun. 30, 2005, issued Jun. 4, 2009, Dec. 18, 2023, 2 pgs.

*Trend Micro, Inc.* v. *Webroot Inc.*, PTAB Case No. IPR2023-01391, Exhibit 2014: USPTO Assignment Record for U.S. Pat. No. 8,719,932, U.S. Pub. No. 2012/0246722 A1, U.S. Appl. No. 13/490,294, filed Jun. 26, 2012, issued May 6, 2014, Dec. 18, 2023, 3 pgs.

*Trend Micro, Inc.* v. *Webroot Inc.*, PTAB Case No. IPR2023-01391, Decision denying Institution of Inter Partes Review, Feb. 17, 2024, 9 pgs. (intentionally blank).

*Trend Micro, Inc.* v. *Webroot Inc.*, PTAB Case No. IPR2023-01380, Patent Owner Open Text Inc.'s Mandatory Notices pursuant to 37 CFR § 42.8(b), Sep. 26, 2023, 9 pgs.

*Trend Micro, Inc.* v. *Webroot Inc.*, PTAB Case No. IPR2023-01380, Notice of Filing Date Accorded to Petition and Time for filing Patent Owner Preliminary Response, Sep. 26, 2023, 6 pgs.

*Trend Micro, Inc.* v. *Webroot Inc.*, PTAB Case No. IPR2023-01380, Patent Owner's Preliminary Response, Dec. 21, 2023, 75 pgs.

*Trend Micro, Inc.* v. *Webroot Inc.*, PTAB Case No. IPR2023-01380, Exhibit 2001: Declaration Of Sam Malek, Ph.D., Dec. 21, 2023, 55 pgs.

*Trend Micro, Inc.* v. *Webroot Inc.*, PTAB Case No. IPR2023-01380, Exhibit 2002: Curriculum Vitae of Sam Malek, Ph.D., Feb. 14, 2023, 36 pgs.

*Trend Micro, Inc.* v. *Webroot Inc.*, PTAB Case No. IPR2023-01380, Exhibit 2003: *Webroot, Inc., Open Text Inc.*, v. *AO Kaspersky Lab et al.*, Case No. 6:22-cv-00243-ADA-DTG, Order Granting Amended Scheduling Order, Dkt. 521 (W.D. Tex., Dec. 7, 2023), 4 pgs.

*Trend Micro, Inc.* v. *Webroot Inc.*, PTAB Case No. IPR2023-01380, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Trend Micro, Inc.* v. *Webroot Inc.*, PTAB Case No. IPR2023-01380, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Trend Micro, Inc.* v. *Webroot Inc.*, PTAB Case No. IPR2023-01380, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Trend Micro, Inc.* v. *Webroot Inc.*, PTAB Case No. IPR2023-01380, Exhibit 2007: *Webroot, Inc. and Open Text Inc.*, v. *AO Kaspersky Lab et al.*, Case No. 6:22-cv-243-ADA-DTG, Claim Construction Order, Dkt. 236 (W.D. Tex., Mar. 16, 2023), 20 pgs.

*Trend Micro, Inc.* v. *Webroot Inc.*, PTAB Case No. IPR2023-01380, Exhibit 2008: Dani Kass, "Catching Up On Patent Litigation With Judge Albright" (Law360 Mar. 14, 2023) at https://www.law360.com/pulse/articles/1582438/print?section=pulse/courts, 3 pgs.

*Trend Micro, Inc.* v. *Webroot Inc.*, PTAB Case No. IPR2023-01380, Exhibit 2009: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2023), 19 pgs.

*Trend Micro, Inc.* v. *Webroot Inc.*, PTAB Case No. IPR2023-01380, Exhibit 2010: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.

*Trend Micro, Inc.* v. *Webroot Inc.*, PTAB Case No. IPR2023-01380, Exhibit 2011: *Webroot, Inc. and Open Text Inc.*, v. *Trend Micro, Inc.*, Case No. 6:22-CV-00239-ADA, Complaint for Patent Infringement, Dkt. 1 (W.D. Tex., Mar. 4, 2022), 6 pgs.

*Trend Micro, Inc.* v. *Webroot Inc.*, PTAB Case No. IPR2023-01380, Exhibit 2012: *Webroot, Inc. and Open Text Inc.*, v. *AO Kaspersky Lab*, Case No. 6:22-CV-00243-ADA-DTG, Defendant's Preliminary Invalidity Contentions Appendix C (W.D. Tex., Sep. 14, 2022), 4 pgs.

*Trend Micro, Inc.* v. *Webroot Inc.*, PTAB Case No. IPR2023-01380, Exhibit 2013: *Webroot, Inc. and Open Text Inc.*, v. *Sophos Ltd.*, Case No. 6:22- cv-00240-ADA-DTG, Defendant Sophos Ltd.'s Final Invalidity Contentions (W.D. Tex., Nov. 1, 2023) (excerpted), 4 pgs.

*Trend Micro, Inc.* v. *Webroot Inc.*, PTAB Case No. IPR2023-01380, Exhibit 2014: *Webroot, Inc. and Open Text Inc.*, v. *Trend Micro Inc.*, Case No. 6:22-cv-00239-ADA-DTG,: Defendant's Final Invalidity Contentions (W.D. Tex., Nov. 1, 2023) (excerpted), 7 pgs.

*Trend Micro, Inc.* v. *Webroot Inc.*, PTAB Case No. IPR2023-01380, Joint Motion to Terminate Proceedings, Feb. 19, 2024, 16 pgs.

*Trend Micro, Inc.* v. *Webroot Inc.*, PTAB Case No. IPR2023-01380, Joint Request to Treat Agreement as Confidential Information, Feb. 19, 2024, 7 pgs.

*Trend Micro, Inc.* v. *Webroot Inc.*, PTAB Case No. IPR2023-01380, Decision—Settlement prior to Institution of Trial, Feb. 28, 2024, 5 pgs.

*Trend Micro, Inc.* v. *Webroot Inc.*, PTAB Case No. IPR2023-01389, Notice of Filing Date Accorded to Petition and Time for Filing Patent Owner Preliminary Response, Sep. 26, 2023, 6 pgs.

*Trend Micro, Inc.* v. *Webroot Inc.*, PTAB Case No. IPR2023-01389, Patent Owner Open Text Inc.'s Mandatory Notices Pursuant to 37 CFR § 42.8(b), Sep. 28, 2023.

*Trend Micro, Inc.* v. *Webroot Inc.*, PTAB Case No. IPR2023-01389, Patent Owner's Preliminary Response, Dec. 22, 2023, 72 pgs.

*Trend Micro, Inc.* v. *Webroot Inc.*, PTAB Case No. IPR2023-01389, Exhibit 2001: Declaration of Ron Schnell, 26 pgs.

*Trend Micro, Inc.* v. *Webroot Inc.*, PTAB Case No. IPR2023-01389, Exhibit 2002: Curriculum Vitae of Ron Schnell, 5 pgs.

*Trend Micro, Inc.* v. *Webroot Inc.*, PTAB Case No. IPR2023-01389, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 5 pgs.

*Trend Micro, Inc.* v. *Webroot Inc.*, PTAB Case No. IPR2023-01389, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Trend Micro, Inc.* v. *Webroot Inc.*, PTAB Case No. IPR2023-01389, Exhibit 2005: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Trend Micro, Inc.* v. *Webroot Inc.*, PTAB Case No. IPR2023-01389, Exhibit 2006: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.

*Trend Micro, Inc.* v. *Webroot Inc.*, PTAB Case No. IPR2023-01389, Exhibit 2007: Dani Kass, "Catching Up On Patent Litigation With Judge Albright" (Law360 Mar. 14, 2023), 3 pgs.

*Trend Micro, Inc.* v. *Webroot Inc.*, PTAB Case No. IPR2023-01389, Exhibit 2008: *Webroot, Inc. and Open Text Inc.*, v. *Trend Micro, Inc et al.*, Case No. 6:22-cv-243-ADA-DTG, Amend the Schedule Order, Dkt. 521 (W.D. Tex. Dec. 7, 2023), 4 pgs.

*Trend Micro, Inc.* v. *Webroot Inc.*, PTAB Case No. IPR2023-01389, Exhibit 2009: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2023), 19 pgs.

(56) References Cited

OTHER PUBLICATIONS

*Trend Micro, Inc.* v. *Webroot Inc.*, PTAB Case No. IPR2023-01389, Exhibit 2010: *Webroot, Inc. and Open Text Inc.*, v. *Sophos Ltd.*, Case No. 6:22-cv-240-ADA-DTG, Defendant Sophos Ltd.'s Final Invalidity Contentions—Claim Chart 505-A-21, Garfinkel, (W.D. Tex. Nov. 1, 2023) (excerpted), 30 pgs.

*Trend Micro, Inc.* v. *Webroot Inc.*, PTAB Case No. IPR2023-01389, Exhibit 2011: *Webroot, Inc. and Open Text Inc.*, v. *Sophos Ltd.*, Case No. 6:22-cv-240-ADA-DTG, Defendant Sophos Ltd.'s Final Invalidity Contentions—Claim Chart 505-A-22 ("Hoglund") (W.D. Tex. Nov. 1, 2023) (excerpted), 32 pgs.

*Trend Micro, Inc.* v. *Webroot Inc.*, PTAB Case No. IPR2023-01389, Exhibit 2012: Wayback Machine re symposium website address, https://web.archive.org/web/20230000000000*/https:/www.ndss-symposium.org/ndss2003/, 3 pgs.

*Trend Micro, Inc.* v. *Webroot Inc.*, PTAB Case No. IPR2023-01389, Exhibit 2013: Network and Distributed System Security Symposium conference proceedings-2003 [electronic resource]: NDSS '03 Symposium; https://science-catalogue.canada.ca/record=b2011094~S6, 3 pgs.

*Trend Micro, Inc.* v. *Webroot Inc.*, PTAB Case No. IPR2023-01389, Order: Conduct of the Proceeding, Jan. 29, 2024, 5 pgs.

*Trend Micro, Inc.* v. *Webroot Inc.*, PTAB Case No. IPR2023-01389, Exhibit 3001: Jan. 29, 2024 Joint email re: Petitioner's Request for Leave to file Appendices Missing from Dr. Yee's Declaration, 2 pgs.

*Trend Micro, Inc.* v. *Webroot Inc.*, PTAB Case No. IPR2023-01389, Joint Motion to Terminate Proceedings, Feb. 19, 2024, 9 pgs.

*Trend Micro, Inc.* v. *Webroot Inc.*, PTAB Case No. IPR2023-01389, Joint Request to Treat Agreement as Confidential Information, Feb. 19, 2024, 6 pgs.

*Trend Micro, Inc.* v. *Webroot Inc.*, PTAB Case No. IPR2023-01389, Decision—Settlement prior to Institution of Trial, Feb. 28, 2024, 5 pgs.

*Trend Micro, Inc.* v. *Webroot Inc.*, PTAB Case No. IPR2023-01392, Notice of Accepting Corrected Petition, Sep. 26, 2023, 2 pgs.

*Trend Micro, Inc.* v. *Webroot Inc.*, PTAB Case No. IPR2023-01392, Patent Owner Open Text Inc.'s Mandatory Notices Pursuant to 37 CFR § 42.8(b), Sep. 28, 2023, 10 pgs.

*Trend Micro, Inc.* v. *Webroot Inc.*, PTAB Case No. IPR2023-01392, Corrected Petition for Inter Partes Review of U.S. Pat. No. 8,181,244, Oct. 26, 23, 87 pgs.

*Trend Micro, Inc.* v. *Webroot Inc.*, PTAB Case No. IPR2023-01392, Exhibit 1020: Redlined Petition for Inter Partes Review of U.S. Pat. No. 8,181,244, Oct. 26, 23, 94 pgs.

*Trend Micro, Inc.* v. *Webroot Inc.*, PTAB Case No. IPR2023-01392, Patent Owner's Preliminary Response, Dec. 18, 2023, 32 pgs.

*Trend Micro, Inc.* v. *Webroot Inc.*, PTAB Case No. IPR2023-01392, Exhibit 2001: Declaration Of Matthew L. Boney In Support Of Patent Owner's Preliminary Response, 1 pg.

*Trend Micro, Inc.* v. *Webroot Inc.*, PTAB Case No. IPR2023-01392, Exhibit 2002: Assignment of U.S. Patent Publication No. 2007/0006310 A1 from Paul Piccard to Webroot Software, Inc. executed Jun. 30, 2005 and Corrective Assignment, 5 pgs.

*Trend Micro, Inc.* v. *Webroot Inc.*, PTAB Case No. IPR2023-01392, Exhibit 2003: Paul Piccard LinkedIn, 4 pgs.

*Trend Micro, Inc.* v. *Webroot Inc.*, PTAB Case No. IPR2023-01392, Exhibit 2004: Assignment of U.S. Appl. No. 11/408,145 from Matthew L. Boney to Webroot Software, Inc. executed on Jun. 7, 2006, 4 pgs.

*Trend Micro, Inc.* v. *Webroot Inc.*, PTAB Case No. IPR2023-01392, Exhibit 2005: USPTO Assignment Record for U.S. Pub. No. 2009/0144826 A2 (Prior U.S. Pub. No. 2007/0006310 A1), U.S. Appl. No. 11/171,924, filed Jun. 30, 2005, issued Jun. 4, 2009, 2 pgs.

*Trend Micro, Inc.* v. *Webroot Inc.*, PTAB Case No. IPR2023-01392, Exhibit 2006: USPTO Assignment Record for U.S. Pat. No. 8,181,244, U.S. Pub. No. 2007/0250928 A1, U.S. Appl. No. 11/408,145, filed Apr. 20, 2006, issued May 15, 2012, 3 pgs.

*Trend Micro, Inc.* v. *Webroot Inc.*, PTAB Case No. IPR2023-01392, Exhibit 2007: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Trend Micro, Inc.* v. *Webroot Inc.*, PTAB Case No. IPR2023-01392, Exhibit 2008: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Trend Micro, Inc.* v. *Webroot Inc.*, PTAB Case No. IPR2023-01392, Exhibit 2009: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Trend Micro, Inc.* v. *Webroot Inc.*, PTAB Case No. IPR2023-01392, Exhibit 2010: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.

*Trend Micro, Inc.* v. *Webroot Inc.*, PTAB Case No. IPR2023-01392, Exhibit 2011: Dani Kass, "Catching Up On Patent Litigation With Judge Albright" (Law360 Mar. 14, 2023), 3 pgs.

*Trend Micro, Inc.* v. *Webroot Inc.*, PTAB Case No. IPR2023-01392, Exhibit 2012: *Webroot, Inc. and Open Text Inc.*, v. *Trend Micro, Inc. et al.*, Case No. 6:22-cv-243-ADA-DTG, Amend the Schedule Order, Dkt. 521 (W.D. Tex. Dec. 7, 2023), 4 pgs.

*Trend Micro, Inc.* v. *Webroot Inc.*, PTAB Case No. IPR2023-01392, Exhibit 2013: *Webroot, Inc. and Open Text Inc.*, v. *Sophos Ltd.*, Case No. 6:22-cv-00240-ADA-DTG, Defendant Sophos Ltd.'s Final Invalidity Contentions (W.D. Tex., Nov. 1, 2022) (excerpted), 16 pgs.

*Trend Micro, Inc.* v. *Webroot Inc.*, PTAB Case No. IPR2023-01392, Exhibit 2014: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2023), 19 pgs.

*Trend Micro, Inc.* v. *Webroot Inc.*, PTAB Case No. IPR2023-01392, Joint Request to Treat Agreement as Confidential Information, Feb. 19, 2024, Feb. 19, 2024, 7 pgs.

*Trend Micro, Inc.* v. *Webroot Inc.*, PTAB Case No. IPR2023-01392, Joint Motion to Terminate Proceedings, Feb. 19, 2024, 9 pgs.

*Trend Micro, Inc.* v. *Webroot Inc.*, PTAB Case No. IPR2023-01392, Decision—Settlement prior to Institution of Trial, Feb. 28, 2024, 5 pgs.

*Trend Micro, Inc.* v. *Webroot Inc.*, PTAB Case No. IPR2024-00106, Patent Owner's Opposition to Petitioner's Motion for Joinder, Dec. 8, 2023, 18 pgs.

*Trend Micro, Inc.* v. *Webroot Inc.*, PTAB Case No. IPR2024-00106, Exhibit 2001: *Webroot, Inc. and Open Text, Inc.'s* v. *Trend Micro Inc.*, Case No. 6:22-CV-0239-ADA-DTG, Defendants' Preliminary Invalidity Contentions, dated Sep. 13, 2022 (W.D. Tex), 125 pgs.

*Trend Micro, Inc.* v. *Webroot Inc.*, PTAB Case No. IPR2024-00106, Exhibit 2002: *Webroot, Inc. and Open Text, Inc.'s* v. *Trend Micro Inc.*, Case No. 6:22-CV-0239-ADA-DTG, Defendants' Final Invalidity Contentions, dated Nov. 1, 2023 (W.D. Tex), 168 pgs.

*Trend Micro, Inc.* v. *Webroot Inc.*, PTAB Case No. IPR2024-00106, Exhibit 2003: *Webroot, Inc. and Open Text, Inc.'s* v. *Trend Micro Inc.*, Case No. 6:22-CV-0239-ADA-DTG, Order to Amend the Scheduling Order, Dkt. 521, dated Dec. 7, 2023 (W.D. Tex), 4 pgs.

*Trend Micro, Inc.* v. *Webroot Inc.*, PTAB Case No. IPR2024-00106, Joint Request to Treat Agreement as Business Confidential Information, Feb. 19, 2024, 6 pgs.

*Trend Micro, Inc.* v. *Webroot Inc.*, PTAB Case No. IPR2024-00106, Joint Motion to Terminate Proceedings, Feb. 19, 2024, 8 pgs.

*Trend Micro, Inc.* v. *Webroot Inc.*, PTAB Case No. IPR2024-00106, Patent Owner's Preliminary Response, Feb. 22, 2024, 19 pgs.

*Trend Micro, Inc.* v. *Webroot Inc.*, PTAB Case No. IPR2024-00106, Exhibit 2004: Email from B. Hansen to Trials@USPTO.gov, cc: B. Eutermoser et al. re Request for permission to file joint motions to terminate five IPRs: IPR 2023-01380, IPR 2023-01389, IPR 2023-01392, IPR2023-01459, and IPR2024-00106, dated Feb. 15, 2024, 42 pgs.

*Trend Micro, Inc.* v. *Webroot Inc.*, PTAB Case No. IPR2024-00106, Exhibit 2005: Email from Trials@USPTO.gov to Bob Hansen et al.

(56) References Cited

OTHER PUBLICATIONS re Authorized to file joint motion to terminate and request to file settlement agreement as CBI, dated Feb. 16, 2024, 2 pgs.

*Trend Micro, Inc.* v. *Webroot Inc.*, PTAB Case No. IPR2024-00106, Exhibit 2006: *Trend Micro, Inc.* v. *Open Text, Inc.*, IPR2024-00106, Joint Motion to Terminate Proceedings (P.T.A.B. Feb. 19, 2024), 8 pgs.

*Trend Micro, Inc.* v. *Webroot Inc.*, PTAB Case No. IPR2024-00106, Decision—Settlement prior to Institution of Trial, Feb. 28, 2024, 5 pgs.

*AO Kaspersky Lab* v. *Webroot Inc.*, PTAB Case No. IPR2023-01011, Termination due to Settlement after Institution of Trial, Apr. 17, 2024, 5 pgs.

*AO Kaspersky Lab* v. *Webroot Inc.*, PTAB Case No. IPR2023-01199, Panel Change Order, Conduct of the Proceeding, 37 CFR § 42.5, Feb. 23, 2024, 3 pgs.

*AO Kaspersky Lab* v. *Webroot Inc.*, PTAB Case No. IPR2023-01199, Termination due to Settlement after Institution of Trial, Apr. 17, 2024, 5 pgs.

*Sophos Ltd. and Sophos Inc.* v. *Webroot Inc.*, PTAB Case No. IPR2024-00252, Notice of Filing Date Accorded to Petition and Time for Filing Patent Owner Preliminary Response, Dec. 22, 2023, 6 pgs.

*Sophos Ltd. and Sophos Inc.* v. *Webroot Inc.*, PTAB Case No. IPR2024-00252, Patent Owner Open Text Inc.'s Mandatory Notices Pursuant to 37 CFR § 42.8(b), Dec. 29, 2023, 10 pgs.

*Sophos Ltd. and Sophos Inc.* v. *Webroot Inc.*, PTAB Case No. IPR2024-00252, Patent Owner's Preliminary Response, Mar. 22, 2023, 62 pgs.

*Sophos Ltd. and Sophos Inc.* v. *Webroot Inc.*, PTAB Case No. IPR2024-00252, Exhibit 2001: Declaration of Professor Ron Schnell (Patent Owner Exhibit 2001, IPR2023-00731), Aug. 10, 2023, 41 pgs.

*Sophos Ltd. and Sophos Inc.* v. *Webroot Inc.*, PTAB Case No. IPR2024-00252, Exhibit 2002: Curriculum Vitae of Professor Ron Schnell (Patent Owner Exhibit 2002, IPR2023-00731), Feb. 2005, 5 pgs.

*Sophos Ltd. and Sophos Inc.* v. *Webroot Inc.*, PTAB Case No. IPR2024-00252, Exhibit 2003: Defendant Sophos Ltd.'s Preliminary Invalidity Contentions for Patens Plaintiffs Added by Amendment, 13 pgs.

*Sophos Ltd. and Sophos Inc.* v. *Webroot Inc.*, PTAB Case No. IPR2024-00252, Exhibit 2004: *Webroot, Inc. and Open Text Inc.*, v. *Sophos Ltd.*, Case No. 6:22-CV-00240-ADA-DTG, Defendant's Final Invalidity Contentions Against Counterclaim Plaintiff Sophos Ltd. (W.D. Tex., Nov. 1, 2023) (excerpted), 16 pgs.

*Sophos Ltd. and Sophos Inc.* v. *Webroot Inc.*, PTAB Case No. IPR2024-00252, Exhibit 2005: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2022), 19 pgs.

*Sophos Ltd. and Sophos Inc.* v. *Webroot Inc.*, PTAB Case No. IPR2024-00252, Exhibit 2006: Email from Timothy Best (counsel for Petitioner) to trials@USPTO.gov re IPR Proceedings: IPR2023-00699; IPR2024-00252; and IPR2024-00253, dated Mar. 20, 2024, 2 pgs.

*Sophos Ltd. and Sophos Inc.* v. *Webroot Inc.*, PTAB Case No. IPR2024-00252, Exhibit 2007: *Sophos Ltd. & Sophos Inc.* v. *Open Text Inc.*, Case IPR2023-00732, EX-3002: Email dated Oct. 16, 2023 from trials@USPTO.gov to Timothy Best (counsel for Petitioner), 3 pgs.

*Sophos Ltd. and Sophos Inc.* v. *Webroot Inc.*, PTAB Case No. IPR2024-00252, Joint Motion to Terminate Proceeding, Mar. 22, 2024, 9 pgs.

*Sophos Ltd. and Sophos Inc.* v. *Webroot Inc.*, PTAB Case No. IPR2024-00252, Joint Request to Treat Agreements as Business Confidential Information, Mar. 29, 2024, 5 pgs.

*Sophos Ltd. and Sophos Inc.* v. *Webroot Inc.*, PTAB Case No. IPR2024-00252, Termination due to Settlement before Institution of Trial, Apr. 2, 2024, 5 pgs.

*Sophos Ltd. and Sophos Inc.* v. *Webroot Inc.*, PTAB Case No. IPR2024-00253, Notice of Filing Date Accorded to Petition and Time for Filing Patent Owner Preliminary Response, Dec. 22, 2023, 6 pgs.

*Sophos Ltd. and Sophos Inc.* v. *Webroot Inc.*, PTAB Case No. IPR2024-00253, Patent Owner Open Text Inc.'s Mandatory Notices Pursuant to 37 CFR § 42.8(b), Dec. 29, 2023, 10 pgs.

*Sophos Ltd. and Sophos Inc.* v. *Webroot Inc.*, PTAB Case No. IPR2024-00253, Patent Owner's Preliminary Response, Mar. 22, 2023, 61 pgs.

*Sophos Ltd. and Sophos Inc.* v. *Webroot Inc.*, PTAB Case No. IPR2024-00253, Exhibit 2001: Declaration of Professor Ron Schnell (Patent Owner Exhibit 2001, IPR2023-00732), Aug. 10, 2023, 41 pgs.

*Sophos Ltd. and Sophos Inc.* v. *Webroot Inc.*, PTAB Case No. IPR2024-00253, Exhibit 2002: Curriculum Vitae of Professor Ron Schnell (Patent Owner Exhibit 2002, IPR2023-00732), Feb. 2005, 5 pgs.

*Sophos Ltd. and Sophos Inc.* v. *Webroot Inc.*, PTAB Case No. IPR2024-00253, Exhibit 2003: *Webroot, Inc. and Open Text Inc.*, v. *Sophos Ltd.*, Case No. 6:22-CV-00240-ADA-DTG, Defendant's Preliminary Invalidity Contentions (W.D. Tex., Feb. 21, 2023) (excerpted), 13 pgs.

*Sophos Ltd. and Sophos Inc.* v. *Webroot Inc.*, PTAB Case No. Exhibit 2004: *Webroot, Inc. and Open Text Inc.*, v. *Sophos Ltd.*,cv-00240-ADA-DTG, Defendant's Final Invalidity Contentions Plaintiff Sophos Ltd. (W.D. Tex., Nov. 1, 2023) (excerpted), 16.

*Sophos Ltd. and Sophos Inc.* v. *Webroot Inc.*, PTAB Case No. IPR2024-00253, Exhibit 2005: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2022), 19 pgs.

*Sophos Ltd. and Sophos Inc.* v. *Webroot Inc.*, PTAB Case No. IPR2024-00253, Exhibit 2006: Email from Timothy Best (counsel for Petitioner) to trials@USPTO.gov re IPR Proceedings: IPR2023-00699; IPR2024-00252; and IPR2024-00253, dated Mar. 20, 2024.

*Sophos Ltd. and Sophos Inc.* v. *Webroot Inc.*, PTAB Case No. IPR2024-00253, Exhibit 2007: *Sophos Ltd. & Sophos Inc.* v. *Open Text Inc.*, Case IPR2023-00732, EX-3002: Email dated Oct. 16, 2023 from trials@USPTO.gov to Timothy Best (counsel for Petitioner), 3 pgs.

*Sophos Ltd. and Sophos Inc.* v. *Webroot Inc.*, PTAB Case No. IPR2024-00253, Joint Motion to Terminate Proceeding, Mar. 29, 2024, 9 pgs.

*Sophos Ltd. and Sophos Inc.* v. *Webroot Inc.*, PTAB Case No. IPR2024-00253, Joint Request to Treat Agreements as Business Confidential Information, Mar. 29, 2024, 5 pgs.

*Sophos Ltd. and Sophos Inc.* v. *Webroot Inc.*, PTAB Case No. IPR2024-00253, Termination due to Settlement before Institution of Trial, Apr. 2, 2024, 5 pgs.

*AO Kaspersky Lab* v. *Open Text Inc.*, PTAB Case No. IPR2024-00297, Notice of Filing Date According to Petition and Time for Filing Patent Owner Preliminary Response, Dec. 22, 2023, 6 pgs.

*AO Kaspersky Lab* v. *Open Text Inc.*, PTAB Case No. IPR2024-00297, Patent Owner Open Text Inc.'s Mandatory Notices Pursuant to 37 CFR § 42.8(b), Dec. 29, 2023, 10 pgs.

*AO Kaspersky Lab* v. *Open Text Inc.*, PTAB Case No. IPR2024-00297, Patent Owner's Preliminary Response, Mar. 22, 2024, 29 pgs.

*AO Kaspersky Lab* v. *Open Text Inc.*, PTAB Case No. IPR2024-00297, Exhibit 2001: Declaration Of Matthew L. Boney In Support Of Patent Owner's Preliminary Response, 1 pgs.

*AO Kaspersky Lab* v. *Open Text Inc.*, PTAB Case No. IPR2024-00297, Exhibit 2002: Assignment of U.S. Publication No. 2007/0016951 A1 from Paul Piccard and Michael Greene to Webroot Software, Inc. executed Jul. 11, 2005 and Jul. 7, 2005, 5 pgs.

*AO Kaspersky Lab* v. *Open Text Inc.*, PTAB Case No. IPR2024-00297, Exhibit 2003: Paul Piccard LinkedIn, 4 pgs.

*AO Kaspersky Lab* v. *Open Text Inc.*, PTAB Case No. IPR2024-00297, Exhibit 2004: Michael P. Greene LinkedIn, 6 pgs.

*AO Kaspersky Lab* v. *Open Text Inc.*, PTAB Case No. IPR2024-00297, Exhibit 2005: Assignment of U.S. Appl. No. 13/490,294 from Matthew L. Boney to Webroot Software, Inc. executed on Jun. 7, 2006, 4 pgs.

(56)　　　　　References Cited

OTHER PUBLICATIONS

*AO Kaspersky Lab* v. *Open Text Inc.*, PTAB Case No. IPR2024-00297, Exhibit 2006: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*AO Kaspersky Lab* v. *Open Text Inc.*, PTAB Case No. IPR2024-00297, Exhibit 2007: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*AO Kaspersky Lab* v. *Open Text Inc.*, PTAB Case No. IPR2024-00297, Exhibit 2008: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*AO Kaspersky Lab* v. *Open Text Inc.*, PTAB Case No. IPR2024-00297, Exhibit 2009: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.

*AO Kaspersky Lab* v. *Open Text Inc.*, PTAB Case No. IPR2024-00297, Exhibit 2010: Dani Kass, "Catching Up On Patent Litigation With JudgeAlbright" (Law360 Mar. 14, 2023), 3 pgs.

*AO Kaspersky Lab* v. *Open Text Inc.*, PTAB Case No. IPR2024-00297, Exhibit 2011: *Webroot, Inc. and Open Text Inc.*, v. *Trend Micro, Inc et al.*, Case No. 6:22-cv-243-ADA-DTG, Seventh Amended Schedule Order, Dkt. 566 (W.D. Tex. Feb. 23, 2024), 3 pgs.

*AO Kaspersky Lab* v. *Open Text Inc.*, PTAB Case No. IPR2024-00297, Exhibit 2012: *Webroot, Inc. and Open Text Inc.*, v. *AO Kaspersky Lab.*, Case No. 6:22-cv-00243-ADA-DTG, Defendants' Second Amended Invalidity Contentions (W.D. Tex., Jan. 19, 2024) (excerpted), 6 pgs.

*AO Kaspersky Lab* v. *Open Text Inc.*, PTAB Case No. IPR2024-00297, Exhibit 2013: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2023), 19 pgs.

*AO Kaspersky Lab* v. *Open Text Inc.*, PTAB Case No. IPR2024-00297, Exhibit 2014: USPTO Assignment Record for U.S. Pub. No. 2007/0016951 A1, U.S. Appl. No. 11/180,161, filed Jul. 13, 2005, published on Jan. 18, 2007, 2 pgs.

*AO Kaspersky Lab* v. *Open Text Inc.*, PTAB Case No. IPR2024-00297, Exhibit 2015: USPTO Assignment Record for U.S. Pat. No. 8,719,932, U.S. Pub. No. 2012/0246722 A1, U.S. Appl. No. 13/490,294, filed Jun. 26, 2012, issued May 6, 2014, 3 pgs.

*AO Kaspersky Lab* v. *Open Text Inc.*, PTAB Case No. IPR2024-00297, Joint Motion to Terminate Proceeding, Apr. 12, 2024, 9 pgs.

*AO Kaspersky Lab* v. *Open Text Inc.*, PTAB Case No. IPR2024-00297, Joint Request to Treat Agreement as Business Confidential Information, Apr. 12, 2024, 5 pgs.

*AO Kaspersky Lab* v. *Open Text Inc.*, PTAB Case No. IPR2024-00297, Decision, Joint Motion to Terminate and Request to Keep Confidential, Apr. 18, 2024, 4 pgs.

*AO Kaspersky Lab* v. *Open Text Inc.*, PTAB Case No. IPR2024-00297, Exhibit 3001: Attorney Correspondence, Apr. 9, 2024, 2 pgs.

*Crowdstrike, Inc.* v. *Webroot Inc.*, PTAB Case No. IPR2023-00556, Decision Granting Institution of Inter Partes Review, Jan. 25, 2024, 7 pgs.

*Crowdstrike, Inc.* v. *Webroot Inc.*, PTAB Case No. IPR2023-00556, Second Revised Scheduling Order, Jan. 25, 2024, 4 pgs.

*Crowdstrike, Inc.* v. *Webroot Inc.*, PTAB Case No. IPR2023-00556, Decision Granting Institution of Inter Partes Review, Jan. 29, 2024, 8 pgs.

*Crowdstrike, Inc.* v. *Webroot Inc.*, PTAB Case No. IPR2023-00556, Order, Termination as to Crowdstrike, Inc. due to Settlement, Feb. 6, 2024, 6 pgs.

*Crowdstrike, Inc.* v. *Webroot Inc.*, PTAB Case No. IPR2023-00556, Joint Stipulation to Modify Due Dates 1, 2 and 3, Feb. 22, 24, 4 pgs.

*Crowdstrike, Inc.* v. *Webroot Inc.*, PTAB Case No. IPR2023-00556, Order, Termination as to Trend Micro, Inc. due to Settlement, Feb. 28, 2024, 5 pgs.

*Crowdstrike, Inc.* v. *Webroot Inc.*, PTAB Case No. IPR2023-00556, Patent Owner's Response, Mar. 29, 2024, 56 pgs.

*Crowdstrike, Inc.* v. *Webroot Inc.*, PTAB Case No. IPR2023-00556, Joint Motion to Terminate Proceeding, Apr. 12, 2024, 9 pgs.

*Crowdstrike, Inc.* v. *Webroot Inc.*, PTAB Case No. IPR2023-00556, Joint Request to Treat Agreement as Business Confidential Information, Apr. 12, 2024, 5 pgs.

*Crowdstrike, Inc.* v. *Webroot Inc.*, PTAB Case No. IPR2023-00556, Termination due to Settlement after Institution of Trial, Apr. 17, 2024, 5 pgs.

*Crowdstrike, Inc.* v. *Webroot Inc.*, PTAB Case No. IPR2023-00556, Exhibit 3001: Attorney Correspondence, Apr. 17, 24, 2 pgs.

*Sophos Ltd. and Sophos Inc.* v. *Webroot Inc.*, PTAB Case No. IPR2023-00699, Joint Motion to Terminate Proceedings, Mar. 29, 2024, 9 pgs.

*Sophos Ltd. and Sophos Inc.* v. *Webroot Inc.*, PTAB Case No. IPR2023-00699, Joint Request to Treat Agreements as Business Confidential Information, Mar. 29, 2024, 5 pgs.

*Sophos Ltd. and Sophos Inc.* v. *Webroot Inc.*, PTAB Case No. IPR2023-00699, Termination due to Settlement after Institution of Trial, Apr. 5, 2024, 4 pgs.

*AO Kaspersky Lab* v. *Webroot Inc.*, PTAB Case No. IPR2023-01334, Patent Owner's Preliminary Response, Nov. 28, 2023, 14 pgs.

*AO Kaspersky Lab* v. *Webroot Inc.*, PTAB Case No. IPR2023-01334, Exhibit 2001: *Webroot, Inc. and Open Text Inc.* v. *AO Kaspersky Lab*, Complaint for Patent Infringement, Dkt. 1 (W.D. Tex. Mar. 4, 2022), 115 pgs.

*AO Kaspersky Lab* v. *Webroot Inc.*, PTAB Case No. IPR2023-01334, Exhibit 2002: *Webroot, Inc. and Open Text Inc.* v. *AO Kaspersky Lab*, Waiver of Service of Summons, Dkt. 16 (W.D. Tex. May 25, 2022), 1 pg.

*AO Kaspersky Lab* v. *Webroot Inc.*, PTAB Case No. IPR2023-01334, Exhibit 2003: Email from J. Miotke to trials@USPTO.gov re *Crowdstrike* v. *Open Text Inc.*—IPR2023-00126 & IPR2023-01011 (U.S. Pat. No. 10,257,224) and IPR2023-00289 & IPR2023-001334 (U.S. Pat. No. 8,418,250) / Conference Call Request, Nov. 21, 2023, 2 pgs.

*AO Kaspersky Lab* v. *Webroot Inc.*, PTAB Case No. IPR2023-01334, Supplemental Mandatory Notice Under 37 CFR § 42.8(a)(3), Dec. 11, 2023, 7 pgs.

*AO Kaspersky Lab* v. *Webroot Inc.*, PTAB Case No. IPR2023-01334, Decision granting Institution of Inter Partes Review and granting Motion for Joinder, Dec. 21, 2023, 10 pgs.

*AO Kaspersky Lab* v. *Webroot Inc.*, PTAB Case No. IPR2023-01334, Petitioner's Reply to Patent Owner's Response, Feb. 22, 2024, 32 pgs.

*AO Kaspersky Lab* v. *Webroot Inc.*, PTAB Case No. IPR2023-01334, Patent Owner's Request for Oral Argument, Mar. 12, 2024, 4 pgs.

*AO Kaspersky Lab* v. *Webroot Inc.*, PTAB Case No. IPR2023-01334, Termination due to Settlement after Institution of Trial, Apr. 17, 2024, 5 pgs.

*AO Kaspersky Lab* v. *Webroot Inc.*, PTAB Case No. IPR2023-01334, Exhibit 3002, Attorney Correspondence, Apr. 17, 2024, 3 pgs.

*Trend Micro, Inc.* v. *Open Text Inc.*, PTAB Case No. IPR2023-01459, Decision Granting Institution of Inter Partes Review and Granting Motion for Joinder, Jan. 25, 2024, 7 pgs.

*Trend Micro, Inc.* v. *Open Text Inc.*, PTAB Case No. IPR2023-01459, Joint Motion to Terminate Proceedings, Feb. 19, 24, 9 pgs.

*Trend Micro, Inc.* v. *Open Text Inc.*, PTAB Case No. IPR2023-01459, Request to Treat as Business Confidential Information, Feb. 19, 2024, 7 pgs.

*Trend Micro, Inc.* v. *Open Text Inc.*, PTAB Case No. IPR2023-01459, Termination due to Settlement after Institution of Trial, Apr. 17, 2024, 5 pgs.

*Trend Micro, Inc.* v. *Open Text Inc.*, PTAB Case No. IPR2023-01459, Exhibit 3001: Attorney Correspondence, Apr. 17, 2024, 2 pgs.

(56) References Cited

OTHER PUBLICATIONS

*AO Kaspersky Lab* v. *Webroot Inc.*, PTAB Case No. IPR2024-00035, Decision Granting Institution of Inter Partes Review and Granting Motion for Joinder, Jan. 29, 2024, 8 pgs.
*AO Kaspersky Lab* v. *Webroot Inc.*, PTAB Case No. IPR2024-00035, Termination due to Settlement after Institution of Trial, Apr. 17, 2024, 5 pgs.
*AO Kaspersky Lab* v. *Webroot Inc.*, PTAB Case No. IPR2024-00035, Exhibit 3001: Attorney Correspondence, Apr. 17, 2024, 2 pgs.
U.S. Appl. No. 60/793,475, filed Apr. 21, 2006, Lowrey.
U.S. Appl. No. 60/803,058, filed May 26, 2006, Gutterman.
U.S. Appl. No. 60/830,122, filed Jul. 12, 2006, Just.
Crowdstrike's First Supplemental Preliminary Invalidity Contentions (Patents Asserted by Amendment), *Webroot, Inc. and Open Text, Inc.* v. *Crowdstrike, Inc.*, No. 6:22 CV-00241-ADA-DTG (WD, Texas), Jun. 27, 2023, 90 pgs.
Crowdstrike's Second Supplemental Preliminary Invalidity Contentions, *Webroot, Inc. and Open Text, Inc.* v. *Crowdstrike, Inc.*, No. 6:22 CV-00241-ADA-DTG (WD, Texas), Jul. 14, 2023, 85 pgs.
Defendant Forcepoint LLC's Final Invalidity Contentions, *Webroot, Inc. and Open Text, Inc.* v. *Forcepoint LLC*, CA. No. 6:22-CV-00342-ADA-DTG, W.D. Tex., Nov. 1, 2023, 394 pgs.
Defendant's Final Invalidity Contentions, *Webroot, Inc. and Open Text, Inc.* v. *Trend Micro Inc.*, Case No. 6:22-cv-00239-ADA-DTG, W.D., Tex., Nov. 1, 2023, 168 pgs.
Defendant Sophos Ltd.'s Final Invalidity Contentions, *Webroot, Inc. and Open Text, Inc.* v. *Sophos Ltd.*, Case No. 6:22-cv-00240-ADA-DTG, W.D., Tex., Nov. 1, 2023, 281 pgs.
Defendant Crowdstrike Holdings, Inc.'s Second Supplemental Preliminary Invalidity Contentions, Exhibit 045-A-1, *Webroot, Inc. and Open Text, Inc.* v. *Crowdstrike Holdings, Inc.*, No. 6:22-CV-00241-ADA-DTG (WD, Texas), Jul. 14, 2023, 82 pgs.
Defendant Crowdstrike Holdings, Inc.'s Second Supplemental Preliminary Invalidity Contentions, Exhibit 224-A-1, *Webroot, Inc. and Open Text, Inc.* v. *Crowdstrike Holdings, Inc.*, No. 6:22-CV-00241-ADA-DTG (WD, Texas), Jul. 14, 2023, 118 pgs.
Defendant Forcepoint LLC's Final Invalidity Contentions, Exhibit 243-F-1, *Webroot, Inc. and Open Text, Inc.* v. *Forcepoint LLC*, CA. No. 6:22-CV-00342-ADA-DTG, W.D. Tex., Nov. 1, 2023, 25 pgs.
Defendant Forcepoint LLC's Final Invalidity Contentions, Exhibit 243-F-2, *Webroot, Inc. and Open Text, Inc.* v. *Forcepoint LLC*, CA. No. 6:22-CV-00342-ADA-DTG, W.D. Tex., Nov. 1, 2023, 49 pgs.
Defendant Forcepoint LLC's Final Invalidity Contentions, Exhibit 243-F-3, *Webroot, Inc. and Open Text, Inc.* v. *Forcepoint LLC*, CA. No. 6:22-CV-00342-ADA-DTG, W.D. Tex., Nov. 1, 2023, 36 pgs.
Defendant Forcepoint LLC's Final Invalidity Contentions, Exhibit 243-F-4, *Webroot, Inc. and Open Text, Inc.* v. *Forcepoint LLC*, CA. No. 6:22-CV-00342-ADA-DTG, W.D. Tex., Nov. 1, 2023, 31 pgs.
Defendant Forcepoint LLC's Final Invalidity Contentions, Exhibit 243-F-5, *Webroot, Inc. and Open Text, Inc.* v. *Forcepoint LLC*, CA. No. 6:22-CV-00342-ADA-DTG, W.D. Tex., Nov. 1, 2023, 90 pgs.
Defendant Forcepoint LLC's Final Invalidity Contentions, Exhibit 243-F-6, *Webroot, Inc. and Open Text, Inc.* v. *Forcepoint LLC*, CA. No. 6:22-CV-00342-ADA-DTG, W.D. Tex., Nov. 1, 2023, 35 pgs.
Defendant Forcepoint LLC's Final Invalidity Contentions, Exhibit 243-F-7, *Webroot, Inc. and Open Text, Inc.* v. *Forcepoint LLC*, CA. No. 6:22-CV-00342-ADA-DTG, W.D. Tex., Nov. 1, 2023, 73 pgs.
Defendant Forcepoint LLC's Final Invalidity Contentions, Exhibit 243-F-8, *Webroot, Inc. and Open Text, Inc.* v. *Forcepoint LLC*, CA. No. 6:22-CV-00342-ADA-DTG, W.D. Tex., Nov. 1, 2023, 58 pgs.
Defendant Forcepoint LLC's Final Invalidity Contentions, Exhibit 243-F-9 *Webroot, Inc. and Open Text, Inc.* v. *Forcepoint LLC*, CA. No. 6:22-CV-00342-ADA-DTG, W.D. Tex., Nov. 1, 2023, 92 pgs.
Defendant Forcepoint LLC's Final Invalidity Contentions, Exhibit 243-F-10, *Webroot, Inc. and Open Text, Inc.* v. *Forcepoint LLC*, CA. No. 6:22-CV-00342-ADA-DTG, W.D. Tex., Nov. 1, 2023, 52 pgs.
Defendant Forcepoint LLC's Final Invalidity Contentions, Exhibit 243-F-11, *Webroot, Inc. and Open Text, Inc.* v. *Forcepoint LLC*, CA. No. 6:22-CV-00342-ADA-DTG, W.D. Tex., Nov. 1, 2023, 88 pgs.
Defendant Forcepoint LLC's Final Invalidity Contentions, Exhibit 243-F-12, *Webroot, Inc. and Open Text, Inc.* v. *Forcepoint LLC*, CA. No. 6:22-CV-00342-ADA-DTG, W.D. Tex., Nov. 1, 2023, 64 pgs.
Defendant Forcepoint LLC's Final Invalidity Contentions, Exhibit 243-F-13, *Webroot, Inc. and Open Text, Inc.* v. *Forcepoint LLC*, CA. No. 6:22-CV-00342-ADA-DTG, W.D. Tex., Nov. 1, 2023, 53 pgs.
Defendant Forcepoint LLC's Final Invalidity Contentions, Exhibit 243-F-14, *Webroot, Inc. and Open Text, Inc.* v. *Forcepoint LLC*, CA. No. 6:22-CV-00342-ADA-DTG, W.D. Tex., Nov. 1, 2023, 60 pgs.
Defendant Forcepoint LLC's Final Invalidity Contentions, Exhibit 243-F-15, *Webroot, Inc. and Open Text, Inc.* v. *Forcepoint LLC*, CA. No. 6:22-CV-00342-ADA-DTG, W.D. Tex., Nov. 1, 2023, 34 pgs.
Defendant Forcepoint LLC's Final Invalidity Contentions, Exhibit 243-F-16, *Webroot, Inc. and Open Text, Inc.* v. *Forcepoint LLC*, CA. No. 6:22-CV-00342-ADA-DTG, W.D. Tex., Nov. 1, 2023, 53 pgs.
Defendant Forcepoint LLC's Final Invalidity Contentions, Exhibit 243-F-17, *Webroot, Inc. and Open Text, Inc.* v. *Forcepoint LLC*, CA. No. 6:22-CV-00342-ADA-DTG, W.D. Tex., Nov. 1, 2023, 37 pgs.
Defendant Forcepoint LLC's Final Invalidity Contentions, Exhibit 243-F-18, *Webroot, Inc. and Open Text, Inc.* v. *Forcepoint LLC*, CA. No. 6:22-CV-00342-ADA-DTG, W.D. Tex., Nov. 1, 2023, 46 pgs.
Defendant Forcepoint LLC's Final Invalidity Contentions, Exhibit 243-F-19, *Webroot, Inc. and Open Text, Inc.* v. *Forcepoint LLC*, CA. No. 6:22-CV-00342-ADA-DTG, W.D. Tex., Nov. 1, 2023, 46 pgs.
Defendant Forcepoint LLC's Final Invalidity Contentions, Exhibit 243-F-20, *Webroot, Inc. and Open Text, Inc.* v. *Forcepoint LLC*, CA. No. 6:22-CV-00342-ADA-DTG, W.D. Tex., Nov. 1, 2023, 45 pgs.
Defendant Forcepoint LLC's Final Invalidity Contentions, Exhibit 243-F-21, *Webroot, Inc. and Open Text, Inc.* v. *Forcepoint LLC*, CA. No. 6:22-CV-00342-ADA-DTG, W.D. Tex., Nov. 1, 2023, 41 pgs.
Defendant Forcepoint LLC's Final Invalidity Contentions, Exhibit 243-F-22, *Webroot, Inc. and Open Text, Inc.* v. *Forcepoint LLC*, CA. No. 6:22-CV-00342-ADA-DTG, W.D. Tex., Nov. 1, 2023, 52 pgs.
Defendant Forcepoint LLC's Final Invalidity Contentions, Exhibit 243-F-23, *Webroot, Inc. and Open Text, Inc.* v. *Forcepoint LLC*, CA. No. 6:22-CV-00342-ADA-DTG, W.D. Tex., Nov. 1, 2023, 50 pgs.
Defendant Forcepoint LLC's Final Invalidity Contentions, Exhibit 243-F-24, *Webroot, Inc. and Open Text, Inc.* v. *Forcepoint LLC*, CA. No. 6:22-CV-00342-ADA-DTG, W.D. Tex., Nov. 1, 2023, 54 pgs.
Defendant Forcepoint LLC's Final Invalidity Contentions, Exhibit 243-F-25, *Webroot, Inc. and Open Text, Inc.* v. *Forcepoint LLC*, CA. No. 6:22-CV-00342-ADA-DTG, W.D. Tex., Nov. 1, 2023, 107 pgs.
Defendant Forcepoint LLC's Final Invalidity Contentions, Exhibit 243-F-26, *Webroot, Inc. and Open Text, Inc.* v. *Forcepoint LLC*, CA. No. 6:22-CV-00342-ADA-DTG, W.D. Tex., Nov. 1, 2023, 220 pgs.
Defendant Forcepoint LLC's Final Invalidity Contentions, Exhibit 243-F-27, *Webroot, Inc. and Open Text, Inc.* v. *Forcepoint LLC*, CA. No. 6:22-CV-00342-ADA-DTG, W.D. Tex., Nov. 1, 2023, 32 pgs.
Defendant Forcepoint LLC's Final Invalidity Contentions, Exhibit 243-F-28, *Webroot, Inc. and Open Text, Inc.* v. *Forcepoint LLC*, CA. No. 6:22-CV-00342-ADA-DTG, W.D. Tex., Nov. 1, 2023, 29 pgs.
Defendant Forcepoint LLC's Final Invalidity Contentions, Exhibit 932-G-1 *Webroot, Inc. and Open Text, Inc.* v. *Forcepoint LLC*, CA. No. 6:22-CV-00342-ADA-DTG, W.D. Tex., Nov. 1, 2023, , 26 pgs.
Defendant Forcepoint LLC's Final Invalidity Contentions, Exhibit 932-G-2 *Webroot, Inc. and Open Text, Inc.* v. *Forcepoint LLC*, CA. No. 6:22-CV-00342-ADA-DTG, W.D. Tex., Nov. 1, 2023, 54 pgs.
Defendant Forcepoint LLC's Final Invalidity Contentions, Exhibit 932-G-3, *Webroot, Inc. and Open Text, Inc.* v. *Forcepoint LLC*, CA. No. 6:22-CV-00342-ADA-DTG, W.D. Tex., Nov. 1, 2023, 44 pgs.
Defendant Forcepoint LLC's Final Invalidity Contentions, Exhibit 932-G-4, *Webroot, Inc. and Open Text, Inc.* v. *Forcepoint LLC*, CA. No. 6:22-CV-00342-ADA-DTG, W.D. Tex., Nov. 1, 2023, 33 pgs.
Defendant Forcepoint LLC's Final Invalidity Contentions, Exhibit 932-G-5, *Webroot, Inc. and Open Text, Inc.* v. *Forcepoint LLC*, CA. No. 6:22-CV-00342-ADA-DTG, W.D. Tex., Nov. 1, 2023, 113 pgs.
Defendant Forcepoint LLC's Final Invalidity Contentions, Exhibit 932-G-6, *Webroot, Inc. and Open Text, Inc.* v. *Forcepoint LLC*, CA. No. 6:22-CV-00342-ADA-DTG, W.D. Tex., Nov. 1, 2023, 36 pgs.
Defendant Forcepoint LLC's Final Invalidity Contentions, Exhibit 932-G-7, *Webroot, Inc. and Open Text, Inc.* v. *Forcepoint LLC*, CA. No. 6:22-CV-00342-ADA-DTG, W.D. Tex., Nov. 1, 2023, 87 pgs.

(56) References Cited

OTHER PUBLICATIONS

Defendant Forcepoint LLC's Final Invalidity Contentions, Exhibit 932-G-8, *Webroot, Inc. and Open Text, Inc. v. Forcepoint LLC*, CA. No. 6:22-CV-00342-ADA-DTG, W.D. Tex., Nov. 1, 2023, 70 pgs.

Defendant Forcepoint LLC's Final Invalidity Contentions, Exhibit 932-G-9, *Webroot, Inc. and Open Text, Inc. v. Forcepoint LLC*, CA. No. 6:22-CV-00342-ADA-DTG, W.D. Tex., Nov. 1, 2023, 112 pgs.

Defendant Forcepoint LLC's Final Invalidity Contentions, Exhibit 932-G-10, *Webroot, Inc. and Open Text, Inc. v. Forcepoint LLC*, CA. No. 6:22-CV-00342-ADA-DTG, W.D. Tex., Nov. 1, 2023, 63 pgs.

Defendant Forcepoint LLC's Final Invalidity Contentions, Exhibit 932-G-11, *Webroot, Inc. and Open Text, Inc. v. Forcepoint LLC*, CA. No. 6:22-CV-00342-ADA-DTG, W.D. Tex., Nov. 1, 2023, 110 pgs.

Defendant Forcepoint LLC's Final Invalidity Contentions, Exhibit 932-G-12, *Webroot, Inc. and Open Text, Inc. v. Forcepoint LLC*, CA. No. 6:22-CV-00342-ADA-DTG, W.D. Tex., Nov. 1, 2023, 74 pgs.

Defendant Forcepoint LLC's Final Invalidity Contentions, Exhibit 932-G-13, *Webroot, Inc. and Open Text, Inc. v. Forcepoint LLC*, No. 6:22-CV-00342-ADA-DTG, W.D. Tex., Nov. 1, 2023, 57 pgs.

Defendant Forcepoint LLC's Final Invalidity Contentions, Exhibit 932-G-14, *Webroot, Inc. and Open Text, Inc. v. Forcepoint LLC*, No. 6:22-CV-00342-ADA-DTG, W.D. Tex., Nov. 1, 2023, 60 pgs.

Defendant Forcepoint LLC's Final Invalidity Contentions, Exhibit 932-G-15, *Webroot, Inc. and Open Text, Inc. v. Forcepoint LLC*, No. 6:22-CV-00342-ADA-DTG, W.D. Tex., Nov. 1, 2023, 39 pgs.

Defendant Forcepoint LLC's Final Invalidity Contentions, Exhibit 932-G-16, *Webroot, Inc. and Open Text, Inc. v. Forcepoint LLC*, No. 6:22-CV-00342-ADA-DTG, W.D. Tex., Nov. 1, 2023, 62 pgs.

Defendant Forcepoint LLC's Final Invalidity Contentions, Exhibit 932-G-17, *Webroot, Inc. and Open Text, Inc. v. Forcepoint LLC*, No. 6:22-CV-00342-ADA-DTG, W.D. Tex., Nov. 1, 2023, 57 pgs.

Defendant Forcepoint LLC's Final Invalidity Contentions, Exhibit 932-G-18, *Webroot, Inc. and Open Text, Inc. v. Forcepoint LLC*, No. 6:22-CV-00342-ADA-DTG, W.D. Tex., Nov. 1, 2023, 61 pgs.

Defendant Forcepoint LLC's Final Invalidity Contentions, Exhibit 932-G-19, *Webroot, Inc. and Open Text, Inc. v. Forcepoint LLC*, No. 6:22-CV-00342-ADA-DTG, W.D. Tex., Nov. 1, 2023, 54 pgs.

Defendant Forcepoint LLC's Final Invalidity Contentions, Exhibit 932-G-20, *Webroot, Inc. and Open Text, Inc. v. Forcepoint LLC*, No. 6:22-CV-00342-ADA-DTG, W.D. Tex., Nov. 1, 2023, 57 pgs.

Defendant Forcepoint LLC's Final Invalidity Contentions, Exhibit 932-G-21, *Webroot, Inc. and Open Text, Inc. v. Forcepoint LLC*, No. 6:22-CV-00342-ADA-DTG, W.D. Tex., Nov. 1, 2023, 59 pgs.

Defendant Forcepoint LLC's Final Invalidity Contentions, Exhibit 932-G-22, *Webroot, Inc. and Open Text, Inc. v. Forcepoint LLC*, No. 6:22-CV-00342-ADA-DTG, W.D. Tex., Nov. 1, 2023, 139 pgs.

Defendant Forcepoint LLC's Final Invalidity Contentions, Exhibit 932-G-23, *Webroot, Inc. and Open Text, Inc. v. Forcepoint LLC*, No. 6:22-CV-00342-ADA-DTG, W.D. Tex., Nov. 1, 2023, 273 pgs.

Defendant Forcepoint LLC's Final Invalidity Contentions, Exhibit 932-G-24, *Webroot, Inc. and Open Text, Inc. v. Forcepoint LLC*, No. 6:22-CV-00342-ADA-DTG, W.D. Tex., Nov. 1, 2023, 39 pgs.

Defendant Forcepoint LLC's Final Invalidity Contentions, Exhibit 932-G-25, *Webroot, Inc. and Open Text, Inc. v. Forcepoint LLC*, No. 6:22-CV-00342-ADA-DTG, W.D. Tex., Nov. 1, 2023, 31 pgs.

Defendant Forcepoint LLC's Final Invalidity Contentions, Exhibit 932-G-26, *Webroot, Inc. and Open Text, Inc. v. Forcepoint LLC*, No. 6:22-CV-00342-ADA-DTG, W.D. Tex., Nov. 1, 2023, 54 pgs.

Defendant Forcepoint LLC's Final Invalidity Contentions, Exhibit 932-G-27, *Webroot, Inc. and Open Text, Inc. v. Forcepoint LLC*, No. 6:22-CV-00342-ADA-DTG, W.D. Tex., Nov. 1, 2023, 55 pgs.

Defendant Sophos Ltd.'s Final Invalidity Contentions, Exhibit 045-A-4, *Webroot, Inc. and Open Text, Inc. v. Sophos Ltd.*, Case No. 6:22-cv-00240-ADA-DTG, W.D. Tex., Nov. 1, 2023, 150 pgs.

Defendant Sophos Ltd.'s Final Invalidity Contentions, Exhibit 045-A-22, *Webroot, Inc. and Open Text, Inc. v. Sophos Ltd.*, Case No. 6:22-cv-00240- Ada-Dtg, W.D. Tex., Nov. 1, 2023, 93 pgs.

Defendant Sophos Ltd.'s Final Invalidity Contentions, Exhibit 045-A-27, *Webroot, Inc. and Open Text, Inc. v. Sophos Ltd.*, Case No. 6:22-cv-00240- Ada-Dtg, W.D. Tex., Nov. 1, 2023, 35 pgs.

Defendant Sophos Ltd.'s Final Invalidity Contentions, Exhibit 045-A-34, *Webroot, Inc. and Open Text, Inc. v. Sophos Ltd.*, Case No. 6:22-cv-00240-ADA-DTG, W.D. Tex., Nov. 1, 2023, 27 pgs.

Defendant Sophos Ltd.'s Final Invalidity Contentions, Exhibit 045-B, *Webroot, Inc. and Open Text, Inc. v. Sophos Ltd.*, Case No. 6:22-cv-00240-ADA-DTG, W.D. Tex., Nov. 1, 2023, 35 pgs.

Defendant Sophos Ltd.'s Final Invalidity Contentions, *Webroot, Inc. and Open Text, Inc. v. Sophos Ltd.*, CA. No. 6:22-CV-00240-ADA-DTG, W.D. Tex., Nov. 1, 2023, 207 pgs.

Defendant Sophos Ltd.'s Final Invalidity Contentions, Exhibit 224-A-22, *Webroot, Inc. and Open Text, Inc. v. Sophos Ltd.*, CA. No. 6:22-CV-00240-ADA-DTG, W.D. Tex., Nov. 1, 2023, 152 pgs.

Defendant Sophos Ltd.'s Final Invalidity Contentions, Exhibit 224-A-27, *Webroot, Inc. and Open Text, Inc. v. Sophos Ltd.*, CA. No. 6:22-CV-00240-ADA-DTG, W.D. Tex., Nov. 1, 2023, 69 pgs.

Defendant Sophos Ltd.'s Final Invalidity Contentions, Exhibit 224-A-34, *Webroot, Inc. and Open Text, Inc. v. Sophos Ltd.*, CA. No. 6:22-CV-00240-ADA-DTG, W.D. Tex., Nov. 1, 2023, 59 pgs.

Defendant Sophos Ltd.'s Final Invalidity Contentions, Exhibit 224-B, *Webroot, Inc. and Open Text, Inc. v. Sophos Ltd.*, CA. No. 6:22-CV-00240-ADA-DTG, W.D. Tex., Nov. 1, 2023, 53 pgs.

Defendant Sophos Ltd.'s Final Invalidity Contentions, Exhibit 243-A-3, *Webroot, Inc. and Open Text, Inc. v. Sophos Ltd.*, Case No. 6:22-cv-00240-ADA-DTG, W.D. Tex., Nov. 1, 2023, 30 pgs.

Defendant Sophos Ltd.'s Final Invalidity Contentions, Exhibit 243-A-7, *Webroot, Inc. and Open Text, Inc. v. Sophos Ltd.*, Case No. 6:22-cv-00240-ADA-DTG, W.D. Tex., Nov. 1, 2023, 110 pgs.

Defendant Sophos Ltd.'s Final Invalidity Contentions, Exhibit 243-A-8, *Webroot, Inc. and Open Text, Inc. v. Sophos Ltd.*, Case No. 6:22-cv-00240-ADA-DTG, W.D. Tex., Nov. 1, 2023, 60 pgs.

Defendant Sophos Ltd.'s Final Invalidity Contentions, Exhibit 243-A-13, *Webroot, Inc. and Open Text, Inc. v. Sophos Ltd.*, Case No. 6:22-cv-00240-ADA-DTG, W.D. Tex., Nov. 1, 2023, 37 pgs.

Defendant Sophos Ltd.'s Final Invalidity Contentions, Exhibit 243-A-14, *Webroot, Inc. and Open Text, Inc. v. Sophos Ltd.*, Case No. 6:22-cv-00240-ADA-DTG, W.D. Tex., Nov. 1, 2023, 49 pgs.

Defendant Sophos Ltd.'s Final Invalidity Contentions, Exhibit 243-A-18, *Webroot, Inc. and Open Text, Inc. v. Sophos Ltd.*, Case No. 6:22-cv-00240-ADA-DTG, W.D. Tex., Nov. 1, 2023, 37 pgs.

Defendant Sophos Ltd.'s Final Invalidity Contentions, Exhibit 243-A-29, *Webroot, Inc. and Open Text, Inc. v. Sophos Ltd.*, Case No. 6:22-cv-00240-ADA-DTG, W.D. Tex., Nov. 1, 2023, 113 pgs.

Defendant Sophos Ltd.'s Final Invalidity Contentions, Exhibit 243-A-30, *Webroot, Inc. and Open Text, Inc. v. Sophos Ltd.*, Case No. 6:22-cv-00240-ADA-DTG, W.D. Tex., Nov. 1, 2023, 93 pgs.

Defendant Sophos Ltd.'s Final Invalidity Contentions, Exhibit 243-A-31, *Webroot, Inc. and Open Text, Inc. v. Sophos Ltd.*, Case No. 6:22-cv-00240-ADA-DTG, W.D. Tex., Nov. 1, 2023, 33 pgs.

Defendant Sophos Ltd.'s Final Invalidity Contentions, Exhibit 243-A-32, *Webroot, Inc. and Open Text, Inc. v. Sophos Ltd.*, Case No. 6:22-cv-00240-ADA-DTG, W.D. Tex., Nov. 1, 2023, 32 pgs.

Defendant Sophos Ltd.'s Final Invalidity Contentions, Exhibit 243-A-33, *Webroot, Inc. and Open Text, Inc. v. Sophos Ltd.*, Case No. 6:22-cv-00240-ADA-DTG, W.D. Tex., Nov. 1, 2023, 27 pgs.

Defendant Sophos Ltd.'s Final Invalidity Contentions, Exhibit 243-A-34, *Webroot, Inc. and Open Text, Inc. v. Sophos Ltd.*, Case No. 6:22-cv-00240-ADA-DTG, W.D. Tex., Nov. 1, 2023, 24 pgs.

Defendant Sophos Ltd.'s Final Invalidity Contentions, Exhibit 243-B, *Webroot, Inc. and Open Text, Inc. v. Sophos Ltd.*, Case No. 6:22-cv-00240-ADA-DTG, W.D. Tex., Nov. 1, 2023, 131 pgs.

Defendant Sophos Ltd.'s Final Invalidity Contentions, Exhibit 932-A-3, Webroot, Inc. and Open Text, Inc. v. Sophos Ltd., Case No. 6:22-cv-00240-ADA-DTG, W.D. Tex., Nov. 1, 2023, 29 pgs.

Defendant Sophos Ltd.'s Final Invalidity Contentions, Exhibit 932-A-6, *Webroot, Inc. and Open Text, Inc. v. Sophos Ltd.*, Case No. 6:22-cv-00240-ADA-DTG, W.D. Tex., Nov. 1, 2023, 130 pgs.

Defendant Sophos Ltd.'s Final Invalidity Contentions, Exhibit 932-A-7, *Webroot, Inc. and Open Text, Inc. v. Sophos Ltd.*, Case No. 6:22-cv-00240-ADA-DTG, W.D. Tex., Nov. 1, 2023, 75 pgs.

(56) References Cited

OTHER PUBLICATIONS

Defendant Sophos Ltd.'s Final Invalidity Contentions, Exhibit 932-A-13, *Webroot, Inc. and Open Text, Inc.* v. *Sophos Ltd.*, Case No. 6:22-cv-00240-ADA-DTG, W.D. Tex., Nov. 1, 2023, 62 pgs.
Defendant Sophos Ltd.'s Final Invalidity Contentions, Exhibit 932-A-14, *Webroot, Inc. and Open Text, Inc.* v. *Sophos Ltd.*, Case No. 6:22-cv-00240-ADA-DTG, W.D. Tex., Nov. 1, 2023, 63 pgs.
Defendant Sophos Ltd.'s Final Invalidity Contentions, Exhibit 932-A-18, *Webroot, Inc. and Open Text, Inc.* v. *Sophos Ltd.*, Case No. 6:22-cv-00240-ADA-DTG, W.D. Tex., Nov. 1, 2023, 39 pgs.
Defendant Sophos Ltd.'s Final Invalidity Contentions, Exhibit 932-A-28, *Webroot, Inc. and Open Text, Inc.* v. *Sophos Ltd.*, Case No. 6:22-cv-00240-ADA-DTG, W.D. Tex., Nov. 1, 2023, 159 pgs.
Defendant Sophos Ltd.'s Final Invalidity Contentions, Exhibit 932-A-29, *Webroot, Inc. and Open Text, Inc.* v. *Sophos Ltd.*, Case No. 6:22-cv-00240-ADA-DTG, W.D. Tex., Nov. 1, 2023, 120 pgs.
Defendant Sophos Ltd.'s Final Invalidity Contentions, Exhibit 932-A-30, *Webroot, Inc. and Open Text, Inc.* v. *Sophos Ltd.*, Case No. 6:22-cv-00240-ADA-DTG, W.D. Tex., Nov. 1, 2023, 34 pgs.
Defendant Sophos Ltd.'s Final Invalidity Contentions, Exhibit 932-A-31, *Webroot, Inc. and Open Text, Inc.* v. *Sophos Ltd.*, Case No. 6:22-cv-00240-ADA-DTG, W.D. Tex., Nov. 1, 2023, 33 pgs.
Defendant Sophos Ltd.'s Final Invalidity Contentions, Exhibit 932-A-32, *Webroot, Inc. and Open Text, Inc.* v. *Sophos Ltd.*, Case No. 6:22-cv-00240-ADA-DTG, W.D. Tex., Nov. 1, 2023, 26 pgs.
Defendant Sophos Ltd.'s Final Invalidity Contentions, Exhibit 932-A-33, *Webroot, Inc. and Open Text, Inc.* v. *Sophos Ltd.*, Case No. 6:22-cv-00240-ADA-DTG, W.D. Tex., Nov. 1, 2023, 24 pgs.
Defendant Sophos Ltd.'s Final Invalidity Contentions, Exhibit 932-B, *Webroot, Inc. and Open Text, Inc.* v. *Sophos Ltd.*, Case No. 6:22-cv-00240-ADA-DTG, W.D. Tex., Nov. 1, 2023, 164 pgs.
Defendant Sophos Ltd.'s Final Invalidity Contentions, Exhibit 244-A-6, *Webroot, Inc. and Open Text, Inc.* v. *Sophos Ltd.*, Case No. 6:22-cv-00240-ADA-DTG, W.D. Tex., Nov. 1, 2023, 45 pgs.
Defendant Sophos Ltd.'s Final Invalidity Contentions, Exhibit 244-A-9, *Webroot, Inc. and Open Text, Inc.* v. *Sophos Ltd.*, Case No. 6:22-cv-00240-ADA-DTG, W.D. Tex., Nov. 1, 2023, 100 pgs.
Defendant Sophos Ltd.'s Final Invalidity Contentions, Exhibit 244-A-23, *Webroot, Inc. and Open Text, Inc.* v. *Sophos Ltd.*, Case No. 6:22-cv-00240-ADA-DTG, W.D. Tex., Nov. 1, 2023, 28 pgs.
Defendant Sophos Ltd.'s Final Invalidity Contentions, Exhibit 244-A-24, *Webroot, Inc. and Open Text, Inc.* v. *Sophos Ltd.*, Case No. 6:22-cv-00240-ADA-DTG, W.D. Tex., Nov. 1, 2023, 107 pgs.
Defendant Sophos Ltd.'s Final Invalidity Contentions, Exhibit 244-A-25, *Webroot, Inc. and Open Text, Inc.* v. *Sophos Ltd.*, Case No. 6:22-cv-00240-ADA-DTG, W.D. Tex., Nov. 1, 2023, 108 pgs.
Defendant Sophos Ltd.'s Final Invalidity Contentions, Exhibit 244-A-26, *Webroot, Inc. and Open Text, Inc.* v. *Sophos Ltd.*, Case No. 6:22-cv-00240-ADA-DTG, W.D. Tex., Nov. 1, 2023, 43 pgs.
Defendant Sophos Ltd.'s Final Invalidity Contentions, Exhibit 244-A-27, *Webroot, Inc. and Open Text, Inc.* v. *Sophos Ltd.*, Case No. 6:22-cv-00240-ADA-DTG, W.D. Tex., Nov. 1, 2023, 32 pgs.
Defendant Sophos Ltd.'s Final Invalidity Contentions, Exhibit 244-B, *Webroot, Inc. and Open Text, Inc.* v. *Sophos Ltd.*, Case No. 6:22-cv-00240-ADA-DTG, W.D. Tex., Nov. 1, 2023, 53 pgs.
Defendant Sophos Ltd.'s Final Invalidity Contentions, Exhibit 505-A-6, *Webroot, Inc. and Open Text, Inc.* v. *Sophos Ltd.*, Case No. 6:22-cv-00240-ADA-DTG, W.D. Tex., Nov. 1, 2023, 162 pgs.
Defendant Sophos Ltd.'s Final Invalidity Contentions, Exhibit 505-A-8, *Webroot, Inc. and Open Text, Inc.* v. *Sophos Ltd.*, Case No. 6:22-cv-00240-ADA-DTG, W.D. Tex., Nov. 1, 2023, 35 pgs.
Defendant Sophos Ltd.'s Final Invalidity Contentions, Exhibit 505-A-15, *Webroot, Inc. and Open Text, Inc.* v. *Sophos Ltd.*, CA. No. 6:22-CV-00240-ADA-DTG, W.D. Tex., Feb. 21, 2023, 148 pgs.
Defendant Sophos Ltd.'s Final Invalidity Contentions, Exhibit 505-A-21, *Webroot, Inc. and Open Text, Inc.* v. *Sophos Ltd.*, Case No. 6:22-cv-00240-ADA-DTG, W.D. Tex., Nov. 1, 2023, 30 pgs.
Defendant Sophos Ltd.'s Final Invalidity Contentions, Exhibit 505-A-22, *Webroot, Inc. and Open Text, Inc.* v. *Sophos Ltd.*, Case No. 6:22-cv-00240-ADA-DTG, W.D. Tex., Nov. 1, 2023, 32 pgs.

Defendant Sophos Ltd.'s Final Invalidity Contentions, Exhibit 505-B, *Webroot, Inc. and Open Text, Inc.* v. *Sophos Ltd.*, Case No. 6:22-cv-00240-ADA-DTG, W.D. Tex., Nov. 1, 2023, 117 pgs.
Defendant Sophos Ltd.'s Final Invalidity Contentions, Exhibit 591-A-3, *Webroot, Inc. and Open Text, Inc.* v. *Sophos Ltd.*, Case No. 6:22-cv-00240-ADA-DTG, W.D. Tex., Nov. 1, 2023, 37 pgs.
Defendant Sophos Ltd.'s Final Invalidity Contentions, Exhibit 591-A-4, *Webroot, Inc. and Open Text, Inc.* v. *Sophos Ltd.*, Case No. 6:22-cv-00240-ADA-DTG, W.D. Tex., Nov. 1, 2023, 53 pgs.
Defendant Sophos Ltd.'s Final Invalidity Contentions, Exhibit 591-A-19, *Webroot, Inc. and Open Text, Inc.* v. *Sophos Ltd.*, Case No. 6:22-cv-00240-ADA-DTG, W.D. Tex., Nov. 1, 2023, 54 pgs.
Defendant Sophos Ltd.'s Final Invalidity Contentions, Exhibit 591-A-20, *Webroot, Inc. and Open Text, Inc.* v. *Sophos Ltd.*, Case No. 6:22-cv-00240-ADA-DTG, W.D. Tex., Nov. 1, 2023, 33 pgs.
Defendant Sophos Ltd.'s Final Invalidity Contentions, Exhibit 591-A-22, *Webroot, Inc. and Open Text, Inc.* v. *Sophos Ltd.*, Case No. 6:22-cv-00240-ADA-DTG, W.D. Tex., Nov. 1, 2023, 52 pgs.
Defendant Sophos Ltd.'s Final Invalidity Contentions, Exhibit 591-A-28, *Webroot, Inc. and Open Text, Inc.* v. *Sophos Ltd.*, Case No. 6:22-cv-00240-ADA-DTG, W.D. Tex., Nov. 1, 2023, 60 pgs.
Defendant Sophos Ltd.'s Final Invalidity Contentions, Exhibit 591-B, *Webroot, Inc. and Open Text, Inc.* v. *Sophos Ltd.*, Case No. 6:22-cv-00240-ADA-DTG, W.D. Tex., Nov. 1, 2023, 38 pgs.
Defendant's Final Invalidity Contentions, Exhibit 591-A-47, *Webroot, Inc. and Open Text, Inc.* v. *Trend Micro, Inc.*, Case No. 6:22-cv-00239-ADA-DTG, W.D. Tex., Nov. 1, 2023, 46 pgs.
Defendant Forcepoint LLC's Final Invalidity Contentions, Exhibit 386-D-1, *Webroot, Inc. and Open Text, Inc.* v. *Forcepoint LLC*, No. 6:22-CV-00342-ADA-DTG (WD, Texas), Nov. 1, 2023, 88 pgs.
Defendant Forcepoint LLC's Final Invalidity Contentions, Exhibit 386-D-2, *Webroot, Inc. and Open Text, Inc.* v. *Forcepoint LLC*, No. 6:22-CV-00342-ADA-DTG (WD, Texas), Nov. 1, 2023, 61 pgs.
Defendant Forcepoint LLC's Final Invalidity Contentions, Exhibit 386-D-3, *Webroot, Inc. and Open Text, Inc.* v. *Forcepoint LLC*, No. 6:22-CV-00342-ADA-DTG (WD, Texas), Nov. 1, 2023, 72 pgs.
Defendant Forcepoint LLC's Final Invalidity Contentions, Exhibit 386-D-4, *Webroot, Inc. and Open Text, Inc.* v. *Forcepoint LLC*, No. 6:22-CV-00342-ADA-DTG (WD, Texas), Nov. 1, 2023, 69 pgs.
Defendant Forcepoint LLC's Final Invalidity Contentions, Exhibit 386-D-5, *Webroot, Inc. and Open Text, Inc.* v. *Forcepoint LLC*, No. 6:22-CV-00342-ADA-DTG (WD, Texas), Nov. 1, 2023, 73 pgs.
Defendant Forcepoint LLC's Final Invalidity Contentions, Exhibit 386-D-6, *Webroot, Inc. and Open Text, Inc.* v. *Forcepoint LLC*, No. 6:22-CV-00342-ADA-DTG (WD, Texas), Nov. 1, 2023, 100 pgs.
Defendant Forcepoint LLC's Final Invalidity Contentions, Exhibit 386-D-7, *Webroot, Inc. and Open Text, Inc.* v. *Forcepoint LLC*, No. 6:22-CV-00342-ADA-DTG (WD, Texas), Nov. 1, 2023, 77 pgs.
Defendant Forcepoint LLC's Final Invalidity Contentions, Exhibit 928-E-1, *Webroot, Inc. and Open Text, Inc.* v. *Forcepoint LLC*, No. 6:22-CV-00342-ADA-DTG (WD, Texas), Nov. 1, 2023, 26 pgs.
Defendant Forcepoint LLC's Final Invalidity Contentions, Exhibit 928-E-2, *Webroot, Inc. and Open Text, Inc.* v. *Forcepoint LLC*, No. 6:22-CV-00342-ADA-DTG (WD, Texas), Nov. 1, 2023, 24 pgs.
Defendant Forcepoint LLC's Final Invalidity Contentions, Exhibit 928-E-3, *Webroot, Inc. and Open Text, Inc.* v. *Forcepoint LLC*, No. 6:22-CV-00342-ADA-DTG (WD, Texas), Nov. 1, 2023, 27 pgs.
Defendant Forcepoint LLC's Final Invalidity Contentions, Exhibit 928-E-4, *Webroot, Inc. and Open Text, Inc.* v. *Forcepoint LLC*, No. 6:22-CV-00342-ADA-DTG (WD, Texas), Nov. 1, 2023, 29 pgs.
Defendant Forcepoint LLC's Final Invalidity Contentions, Exhibit 928-E-5, *Webroot, Inc. and Open Text, Inc.* v. *Forcepoint LLC*, No. 6:22-CV-00342-ADA-DTG (WD, Texas), Nov. 1, 2023, 30 pgs.
Defendant Forcepoint LLC's Final Invalidity Contentions, Exhibit 844-B-1, *Webroot, Inc. and Open Text, Inc.* v. *Forcepoint LLC*, No. 6:22-CV-00342-ADA-DTG (WD, Texas), Nov. 1, 2023, 23 pgs.
Defendant Forcepoint LLC's Final Invalidity Contentions, Exhibit 844-B-2, *Webroot, Inc. and Open Text, Inc.* v. *Forcepoint LLC*, 1 No. 6:22-CV-00342-ADA-DTG (WD, Texas), Jan. 1, 2023, 21 pgs.
Defendant Forcepoint LLC's Final Invalidity Contentions, Exhibit 844-B-3, *Webroot, Inc. and Open Text, Inc.* v. *Forcepoint LLC*, No. 6:22-CV-00342-ADA-DTG (WD, Texas), Nov. 1, 2023, 27 pgs.

(56)     References Cited

OTHER PUBLICATIONS

Defendant Forcepoint LLC's Final Invalidity Contentions, Exhibit 844-B-4, *Webroot, Inc. and Open Text, Inc.* v. *Forcepoint LLC*, No. 6:22-CV-00342-ADA-DTG (WD, Texas), Nov. 1, 2023, 23 pgs.
Defendant Forcepoint LLC's Final Invalidity Contentions, Exhibit 844-B-5, *Webroot, Inc. and Open Text, Inc.* v. *Forcepoint LLC*, No. 6:22-CV-00342-ADA-DTG (WD, Texas), Nov. 1, 2023, 25 pgs.
Defendant Forcepoint LLC's Final Invalidity Contentions, Exhibit 844-B-6, *Webroot, Inc. and Open Text, Inc.* v. *Forcepoint LLC*, No. 6:22-CV-00342-ADA-DTG (WD, Texas), Nov. 1, 2023, 21 pgs.
Defendant Forcepoint LLC's Final Invalidity Contentions, Exhibit 844-B-7, *Webroot, Inc. and Open Text, Inc.* v. *Forcepoint LLC*, No. 6:22-CV-00342-ADA-DTG (WD, Texas), Nov. 1, 2023, 29 pgs.
Defendant Forcepoint LLC's Final Invalidity Contentions, Exhibit 844-B-8, *Webroot, Inc. and Open Text, Inc.* v. *Forcepoint LLC*, No. 6:22-CV-00342-ADA-DTG (WD, Texas), Nov. 1, 2023, 24 pgs.
Defendant Forcepoint LLC's Final Invalidity Contentions, Exhibit 844-B-9, *Webroot, Inc. and Open Text, Inc.* v. *Forcepoint LLC*, No. 6:22-CV-00342-ADA-DTG (WD, Texas), Nov. 1, 2023, 23 pgs.
Defendant Forcepoint LLC's Final Invalidity Contentions, Exhibit 844-B-10, *Webroot, Inc. and Open Text, Inc.* v. *Forcepoint LLC*, No. 6:22-CV-00342-ADA-DTG (WD, Texas), Nov. 1, 2023, 20 pgs.
Defendant Forcepoint LLC's Final Invalidity Contentions, Exhibit 844-B-11, *Webroot, Inc. and Open Text, Inc.* v. *Forcepoint LLC*, No. 6:22-CV-00342-ADA-DTG (WD, Texas), Nov. 1, 2023, 25 pgs.
Defendant Forcepoint LLC's Final Invalidity Contentions, Exhibit 844-B-12, *Webroot, Inc. and Open Text, Inc.* v. *Forcepoint LLC*, No. 6:22-CV-00342-ADA-DTG (WD, Texas), Nov. 1, 2023, 24 pgs.
Defendant Forcepoint LLC's Final Invalidity Contentions, Exhibit 844-B-13, *Webroot, Inc. and Open Text, Inc.* v. *Forcepoint LLC*, No. 6:22-CV-00342-ADA-DTG (WD, Texas), Nov. 1, 2023, 24 pgs.
Defendant Forcepoint LLC's Final Invalidity Contentions, Exhibit 844-B-14, *Webroot, Inc. and Open Text, Inc.* v. *Forcepoint LLC*, No. 6:22-CV-00342-ADA-DTG (WD, Texas), Nov. 1, 2023, 21 pgs.
Defendant Forcepoint LLC's Final Invalidity Contentions, Exhibit 844-B-15, *Webroot, Inc. and Open Text, Inc.* v. *Forcepoint LLC*, No. 6:22-CV-00342-ADA-DTG (WD, Texas), Nov. 1, 2023, 17 pgs.
Defendant Forcepoint LLC's Final Invalidity Contentions, Exhibit 844-B-16, *Webroot, Inc. and Open Text, Inc.* v. *Forcepoint LLC*, No. 6:22-CV-00342-ADA-DTG (WD, Texas), Nov. 1, 2023, 20 pgs.
Defendant Forcepoint LLC's Final Invalidity Contentions, Exhibit 844-B-17, *Webroot, Inc. and Open Text, Inc.* v. *Forcepoint LLC*, No. 6:22-CV-00342-ADA-DTG (WD, Texas), Nov. 1, 2023, 18 pgs.
Defendant Forcepoint LLC's Final Invalidity Contentions, Exhibit 844-B-18, *Webroot, Inc. and Open Text, Inc.* v. *Forcepoint LLC*, No. 6:22-CV-00342-ADA-DTG (WD, Texas), Nov. 1, 2023, 18 pgs.
Defendant Forcepoint LLC's Final Invalidity Contentions, Exhibit 844-B-19, *Webroot, Inc. and Open Text, Inc.* v. *Forcepoint LLC*, No. 6:22-CV-00342-ADA-DTG (WD, Texas), Nov. 1, 2023, 20 pgs.
Defendant Forcepoint LLC's Final Invalidity Contentions, Exhibit 844-B-20, *Webroot, Inc. and Open Text, Inc.* v. *Forcepoint LLC*, No. 6:22-CV-00342-ADA-DTG (WD, Texas), Nov. 1, 2023, 17 pgs.
Defendant Forcepoint LLC's Final Invalidity Contentions, Exhibit 844-B-21, *Webroot, Inc. and Open Text, Inc.* v. *Forcepoint LLC*, No. 6:22-CV-00342-ADA-DTG (WD, Texas), Nov. 1, 2023, 18 pgs.
Defendant Forcepoint LLC's Final Invalidity Contentions, Exhibit 844-B-22, *Webroot, Inc. and Open Text, Inc.* v. *Forcepoint LLC*, No. 6:22-CV-00342-ADA-DTG (WD, Texas), Nov. 1, 2023, 22, 17 pgs.
Defendant Forcepoint LLC's Final Invalidity Contentions, Exhibit 844-B-23, *Webroot, Inc. and Open Text, Inc.* v. *Forcepoint LLC*, No. 6:22-CV-00342-ADA-DTG (WD, Texas), Nov. 1, 2023, 23 pgs.
Defendant Forcepoint LLC's Final Invalidity Contentions, Exhibit 844-B-24, *Webroot, Inc. and Open Text, Inc.* v. *Forcepoint LLC*, No. 6:22-CV-00342-ADA-DTG (WD, Texas), Nov. 1, 2023, 27 pgs.
Defendant Forcepoint LLC's Final Invalidity Contentions, Exhibit 844-B-25, *Webroot, Inc. and Open Text, Inc.* v. *Forcepoint LLC*, No. 6:22-CV-00342-ADA-DTG (WD, Texas), Nov. 1, 2023, 23 pgs.
Defendant Forcepoint LLC's Final Invalidity Contentions, Exhibit 844-B-26, *Webroot, Inc. and Open Text, Inc.* v. *Forcepoint LLC*, No. 6:22-CV-00342-ADA-DTG (WD, Texas), Nov. 1, 2023, 22 pgs.
Defendant Forcepoint LLC's Final Invalidity Contentions, Exhibit 844-B-27, *Webroot, Inc. and Open Text, Inc.* v. *Forcepoint LLC*, No. 6:22-CV-00342-ADA-DTG (WD, Texas), Nov. 1, 2023, 33 pgs.
Defendant Forcepoint LLC's Final Invalidity Contentions, Exhibit 844-B-28, *Webroot, Inc. and Open Text, Inc.* v. *Forcepoint LLC*, No. 6:22-CV-00342-ADA-DTG (WD, Texas), Nov. 1, 2023, 30 pgs.
Defendant Forcepoint LLC's Final Invalidity Contentions, Exhibit 844-B-29, *Webroot, Inc. and Open Text, Inc.* v. *Forcepoint LLC*, No. 6:22-CV-00342-ADA-DTG (WD, Texas), Nov. 1, 2023, 27 pgs.
Defendant Forcepoint LLC's Final Invalidity Contentions, Exhibit 869-H-1, *Webroot, Inc. and Open Text, Inc.* v. *Forcepoint LLC*, No. 6:22-CV-00342-ADA-DTG (WD, Texas), Nov. 1, 2023, 55 pgs.
Defendant Forcepoint LLC's Final Invalidity Contentions, Exhibit 869-H-2, *Webroot, Inc. and Open Text, Inc.* v. *Forcepoint LLC*, No. 6:22-CV-00342-ADA-DTG (WD, Texas), Nov. 1, 2023, 42 pgs.
Defendant Forcepoint LLC's Final Invalidity Contentions, Exhibit 869-H-3, *Webroot, Inc. and Open Text, Inc.* v. *Forcepoint LLC*, No. 6:22-CV-00342-ADA-DTG (WD, Texas), Nov. 1, 2023, 39 pgs.
Defendant Forcepoint LLC's Final Invalidity Contentions, Exhibit 869-H-4, *Webroot, Inc. and Open Text, Inc.* v. *Forcepoint LLC*, No. 6:22-CV-00342-ADA-DTG (WD, Texas), Nov. 1, 2023, 40 pgs.
Defendant Forcepoint LLC's Final Invalidity Contentions, Exhibit 869-H-5, *Webroot, Inc. and Open Text, Inc.* v. *Forcepoint LLC*, No. 6:22-CV-00342-ADA-DTG (WD, Texas), Nov. 1, 2023, 47 pgs.
Defendant Forcepoint LLC's Final Invalidity Contentions, Exhibit 869-H-6, *Webroot, Inc. and Open Text, Inc.* v. *Forcepoint LLC*, No. 6:22-CV-00342-ADA-DTG (WD, Texas), Nov. 1, 2023, 48 pgs.
Defendant Forcepoint LLC's Final Invalidity Contentions, Exhibit 869-H-7, *Webroot, Inc. and Open Text, Inc.* v. *Forcepoint LLC*, No. 6:22-CV-00342-ADA-DTG (WD, Texas), Nov. 1, 2023, 62 pgs.
Defendant Forcepoint LLC's Final Invalidity Contentions, Exhibit 869-H-8, *Webroot, Inc. and Open Text, Inc.* v. *Forcepoint LLC*, No. 6:22-CV-00342-ADA-DTG (WD, Texas), Nov. 1, 2023, 36 pgs.
Defendant Forcepoint LLC's Final Invalidity Contentions, Exhibit 869-H-9, *Webroot, Inc. and Open Text, Inc.* v. *Forcepoint LLC*, No. 6:22-CV-00342-ADA-DTG (WD, Texas), Nov. 1, 2023, 39 pgs.
Defendant Forcepoint LLC's Final Invalidity Contentions, Exhibit 869-H-10, *Webroot, Inc. and Open Text, Inc.* v. *Forcepoint LLC*, No. 6:22-CV-00342-ADA-DTG (WD, Texas), Nov. 1, 2023, 37 pgs.
Defendant Forcepoint LLC's Final Invalidity Contentions, Exhibit 869-H-11, *Webroot, Inc. and Open Text, Inc.* v. *Forcepoint LLC*, No. 6:22-CV-00342-ADA-DTG (WD, Texas), Nov. 1, 2023, 44 pgs.
Defendant Forcepoint LLC's Final Invalidity Contentions, Exhibit 869-H-12, *Webroot, Inc. and Open Text, Inc.* v. *Forcepoint LLC*, No. 6:22-CV-00342-ADA-DTG (WD, Texas), Nov. 1, 2023, 39 pgs.
Defendant Forcepoint LLC's Final Invalidity Contentions, Exhibit 869-H-13, *Webroot, Inc. and Open Text, Inc.* v. *Forcepoint LLC*, No. 6:22-CV-00342-ADA-DTG (WD, Texas), Nov. 1, 2023, 50 pgs.
Defendant Forcepoint LLC's Final Invalidity Contentions, Exhibit 869-H-14, *Webroot, Inc. and Open Text, Inc.* v. *Forcepoint LLC*, No. 6:22-CV-00342-ADA-DTG (WD, Texas), Nov. 1, 2023, 37 pgs.
Defendant Forcepoint LLC's Final Invalidity Contentions, Exhibit 869-H-15, *Webroot, Inc. and Open Text, Inc.* v. *Forcepoint LLC*, No. 6:22-CV-00342-ADA-DTG (WD, Texas), Nov. 1, 2023, 36 pgs.
Defendant Forcepoint LLC's Final Invalidity Contentions, Exhibit 869-H-16, *Webroot, Inc. and Open Text, Inc.* v. *Forcepoint LLC*, No. 6:22-CV-00342-ADA-DTG (WD, Texas), Nov. 1, 2023, 32 pgs.
Defendant Forcepoint LLC's Final Invalidity Contentions, Exhibit 869-H-17, *Webroot, Inc. and Open Text, Inc.* v. *Forcepoint LLC*, No. 6:22-CV-00342-ADA-DTG (WD, Texas), Nov. 1, 2023, 31 pgs.
Defendant Forcepoint LLC's Final Invalidity Contentions, Exhibit 869-H-18, *Webroot, Inc. and Open Text, Inc.* v. *Forcepoint LLC*, No. 6:22-CV-00342-ADA-DTG (WD, Texas), Nov. 1, 2023, 31 pgs.
Defendant Forcepoint LLC's Final Invalidity Contentions, Exhibit 869-H-19, *Webroot, Inc. and Open Text, Inc.* v. *Forcepoint LLC*, No. 6:22-CV-00342-ADA-DTG (WD, Texas), Nov. 1, 2023, 37 pgs.
Defendant Forcepoint LLC's Final Invalidity Contentions, Exhibit 869-H-20, *Webroot, Inc. and Open Text, Inc.* v. *Forcepoint LLC*, No. 6:22-CV-00342-ADA-DTG (WD, Texas), Nov. 1, 2023, 32 pgs.
Defendant Forcepoint LLC's Final Invalidity Contentions, Exhibit 869-H-21, *Webroot, Inc. and Open Text, Inc.* v. *Forcepoint LLC*, No. 6:22-CV-00342-ADA-DTG (WD, Texas), Nov. 1, 2023, 37 pgs.

(56) References Cited

OTHER PUBLICATIONS

Defendant Forcepoint LLC's Final Invalidity Contentions, Exhibit 869-H-22, *Webroot, Inc. and Open Text, Inc.* v. *Forcepoint LLC*, No. 6:22-CV-00342-ADA-DTG (WD, Texas), Nov. 1, 2023, 38 pgs.

Defendant Forcepoint LLC's Final Invalidity Contentions, Exhibit 869-H-23, *Webroot, Inc. and Open Text, Inc.* v. *Forcepoint LLC*, No. 6:22-CV-00342-ADA-DTG (WD, Texas), Nov. 1, 2023, 33 pgs.

Defendant Forcepoint LLC's Final Invalidity Contentions, Exhibit 869-H-24, *Webroot, Inc. and Open Text, Inc.* v. *Forcepoint LLC*, No. 6:22-CV-00342-ADA-DTG (WD, Texas), Nov. 1, 2023, 35 pgs.

Defendant Forcepoint LLC's Final Invalidity Contentions, Exhibit 869-H-25, *Webroot, Inc. and Open Text, Inc.* v. *Forcepoint LLC*, No. 6:22-CV-00342-ADA-DTG (WD, Texas), Nov. 1, 2023, 63 pgs.

Defendant Forcepoint LLC's Final Invalidity Contentions, Exhibit 869-H-26, *Webroot, Inc. and Open Text, Inc.* v. *Forcepoint LLC*, No. 6:22-CV-00342-ADA-DTG (WD, Texas), Nov. 1, 2023, 39 pgs.

Defendant Forcepoint LLC's Final Invalidity Contentions, Exhibit 869-H-27, *Webroot, Inc. and Open Text, Inc.* v. *Forcepoint LLC*, No. 6:22-CV-00342-ADA-DTG (WD, Texas), Nov. 1, 2023, Exhibit 869-H-27, 29 pgs.

Defendant Forcepoint LLC's Final Invalidity Contentions, Exhibit 869-H-28, *Webroot, Inc. and Open Text, Inc.* v. *Forcepoint LLC*, No. 6:22-CV-00342-ADA-DTG (WD, Texas), Nov. 1, 2023, 71 pgs Defendant Forcepoint LLC's Final Invalidity Contentions, Exhibit 869-H-29, *Webroot, Inc. and Open Text, Inc.* v. *Forcepoint LLC*, No. 6:22-CV-00342-ADA-DTG (WD, Texas), Nov. 1, 2023, 38 pgs.

Defendant Forcepoint LLC's Final Invalidity Contentions, Exhibit 869-H-30, *Webroot, Inc. and Open Text, Inc.* v. *Forcepoint LLC*, No. 6:22-CV-00342-ADA-DTG (WD, Texas), Nov. 1, 2023, 33 pgs.

Defendant Forcepoint LLC's Final Invalidity Contentions, Exhibit 869-H-31, *Webroot, Inc. and Open Text, Inc.* v. *Forcepoint LLC*, No. 6:22-CV-00342-ADA-DTG (WD, Texas), Nov. 1, 2023, 39 pgs.

Defendant Forcepoint LLC's Final Invalidity Contentions, Exhibit 869-H-32, *Webroot, Inc. and Open Text, Inc.* v. *Forcepoint LLC*, No. 6:22-CV-00342-ADA-DTG (WD, Texas), Nov. 1, 2023, 34 pgs.

Defendant Forcepoint LLC's Final Invalidity Contentions, Exhibit 869-H-33, *Webroot, Inc. and Open Text, Inc.* v. *Forcepoint LLC*, No. 6:22-CV-00342-ADA-DTG (WD, Texas), Nov. 1, 2023, 40 pgs.

Defendant Forcepoint LLC's Final Invalidity Contentions, Exhibit 869-H-34, *Webroot, Inc. and Open Text, Inc.* v. *Forcepoint LLC*, No. 6:22-CV-00342-ADA-DTG (WD, Texas), Nov. 1, 2023, 43 pgs.

Defendant Forcepoint LLC's Final Invalidity Contentions, Exhibit 869-H-35, *Webroot, Inc. and Open Text, Inc.* v. *Forcepoint LLC*, No. 6:22-CV-00342-ADA-DTG (WD, Texas), Nov. 1, 2023, 49 pgs.

Defendant Forcepoint LLC's Final Invalidity Contentions, Exhibit 869-H-36, *Webroot, Inc. and Open Text, Inc.* v. *Forcepoint LLC*, No. 6:22-CV-00342-ADA-DTG (WD, Texas), Nov. 1, 2023, 69 pgs.

Defendant's Final Invalidity Contentions, Exhibit 844-A-48, *Webroot, Inc. and Open Text, Inc.* v. *Trend Micro, Inc.*, Case No. 6:22-cv-00239-ADA-DTG, W.D. Tex., Nov. 1, 2023, 100 pgs.

Defendant's Final Invalidity Contentions, Exhibit 844-A-75, *Webroot, Inc. and Open Text, Inc.* v. *Trend Micro, Inc.*, Case No. 6:22-cv-00239-ADA-DTG, W.D. Tex., Nov. 1, 2023, 78 pgs.

Defendant's Final Invalidity Contentions, Exhibit 844-B, *Webroot, Inc. and Open Text, Inc.* v. *Trend Micro, Inc.*, Case No. 6:22-cv-00239-ADA-DTG, W.D. Tex., Nov. 1, 2023, 53 pgs.

Defendant's Final Invalidity Contentions, Exhibit 869-A-24, *Webroot, Inc. and Open Text, Inc.* v. *Trend Micro, Inc.*, Case No. 6:22-cv-00239-ADA-DTG, W.D. Tex., Nov. 1, 2023, 71 pgs.

Defendant's Final Invalidity Contentions, Exhibit 869-A-53, *Webroot, Inc. and Open Text, Inc.* v. *Trend Micro, Inc.*, Case No. 6:22-cv-00239-ADA-DTG, W.D. Tex., Nov. 1, 2023, 64 pgs.

Defendant's Final Invalidity Contentions, Exhibit 869-B, *Webroot, Inc. and Open Text, Inc.* v. *Trend Micro, Inc.*, Case No. 6:22-cv-00239-ADA-DTG, W.D. Tex., Nov. 1, 2023, 65 pgs.

Defendant Forcepoint LLC's Final Invalidity Contentions, Exhibit 389-A-1, *Webroot, Inc. and Open Text, Inc.* v. *Forcepoint LLC*, No. 6:22-CV-00342-ADA-DTG (WD, Texas), Nov. 1, 2023, 28 pgs.

Defendant Forcepoint LLC's Final Invalidity Contentions, Exhibit 389-A-2, *Webroot, Inc. and Open Text, Inc.* v. *Forcepoint LLC*, No. 6:22-CV-00342-ADA-DTG (WD, Texas), Nov. 1, 2023, 44 pgs.

Defendant Forcepoint LLC's Final Invalidity Contentions, Exhibit 389-A-3, *Webroot, Inc. and Open Text, Inc.* v. *Forcepoint LLC*, No. 6:22-CV-00342-ADA-DTG (WD, Texas), Nov. 1, 2023, 49 pgs.

Defendant Forcepoint LLC's Final Invalidity Contentions, Exhibit 389-A-4, *Webroot, Inc. and Open Text, Inc.* v. *Forcepoint LLC*, No. 6:22-CV-00342-ADA-DTG (WD, Texas), Nov. 1, 2023, 68 pgs.

Defendant Forcepoint LLC's Final Invalidity Contentions, Exhibit 389-A-5, *Webroot, Inc. and Open Text, Inc.* v. *Forcepoint LLC*, No. 6:22-CV-00342-ADA-DTG (WD, Texas), Nov. 1, 2023, 25 pgs.

Defendant Forcepoint LLC's Final Invalidity Contentions, Exhibit 389-A-6, *Webroot, Inc. and Open Text, Inc.* v. *Forcepoint LLC*, No. 6:22-CV-00342-ADA-DTG (WD, Texas), Nov. 1, 2023, 20 pgs.

Defendant Forcepoint LLC's Final Invalidity Contentions, Exhibit 389-A-7, *Webroot, Inc. and Open Text, Inc.* v. *Forcepoint LLC*, No. 6:22-CV-00342-ADA-DTG (WD, Texas), Nov. 1, 2023, 31 pgs.

Defendant Forcepoint LLC's Final Invalidity Contentions, Exhibit 389-A-8, *Webroot, Inc. and Open Text, Inc.* v. *Forcepoint LLC*, No. 6:22-CV-00342-ADA-DTG (WD, Texas), Nov. 1, 2023, 86 pgs.

Defendant Forcepoint LLC's Final Invalidity Contentions, Exhibit 389-A-9, *Webroot, Inc. and Open Text, Inc.* v. *Forcepoint LLC*, No. 6:22-CV-00342-ADA-DTG (WD, Texas), Nov. 1, 2023, 19 pgs.

Defendant Forcepoint LLC's Final Invalidity Contentions, Exhibit 389-A-10, *Webroot, Inc. and Open Text, Inc.* v. *Forcepoint LLC*, No. 6:22-CV-00342-ADA-DTG (WD, Texas), Nov. 1, 2023, 75 pgs.

Defendant Forcepoint LLC's Final Invalidity Contentions, Exhibit 389-A-11, *Webroot, Inc. and Open Text, Inc.* v. *Forcepoint LLC*, No. 6:22-CV-00342-ADA-DTG (WD, Texas), Nov. 1, 2023, 28 pgs.

Defendant Forcepoint LLC's Final Invalidity Contentions, Exhibit 389-A-12, *Webroot, Inc. and Open Text, Inc.* v. *Forcepoint LLC*, No. 6:22-CV-00342-ADA-DTG (WD, Texas), Nov. 1, 2023, 24 pgs.

Defendant Forcepoint LLC's Final Invalidity Contentions, Exhibit 389-A-13, *Webroot, Inc. and Open Text, Inc.* v. *Forcepoint LLC*, No. 6:22-CV-00342-ADA-DTG (WD, Texas), Nov. 1, 2023, 38 pgs.

Defendant Forcepoint LLC's Final Invalidity Contentions, Exhibit 389-A-14, *Webroot, Inc. and Open Text, Inc.* v. *Forcepoint LLC*, No. 6:22-CV-00342-ADA-DTG (WD, Texas), Nov. 1, 2023, 23 pgs.

Defendant Forcepoint LLC's Final Invalidity Contentions, Exhibit 389-A-15, *Webroot, Inc. and Open Text, Inc.* v. *Forcepoint LLC*, No. 6:22-CV-00342-ADA-DTG (WD, Texas), Nov. 1, 2023, 125 pgs.

Defendant Forcepoint LLC's Final Invalidity Contentions, Exhibit 389-A-16, *Webroot, Inc. and Open Text, Inc.* v. *Forcepoint LLC*, No. 6:22-CV-00342-ADA-DTG (WD, Texas), Nov. 1, 2023, 126 pgs.

Defendant Forcepoint LLC's Final Invalidity Contentions, Exhibit 389-A-17, *Webroot, Inc. and Open Text, Inc.* v. *Forcepoint LLC*, No. 6:22-CV-00342-ADA-DTG (WD, Texas), Nov. 1, 2023, 60 pgs.

Defendant Forcepoint LLC's Final Invalidity Contentions, Exhibit 389-A-18, *Webroot, Inc. and Open Text, Inc.* v. *Forcepoint LLC*, No. 6:22-CV-00342-ADA-DTG (WD, Texas), Nov. 1, 2023, 34 pgs.

Defendant Forcepoint LLC's Final Invalidity Contentions, Exhibit 389-A-19, *Webroot, Inc. and Open Text, Inc.* v. *Forcepoint LLC*, No. 6:22-CV-00342-ADA-DTG (WD, Texas), Nov. 1, 2023, 41 pgs.

Defendant Forcepoint LLC's Final Invalidity Contentions, Exhibit 389-A-20, *Webroot, Inc. and Open Text, Inc.* v. *Forcepoint LLC*, No. 6:22-CV-00342-ADA-DTG (WD, Texas), Nov. 1, 2023, 34 pgs.

Defendant's Final Invalidity Contentions, Exhibit 250-A-13, *Webroot, Inc. and Open Text, Inc.* v. *Trend Micro, Inc.*, Case No. 6:22-cv-00239-ADA-DTG, W.D. Tex., Nov. 1, 2023, 75 pgs.

Defendant's Final Invalidity Contentions, Exhibit 250-A-37, *Webroot, Inc. and Open Text, Inc.* v. *Trend Micro, Inc.*, Case No. 6:22-cv-00239-ADA-DTG, W.D. Tex., Nov. 1, 2023, 40 pgs.

Defendant's Final Invalidity Contentions, Exhibit 250-A-38, *Webroot, Inc. and Open Text, Inc.* v. *Trend Micro, Inc.*, Case No. 6:22-cv-00239-ADA-DTG, W.D. Tex., Nov. 1, 2023, 31 pgs.

Defendant's Final Invalidity Contentions, Exhibit 250-A-39, *Webroot, Inc. and Open Text, Inc.* v. *Trend Micro, Inc.*, Case No. 6:22-cv-00239-ADA-DTG, W.D. Tex., Nov. 1, 2023, 49 pgs.

Defendant's Final Invalidity Contentions, Exhibit 250-A-40, *Webroot, Inc. and Open Text, Inc.* v. *Trend Micro, Inc.*, Case No. 6:22-cv-00239-ADA-DTG, W.D. Tex., Nov. 1, 2023, 50 pgs.

(56) References Cited

OTHER PUBLICATIONS

Defendant's Final Invalidity Contentions, Exhibit 250-A-41, *Webroot, Inc. and Open Text, Inc.* v. *Trend Micro, Inc.*, Case No. 6:22-cv-00239-ADA-DTG, W.D. Tex., Nov. 1, 2023, 40 pgs.

Defendant's Final Invalidity Contentions, Exhibit 250-A-42, *Webroot, Inc. and Open Text, Inc.* v. *Trend Micro, Inc.*, Case No. 6:22-cv-00239-ADA-DTG, W.D. Tex., Nov. 1, 2023, 36 pgs.

Defendant's Final Invalidity Contentions, Exhibit 389-A-13, *Webroot, Inc. and Open Text, Inc.* v. *Trend Micro, Inc.*, Case No. 6:22-cv-00239-ADA-DTG, W.D. Tex., Nov. 1, 2023, 77 pgs.

Defendant's Final Invalidity Contentions, Exhibit 389-A-38, *Webroot, Inc. and Open Text, Inc.* v. *Trend Micro, Inc.*, Case No. 6:22-cv-00239-ADA-DTG, W.D. Tex., Nov. 1, 2023, 37 pgs.

Defendant's Final Invalidity Contentions, Exhibit 389-A-39, *Webroot, Inc. and Open Text, Inc.* v. *Trend Micro, Inc.*, Case No. 6:22-cv-00239-ADA-DTG, W.D. Tex., Nov. 1, 2023, 21 pgs.

Defendant's Final Invalidity Contentions, Exhibit 389-A-40, *Webroot, Inc. and Open Text, Inc.* v. *Trend Micro, Inc.*, Case No. 6:22-cv-00239-ADA-DTG, W.D. Tex., Nov. 1, 2023, 52 pgs.

Defendant's Final Invalidity Contentions, Exhibit 389-A-41, *Webroot, Inc. and Open Text, Inc.* v. *Trend Micro, Inc.*, Case No. 6:22-cv-00239-ADA-DTG, W.D. Tex., Nov. 1, 2023, 42 pgs.

Defendant's Final Invalidity Contentions, Exhibit 389-A-42, *Webroot, Inc. and Open Text, Inc.* v. *Trend Micro, Inc.*, Case No. 6:22-cv-00239-ADA-DTG, W.D. Tex., Nov. 1, 2023, 33 pgs.

Defendant's Final Invalidity Contentions, Exhibit 389-A-43, *Webroot, Inc. and Open Text, Inc.* v. *Trend Micro, Inc.*, Case No. 6:22-cv-00239-ADA-DTG, W.D. Tex., Nov. 1, 2023, 31 pgs.

Defendant Sophos Ltd.'s Final Invalidity Contentions, Exhibit 250-A-18, *Webroot, Inc. and Open Text, Inc.* v. *Sophos Ltd.*, Case No. 6:22-cv-00240-ADA-DTG, W.D. Tex., Nov. 1, 2023, 123 pgs.

Defendant Sophos Ltd.'s Final Invalidity Contentions, Exhibit 250-B, *Webroot, Inc. and Open Text, Inc.* v. *Sophos Ltd.*, Case No. 6:22-cv-00240-ADA-DTG, W.D. Tex., Nov. 1, 2023, 42 pgs.

Defendant Sophos Ltd.'s Final Invalidity Contentions, Exhibit 389-A-21, *Webroot, Inc. and Open Text, Inc.* v. *Sophos Ltd.*, Case No. 6:22-cv-00240-ADA-DTG, W.D. Tex., Nov. 1, 2023, 160 pgs.

Defendant Sophos Ltd.'s Final Invalidity Contentions, Exhibit 389-B, *Webroot, Inc. and Open Text, Inc.* v. *Sophos Ltd.*, Case No. 6:22-cv-00240-ADA-DTG, W.D. Tex., Nov. 1, 2023, 23 pgs.

Defendant Sophos Ltd.'s Final Invalidity Contentions, Exhibit 123-A-1, *Webroot, Inc. and Open Text, Inc.* v. *Sophos Ltd.*, Case No. 6:22-cv-00240-ADA-DTG, W.D. Tex., Nov. 1, 2023, 54 pgs.

Defendant Sophos Ltd.'s Final Invalidity Contentions, Exhibit 123-A-8, *Webroot, Inc. and Open Text, Inc.* v. *Sophos Ltd.*, Case No. 6:22-cv-00240-ADA-DTG, W.D. Tex., Nov. 1, 2023, 252 pgs.

Defendant Sophos Ltd.'s Final Invalidity Contentions, Exhibit 123-B, *Webroot, Inc. and Open Text, Inc.* v. *Sophos Ltd.*, Case No. 6:22-cv-00240-ADA-DTG, W.D. Tex., Nov. 1, 2023, 46 pgs.

Defendant Forcepoint LLC's Final Invalidity Contentions, Exhibit 721-C-1, *Webroot, Inc. and Open Text, Inc.* v. *Forcepoint LLC*, No. 6:22-CV-00342-ADA-DTG (WD, Texas), Nov. 1, 2023, 49 pgs.

Defendant Forcepoint LLC's Final Invalidity Contentions, Exhibit 721-C-2, *Webroot, Inc. and Open Text, Inc.* v. *Forcepoint LLC*, No. 6:22-CV-00342-ADA-DTG (WD, Texas), Nov. 1, 2023, 80 pgs.

Defendant Forcepoint LLC's Final Invalidity Contentions, Exhibit 721-C-3, *Webroot, Inc. and Open Text, Inc.* v. *Forcepoint LLC*, No. 6:22-CV-00342-ADA-DTG (WD, Texas), Nov. 1, 2023, 79 pgs.

Defendant Forcepoint LLC's Final Invalidity Contentions, Exhibit 721-C-4, *Webroot, Inc. and Open Text, Inc.* v. *Forcepoint LLC*, No. 6:22-CV-00342-ADA-DTG (WD, Texas), Nov. 1, 2023, 97 pgs.

Defendant Forcepoint LLC's Final Invalidity Contentions, Exhibit 721-C-5, *Webroot, Inc. and Open Text, Inc.* v. *Forcepoint LLC*, No. 6:22-CV-00342-ADA-DTG (WD, Texas), Nov. 1, 2023, 30 pgs.

Defendant Forcepoint LLC's Final Invalidity Contentions, Exhibit 721-C-6, *Webroot, Inc. and Open Text, Inc.* v. *Forcepoint LLC*, No. 6:22-CV-00342-ADA-DTG (WD, Texas), Nov. 1, 2023, 26 pgs.

Defendant Forcepoint LLC's Final Invalidity Contentions, Exhibit 721-C-7, *Webroot, Inc. and Open Text, Inc.* v. *Forcepoint LLC*, No. 6:22-CV-00342-ADA-DTG (WD, Texas), Nov. 1, 2023, 32 pgs.

Defendant Forcepoint LLC's Final Invalidity Contentions, Exhibit 721-C-8, *Webroot, Inc. and Open Text, Inc.* v. *Forcepoint LLC*, No. 6:22-CV-00342-ADA-DTG (WD, Texas), Nov. 1, 2023, 38 pgs.

Defendant Forcepoint LLC's Final Invalidity Contentions, Exhibit 721-C-9, *Webroot, Inc. and Open Text, Inc.* v. *Forcepoint LLC*, No. 6:22-CV-00342-ADA-DTG (WD, Texas), Nov. 1, 2023, 40 pgs.

Defendant Forcepoint LLC's Final Invalidity Contentions, Exhibit 721-C-10, *Webroot, Inc. and Open Text, Inc.* v. *Forcepoint LLC*, No. 6:22-CV-00342-ADA-DTG (WD, Texas), Nov. 1, 2023, 29 pgs.

Defendant Forcepoint LLC's Final Invalidity Contentions, Exhibit 721-C-11, *Webroot, Inc. and Open Text, Inc.* v. *Forcepoint LLC*, No. 6:22-CV-00342-ADA-DTG (WD, Texas), Nov. 1, 2023, 37 pgs.

Defendant Forcepoint LLC's Final Invalidity Contentions, Exhibit 721-C-12, *Webroot, Inc. and Open Text, Inc.* v. *Forcepoint LLC*, No. 6:22-CV-00342-ADA-DTG (WD, Texas), Nov. 1, 2023, 34 pgs.

Defendant Forcepoint LLC's Final Invalidity Contentions, Exhibit 721-C-13, *Webroot, Inc. and Open Text, Inc.* v. *Forcepoint LLC*, No. 6:22-CV-00342-ADA-DTG (WD, Texas), Nov. 1, 2023, 40 pgs.

Defendant Forcepoint LLC's Final Invalidity Contentions, Exhibit 721-C-14, *Webroot, Inc. and Open Text, Inc.* v. *Forcepoint LLC*, No. 6:22-CV-00342-ADA-DTG (WD, Texas), Nov. 1, 2023, 40 pgs.

Defendant Forcepoint LLC's Final Invalidity Contentions, Exhibit 721-C-15, *Webroot, Inc. and Open Text, Inc.* v. *Forcepoint LLC*, No. 6:22-CV-00342-ADA-DTG (WD, Texas), Nov. 1, 2023, 33 pgs.

Defendant Forcepoint LLC's Final Invalidity Contentions, Exhibit 721-C-16, *Webroot, Inc. and Open Text, Inc.* v. *Forcepoint LLC*, No. 6:22-CV-00342-ADA-DTG (WD, Texas), Nov. 1, 2023, 21 pgs.

Defendant Forcepoint LLC's Final Invalidity Contentions, Exhibit 721-C-17, *Webroot, Inc. and Open Text, Inc.* v. *Forcepoint LLC*, No. 6:22-CV-00342-ADA-DTG (WD, Texas), Nov. 1, 2023, 21 pgs.

Defendant Sophos Ltd.'s Final Invalidity Contentions, Exhibit 721-A-23, *Webroot, Inc. and Open Text, Inc.* v. *Sophos Ltd.*, Case No. 6:22-cv-00240-ADA-DTG, W.D. Tex., Nov. 1, 2023, 88 pgs.

Defendant Sophos Ltd.'s Final Invalidity Contentions, Exhibit 721-B, *Webroot, Inc. and Open Text, Inc.* v. *Sophos Ltd.*, Case No. 6:22-cv-00240-ADA-DTG, W.D. Tex., Nov. 1, 2023, 70 pgs.

Roberts, Paul, "Big Picture Security—A Multiplicity of Threats Yields an Ever- Expanding Variety of Defenses Spewing Gobs of Security Data Security Event," InfoWorld, vol. 26, Issue 44, Nov. 1, 2004, 6 pgs.

Pappas, Vasilis, et al., Transparent ROP Exploit Mitigation Using Indirect Branch Tracing, Proceedings of the 22nd USENIX Security Symposium, Washington, DC, Usenix Association, Columbia University, Aug. 14-16, 2013, pp. 447-462.

Cowan, Crispan, et al., Stackguard: Automatic Adaptive Detection and Prevention of Buffer-Overflow Attacks, 7th USENIX Security Symposium, San Antonio, TX, Usenix Association, Jan. 26-29, 1998, 16 pgs.

Asaka, Midori, et al., Information Gathering with Mobile Agents for an Intrusion Detection System, Systems and Computers in Japan, vol. 30, No. 2, 1999, 7 pgs.

Asaka, Midori, et al., Remote Attack Detection Method in IDA: MLSI-Based Intrusion Detection with Discriminant Analysis, Electronics and Communications in Japan, Part 1, vol. 86, No. 4, 2003, pp. 50-62, Wiley Periodicals, Inc. (translated from Denshi Joho Tshushin Gakki Ronbunshi, vol. J85-B, No. 1, Jan. 2002, pp. 60-74).

Kaplan, Yariv, API Spying Techniques for Windows 9x, NT and 2000, The Wayback Machine at https://web.archive.org/web/20001009011848/http://www.inte . . . , Oct. 9, 2000, 11 pgs.

Kephart, Jeffrey, et al., "An Immune System for Cyberspace," 1997 IEEE Int'l Conf. on Systems, Man, and Cybernetics, Computational Cybernetics and Simulation 1, vol. 1, 1997, pp. 879-884.

King, Samuel, et al., Enriching intrusions alerts through multi-host causality, Proceedings of the Network and Distributed System Security Symposium, 2005, San Diego, California, Jan. 1, 2005, 12 pgs.

Li, Zhenmin, et al., UCLog: A Unified, Correlated Logging Architecture for Intrusion Detection, In'tl Conf. on Telecomm. Sys. Modeling & Analysis, Jan. 2004, 15 pgs.

Lunt, Teresa F., et al., A Real-Time Intrusion-Detection Expert System, SRI International, Menlo Park, CA, Feb. 28, 1992, 166 pgs.

(56) References Cited

OTHER PUBLICATIONS

PrevX Home launches Worlds first free consumer intrusion prevention system, M2 Presswire, M2 Communications Ltd., Jun. 16, 2004, 2 pgs.

PrevX Home v20 Shuts the Door on the Unknown and Unwanted Internet Security Threats Upgrade to First In, Business Wire, Nov. 5, 2004, 2 pgs.

Yu, Dong and Frincke, Deborah, Alert Confidence Fusion in Intrusion Detection Systems with Extended Dempster-Shafer Theory, Proceedings of the 43rd Annual Southeast Regional Conference, vol. 2, 2005, 6 pgs.

Proventia Desktop User Guide, Version 8.0, Internet Security Systems, Inc., Atlanta, GA, Mar. 24, 05, 132 pgs.

Feng, Henry H., et al., "Anomaly Detection Using Call Stack Information," 2003 Symposium on Security and Privacy, Berkeley, CA, 003, pp. 62-75, available at https://ieeexplore.IEEE.org/document/1199328.

Kruegel, Christopher, et al., Bayesian Event Classification for Intrusion Detection, 19th Annual Computer Security Applications Conference 2003, pp. 14-23.

Yurcik, William, et al., UCLog+: A Security Data Management System for Correlating Alerts, Incidents, and Raw Data From Remote Logs, Cornell University, arXiv:cs/0607111, Jul. 25, 2006, 10 pgs.

Publications on Data Mining/Machine Learning on Systems, UCSD Operating Systems Research Group, The Wayback Machine at https://web.archive.org/web/20100907170802/http://opera.ucsd.edu:80/pub_sys mining.html, 1 pg.

Nachenberg, Carey, Behavior Blocking: The Next Step in Anti-Virus Protection, SecurityFocus, at http://ww.securityfocus.com/print/infocus/1557, Mar. 19, 2002, 7 pgs.

Ranum, Marcos J., Tales From The Early Days of the Firewall Presentation, 33 pgs.

Moffie, Micha, and Kaeli, David, "ASM: Application Security Monitor", ACM SIGARCH Computer Architecture News, Dec. 2005, pp. 21-26.

Chari, Suresh N., and Cheng, Pau-Chen, "BlueBox: A policy-driven, host-based intrusion detection system," ACM Transactions on Information and System Security, vol. 6, No. 2, May 2003, pp. 173-200.

Vasudevan, Amit, and Yerraballi, Ramesh, "Spike: Engineering Malware Analysis Tools using Unobtrusive Binary-Instrumentation", Proceedings of the 29th Australasian Computer Science Conference, Tasmania, Australia, vol. 48, Jan. 2006, 10 pgs.

Rabek, Jesse C., et al., "Detection of injected, dynamically generated, and obfuscated malicious code", Proceedings of the 2003 ACM workshop on Rapid Malcode, 2003, pp. 76-82.

Kruegel, Christopher, et al., Intrusion Detection and Correlation: Challenges and Solutions, Springer, ISBN: 978-0-387-23398-7, 2005, 87 pgs.

Pfleeger, Charles P., and Pfleeger, Shari Lawrence, Security in Computing, 4th Edition, Prentice Hall, Jan. 2006, 237 pgs.

Abrams, Lawrence, Using Blacklight to detect and remove Rootkits from your computer, May 18, 2006, F-Secure, 8 pgs.

Adelstein, Frank, Stillerman, Matt, and Kozen, Dexter, Malicious Code Detection for Open Firmware, Proceedings of the 18th Annual Computer Security Applications Conference, IEEE, Jun. 2002, 10 pgs.

Chow, Sherman, et al., A generic anti-spyware solution by access control list at kernel level, The Journal of Systems and Software 75 (www.sciencedirect.com) available Jul. 15, 2004, pp. 227-234.

The Cure—F-Secure Blacklight (Beta Release), Aug. 2, 2005, The Wayback Machine at https://web.archive.org.web/20050802004302/http://www.f-secure.com:80/blacklight/cure.shtml, F-Secure, 2 pgs.

Grizzard, Jullian, On a μ-Kernel Based System Architecture Enabling Recovery from Rootkits, Proceedings of the First IEEE International Workshop on Critical Infrastructure Protection, IEEE, (07695-2426-5/05) Nov. 2005, 9 pgs.

Iglio, Pietro, TrustedBox: a Kernel-Level Integrity Checker, 15th Annual Computer Security Applications Conference, Phoenix, AZ, IEEE, Dec. 6-10, 1999, 20 pgs.

Kruegel, Christopher et al., Detecting Kernel-Level Rootkits Through Binary Analysis, 20th Annual Computer Security Applications Conference, Tucson, AZ, IEEE, Dec. 6-10, 2004, 18 pgs.

Levine, John G., et al., A Methodology to Characterize Kernel Level Rootkit Exploits that Overwrite the System Call Table, IEEE SoutheastCon, 2004, Proceedings., Greensboro, NC, pp. 25-31.

Levine, John, et al., Application of a Methodology to Characterize Rootkits Retrieved from Honeynets, Proceedings of the 2004 IEEE Workshop on Information Assurance, U.S. Military Academy, West Point, NY, Jun. 10-11, 2004, pp. 15-21.

Levine, John G., et al., Detecting and Categorizing Kernel-Level Rootkits to Aid Future Detection, IEEE Security & Privacy, IEEE (www.computer.org/security/), Feb. 2006, pp. 24-32.

Liang, Zhenkai, et al., Isolated Program Execution: An Application Transparent Approach for Executing Untrusted Programs, Proceedings of the 19th Annual Computer Security Applications Conference, 2003, IEEE, 10 pgs.

Mulliner, Collin, et al., Using Labeling to Prevent Cross-Service Attacks Against Smart Phones, 3rd International Conference, Detections of Intrusions and Malware & Vulnerability Assessment, Berlin, Germany, Jul. 13-14, 2006, pp. 91-108.

Munson, John C. and Wimer, Scott, Watcher: The Missing Piece of the Security Puzzle, 17th Annual Computer Security Applications Conference, New Orleans, LA, IEEE, Dec. 10-14, 2001, 17 pgs.

Provos, Niels, Improving Host Security with System Call Policies, Proceedings of the 12th USENIX Security Symposium, The USENIX Association (www.usenix.org), Aug. 4-8, 2003, pp. 257-271.

Quynh, Nguyen Anh, and Takefui, Yoshiyasu, A Real-time Integrity Monitor for Xen Virtual Machine, International Conference on Networking and Services, Jul. 2006, Silicon Valley, CA, IEEE, 20 pgs.

Shi, Weidong, et al., An Intrusion-Tolerant and Self-Recoverable Network Service System Using A Security Enhanced Chip Multiprocessor, Second International Conference on Autonomic Computing, Seattle, WA, IEEE, Jun. 13-16, 2005, 12 pgs.

Wang, Yi-Min, et al., Detecting Stealth Software with Strider GhostBuster, International Conference on Dependable Systems and Networks, Yokohama, Japan, IEEE, 2005, pp. 368-377.

Wright, Chris, et al., Linux Security Modules: General Security Support for the Linux Kernel, 11th USENIX Security Symposium, San Francisco, CA, Aug. 5-9, 2002, 21 pgs.

Xu, Haizhi, Du, Wenliang, and Chapin, Steve J., Detecting Exploit Code Execution in Loadable Kernel Modules, 20th Annual Computer Security Applications Conference, Tucson, AZ, IEEE, Dec. 6-10, 2004, 18 pgs.

Zhou, Jingyu and Vigna, Giovanni, Detecting Attacks That Exploit Application-Logic Errors Through Application-Level Auditing, 20th Annual Computer Security Applications Conference, Tucson, AZ, IEEE, Dec. 6-10, 2004, 19 pgs.

Ren, Jiangchun, Dai, Kui, and Wang, Zhiying, Trust-Enhanced Alteration Scenario For Universal Computer, 11th International Symposium Pacific Rim Dependable Computing, Changsha, Hunan, China, IEEE, Dec. 12-14, 2005, 10 pgs.

Schmid, Matthew, Hill, Frank, and Ghosh, Anup K., Protecting Data from Malicious Software, Proceedings of the 18th Annual Computer Security Applications Conference, IEEE, Dec. 2002, 10 pgs.

Russinovich, Mark, Monitoring Registry Activity During the Boot Process, The Wayback Machine at https://web.archive.org/web/20050622032630/http://www.sysinternals.com . . . , Nov. 2, 1998, 3 pgs.

Russinovich, Mark and Cogswell, Bryce, Regmon for Windows NT/9x, The Wayback Machine at https://web.archive.org/web/20050622023903/http://www.sysinternals.com:80/ . . . , Apr. 7, 2005, 4 pgs.

Intrusion Prevention, Astaro Internet Security, Astaro GmbH & Co. KG, a Sophos company, The Wayback Machine at https://web.archive.org/web/20120406123658/http:/www.astaro.com/solutions/network-security/intrusion-prevention, 2012, 2 pgs.

(56)         References Cited

OTHER PUBLICATIONS

Astaro Security Gateway, Astaro AG, The Wayback Machine at https://web.archive.org/web/20100 208163039/http:/www.astaro.com/, 2010, 2 pgs.

Blue Coat Proxy AV Appliances Overview, 2010, 2 pgs.

Blue Coat WebFilter, Products and Overview, EdgeBlue.com, 2010, 9 pgs.

Blue Coat ProxyAV 210/510/810 Product Sheet, Blue Coat Systems, Inc., www.bluecoat.com, Sunnyvale, CA, 2009, 2 pgs.

Blue Coat WebFilter, Blue Coat Systems, Inc., www.bluecoat.com, Sunnyvale, CA, 2 pgs.

Blue Coat AV Appliances, EdgeBlue.com, The Wayback Machine at https://web.archive.org/web/201005220252442/http://www.edgeblue.com:80/AV-Appliances.asp, 1 pg.

Check Point Anti-Malware & Program Control Software Blade, Benefits, Check Point Software Technologies Ltd. at https://web.archive.org/web/20131231065958/http:/www.checkpoint.com/products/anti-malware-program-control/index.html, 2013, 3 pgs.

Software Blades, Release Notes, R75.20, Check Point Software Technologies Ltd., Oct. 6, 2013, 29 pgs.

Software Blades, SmartEvent R75.40 Administration Guide, Check Point Software Technologies Ltd., Sep. 2, 2013, 78 pgs.

Software Blades, SmartView Monitor R75.40VS Administration Guide, Check Point Software Technologies Ltd., Apr. 16, 2012, 52 pgs.

Software Blades SmartEvent R75 Administration Guide, Check Point Software Technologies Ltd., Dec. 15, 2010, 35 pgs.

Check Point Anti-Spam & Email Security Software Blade Overview, The Wayback Machine at https://web.archive.org/web/20150316022003/http://www.checkpoint.com:80//products/anti-spam-email-security-software-blade/index.html/, Check Point Software Technologies Ltd., 2015, 5 pgs.

Check Point Anti-Bot Software Blade Data Sheet, Check Point Software Technologies Ltd., Apr. 16, 2012, 2 pgs.

Check Point Secure Web Gateway Appliance Benefits, The Wayback Machine at https://web.archive.org/web/20131219213701/http://www.checkpoint.com:80/products/secure-web-gateway/ind . . . , Check Point Software Technologies Ltd., 2013, 5 pgs.

Check Point Threat Prevention Appliance Features, The Wayback Machine—https://web.archive.org/web/20140109004125/http://www.checkpoint.com:80/products/threat-prevention-appliances/index . . . , Check Point Software Technologies Ltd., 2013, 3 pgs.

Check Point URL Filtering Software Blade Overview, The Wayback Machine—https://web.archive.org/web/20150317044930/http://www.checkpoint.com:80/products/url-filtering-software-blade/index.html/, 7 pgs.

Check Point R70.30 Installation and Upgrade Guide, Check Point Software Ltd., Jun. 22, 2010, 27 pgs.

Check Point SmartEvent Software Blade, Benefits, Check Point Software Technologies Ltd., The Wayback Machine at https://web.archive.org/web/20130225182620/http://www.checkpoint.com/products/smartevent-software-blade/index.html?sp_link=1, Feb. 25, 2013, 3 pgs.

Check Point SmartEvent Software Blade, Check Point Software Technologies, Ltd., Apr. 28, 2013, 3 pgs.

CounterTack Announces Sentinel—Expanding the Deep System Inspection Product Portfolio with Production System Monitoring, CounterTack, InkHouse LLC, Feb. 25, 2013, 1 pg.

CounterTack Announces Sentinel—Expanding the Deep System Inspection Product Portfolio with Production System Monitoring, CounterTack, at https://www.globenewswire.com/news-release/2013/02/25/1034553/0/en/CounterTack-Announces-Sentinel.html, 02/25, 2013, 3 pgs.

Machine Learning, Trend Micro Incorporated, undated, 14 pgs.

Cyberoam-Securing You, Cyberoam, a division of Elitecore Technologies Pvt. Ltd., The Wayback Machine, at https://web.archive.org/web/20120425093828 /http://www.cyberoam.com, Apr. 25, 2012, 2 pgs.

Cyberoam Central Console, Cyberoam, a division of Elitecore Technologies Pvt. Ltd., The Wayback Machine at https://web.archive.org/web/20120421122028/http://www.cyberoam.com/ccc.html, Apr. 21, 2012, 2 pgs.

Cyberoam Endpoint Data Protection, Cyberoam, a division of Elitecore Technologies Pvt. Ltd., The Wayback Machine at https://web.archive.org/web/20120428070944/http: //www.cyberoam.com/endpointdataprotection.html, Apr. 28, 2012, 2 pgs.

DeepNines Delivers Solution to Thwart Extortion Demands from Cyber Criminals, Business Wire, The Wayback Machine at https://web.archive.org/web/20031203045510/http://www.deepnines.com/press_releases/pr112003.html, Nov. 20, 2003, 2 pgs.

ArcSight ESM Enterprise Security Manager, ArcSight, Inc., Cupertino, CA, The Wayback Machine at https://web.archive.org/web/20100422041236/http://www. arcsight. com:80/products/products-esm/, Apr. 22, 2010, 2 pgs.

HP Arcsight Express: Powered by the Corr-Engine, HP Enterprise Product Brief, Hewlett-Packard Development Co., LP, The Wayback Machine at https://www.hp.com/hpinfo/newsroom/press_kits/2011/risk2011/HP_ArcSight_Express_Product_Brief.pdf, Aug. 2011, 3 pgs.

Cisco IronPort S-Series Web Security Appliance Security Target, Version 1.0, Cisco IronPort Systems, San Bruno, CA, Oct. 12, 2009, 51 pgs.

Duffy, Jim, Cisco IronPort unveils e-mail security appliances, Channel Strategy, Oct. 9, 2008, 1 pg.

Evers, Joris, IronPort to Rate Web Links in Spam Fight, CNET News.com, Jan. 24, 2006, 11 pgs.

The SenderBase Network Overview, IronPort Systems, Inc., San Bruno, CA, 2006, 3 pgs.

Cisco IronPort Email Security Appliances, Data Sheet, Cisco Systems, Inc., San Jose, CA, #C78-694035-03, copyright 2011-2012, 5 pgs.

McAfee Advanced Threat Defense, Advanced detection for stealthy, zero-day malware, Data Sheet, McAfee, Santa Clara, CA, 2013, 2 pgs.

McAfee Advanced Threat Defense, Next Steps, McAfee, Santa Clara, CA, at https://web.archive.org/web/20150317123246/http://www.mcafee.com:80/products/advanced-threat-defense.aspx, 2015, 2 pgs.

McAfee Advanced Threat Defense, Appliance Hardware Components, Data Sheet, McAfee, Santa Clara, CA, at https://web.archive.org/web/20150317123246/http://www.mcafee.com:80/ products/advanced-threat-defense.aspx, 2015, 2 pgs.

McAfee Content Security Suite, comprehensive email, web, and data security, Data Sheet, McAfee, Santa Clara, CA, 2012, 2 pgs.

Security Target: McAfee Enterprise Security Manager with Event Receiver, Enterprise Log Manager, Advanced Correlation Engine, Application Data Monitor and Database Event Monitor 9.1, Document Version 1.1, McAfee, Santa Clara, CA, Mar. 25, 2013, 36 pgs.

McAfee Enterprise Security Manager Data Sheet, McAfee, Santa Clara, CA, [47101ds_esm_0612_fnl_ETMG], copyright 2012, 2 pgs.

McAfee Global Threat Intelligence for Enterprise Security Manager Data Sheet, McAfee, Santa Clara, CA, [46502ds_gti-esm_0612_ETMG], copyright 2012, 2 pgs.

McAfee SiteAdvisor Plus 2009, DataSheet, McAfee, Santa Clara, CA, copyright 2008, 2 pgs.

Singel, Ryan, McAfee SiteAdvisory Plus Review, Wired Security, Wired.com, Nov. 6, 2006, 9 pgs.

McAfee Web Protection Data Sheet, Web Security your way—SaaS, on premises, or a hybrid combination, McAfee, Santa Clara, CA, [61120ds_web-protection_0514B_ETMG], copyright 2014, 3 pgs.

Enterprise Security and Network Management Software, Product Overview, OpenService, Inc., The Wayback Machine at https://web.archive.org/web/200 61115024535/http://www.openservice.com:80/products/, Nov. 15, 2006, 2 pgs.

Security Management Center, OpenService, Inc., The Wayback Machine at https://web.archive.org/web/20061016130049/http://www.openservice.com/pro ducts/smc.php, Oct. 16, 2006, 2 pgs.

(56)         References Cited

OTHER PUBLICATIONS

NerveCenter Overview, OpenService, Inc., The Wayback Machine at https://web.archive.org/web/20061016124321/http://www.openservice.com/products/nervecenter.php, Oct. 16, 2006, 1 pg.

Prevx1 Product Tour: What is Prevx1?, Prevx, The Wayback Machine at http://web.archive.org/web/20060510191309/http:/info.prevx.com/onetutorial.asp?st=1, May 4, 2006, 1 pgs.

Prevx1 Product Tour: How Does Prevx1 Work?, The Wayback Machine at http://web.archive.org/web/20060510191054/http:/info.prevx.com/onetutorial.asp?st=2, May 10, 2006, 1 pg.

Prevx1 Product Tour: Installation and Setup, The Wayback Machine at http://web.archive.org/web/2006 0510191303/http:/info.prevx.com/onetutorial.asp?st=3, May 4, 2006, 2 pgs.

Prevx1 Product Tour: Community Information, The Wayback Machine at http://web.archive.org/web/ 20061109165542/http:/info.prevx.com/onetutorial.asp?st=11, Nov. 9, 2006, 1 pg.

Prevx1 Product Tour: Prevx1 Console: Program Monitor, The Wayback Machine at http://web.archive.org/web/20060510191339/http:/info.prevx.com/onetutorial.asp?st=6, May 10, 2006, 1 pg.

Prevx1 Product Tour: Prevx1 Console: Jail, The Wayback Machine at http://web.archive.org/web/20060510191327/http:/info.prevx.com/onetutorial.asp?st=5, May 10, 2006, 1 pg.

Prevx1 Product Tour: Prevx1 Console: Advanced Features, The Wayback Machine at http://web.archive.org/web/20060510191345/http:/info.prevx.com/onetutorial.asp?st=7, May 10, 2006, 2 pgs.

Prevx1 Abc, Faq, Prevx, The Wayback Machine at http://web.archive.org/web/20060110161540/http:/individual.prevx.com:80/faq.asp, Jan. 10, 2006, 11 pgs.

Prevx Company Overview, Prevx ltd, copyright 2003, 1 pg.

Prevx Computer Security Investigator—Enterprise, Prevx, https://slideplayer.com/slide/7232158/, undated, 12 pgs.

Jacobson, Emily, Using Dyninst for Program Binary Analysis and Instrumentation, Paradyn/Dyninst Week, Madison, WI, at https://www.paradyn.org/petascale2013/tutorial/Dyninst.pptx, 2013, 35 pgs.

Roundy, Kevin A. and Miller, Barton P., Hybrid Analysis and Control of Malware, University of Wisconsin, Computer Sciences Department, at https://www.paradyn.org/papers/Roundy10Malware.pdf, 2010, 23 pgs.

Stackwalker Source Code at https://github.com/dyninst/dyninst/tree/c4ad1fbc37535b84f83343c9296c2717704264ab/stackwalk, 2 pgs.

OpenText EnCase Endpoint Security Product Overview, OpenText, copyright 2021, 4 pgs.

What is Splunk Enterprise? The Platform for Machine Data, The Wayback Machine at https://web.archive.org/web/20130424224158/http://www.splunk.com/view/splunk/S . . . , 6 pgs.

Splunk 5.0.2 Installation Manual, The Wayback Machine at https://web.archive .org/web/20130306111105/http://docs.splunk.com:80/Documentation/Splunk/latest/Installation/Whatsinthismanual . . . , Mar. 6, 2013, 135 pgs.

Splunk Memory Use Patterns, Splunk Blog Tips & Tricks, The Wayback Machine at https://www.splunk.com/en_us/blog/tips-and-tricks/splunk-memory-use-patterns.html, Feb. 3, 2010, 4 pgs.

Splunk Fact Sheet: Splunk App for Enterprise Security, Splunk, San Francisco, CA, [Item # FS-Splunk-AppEntSec-101], copyright 2012, 2 pgs.

Splunk Enterprise Product Data Sheet: The Platform for Machine Data, Splunk, San Francisco, CA, [Item # DS-Splunk-115], copyright 2012, 2 pgs.

Event Correlation: Move from Search to Operational Intelligence, Splunk Tech Brief, Splunk, San Francisco, CA, copyright 2009, 1 pg.

Splunk for Cisco Security Suite, Fact Sheet, Splunk, San Francisco, CA, [Item # FS-Splunk-Cisco-101], copyright 2012, 2 pgs.

Splunk for Cyber Threat Analysis—A Big Data Approach to Enterprise Security, Solutions Guide, Splunk, San Francisco, CA, [Item # SG-Splunk-Security-106], copyright 2012, 2 pgs.

Splunk for Security, Solutions Guide, Splunk, San Francisco, CA, [Item # SG-Splunk-Security-106], copyright 2012, 2 pgs.

Splunk for Windows—End-to-End Real-time Visibility of Your Windows Environment, Solutions Guide, Splunk, San Francisco, CA, [Item # SG-Splunk-Windows-102], copyright 2012, 2 pgs.

Splunk Forwarders: the Benefits of Deploying Splunk, Tech Brief, Splunk, San Francisco, CA, [ItemTB-Splunk-Forwarder Deployment-101], copyright 2012, 2 pgs.

The Splunk Guide to Operational Intelligence-Turn Machine-generated Data into Real-time Visibility and Insight, Solutions Guide, Splunk, San Francisco, CA, [Item # SG-Splunk-OpIntell-113], copyright 2012, 13 pgs.

Symantec Email Security.cloud, DataSheet: Messaging Security, Symantec, Mountain View, CA, #21290485-2, Jul. 2014, 4 pgs.

Symantec Endpoint Protection 12.1, Data Sheet: Endpoint Security, Symantec, Mountain View, CA, #21194634, Jun. 2011, 5 pgs.

Symantec Endpoint Encryption Policy Administrator Guide Version 11.3.1, Symantec, Mountain View, CA, 197 pgs.

Symantec Endpoint Protection. Cloud, FAQ: Symantec.cloud, Symantec, Mountain View, CA, #125480, Aug. 2012, 4 pgs.

Symantec Endpoint Protection, Data Sheet: Endpoint Security, Symantec, Mountain View, CA, #12516465, May 2007, 4 pgs.

Symantec Endpoint Protection User Manual, Symantec, Mountain View, CA, 7 pgs.

Symantec Security Information Manager, Data Sheet: Compliance and Security Management, Symantec, Mountain View, CA, #12415412-1, May 2008, 8 pgs.

Worry-Free Business Security Services 3.5 Review's Guide, Volume Technical Product Marketing, Trend Micro, Inc., Cupertino, CA, 2010, 110 pgs.

Client Server Security 3 for Small and Medium Business, Administrator's Guide, Trend Micro, Inc., Cupertino, CA, Document Part No. CSEM32492/51028, Nov. 2005, 223 pgs.

Client Server Messaging Security for Small and Medium Business 3, Desktop/Server/Email-SMB, Trend Micro, Inc., Cupertino, CA, #DS05CSMSM03051024US, 2005, 2 pgs.

Client Server Messaging Security 3 for Small and Medium Business, Getting Started Guide, Trend Micro, Inc., Cupertino, CA, Document Part No. CSEM32493/51028, Nov. 2005, 115 pgs.

Client/Server Messaging Suite for Small and Medium Businesses, Administrator's Guide, Trend Micro, Inc., Cupertino, CA, Document Part No. NAEM21620/31003, Nov. 2003, 339 pgs.

Worry-Free Business Security Services for Small Business Security, User's Guide, Trend Micro, Inc., Cupertino, CA, Document Version: 0.3, Sep. 2010, 150 pgs.

Worry-Free Business Security 7 Services Standard and Advanced Editions, Installation Guide, Trend Micro, Inc., Cupertino, CA, Document Part No. WBEM74599/100819, Nov. 2011, 204 pgs.

Worry-Free Business Security Advanced and Standard, Products, Datasheet, Trend Micro Inc., [DS04_WFBS6_10021US], copyright 2010, 2 pgs.

Client Server Security 3 for Small and Medium Business, Administrator's Guide, Trend Micro, Inc., Cupertino, CA, Document Part No. CSEM32494/51028, Nov. 2005, 276 pgs.

Client/Server Suite, Getting Started Guide, Trend Micro, Inc., Cupertino, CA, Document Part No. NJEM01254/20926, Oct. 2002, 61 pgs.

Client/Server Suite for Small and Medium Businesses (SMB), Trend Micro, Inc., [DS01CS_NT20_03112IDE], copyright 2003-2004, 2 pgs.

Enterprise Security for Communication and Collaboration, Datasheet, Trend Micro, Inc., Cupertino, Ca, [DS01_ESCC_121109US], 2012, 3 pgs.

How to Test Outbreak Commander, Testing Guide, Trend Micro, Inc., Cupertino, CA, Aug. 2002, 13 pgs.

Control Manager 3, Installation Guide, Trend Micro Incorporated, Cupertino, CA, Document Part No. CMEM32569/51128, Mar. 2006, 233 pgs.

Control Manager 3, Getting Start Guide, Trend Micro Incorporated, Cupertino, CA, Document Part No. TMEM31864/40414, Apr. 2004, 237 pgs.

Control Manager 2, Getting Start Guide, Trend Micro Incorporated, Cupertino, CA, Item Code CMEM21397/30306, Mar. 2003, 151 pgs.

(56) References Cited

OTHER PUBLICATIONS

Control Manager 5, Administrator's Guide, Trend Micro Incorporated, Cupertino, CA, Document Part No. TMEM53360/70921, Feb. 2008, 476 pgs.

Control Manager 5, Installation Guide, Trend Micro Incorporated, Cupertino, CA, Document Part No. CMEM54524/100720, Mar. 2012, 146 pgs.

Control Manager 6.0, Installation Guide, Trend Micro Incorporated, Cupertino, CA, Document Part No. CMEM65332/120203, Feb. 2013, 136 pgs.

Control Manager 3, Administrator's Guide, Trend Micro Incorporated, Cupertino, CA, Document Part No. CMEM32570/51128, Mar. 2006, 497 pgs.

Oliver, Jon, Is Big Data Enough for Machine Learning in Cybersecurity?, Trend Micro Incorporated, available at https://www.trendmicro.com/vinfo/US/ security/ news/security-technology /is-big-data-big-enough-for-machine- learning-in-cybersecurity, Jul. 19, 2018, 3 pgs.

Machine Learning, What is Machine Learning?, Trend Micro, Incorporated, Cupertino, CA, 8 pgs.

Deep Discovery Analyzer 5.8, Syslog Content Mapping Guide, Trend Micro, Incorporated, Cupertino, CA, Document No. APEM57742/170315, Mar. 2017, 56 pgs.

Deep Discovery Analyzer 6.1, Administrator's Guide, Trend Micro, Incorporated, Cupertino, CA, Document No. APEM68234/180418, Jul. 2018, 276 pgs.

Deep Discovery Analyzer 7.0, Syslog Content Mapping Guide, Trend Micro, Incorporated, Cupertino, CA, Document No. APEM79199_210115, Apr. 2021, 69 pgs.

Deep Discovery Analyzer 7.1, Readme file, Trend Micro, Incorporated, Cupertino, CA, copyright 2021, 5 pgs.

Deep Discovery Analyzer 7.2, Syslog Content Mapping Guide, Trend Micro, Incorporated, Cupertino, CA, Document No. APEM79450_211122, Jun. 2022, 74 pgs.

Deep Discovery Analyzer 1200 Quick Start Card, Trend Micro, Incorporated, Cupertino, CA, Item Code APEQ79153/201119, 2021, 1 pg.

Deep Discovery Analyzer 5.5 SP1, Readme file, Trend Micro, Incorporated, Cupertino, CA, Jun. 2016, 11 pgs.

Deep Discovery Inspector 3.7, User's Guide, Trend Micro, Incorporated, Cupertino, CA, Document No. APEM36464/140618, Jul. 2014, 126 pgs.

Deep Discovery Inspector 3.8, Service Pack 3, Administrator's Guide, Trend Micro, Incorporated, Cupertino, CA, Document No. APEM37418/160627, Jul. 2016, 403 pgs.

Deep Discovery Inspector 4000, Quick Start Card, Trend Micro, Incorporated, Cupertino, CA, Item Code APEQ36484/140710, copyright 2014, 1 pg.

Deep Edge 2.5, Service Pack 2, Administrator's Guide, Trend Micro, Incorporated, Cupertino, CA, Document No. CTEM26692_140930, Nov. 2014, 371 pgs.

Deep Security 7.5, Installation Guide, Trend Micro, Incorporated, Cupertino, CA, Document No. APEM74679/100927, Oct. 2010, 47 pgs.

Deep Security 7.5, Security Target (EAL4+) Revision 1.18, Trend Micro, Inc., Ottawa, Canada, Aug. 2, 2011, 48 pgs.

Deep Security 9, Data Sheet, Trend Micro, Incorporated, Cupertino, CA, [DS01_DeepSecurity9_120812US], copyright 2012, 4 pgs.

Deep Security 9.0, SP1 Administrator's Guide, Trend Micro, Incorporated, Cupertino, CA, Document No. APEM95863/130213, Apr. 2013, 574 pgs.

Deep Security 9.0, SP1 Installation Guide, Trend Micro, Incorporated, Cupertino, CA, Document No. APEM95862/130213, May 2013, 160 pgs.

Deep Security 7.5, Data Sheet, Trend Micro, Incorporated, Cupertino, CA, DS04DeepSecurity7.5_101116US], copyright 2010, 2 pgs.

Deep Security 8.0, Getting Started and Installation Guide, Trend Micro, Incorporated, Cupertino, CA, Document No. APEM85311_120105, Jan. 2012, 156 pgs.

Enterprise Security Suites, Trend Micro Incorporated, The Wayback Machine at https://web.archive .org/web/20130322054951/http://www.trendmicro.com/us/enterprise/security-suite-solutions/index.html, Mar. 22, 2013, 2 pgs.

Enterprise Security for Endpoints, Datasheet, Trend Micro, Inc., Cupertino, CA, [DS02_ESE_100803US], copyright 2010, 2 pgs.

Enterprise Security Suite, Datasheet, Trend Micro, Inc., Cupertino, CA, [DS02_ESS_100830US], copyright 2010, 2 pgs.

Enterprise Security Suite, Datasheet, Trend Micro, Inc., Cupertino, CA, [DS01_ESS_121108US], copyright 2012, 4 pgs.

Solution Brief—Combating New Spam and Social Engineering Attack Methods, Trend Micro Incorporated, Cupertino, CA, copyright 2015, 5 pgs.

Hosted Email Security Datasheet, Trend Micro Inc., Cupertino, CA, [DS02_TMHES_130912US], copyright 2013, 2 pgs.

IM Security for Microsoft Skype for Business 1.6.5, Administrator's Guide, Trend Micro, Inc., Cupertino, CA, Document Part No. TIEM16346/140311, May 2014, 259 pgs.

Trend Micro Earns Patent for Active Content Security Technology, Help Net Security, at https://www.helpnetsecurity.com/2002/04/08/trend-micro-earns-patent-for-active-content-security-technology/, Apr. 8, 2002, 5 pgs.

InterScan Messaging Security Suite 7.5, Administrator's Guide, Trend Micro, Inc., Cupertino, CA, Document Part No. MSEM76206_131030, Feb. 2014, 419 pgs.

InterScan Messaging Security Suite 7.5, Installation Guide for Windows, Trend Micro, Inc., Cupertino, CA, Document Part No. MSEM76207_131030, Feb. 2014, 171 pgs.

InterScan Messaging Security Virtual Appliance 9.0, Installation Guide for Hybrid SaaS Email Security, Trend Micro, Inc., Cupertino, CA, Document Part No. MSEM96477/140707, Oct. 2014, 197 pgs.

InterScan VirusWall 3 for Unix, Administrator's Guide, Trend Micro, Inc., Cupertino, CA, Document Part No. IVEM30728/20916, Sep. 2002, 249 pgs.

InterScan VirusWall 6 for Linux, Reference Manual, Trend Micro, Inc., Cupertino, CA, Document Part No. IVEM62664/60224, Jul. 2006, 102 pgs.

InterScan VirusWall 7 for Small and Medium Businesses for Windows, Administrator's Guide, Trend Micro, Inc., Cupertino, CA, Document Part No. IVEM74091/90513, Jul. 2009, 499 pgs.

InterScan VirusWall 7 for Small and Medium Businesses for Windows, Quick Start Guide, Trend Micro, Inc., Cupertino, CA, Document Part No. IVEM74092/90513, Jul. 2009, 95 pgs.

Interscan Web Security, Overview, Trend Micro, Inc., Cupertino, CA, [OV01_IWS_Overview_140411US], copyright 2014, 3 pgs.

NeatSuite Standard 1 for Medium Business, Getting Started Guide, Trend Micro, Inc., Cupertino, CA, Document Part No. NSEM13111/70302, Jul. 2007, 60 pgs.

NeatSuite for SMB, Datasheet, Trend Micro, Inc., Cupertino, CA, [DS05NSSMB_080407US] copyright 2008, 2 pgs.

NeatSuite Advanced, Datasheet, Trend Micro, Inc., Cupertino, CA, [DS12NSAdv_080305US] copyright 2008, 2 pgs.

NeatSuite Standard, Datasheet, Trend Micro, Inc., Cupertino, CA, [DS09NSStd_070627US], copyright 2007, 2 pgs.

NeatSuite Advanced, Datasheet, Trend Micro, Inc., Europe, [DS11NSAdv_070629GB], copyright 2007, 2 pgs.

NeatSuite Advanced, Datasheet, Trend Micro, Inc., Cupertino, CA, [DS14NSAdv_090513US], copyright 2009, 2 pgs.

NeaTSuite for Microsoft Windows NT and Lotus Notes, Datasheet, Trend Micro, Inc., Cupertino, CA, copyright 2002, 2 pgs.

NeatSuite for SMB 3.5, Datasheet, Trend Micro, Inc., Cupertino, CA, [DS02_NS35_070118US], copyright 2007, 2 pgs.

Security 2.0 for MAC, Administrator's Guide, Trend Micro, Inc., Cupertino, CA, Document Part No. TSEM25920/130401, Jun. 2013, 144 pgs.

Security 1 for MAC, Administrator's Guide, Trend Micro, Inc., Cupertino, CA, Document Part No. TSEM14893/110621, Aug. 2012, 111 pgs.

Security 1 for Enterprise and Medium Business, MAC, Administrator's Guide, Trend Micro, Inc., Cupertino, CA, Document Part No. TSEM14307/90916, Sep. 2009, 116 pgs.

(56) References Cited

OTHER PUBLICATIONS

ServerProtect for Microsoft Windows and Novell Netware, Datasheet, Trend Micro, Inc., Cupertino, CA, [DS02_SP_MSNT090922US], copyright 2009, 2 pgs.

ServerProtect for EMC Celerra Filers, Getting Started Guide, Trend Micro, Inc., Cupertino, CA, Document Part No. SPEM51694/31205, Dec. 2003, 19 pgs.

ServerProtect 5.3 for Network Appliance Filers, Evaluation Guide, Trend Micro, Inc., Cupertino, CA, Aug. 2001, 20 pgs.

Whitepaper: Ensuring Data Integrity with Trend Micro ServerProtect for Network Appliance filers, Trend Micro, Inc., Cupertino, CA, Aug. 2001, 12 pgs.

ServerProtect 5 for Windows NT/NetWare, Getting Started Guide, Trend Micro, Inc., Cupertino, CA, Document Part No. SPEM51426/30407, Apr. 2003, 149 pgs.

ServerProtect 2 for Linux, Getting Started Guide, Trend Micro, Inc., Cupertino, CA, Document Part No. SPEM22345/50715, Apr. 2006, 176 pgs.

ServerProtect 5.8 for Microsoft Windows and Novell Netware, Getting Started Guide (Patch 3), Trend Micro, Inc., Cupertino, CA, Document Part No. SPEM56439/140521, Feb. 2022, 180 pgs.

ServerProtect 5 for NetApp, Getting Started Guide (Patch 3), Trend Micro, Inc., Cupertino, CA, Document Part No. SPEM54352/91119, Mar. 2011, 172 pgs.

ServerProtect 5 for Microsoft Windows Server/Novell Netware, Getting Started Guide, Trend Micro, Inc., Cupertino, CA, Document Part No. SPEM51426/30407, Jul. 2009, 170 pgs.

ServerProtect for Network Appliance Filers, Datasheet, Trend Micro, Inc., Buckinghamshire, England, [DS01SPNA561040420GB], copyright 2002-2004, 2 pgs.

InterScan Messaging Security Datasheet, Trend Micro, Inc., Cupertino, CA, [DS01_IMS_C&C_130619US], copyright 2013, 4 pgs.

Smart Protection Server 2.5, Administrator's Guide, Trend Micro Inc., Cupertino, CA, Document Part No. APEM84993/110727, Jul. 2011, 86 pgs.

Rashid, Fahmida Y., Trend Micro Enhances Cloud-security Infrastructure with Big Data Analytics, SecurityWeek, at https://www.securityweek.com/trend-micro-enhances-cloud-security-infrastructure-big-data-analyticsm, Aug. 7, 2012, 6 pgs.

Hoffman, Stefanie, Trend Micro Releases New 'Smart Protection Network', CRN Magazine, at https://www.crn.com/news/security/208700393/trend-micro-releases-new-smart-protection-network.htm, Jun. 18, 2008, 3 pgs.

Smart Protection Server 2.6, Administrator's Guide, Trend Micro Inc., Cupertino, CA, Document Part No. APEM26465/120620, Apr. 2013, 86 pgs.

Smart Protection Server 3.0, Administrator's Guide, Trend Micro Inc., Cupertino, CA, Document Part No. APEM36294/140116, Mar. 2014, 98 pgs.

Threat Management System, What it Does, Trend Micro, Inc., The Wayback Machine at https://web.archive.org/web/20120129041740/http://www.trendmicro.com:80/us/enterprise/security-management/threat-management-services/index.html, 2012, 2 pgs.

White Paper: Kolodgy, Charles J., Network Security Overwatch Layer: Smarter Protection for the Enterprise, IDC, Framingham, MA, Nov. 2009, 8 pgs.

Smart Protection Network Datasheet, Trend Micro, Inc., Cupertino, CA, copyright 2010, 2 pgs.

Security Threat Assessment, Datasheet, Trend Micro, Inc., Cupertino, CA, [DS02_TMS_Assessment091007US], copyright 2009, 4 pgs.

Threat Management System, Datasheet, Trend Micro, Inc., Cupertino, CA, [DS01_TMS_110523US], copyright 2011, 2 pgs.

White Paper: Trend Micro Smart Protection Network—Security Made Smarter, Trend Micro, Inc., Cupertino, CA, at https://web.

archive.org/web/2012012 9041740/http://www.trendmicro.com:80/US/enterprise/security- management/threat-management-services/index.html, Jun. 2010, 15 pgs.

Worry-Free Business Security 7, Standard and Advanced Editions, Installation Guide, Trend Micro Inc., Cupertino, CA, Document Part No. WBEM74599/100819, Oct. 2010, 192 pgs.

Worry-Free Business Security 9, Standard and Advanced Editions, Service Pack 1, Administrator's Guide, Trend Micro Inc., Cupertino, CA, Document Part No. WFEM96626/140825, Sep. 2014, 400 pgs.

BrightCloud, End Point Security Application Integration, The Wayback Machine at http://web.archive.org/web/20070505030946/http://www.brightcloud.com:80/endpointsecurity.asp, May 5, 2007, 2 pgs.

BrightCloud Master URL Database Overview, The Wayback Machine at http://web.archive.org/web/20070508223909/http://www.brightcloud.com:80/endpointsecurity.asp, May 8, 2007, 2 pgs.

Webroot BrightCloud Overview, The Wayback Machine at https://web.archive.org/web/20130423211117/http://brightcloud.com/resourcecenter/technology.php, Apr. 23, 2013, 1 pg.

BrightCloud Streaming Malware Detection, Datasheet, OpenText, DS_073120, copyright 2020, 2 pgs.

BrightCloud File Reputation Service, Datasheet, Webroot Inc., Broomfield, CO, Feb. 2014, 2 pgs.

BrightCloud File Reputation Service, Datasheet, Open Text, DS_070620, copyright 2020, 2 pgs.

BrightCloud IP Reputation Service, Datasheet, Webroot Inc., Broomfield, CO, Feb. 2014, 2 pgs.

BrightCloud Real-Time Anti-Phishing Service, Datasheet, Webroot Inc., Broomfield, CO, Feb. 2014, 2 pgs.

Whitepaper: BrightCloud Real-Time Anti-Phishing Service, Webroot Inc., Broomfield, CO, Feb. 2014, 4 pgs.

BrightCloud Web Classification Service, Datasheet, Webroot Inc., Broomfield, CO, Feb. 2014, 2 pgs.

BrightCloud Web Reputation Service, Datasheet, Webroot Inc., Broomfield, CO, Feb. 2014, 2 pgs.

SecureAnywhere Business—Endpoint Protection: Reduced Endpoint Scan Times, Webroot Inc., The Wayback Machine at https://web.archive.org/web/20121104163529/http://www.webroot.com:80/En_US/business/secureanywher eendpoint/performance-productivity/scans, Nov. 2012, 3 pgs.

Webroot Intelligence Network, Webroot Inc., The Wayback Machine at https://web.archive.org/web/20130228175825/http://www.webroot.com/En_US/business/resources/WSAEP_DS_Win.html, Feb. 2013, 3 pgs.

Webroot Security Intelligence for Networks Suite, The Wayback Machine at https://web.archive.org/web/20130316085428/http://www.webroot.com/En_US/business/security-solutions/security-intelligence-network-suite, Mar. 2013, 3 pgs.

Webroot Intelligence Network, The Wayback Machine at https://web.archive.org/web/20130424014346/http://brightcloud.com/toc/index.php, Apr. 2013, 1 pg.

SecureAnywhere—Endpoint Protection, The Wayback Machine at https://web.archive.org/web/20120410105149/http://www.webroot.com/En_US/business-products-secureanywhere-endpoint.html, 2012, 2 pgs.

Kovalev, Timur and Niller, Darren, Mobile App Reputation, a Webroot Security Intelligence Service, Webroot Inc., Broomfield, CO, Apr. 2013, 9 pgs.

Webroot SecureAnywhere—Endpoint Protection, Administrator Guide, Downloading and Forcing Updates, at https://docs.webroot.com/us/en/business/wsab_endpointprotection_adminguide/Content/ManagingEndpoints/Downloa dingAndForcingUpdates.htm, 4 pgs.

Webroot SecureAnywhere BusinessEndpoint Protection, Datasheet, Webroot Inc., Broomfield, CO, DS_051917_US, copyright 2017, 4 pgs.

Webroot SecureAnywhere, User Guide for the Complete Edition, Version 8.0.1, Webroot Inc., Broomfield, CO, May 2012, 144 pgs.

* cited by examiner

DETERMINING EXPLOIT PREVENTION USING MACHINE LEARNING

CROSS-REFERENCE TO RELATED APPLICATION(S)

This application is a continuation of, and claims a benefit of priority under 35 U.S.C. 120 from, U.S. patent application Ser. No. 15/952,656, filed Apr. 13, 2018, issued as U.S. Pat. No. 11,159,553, entitled "DETERMINING EXPLOIT PRE-VENTION USING MACHINE LEARNING," issued as U.S. Pat. No. 11,159,553, which is fully incorporated by reference herein for all purposes.

BACKGROUND

Exploit prevention software occupies a critical role in detecting malware and thwarting malware from compromising processes executing in computing environments. However, many processes are not easily protected from malware. For example, some processes may crash immediately or become unstable over time when exploit prevention software is implemented. To mitigate these scenarios, exploit prevention software must be specifically configured with settings for each of the affected processes. However, such configurations are time consuming and are prone to human error.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for determining exploit prevention software settings using machine learning. In aspects, exploit prevention software may be used to identify processes executing on a computing device. Metadata for the identified processes may be determined and transmitted to a machine learning system. The machine learning system may use an exploit prevention model to determine exploit prevention configuration settings for each of the processes, and may transmit the configuration setting to the computing device. The computing device may implement the configuration settings to protect the processes and monitor the stability of the protected processes as they execute. The computing device may transmit the stability data to the machine-learning system. The machine-learning system may then modify the exploit prevention model based on the stability data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
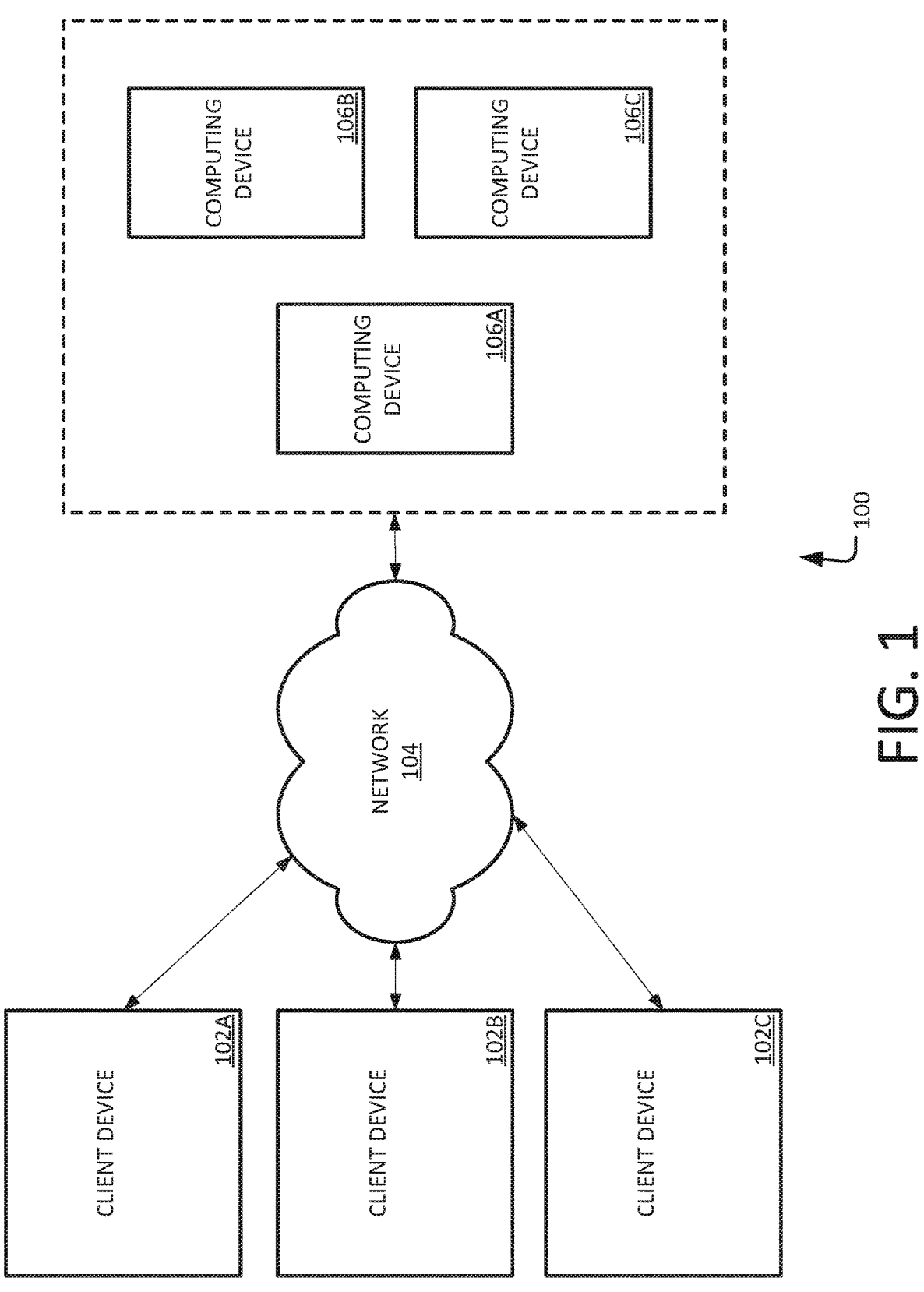
FIG. 1 illustrates an overview of an example system for determining exploit prevention software settings using machine learning as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Given the torrid pace of technological advances in computing and the continued expansion of Internet of Things (IOT) devices, exploit prevention is an ever-present consideration. For many IoT devices, conventional exploit prevention software is implemented to detect and monitor active computer processes. However, the exploit prevention software is not always compatible with the computer processes it is attempting to protect. For example, after the exploit prevention software is applied to a system, many processes may crash immediately or become unstable over time. Generally, in response, an update or patch will be applied to the exploit prevention software, or an Administrator will repeatedly adjust (tweak) the configuration setting for the exploit prevention software. Neither of these responses is adequate, as the former is often untimely and inflexibly applied, and the latter is time consuming and prone to suboptimal correlations/analysis. As a result, exploit prevention software is often unused, disabled, or removed.

To address these problems with conventional systems, the present disclosure describes systems and methods for determining exploit prevention software settings using machine learning. In aspects, exploit prevention software may be implemented on or across one or more computing devices. The exploit prevention software may be used to identify processes executing on a computing device. Process metadata for at least a portion of the identified processes may be determined and transmitted to a machine learning system or platform. Process metadata, as used herein, may refer to, for example, process name and/or identifier, methods and/or functions used by a process, objects used during execution of the process, and the like. The machine learning system may use one or more exploit evaluation models to determine exploit prevention configuration settings for each of the identified processes. A model, as used herein, may refer to a predictive or statistical model that may be used to determine a probability distribution over one or more character sequences, classes, objects, result sets or events, and/or to predict a response value from one or more predictors. A model may be a rule-based model, a machine learning regressor, a machine-learning classifier, a neural network, or the like. In aspects, the exploit evaluation model may compare the process metadata against cached process information or a list of known or suspected process values. If a match is determined, the configuration settings corresponding to the matched data may be selected or identified. Alternately, the exploit evaluation model may evaluate the process metadata using fuzzy logic or one or more heuristics to determine the most relevant configuration settings.

The machine learning system may transmit identified configuration settings for the processes to the computing device. The computing device may implement the received configuration settings for the processes into the exploit prevention software to provide protection for the processes. Implementing the configuration settings may comprise updating one or more setting, installing an update, installing a new application/service, incorporating or training a model, or the like. After the configuration settings have been applied, the computing device may monitor the stability of the protected processes as they execute. Monitoring the stability may include collecting system statistics, process/application metrics, evaluating system and process logs, identifying process metadata, etc. The computing device may store the stability data locally and/or transmit the stability data to the machine-learning system. The machine-learning system may then use the stability data to train the exploit prevention model, generate a new exploit prevention model, or otherwise modify exploit prevention techniques. The exploit prevention model, thus, provides for the dynamic, intelligent, and timely configuration of exploit prevention software.

Accordingly, the present disclosure provides a plurality of technical benefits including but not limited to: increasing system stability through the use of optimized exploitation prevention settings; increasing the compatibility of exploit prevention software and computing systems; increasing the effectiveness of exploit prevention software using process stability feedback loop; decreasing the time to identify/generate exploit prevention configuration setting for a process; and generating and implementing process-specific exploit prevention, among other examples.

FIG. 1 illustrates an overview of an example system for determining exploit prevention software settings using machine learning, as described herein. Example system 100 presented is a combination of interdependent components that interact to form an integrated whole for monitoring the security privileges of a process. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smart-phone/phone, tablet, laptop, personal digital assistant (PDA), etc.) and/or any other electronic devices. As an example of a processing device operating environment, refer to the example operating environments depicted in FIG. 5. In other examples, the components of systems disclosed herein may be spread across multiple devices. For instance, input may be entered or detected on a client device and information may be processed or accessed from other devices in a network, such as one or more server devices.

As one example, the system 100 comprises client devices 102A-C, distributed network 104, and a distributed server environment comprising computing devices 106A-C. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client devices 102A-C may individually incorporate or have access to exploit prevention software. The exploit prevention software may be installed on each of client devices 102A-C, or aspects of the exploit prevention software may be distributed across one or more of client devices 102A-C. The exploit prevention software may be configured to provide multi-vector protection and threat intelligence services for endpoints and networks by detecting, monitoring, preventing, and/or mitigating malware attacks and suspected threats. In examples, the exploit prevention software may identify, or facilitate the identification of, a list of processes executing on a computing device. Processes may be identified and/or recorded using any known process identifying or process management techniques. Process metadata for at least a portion of the identified processes may also be identified and/or collected. The process metadata may include data, such as sections of a file, resources accessed by the process, strings used in (or output by) the process, objects used during execution of the process, etc. In some aspects, the exploit prevention software may use at least a portion of the process metadata to create an identifier for the corresponding process or an associated executable file. In at least one example, creating the identifier may comprise using one or more cryptographic algorithms to generate a hash value. The hash value may increase the security of the process metadata by, for example, preventing clear text process data and metadata from being exposed to third parties. The process identifier and/or the process metadata may be transmitted by one or more of client devices 102A-C to a machine learning system.

Server devices 106A-C may incorporate or have access to a machine learning system. In aspects, a machine learning system may be installed on each of server devices 106A-C, or aspects of the machine learning system may be distributed across one or more of server devices 106A-C. The machine learning system may be configured to evaluate and determine exploit prevention techniques for processes executing on one or more client device. The machine learning system may have access to one or more statistical and/or predictive models for determining exploit prevention configuration settings for identified processes. In examples, the machine learning system may receive process identifiers and/or the process metadata from client devices, such as client devices 102A-C. Server devices 106A-C may provide the process identifiers and/or the process metadata as input to the machine learning system. The machine learning system may engage the model to generate configuration settings for processes corresponding to the process identifiers and/or the process metadata. Generating the configuration setting may include using one or more rule sets, evaluating one or more lists (e.g., a whitelist, blacklist, greylist, etc.), applying one or more sets of exploitation heuristics, or the like. Server devices 106A-C may transmit the generated configuration settings to the client device(s) that provided the process identifiers and/or the process metadata.

Client devices 102A-C may be further configured to implement exploit prevention configuration settings received from the machine learning system. In aspects, a client device may receive exploit prevention configuration settings for various processes executing on the client device. The client device may implement the exploit prevention configuration settings for one or more of the indicated processes. Implementing the exploit prevention configuration settings may comprise restarting the system or the corresponding process/application/service, installing an update or patch, modifying a set of configuration settings, or the like. After the exploit prevention configuration settings have been implemented on the client device, the client device may monitor the affected processes. Monitoring the affected processes may comprise collecting stability statistics for the client device system, collecting stability statistics for the individual processes, evaluating process statuses, evaluating log data, evaluating various checkpoints in the executing code, detecting one or more system or network events, etc. In some aspects, the client device may transmit at least a portion of the monitored data to the machine learning system. In at least one aspect, the client device may hash or otherwise encode the data (as previously described) prior to transmitting the monitored data to the machine learning system.

Server devices 106A-C may be further configured to use monitored data from a client device to adjust the machine learning system. In aspects, a server device may receive monitored data from a client device. The server device may analyze the data to identify at least stability statistics and metadata for one or more processes. The server device may use the stability statistics and metadata to adjust the machine learning system and/or one or more models associated with the machine learning system. The updated machine learning system may then be used subsequently when the server device receives process identifiers and/or the process metadata from a client device. Thus, server devices 106A-C and client devices 102A-C benefit from a feedback loop of client-based stability metrics and machine learning system adjustments.

Figure 2:
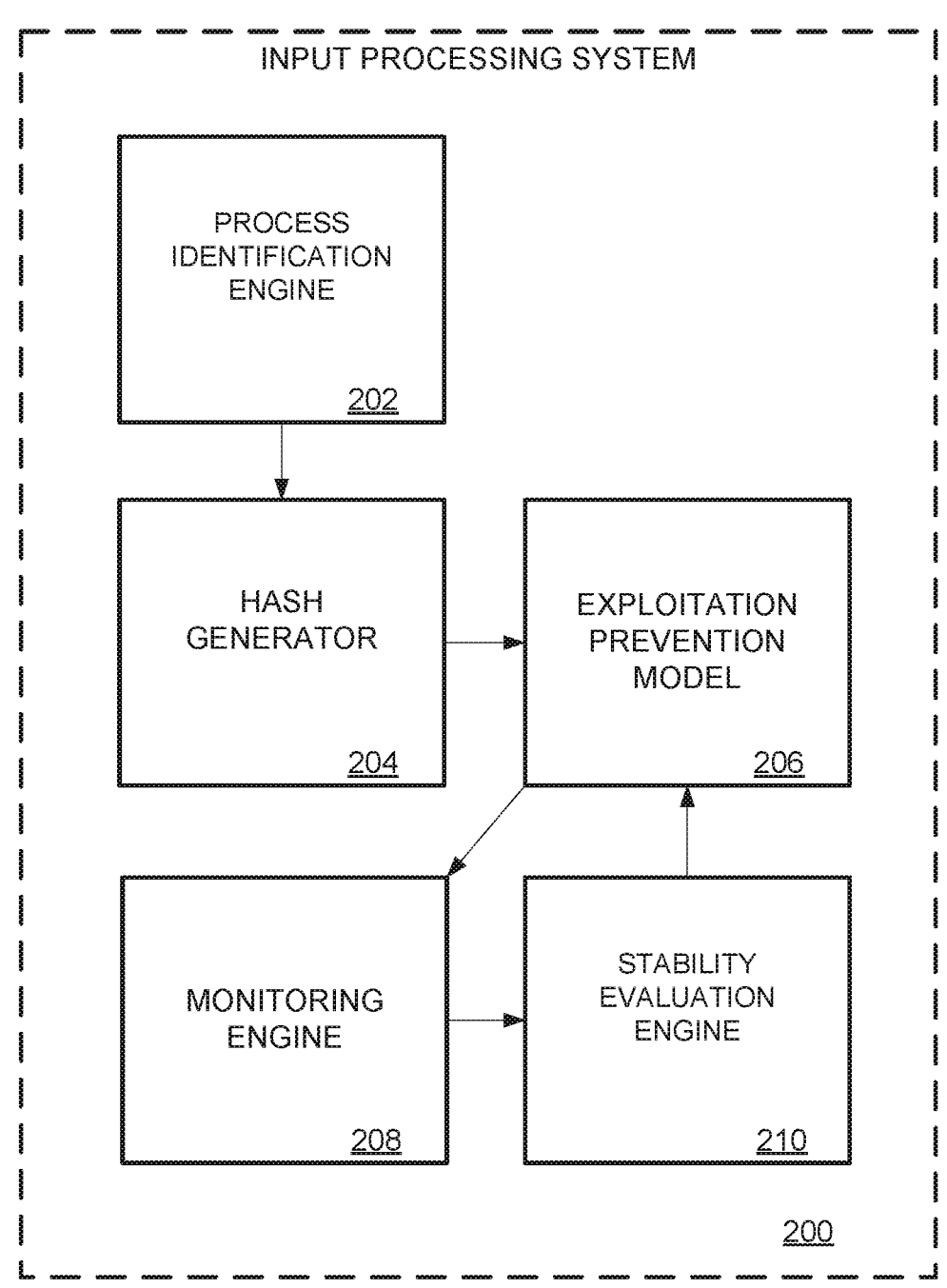
FIG. 2 illustrates an exemplary input processing system for determining exploit prevention software settings using machine learning as described herein.

FIG. 2 illustrates an overview of an exemplary input system unit 200 for determining exploit prevention software settings using machine learning, as described herein. The exploit prevention techniques implemented by input processing system 200 may comprise the processing techniques and content described in FIG. 1. In alternative examples, a distributed system (comprising one or more components such as processor and/or memory) may perform the processing described in system 200.

With respect to FIG. 2, input processing system 200 may comprise process identification engine 202, hash generator 204, exploitation prevention model 206, monitoring engine 208, and stability evaluation engine 210. Identification engine 202 may be configured to identify executing process and/or process metadata associated therewith. In aspects, process identification engine 202 may have access to process information one or more computing devices. Identification engine 202 may evaluate the process information to determine, for example, currently executing processes, processes created and/or terminated over a particular time period, process states, process metadata, etc. Evaluating the process information may include the use of any known process identifying or process management techniques. In some examples, process identification engine 202 may arrange or prioritize the process information according to one or more criteria. For example, the process information may be arranged by the application/service that created the process, a process priority value, process resource allocation or usage, process identifier, a security value, process runtime or projected runtime, etc. Identification engine 202 may collect and/or record the process information in an accessible storage location.

Hash generator 204 may be configured to generate one or more values from the process information. In aspects, hash generator 204 may have access to process information collected/identified by identification engine 202. Hash generator 204 may apply one or more algorithms, functions, or rule sets to the process information (or to a file corresponding to the process information) to secure and/or obfuscate the process information. For example, hash generator 204 may apply a cryptographic hash function to the process information, such as MD5, SHA-1, SHA-2, SHA-3, etc. The cryptographic hash function may output one or more hash values (hashes) or digests. The hashes may comprise or represent data, such as file sections, resources accessed by the process, strings used in (or output by) the process, objects used during execution of the process, etc. Hash generator 204 may store the hashes and/or provide the hashes to a machine learning component, such as exploitation prevention model 206.

Exploitation prevention model 206 may be configured to evaluate and determine exploit prevention techniques for one or more processes. In aspects, exploitation prevention model 206 may receive one or more hashes or digests as input. In some such aspects, exploitation prevention model 206 may evaluate the hashes to identify one or more processes. Identifying the processes may comprise applying a data parsing utility to the hashes in order to identify process identifiers and corresponding process information. In alternate aspects, exploitation prevention model 206 may simply identify a hash identifier for the hashes. For each identified process, process identifier, and/or hash identifier, exploitation prevention model 206 may attempt to determine exploitation prevention configuration settings. In some aspects, determining exploitation prevention configuration settings may comprise comparing the identified process, process identifier, and/or hash identifier to one or more data sources. Examples of data sources may include exploit prevention software/services, "whitelists" of known safe processes/configuration settings, "blacklists" of known or suspected unsafe processes/configuration settings, virus definitions, and the like. The data sources may comprise known or previously evaluated process identifiers (e.g., process name, process identifier, hash identifier, etc.) and one or more sets of corresponding configuration settings. In at least one aspect, the data sources may comprise one or more configuration settings for each process. For example, for a single process, a data source may comprise multiple configuration settings relating to various levels of security, stability, efficiency, resource utilization, or the like. Comparing a received hash information (e.g., identified process, process identifier, and/or hash identifier) to the process identifiers in a data source may comprise using pattern matching techniques, fuzzy logic, or one or more rule sets. When a match (or an approximate match) is indicated by the comparison, exploitation prevention model 206 may automatically select a set of configuration settings based on one or more predefined criteria. Alternately, exploitation prevention model 206 may provide a list of available configuration setting to a user via a user interface. The user interface may enable the user to select or otherwise indicate a configuration setting for a process. Exploitation prevention model 206 may provide one or more configuration settings to a monitoring component, such as monitoring engine 208.

Monitoring engine 208 may be configured to monitor processes as the processes are executing. In aspects, monitoring engine 208 may have access to the configuration settings determined by exploitation prevention model 206. Monitoring engine 208 may apply one or more of the configuration settings to the computing device(s) executing the processes corresponding to the configuration settings. Alternately, one or more separate components of input processing system 200 may apply at least a portion of the configuration settings to the computing device(s) executing the processes corresponding to the configuration settings. In examples, applying the exploitation prevention configuration settings may comprise restarting the system, restarting the computing device(s), restarting one or more processes, applications or services, downloading/installing an update or patch, modifying a set of configuration settings, or the like. After configuration settings have been applied to one or more processes, monitoring engine 208 may monitor the processes. Monitoring the processes may comprise collecting system/process statistics for input processing system 200, collecting statistics for the individual processes, evaluating process statuses, evaluating process and event log data, evaluating various checkpoints in the executing code (via, for example, a debugging utility), etc. In examples, the statistics and information monitored by monitoring engine 208 may be predefined by a user or configuration file or determined dynamically by monitoring engine 208. Moreover, the statistics and information monitored by monitoring engine 208 may be different for one or more processes. In aspects, after a period of monitoring, at least a portion of the monitored statistics may be collected and/or provided to a process stability evaluation component, such as stability evaluation engine 210.

Stability evaluation engine 210 may be configured to evaluate the stability of one or more processes. In aspects, stability evaluation engine 210 may have access to a set of monitored process data. Stability evaluation engine 210 may evaluate the monitored process data to determine the stability of one or more processes. Evaluating the monitored process data may comprise analyzing aspects of the system performance of input processing system 200, such as overall system health and stability, process health and stability, resource utilization, system and application/service processing speed, task performance quality and completion statistics, system and process security, etc. For example, stability evaluation engine 210 may compare a set of process stability data (e.g., average process runtimes, number of process crashes, number of reported errors/exceptions, process exit values, etc.) to a previously collected set of process stability data to determine whether processes (or the system) have become more or less stable. Based on the evaluation of the monitored process data, stability evaluation engine 210 may generate scores, metrics, or labels for one or more process configuration settings. The scores, metrics, or labels may indicate a level of stability, priority, or recency for a process configuration setting. For instance, a process configuration setting may be assigned a label of "stable" or may receive a stability score of 4.8 out of 5.

Stability evaluation engine 210 may be further configured to cause exploitation prevention model 206 to be adjusted. In aspects, stability evaluation engine 210 may provide labeled or unlabeled process data and/or process configuration settings as input to exploitation prevention model 206. Exploitation prevention model 206 may be trained or adjusted using the received data. For example, exploitation prevention model 206 may have access to a set of historical process stability statistics/metrics/labels and/or process configuration settings. Exploitation prevention model 206 may evaluate recently received process data against the historical data to determine whether to implement or incorporate a new set of process configuration settings. In some aspects, when exploitation prevention model 206 is updated or adjusted, an updated set of process configuration settings is provided to monitoring engine 208. The process of monitoring the processes associated with updated process configuration settings, and stability evaluation using stability evaluation engine 210 may continue until one or more processes is stable or the process terminates.

Figure 3:
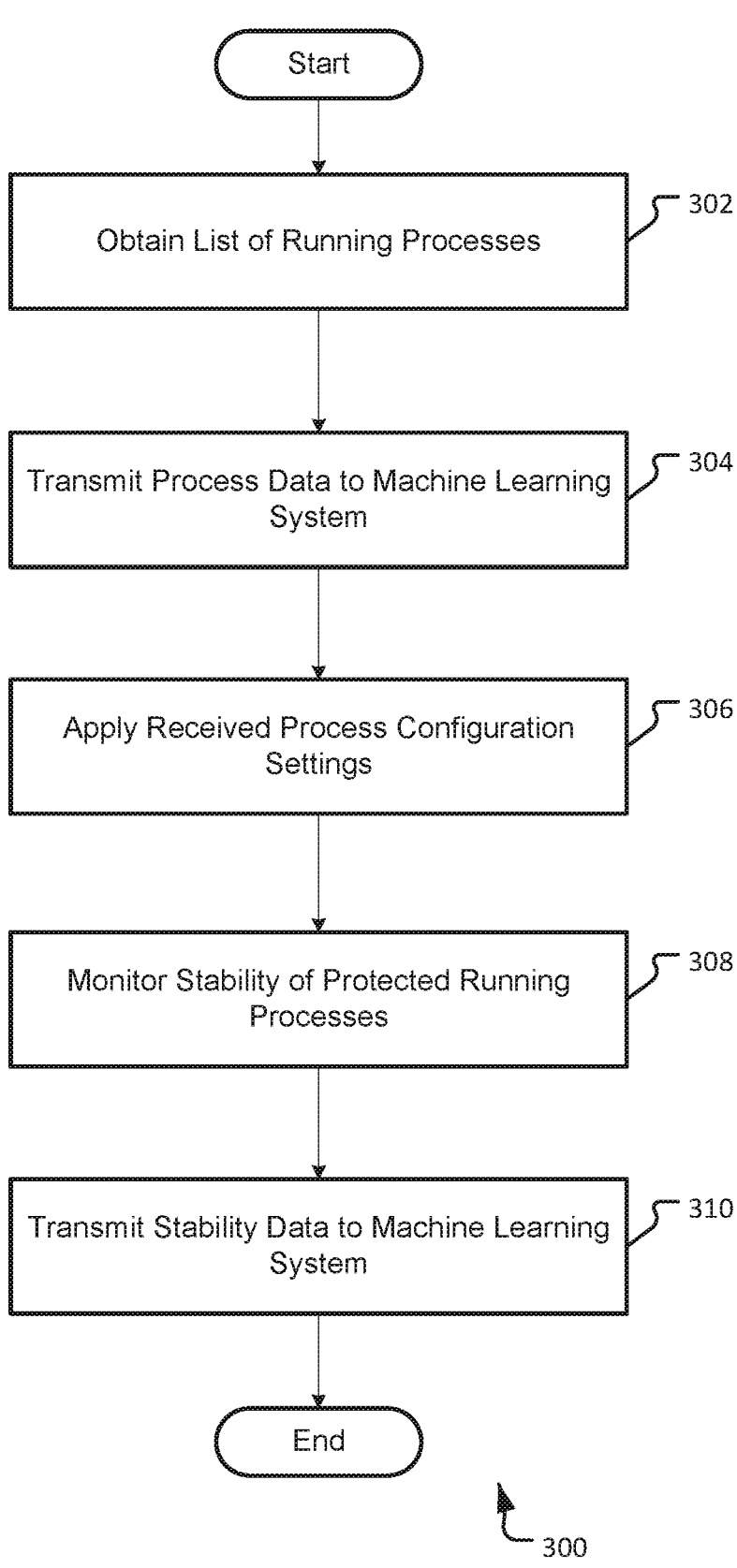
FIG. 3 illustrates an example method for implementing and monitoring exploit prevention software settings as described herein.
Figure 4:
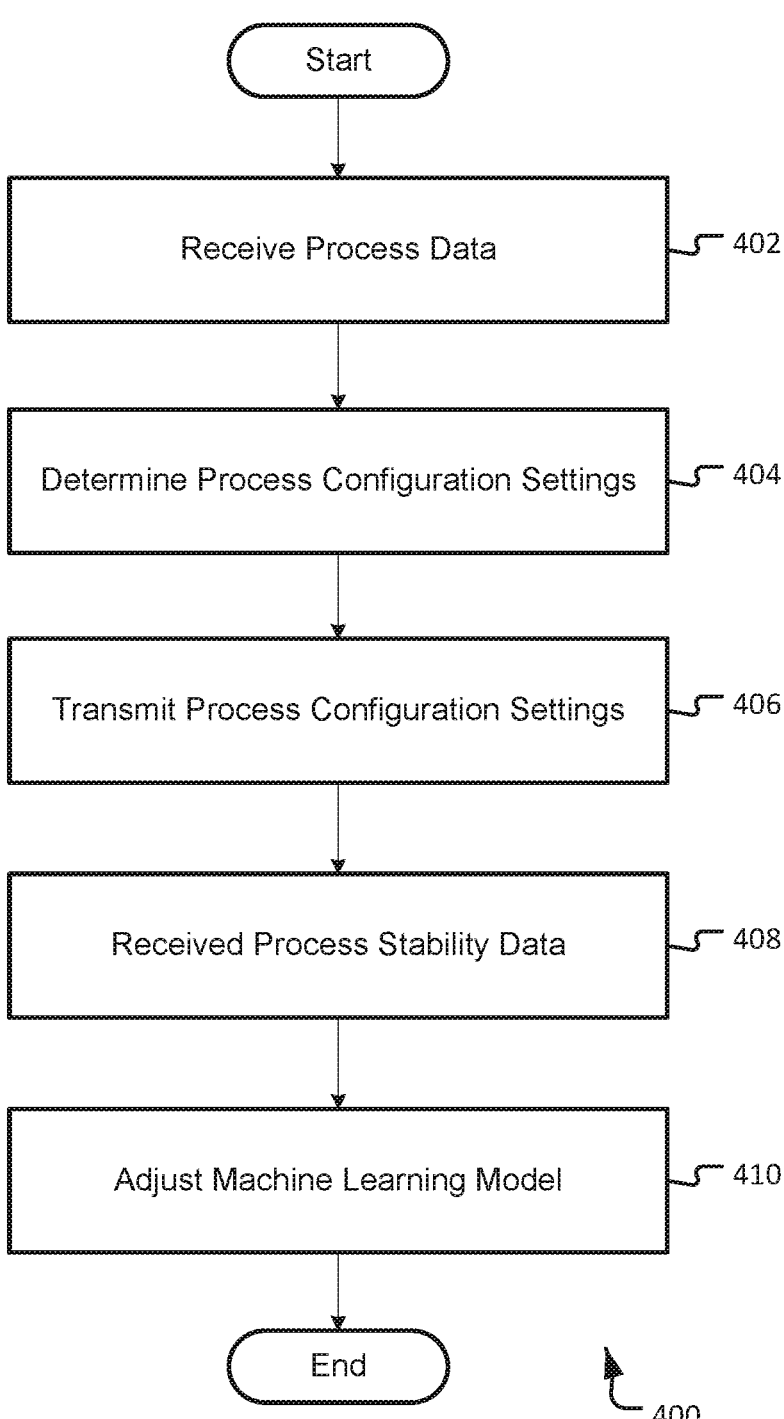
FIG. 4 illustrates an alternate example method for determining exploit prevention software settings using machine learning as described herein.

FIGS. 3 and 4 illustrate example methods for determining exploit prevention software settings using machine learning, as described herein. In aspects, methods 300 and 400 may be executed by an exemplary system such as system 100 of FIG. 1 and system 200 of FIG. 2. In examples, methods 300 and 400 may be executed on a device comprising at least one processor configured to store and execute operations, programs or instructions. However, methods 300 and 400 are not limited to such examples. In other examples, methods 300 and 400 may be performed by a remote application or service. In yet other examples, methods 300 and 400 may be executed (e.g., computer-implemented operations) by one or more components of a distributed network, such as a web service or distributed network service (e.g. cloud service).

Example method 300 begins at operation 302 where a list of running processes is obtained. In aspects, a computing device comprising exploit prevention software may be running one or more processes corresponding to one or more executable files. A process identification utility/device, such as identification engine 202, may have access to the processes and may be used to evaluate the processes. Evaluating the processes may involve determining, for example, currently executing processes, processes created and/or terminated over a particular time period, process states, process metadata, etc. Based on the evaluation, a list of processes currently running on the computing device may be generated or obtained. The process identification utility may identify metadata for one or more processes in the list of processes. The process metadata may include process name and/or identifier, methods and/or functions used by a process, objects used during execution of the process, and the like. The process metadata may be included in the list of processes or otherwise associated with the list of processes. The list of processes (and process metadata) may be arranged or prioritized according to one or more criteria, such as process owner, process identifier, process priority, process resource allocation/usage, process identifier, process security, process runtime, etc. In some aspects, the processes (and process metadata) in the list of processes may be converted (individually or collectively) into a hash or secure value using a hash or digest generating utility/device, such as hash generator 204. The hash or digest generating utility/device may apply one or more algorithms, functions, or rule sets to a process and/or process metadata for security or formatting reasons. The hash(es) may comprise or represent, for example, sections of a file associated with the process, resources accessed by the process, strings used in (or output by) the process, objects used during execution of the process, etc.

At operation 304, the list of processes may be provided to a machine learning system for providing or facilitating exploit prevention. In aspects, the list of processes and/or the process metadata may be provided to a machine learning system configured to determine safe or optimized configuration setting for each received process. The machine learning system may be located remotely from the computing device, such as in a server cluster or cloud-based environment. Alternately, the machine learning system may be located locally on the computing device. The machine learning system may apply the received process data (e.g., the list of processes, process metadata, and/or hash(es)) to a machine learning model, such as exploitation prevention model 206. The machine learning model may be (or have been) trained using one or more sets of labeled and/or unlabeled training data. The training data may comprise hash data, configuration settings, and/or decision logic for selecting configuration settings. The machine learning model may evaluate the process data and output exploitation prevention configuration settings for each process associated with the process data. In examples, determining exploitation prevention configuration settings may comprise comparing the process data to one or more data sources, such as exploit prevention software/services, lists of known processes/configuration settings, lists of known hashes, etc. As one example, the hash value in received process data may be may be compared to hash values retrieved from an exploitation prevention service. If the hash in the process data matches (or approximately matches) a hash from the exploit prevention service, a process configuration setting associated with the hash from the exploit prevention service may be assigned to (or selected for) the hash in the process data. In aspects, the process configuration settings output by the model may be provided to the exploit prevention software (or a separate component) of the computing device.

At operation 306, the process configuration settings may be applied to the computing device. In aspects, the process configuration settings provided by the machine learning model may be applied to the computing device by a utility/device, such as monitoring engine 208. Applying the exploitation prevention configuration settings may comprise restarting the computing device, restarting one or more processes or applications/services, downloading or installing an update or patch associated with the process, modifying previously-configured configuration settings, or the like. For example, a process configuration setting for a process of an executable file may be applied to the executable file. As a result, one or more configuration settings for the executable file may be modified, and the executable file may need to be restarted (or recompiled) in order for the new configuration settings to be implemented. In some aspects, applying the exploitation prevention configuration settings may further comprise updating a file, (such as change log or a versioning file) to track date/time, configuration settings version, update reason, or the like.

At operation 308, processes with updated process configuration settings may be monitored. In aspects, a monitoring utility/device, such as monitoring engine 208, may be associated with at least one of the computing device and the machine learning system. For example, the monitoring utility/device may be incorporated into the exploit prevention software of the computing device. The monitoring utility/device be configured to monitor processes of the computing device. Monitoring the processes may comprise collecting system/process statistics for the computing device, collecting performance statistics for individual processes, evaluating process statuses, evaluating process and event files, evaluating checkpoints in the executing code, etc. In at least one aspect, the monitoring utility/device and the identification utility/device may be the same utility/device. The processes and/or process statistics monitored may be predefined by a user, specified in a configuration file, or the like. Alternately, the processes and/or process statistics monitored may be dynamically determined by the monitoring utility/device. For example, a process may be monitored if the monitoring utility/device determines the process configuration setting assigned to the process possesses a value indicating the process is to be monitored or a value indicating the process is below a predetermined threshold. Such a value may include a trustworthiness rating/score, a stability rating/score, a label (such as "monitor" or "do not monitor"), etc. In aspects, the information collected by monitoring may be different for one or more processes. For example, only (or primarily) resource utilization statistics may be collected for a first process, whereas only (or primarily) process exit values may be monitored for a second process. The monitoring utility/device may collect and/or store the monitored data in one or more data stores.

In some aspects, the monitoring utility/device may react to detected events. For example, the monitoring utility/device may detect that one or more processes have prematurely terminated, generated exceptions, or are otherwise unstable. Based on the determination, the monitoring utility/device may reduce come aspect of the exploit protection techniques applied to the process(es). As a specific example, the monitoring utility/device may increase the resources (e.g., libraries, memory address space, etc.) available to a process, and restart the process. The monitoring utility/device may continue to monitor and adjust the exploit protection of the process until the process is stable or until the process terminates without error.

At operation 310, the monitored data may be transmitted to the machine learning system. In aspects, the monitored data (or portions thereof) may be provided to (or be made accessible to) a machine learning system. For example, the monitored stability data for one or more processes may be provided to the machine learning system. The machine learning system may be the machine learning system previously described or a separate machine learning system/service. In aspects, the machine learning system may evaluate monitored data using an evaluation utility/device, such as stability evaluation engine 210. The evaluation may determine, for example, the stability or health of one or more of the monitored processes, and may generate a metric or label for the process configuration setting corresponding the monitored process(es).

Example method 400 begins at operation 402 where process data is received. In aspects, a machine learning system may receive process data for a list of processes running on a computing device. The machine learning system may be configured to determine and/or provide one or more exploit prevention techniques. After receiving the process data, the machine learning system may process the process data. Processing the process data may comprise parsing the process data (or using other known identification techniques) to identify, for example, one or more process identifiers or hashes/digests representing processes in the process data, or metadata associated with the process data. The metadata may include process names and/or identifiers, methods and/or functions used by a process, objects used during execution of the process, and the like. The processed data (or portions thereof) may be used to identify or generate one or more exploit prevention techniques.

At operation 404, process configuration setting may be determined. In aspects, the machine learning system may use the processed process data to determine exploit prevention techniques for one or more processes. Determining exploitation prevention configuration settings may comprise comparing the process data (e.g., process/hash identifier, process/hash metadata, etc.) to one or more data sources. Examples of data sources may include exploit prevention software/services, "whitelists" of known safe processes/ configuration settings, "blacklists" of known or suspected unsafe processes/configuration settings, virus definitions, and the like. For example, the machine learning system may compare a hash identifier in processed data to an exploit prevention whitelist comprising a list of hash identifiers and corresponding process configuration settings. If an exact match is identified, the process configuration settings for that matched hash identifier may be assigned to the hash identifier in the processed data. If an exact match is not identified, the machine learning system may provide at least a portion of the processed process data as input to one or more machine learning models. The model(s) may be trained to identify and/or determine exploit prevention techniques for one or more processes. The model may apply decision logic (such as a fuzzy matching algorithm or string approximation algorithm) to determine similarities between a hash identifier in the processed process data and hash identifiers accessible in a different storage location (e.g., a cache, a rule set, a data source, etc.). The process configuration settings for the hash identifier determined by the model to be most similar may be assigned to the hash identifier in the processed data.

In some aspects, two or more different process configuration settings may be associated with the same process. For example, the machine learning system and/or the model may identify a plurality of different process configuration settings for a single process or hash identifier. The plurality of different process configuration settings may represent configuration settings from different data sources, various versions of the same configuration settings, various chronological instances of the same configuration settings, or the like. In such aspects, a process configuration setting may be selected based on one or more criteria. Such criteria may include a ranking or priority of a data source, the recency (e.g., creation time/data or modification time/date) of the process configuration settings, stability statistics related to the process configuration settings, and the like. In at least one alternate aspect, a list of available configuration settings may be provided to a user via an interface component, such as a user interface. The interface component may enable the user to select or otherwise indicate a configuration setting for a process/hash identifier. The machine learning system or the model may associate the selected/indicated configuration setting with the process identifier, and store the association information in a storage location.

At operation 406, process configuration settings may be provided to a computing device. In aspects, the process configuration settings for one or more settings in the process data received from the computing device may be provided to the computing device. The computing device may apply the process configuration settings for one or more processes and perform one or more actions to ensure the process configuration settings are put into effect (e.g., restart the computing device or process, recompile an executable file, etc.). The computing device may monitor and collect stability and/or health data for at least the processes corresponding to the recently applied process configuration settings. In examples, monitoring the processes may comprise collecting system/ process statistics for the computing device, collecting performance statistics for individual processes, evaluating process statuses, evaluating process and event files, evaluating checkpoints in the executing code, etc.

At operation 408, process stability data may be received. In aspects, the machine learning system may receive monitored process data from the computing device or a device associated with the computing device. The machine learning system may evaluate the monitored process data using an evaluation utility/device, such as stability evaluation engine 210. The evaluation may determine, for example, the stability or health of one or more of the monitored processes. Evaluating the monitored process data may comprise analyzing aspects of the system performance of the computing device (e.g., system/process uptime and resource utilization, task execution speed and quality, security events, etc.), comparing the monitored data to previously monitored data, comparing the monitored data to benchmark data, performing trend analysis and/or creation, etc. As a specific example, the evaluation utility/device may compare a set of process stability data (e.g., average process runtimes, number of process crashes, number of reported errors/exceptions, process exit values, etc.) to a set of process stability data from a previous monitoring period to determine whether processes (or the system) have become more or less stable. In some aspects, the evaluation utility/device may generate metrics or labels for the monitored data based on the evaluation of the monitored data. The metrics or labels may indicate a level of stability, priority, or recency for a process or process configuration setting. For instance, a process configuration setting recently applied to a monitored process of a computing device, may reduce the number of crashes or exceptions reported for the monitored process. As a result, the process configuration setting may be determined to be an improvement over a process configuration setting applied to the process. The improvement may be denoted with a label such as "more stable" or a stability score that exceeds the stability score of the previous process configuration setting.

At operation 410, a machine learning model may be adjusted based on the process stability data. In aspects, monitored process information (e.g., health/stability information for one or more processes, metrics/labels generated in operation 408, and the like) may be provided as input to a machine learning model. The machine learning model may be machine learning model previously described or a different machine learning model. As a result of providing the monitored process information to the machine learning model, the machine learning model may be trained or adjusted. Such training/adjustment may enable the machine learning model to more efficiently and/or accurately correlate process configuration settings with received process data (e.g., process identifiers, hash identifiers, etc.). For example, the machine learning model may have access to a set of historical process stability statistics and process configuration settings. Upon receiving a current set of process stability statistics and process configuration settings, the machine learning model may determine one or more of the current process configuration settings is more stable than one or more of the historical process configuration settings. In accordance with this determination, the machine learning model may update or replace the historical process configuration settings with the current process configuration settings; thus, adjusting/training the machine learning model. Alternately, the machine learning model may receive a current set of process stability statistics and process configuration settings indicating a decrease in process and/or system stability. In accordance with this determination, the machine learning model may update or replace the current process configuration settings with a previous or alternative version of the process configuration settings; thus, reducing the protection applied to the process associated with the process configuration settings.

Figure 5:
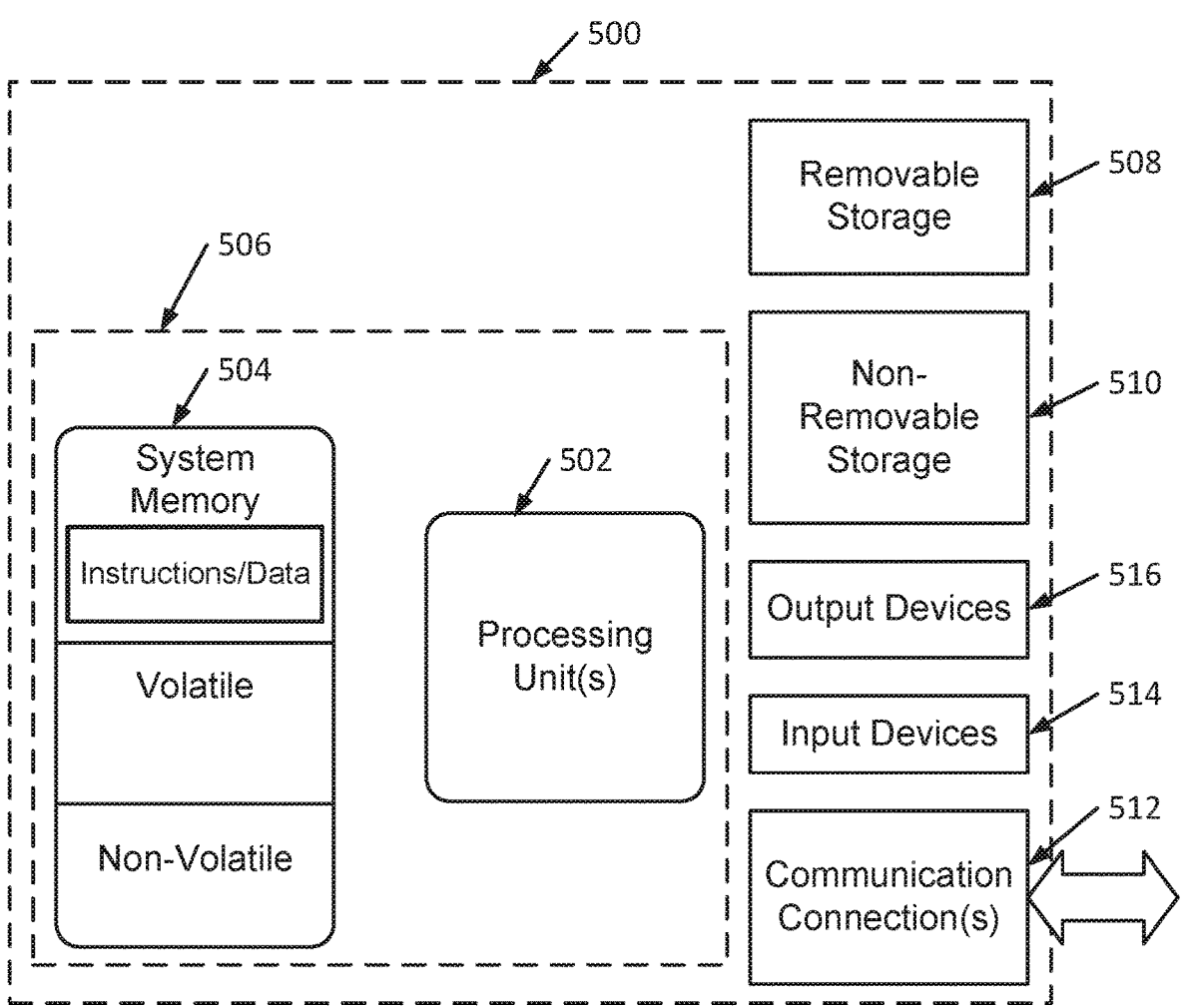
FIG. 5 illustrates one example of a suitable operating environment in which one or more of the present embodiments may be implemented.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, notification data, anti-exploit code/data, instructions to perform the methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for adjusting exploit prevention configuration settings comprising:

receiving, by a machine learning system for exploit prevention from exploit prevention software executing on a computing device, process information for one or more protected processes protected by the exploit prevention software and executing on the computing device, the machine learning system comprising a machine learning model trained to determine process configuration settings for the one or more protected processes and exploit prevention configuration settings for the exploit prevention software, for each of the one or more protected processes, the machine learning model representing training data comprising:

training process information for each of one or more processes protectable by the exploit prevention software; and training configuration settings;

generating, by the machine learning system, the exploit prevention configuration settings for the exploit prevention software and the process configuration settings for the one or more protected processes based on the process information for the one or more protected processes, wherein generating the exploit prevention configuration settings comprises applying the machine learning model to the process information for the one or more protected processes;

providing, by the machine learning system to the exploit prevention software executing on the computing device, the exploit prevention configuration settings;

providing, by the machine learning system, the process configuration settings to the one or more protected processes;

receiving, by the machine learning system from the exploit prevention software, monitored process stability data for each of the one or more protected processes, the monitored process stability data indicating monitored stability of each of the one or more protected processes monitored during execution before and after application of the exploit prevention configuration settings into the exploit prevention software, the monitored process stability data comprising for each of the one or more protected processes at least one of a number of processes crashes or a number of reported errors;

determining, by the machine learning system based on the received monitored process stability data, whether the one or more protected processes have become more or less stable after application of the exploit prevention configuration settings into the exploit prevention software;

based on whether the one or more protected processes have become more or less stable while executing on the computing device, adjusting:

the process configuration settings provided by the machine learning system to the one or more protected processes; and the exploit prevention configuration settings provided by the machine learning system to the exploit prevention software; and applying the adjusted process configuration settings and the adjusted exploit prevention configuration settings to the computing device.

2. The method of claim 1, wherein the process information comprises metadata for the one or more protected processes, wherein the metadata corresponds to at least one of a process identifier, methods or functions used by the one or more protected processes, and objects used during execution of the one or more protected processes.

3. The method of claim 1, wherein the process information comprises one or more hash values for the one or more protected processes, and wherein the one or more hash values are received by the machine learning system from the exploit prevention software.

4. The method of claim 1, wherein the exploit prevention configuration settings comprise at least one configuration setting for each protected process identified in the process information.

5. The method of claim 1, wherein applying the exploit prevention configuration settings comprises at least one of: a setting to cause restarting the computing device, a setting to cause restarting the one or more protected processes by the computing device, a setting to cause modifying previously-configured configuration settings by the computing device, and a setting to cause recompiling a file by the computing device.

6. The method of claim 1, wherein the monitored process stability data comprises at least one of: system health statistics for the computing device, performance statistics for the one or more protected processes, process status for the one or more protected processes, evaluations of event files, and evaluations of checkpoints in executing code.

7. The method of claim 1, further comprising:

evaluating the monitored process stability data; and when the monitored process stability data indicates a decrease in the process stability of the one or more protected processes, reducing, by the computing device, exploit protection provided by the exploit prevention configuration settings.

8. The method of claim 1, wherein determining whether the one or more protected processes have become more or less stable comprises determining whether the one or more protected processes have become more or less stable after application of the exploit prevention configuration settings into the exploit prevention software and as compared to the one or more protected processes executing on the computing device with prior exploit configuration settings applied into the exploit prevention software.

9. A system comprising:

at least one processor; and memory coupled to the at least one processor, the memory storing computer executable instructions that, when executed by the at least one processor, performs a method comprising:

receiving, by a machine learning system for exploit prevention from exploit prevention software executing on a computing device, process information for one or more protected processes protected by the exploit prevention software and executing on the computing device;

generating, by the machine learning system, exploit prevention configuration settings for the exploit prevention software and process configuration settings for the one or more protected processes, based on the process information for the one or more protected processes, wherein generating the exploit prevention configuration settings comprises applying a machine learning model to the process information for the one or more protected processes, the machine learning model trained to determine the process configuration settings for the one or more protected processes and the exploit prevention configuration settings for the exploit prevention software, the machine learning model representing training data comprising:

training process information for each of one or more processes protectable by the exploit prevention software; and training configuration settings;

providing, by the machine learning system to the exploit prevention software executing on the computing device, the exploit prevention configuration settings;

receiving, by the machine learning system from the exploit prevention software, monitored process stability data for each of the one or more protected processes, the monitored process stability data indicating stability monitored of each of the one or more protected processes monitored during execution before and after application of the exploit prevention configuration settings into the exploit prevention software, the monitored process stability data comprising for each of the one or more protected processes at least one of a number of processes crashes or a number of reported errors;

determining, by the machine learning system based on the received monitored process stability data, whether the one or more protected processes have become more or less stable after application of the exploit prevention configuration settings into the exploit prevention software;

based on whether the one or more protected processes have become more or less stable while executing on the computing device, adjusting:

the process configuration settings provided by the machine learning system to the one or more protected processes; and the exploit prevention configuration settings provided by the machine learning system to the exploit prevention software; and applying the adjusted process configuration settings and the adjusted exploit prevention configuration settings to the computing device.

10. The system of claim 9, wherein the process information comprises metadata for the one or more protected processes, wherein the metadata corresponds to at least one of a process identifier, methods or functions used by the one or more protected processes, and objects used during execution of the one or more protected processes.

11. The system of claim 9, wherein the process information comprises one or more hash values for the one or more protected processes, and wherein the one or more hash values are received by the machine learning system from the exploit prevention software.

12. The system of claim 9, wherein the exploit prevention configuration settings comprise at least one configuration setting for each protected process identified in the process information.

13. The system of claim 8, wherein applying the exploit prevention configuration settings comprises at least one of: a setting to cause restarting the computing device, a setting to cause restarting the one or more protected processes by the computing device, a setting to cause modifying previously-configured configuration settings by the computing device, and a setting to cause recompiling a file by the computing device.

14. The system of claim 9, wherein the monitored process stability data comprises at least one of: system health statistics for the computing device, performance statistics for the one or more protected processes, process status for the one or more protected processes, evaluations of event files, and evaluations of checkpoints in executing code.

15. The system of claim 9, wherein the method further comprises:

evaluating the monitored process stability data; and when the monitored process stability data indicates a decrease in the process stability of the one or more protected processes, reducing, by the computing device, exploit protection provided by the exploit prevention configuration settings.

16. The system of claim 9, wherein determining whether the one or more protected processes have become more or less stable comprises determining whether the one or more protected processes have become more or less stable after application of the exploit prevention configuration settings into the exploit prevention software and as compared to the one or more protected processes executing on the computing device with prior exploit configuration settings applied into the exploit prevention software.

17. A computer program product comprising a non-transitory computer-readable medium storing instructions executable by one or more processors to perform:

receiving, by a machine learning system for exploit prevention from exploit prevention software executing on a computing device, process information for one or more protected processes protected by the exploit prevention software and executing on the computing device;

generating, by the machine learning system, exploit prevention configuration settings for the exploit prevention software and process configuration settings for the one or more protected processes, based on the process information for the one or more protected processes, wherein generating the exploit prevention configuration settings and the process configuration settings comprises applying a machine learning model to the process information for the one or more protected processes, the machine learning model trained to determine the exploit prevention configuration settings for the exploit prevention software and the process configuration settings for the one or more protected processes, the machine learning model representing training data comprising:

training process information for each of one or more processes protectable by the exploit prevention software; and training configuration settings;

providing, by the machine learning system to the exploit prevention software executing on the computing device, the exploit prevention configuration settings;

receiving, by the machine learning system from the exploit prevention software, monitored process stability data for each of the one or more protected processes, the monitored process stability data indicating stability of each of the one or more protected processes monitored during execution before and after application of the exploit prevention configuration settings into the exploit prevention software, the monitored process stability data comprising for each of the one or more protected processes at least one of a number of processes crashes or a number of reported errors;

determining, by the machine learning system based on the received monitored process stability data, whether the one or more protected processes have become more or less stable after application of the exploit prevention configuration settings into the exploit prevention software;

based on whether the one or more protected processes have become more or less stable while executing on the computing device, adjusting:

the process configuration settings provided by the machine learning system to the one or more protected processes; and the exploit prevention configuration settings provided by the machine learning system to the exploit prevention software; and applying the adjusted process configuration settings and the adjusted exploit prevention configuration settings to the computing device.

18. The computer program product of claim 17, wherein the process information comprises metadata for the one or more protected processes, wherein the metadata corresponds to at least one of a process identifier, methods or functions used by the one or more protected processes, and objects used during execution of the one or more protected processes.

19. The computer program product of claim 17, wherein the process information comprises one or more hash values for the one or more protected processes, and wherein the one or more hash values are received by the machine learning system from the exploit prevention software.

20. The computer program product of claim 17, wherein the exploit prevention configuration settings comprise at least one configuration setting for each protected process identified in the process information.

21. The computer program product of claim 17, wherein applying the exploit prevention configuration settings comprises at least one of: a setting to cause restarting the computing device, a setting to cause restarting the one or more protected processes by the computing device, a setting to cause modifying previously-configured configuration settings by the computing device, and a setting to cause recompiling a file by the computing device.

22. The computer program product of claim 17, wherein the monitored process stability data comprises at least one of: system health statistics for the computing device, performance statistics for the one or more protected processes, process status for the one or more protected processes, evaluations of event files, and evaluations of checkpoints in executing code.

23. The computer program product of claim 17, wherein determining whether the one or more protected processes have become more or less stable comprises determining whether the one or more protected processes have become more or less stable after application of the exploit prevention configuration settings into the exploit prevention software and as compared to the one or more protected processes executing on the computing device with prior exploit configuration settings applied into the exploit prevention software.

* * * * *